United States Patent [19]

Wheelwright et al.

[11] Patent Number: 4,768,145

[45] Date of Patent: Aug. 30, 1988

[54] BUS SYSTEM

[75] Inventors: Lynn M. Wheelwright; William B. Harmon; James W. Coffron, all of Santa Rosa, Calif.

[73] Assignee: Hewlett-Packard Company, Palo Alto, Calif.

[21] Appl. No.: 675,800

[22] Filed: Nov. 28, 1984

[51] Int. Cl.[4] .............................................. G06F 13/42

[52] U.S. Cl. .................................................... 364/200

[58] Field of Search ... 364/200 MS File, 900 MS File

[56] References Cited

U.S. PATENT DOCUMENTS

| | | | |
|---|---|---|---|
| 4,038,644 | 7/1977 | Duke et al. | 364/900 |
| 4,041,472 | 8/1977 | Shah et al. | 364/900 |
| 4,128,883 | 12/1978 | Duke et al. | 364/200 |
| 4,205,373 | 5/1980 | Shah et al. | 364/200 |
| 4,212,080 | 7/1980 | Milliken | 364/900 |
| 4,491,909 | 1/1985 | Shimizu | 364/200 |
| 4,511,968 | 4/1985 | Fencsik et al. | 364/200 |

*Primary Examiner*—Gareth D. Shaw
*Assistant Examiner*—Kevin A. Kriess
*Attorney, Agent, or Firm*—Donald N. Timbie; William C. Milks, III

[57] ABSTRACT

A bus system is disclosed in which stations having a message to send request access to a parallel bus and an arbitrator responding to the requests connects the transmitters of the stations to the bus in sequence. The words of a message placed on the bus respectively represent the address of the station to which the message is to be delivered, the address of the sending station, and data. A station asserts a signal on one control line in response to its address being on the bus and asserts a signal on another control line if it cannot receive a message. Whether the entire message is placed on the bus or not by the sending station and loaded into the registers of the receiving station depends on whether or not their signals are asserted. An external data transfer means places signals to a station on another parallel bus on an external bus. The external bus is in the form of a loop so that the message eventually returns to the station that sent it. Bits are added to certain of the words in the message when it starts around the loop and the logic level of these bits when they return to the station that sent the message indicates whether the station to which the message was sent exists and, if so, whether or not the message was delivered.

8 Claims, 209 Drawing Sheets

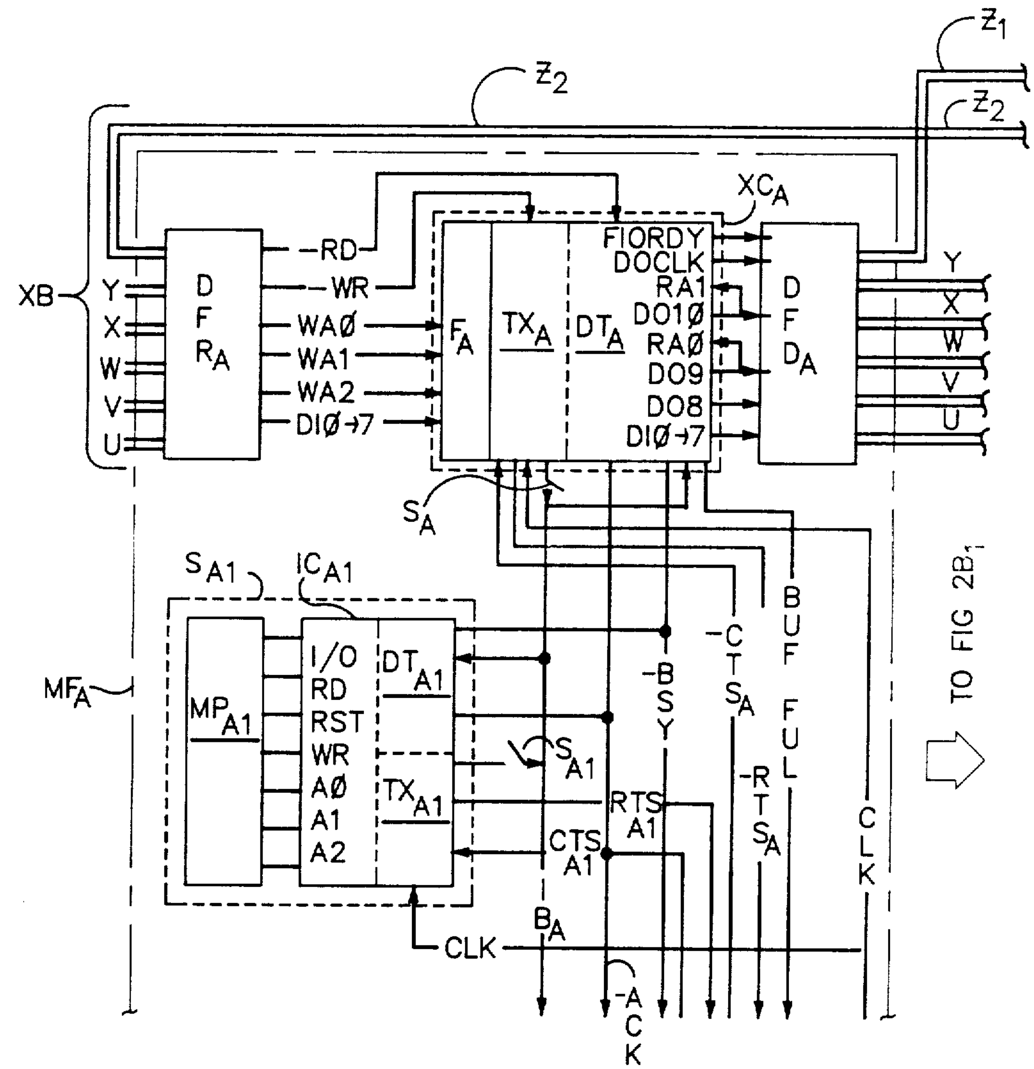
FIG 2A1
TO FIG 2A2

TO FIG 2A1
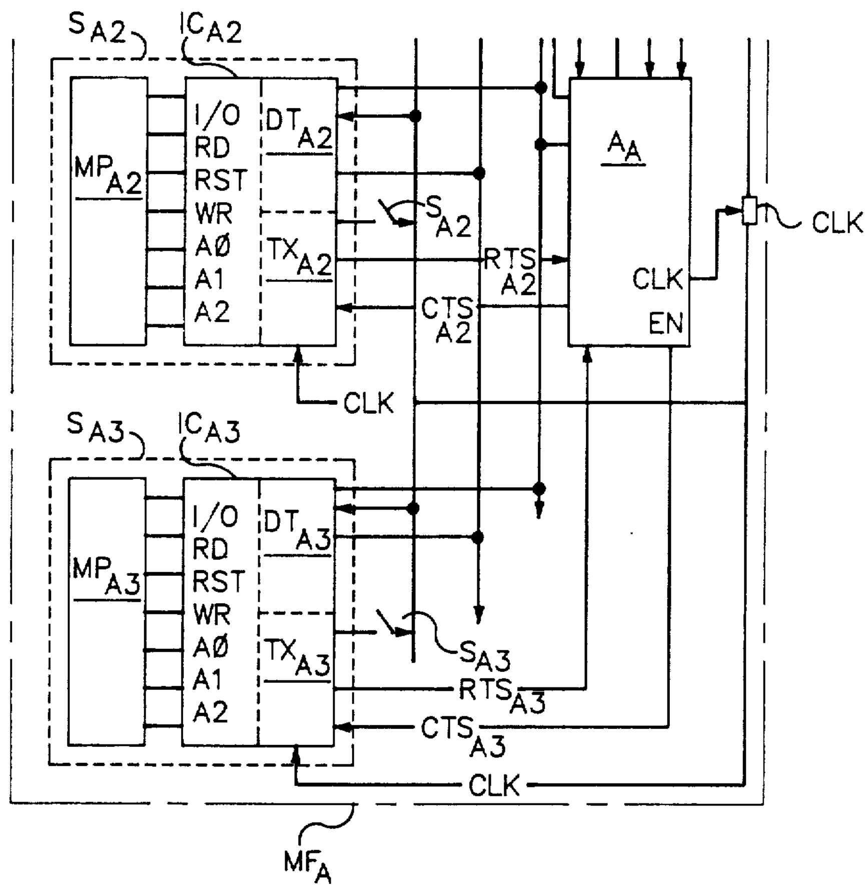
FIG 2A2

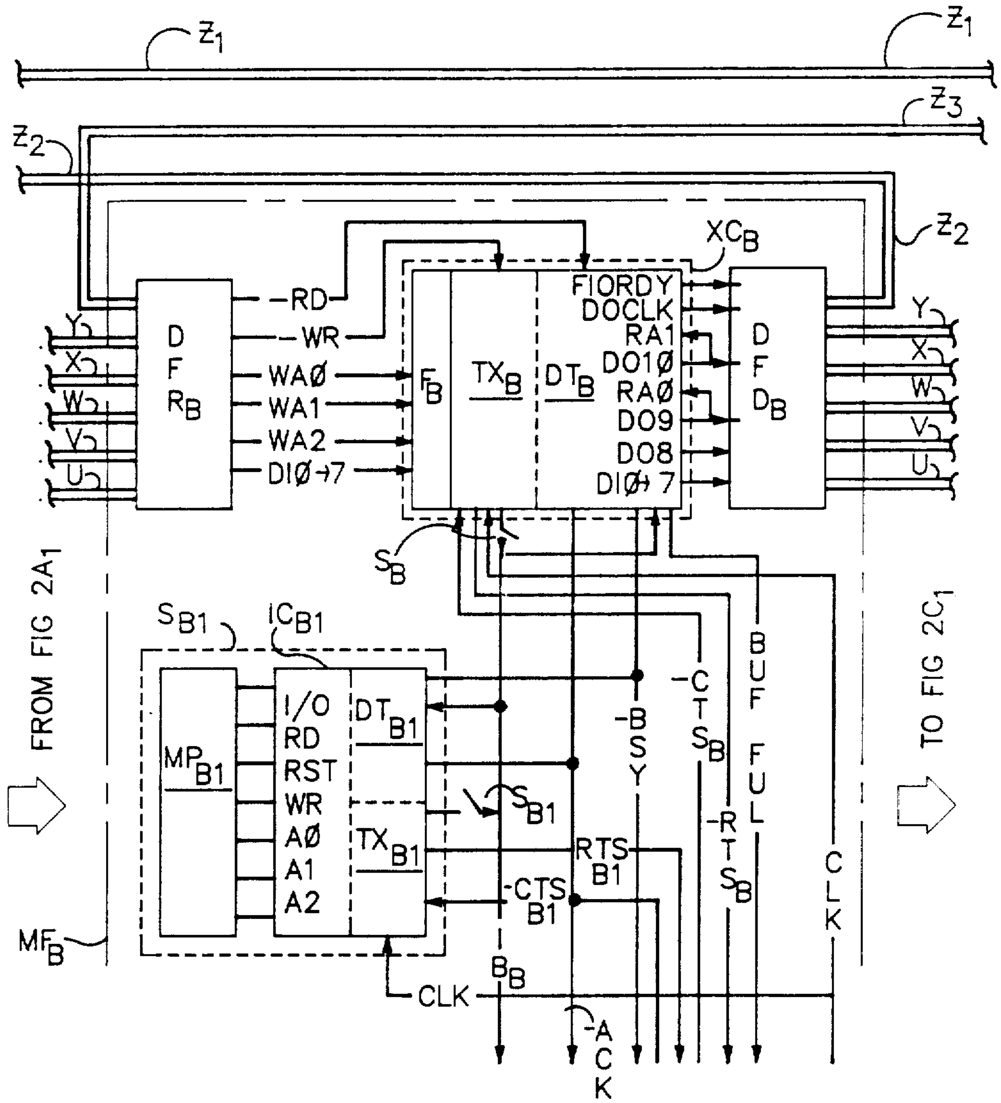
FIG 2B1
TO FIG 2B2

TO FIG 2B1
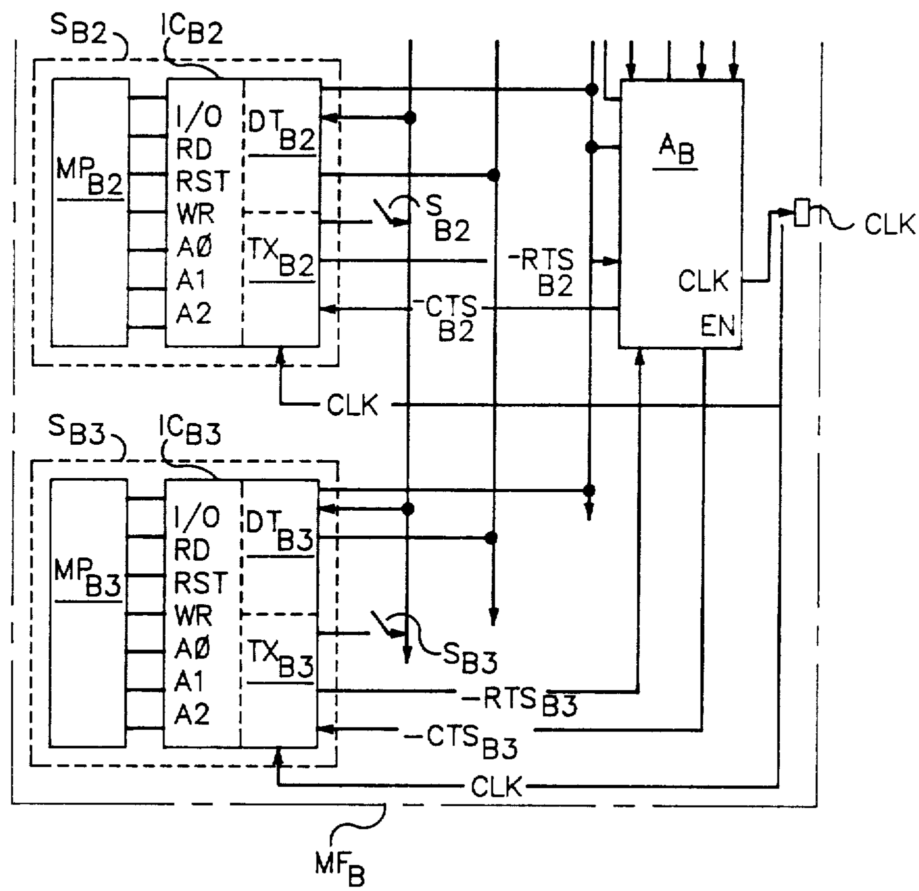
FIG 2B2

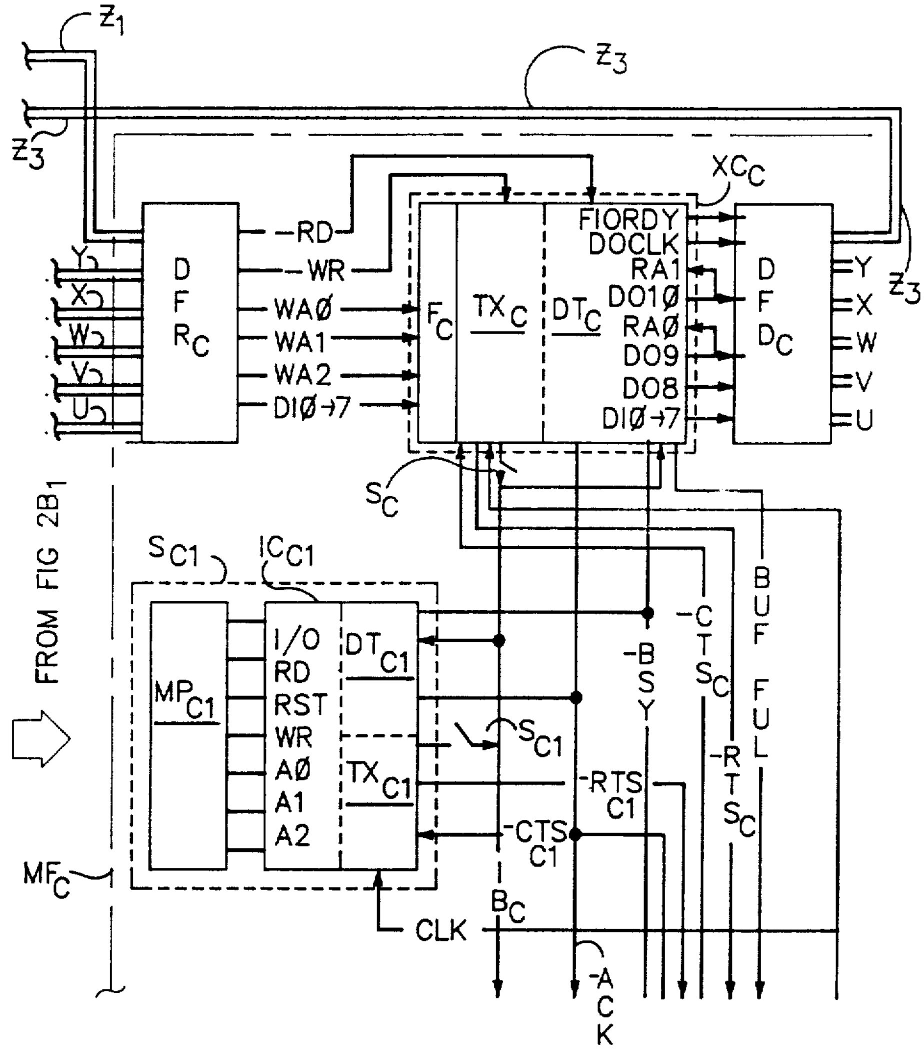
FIG 2C1
TO FIG 2C2

TO FIG 2C1
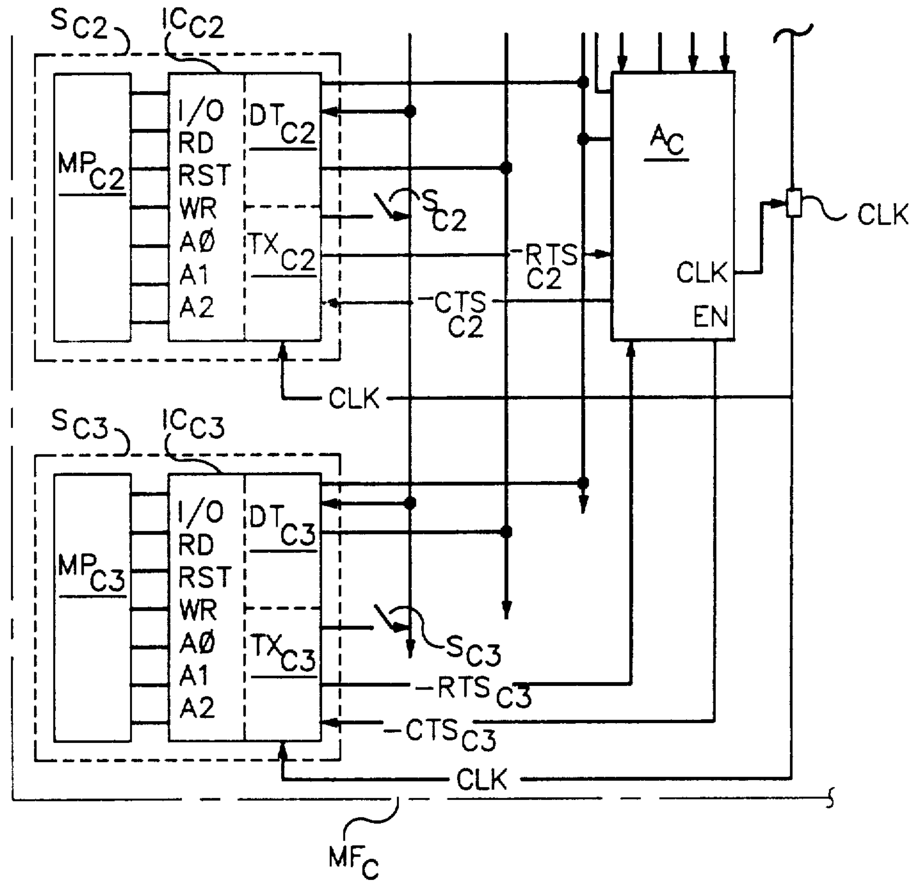
FIG 2C2

FIG 3A$_1$
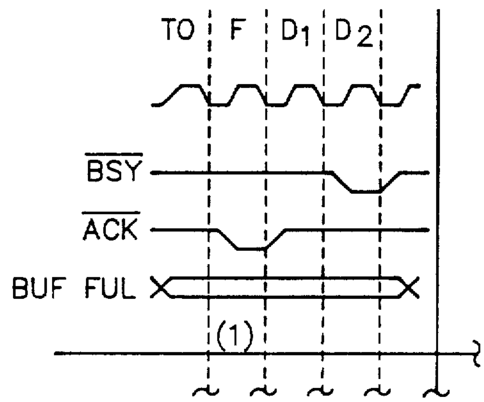
FIG 3A$_2$
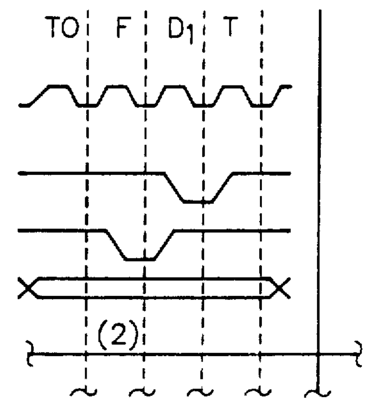
FIG 3B$_1$
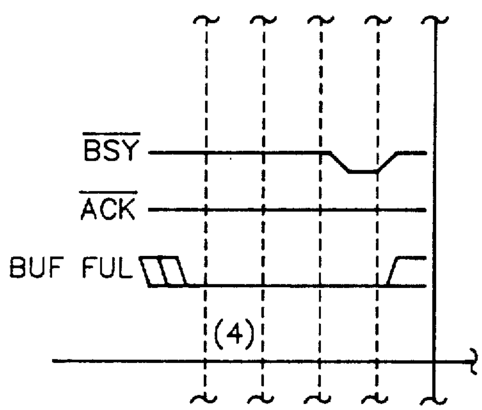
FIG 3B$_2$
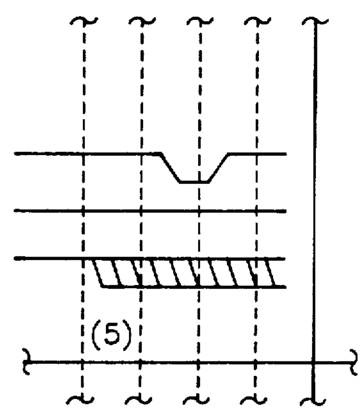

FIG 3A3
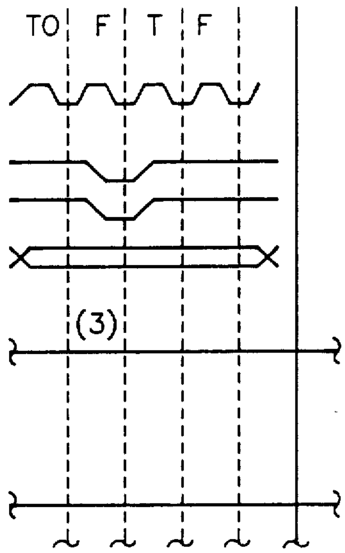
FIG 3A4
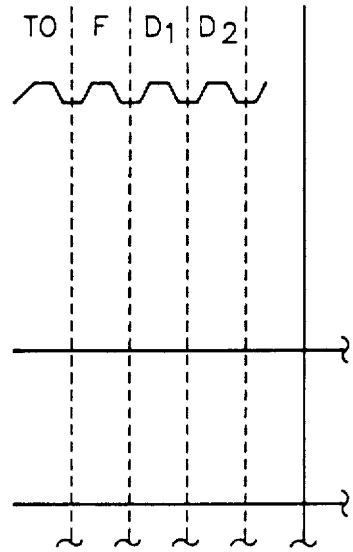
FIG 3D3
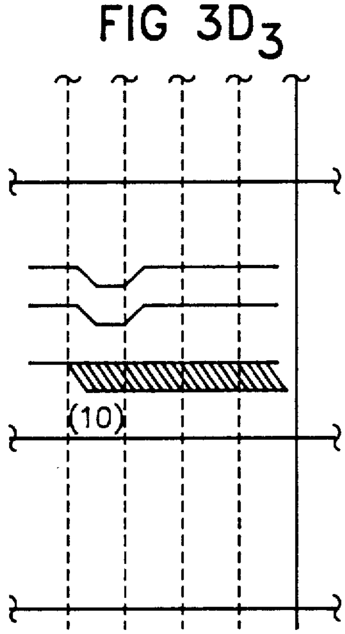
FIG 3D4
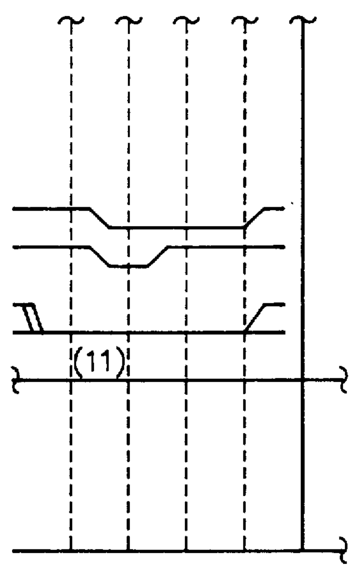

FIG 3A5
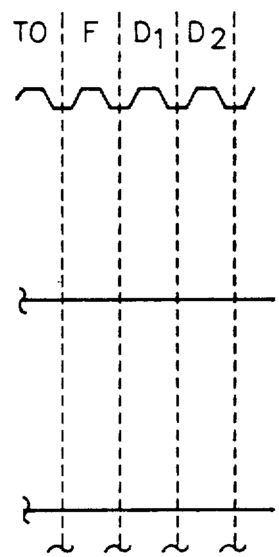
FIG 3D5
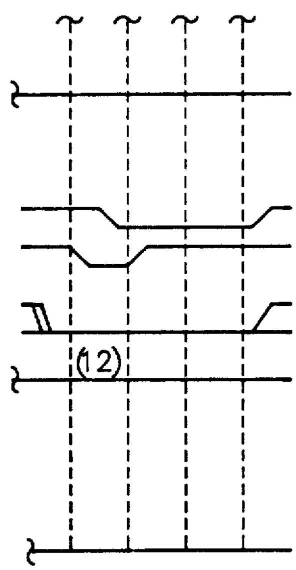

FIG $3C_1$
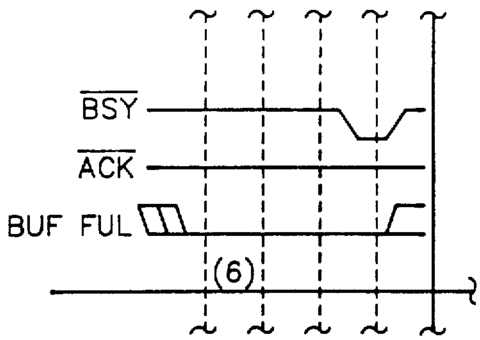
FIG $3C_2$
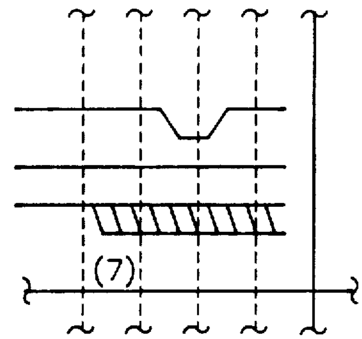
FIG $3D_1$
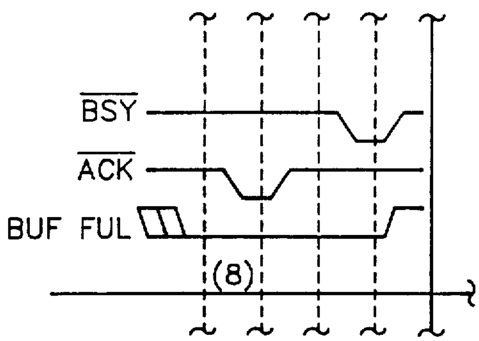
FIG $3D_2$
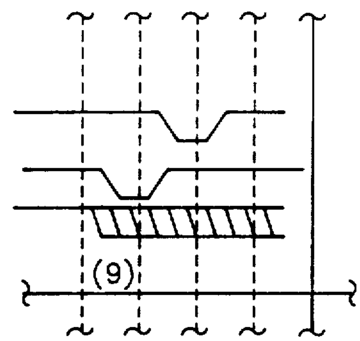
FIG $3E_1$
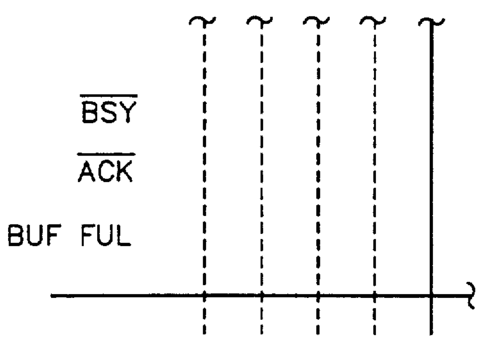
FIG $3E_2$
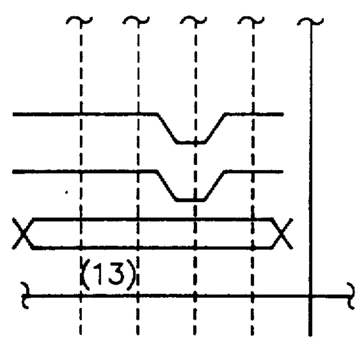

FIG $10_1$
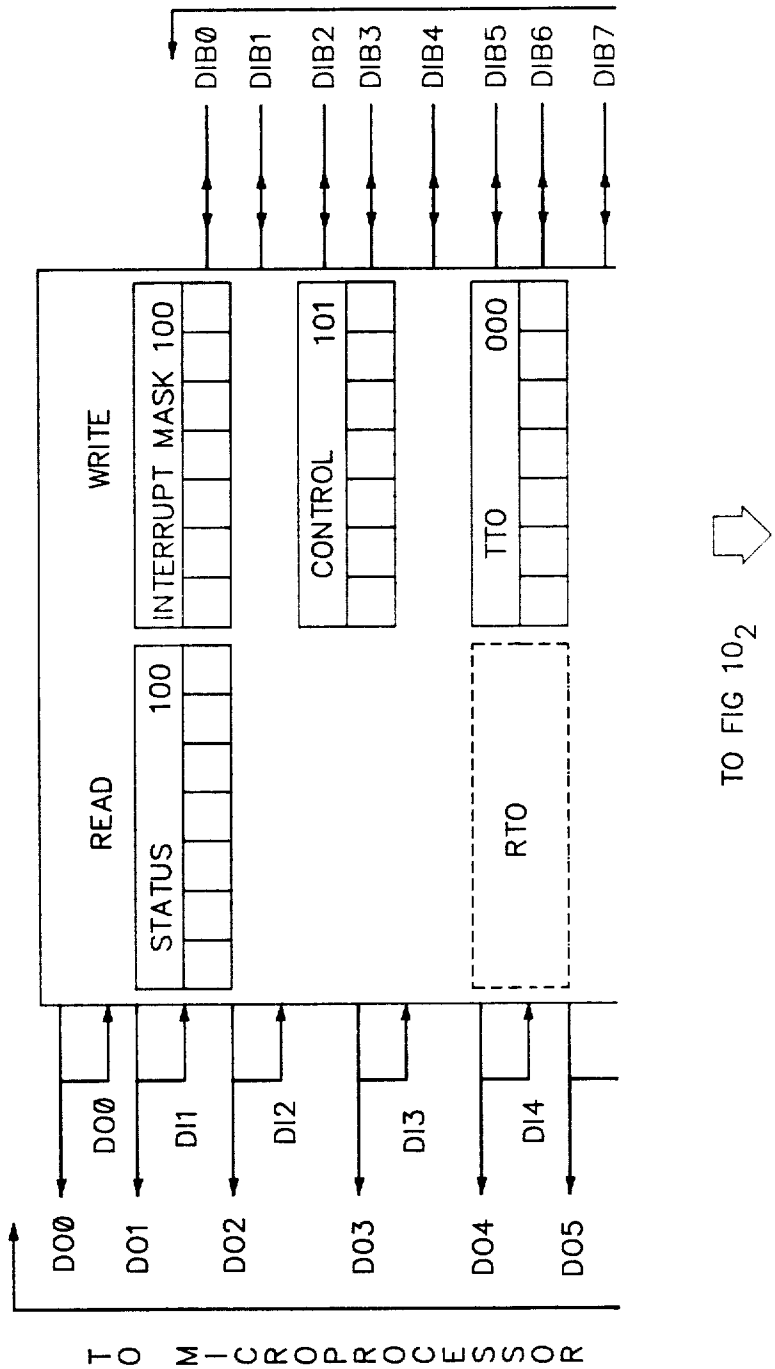

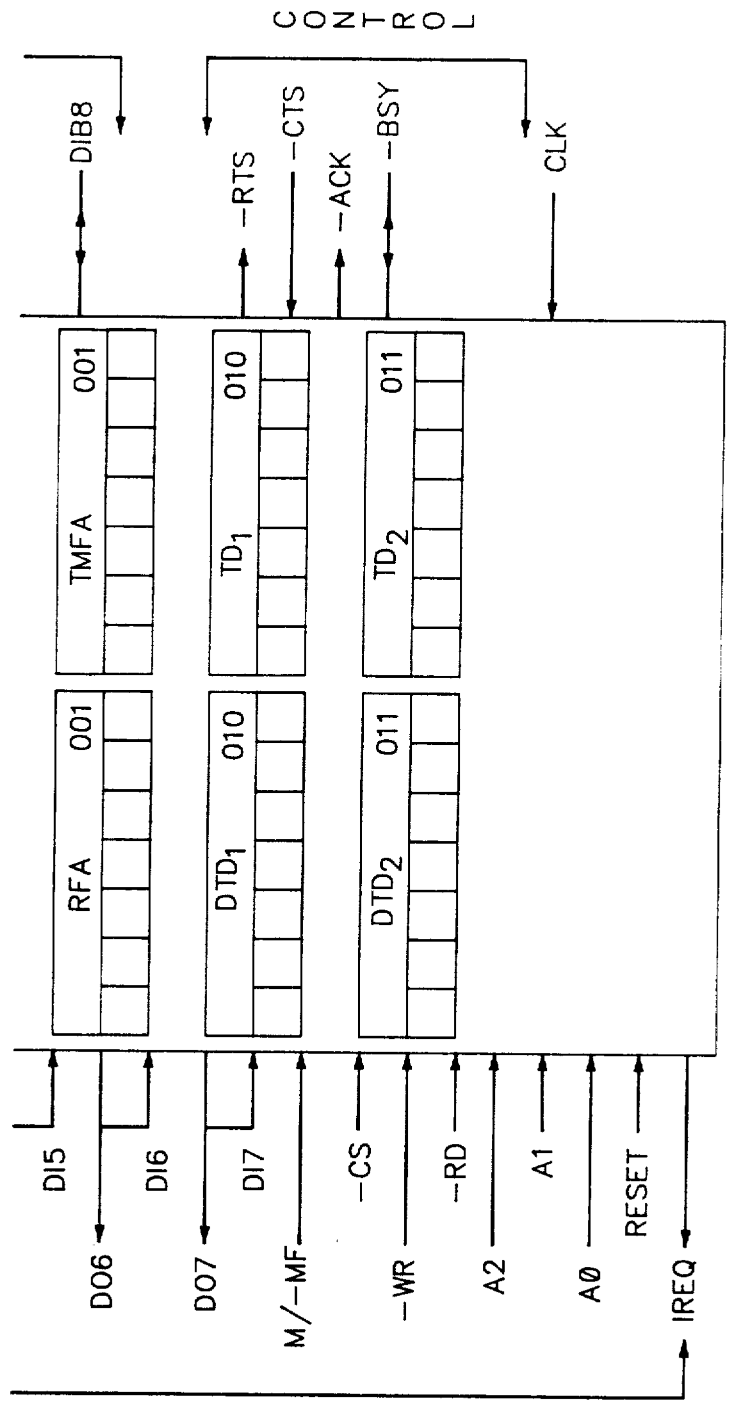
TO FIG $10_1$
FIG $10_2$

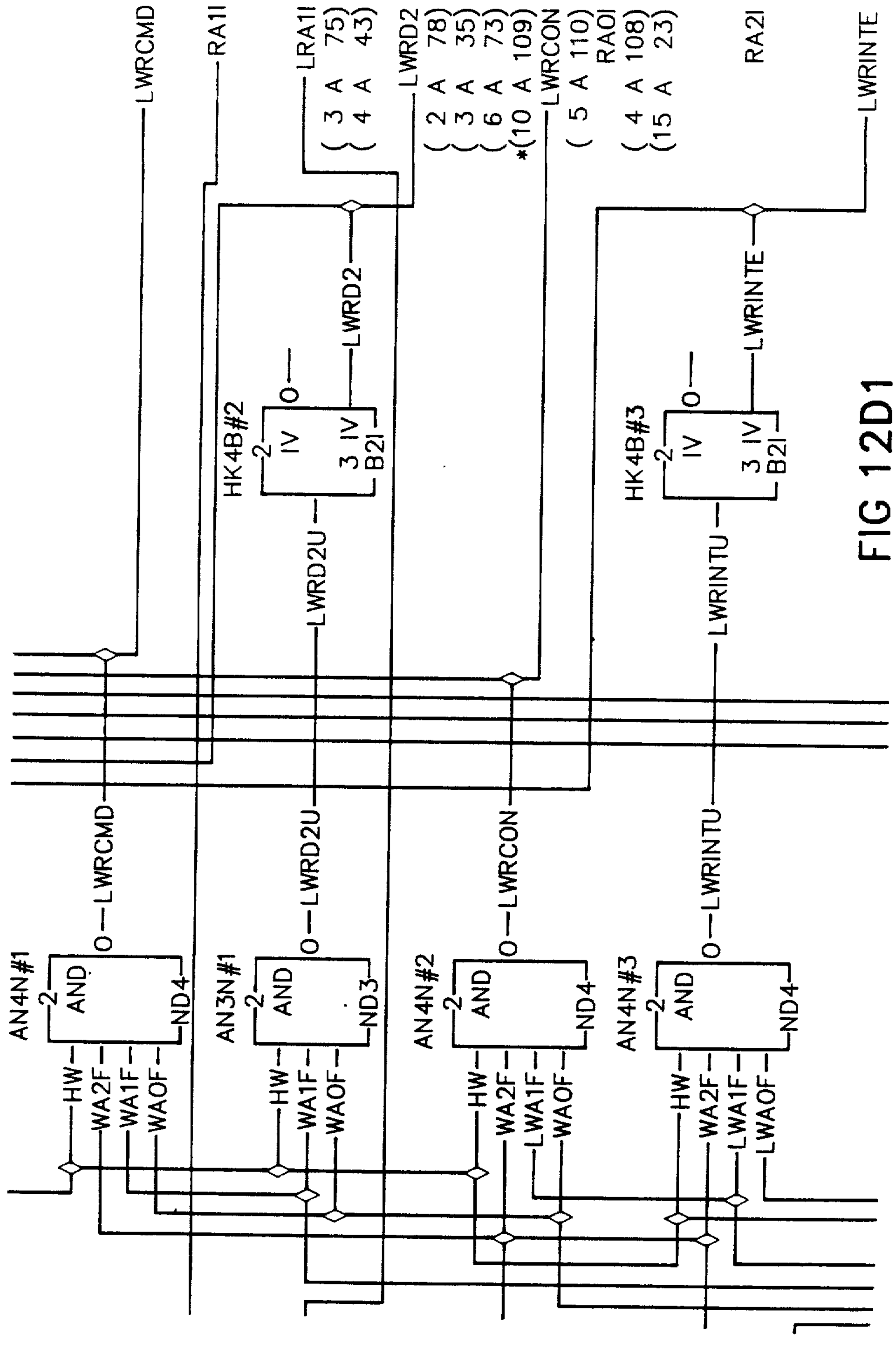
FIG 12D1

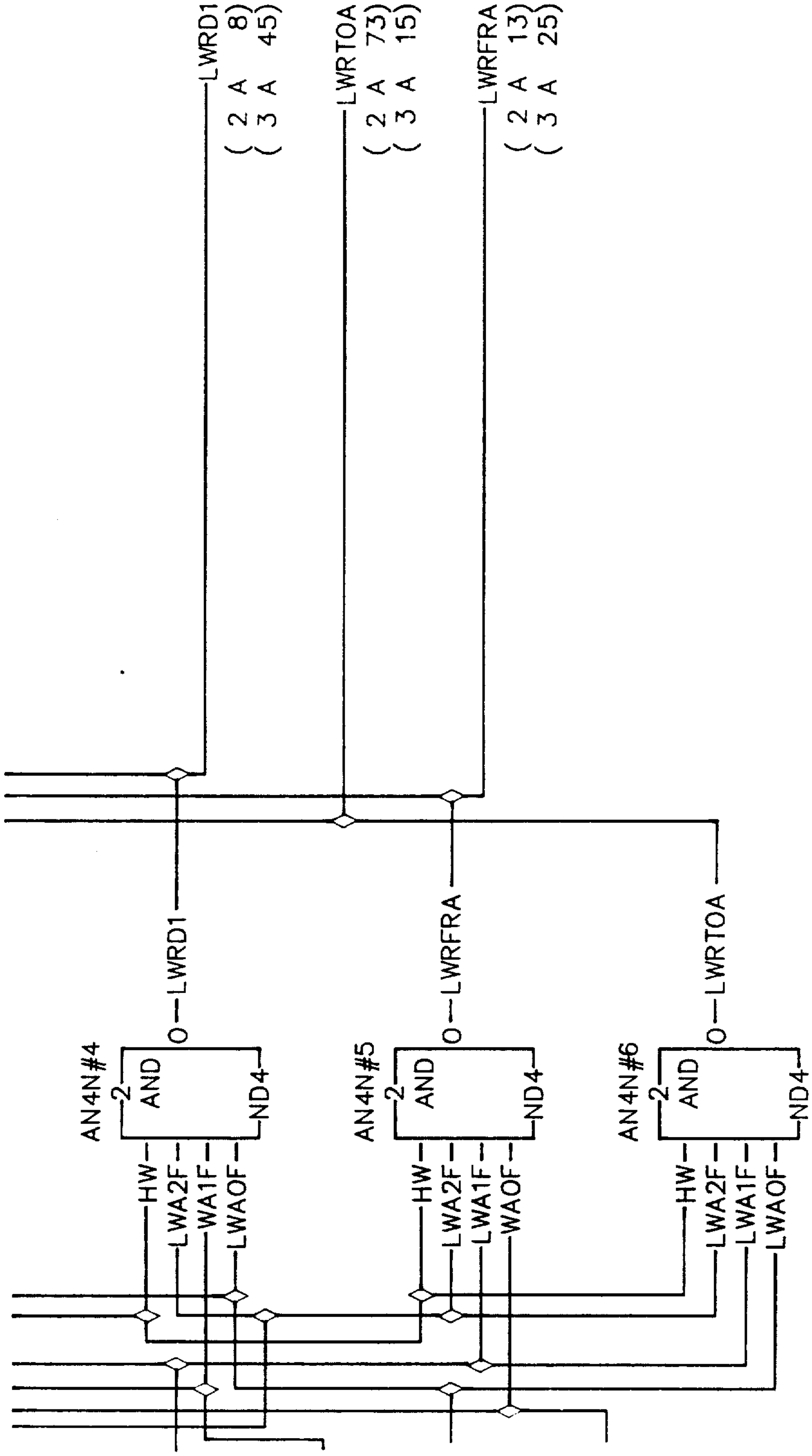
FIG.12D2

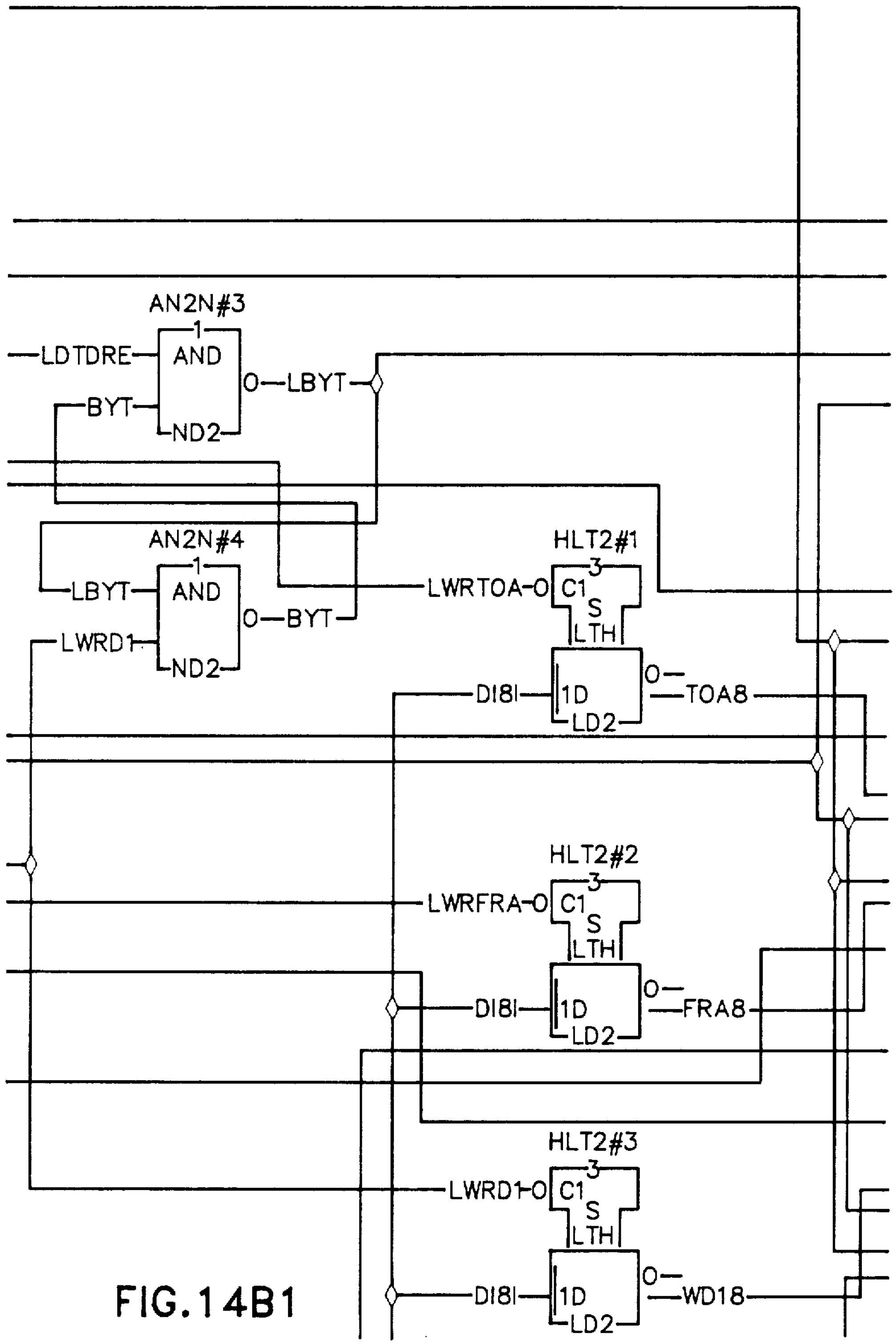
FIG.14B1

FIG 14B2
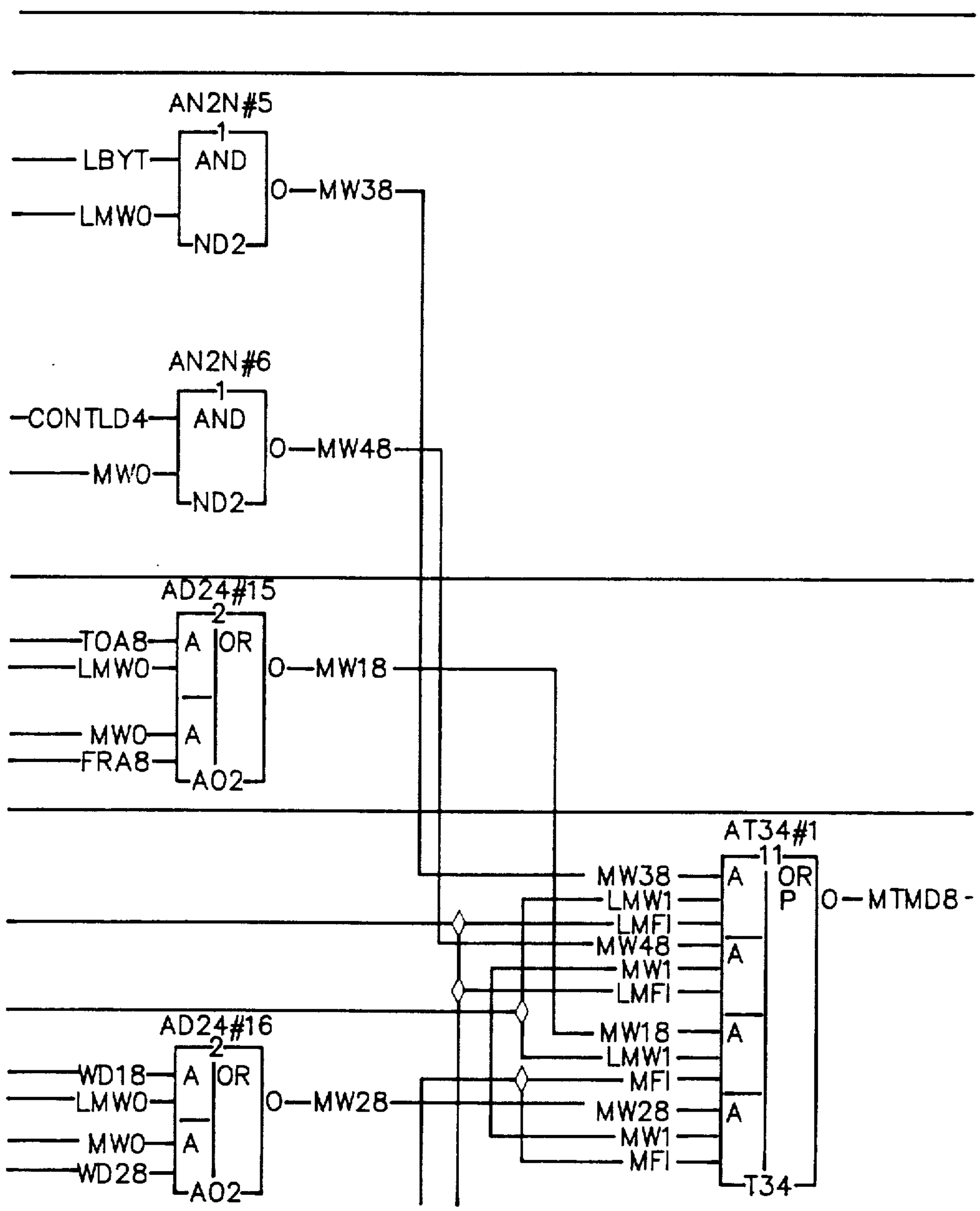

FIG.15G1
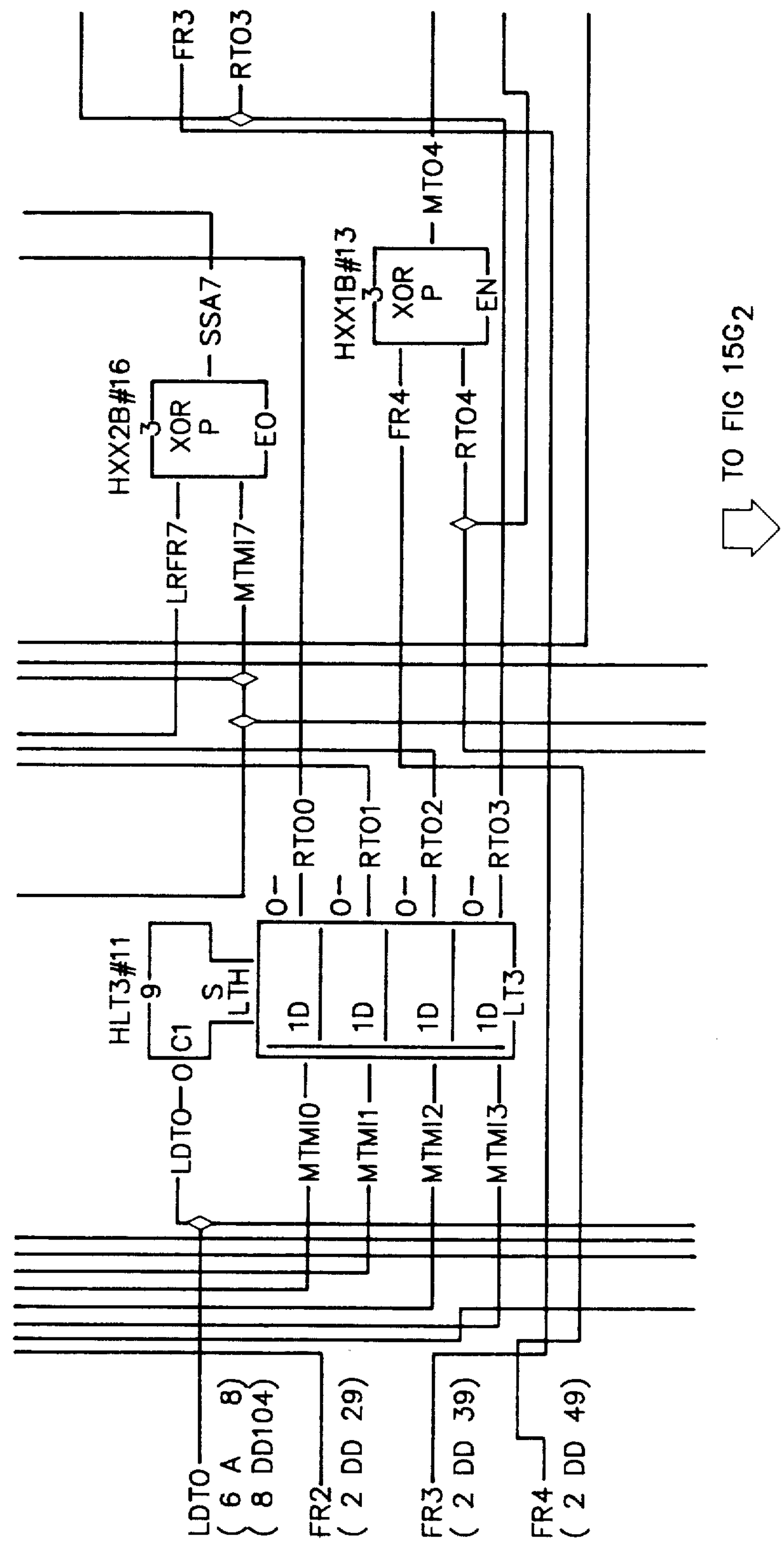

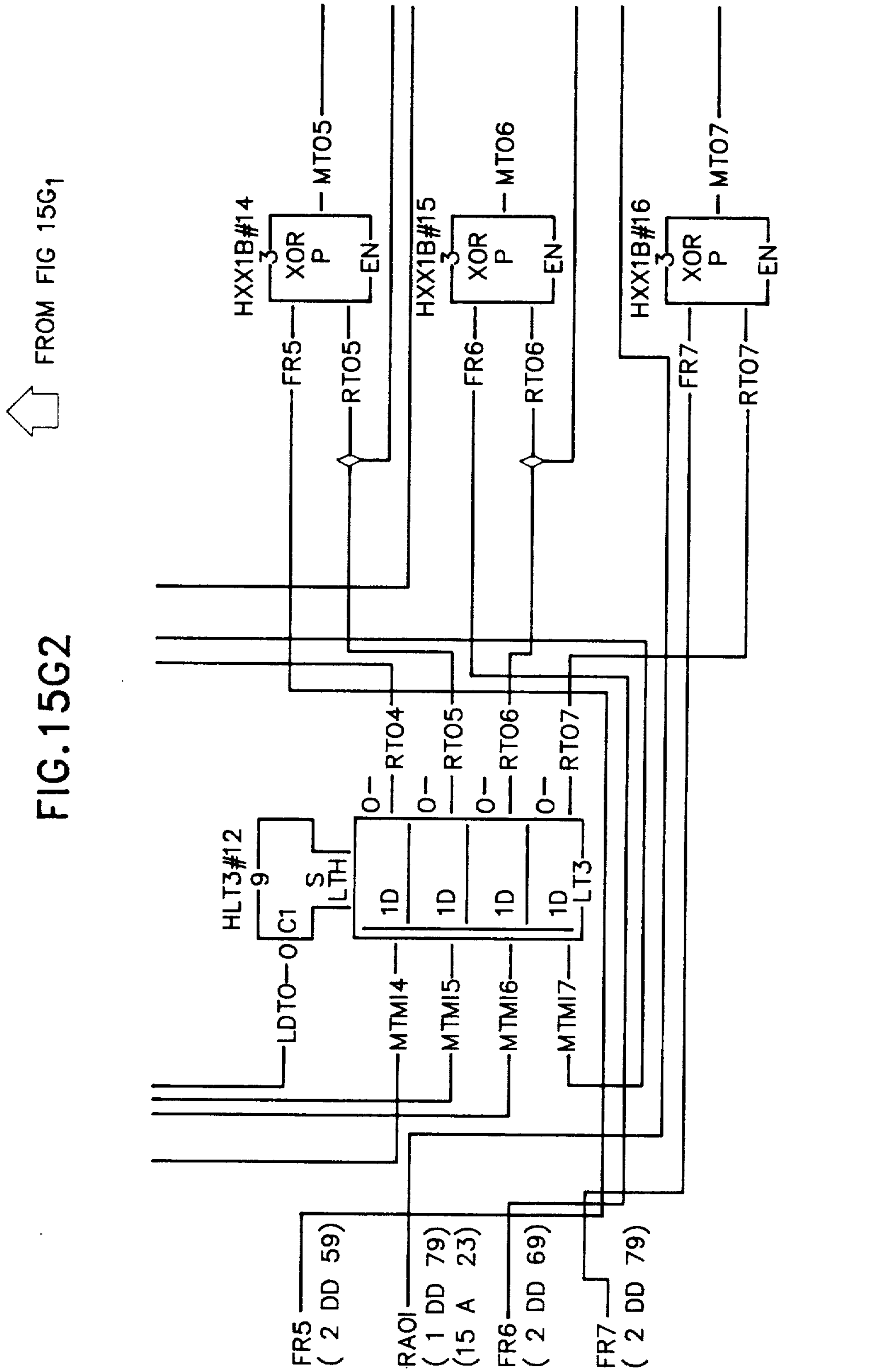
FIG.15G2

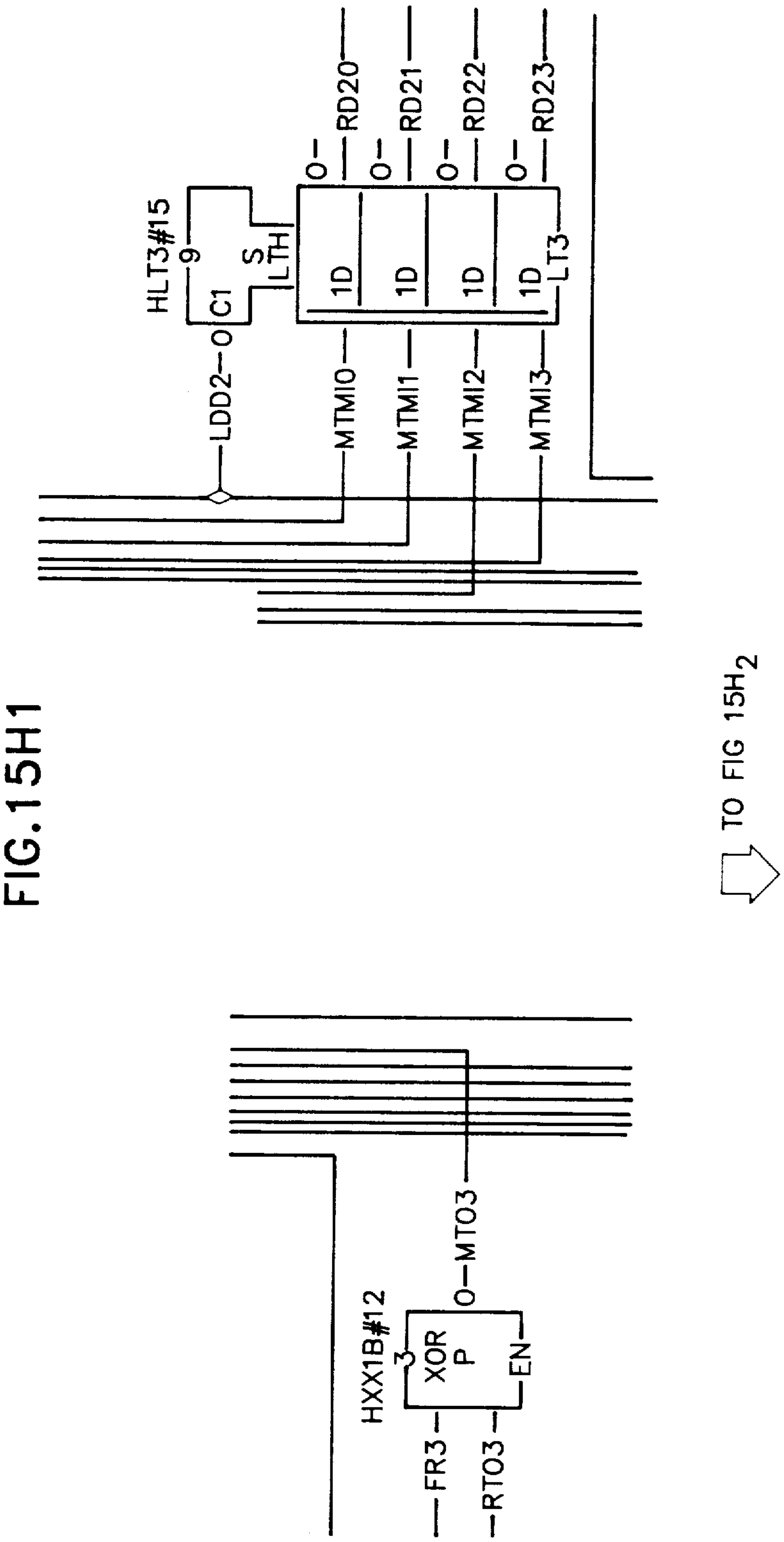
FIG.15H1

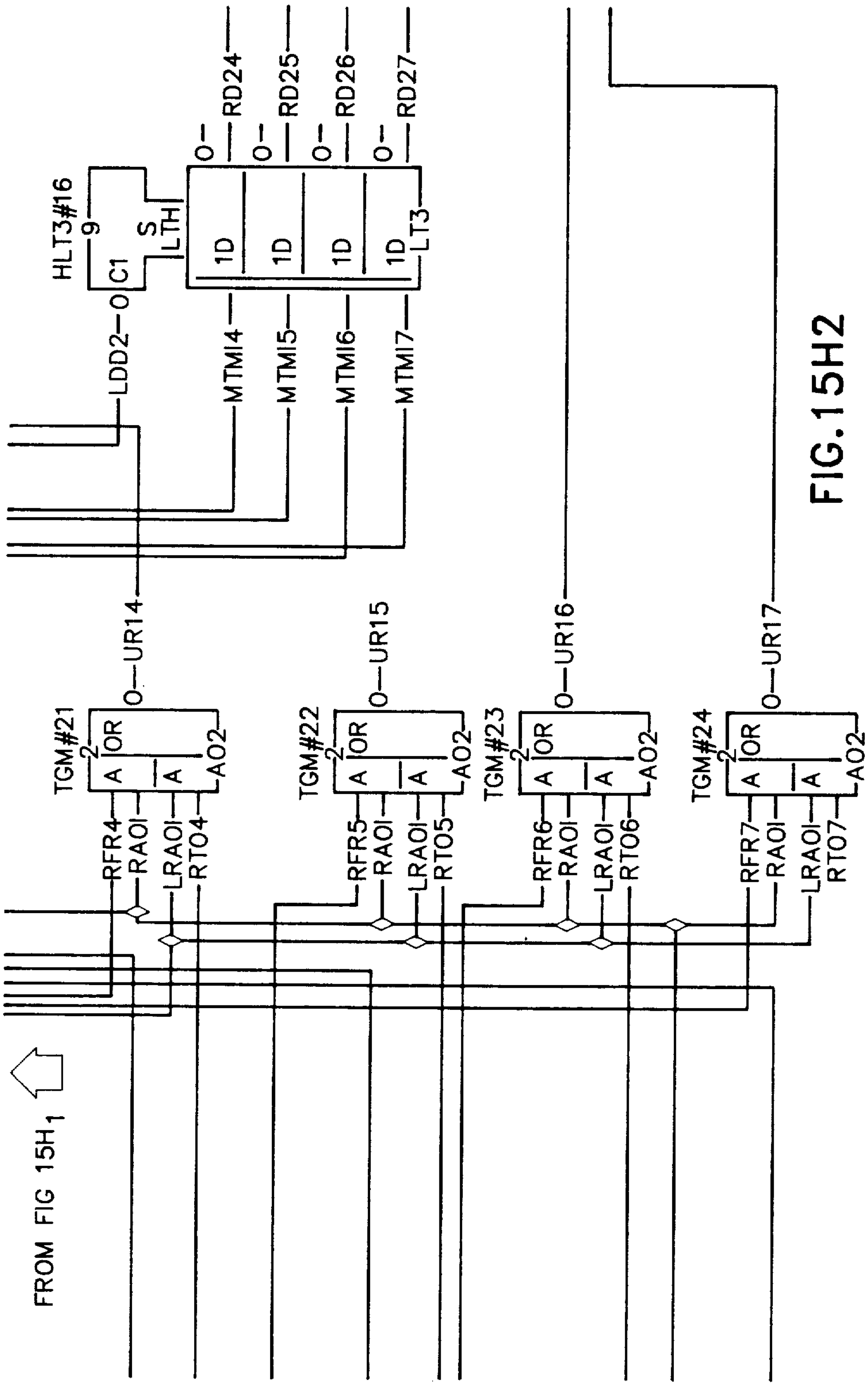
FIG. 15H2

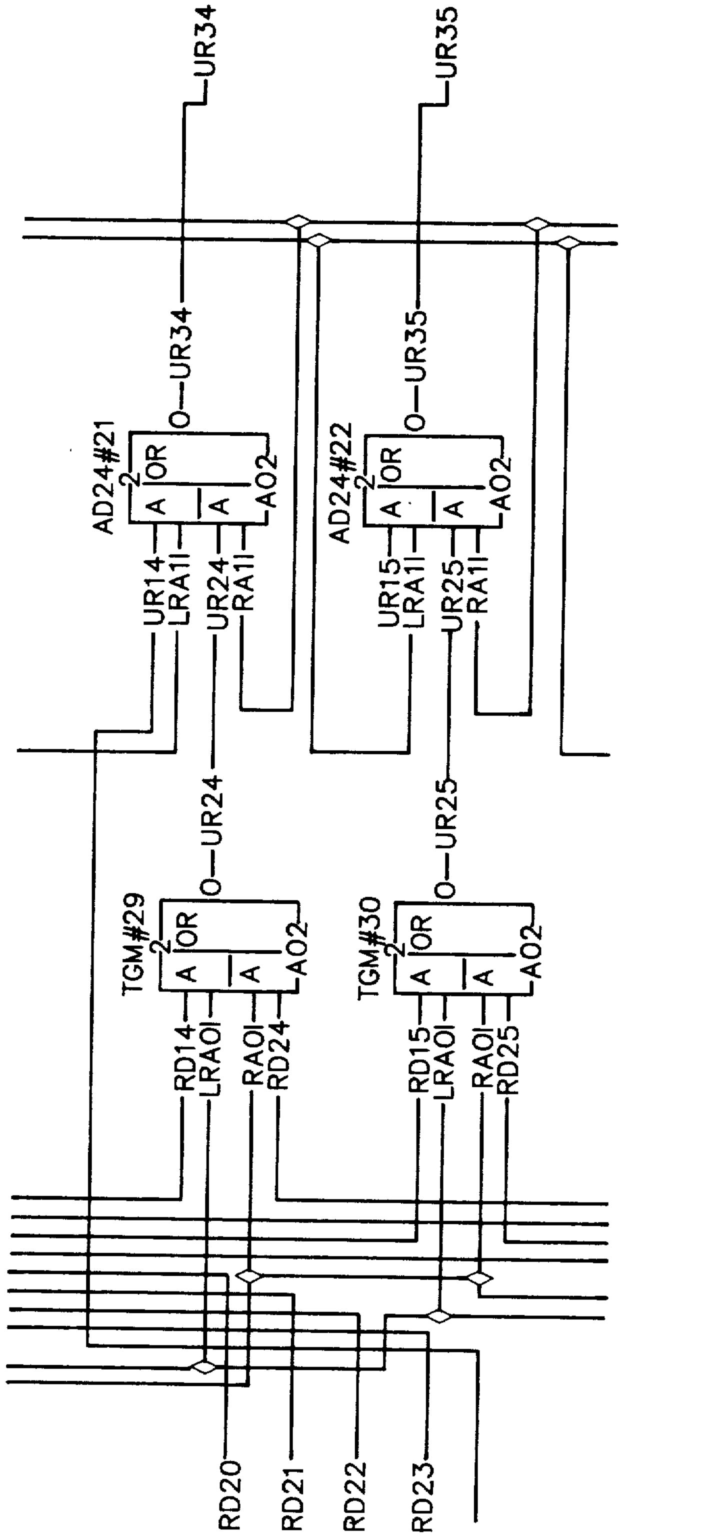
TO FIG 15I2
FIG. 15I1

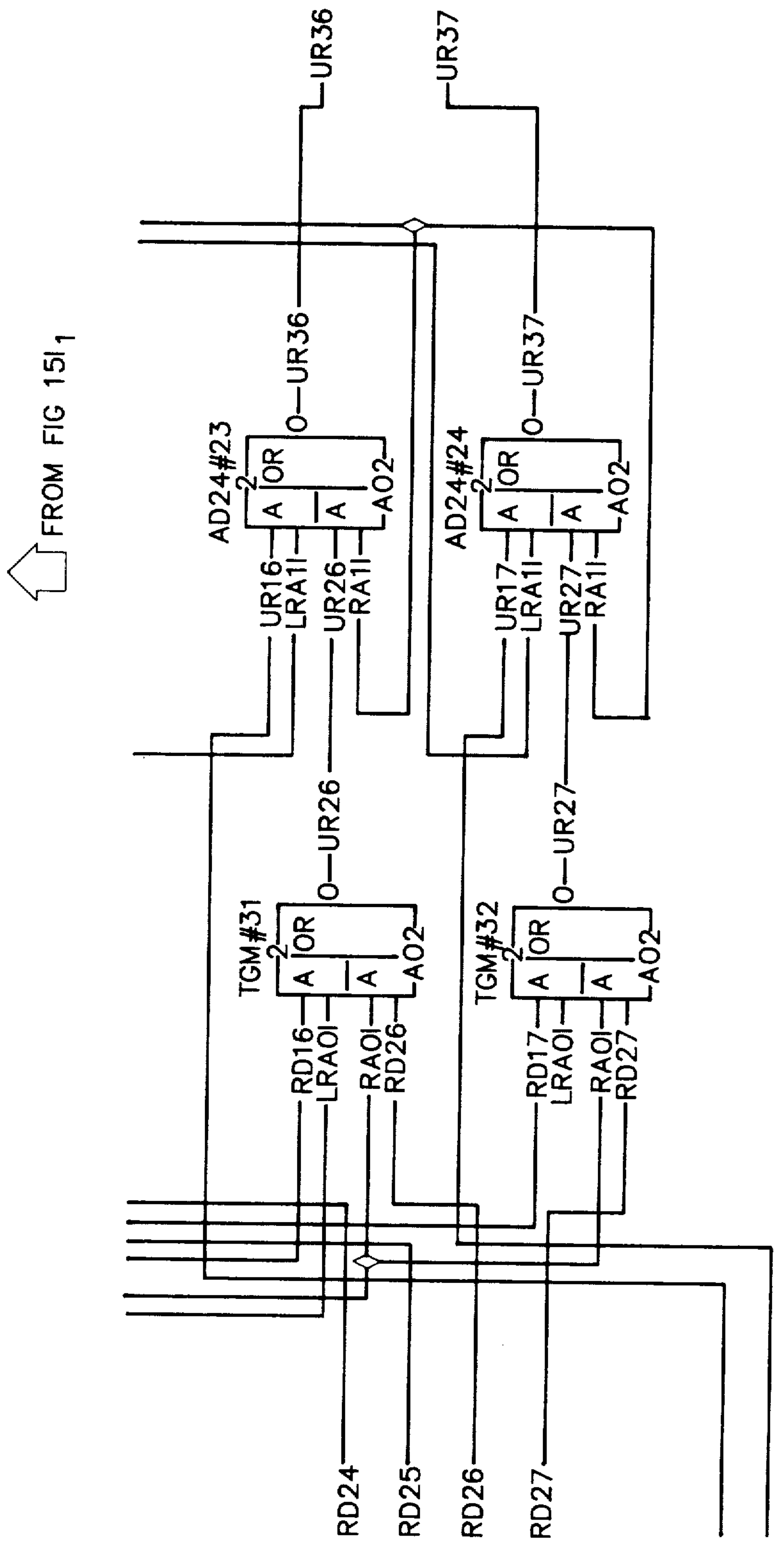
FIG. 1512

FIG16E$_1$
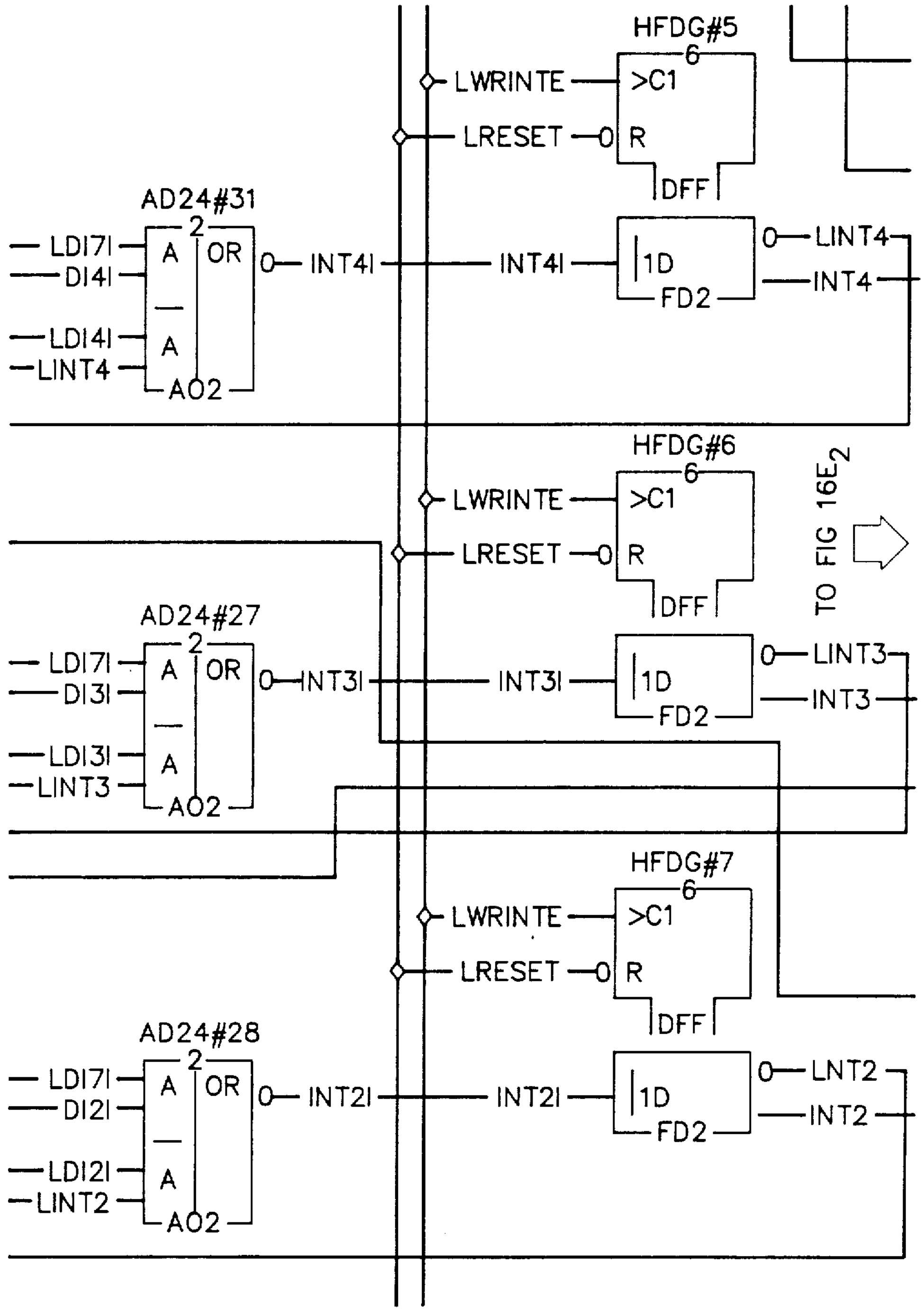

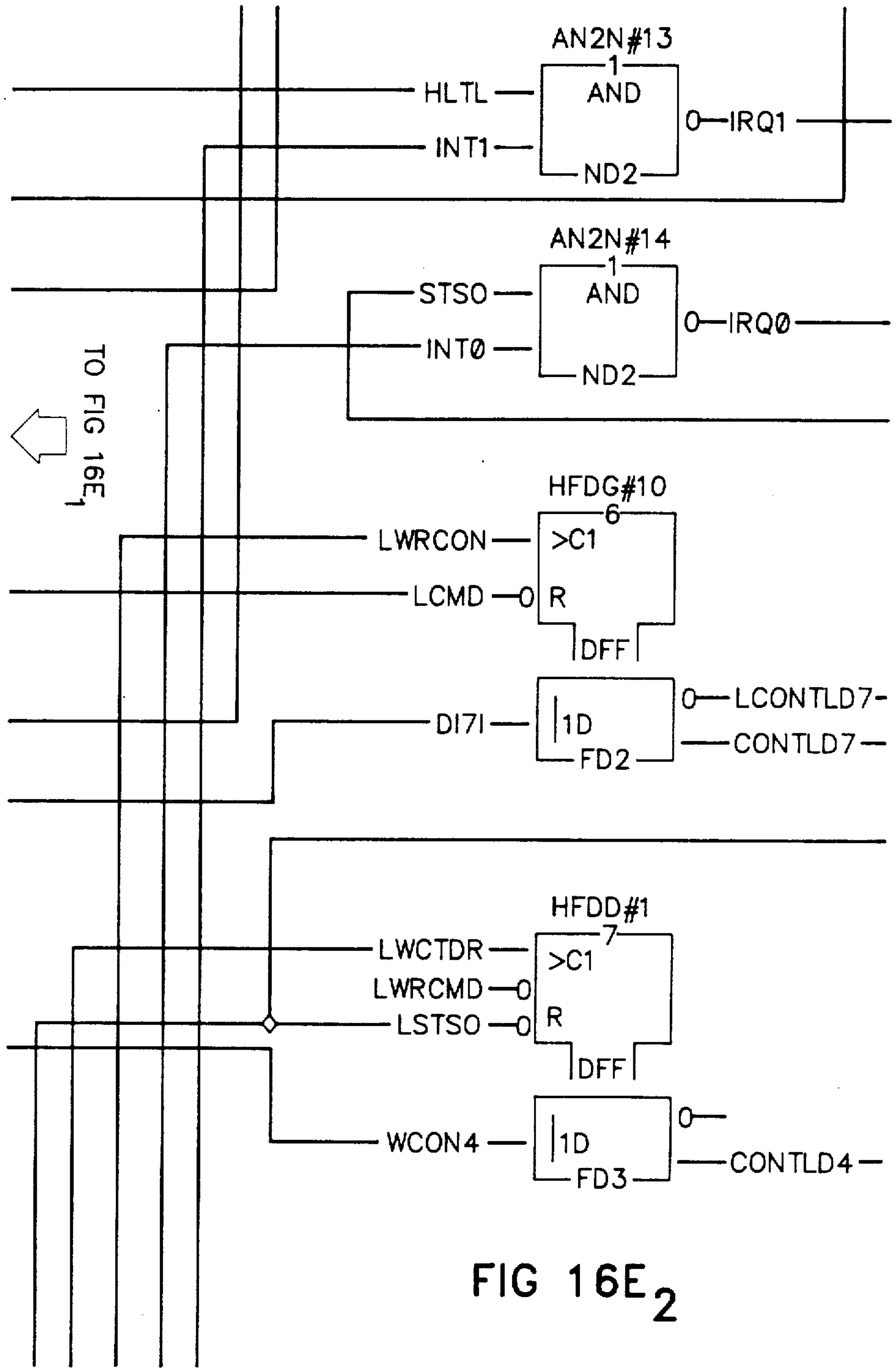
FIG 16E2

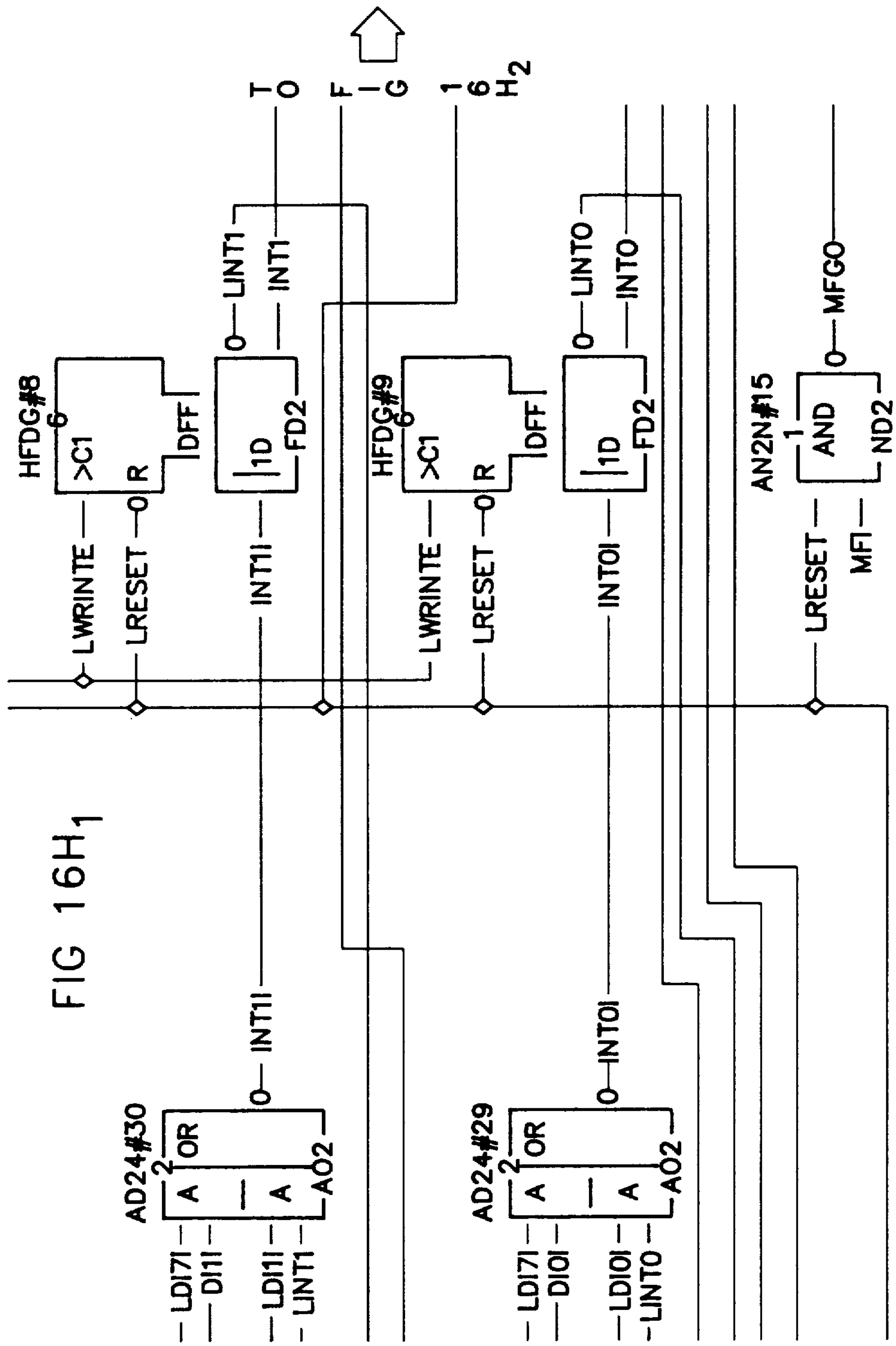
FIG 16H$_1$

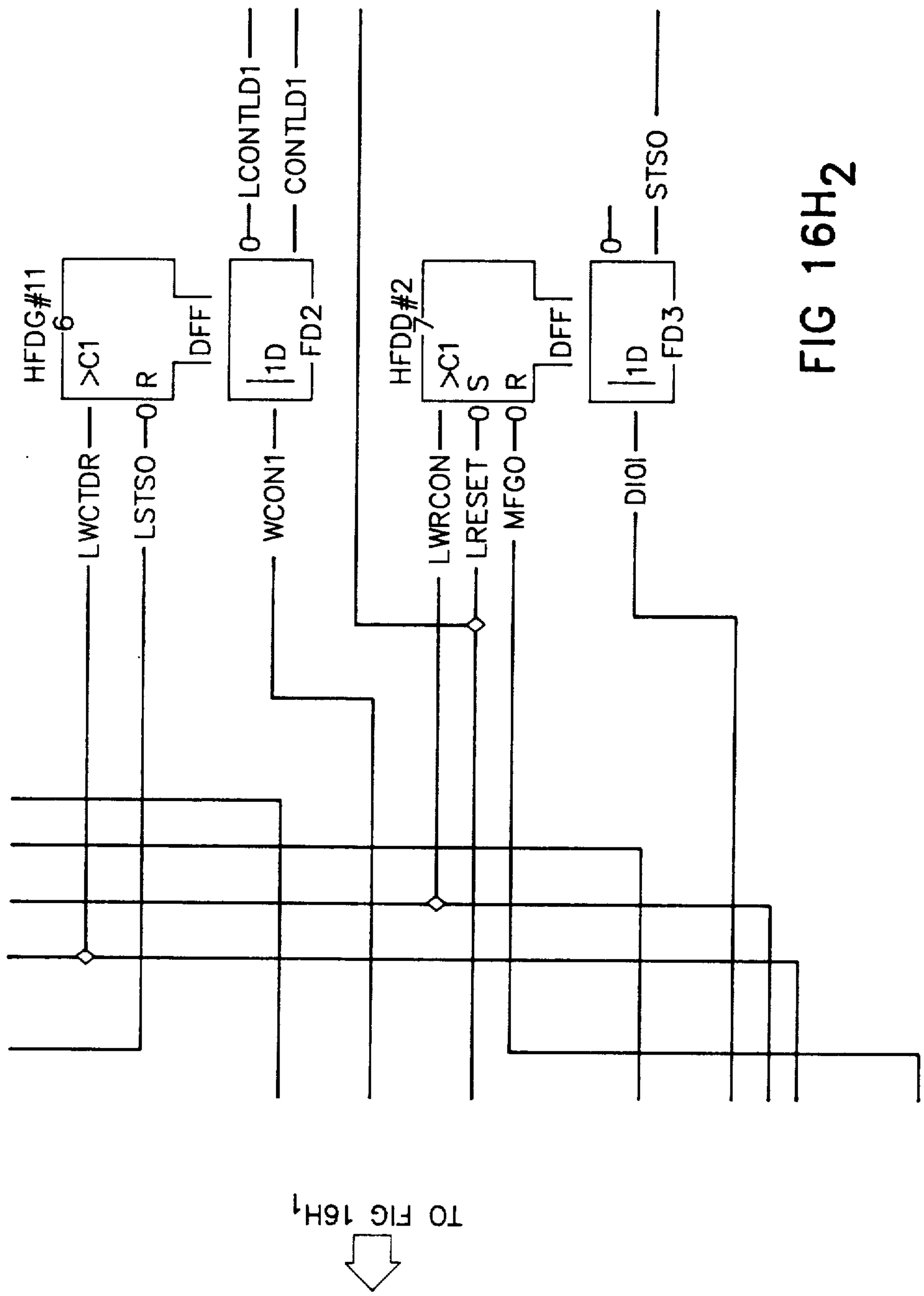
FIG 16H2

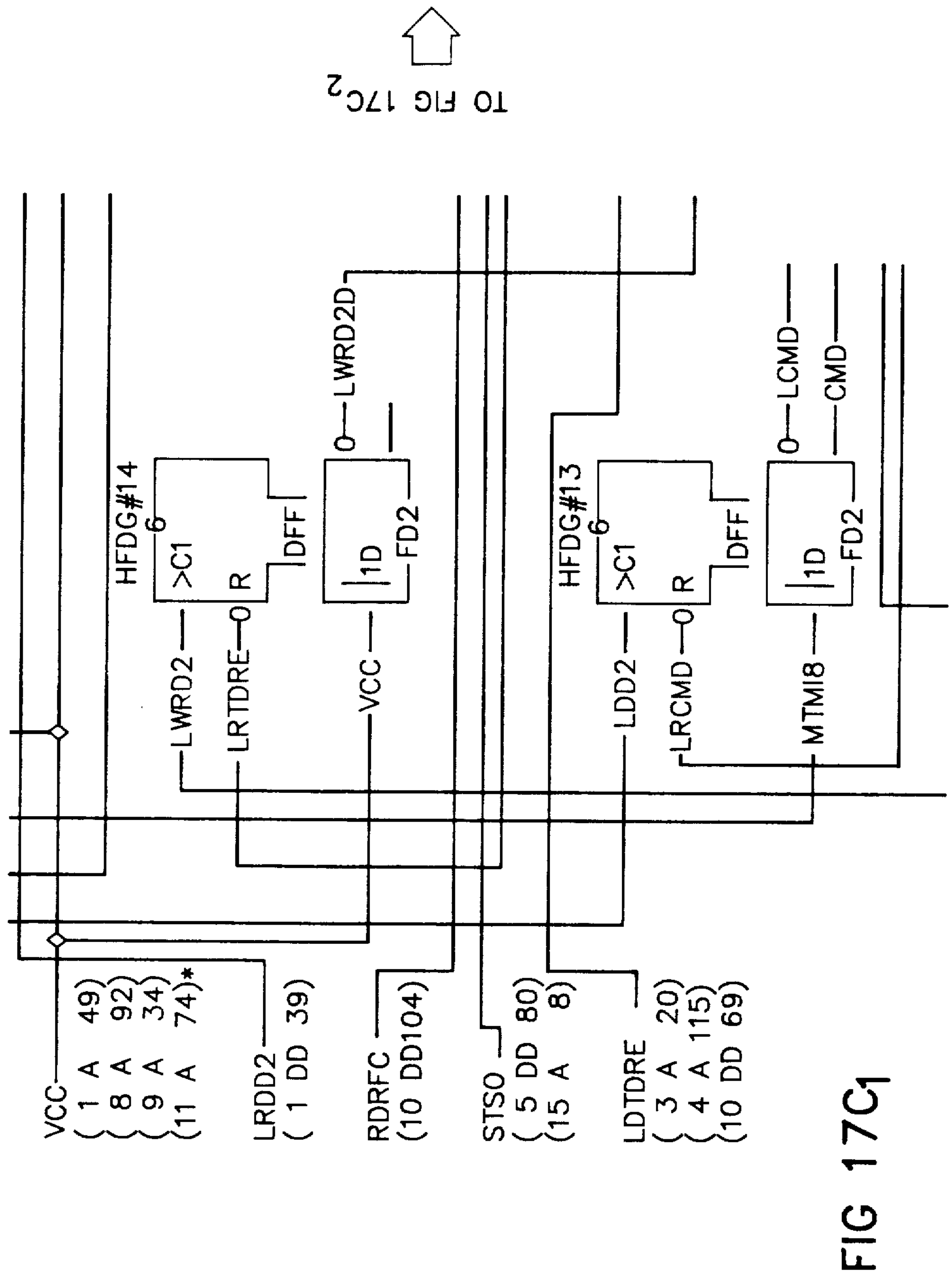
FIG 17C1

FIG 17C₂
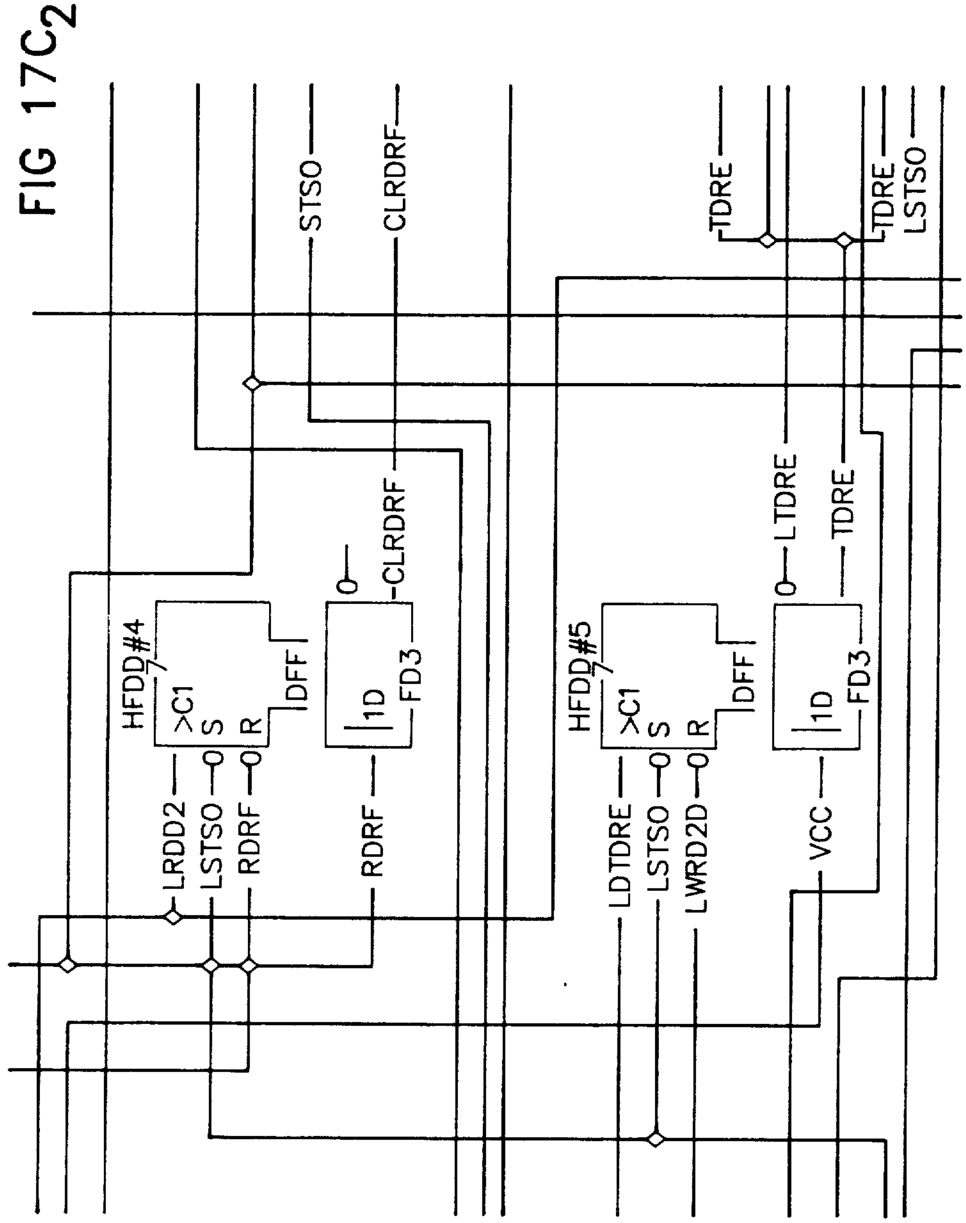
TO FIG 17C₁

FIG 18A1
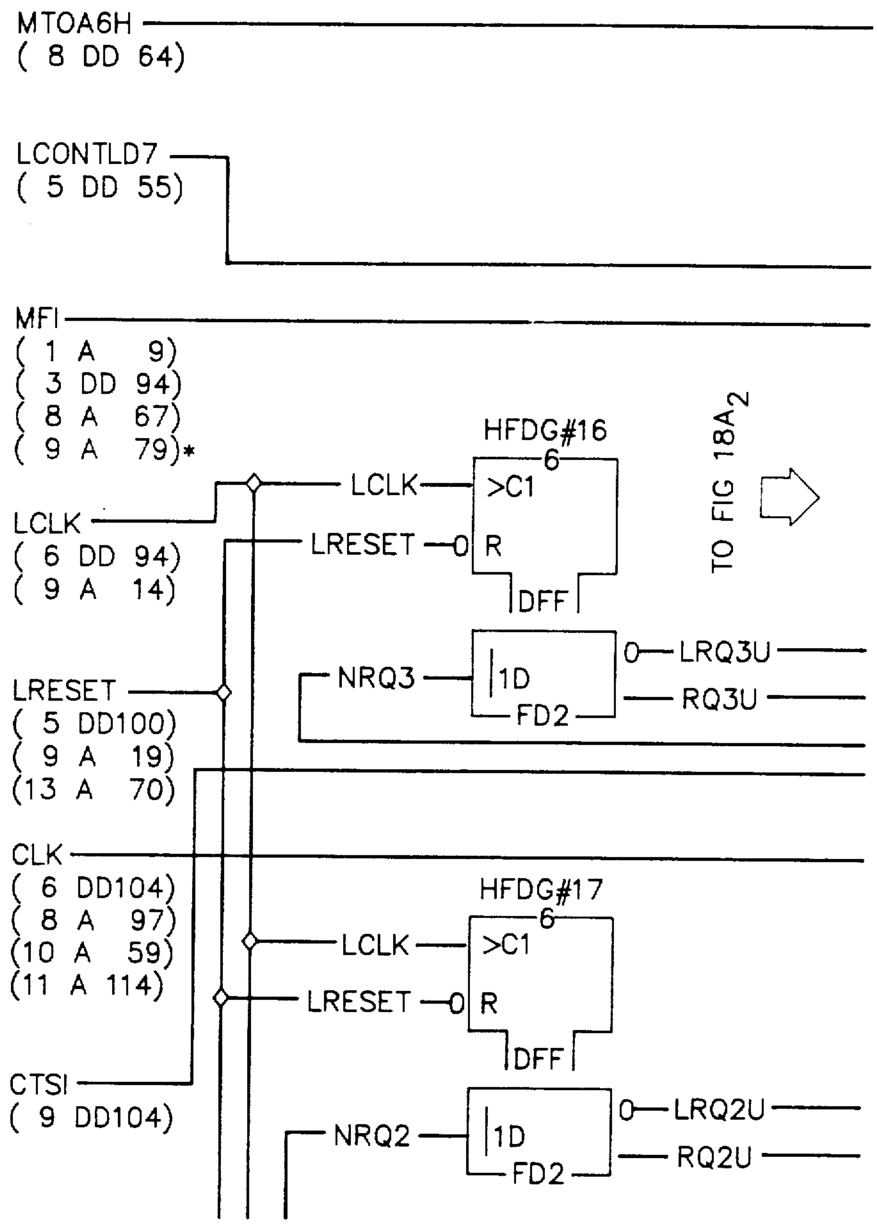

FIG 18A2
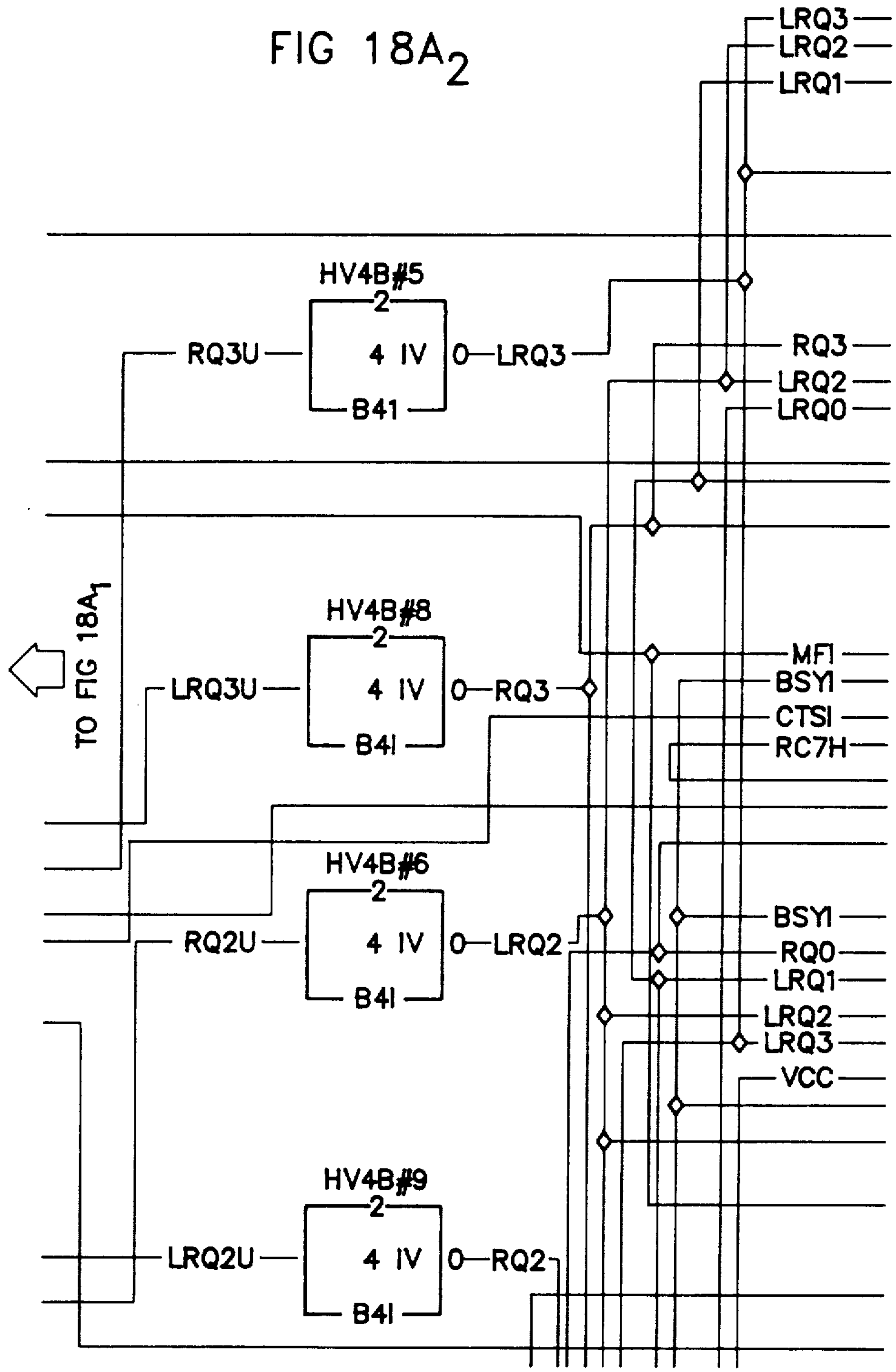

FIG 18B$_1$
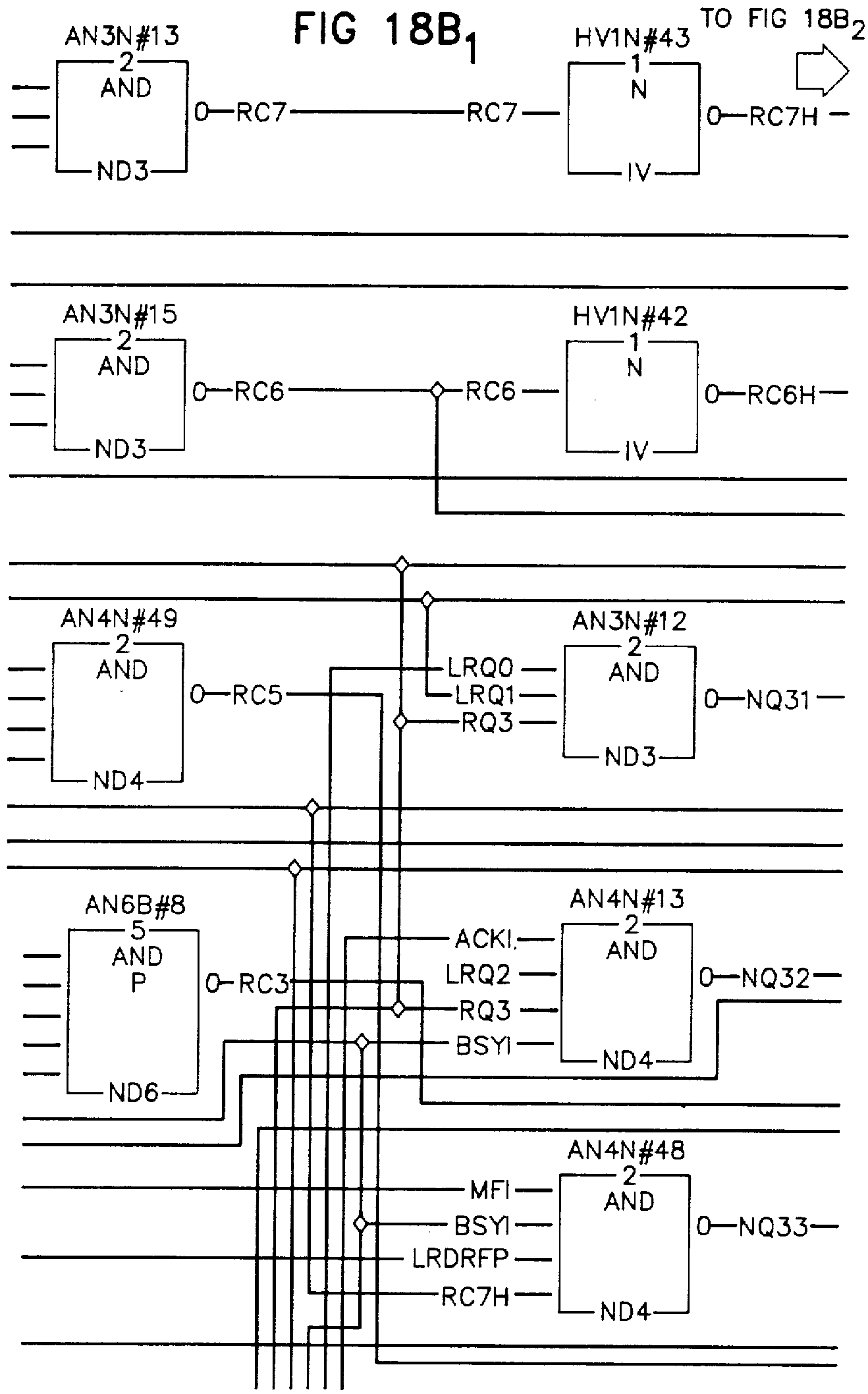

FIG 18B$_2$
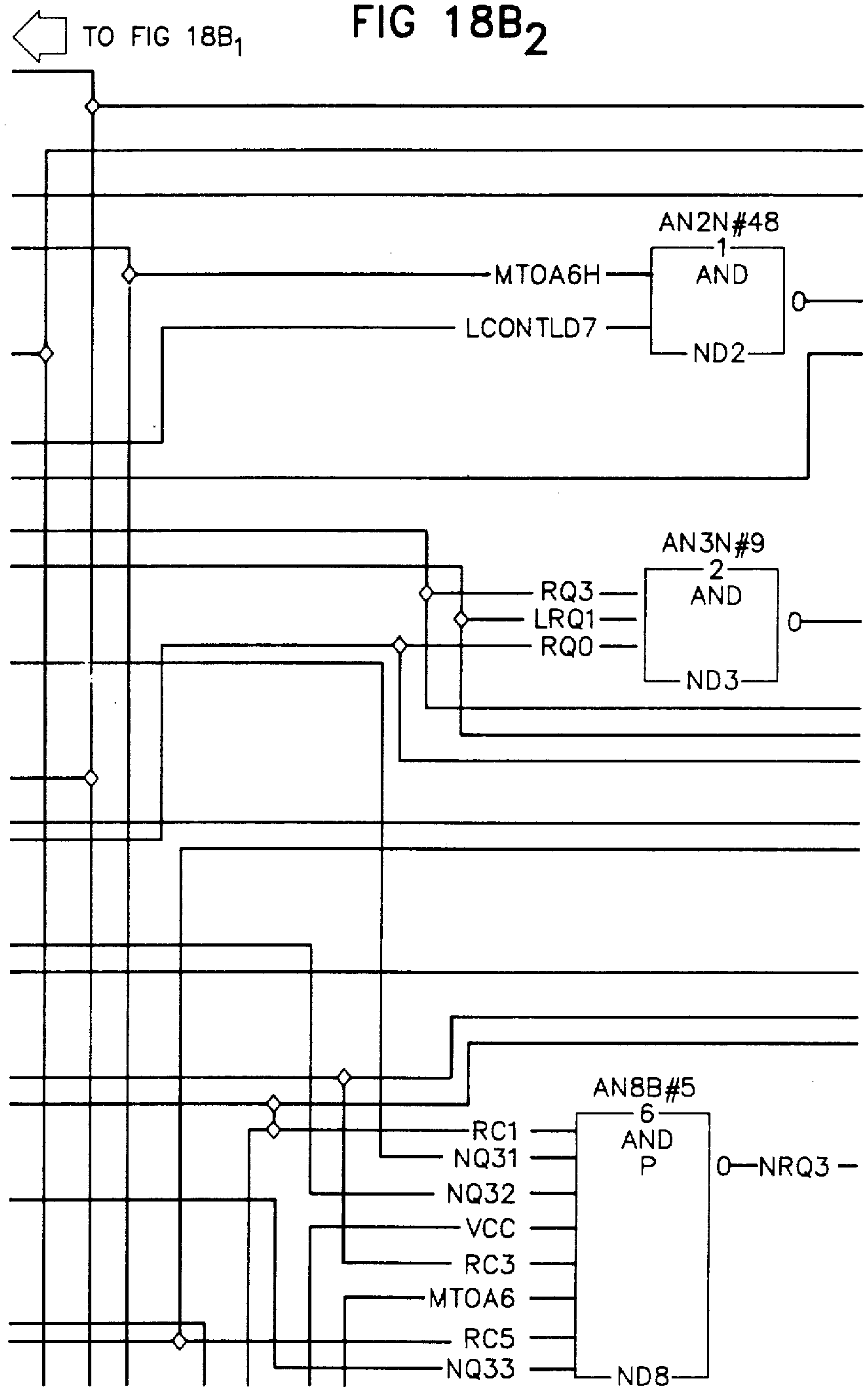

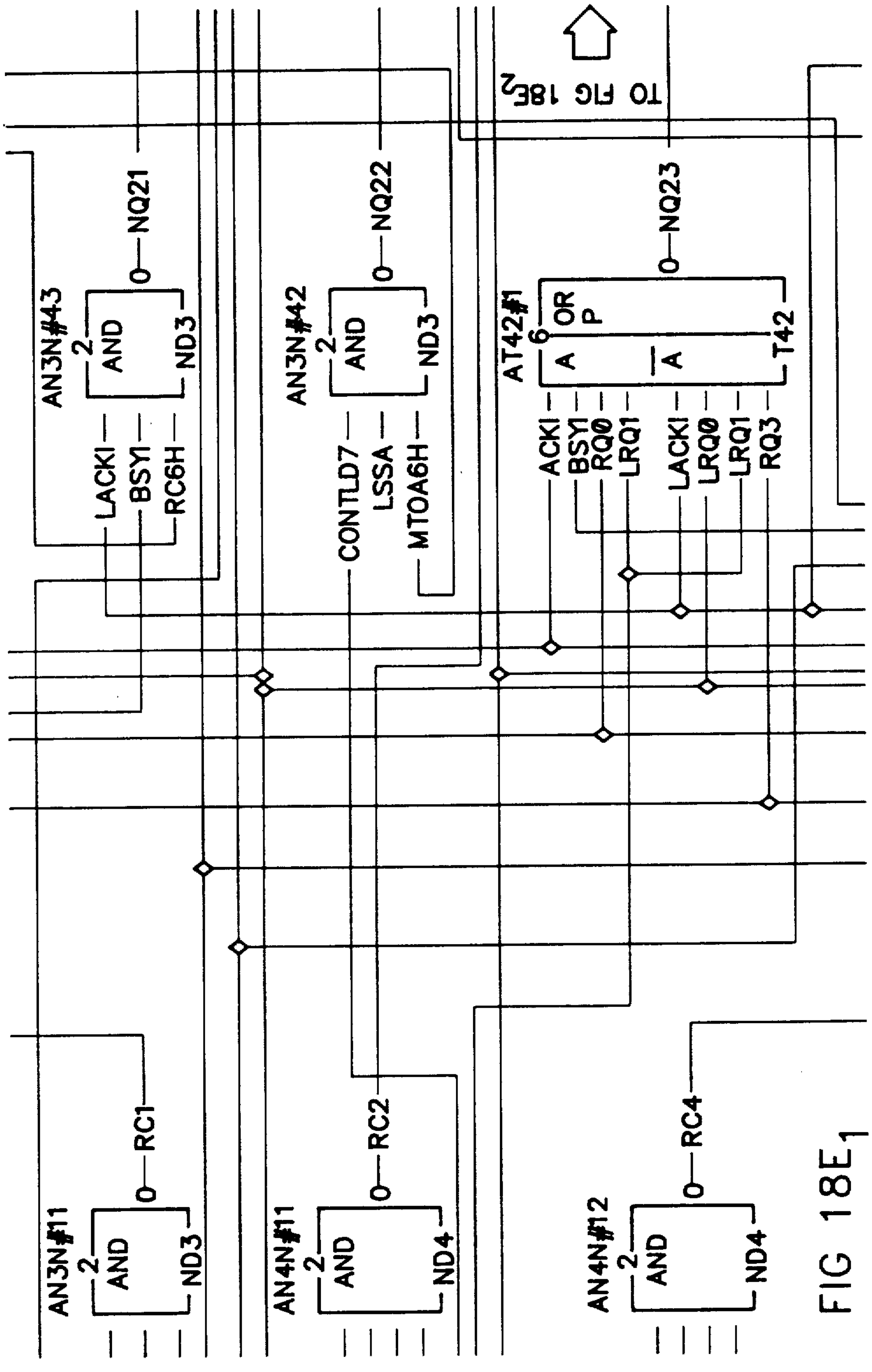
FIG 18E$_1$

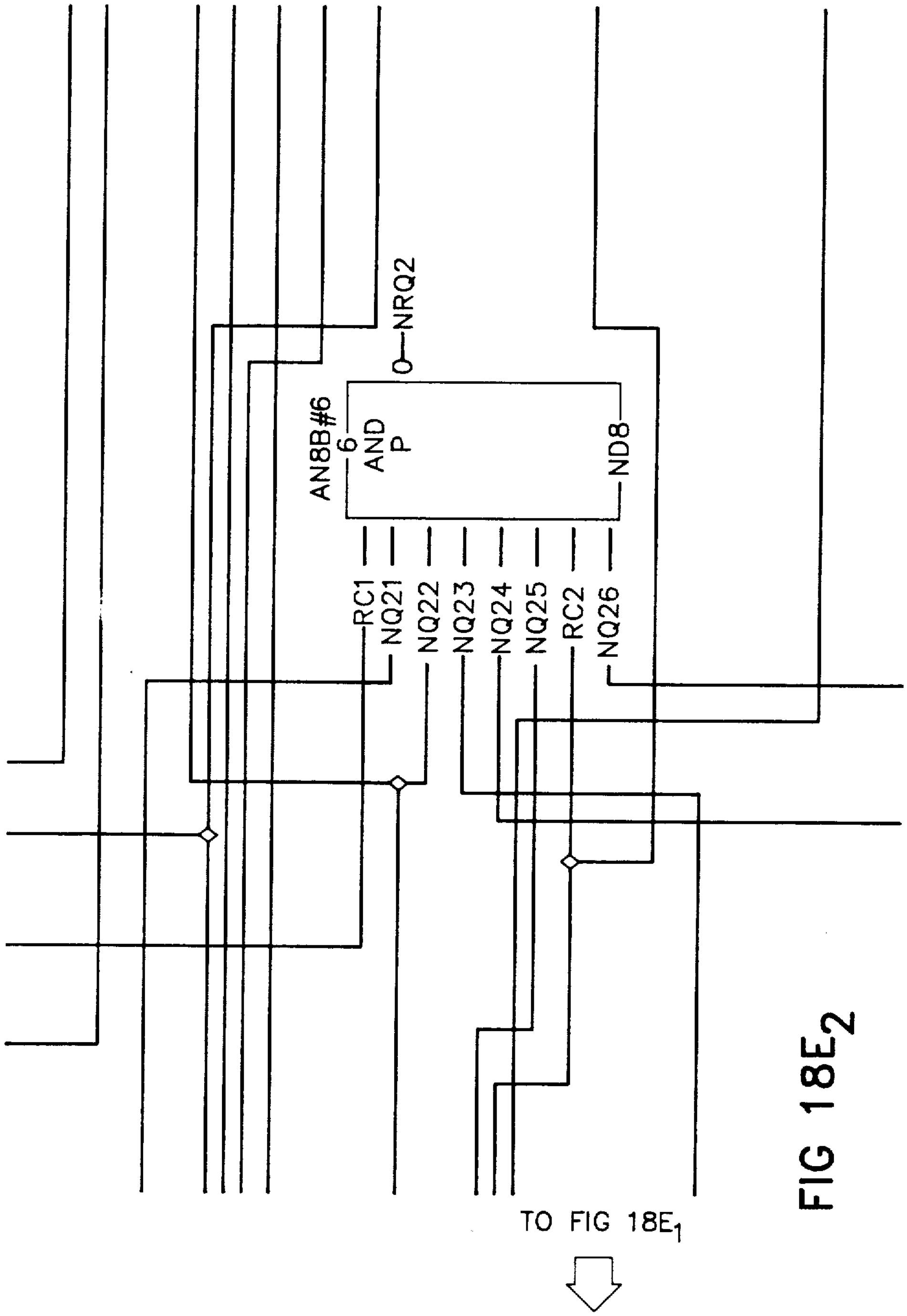
FIG 18E$_2$

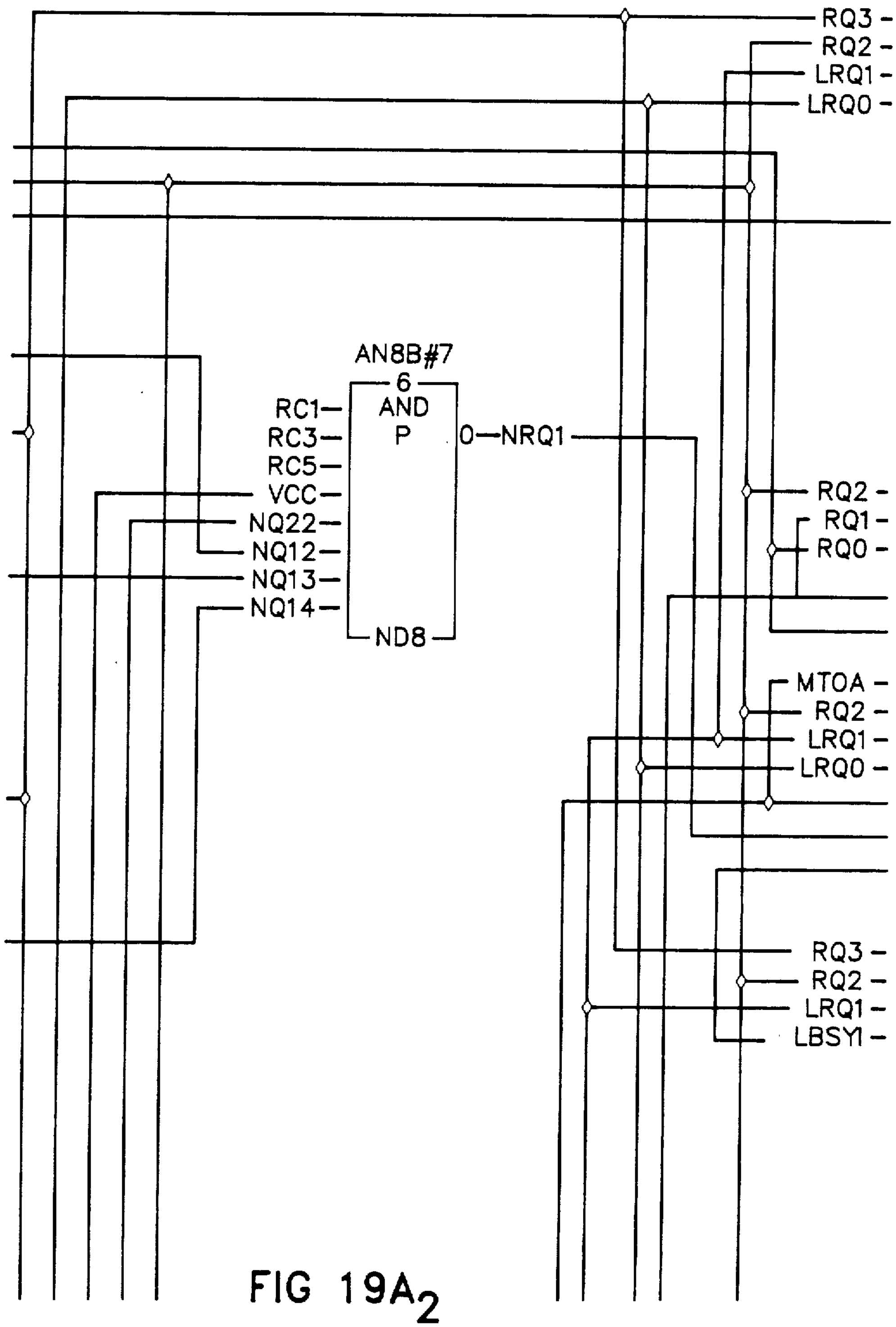
FIG 19A2

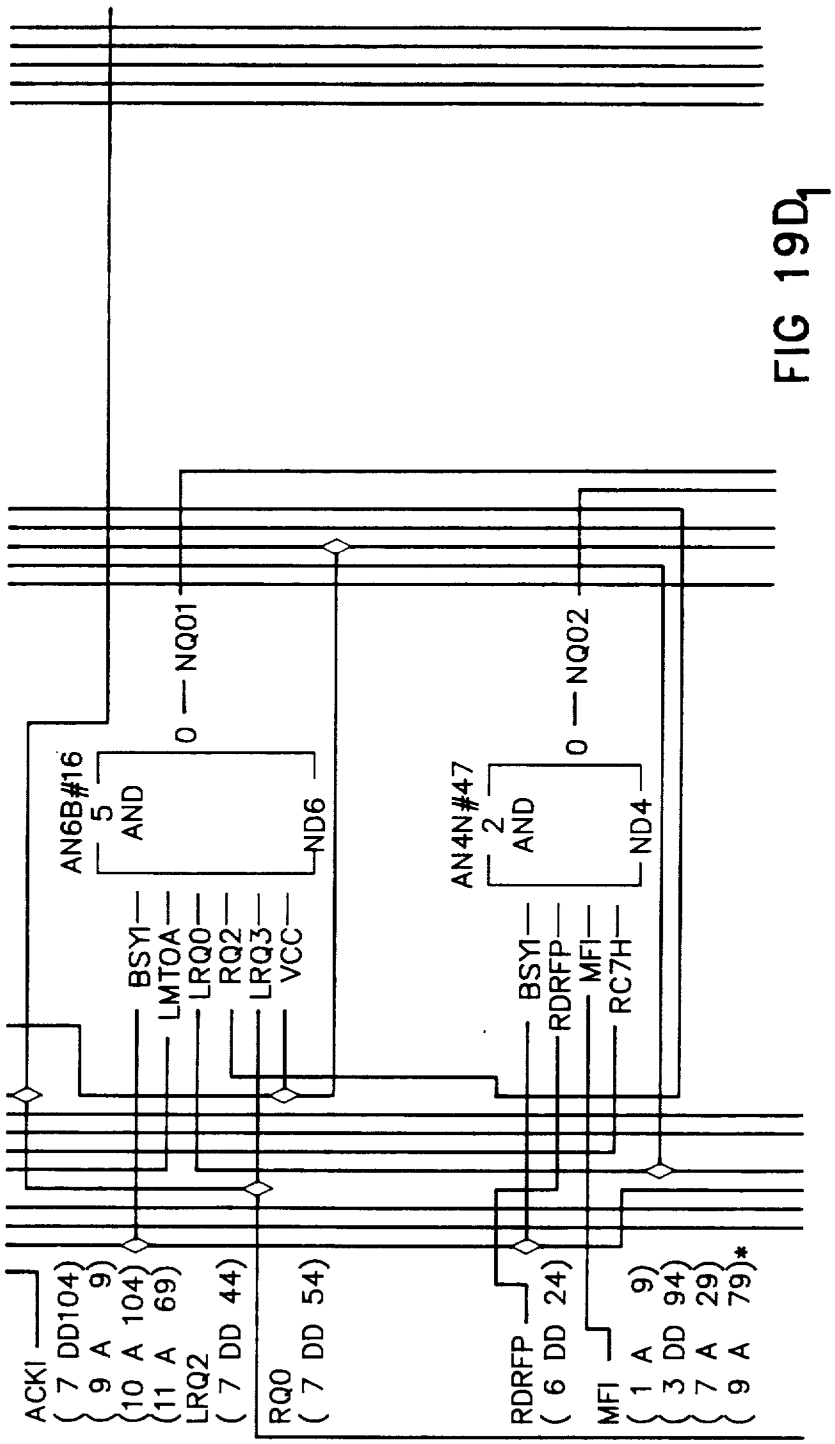
FIG 19D1

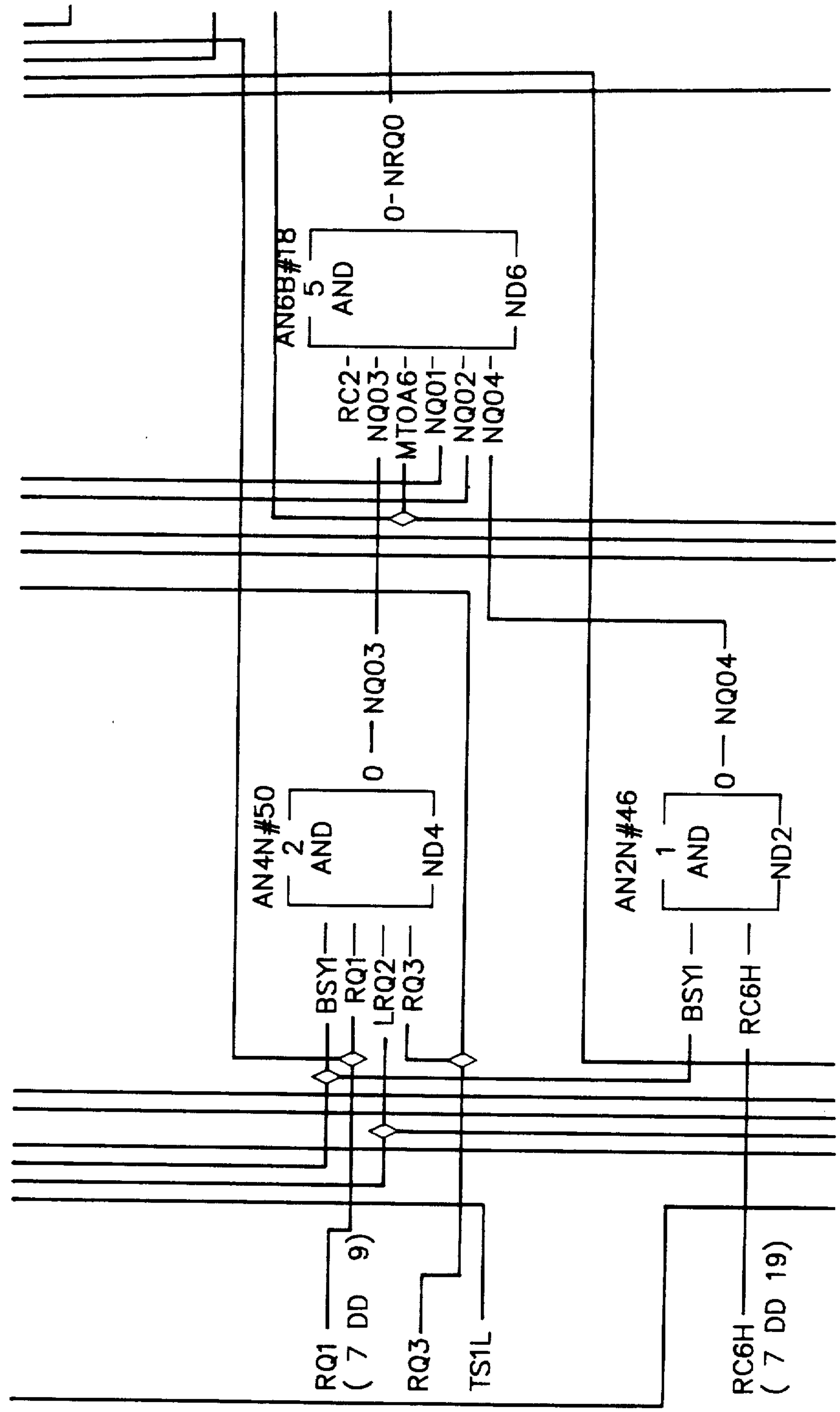
FIG $19D_2$

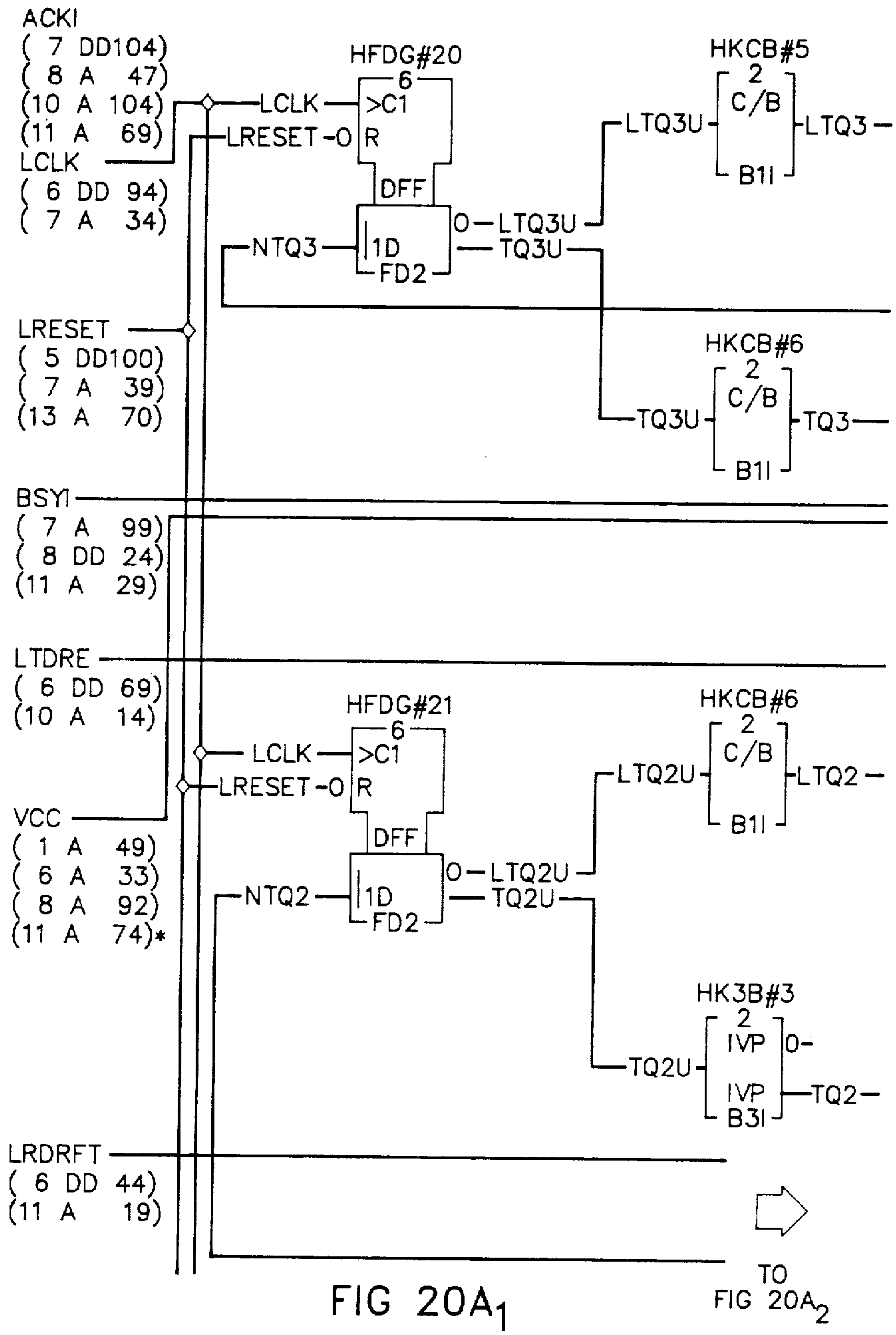
FIG $20A_1$

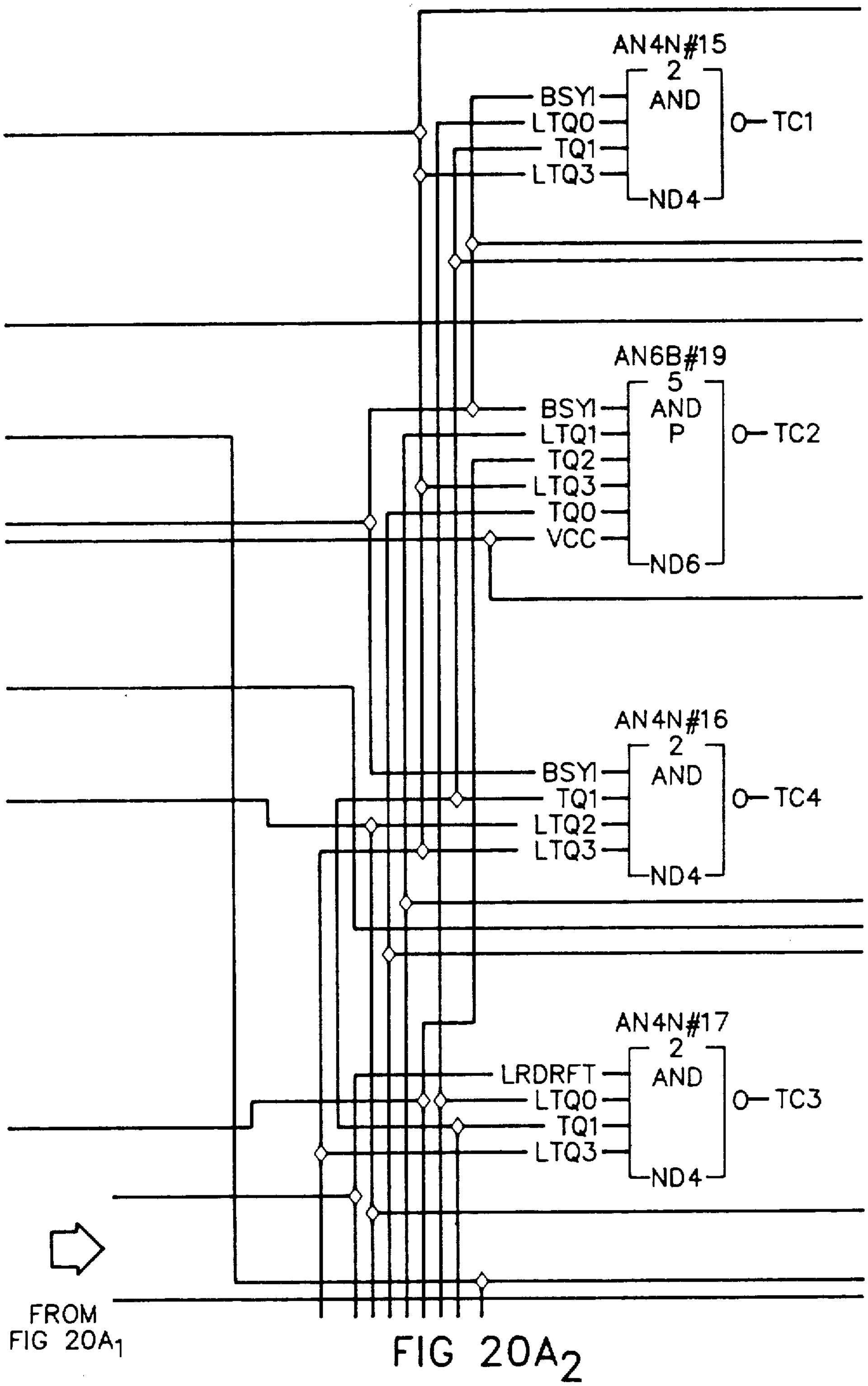
FIG 20A$_2$

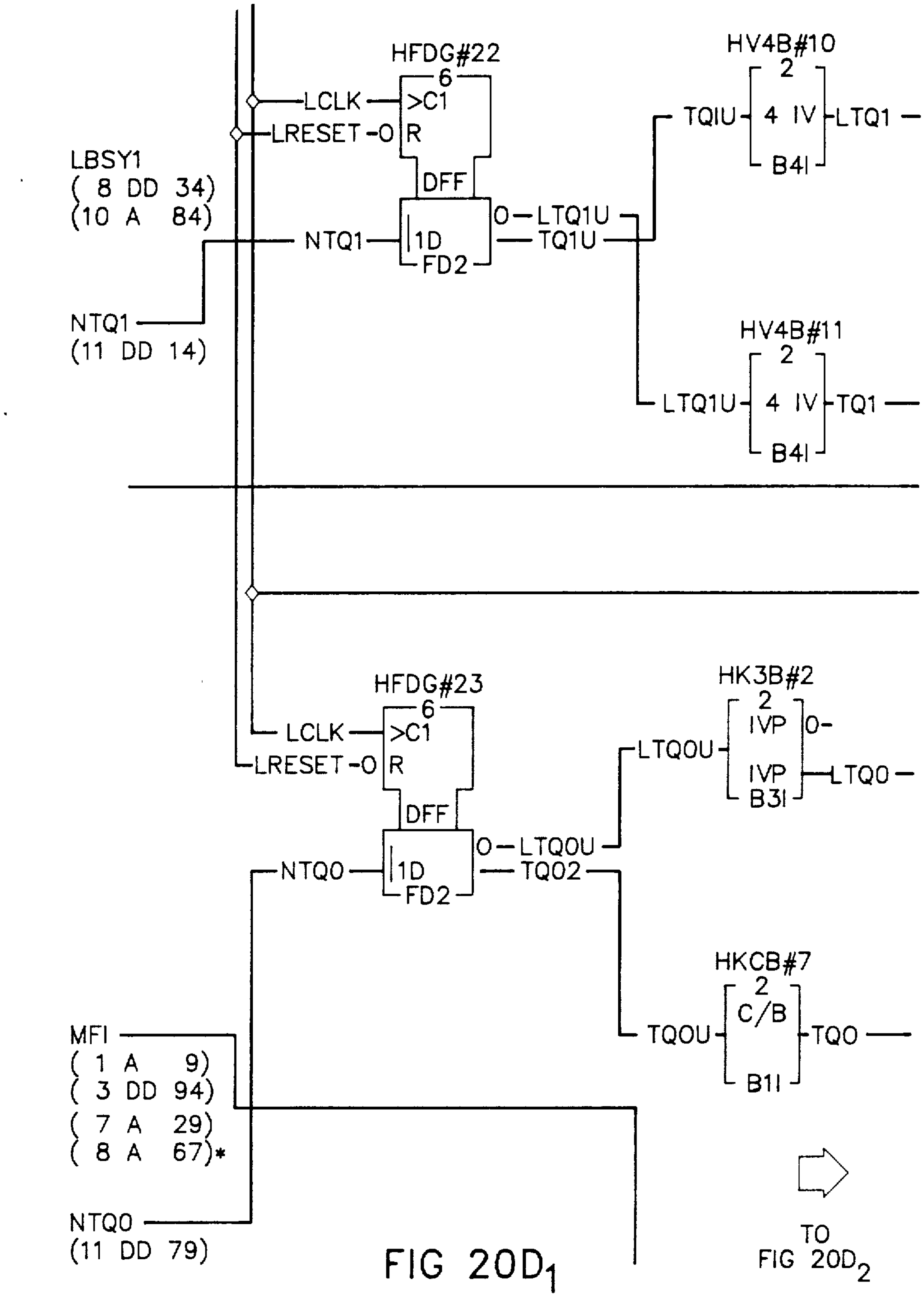
FIG $20D_1$

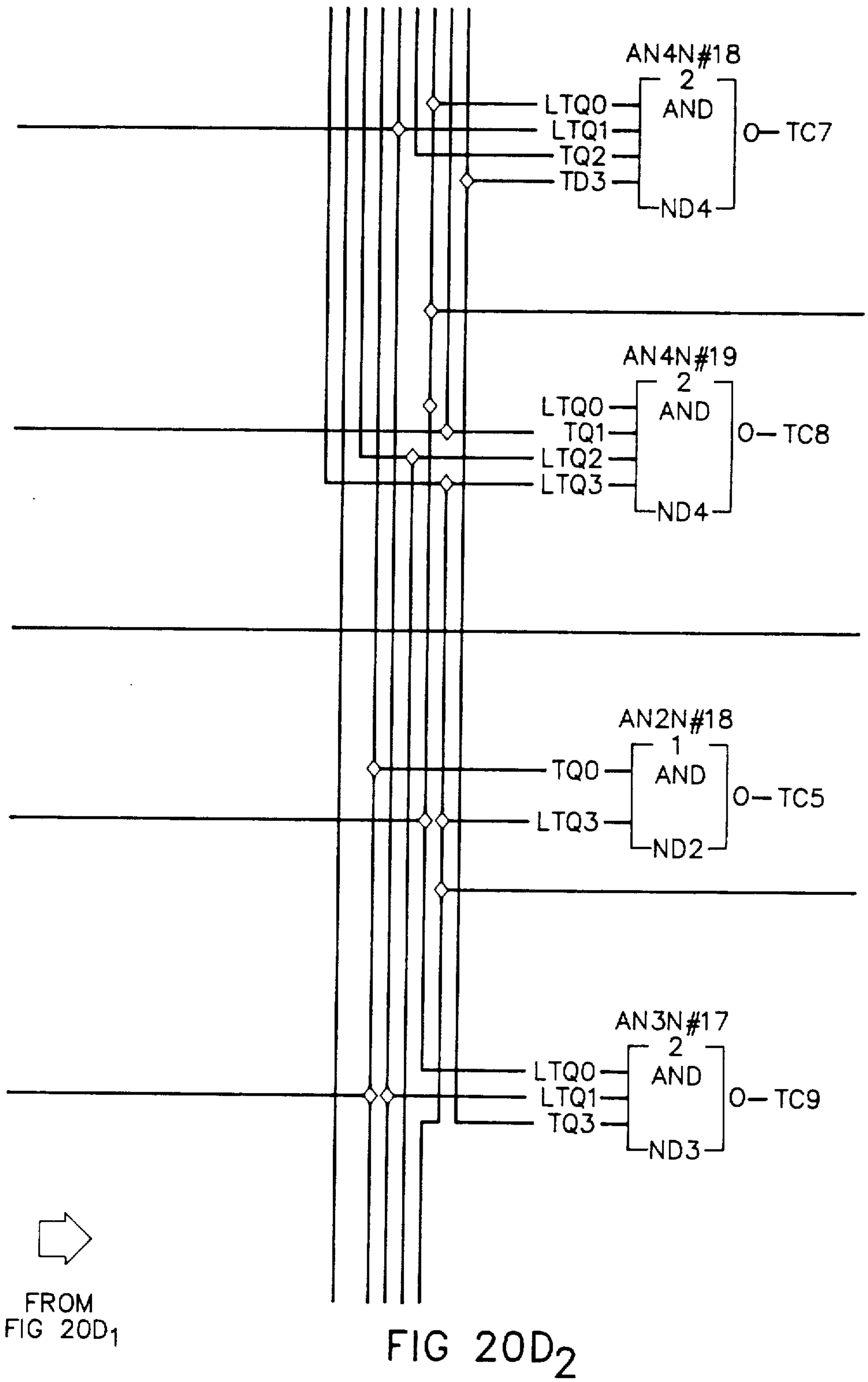
FIG $20D_2$

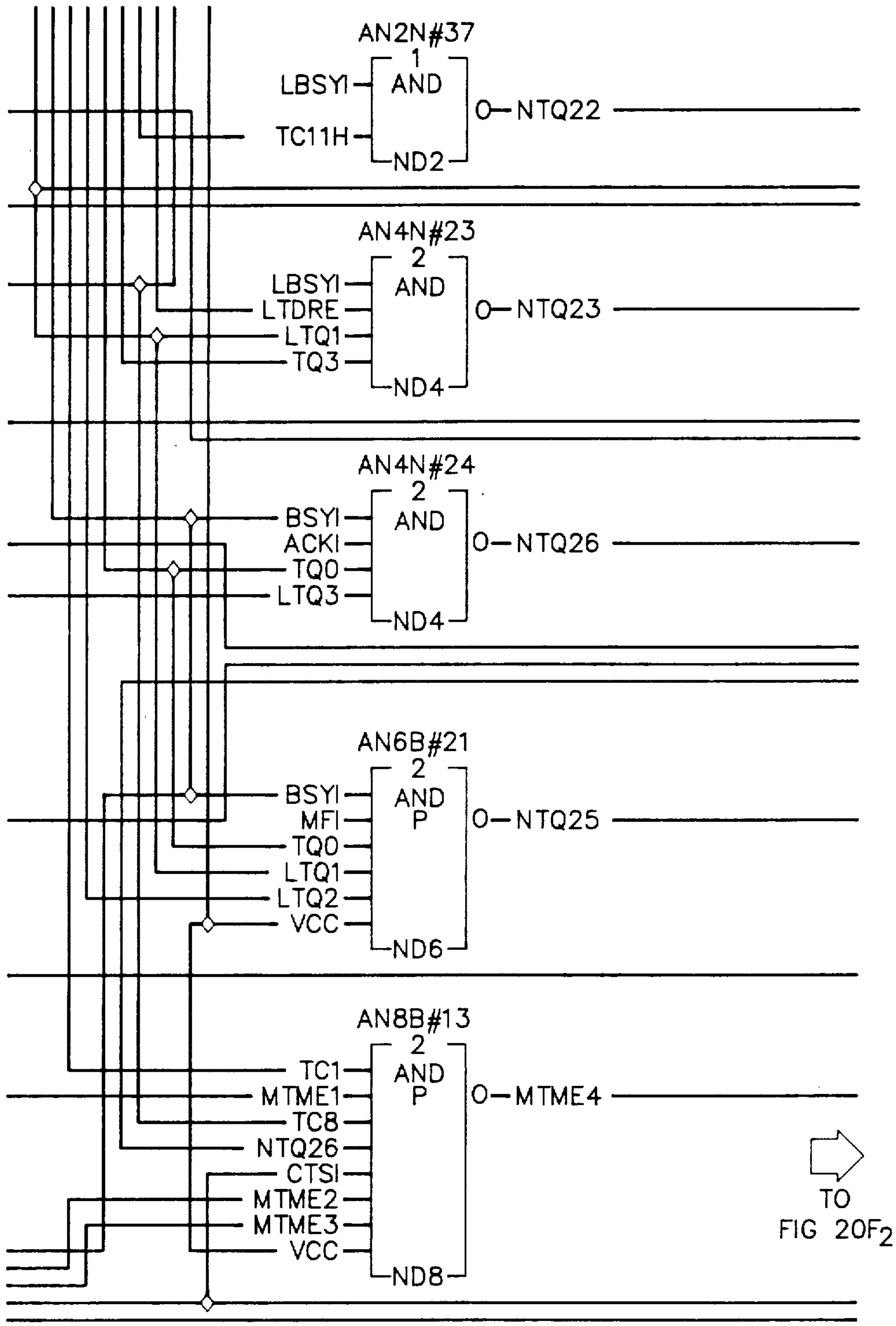
FIG 20F$_1$

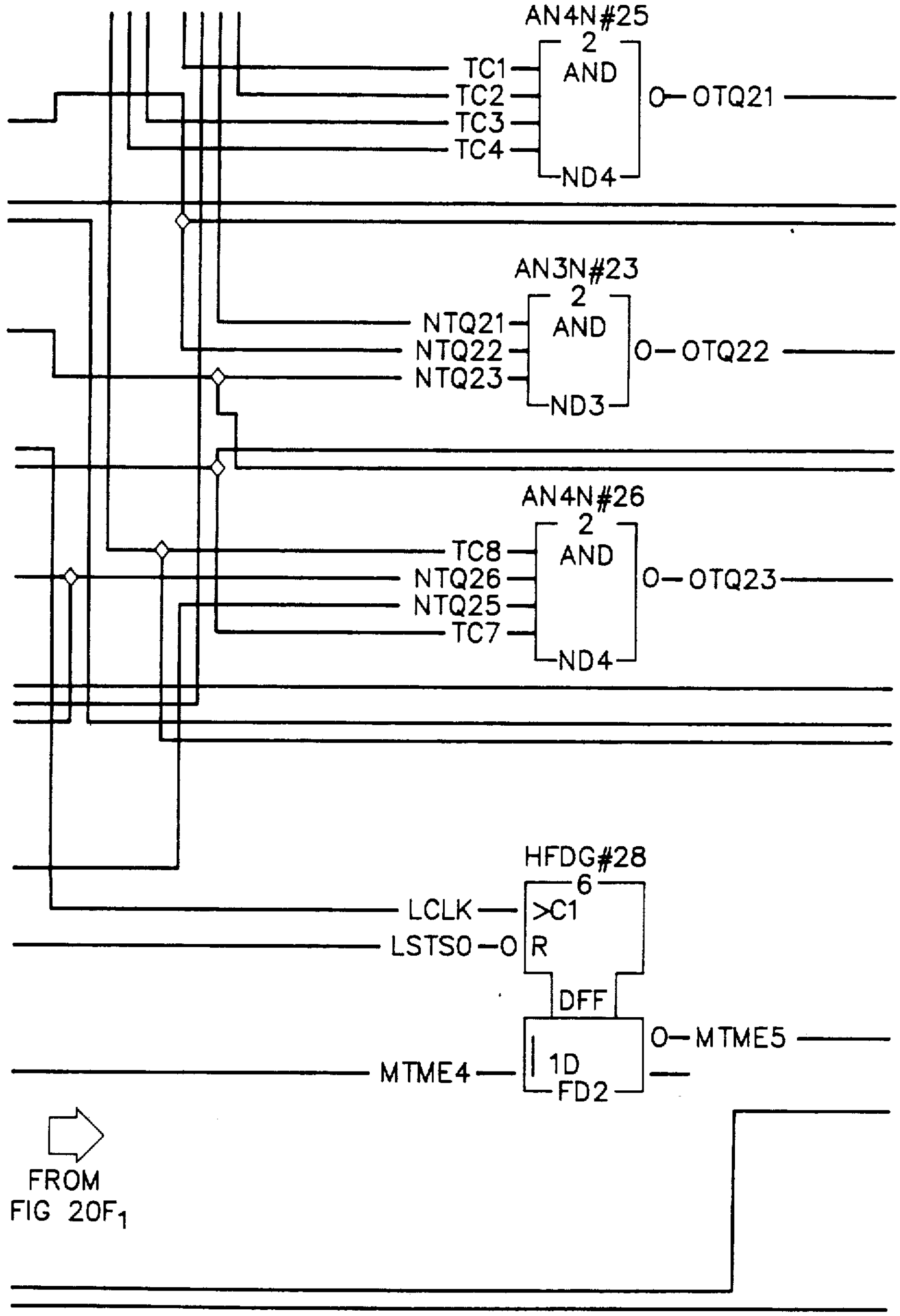
FIG 20F$_2$

AN2N#51
1
AND
ND2
LTDRE
RTSI
O-MWRSTH
MWRSTH
HV1N#16
1
N
IV
O-MWRST
AN2N#52
1
AND
ND2
MTMOUT
CLK
O-MWCLK
MW1
MW0
LMW0
LMW1
CLK
HLDLTL
AN4N#29
2
AND
ND4
TQ3
TQ2
TQ1
TQ0
O-TC11
AN3N#35
2
AND
ND3
TC10H
CONTLD1
MTMI8
O-LTL1
AN4N#41
2
AND
ND4
LDNMAA
LTL1
LTL2
LTL3
O-HLDLTL
MTMOUT
( 9 DD 89)
LTDRE
( 6 DD 69)
( 9 A 29)
LCONTLD1
( 5 DD 85)
TQ3
(11 A 84)
TQ2
TQ1
(11 A 104)
TQ0
( 9 DD 24)
(11 A 49)
CONTLD1
( 5 DD 90)

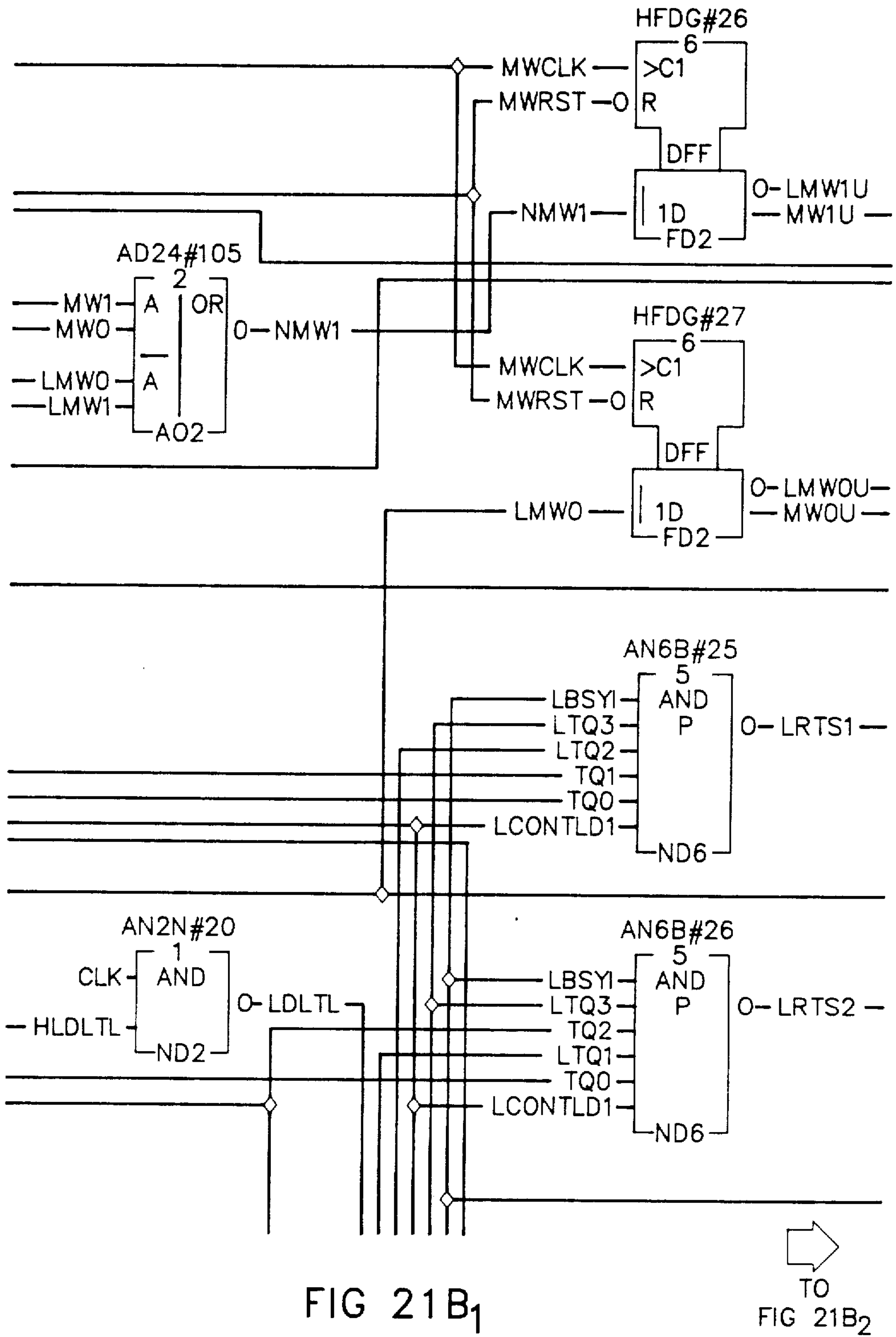
FIG 21B1
TO FIG 21B2

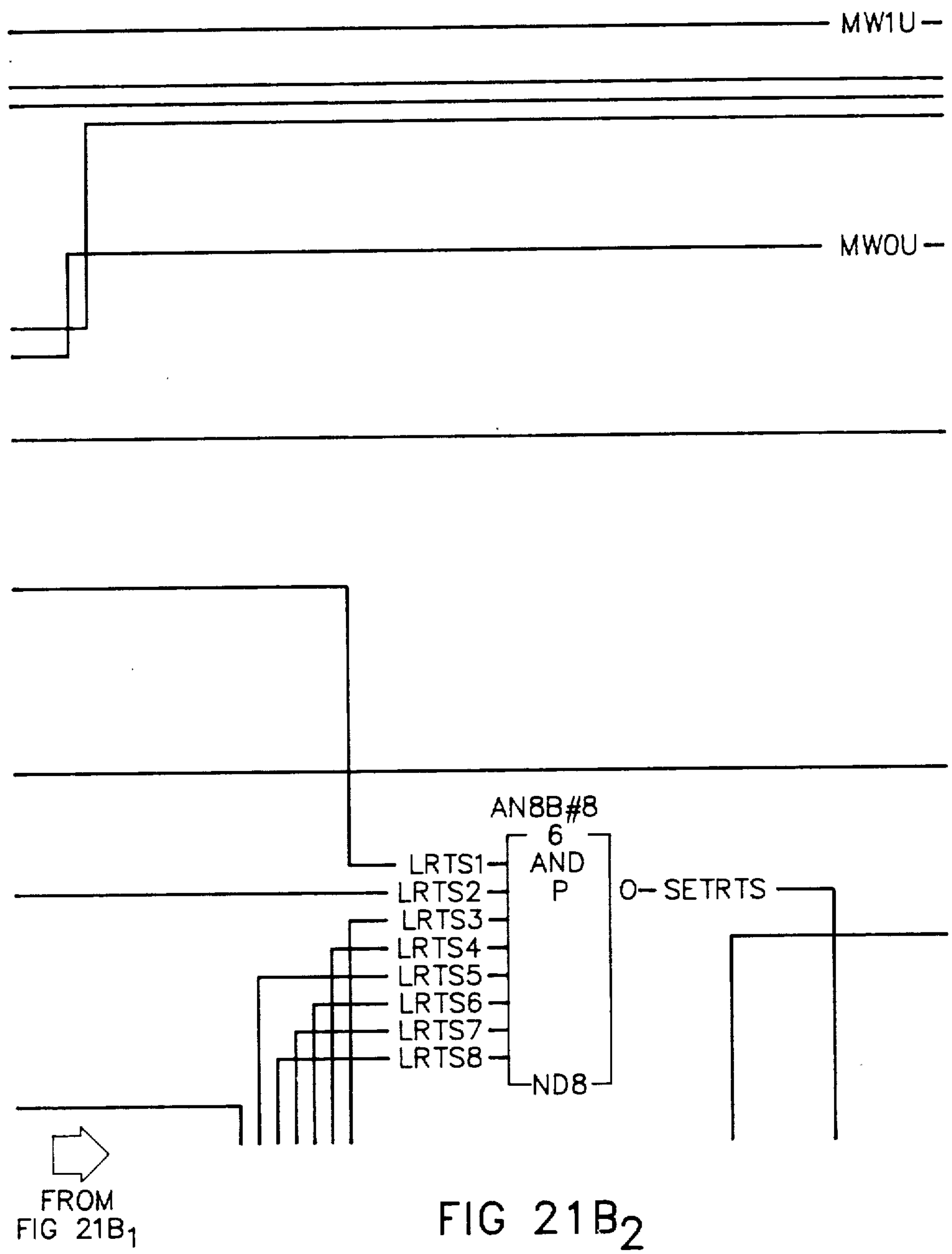
FIG 21B2

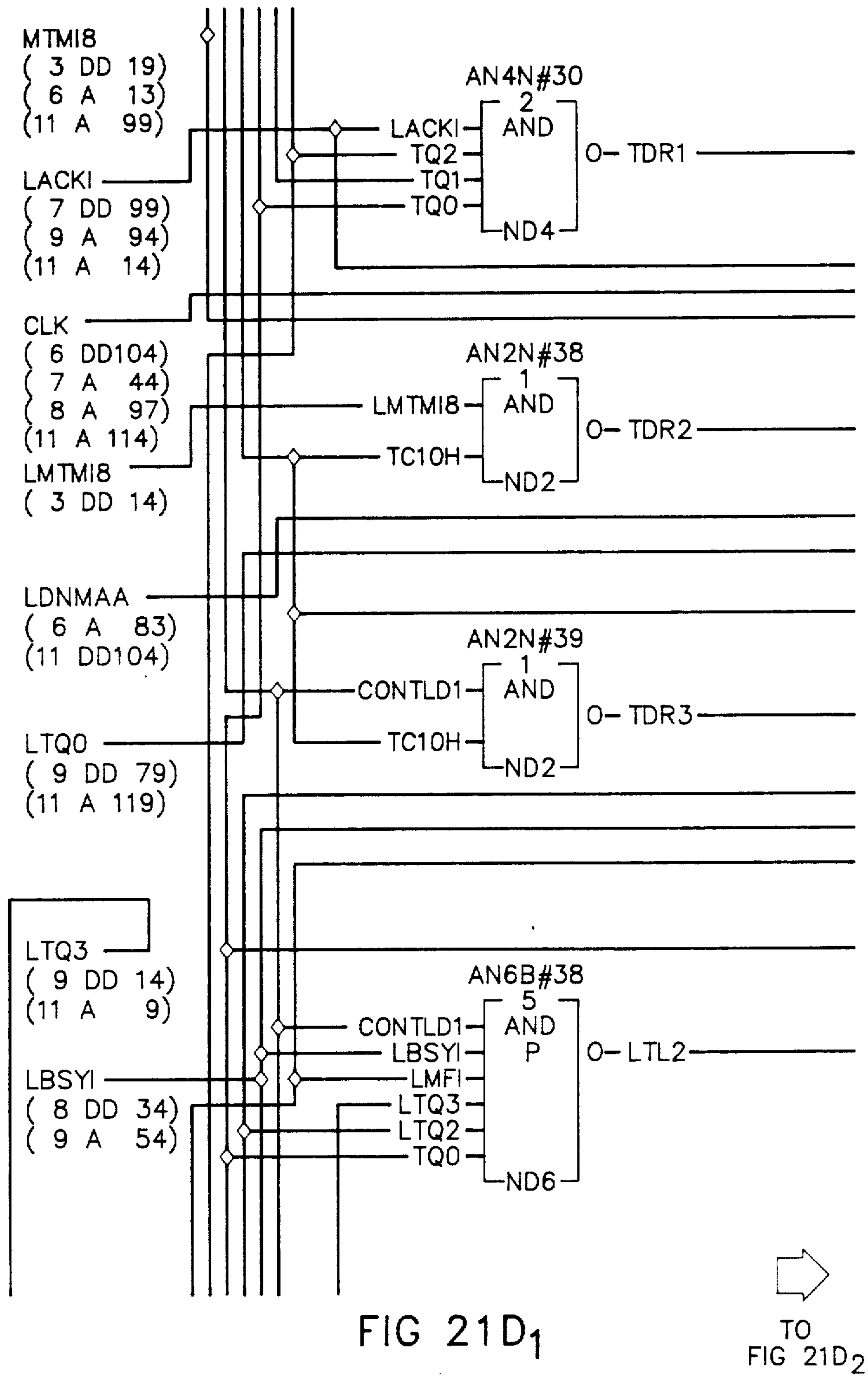
FIG 21D1

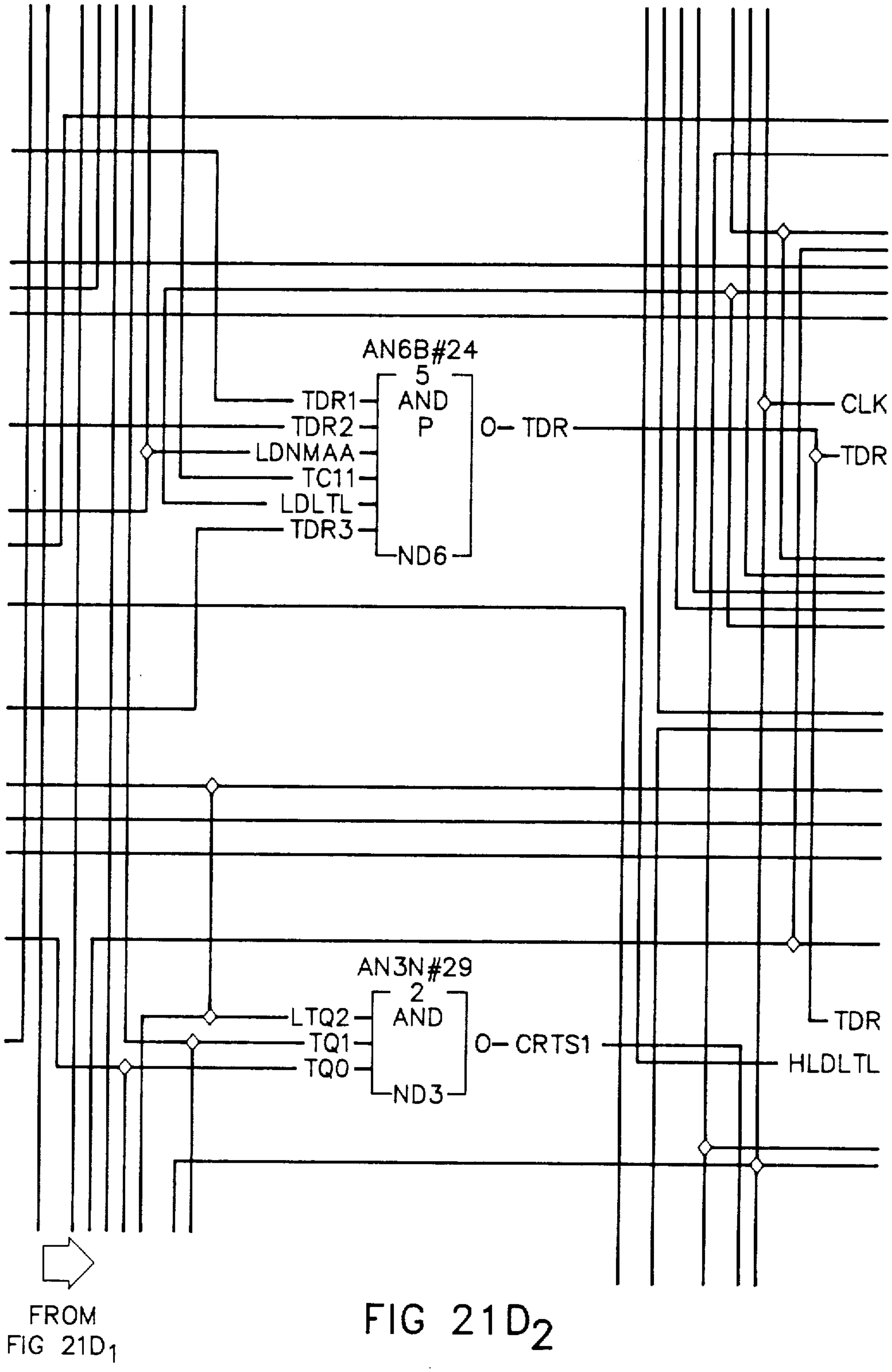
FIG 21D2

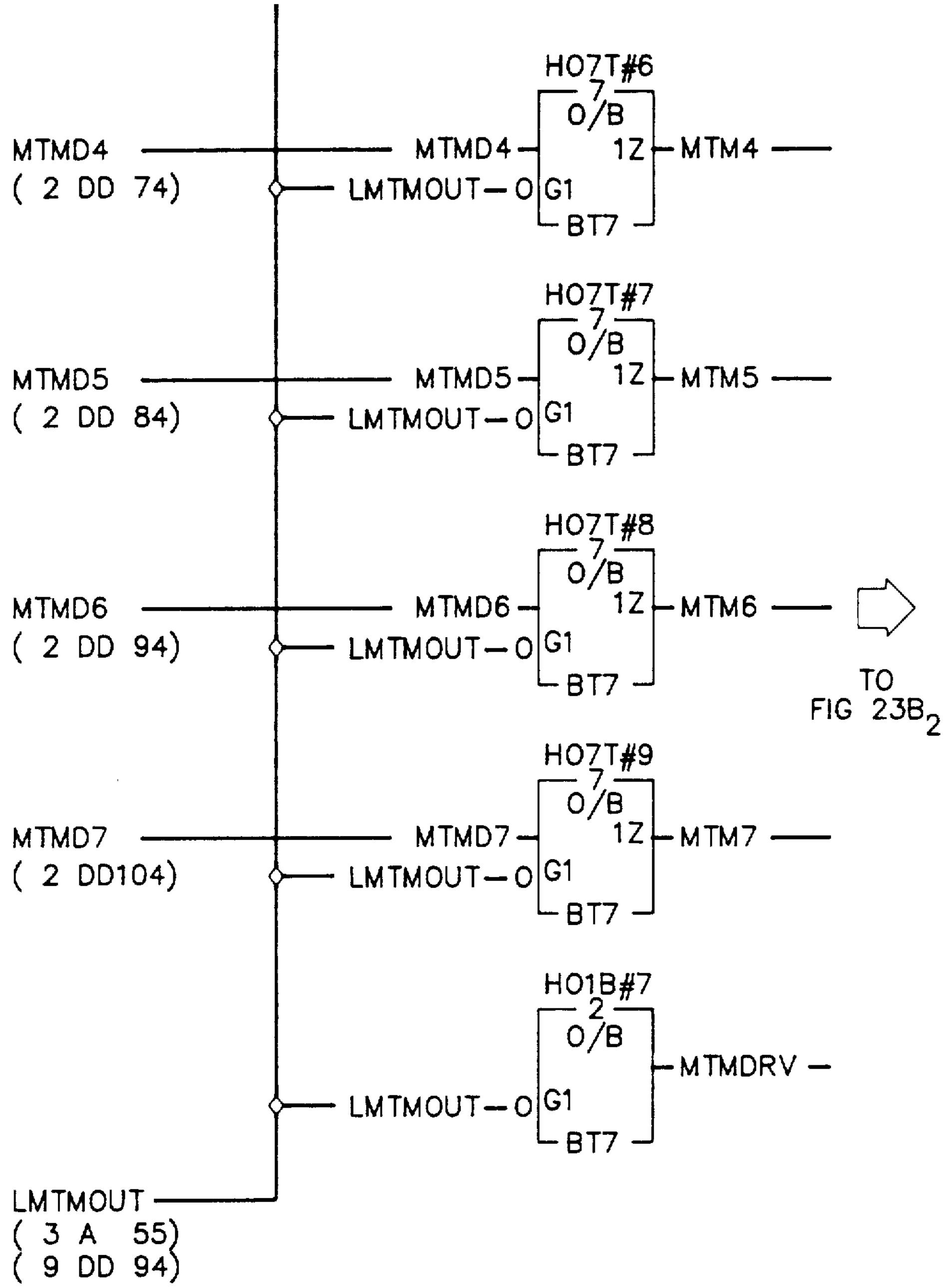
FIG $23B_1$

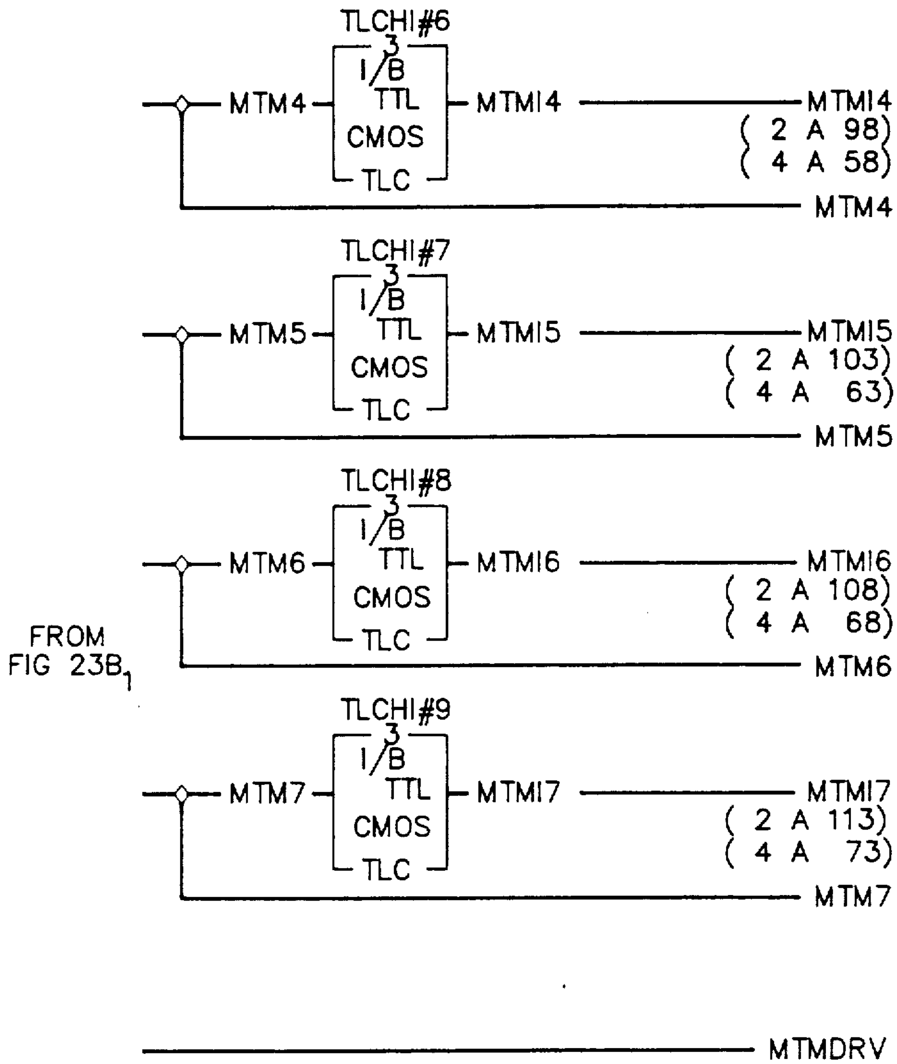
FIG $23B_2$

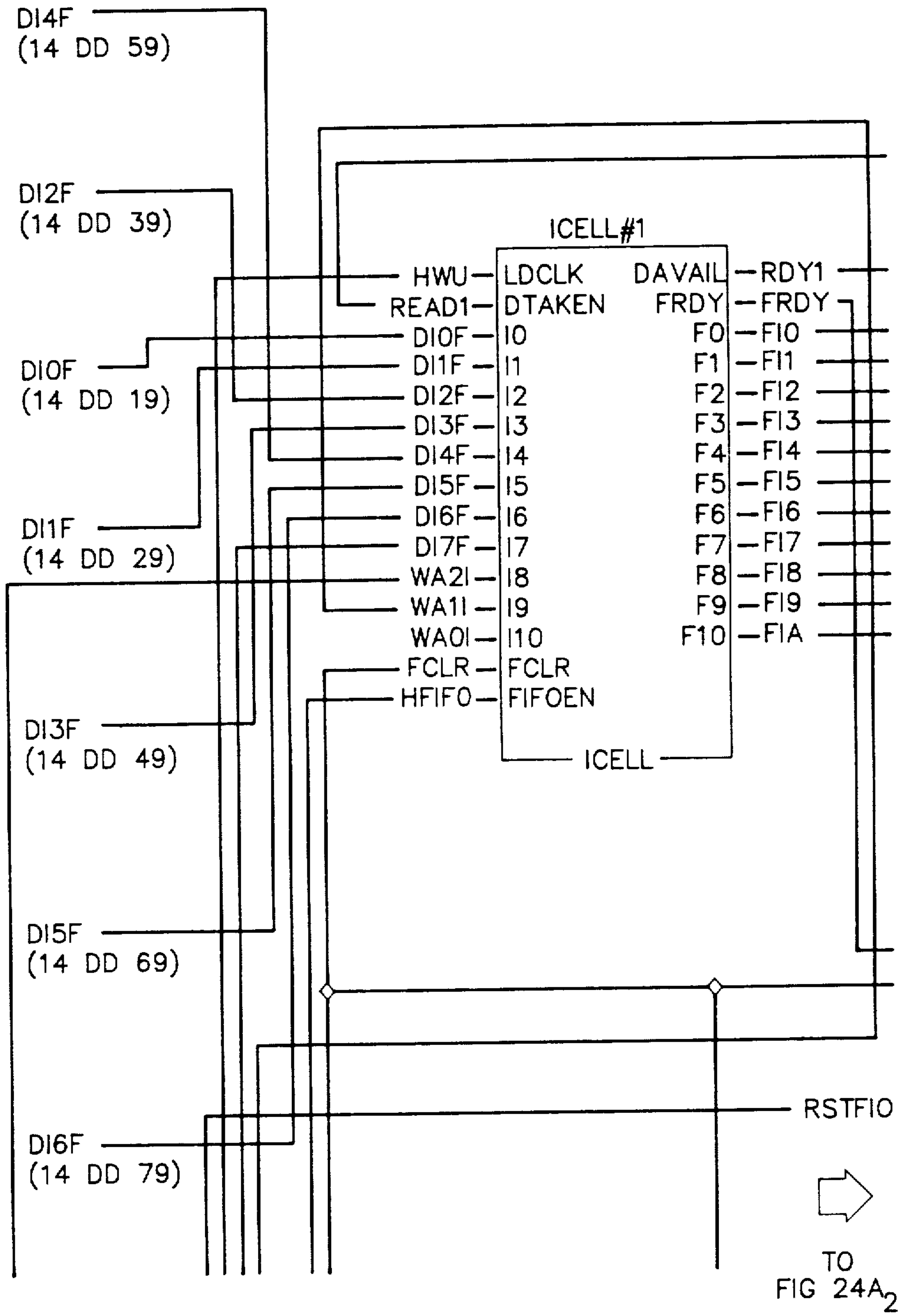
FIG 24A1

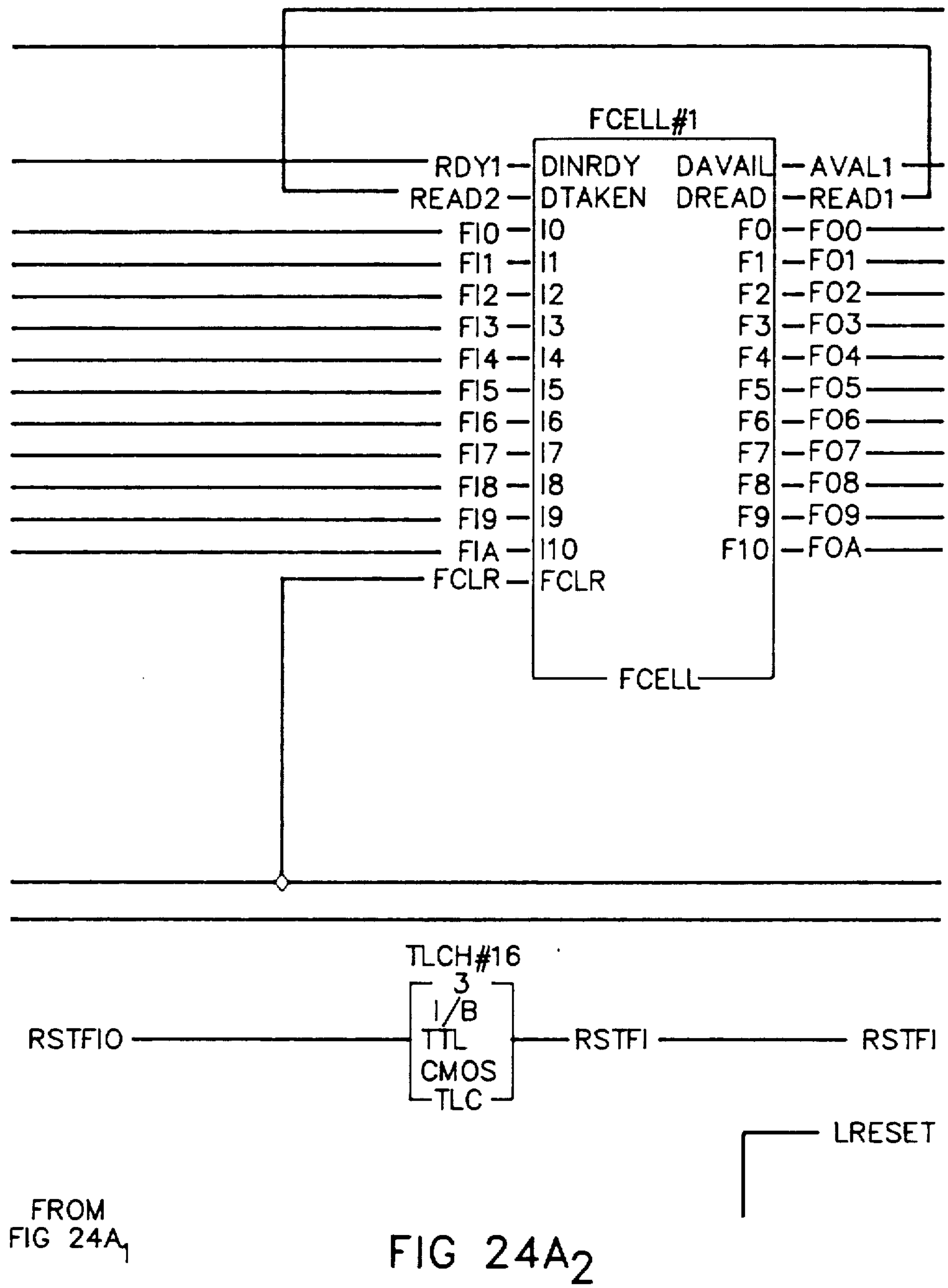
FIG 24A2

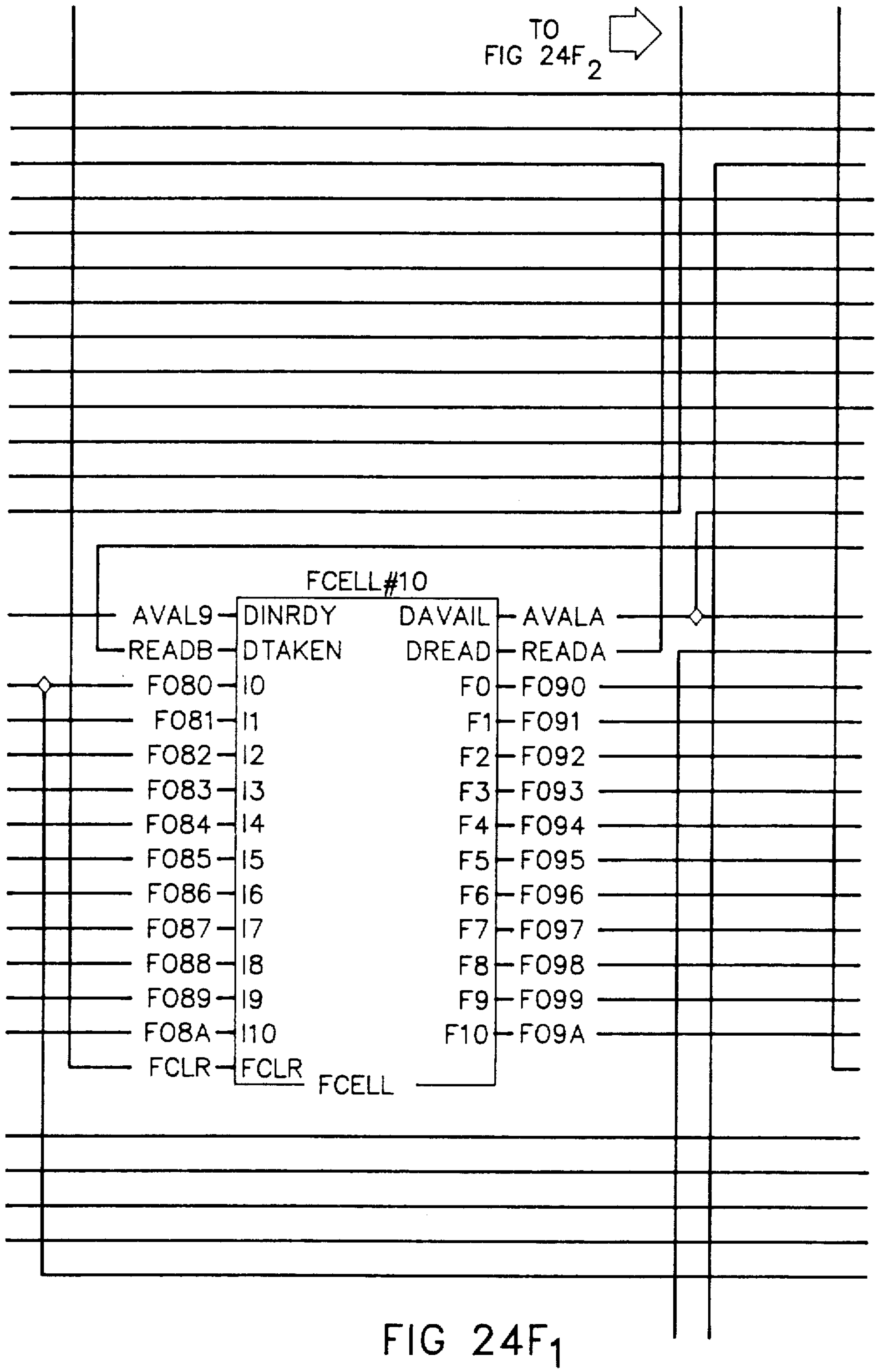
FIG 24F$_1$

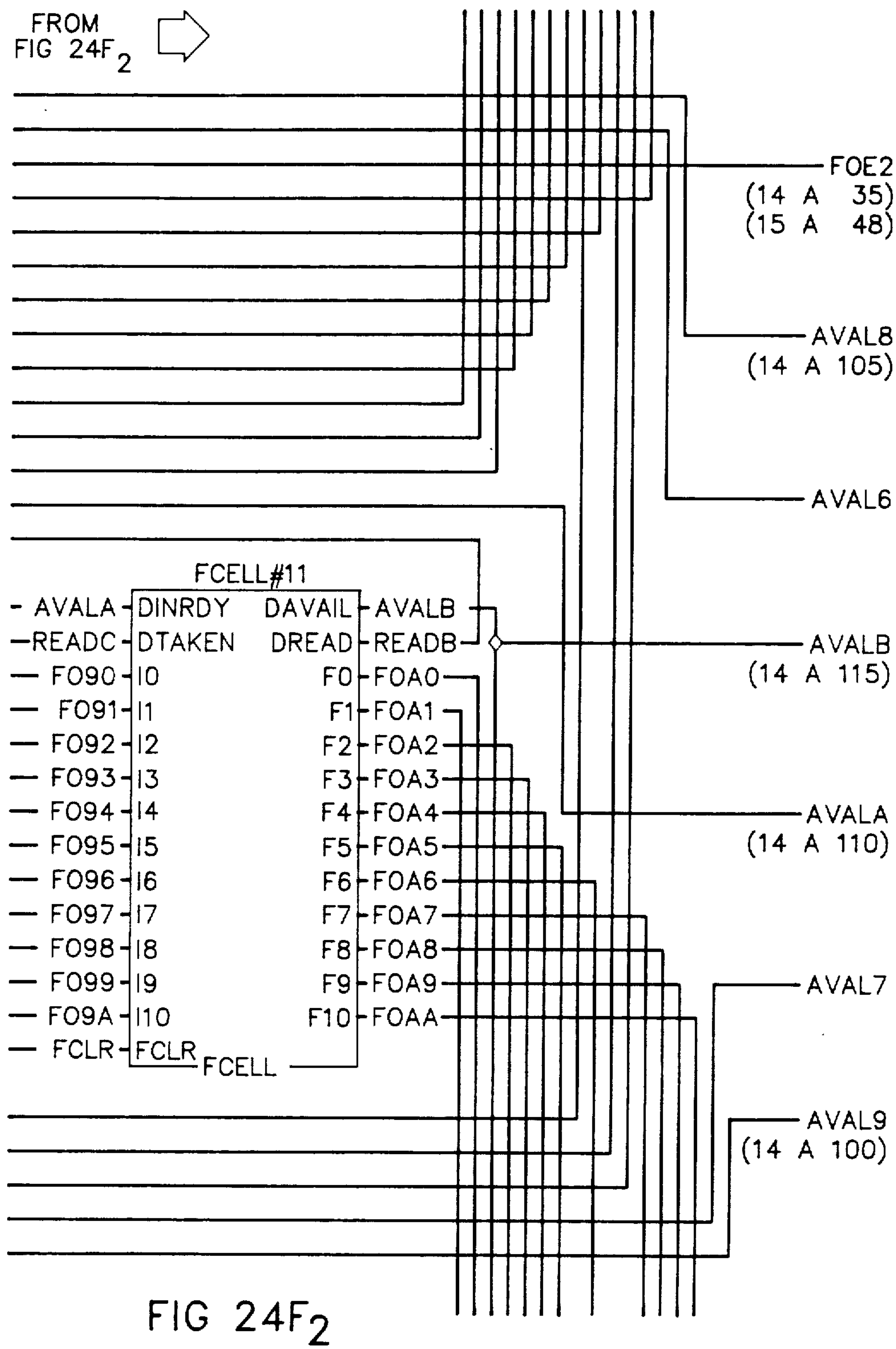
FIG $24F_2$

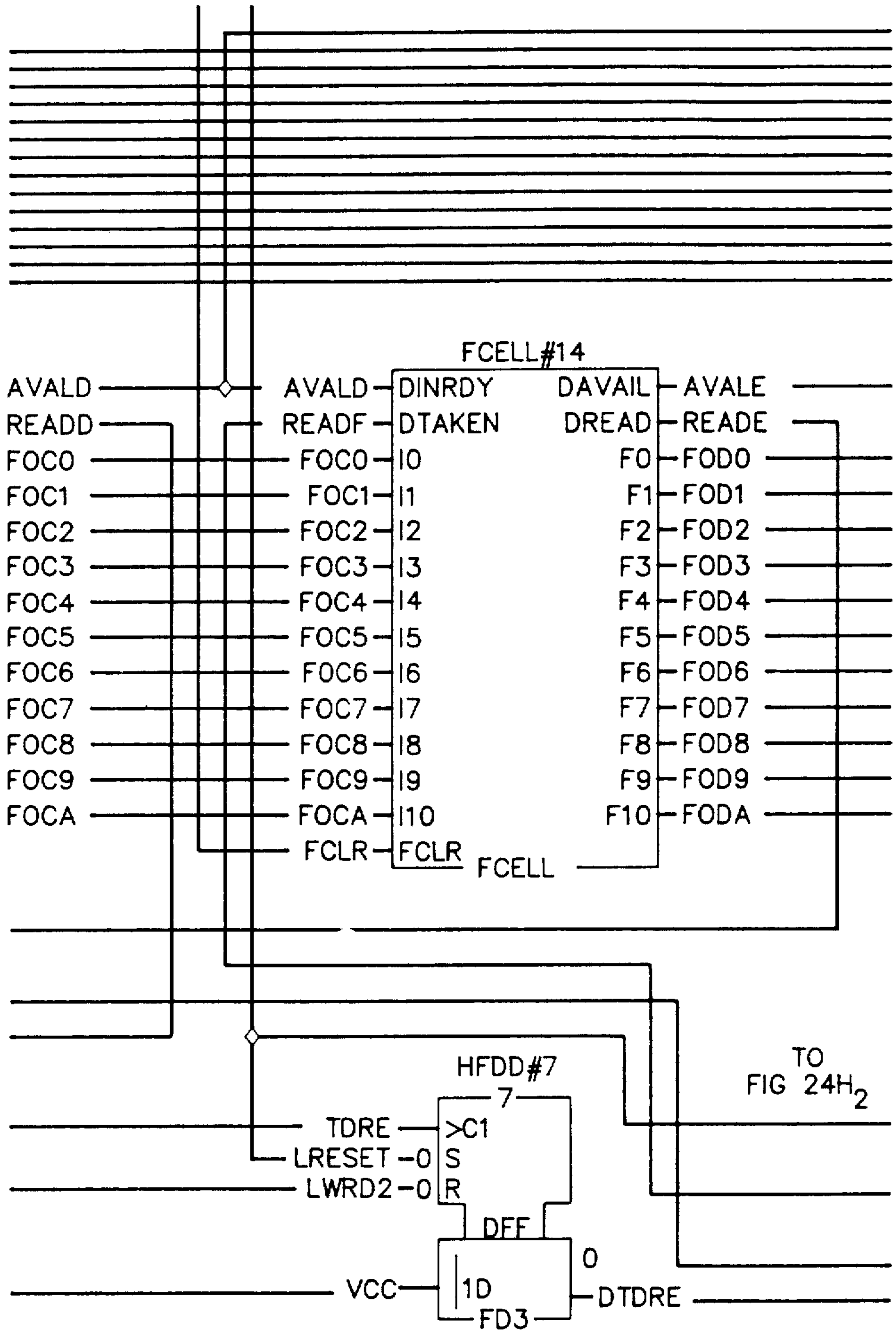
FIG 24H$_1$

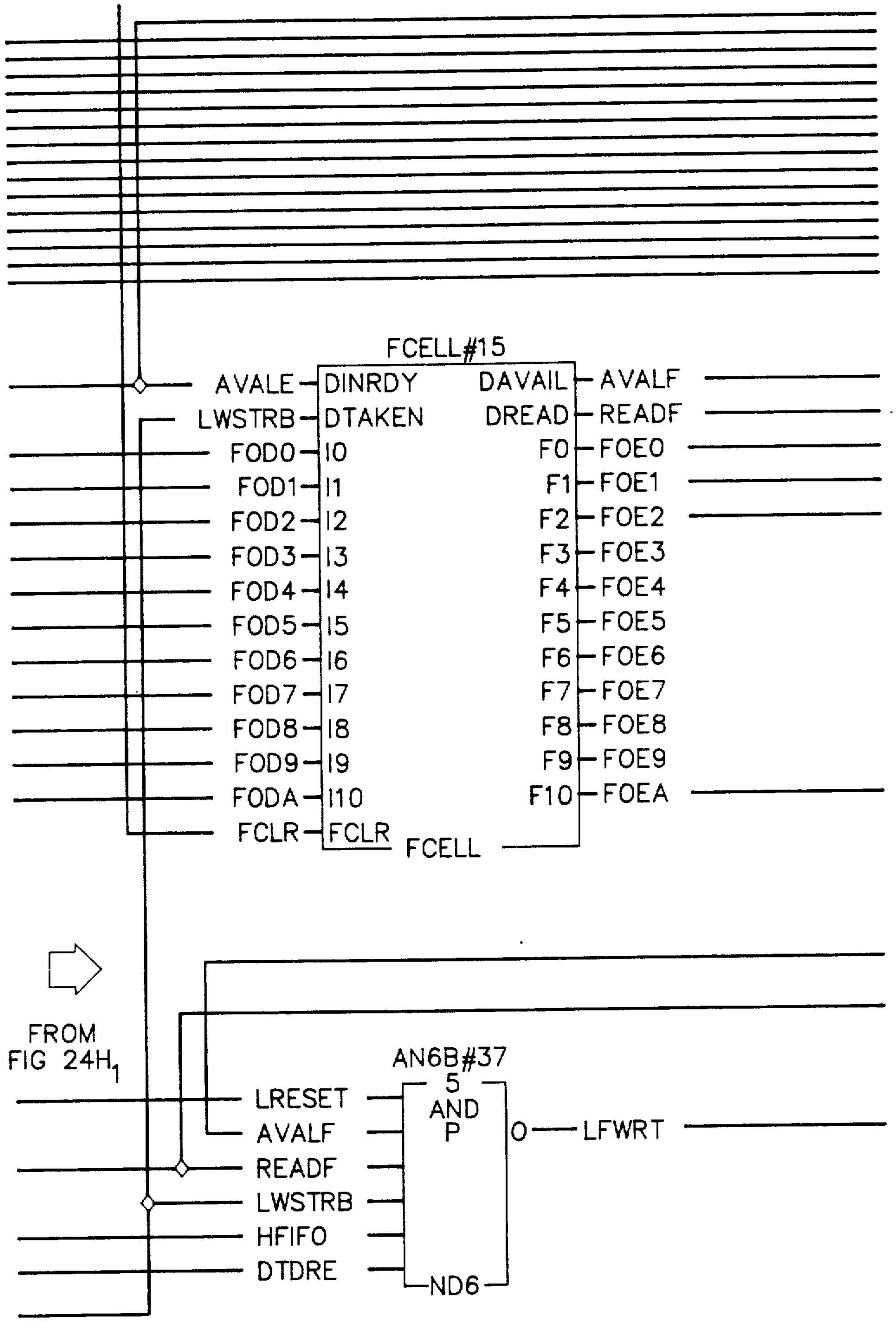
FIG 24H2

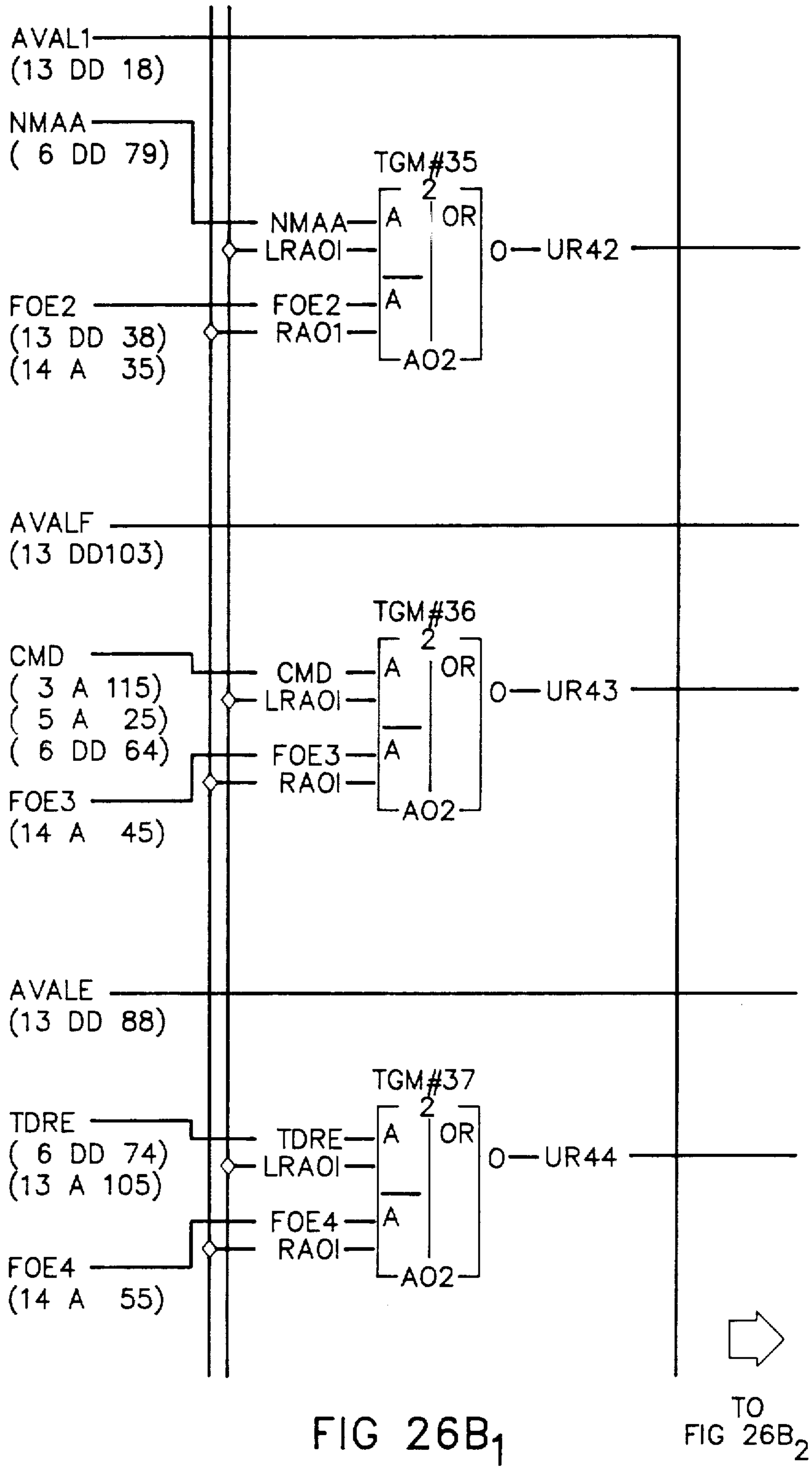
FIG $26B_1$

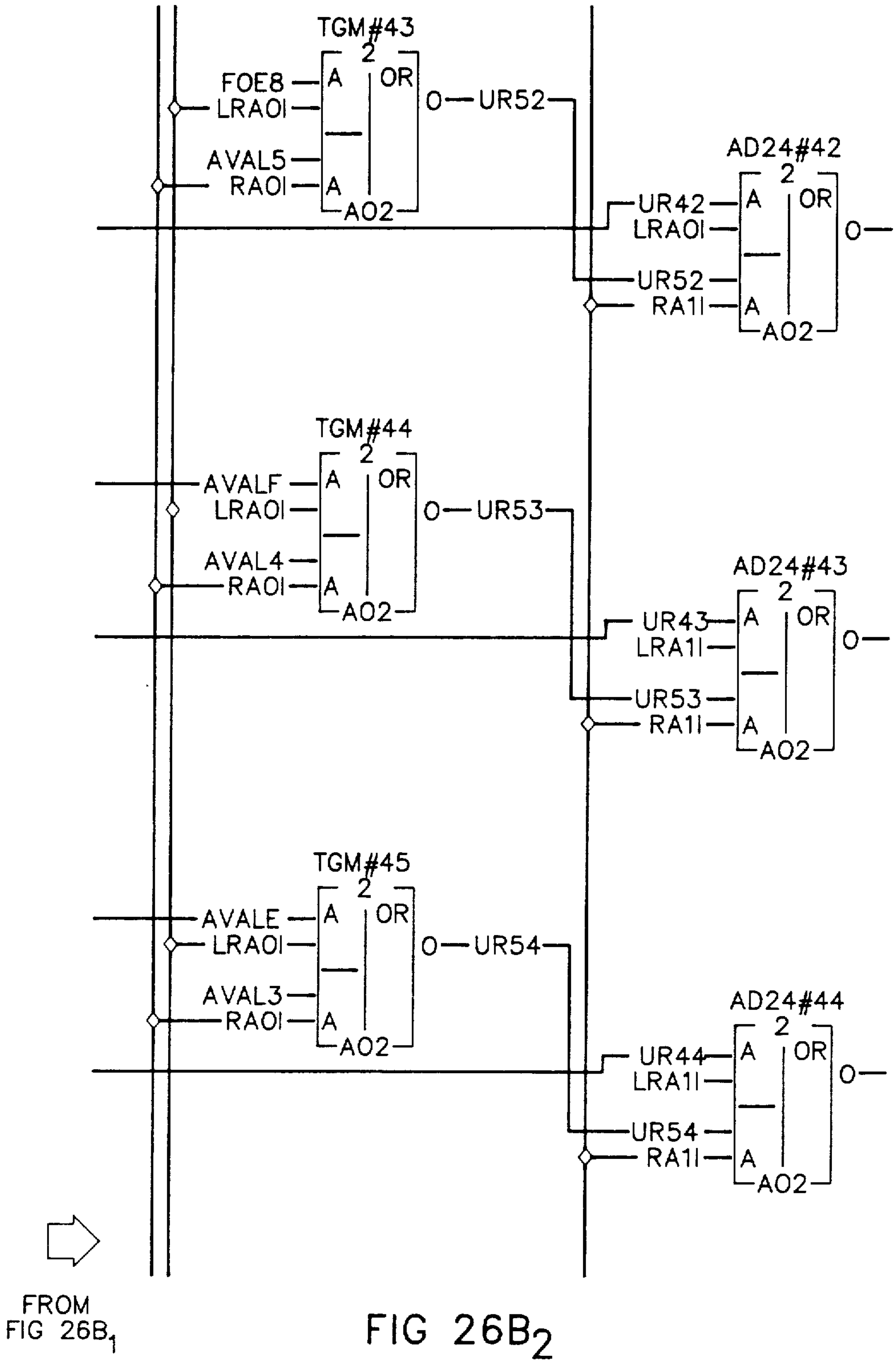
FIG 26B2

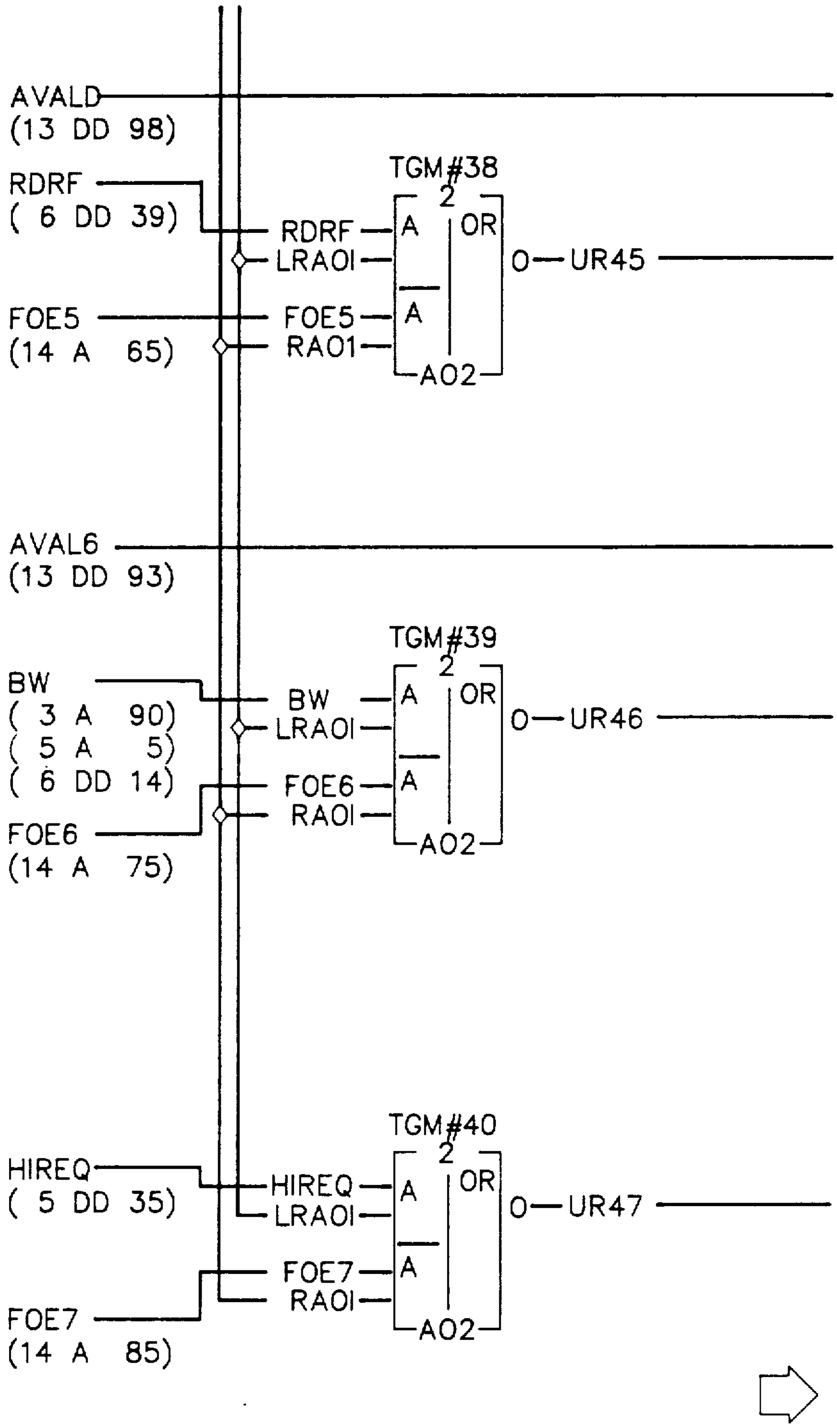
FIG $26C_1$

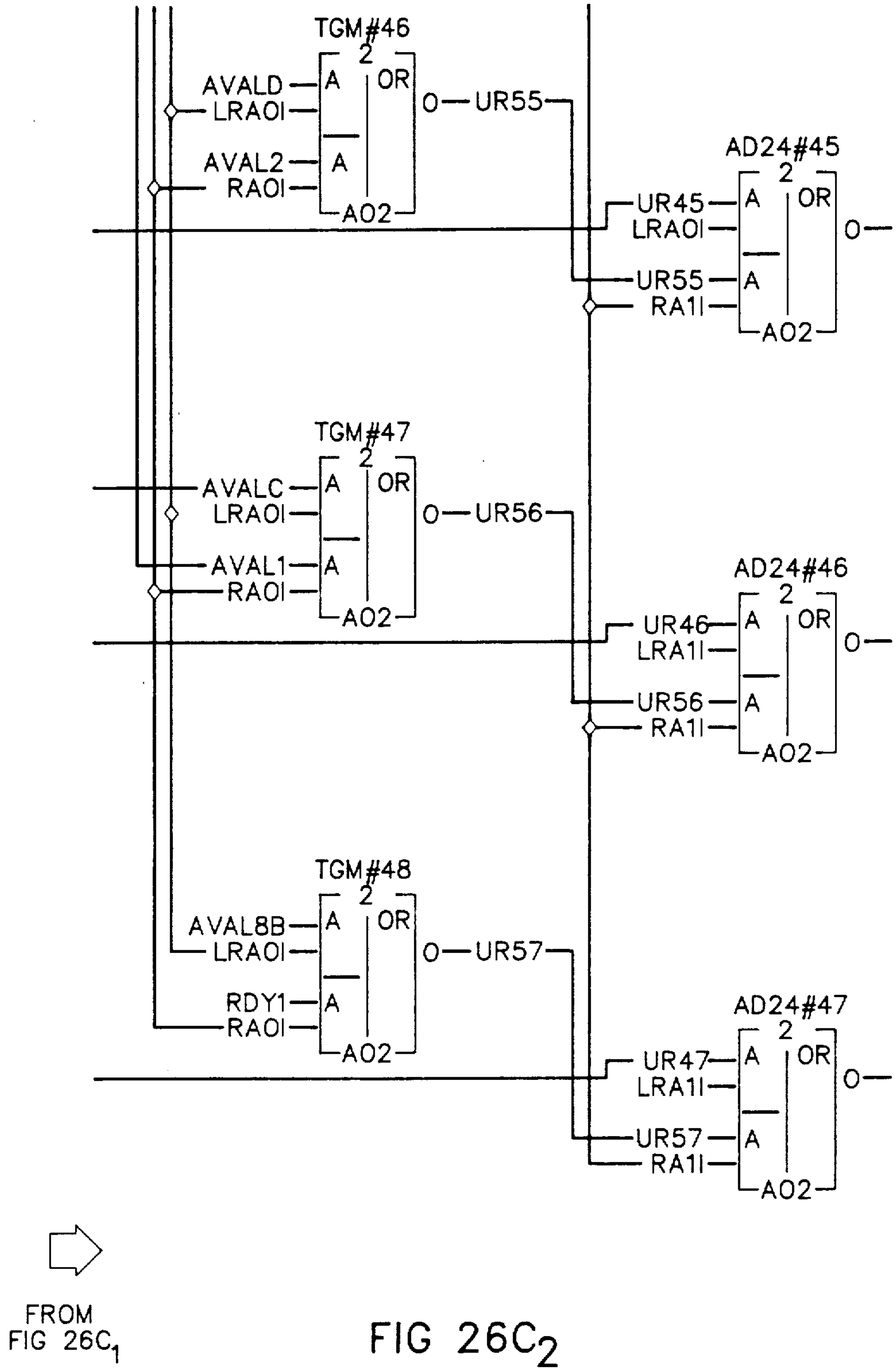
FIG 26C2

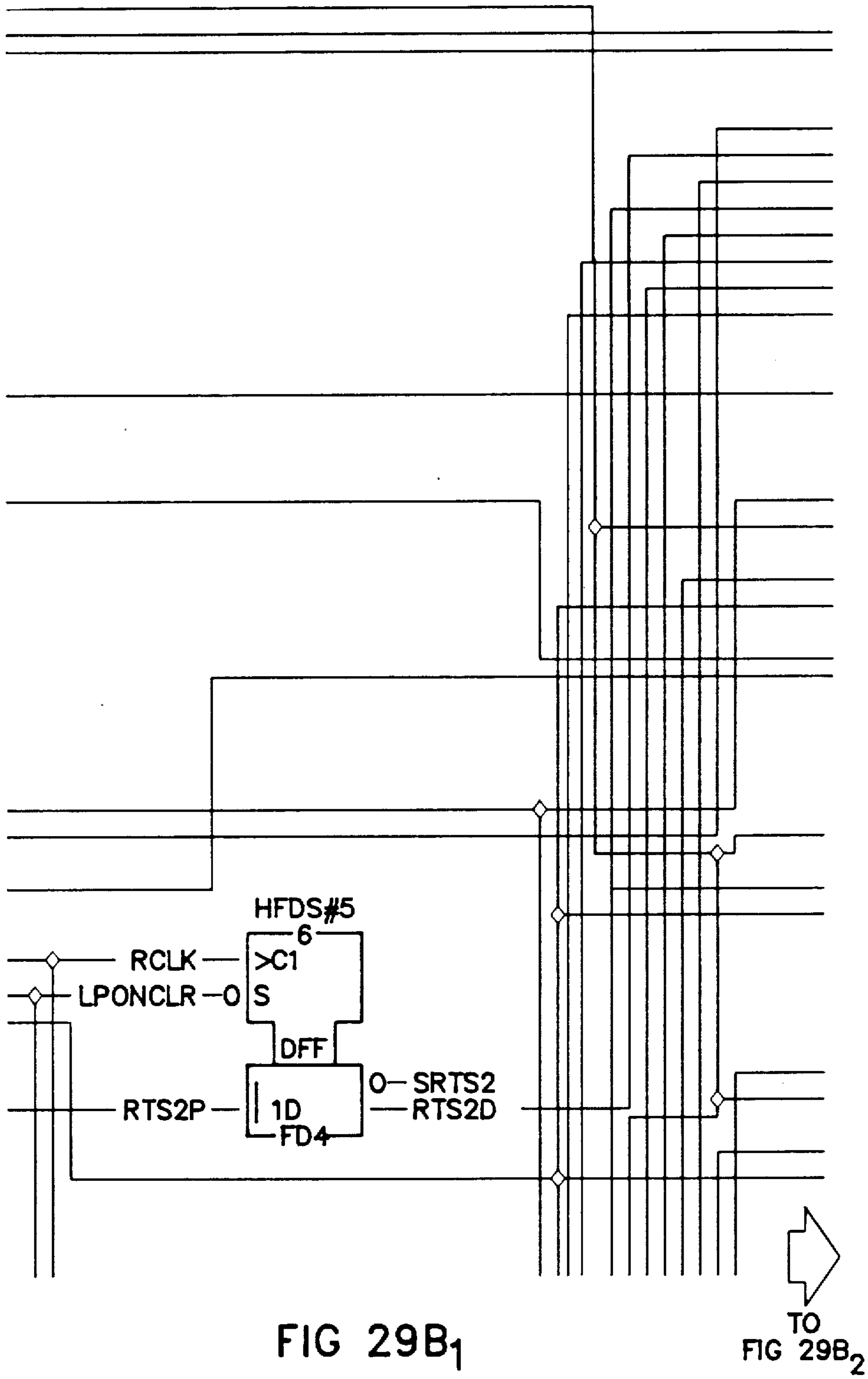
FIG 29B1

FIG 29B$_2$
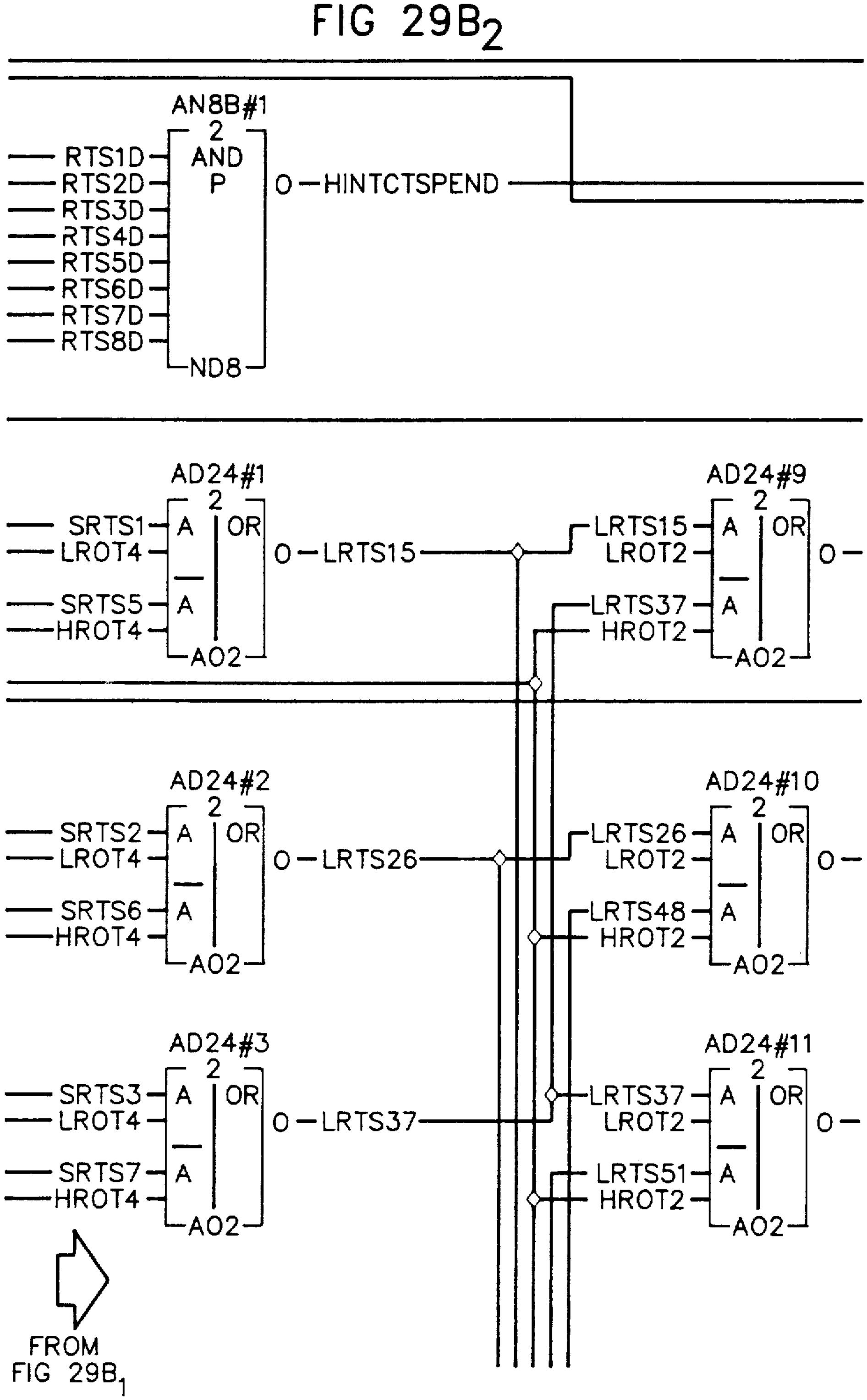

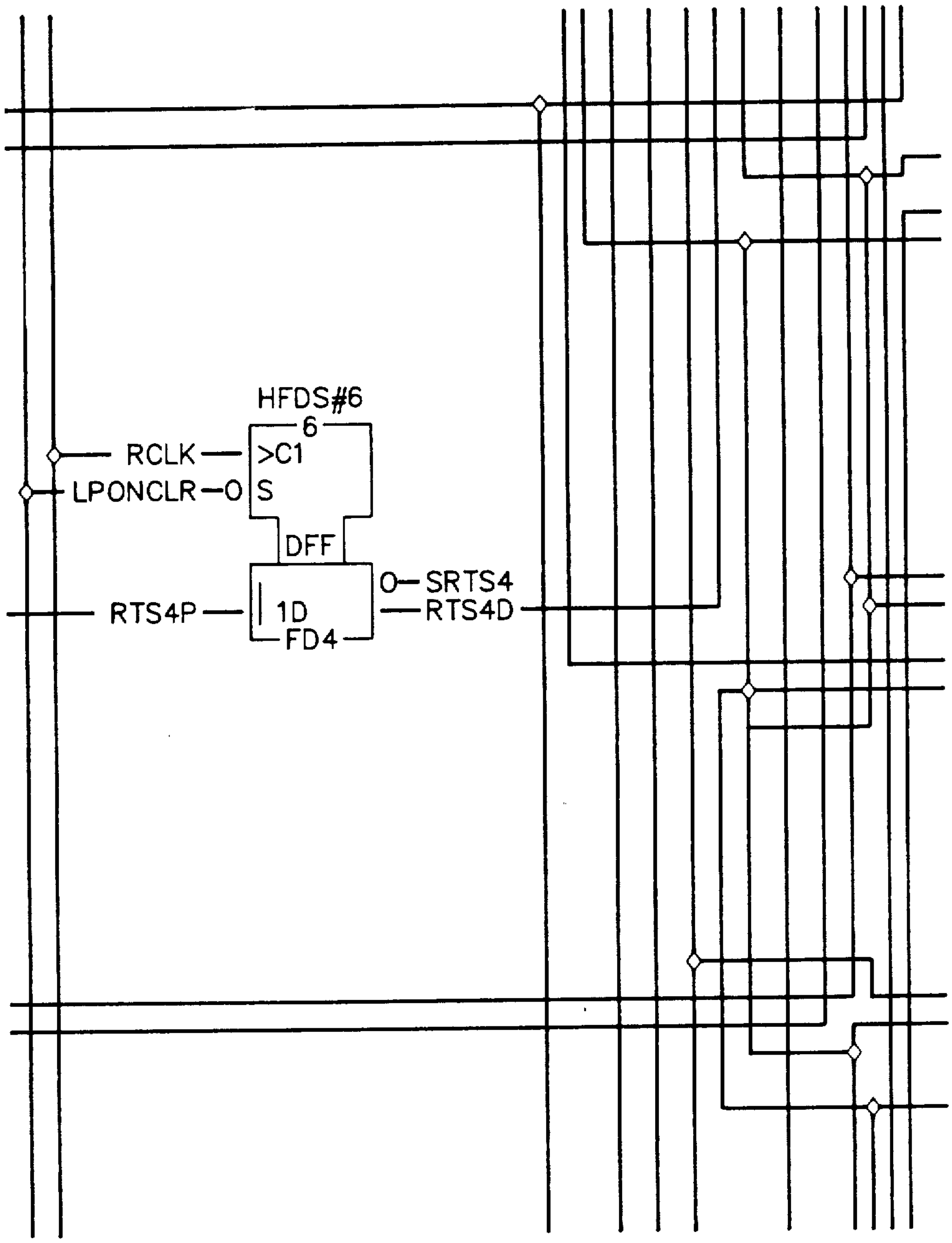
TO FIG 29E2
FIG 29E1

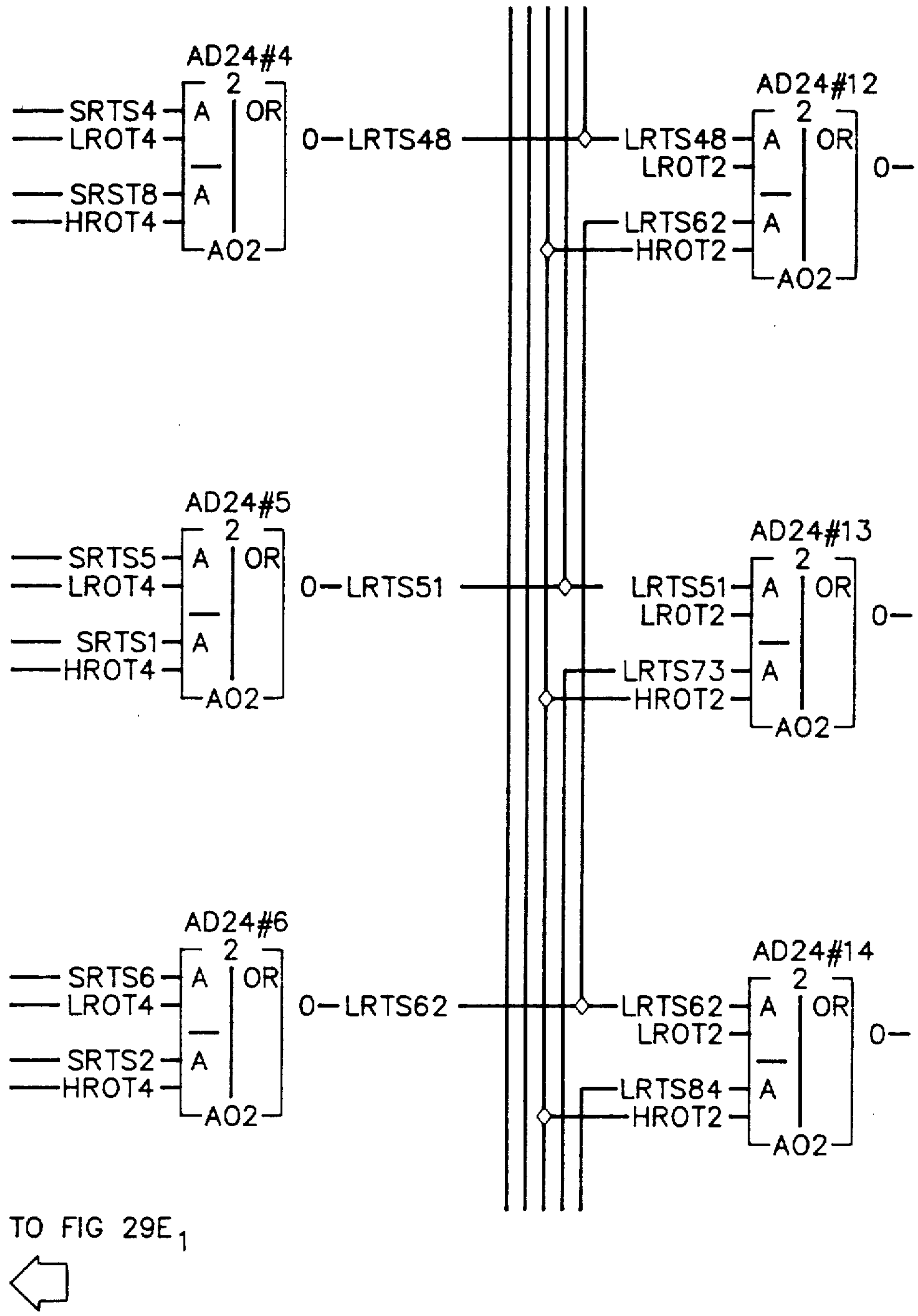
FIG 29E$_2$

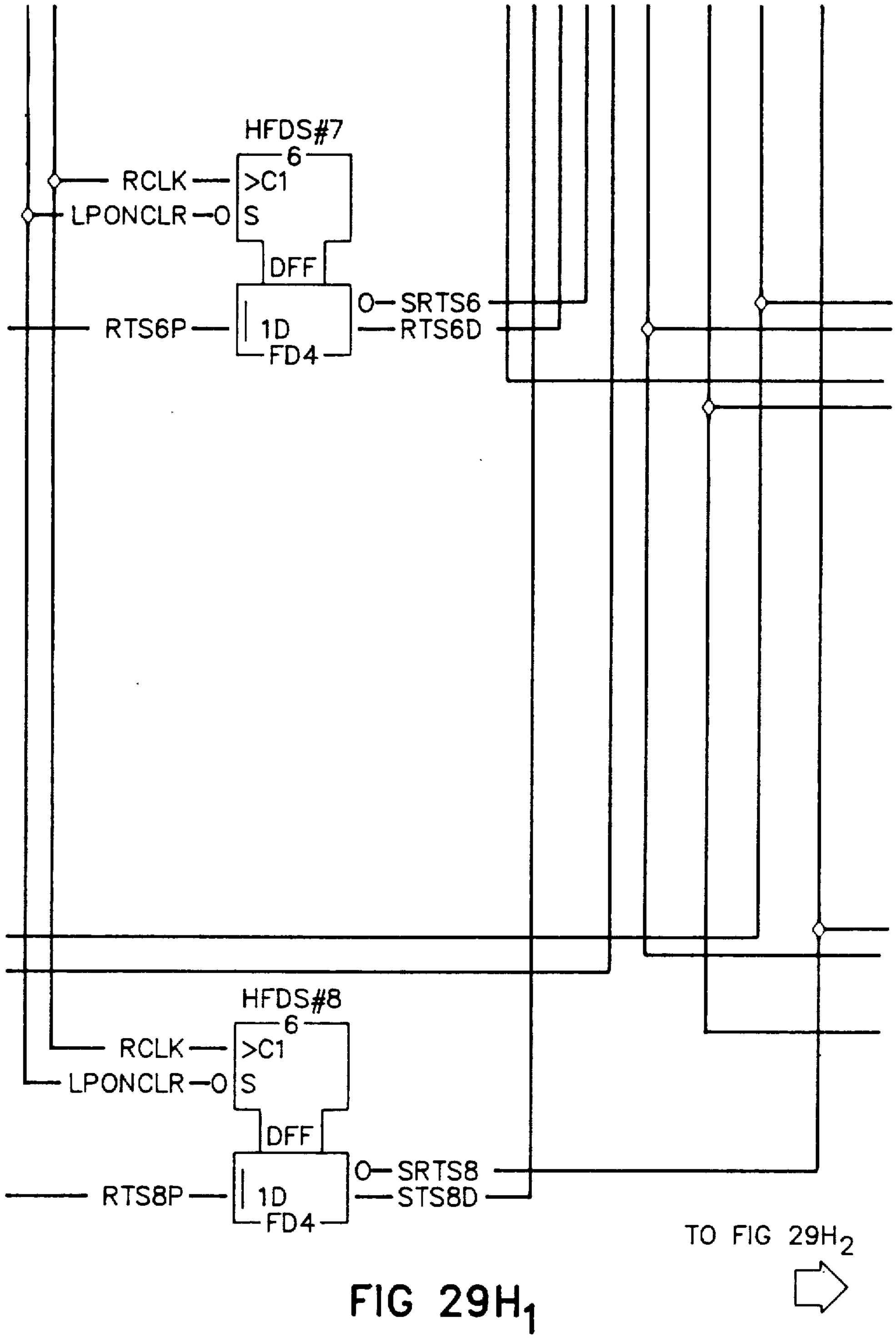
FIG 29H1

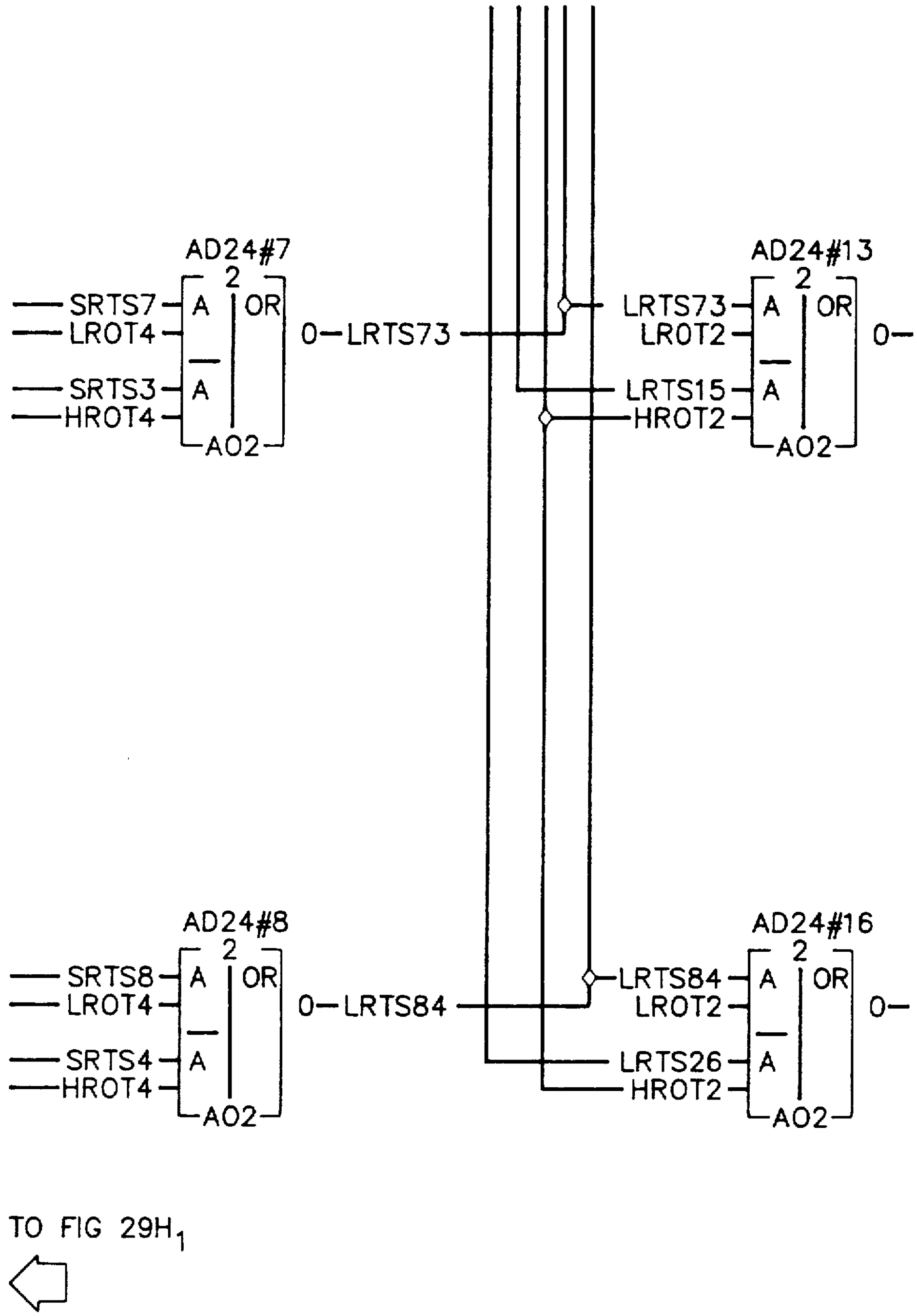
FIG29 $H_2$

TO FIG 31B–2

BUS SYSTEM

BACKGROUND OF THE INVENTION

There are many situations where it is necessary to set up communication links between any selected pairs of a large number of stations. This has been effected in the prior art by provision of a bus to which all the stations may be connected, and utilizing the bus to carry the information that determines whether the communication can be established. In some prior systems, much time is wasted because the decision as to the sequence with which the communication links are to be set up are made by a programmed computer or microprocessor. Furthermore, once a link is set up, it continues to operate until the message is completed so that other selected pairs may have to wait a long time before a link between them may be established, and this may be intolerable, e.g., if one of the stations includes a cathode ray tube on which data is displayed, the presentation may be interrupted for long enough periods of time to prevent it from having a real-time appearance. In other words, a minimum data rate is not guaranteed. Another disadvantage of some prior systems is that the distances over which they can operate are too short. A further problem is that there is only one chance for a message to be sent, and when it is sent, there is no assurance that it was received.

BRIEF DESCRIPTION OF THE INVENTION

In accordance with the general aspects of this invention, stations of the same group communicate with each other via an internal bus for the group as follows. Arbitrator means are provided for granting the stations access to an internal bus during periods of pre-set duration in a sequence that preferably, but not necessarily, only includes those sttions having a message to send. A complete message includes the address, TO, of the station to which the message is to go, a desired number of words of data and preferably the address, FROM, of the station sending the message. When a station is granted access to the internal bus, it places the TO address thereon. If the station with the TO address is in the group, it asserts a first signal preferably on a separate line, but if it cannot accept a message, it asserts a second signal which is also preferably on a separate line.

If the first signal is asserted but the second is not, the delivery of the message to the station having the TO address is completed and the station sending the message is prepared to receive a new message to send; but if the second signal is also asserted, the message is not delivered and remains in the sending station until it is granted access to the internal bus during a succeeding sequence.

The operation thus far described is satisfactory if only one group of stations exists and if there is no mistake in the TO address. If there is a mistake, the message cannot be delivered and would remain in the sending station indefinitely so as to lock that station up. In order to prevent this from occurring, the FROM address is placed on the internal bus along with extra bits whose logic levels can be set to indicate whether the station is present and, if so, whether or not it can receive a message. The extra bits and the FROM address are returned to the internal bus at a later time in the sequence. When the sending station identifies the FROM address as its own, it examines the extra bits to determine that happened to its message. If they indicate that no station has the TO address, the sending station is prepared to receive a new message to send. This is also done if the extra bits indicate that the station having the TO address is present and able to accept a message, in which event it is assumed that the message has been successfully delivered. However, if the station having the TO address is present but cannot receive a message, the message remains in the sending station until it is given access to the bus at a later time and the message is assumed to have been delivered.

In a situation where there are several groups of stations, means are provided for coupling the entire message and the extra bits from the internal bus of a first group to the internal bus of a second group, etc., and the internal bus of the last group is coupled to the internal bus of the first so as to form a loop. As a message initiated by a station in the first group and the extra bits associated therewith pass around the loop, the logic levels of the extra bits are set in each group so as to indicate whether the message has been delivered to a station in that group. When the message returns to the station where it originated, the operations described above are carried out.

In accordance with one aspect of this invention, a message that is generally but not necessarily provided by a programmed processor of a station is temporarily stored in the registers of the transmitter means of that station and conveyed to the registers of the data transfer means of any station via a common parallel bus comprised of data lines and control lines. The bus will hereinafter be referred to as an "internal bus". When the message is loaded into the registers of a data transfer means, it may be read by a device such as a processor for the station.

Some of the details involved in carrying out the above functions are noted below.

Those transmitter means having message to convey assert a request-to-send signal −RTS on an individual line to an arbitrator which sends a clear-to-send signal −CTS on separate lines to the different transmitter means on a sequential basis. The number of transmitter means involved in a sequence depends on the number having messages to send at any time. After each message is placed on the internal bus, the process is repeated. Because the messages are short, a number may be required before a station can convey all the information desired; but the sequential rate with which transmitter means have access to the bus is fast enough to give the information conveyed a continuous character.

When a transmitter means is connected to the internal bus, it places the first and second words of the message thereon in sequence. The first word contains the address of the station to which the message is to be conveyed, hereinafter referred to as the TO address, and the second word is the address of the station sending the message, hereinafter referred to as the FROM address. In view of the fact that the data transfer means of all stations are always connected to the internal bus, they will all receive the TO address. The station having that address places an acknowledge signal −ACK on an −ACK control line to indicate the it is present while the FROM address is on the data lines of the internal bus. The control line is connected to all transmitter means, data transfer means and to the arbitrator. If, however, the registers of the data transfer means of the TO address station are not empty, the data transfer means asserts a busy signal −BSY on a −BSY control line while the FROM address is on the data lines of the internal bus. This control line is also connected to all the transmitter means, data transfer means and the arbitrator.

If −BSY is not asserted while the FROM address is on the internal bus, the transmitter means places a first data word $D_1$ on the internal bus. All of the data words could be placed on the internal bus in sequence and loaded by the data transfer means into its registers if desired, but provision may be made for a processor to instruct a data transfer means to only receive a message from the same station from which it received its last message. To determine this, the data transfer means of the TO address station compares a copy of the last FROM address received with the FROM address in the current message. If they are not the same, −BSY is asserted on the −BSY control line. This can only occur while the $D_1$ data word is on the internal bus because the comparison can only be made while the FROM address is on the internal bus.

The message remains in the registers of the transmitter means until it is successfully delivered to the TO address station during another turn on the bus, or until it is aborted by the processor. The assertion of −ACK and the non-assertion of −BSY assures that the message has been successfully delivered and the registers of the transmitter means are prepared to receive a new message from the programmed processor or other means.

In order to prevent the system from being locked up in the event that a station having the TO address is not connected to the internal bus, a situation that might occur from a mistake in the TO address transmitted or by virtue of the fact that a connection is broken, what will be referred to as an "external transmitter means" and "external data transfer means" are provided and one more line is included in the internal bus than is required for the data. The data lines and the additional line are connected to the input of the external data transfer means, and the output of the external data transfer means is connected to the input of the external transmitter means. Its output is connected to the internal bus when it receives a clear-to-send signal from the arbitrator.

By means of the additional line in the internal bus, an additional bit can be added to each word of the message. They do not come from the processor, but are added to each word of the message as it is placed on the internal bus. Initially, two of them that are respectively added to the FROM address and the $D_1$ data word have a logic level of "0". The bit added to the FROM address will be made a "1" by the external data transfer means if the TO address station is on the internal bus, i.e., if −BSY is asserted; and the bit added to the $D_1$ data word will be made a "1" if the TO address station is busy, i.e., if −BSY is asserted. In the situation where the TO address station is not present, both bits will remain "0". Upon seeing this, the transmitter means that sent the message, i.e., the one having the FROM address, will prepare its registers to receive a new message and flags will be set to indicate to the processor that no such station exists. If the TO address station is there and its data transfer means can receive a message, the bit added to the FROM address will be "1" and the bit added to the $D_1$ data word will be "0", but if the data transfer means is busy or cannot receive from the transmitting station, it will be "1".

Time is saved in this bus system because a processor is not involved in making decisions related to the delivery or non-delivery of a message. All these decisions are made by hard-wired state machines in the transmitter means, the data transfer means and the arbitrator. Time is also saved by virtue of the fact that the request-to-send and clear-to-send signals are conveyed on individual lines rather than via data lines of the bus.

In accordance with another aspect of this invention, means are provided for sending a message from a station on one internal bus to a station on another internal bus. This may be necessary because of a practicable limit to the number of stations that can be on one internal bus or because it is desired to have a first group of stations on one internal bus at a point that is remote from a second group of stations on another internal bus.

To carry out this kind of transmission, an external bus is connected between the output of the external data transfer means of the first group to a fifo buffer that is connected to the input of the external transmitter means of the second group. In this situation, the external data transfer means of the first group determines from the fact that neither −ACK nor −BSY are asserted when the FROM address is on its internal bus that it is to place the message on the external bus. If the registers of the external data transfer means are not empty, it asserts −BSY on the control line while the $D_1$ data word is on the bus and the transmission is terminated and the message stays in the registers of the transmitter means to wait for it to have another turn on the internal bus. If, however, the registers of the external data transfer means are empty, it loads the message into registers selected by a two-bit state code machine.

Before the external data transfer means of the first group loads the external bus, it sends out a signal of enquiry to determine if the fifo in the second group can accept a word of data. If it can, an affirmation signal is sent back indicating this fact and the external data transfer means for the first group loads the external bus. It will have one line for each bit in the message, one line for the additional bit referred to above, two lines for the two bits from the code state machine, one line for the signal of enquiry, and one line for the affirmation signal.

The message, the extra bit for each word and the code state machine bits then bubble up through the fifo of the second group. A Transmit Data Register Empty (TDRE) flag is checked to determine if the registers of the external transmitter means are empty. If they are, the message and the extra bit for each word are written into appropriate registers of the external transmitter means as directed by the code state machine bits. After the external transmitter means asserts a request-to-send signal −RTS to the arbitrator for the second group and when the arbitrator sends back a clear-to-send signal −CTS, the external transmitter means places the TO address and FROM address on the internal bus of the second group in sequence.

If the station having the TO address is not in the second group and if the registers of the external data transfer means of the second group are empty, the message and the extra bits in the FROM address and the $D_1$ data word are loaded into the registers of the external data transfer means selected by its code state machine; but if the registers are not empty, the message and extra bits remain in the registers of the external transmitter means of the second group and the process is repeated until the message is successfully sent.

The message and extra bit are conveyed from the registers of the external data transfer means of the second group to the external transmitter means of a third group in the same manner as they were conveyed from the registers of the external data transfer means of the first group to the external transmitter means of the second group.

If the station having the TO address is in the third group, the message and extra bits will remain in the registers of the external transmitter means for the third group if the registers for the external data transfer means for the third group are full; but if the latter registers are empty, the message will be loaded into these registers. In the event that the TO address station cannot receive the message, the extra bit added to the FROM address and the extra bit added to the $D_1$ data word are both changed to a "1" by the external data transfer means. If, however, the TO address station can accept the message, the extra bit in the FROM address is set at "1" and the bit added to the $D_1$ data word remains at "0".

In order that the transmitter means that originated the message can know what happened to the message it sent, it is necessary that the external bus eventually return to the input of the external transmitter means of the first group. In other words, the external bus must be in the form of a loop. When this is done, the transmitter means originating the message can tell from the extra bits what happened to the message. If it was delivered, the registers of that transmitter means can be prepared to accept a new message; but if is was not delivered, the message remains in the registers of the transmitter means until it is successfully transmitted or until it is aborted by the associated processor. Then, too, if the TO address is not present, the extra bits are "0,0" as previously discussed, a flag is set and the message is automatically aborted.

In the description, words of action have been used, but it will be understood that means could be used in each phrase.

BRIEF DESCRIPTION OF THE DRAWINGS

FIGS. 2A, 2B and 2C constitute a block diagram of a bus system incorporating this invention;

Figure 3A:
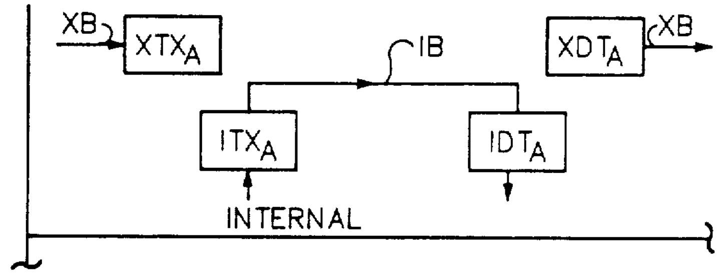
FIG. 3A is a simplified block diagram illustrating a communication type wherein a message is sent from a transmitter means in a group to a data transfer means in the same group.
Figure 3B:
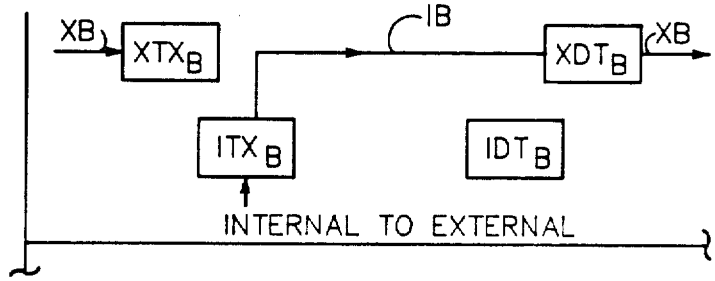
Figure 3C:
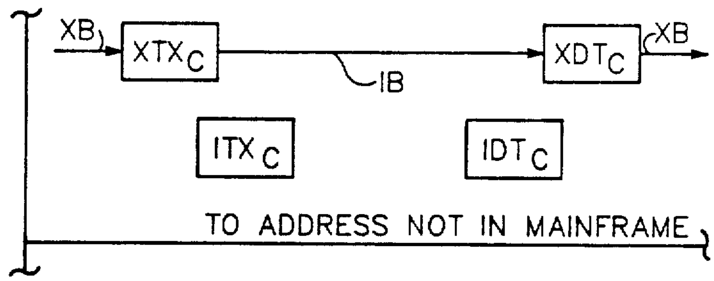
Figure 3D:
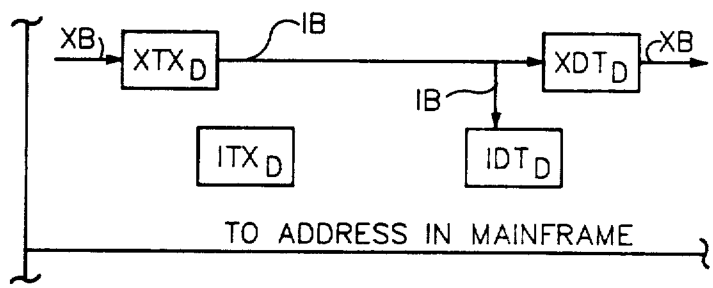
Figure 3E:
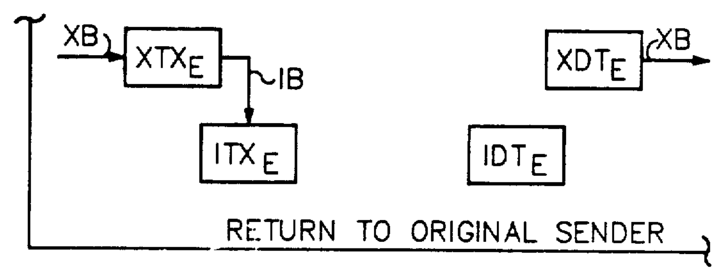
Figure 4A:
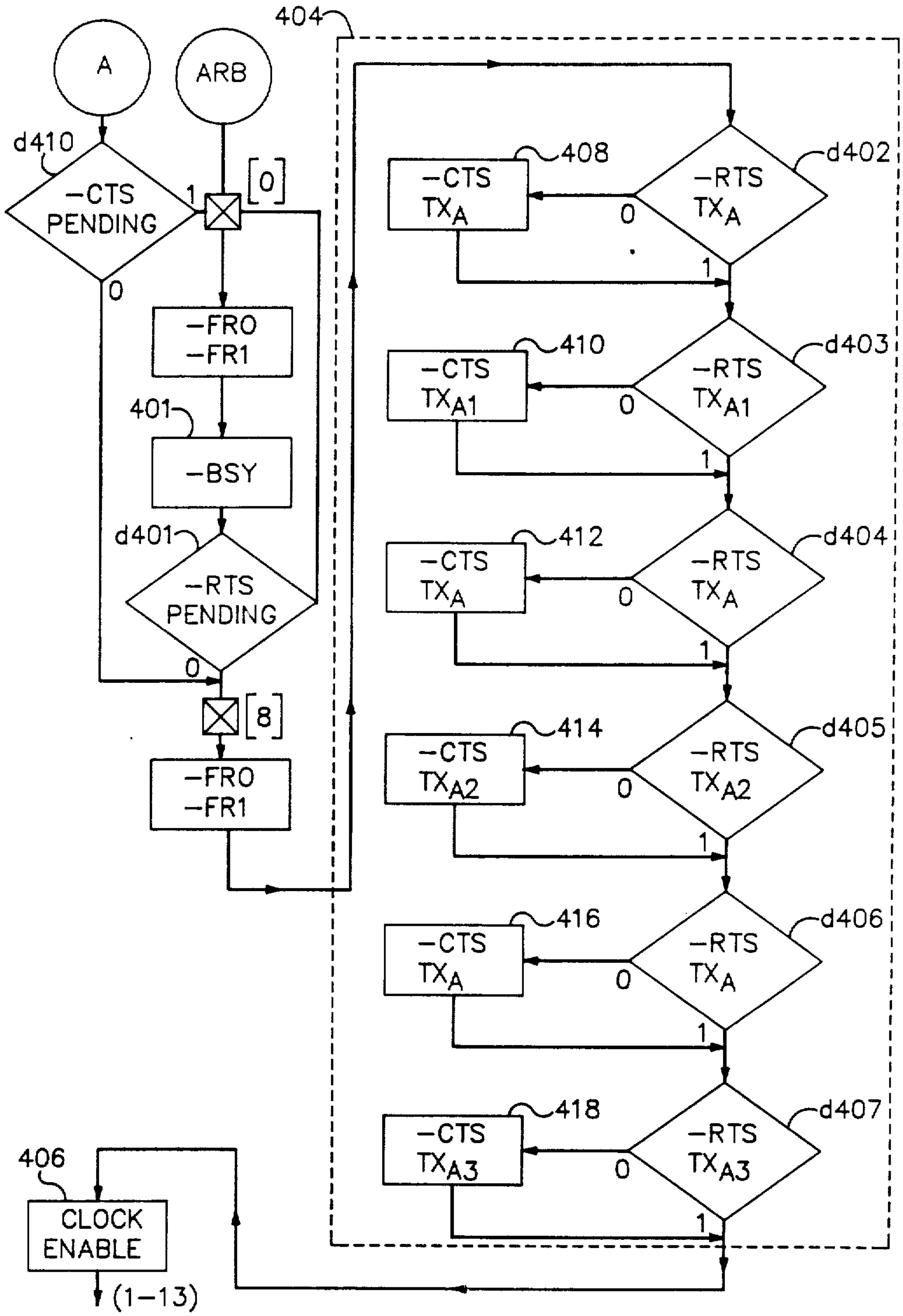
Figure 4B:
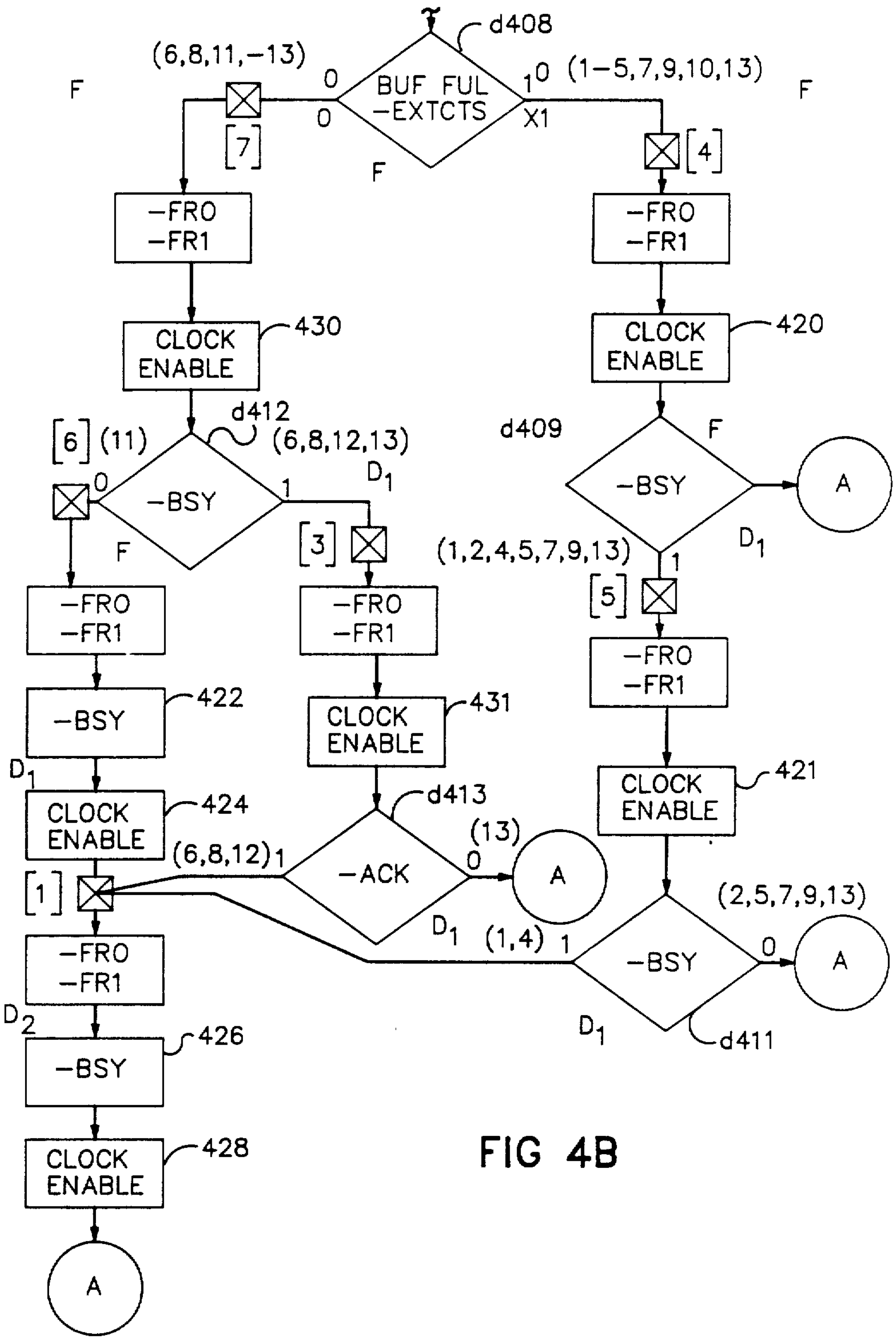
Figure 5:
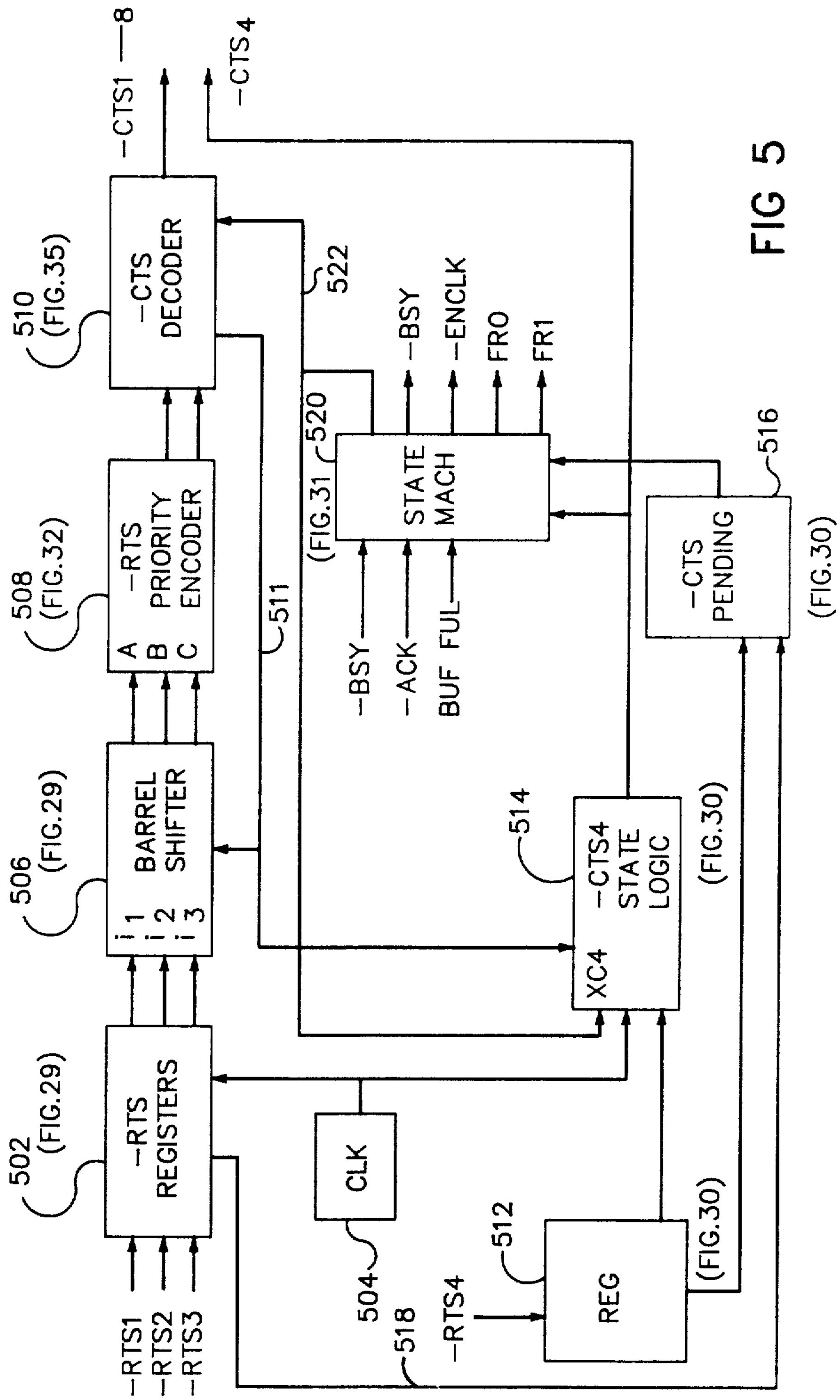
Figure 6A:
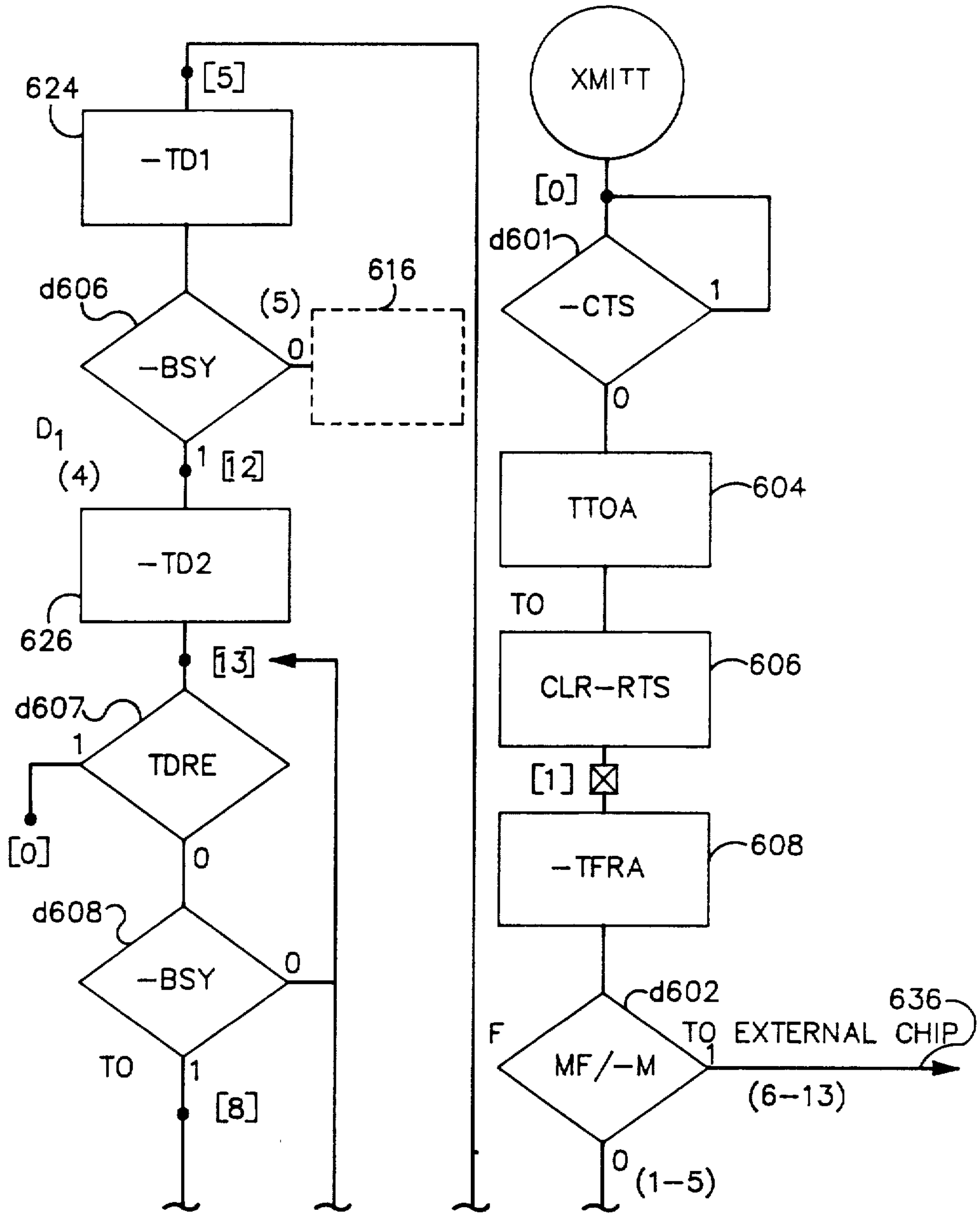
Figure 6B:
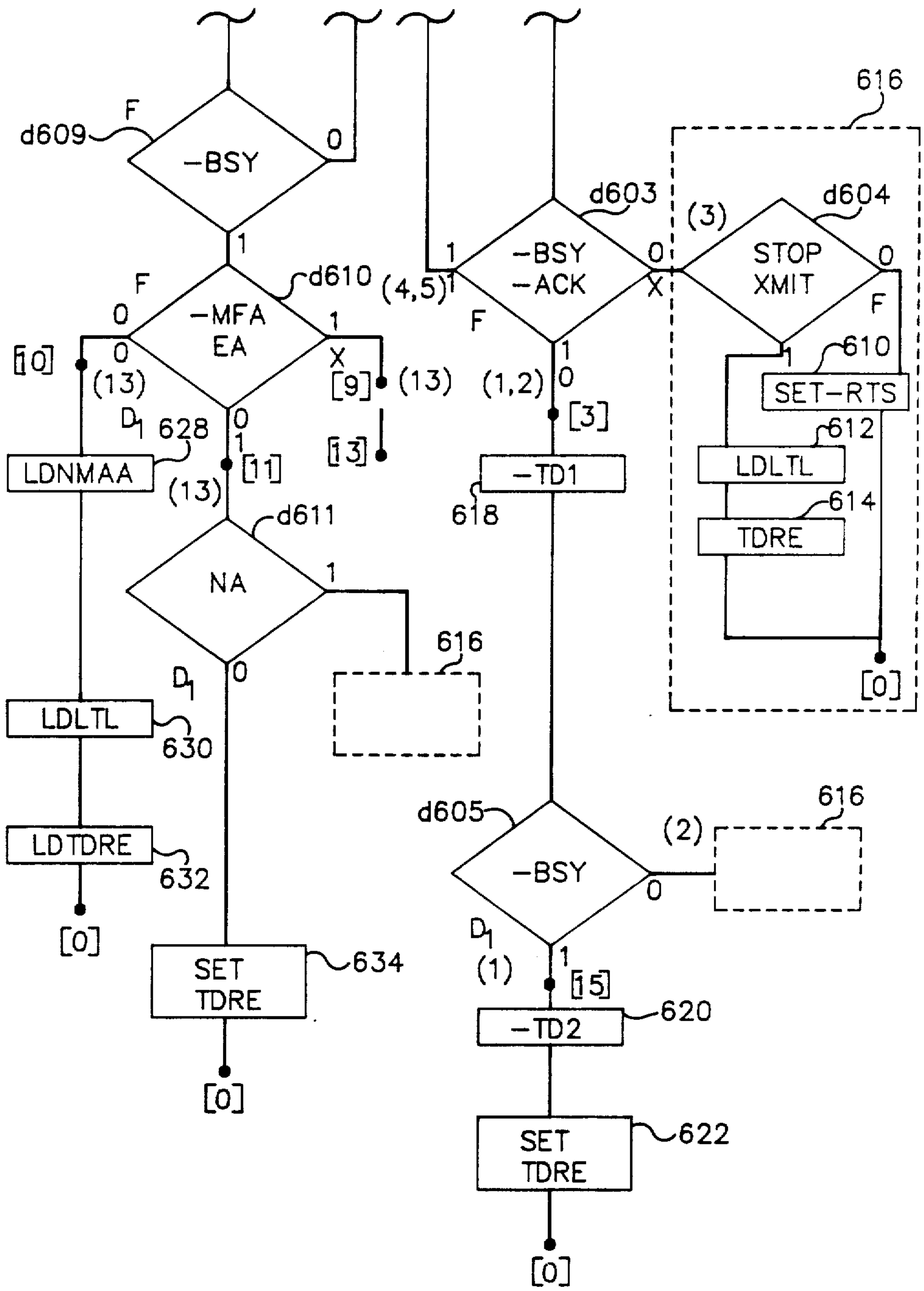
Figure 6C:
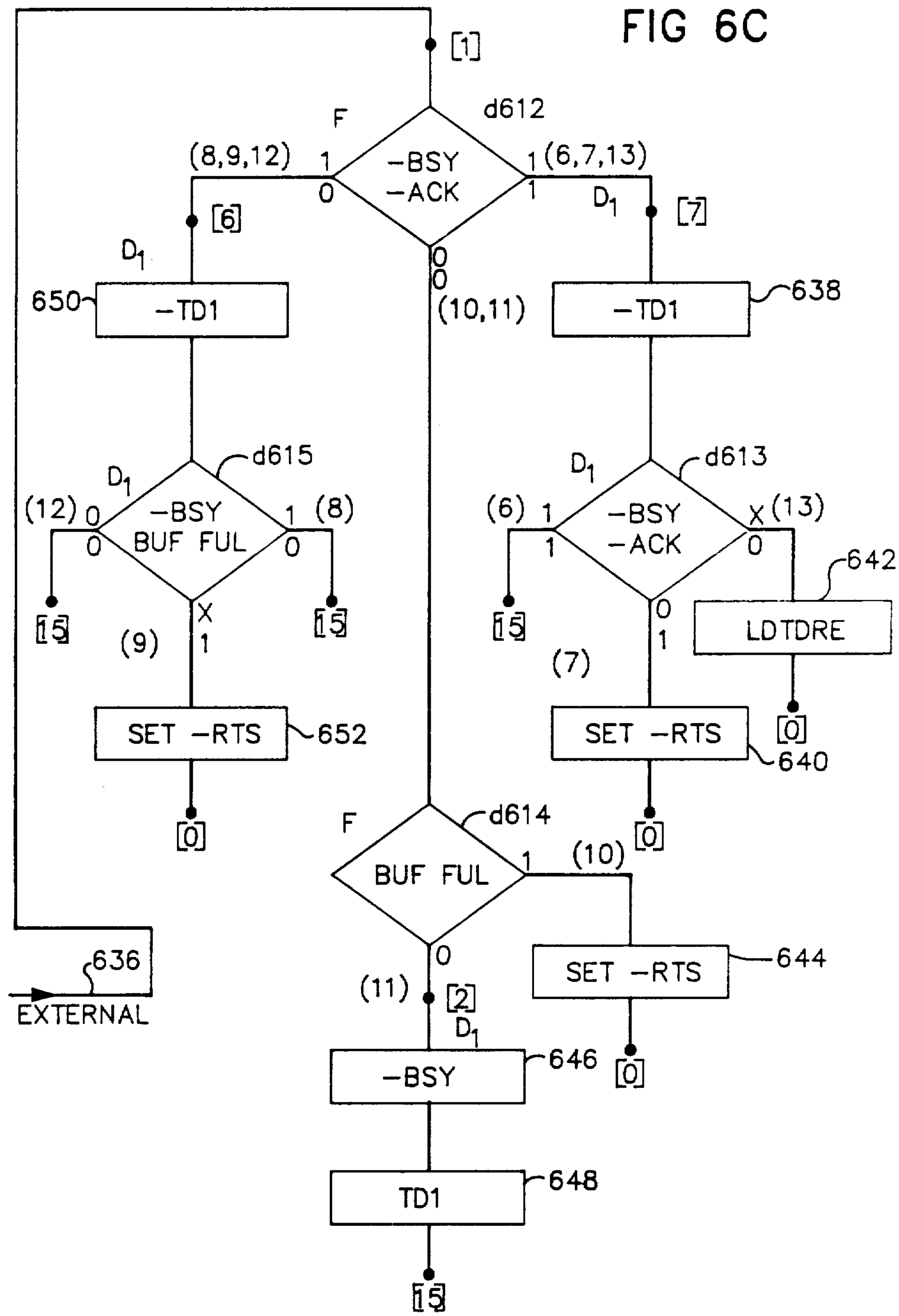
Figure 7A:
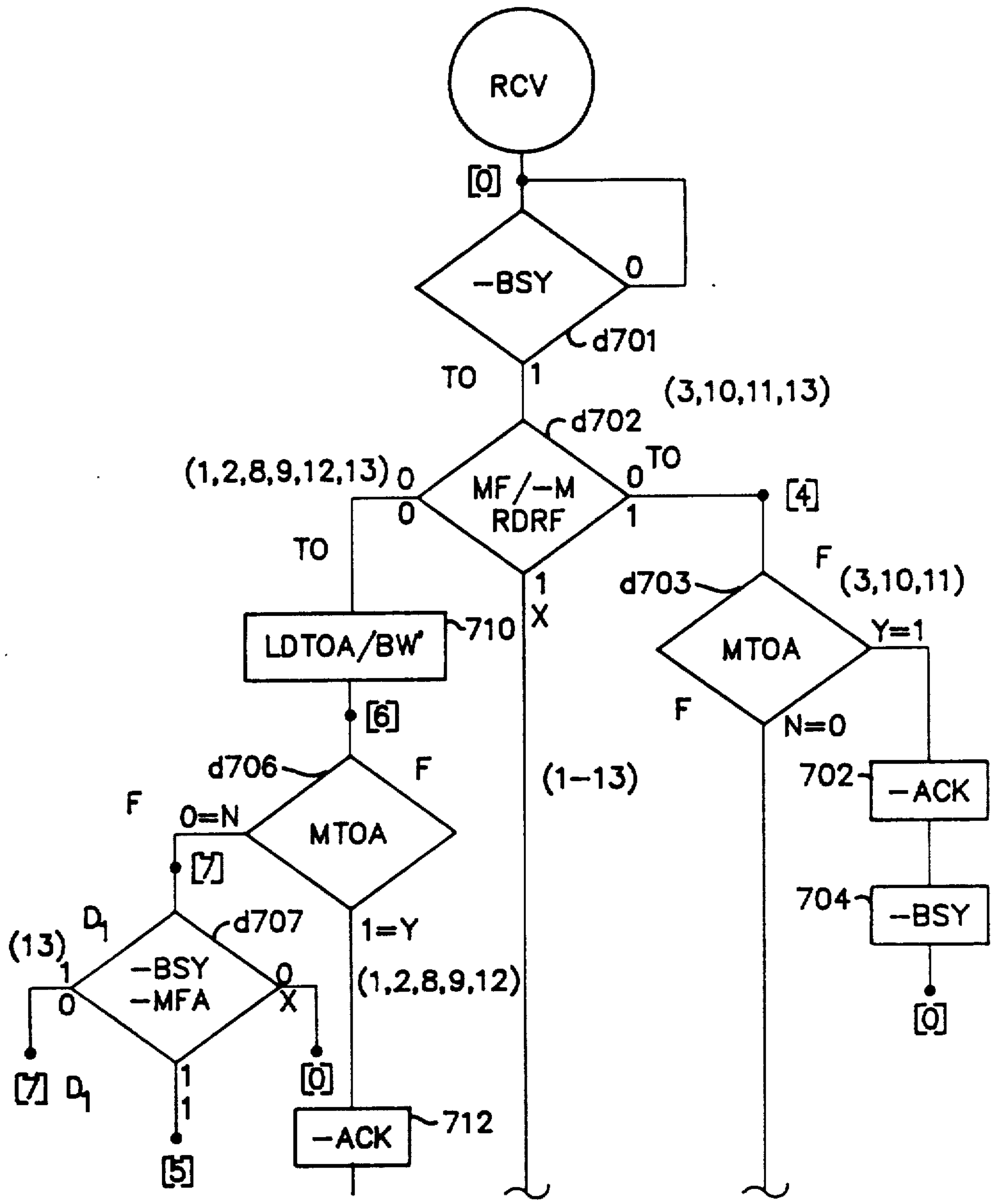
Figure 7B:
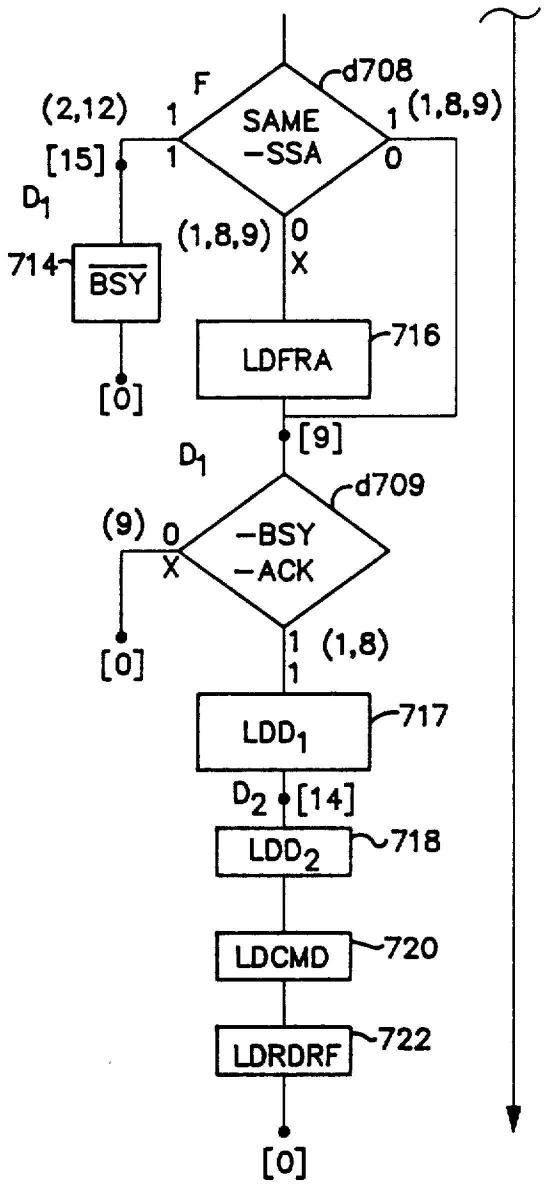
Figure 7C:
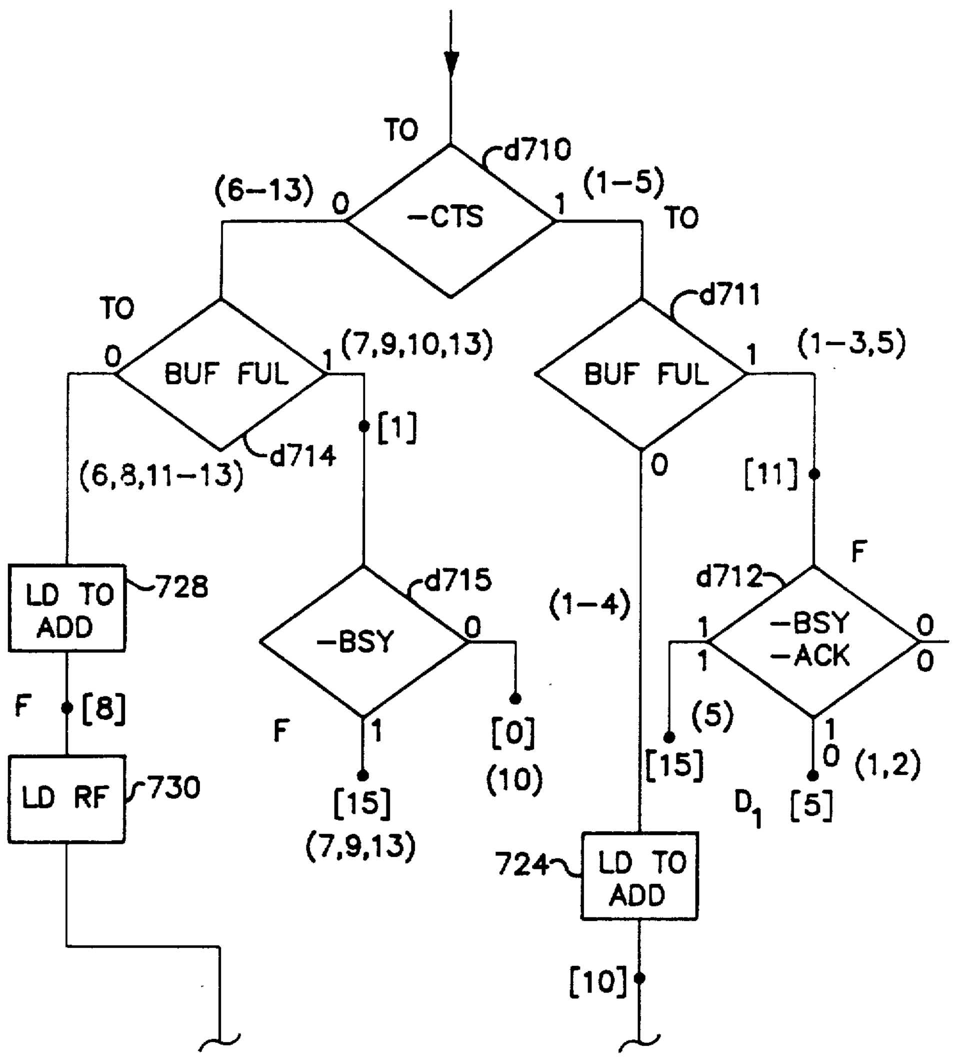
Figure 7D:
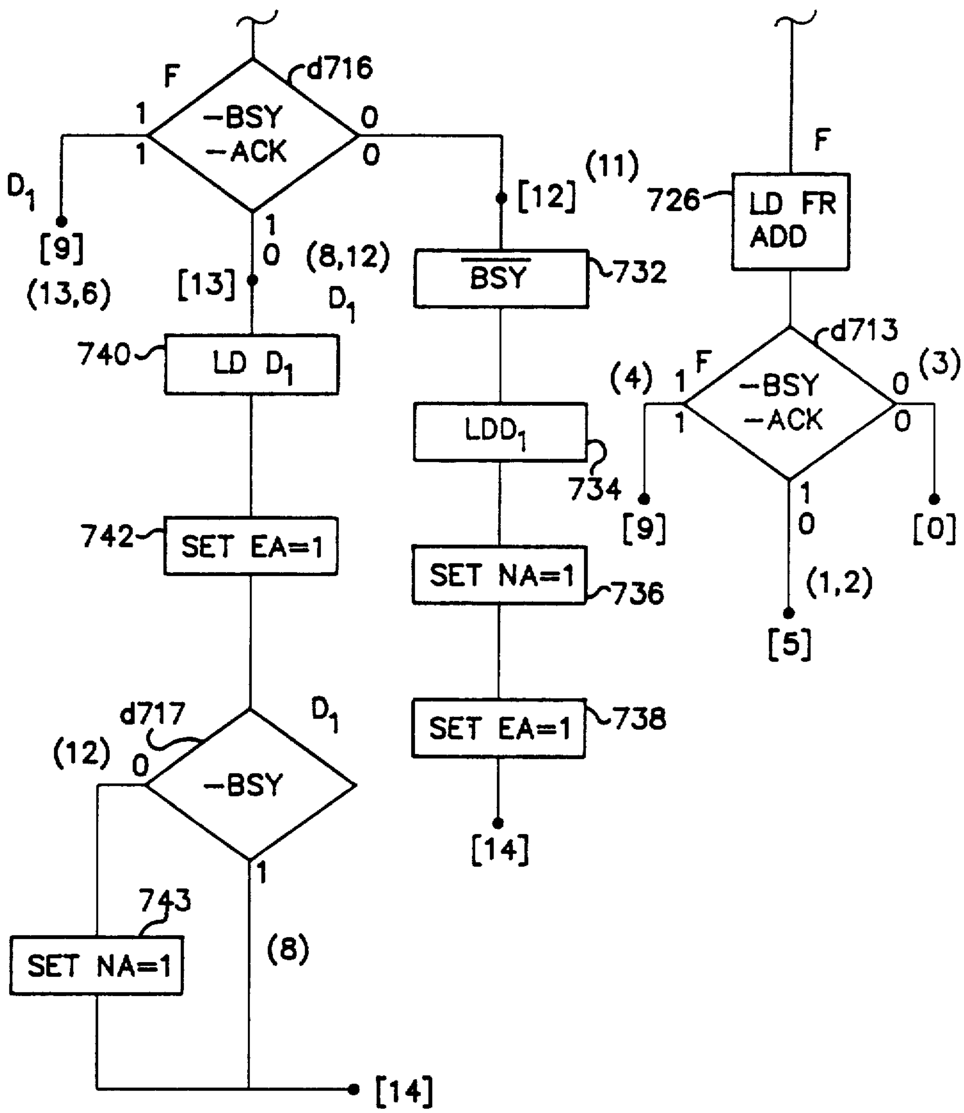
Figure 8:
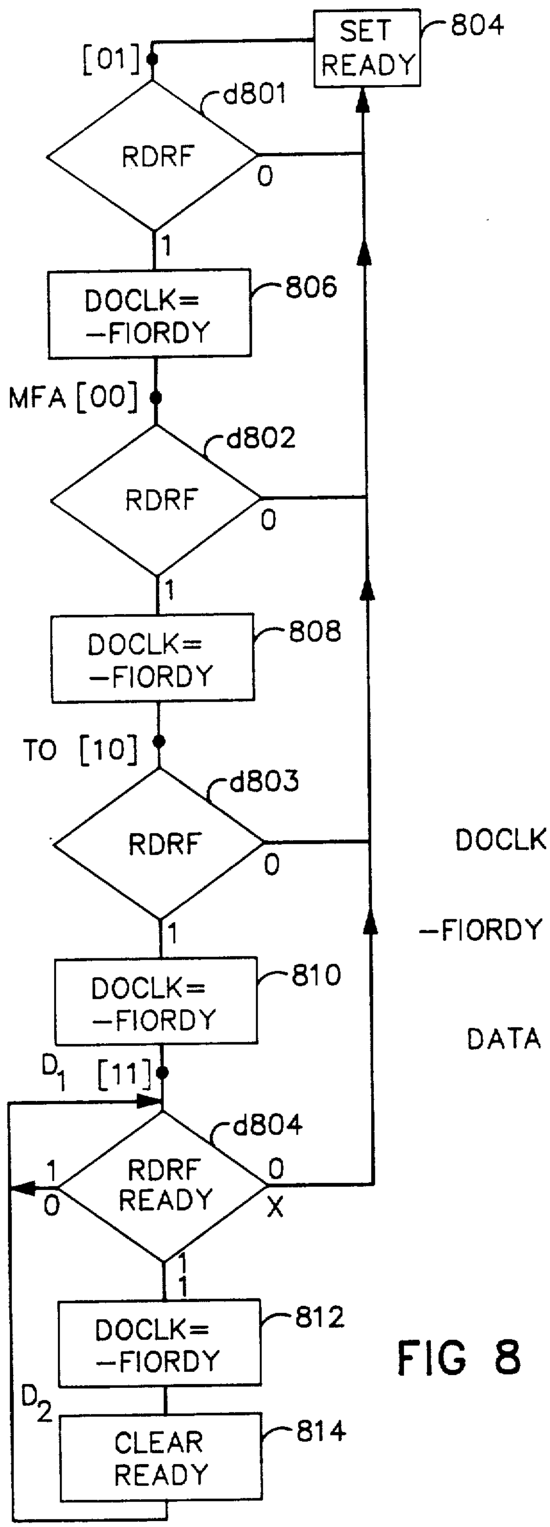
Figure 8A:
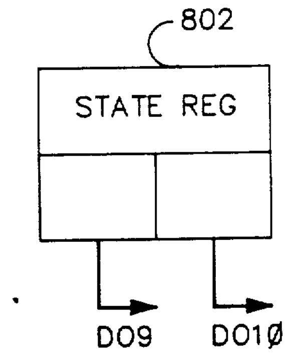
Figure 8B:
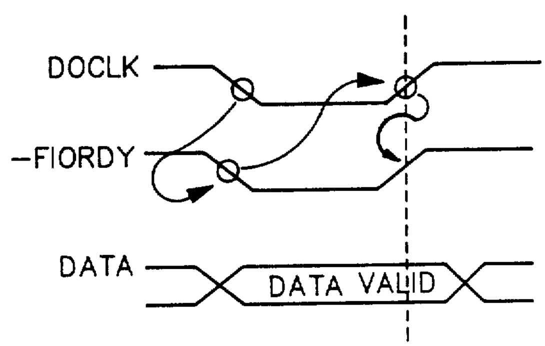
Figure 9A:
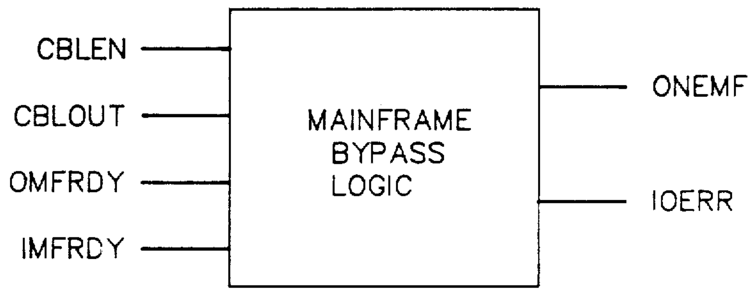
Figure 9A:
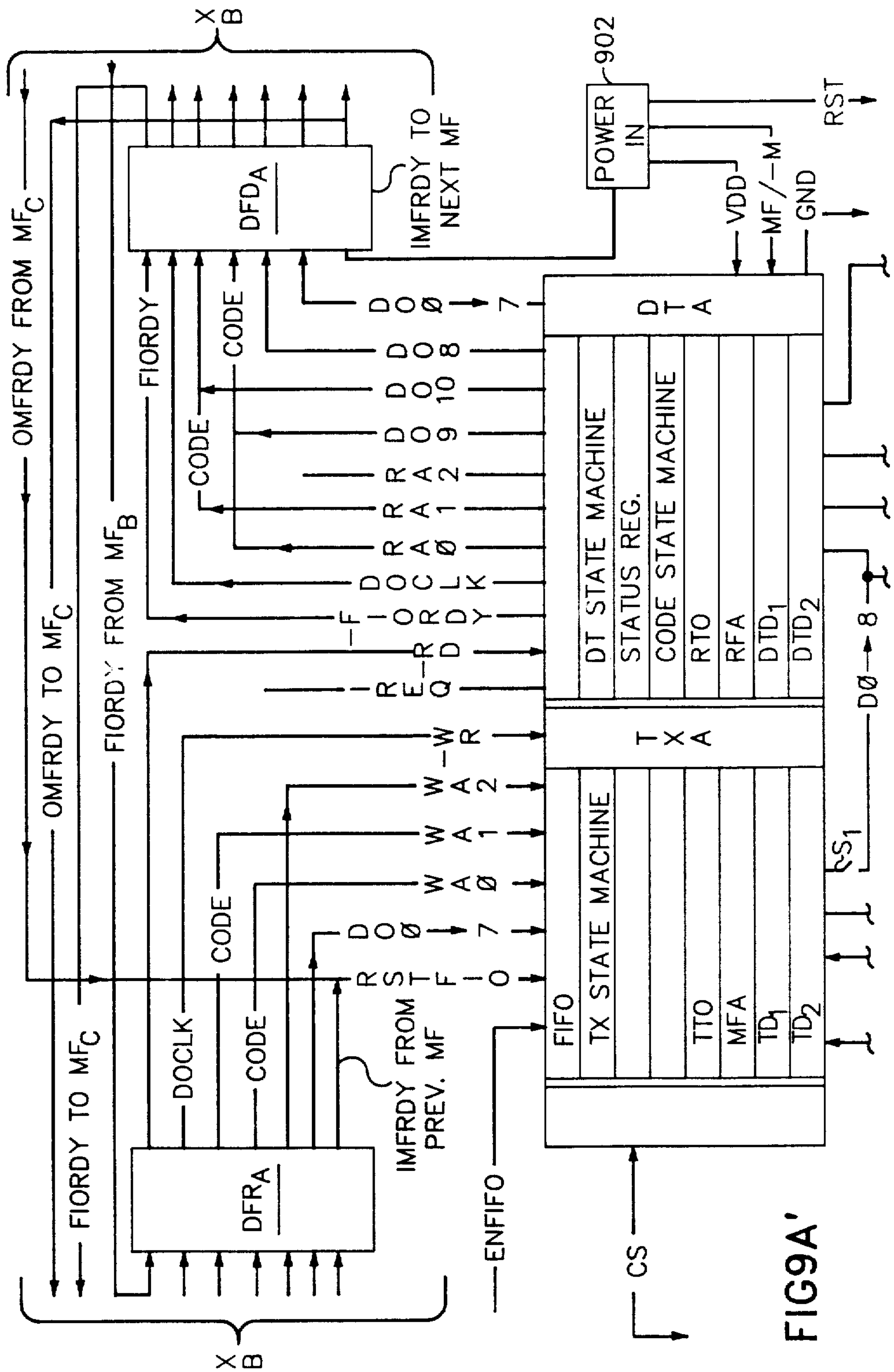
Figure 11A:
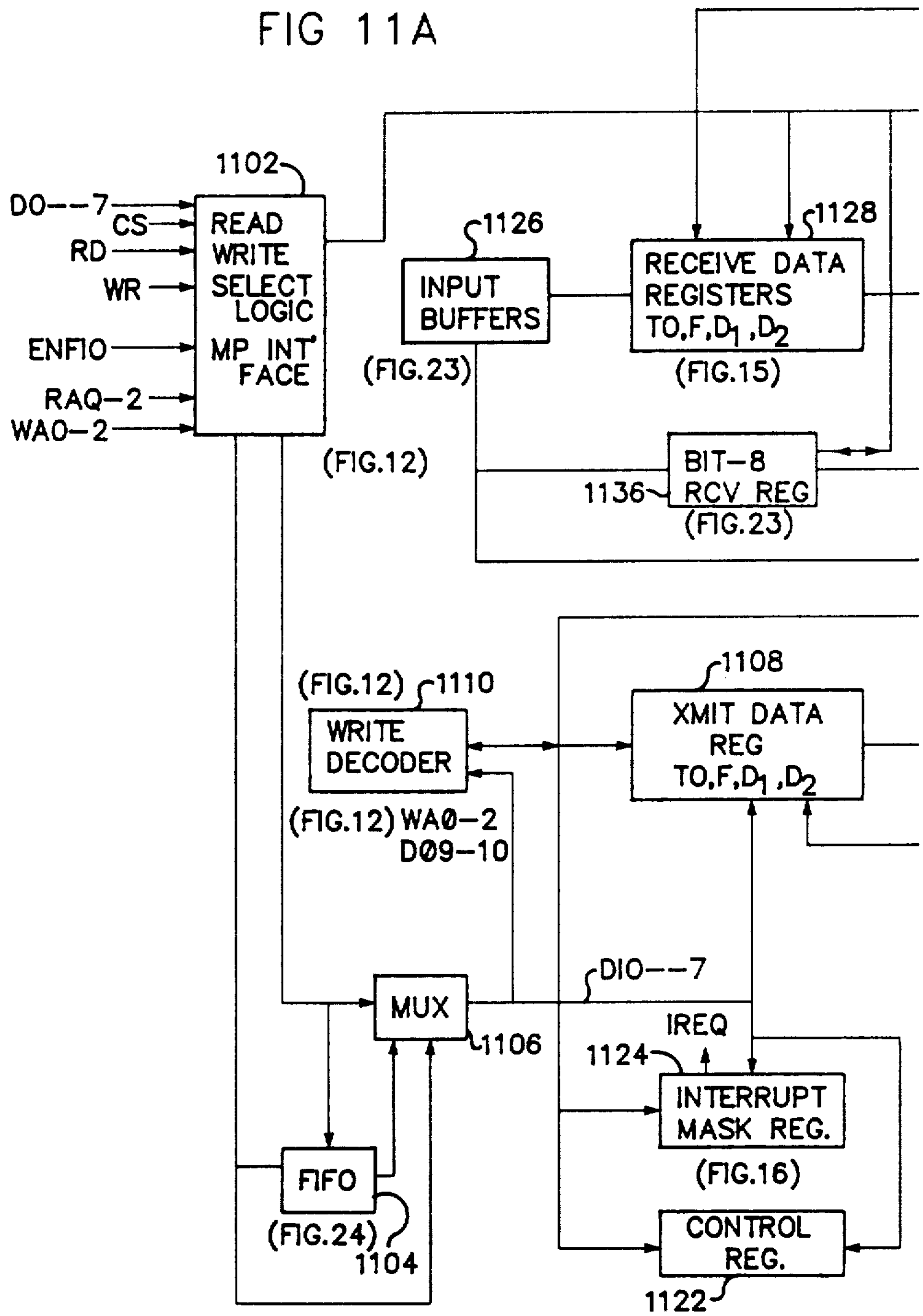
Figure 11B:
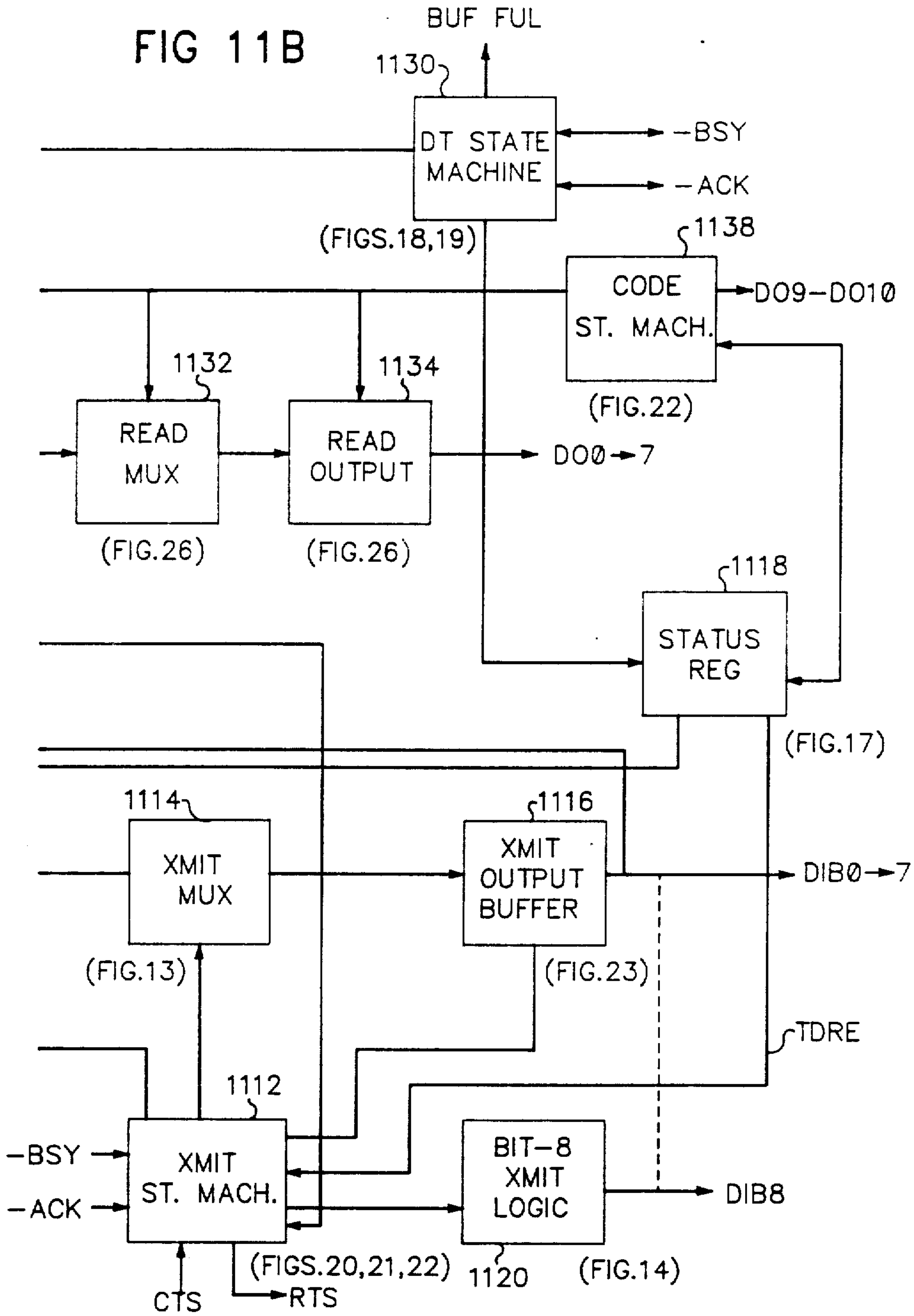
Figure 12A:
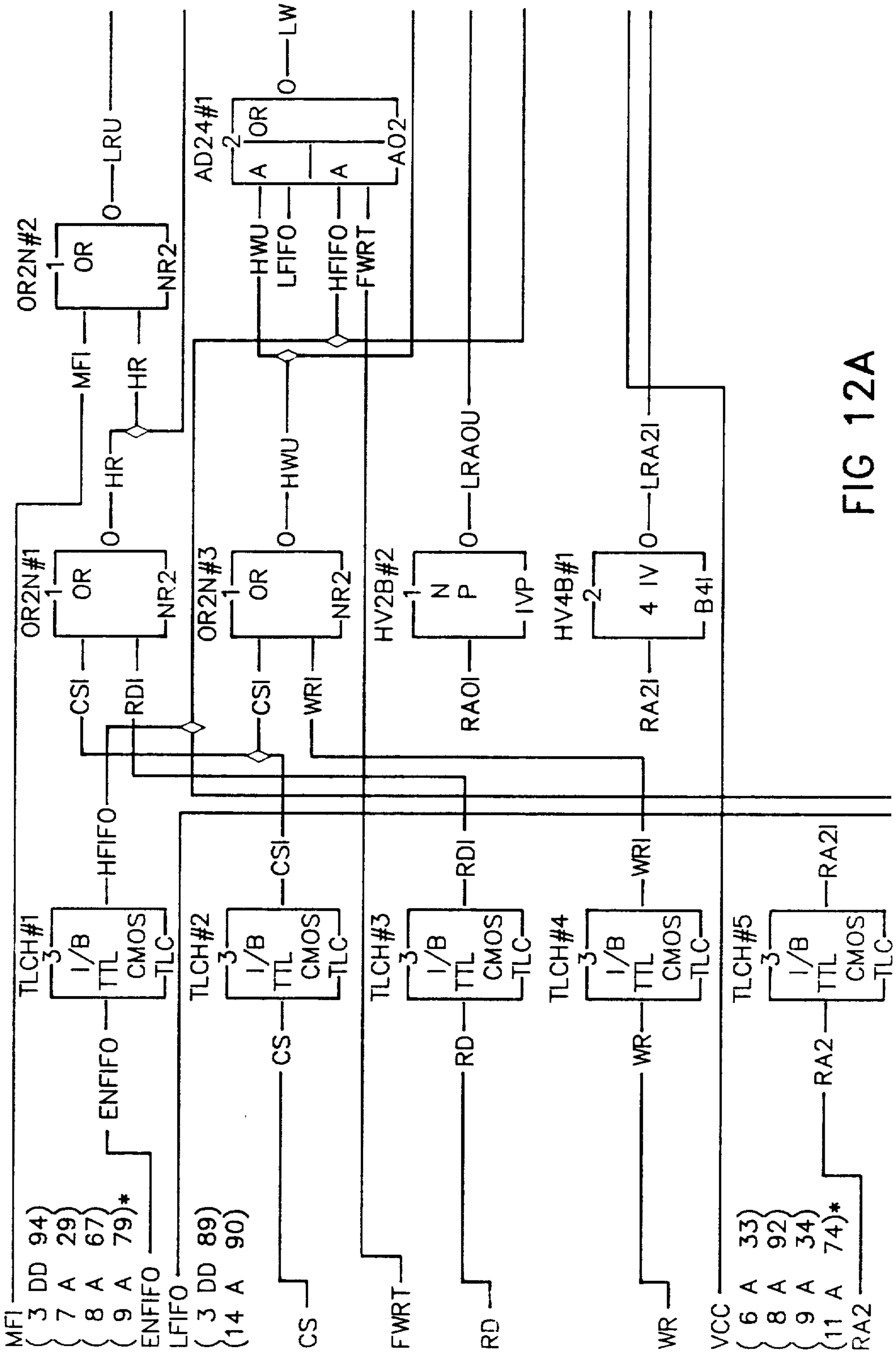
Figure 12B:
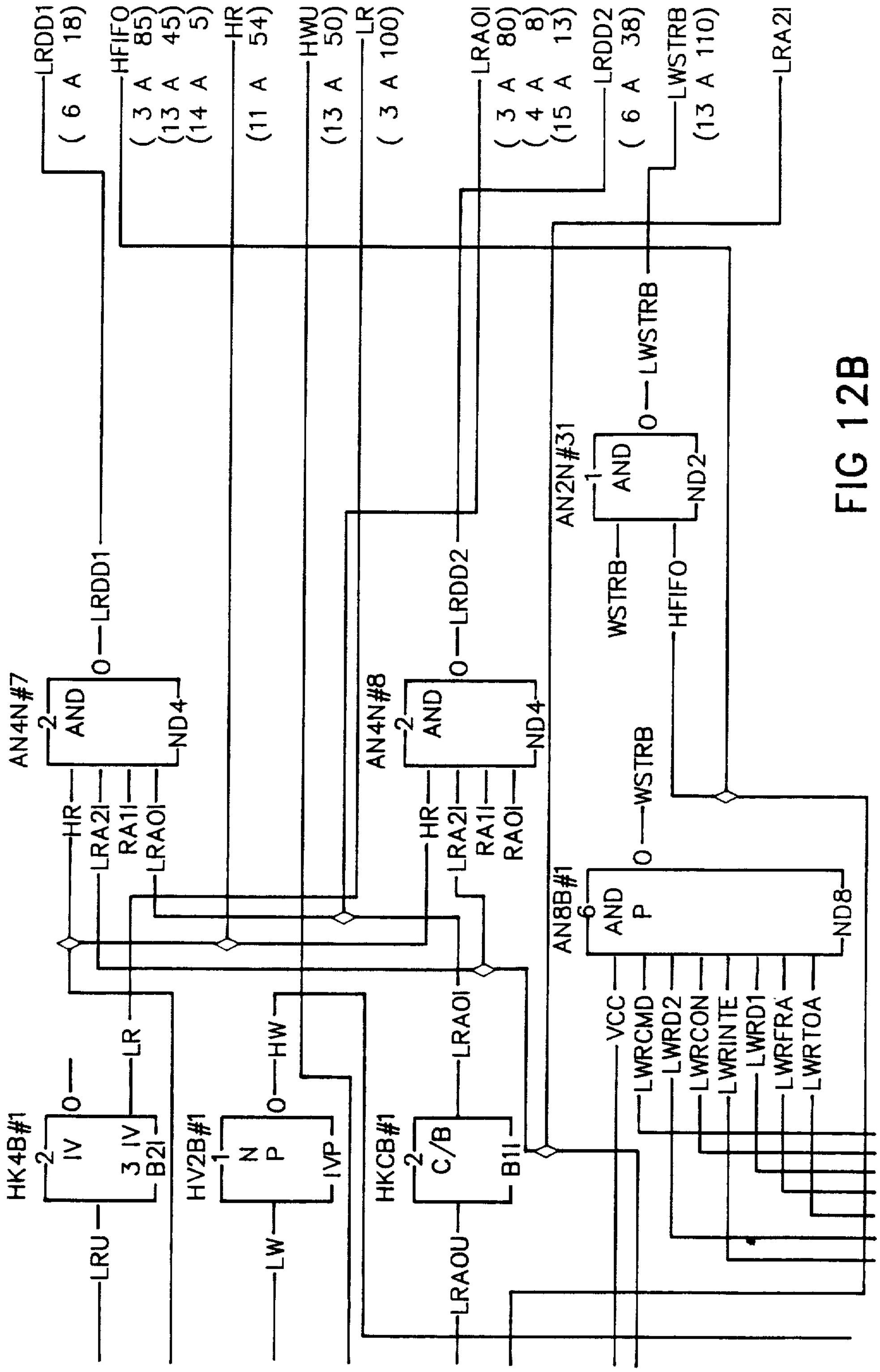
Figure 12C:
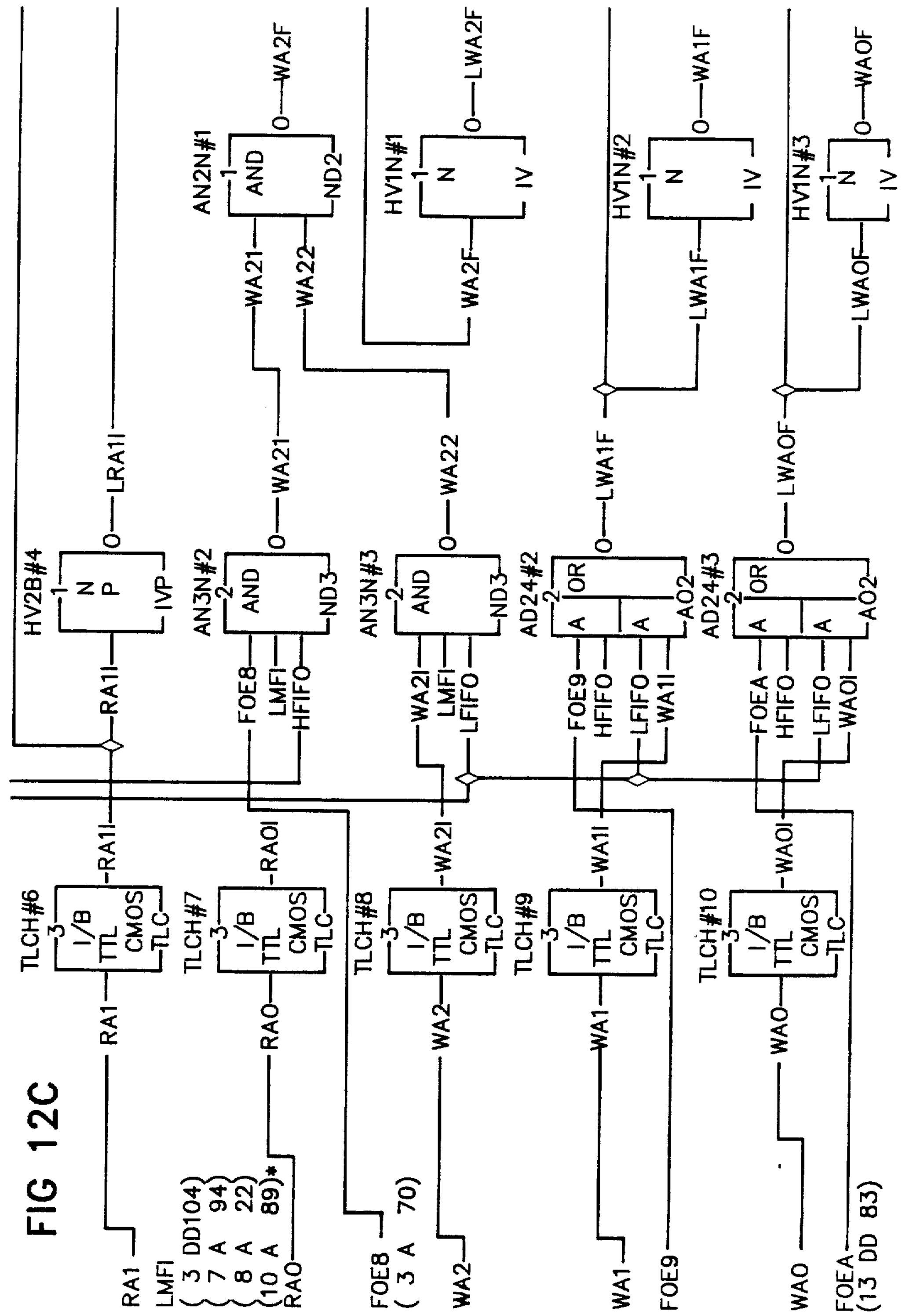
Figure 13A:
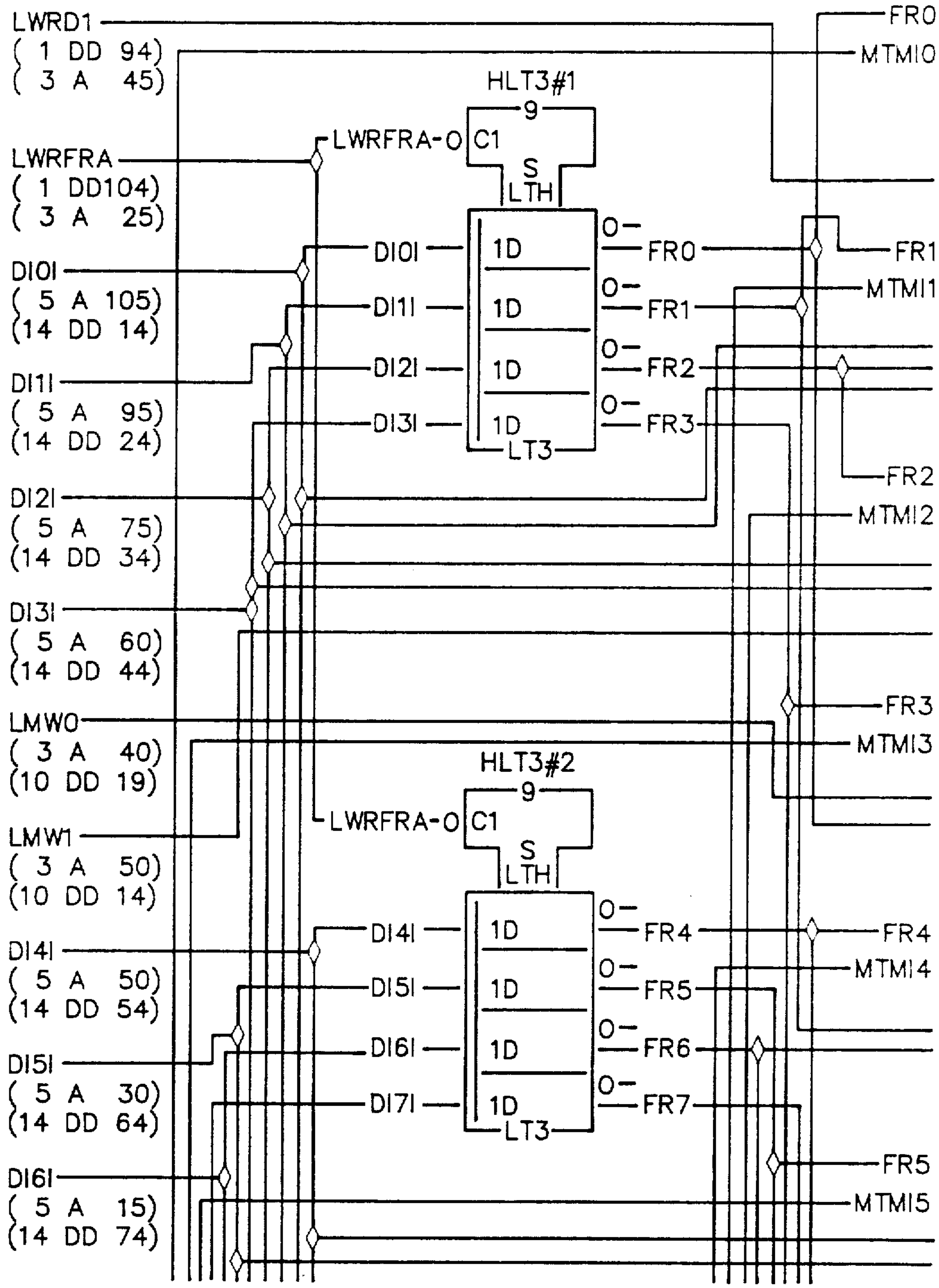
Figure 13B:
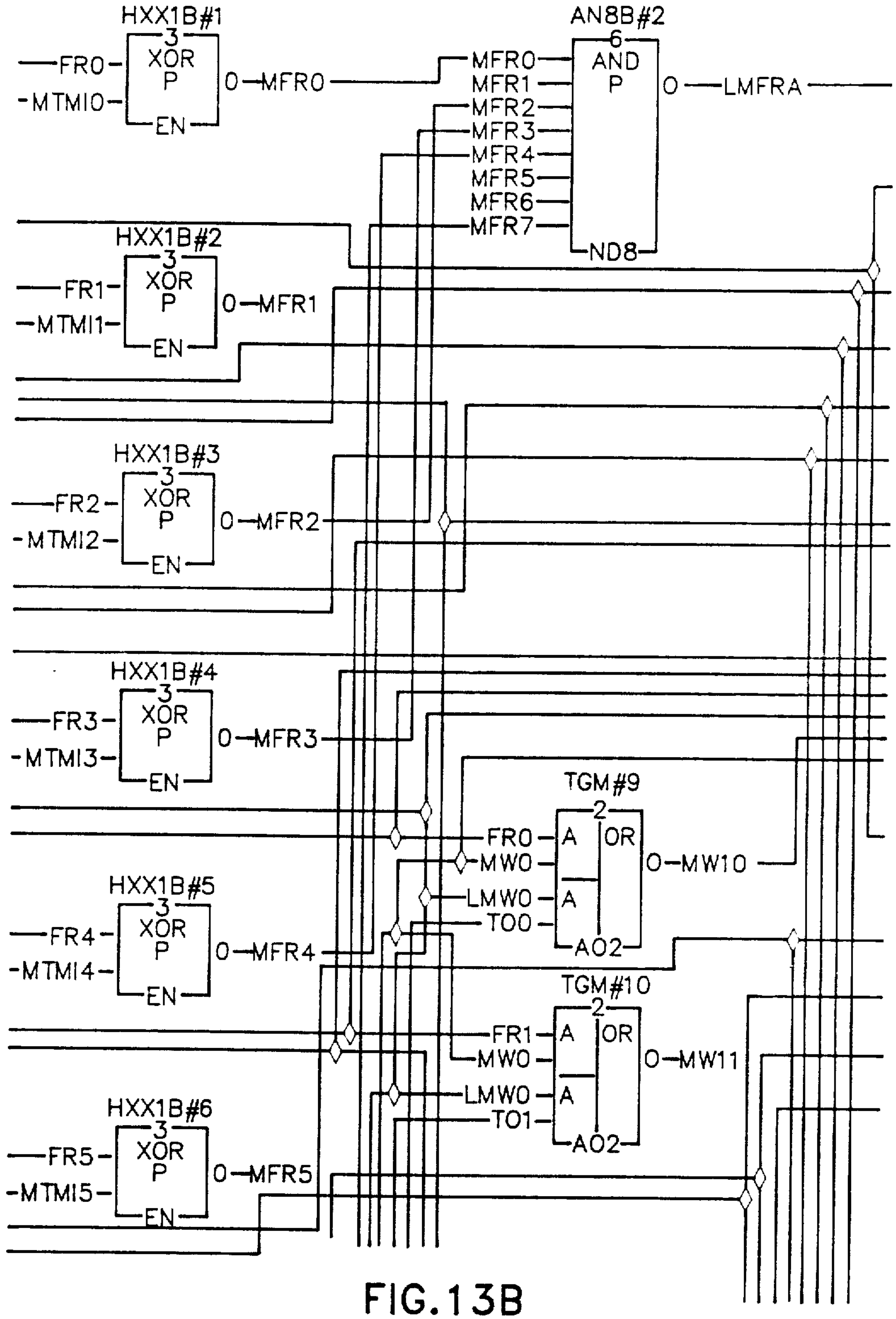
Figure 13C:
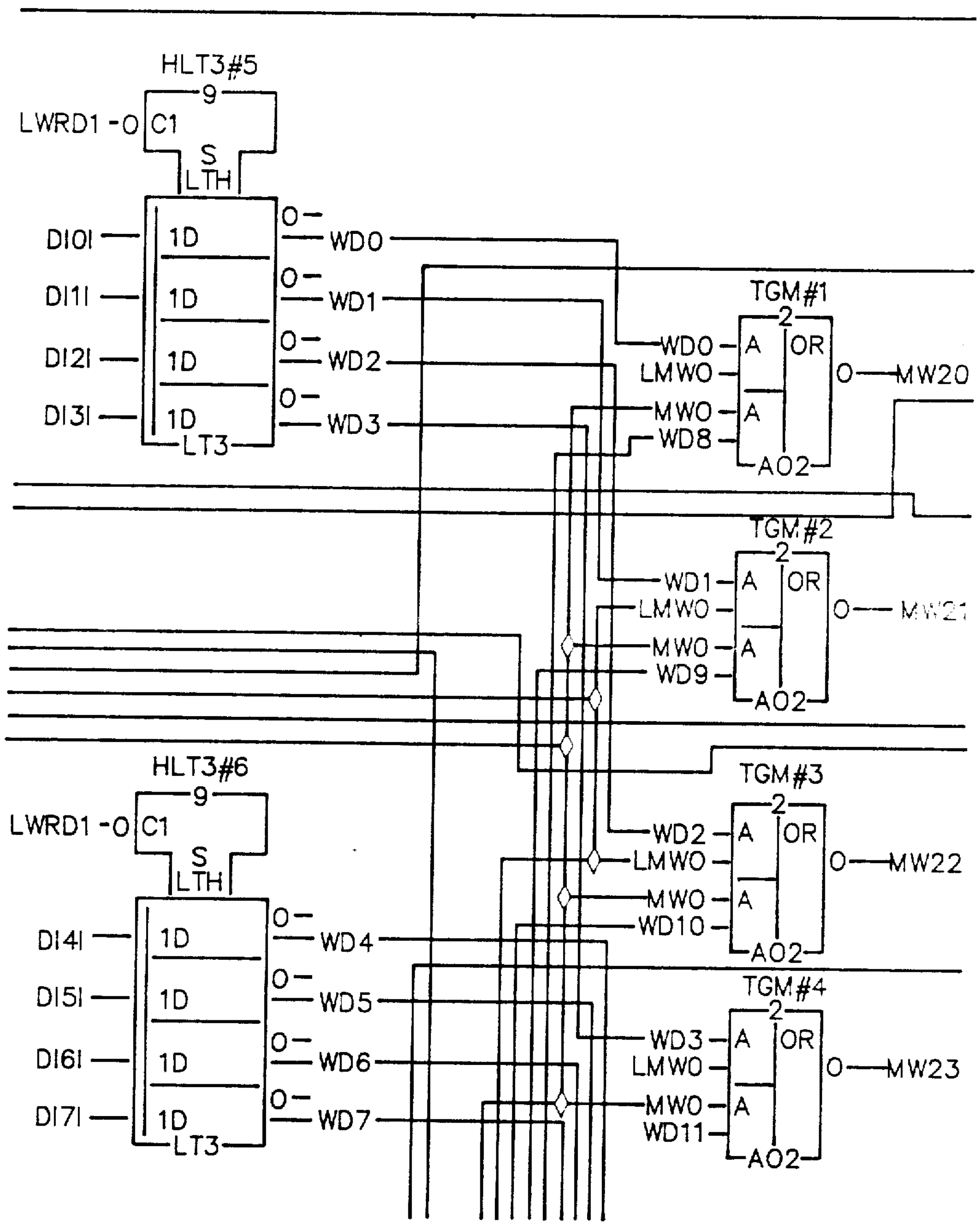
Figure 13D:
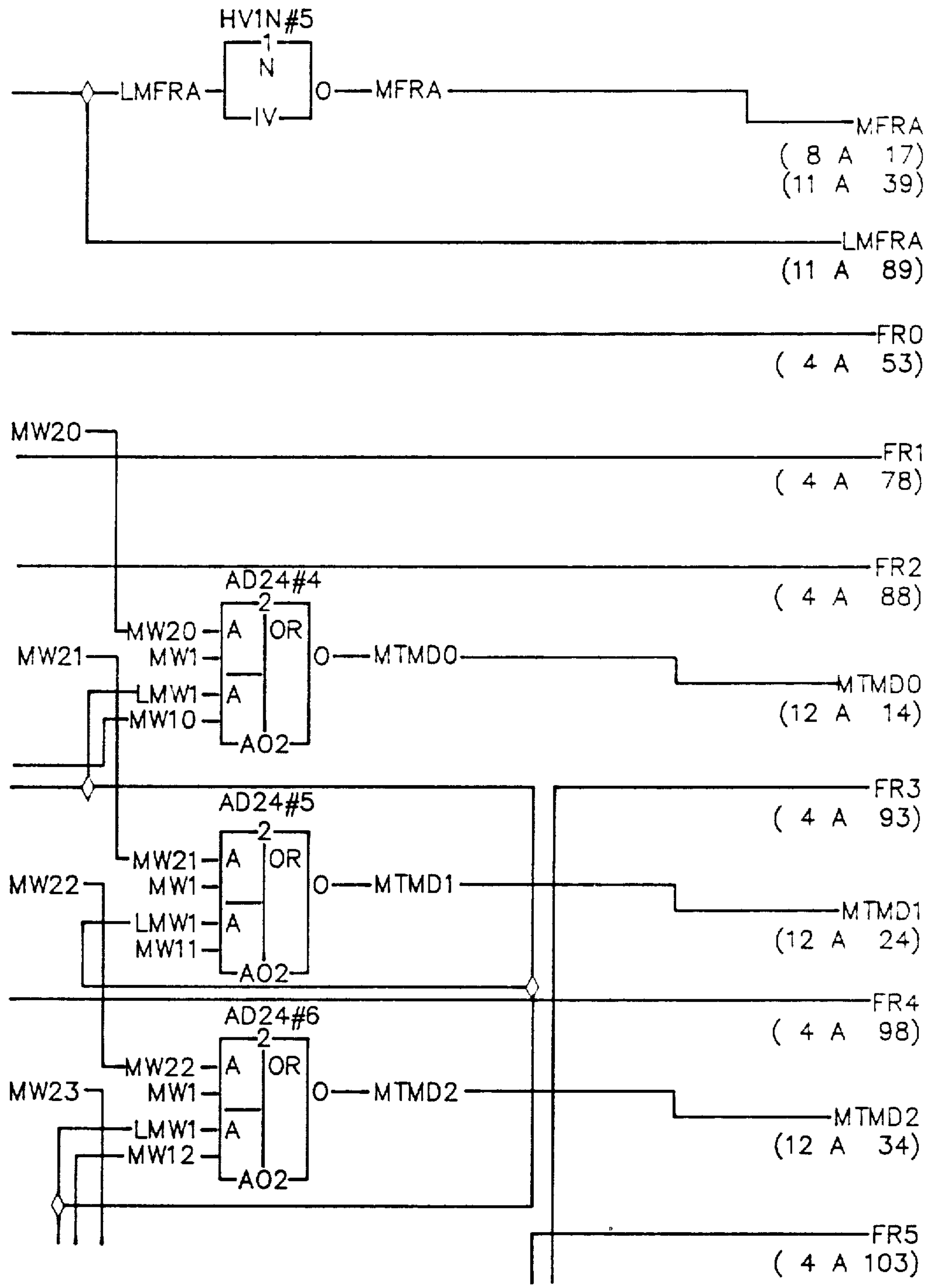
Figure 13E:
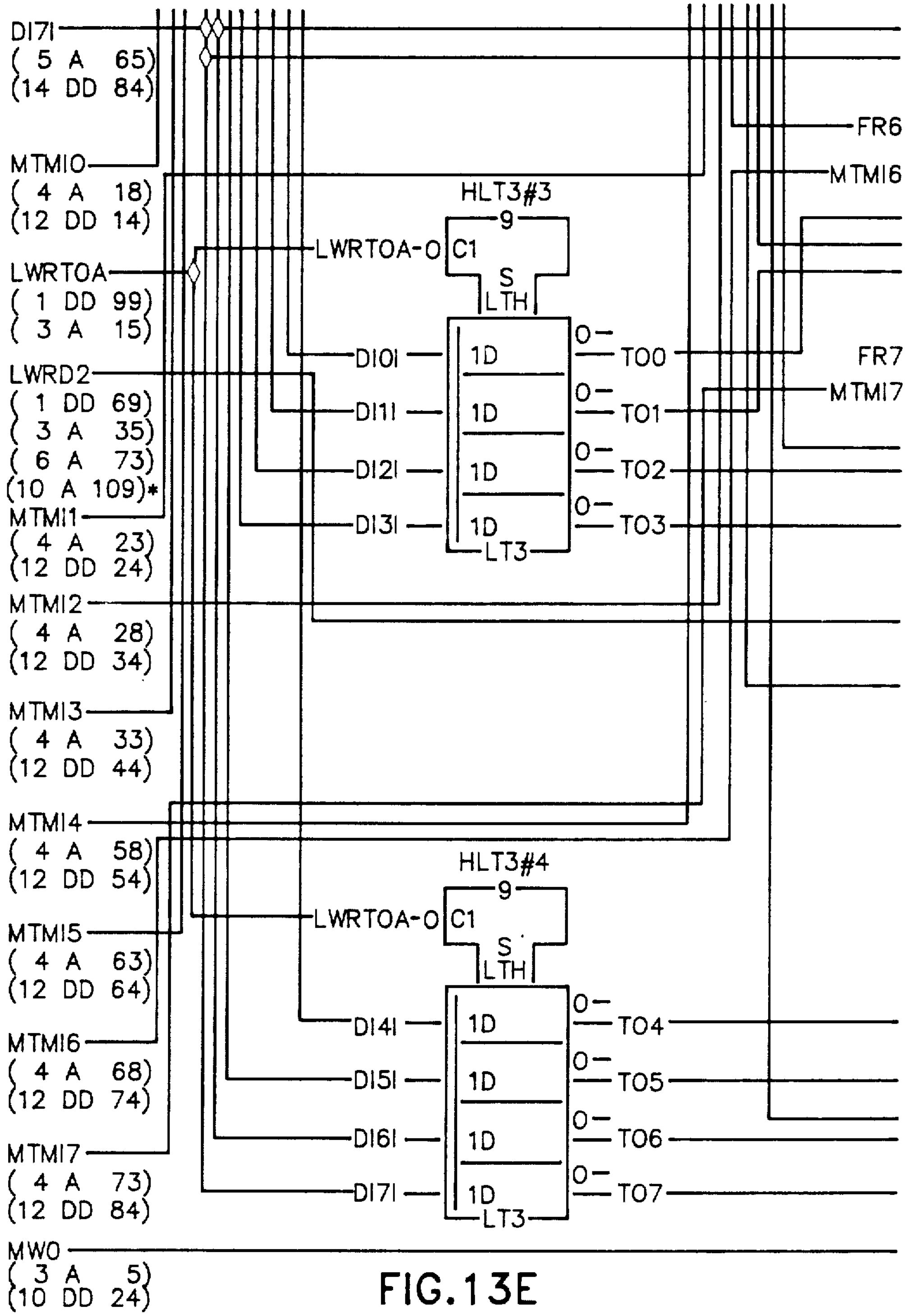
Figure 13F:
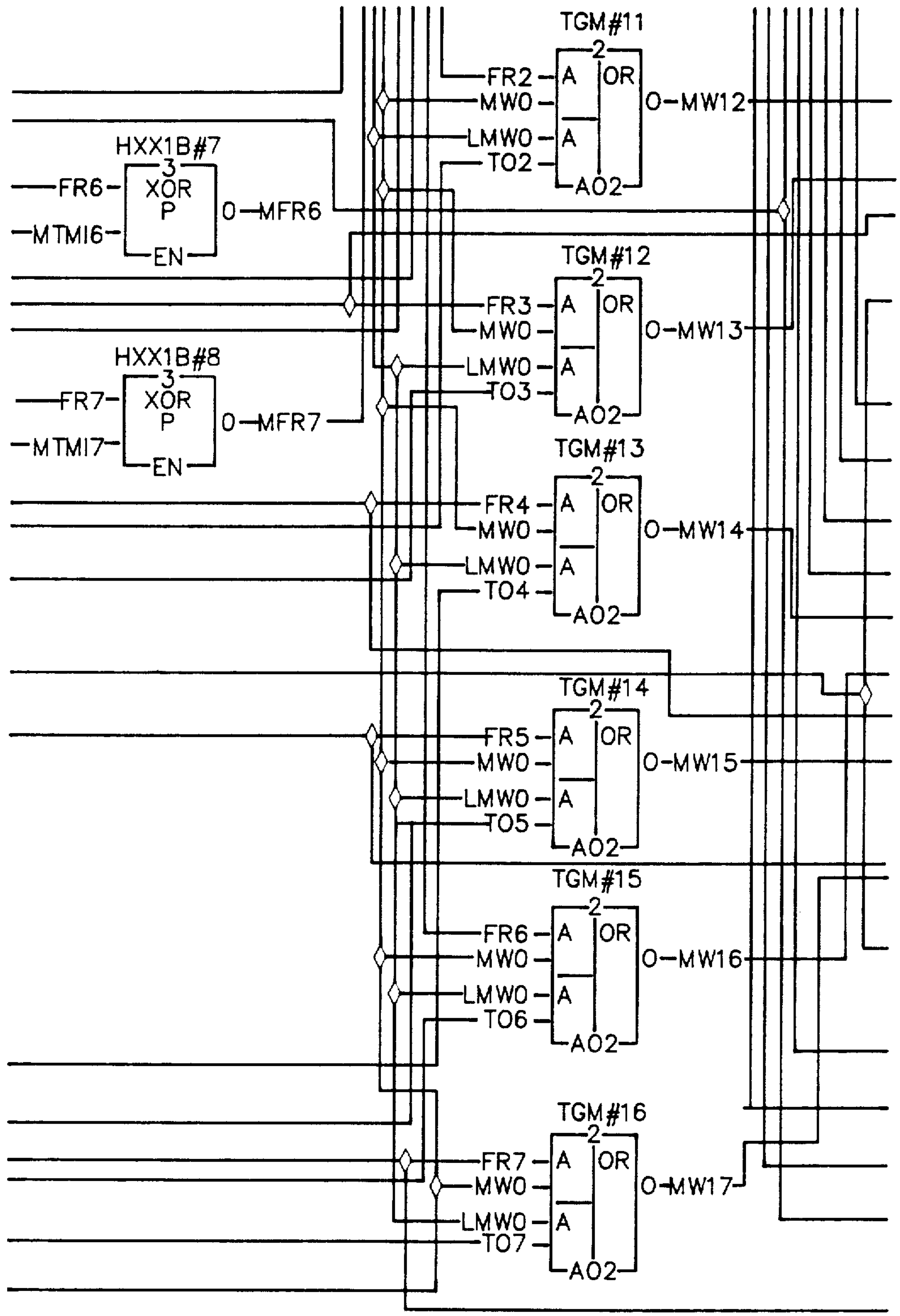
Figure 13G:
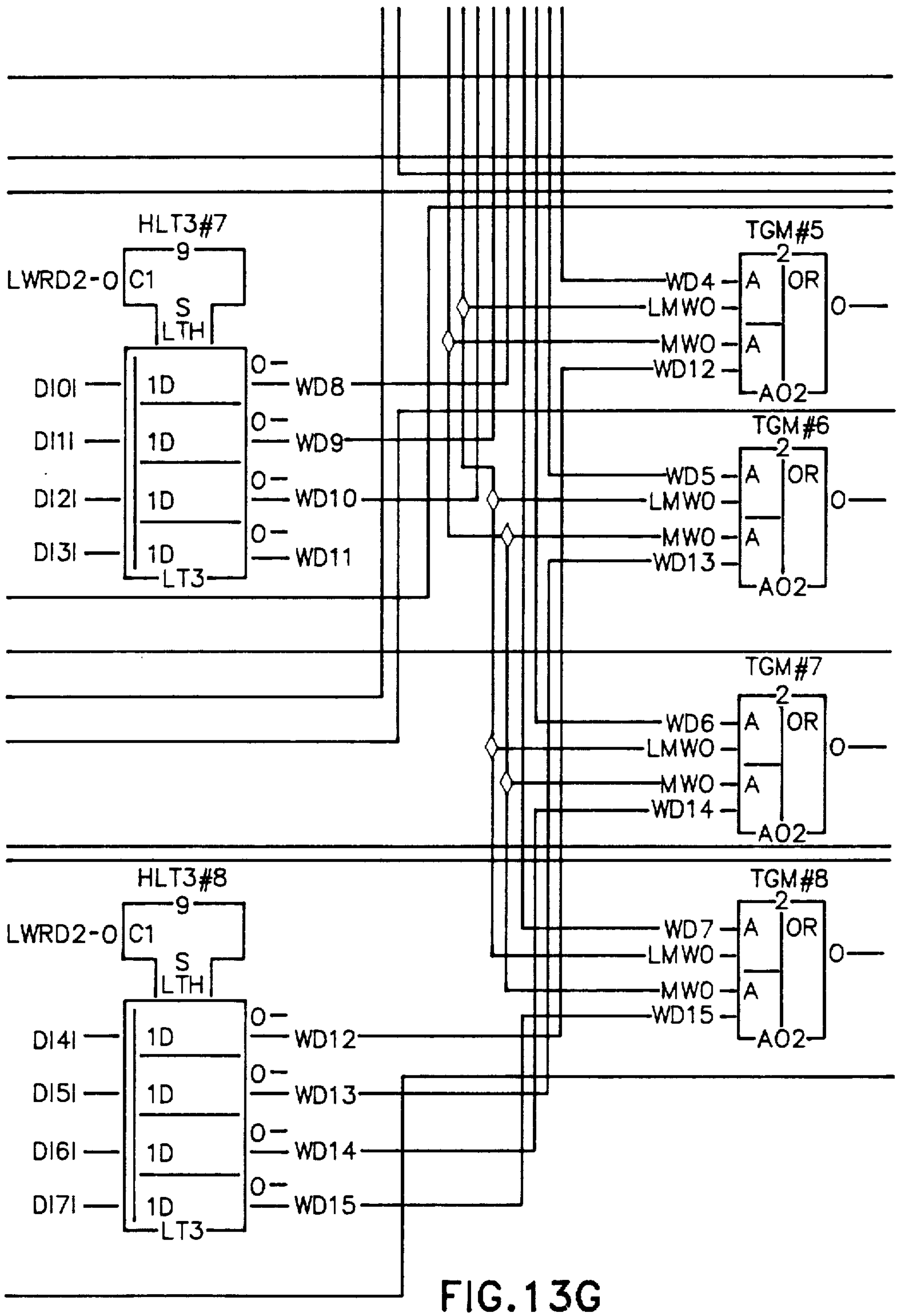
Figure 13H:
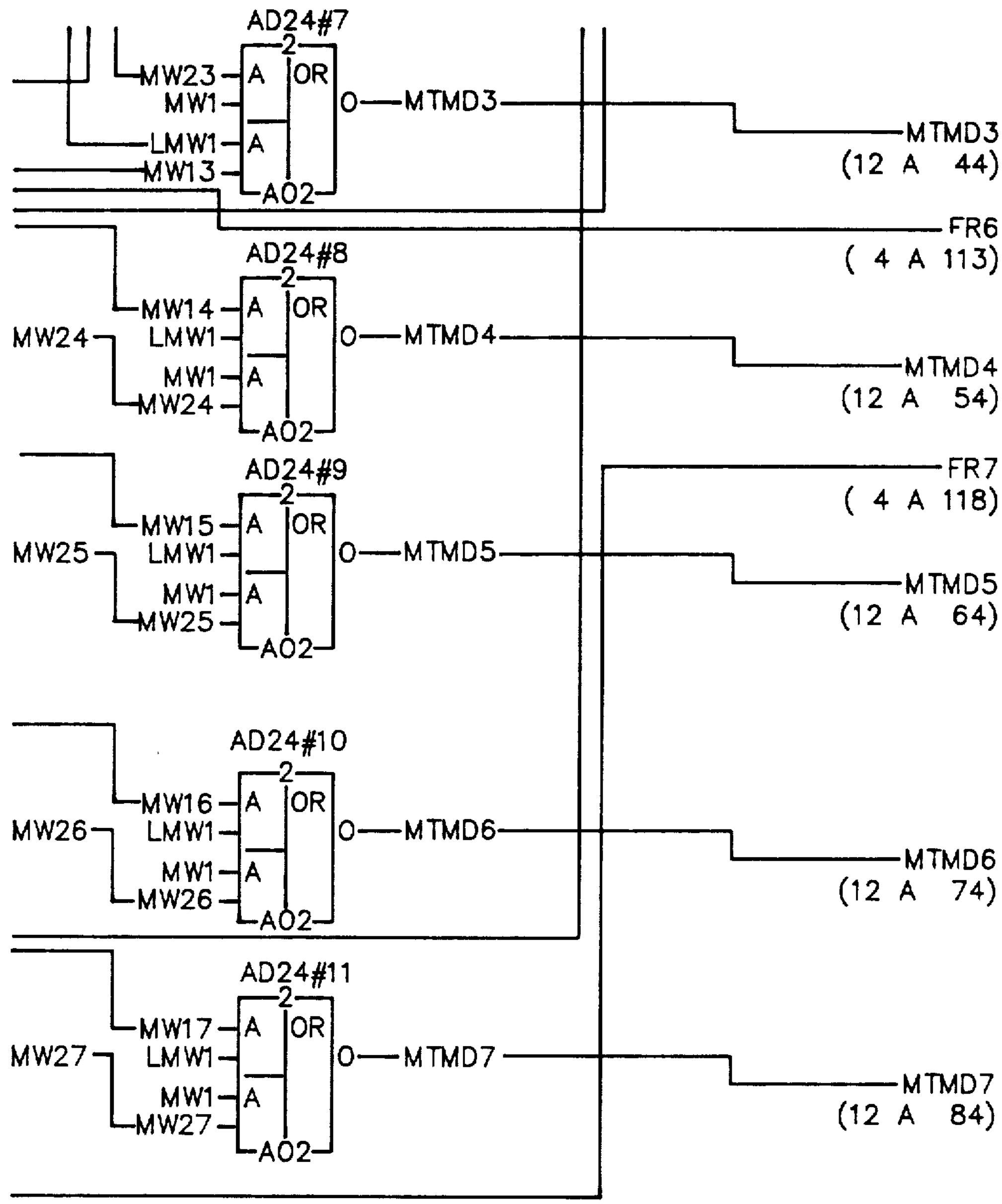
Figure 14A:
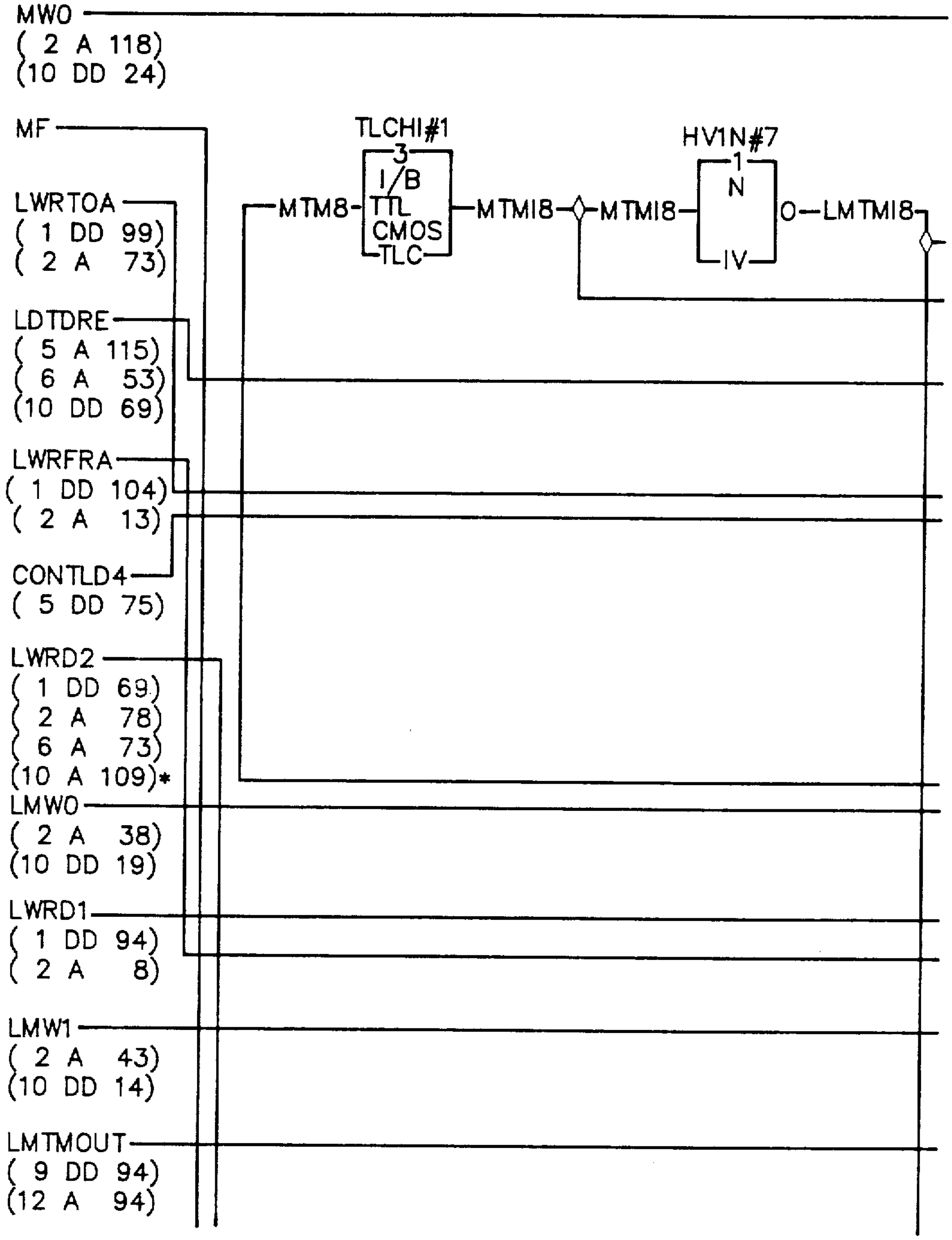
Figure 14C:
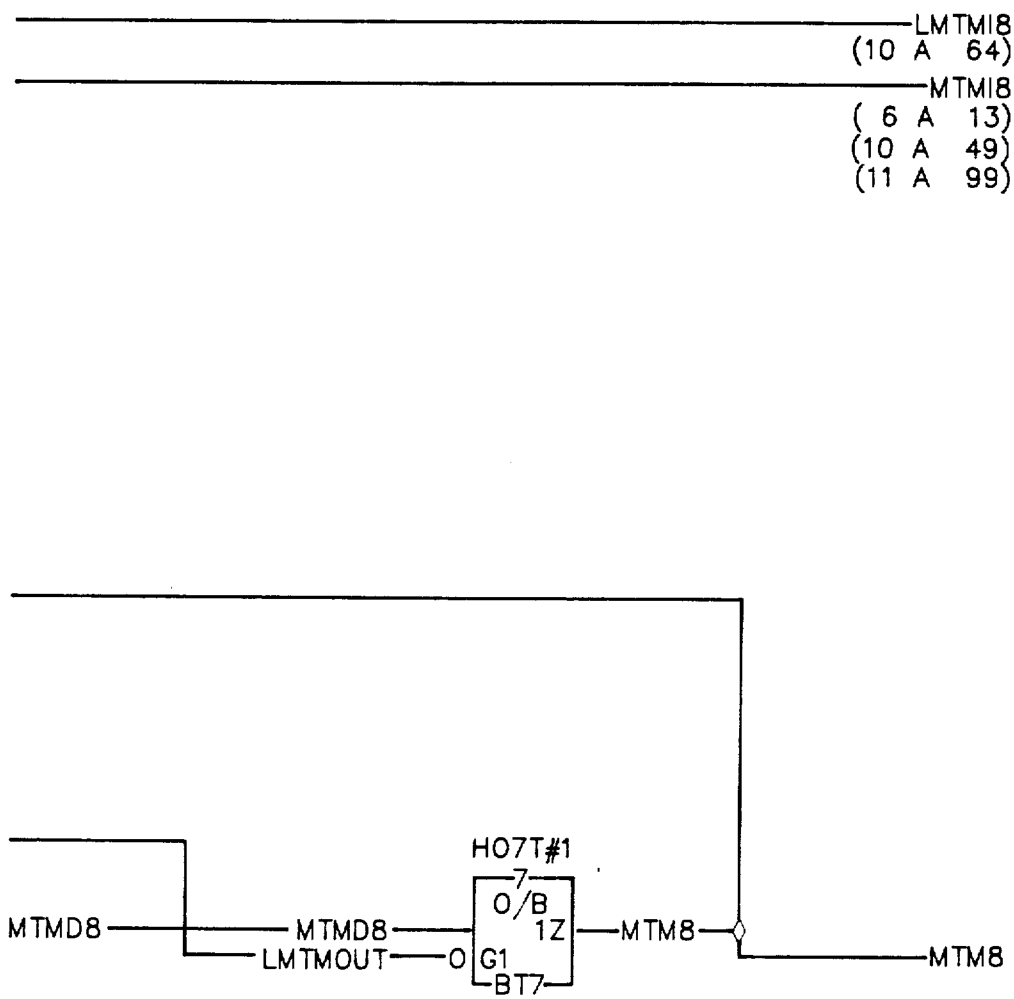
Figure 14D:
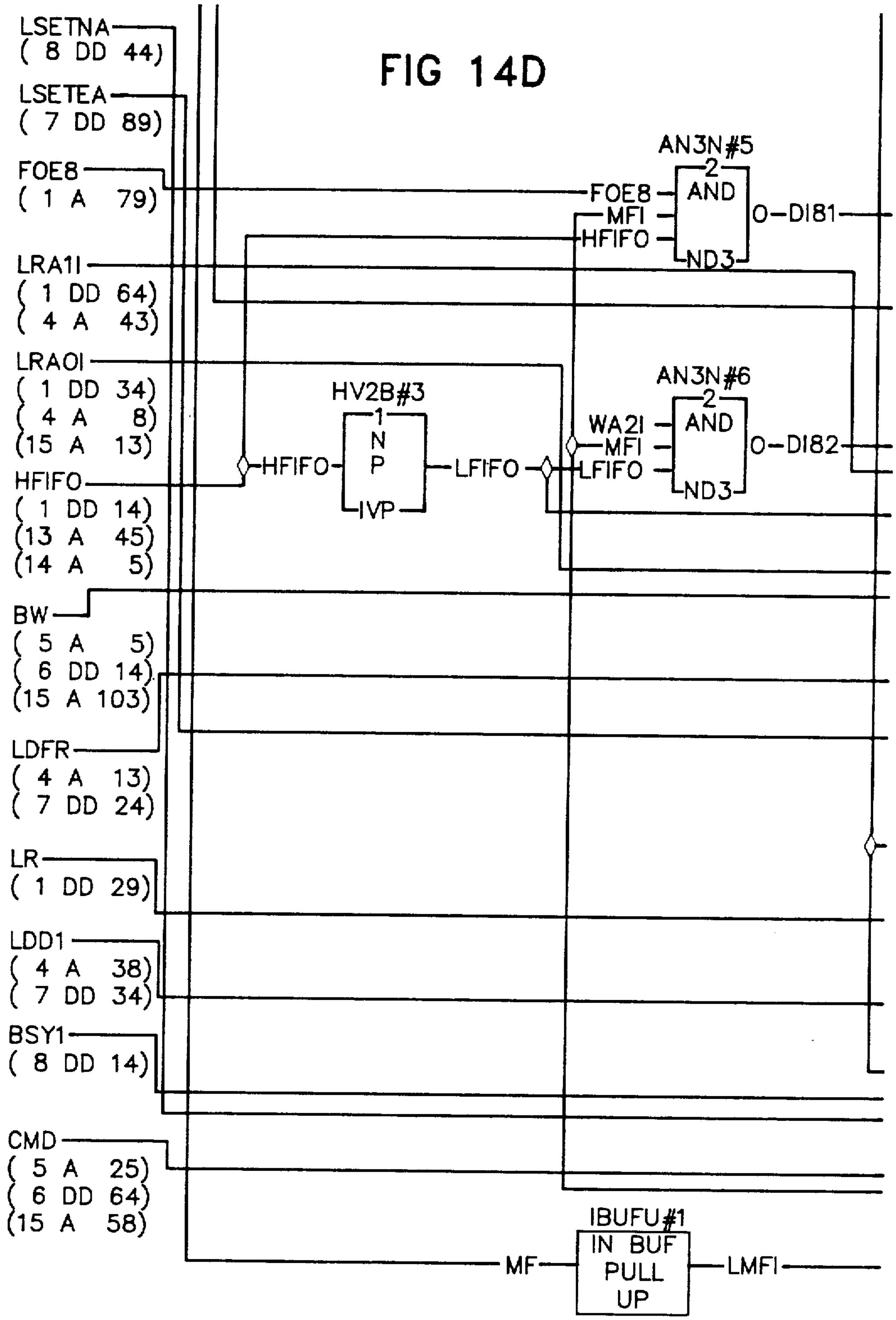
Figure 14E:
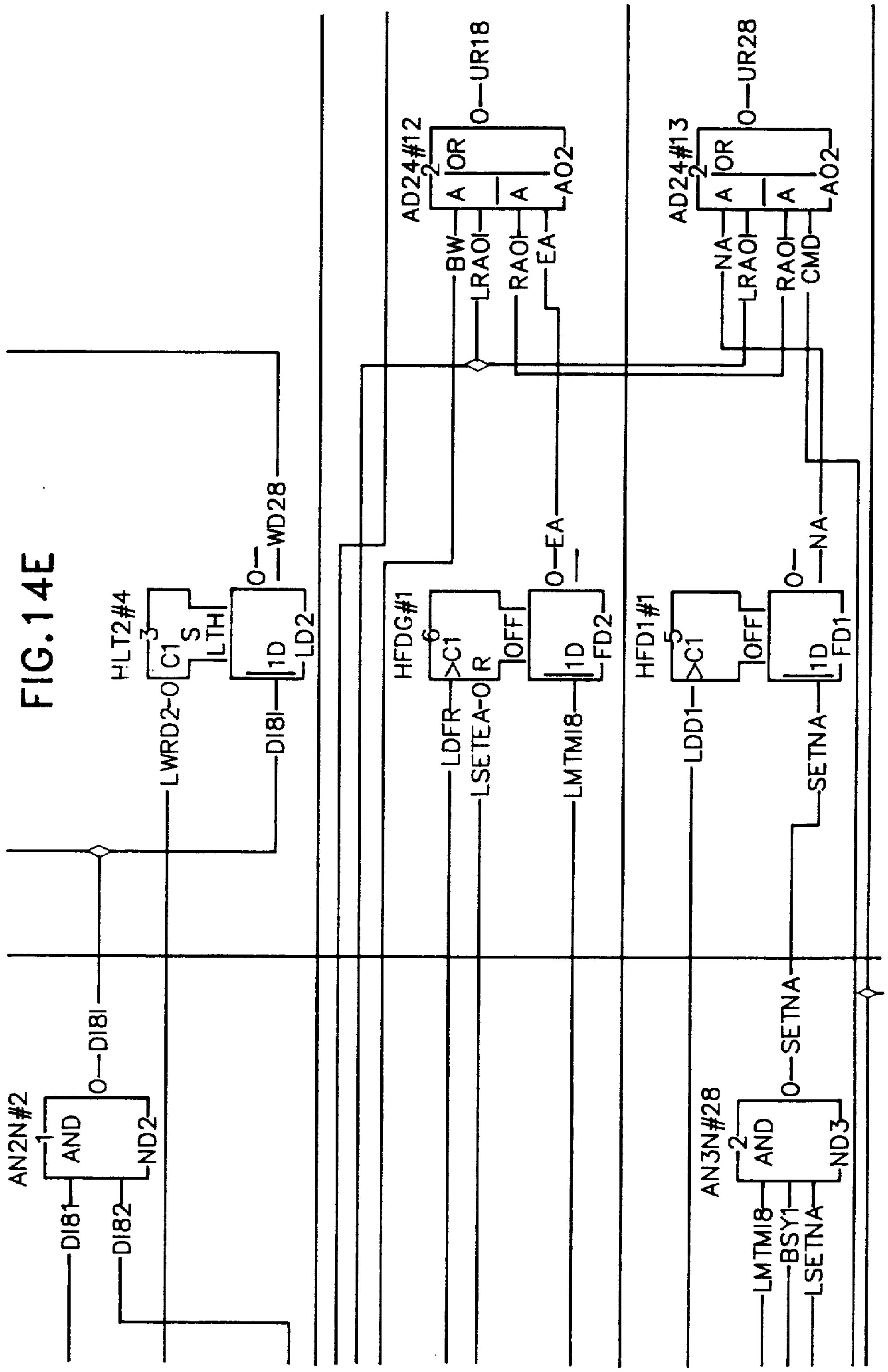
Figure 14F:
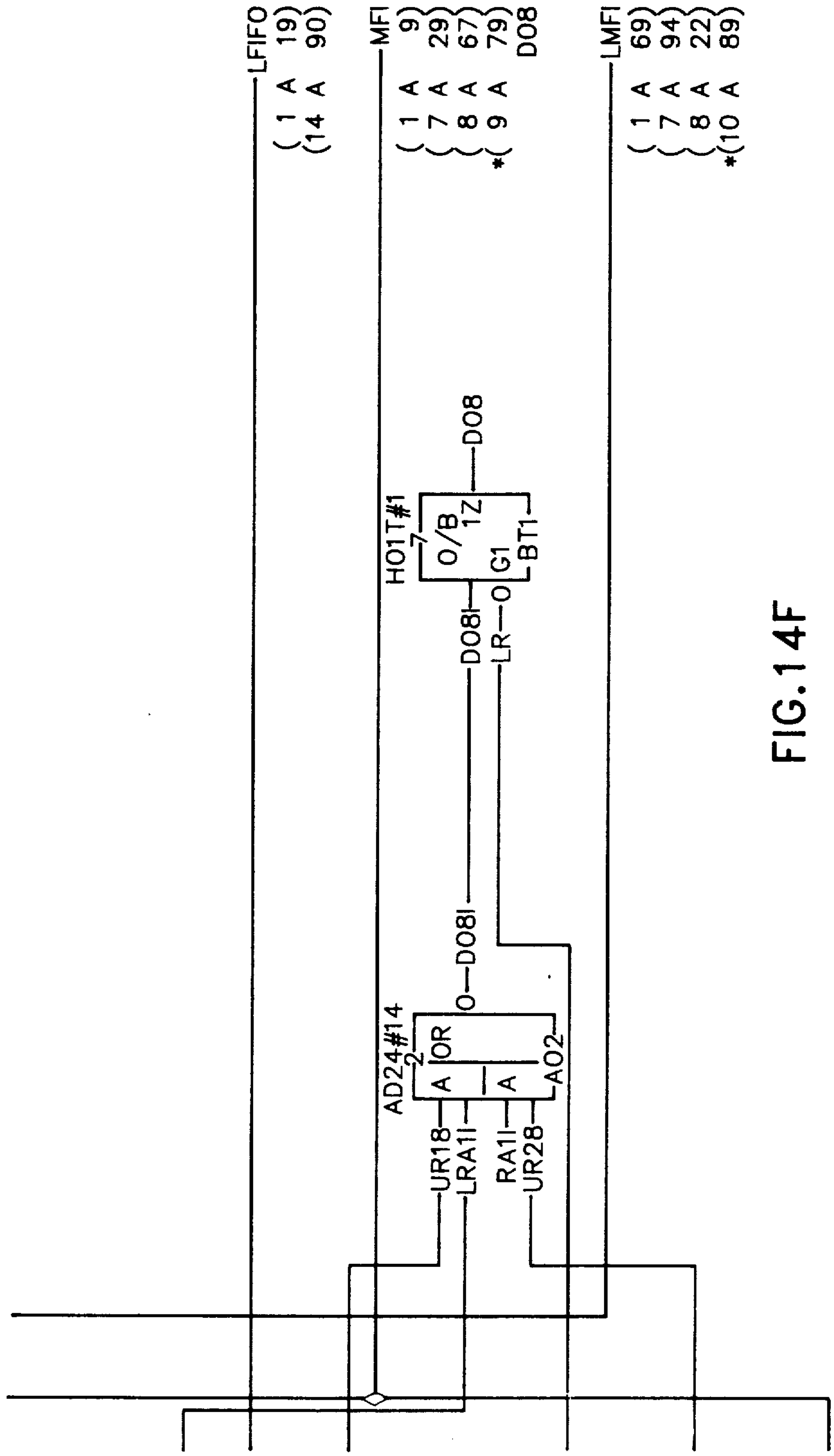
Figure 15A:
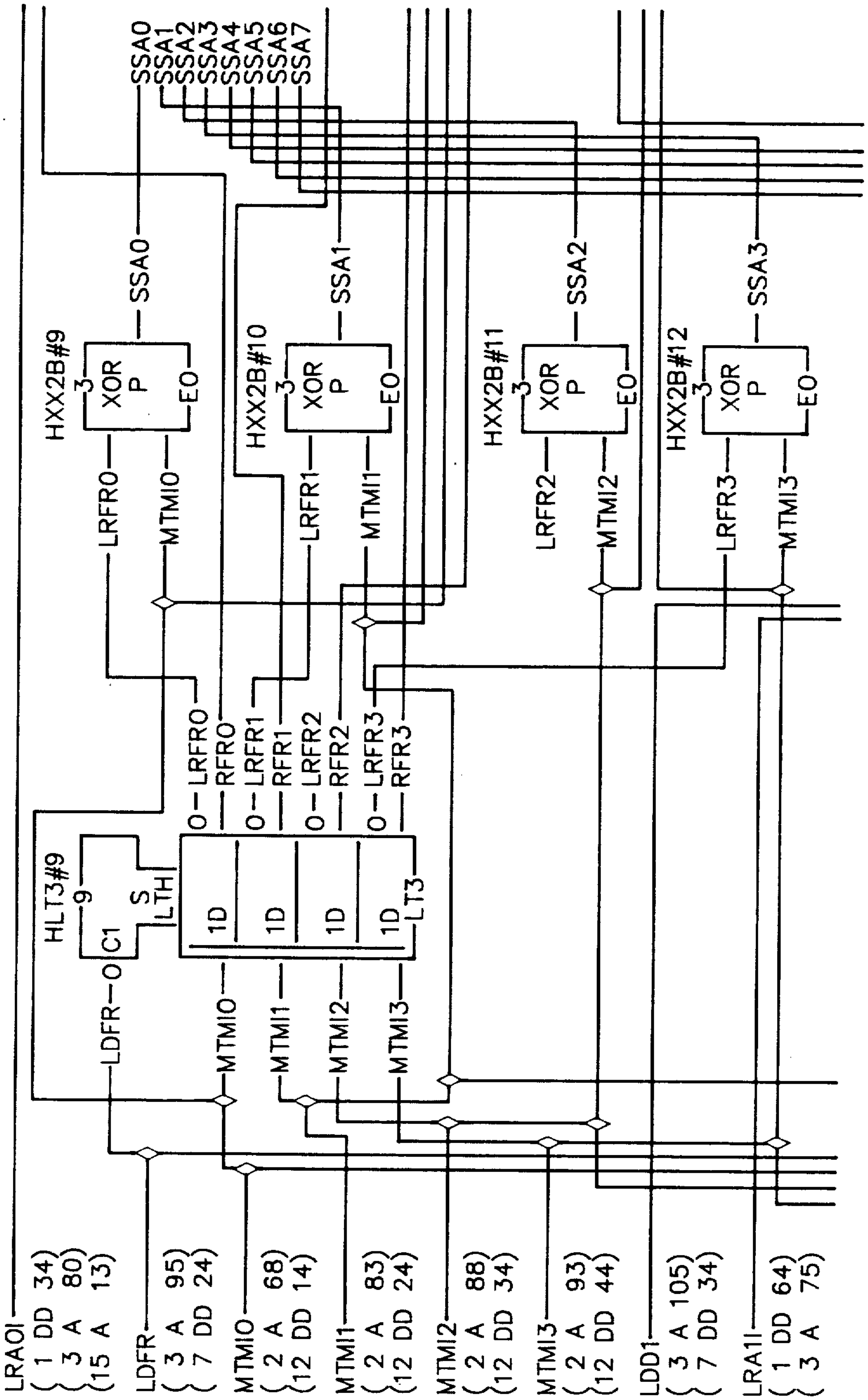
Figure 15B:
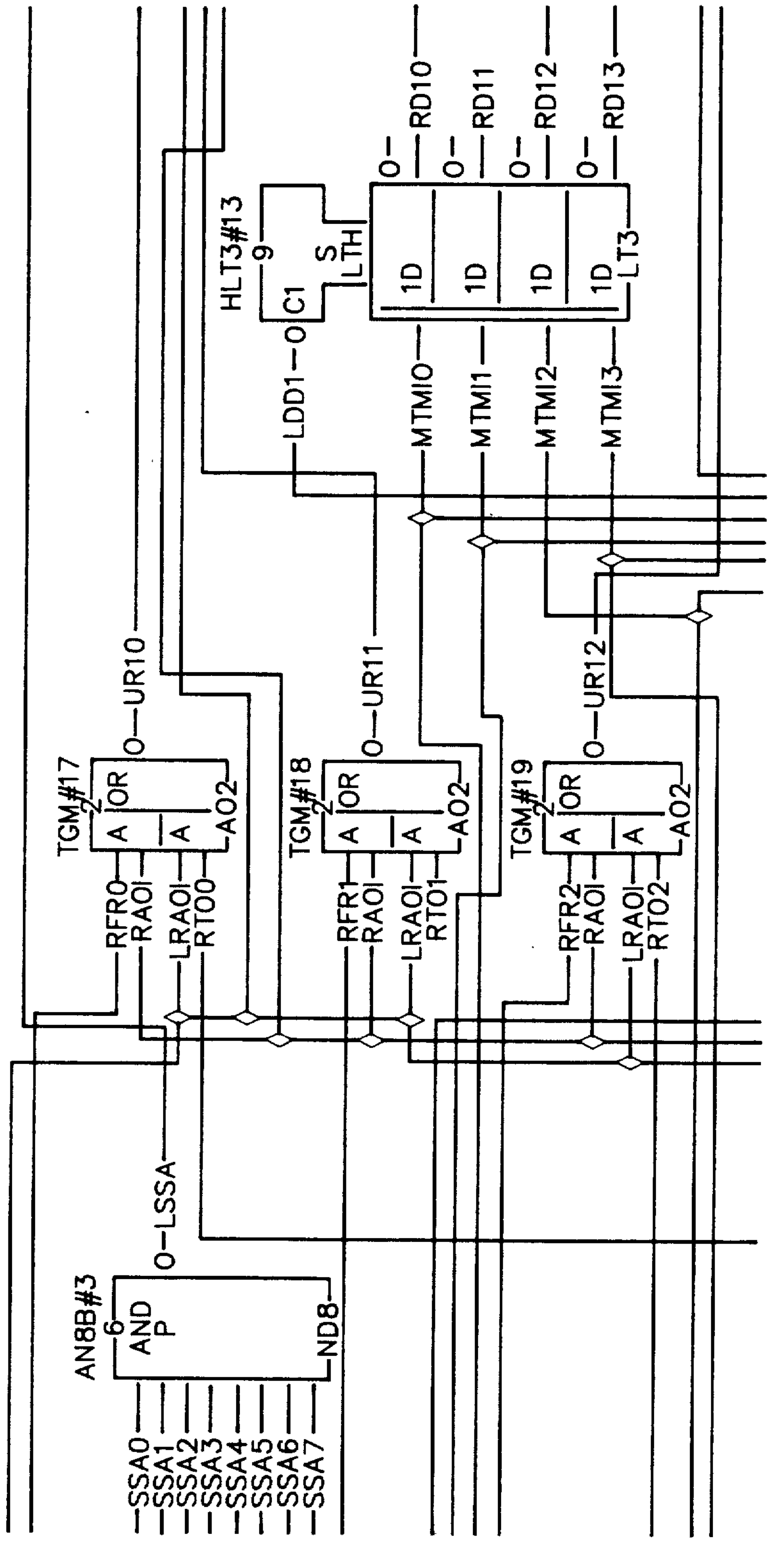
Figure 15C:
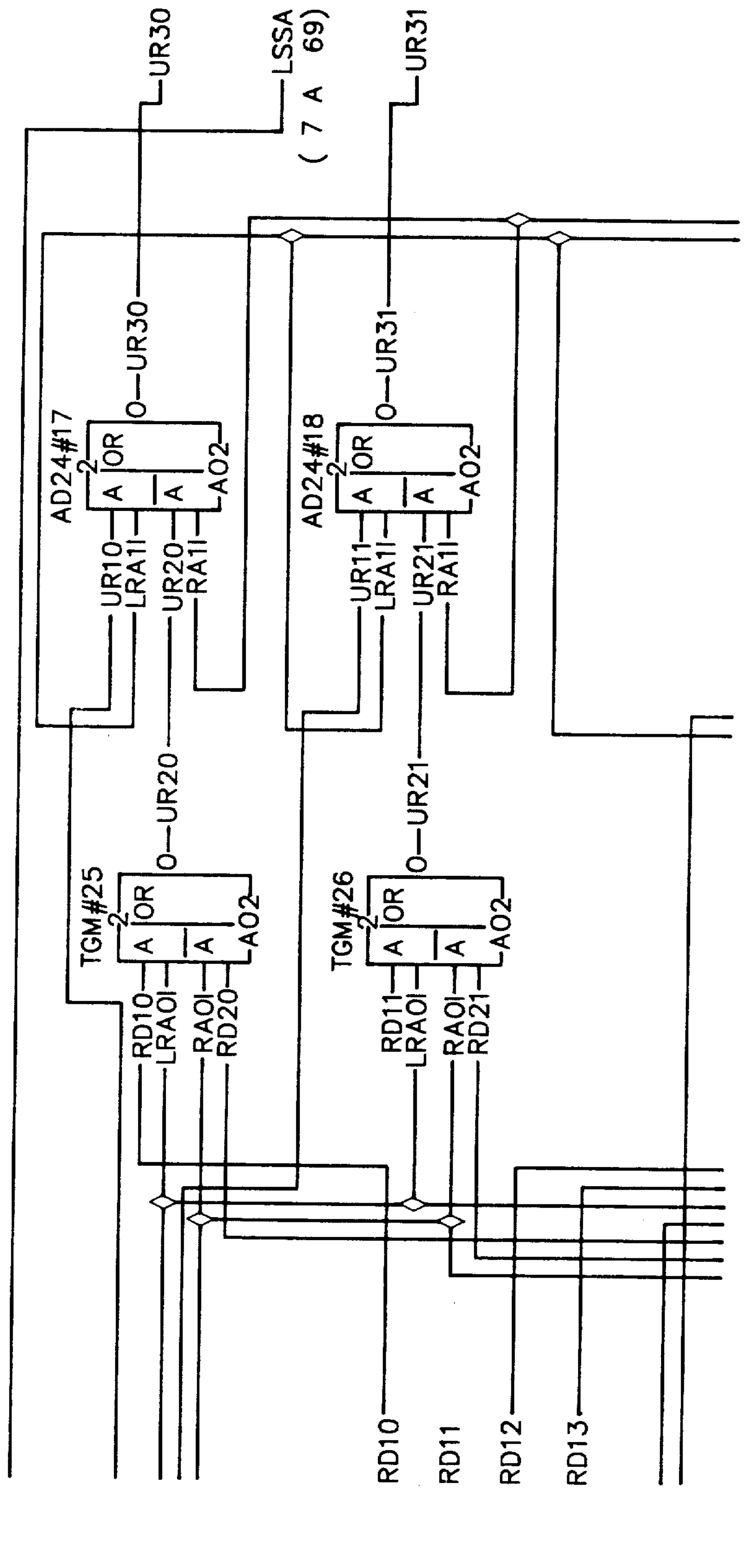
Figure 15D:
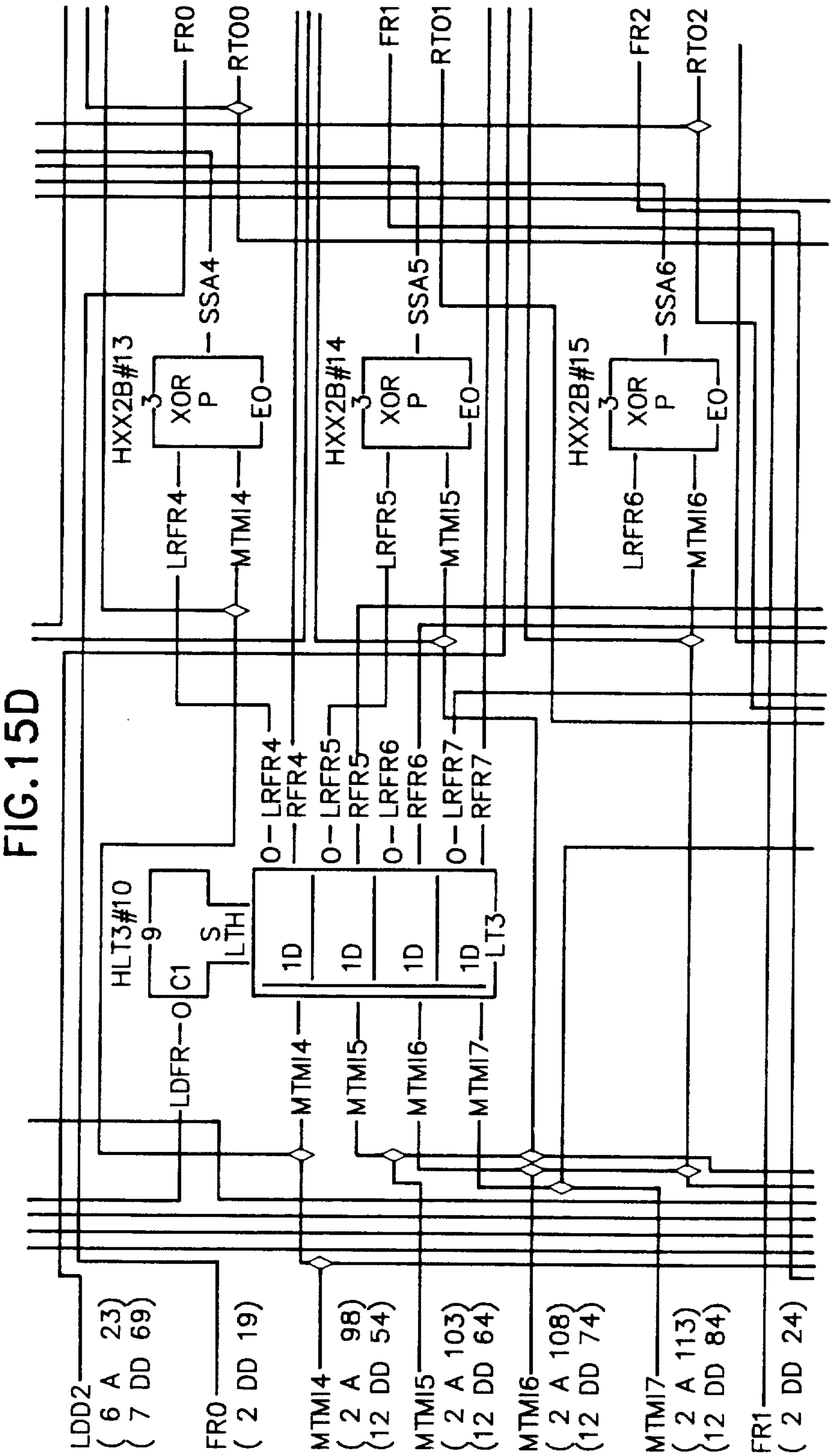
Figure 15E:
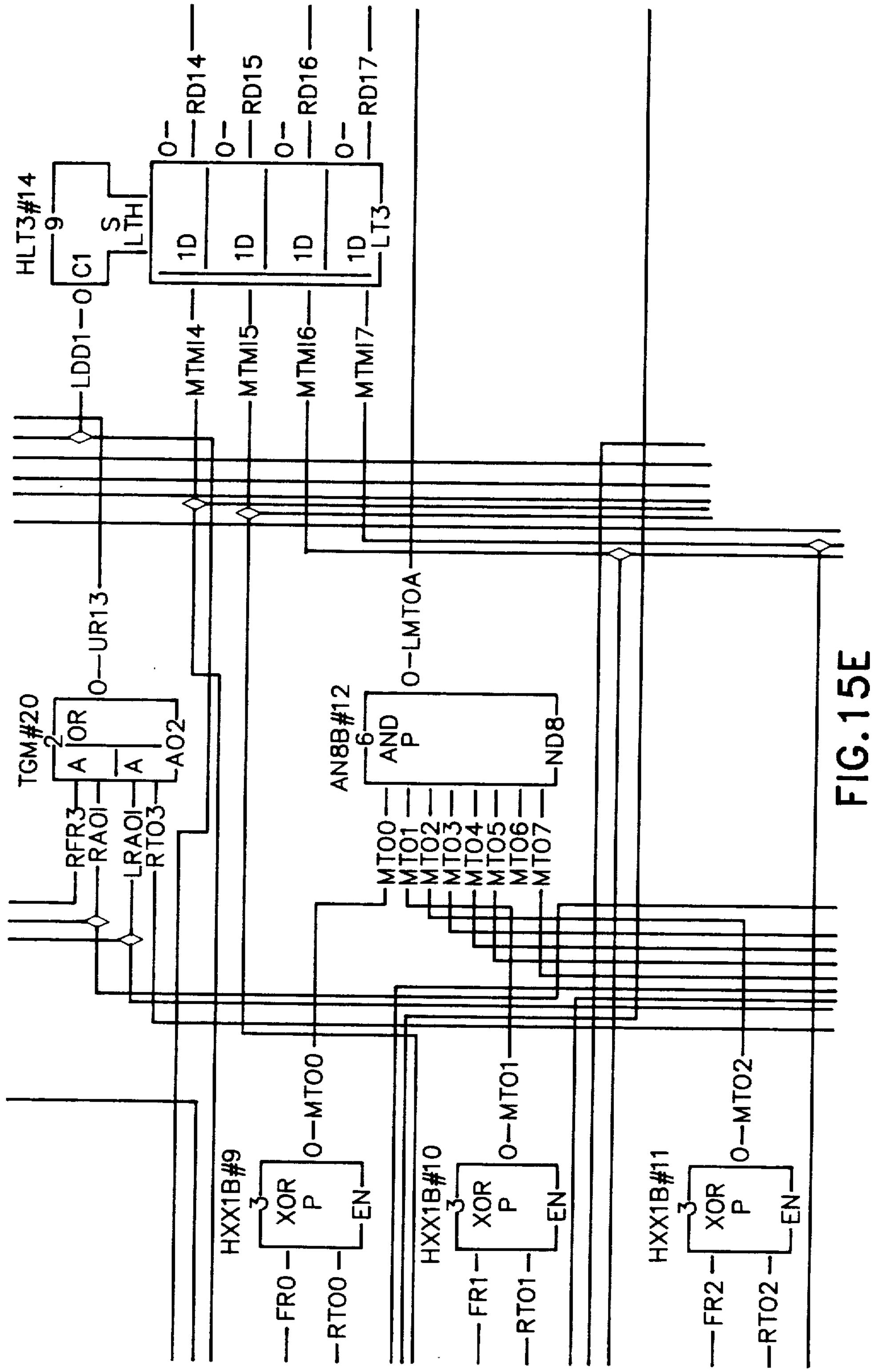
Figure 15F:
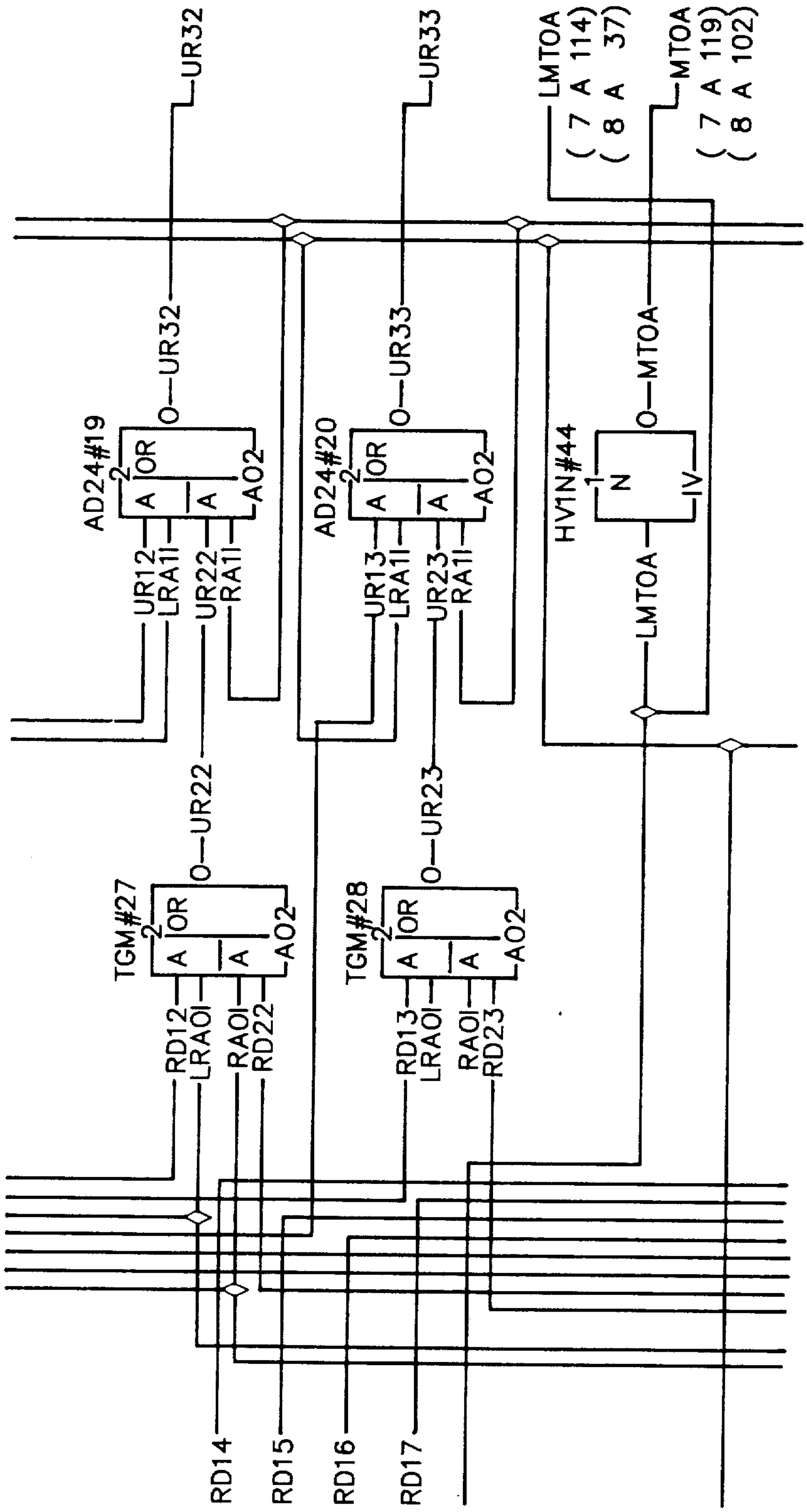
Figure 16A:
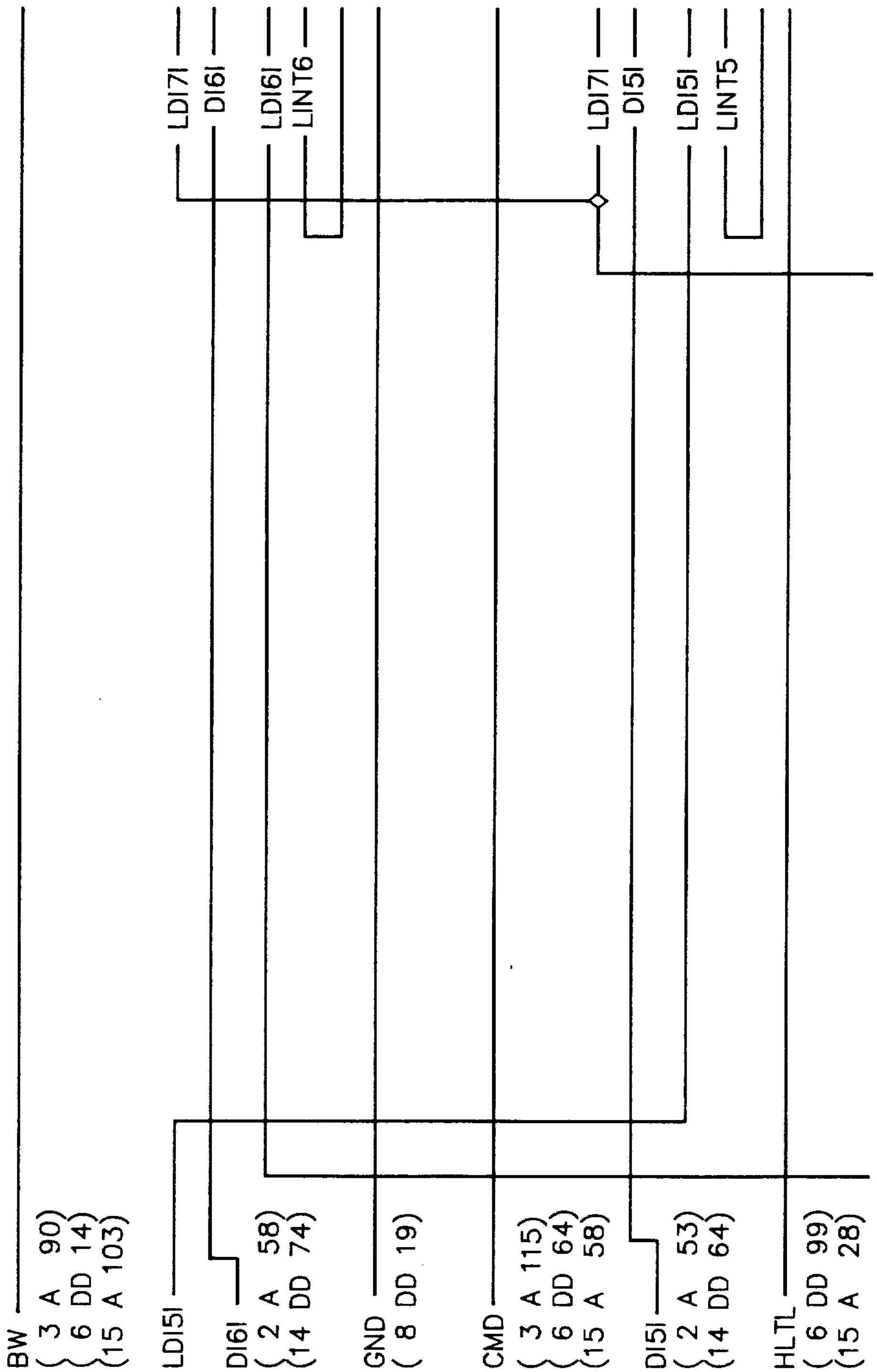
Figure 16B:
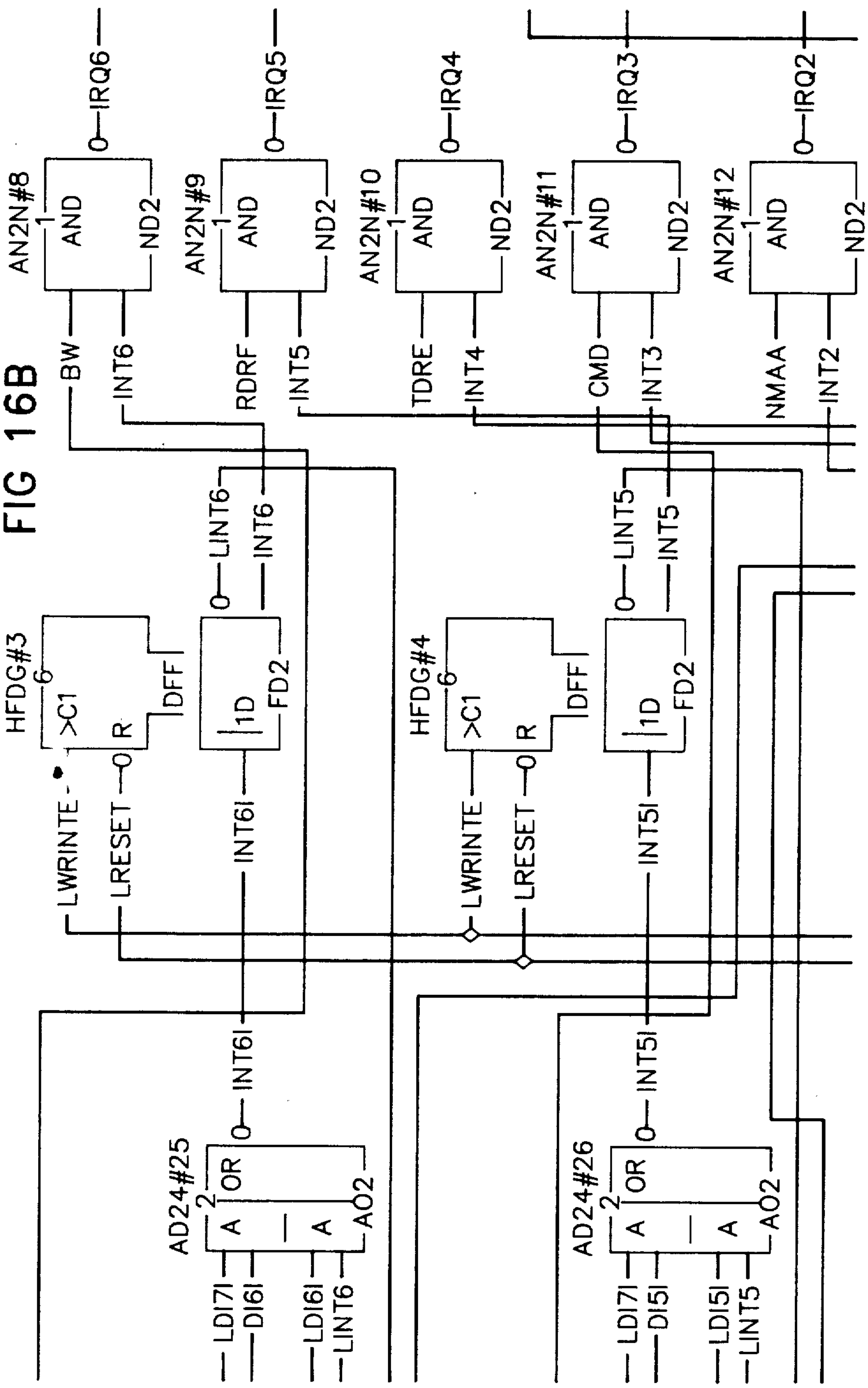
Figure 16C:
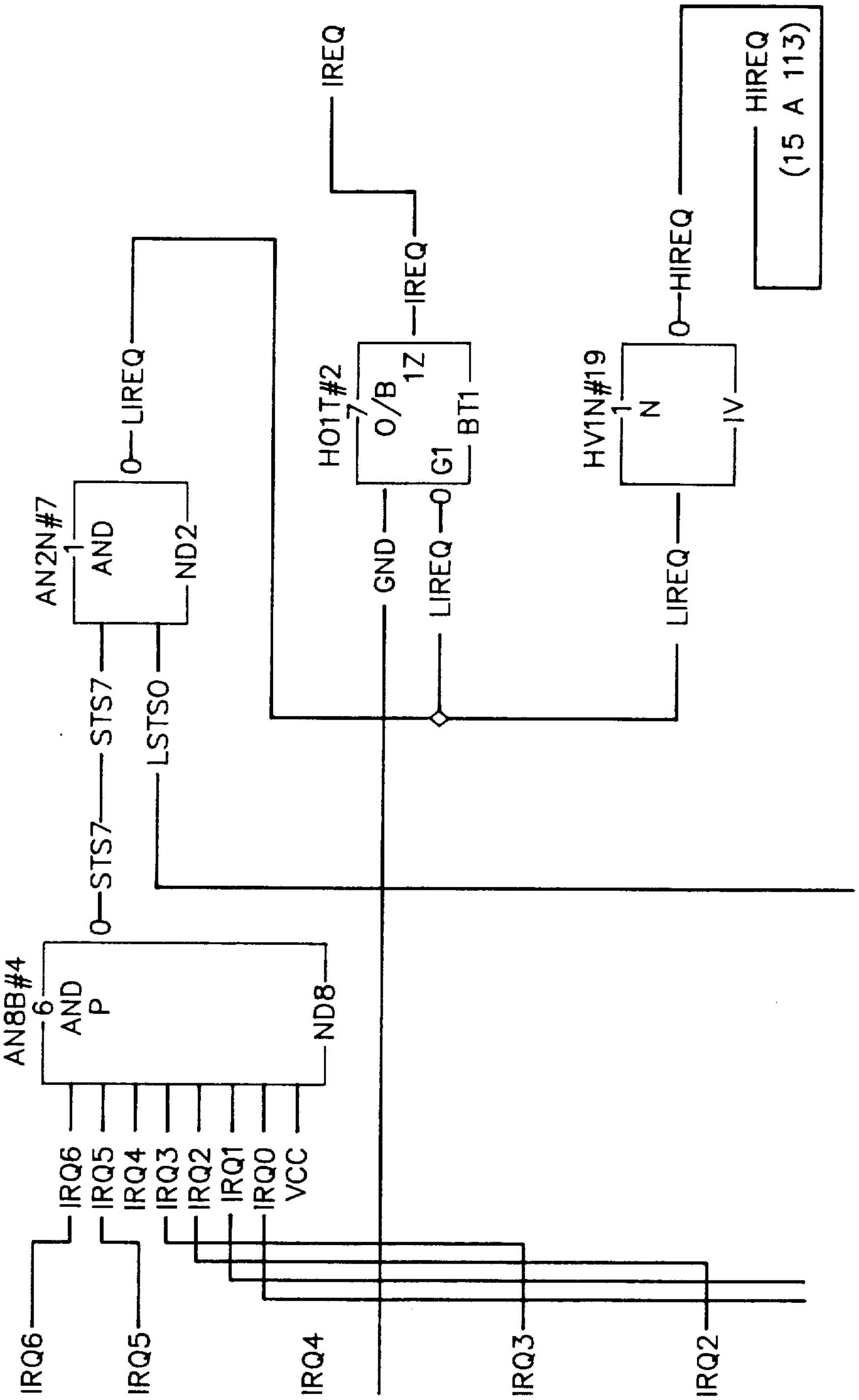
Figure 16D:
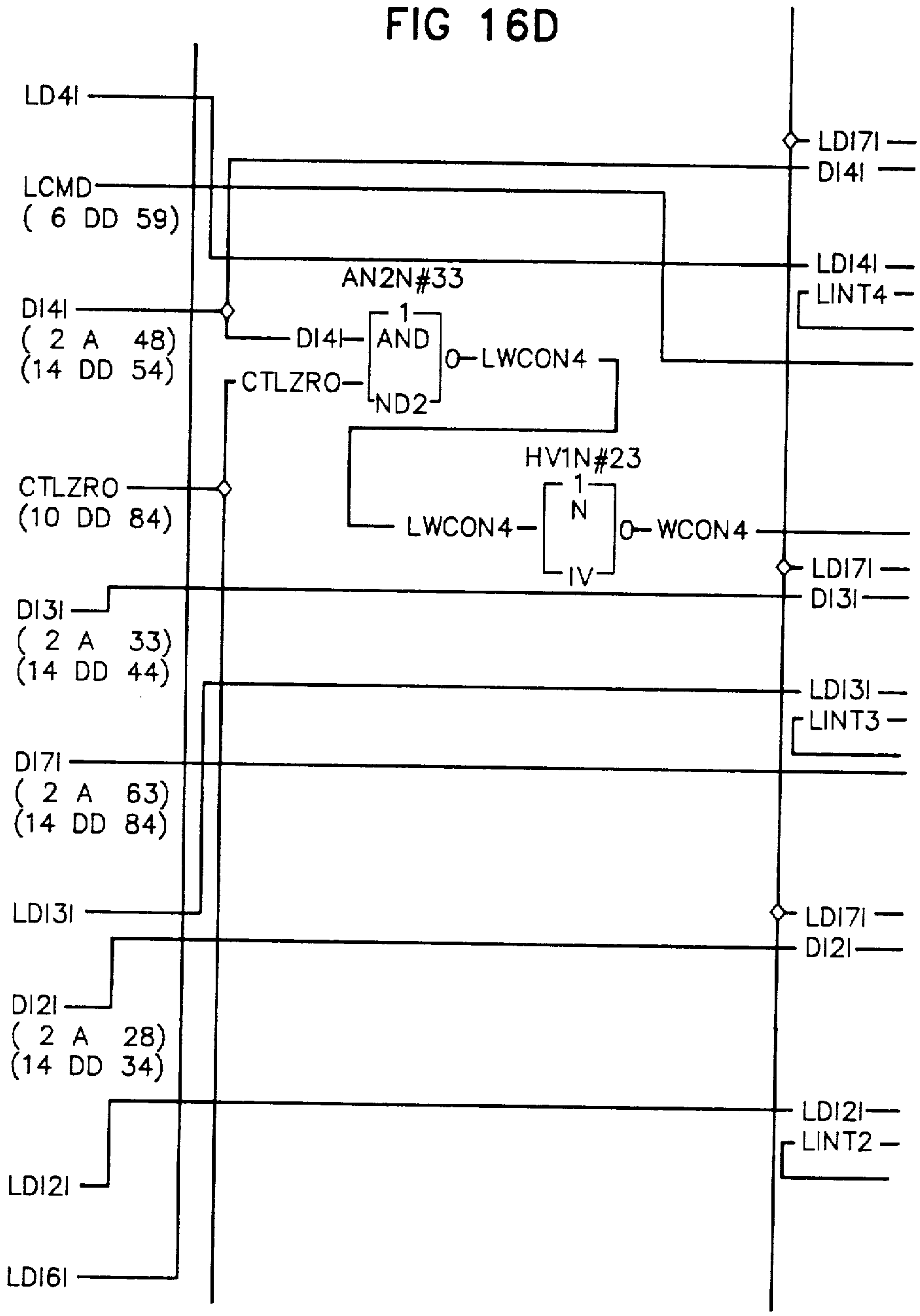
Figure 16F:
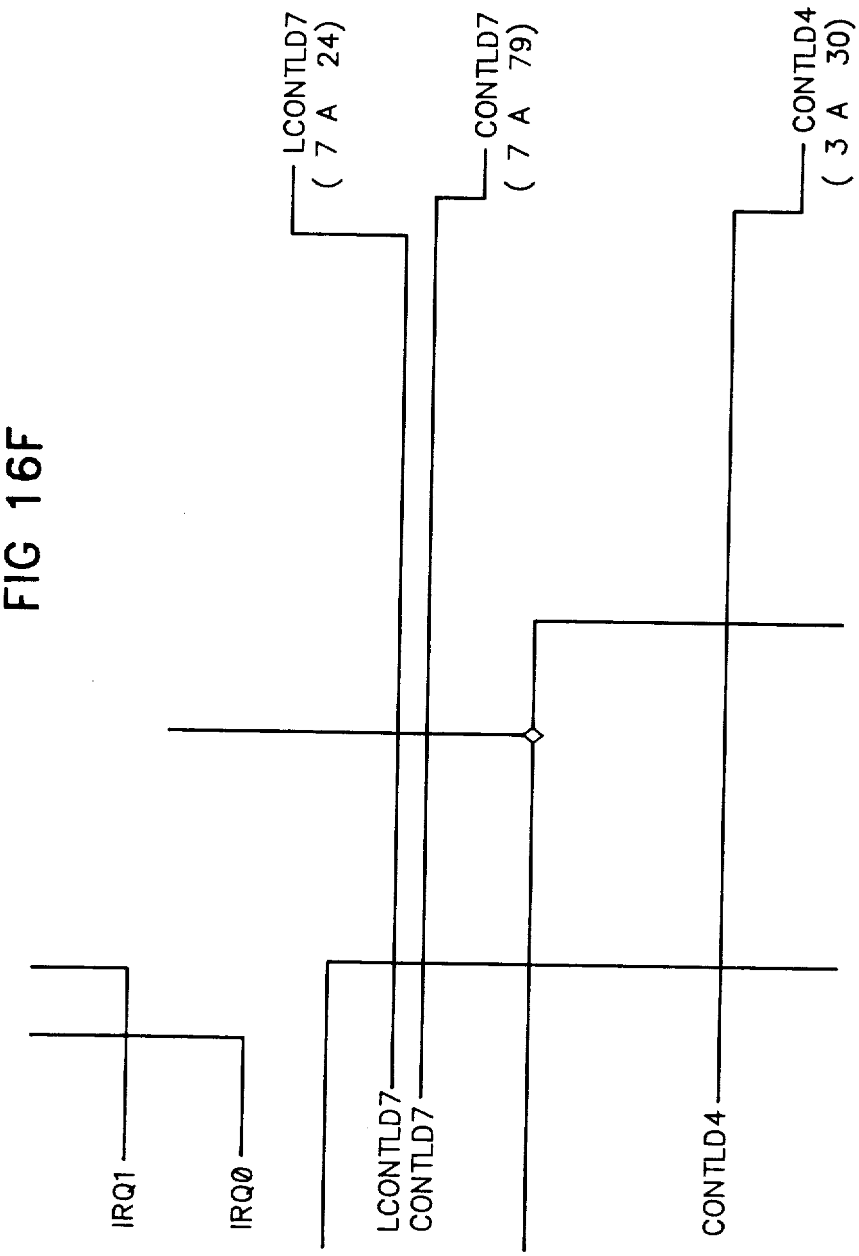
Figure 16G:
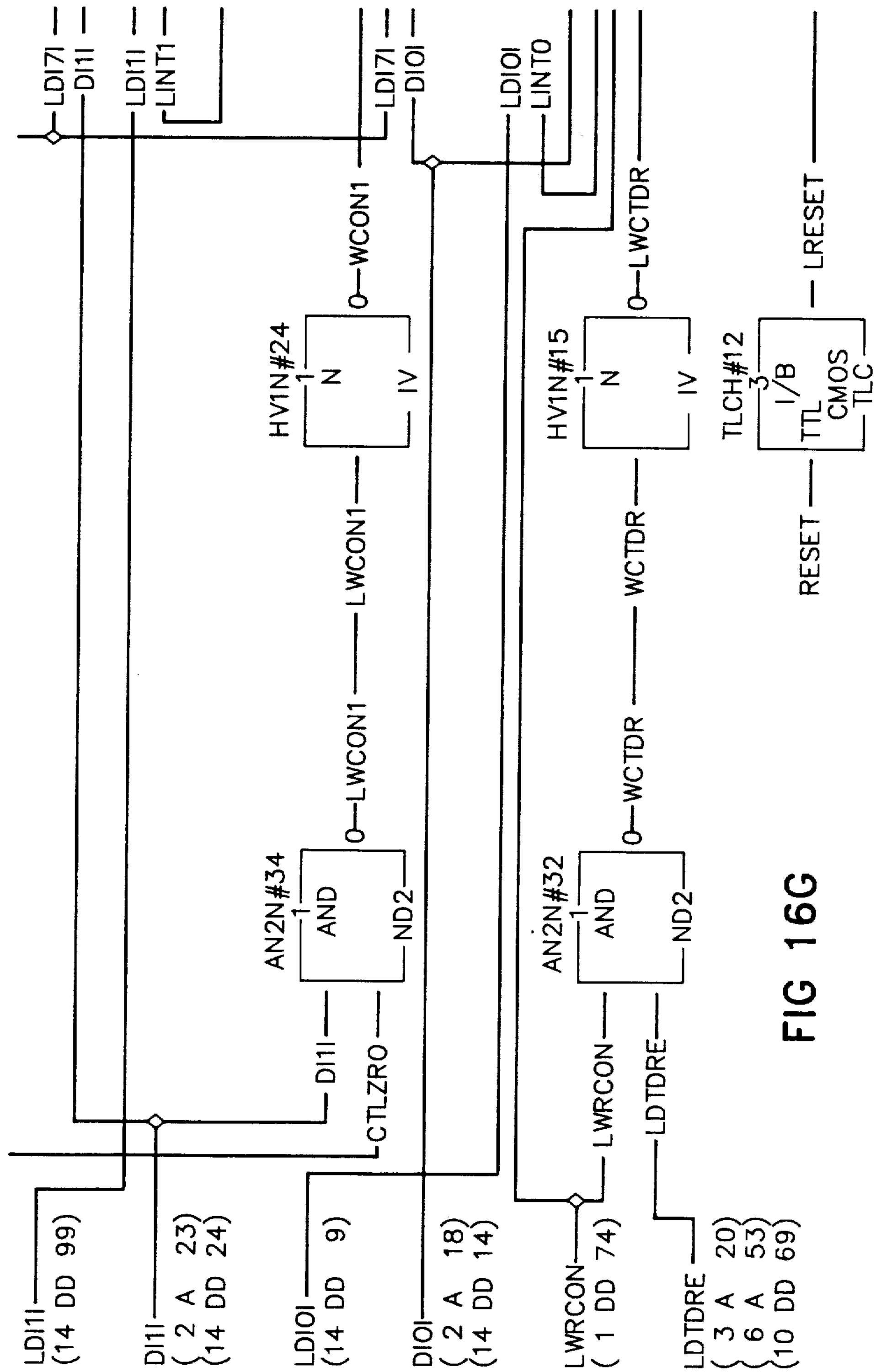
Figure 16I:
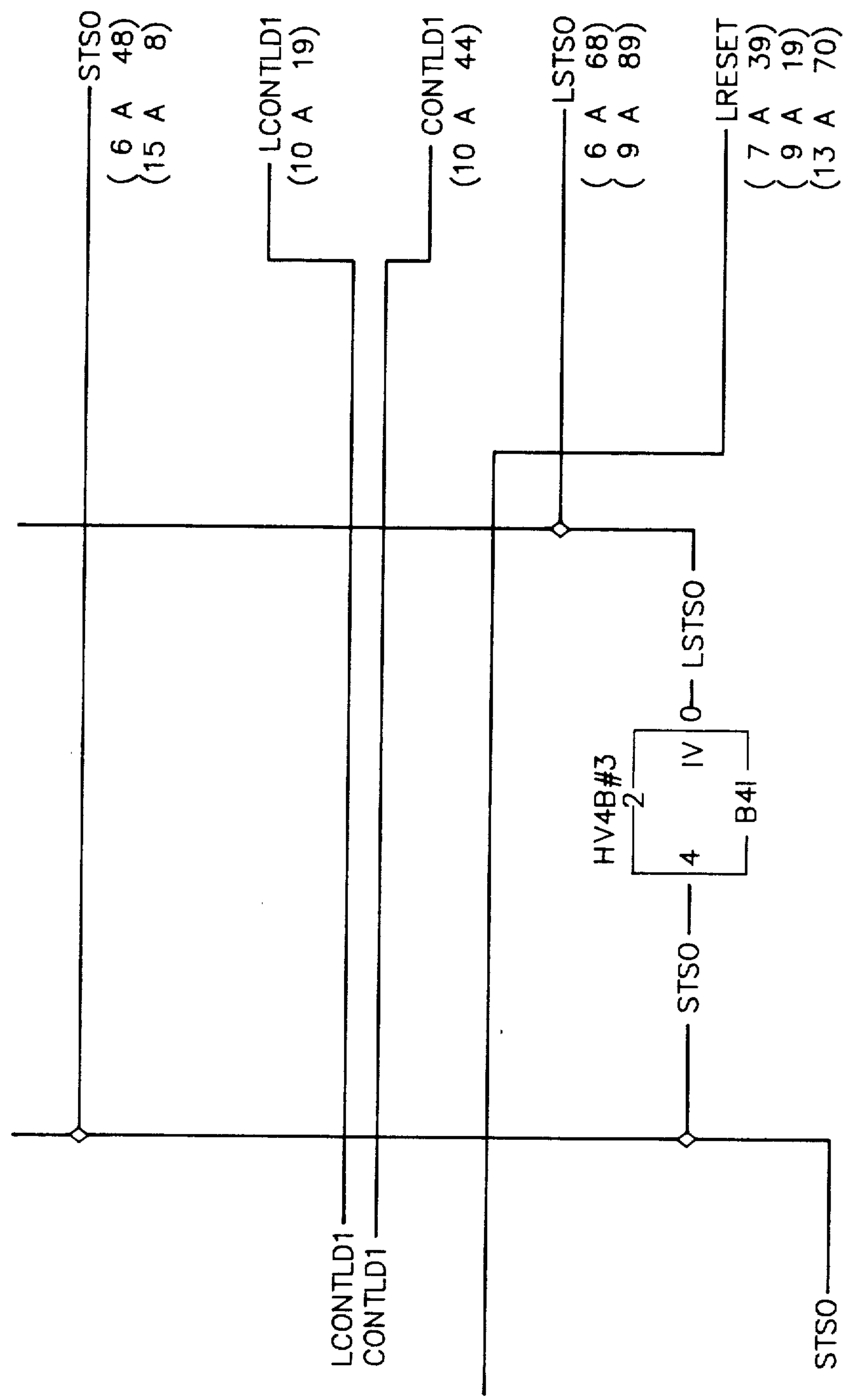
Figure 17A:
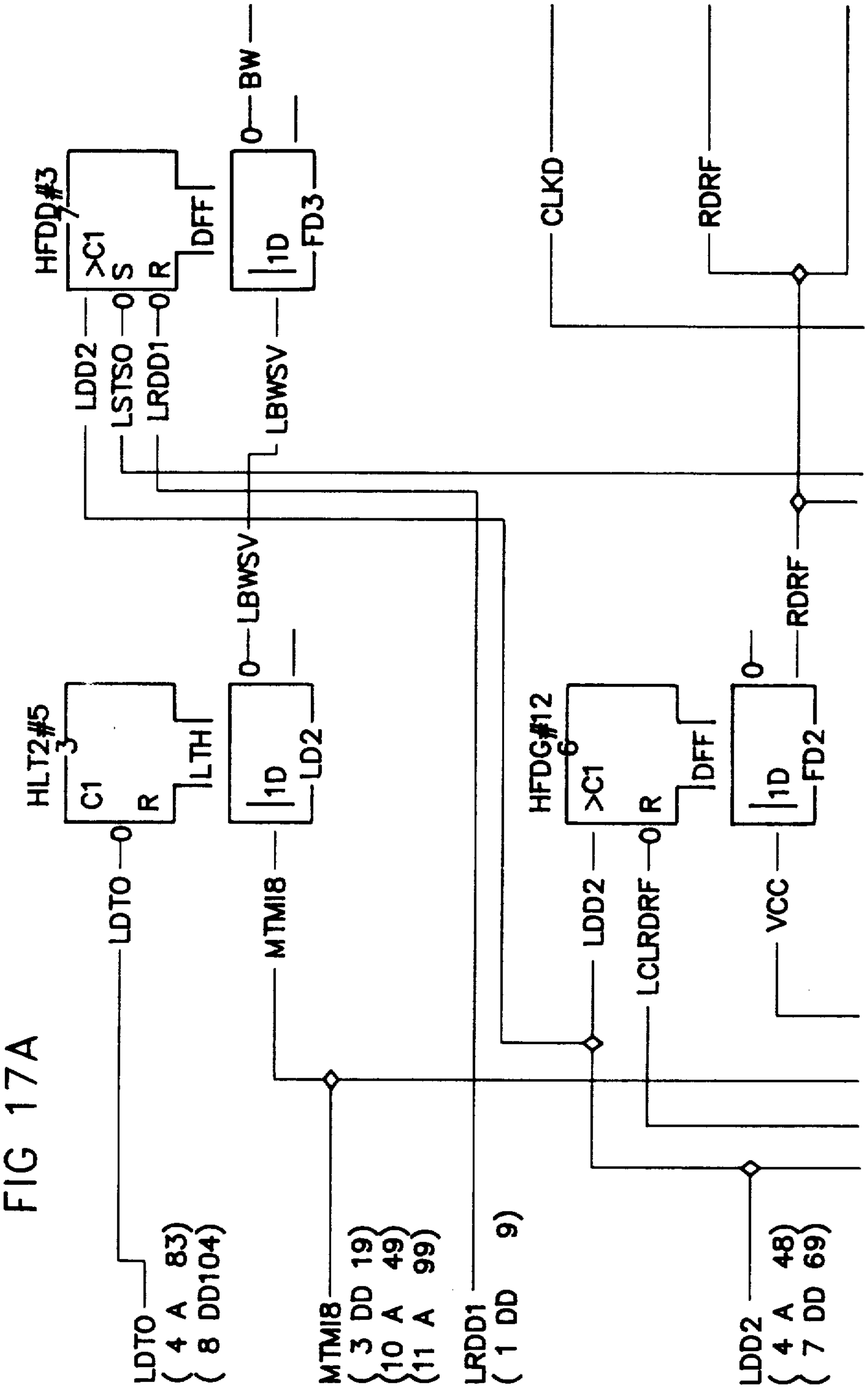
Figure 17B:
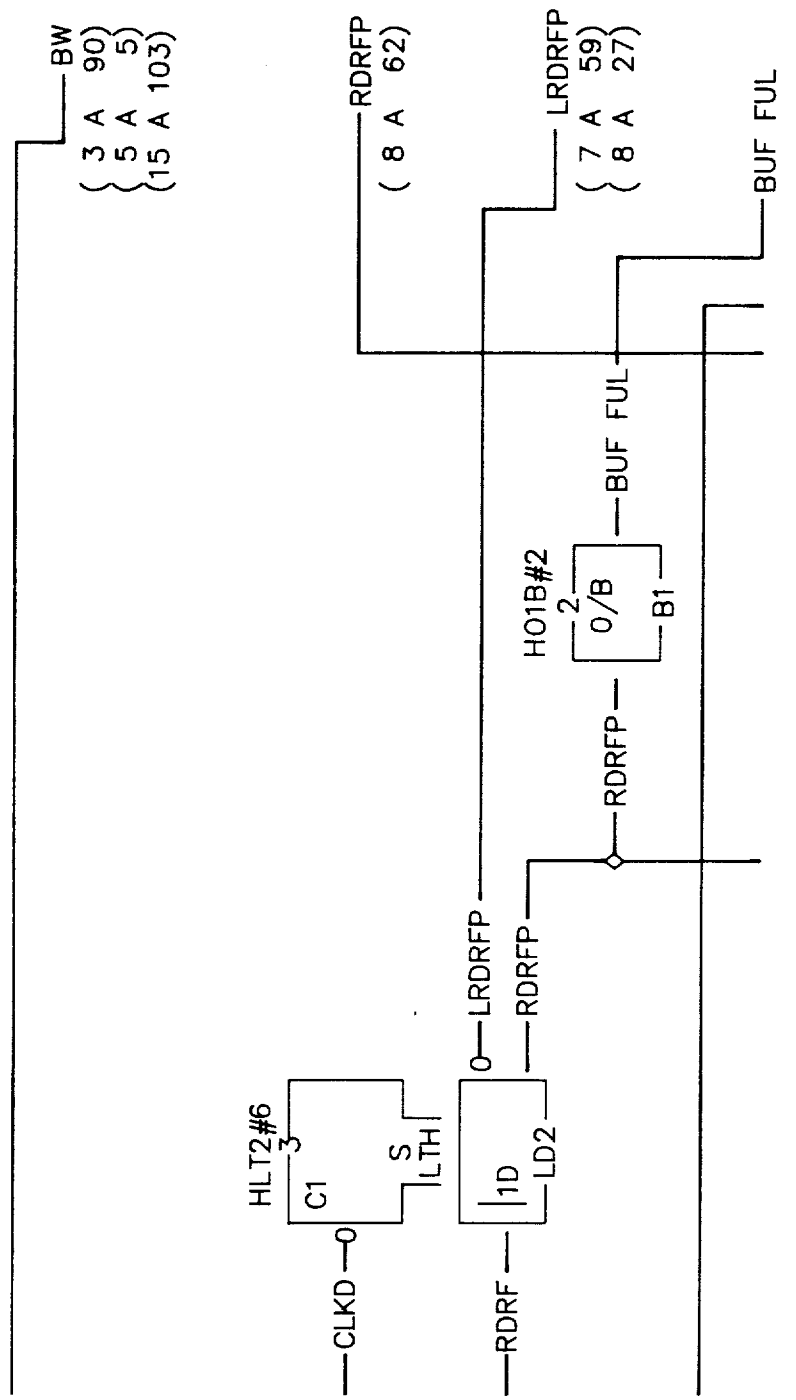
Figure 17D:
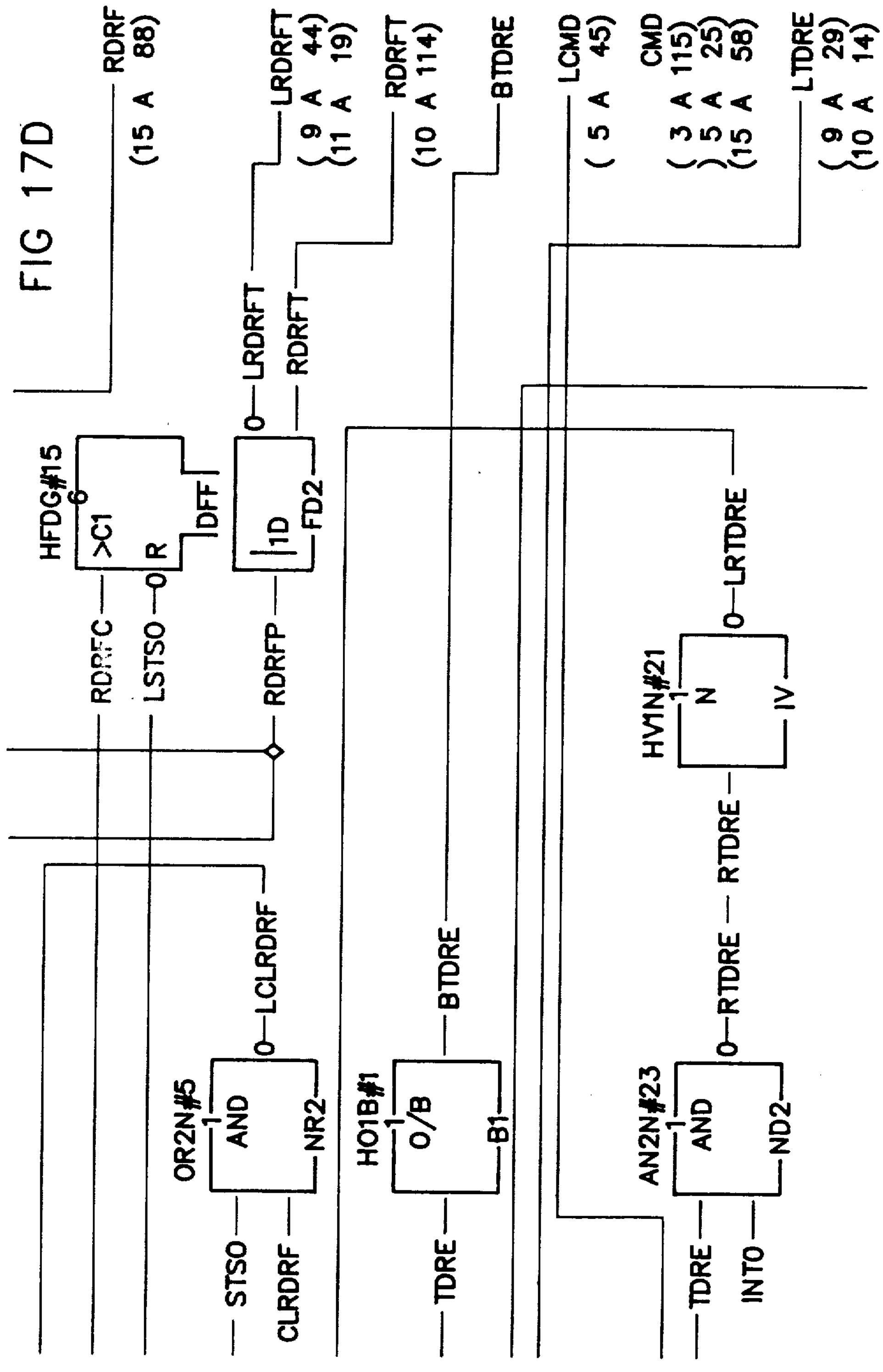
Figure 17E:
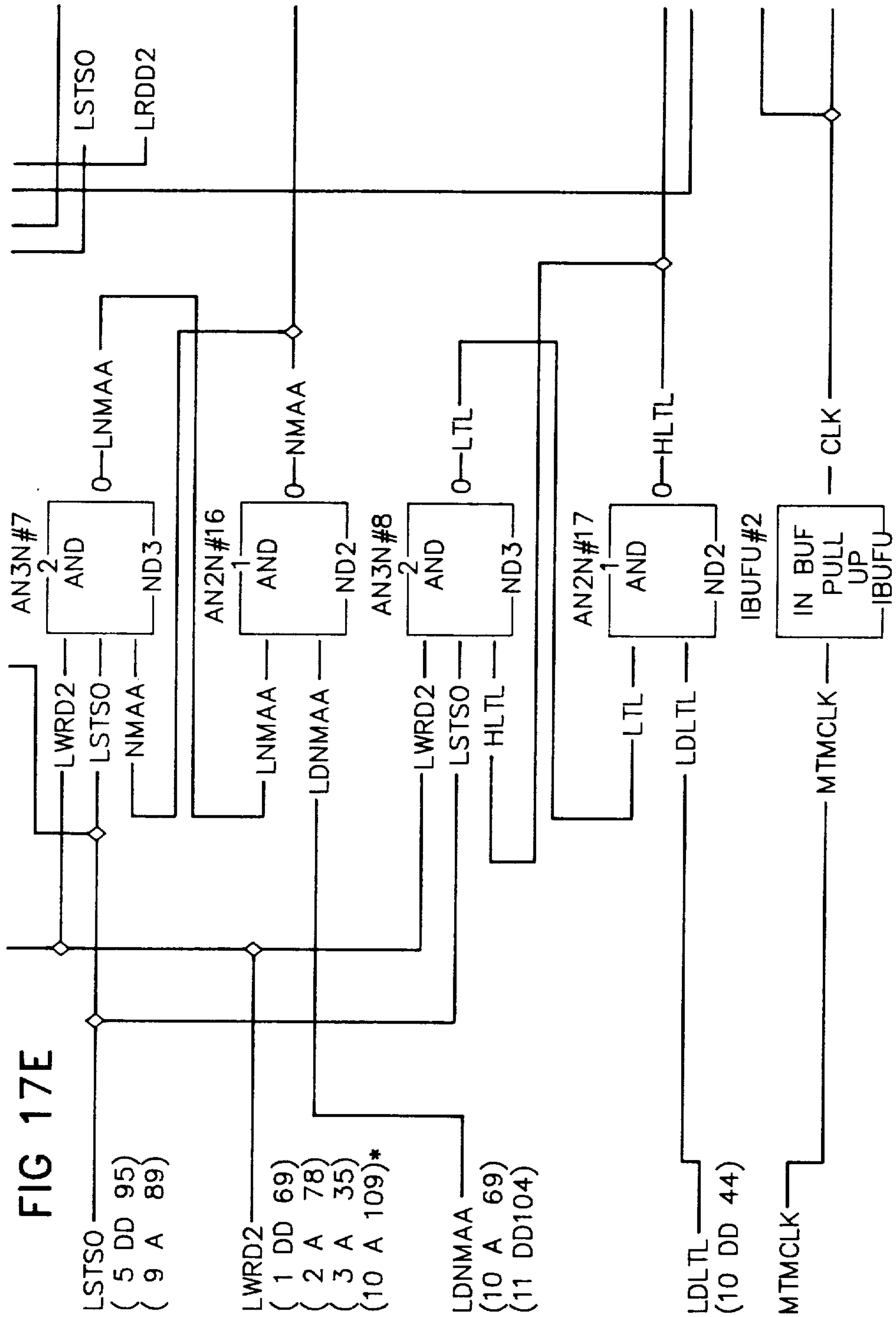
Figure 17F:
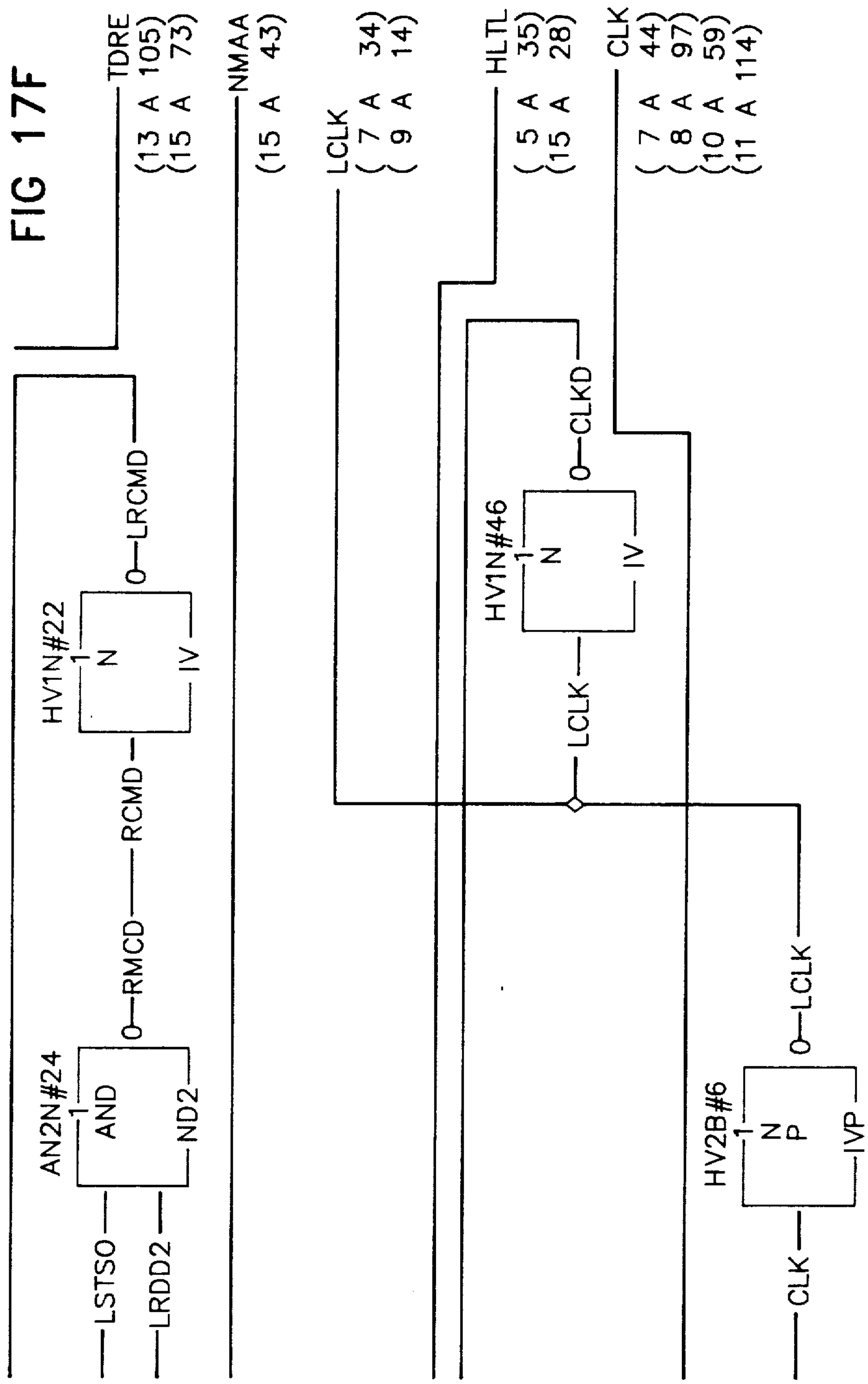
Figure 18C:
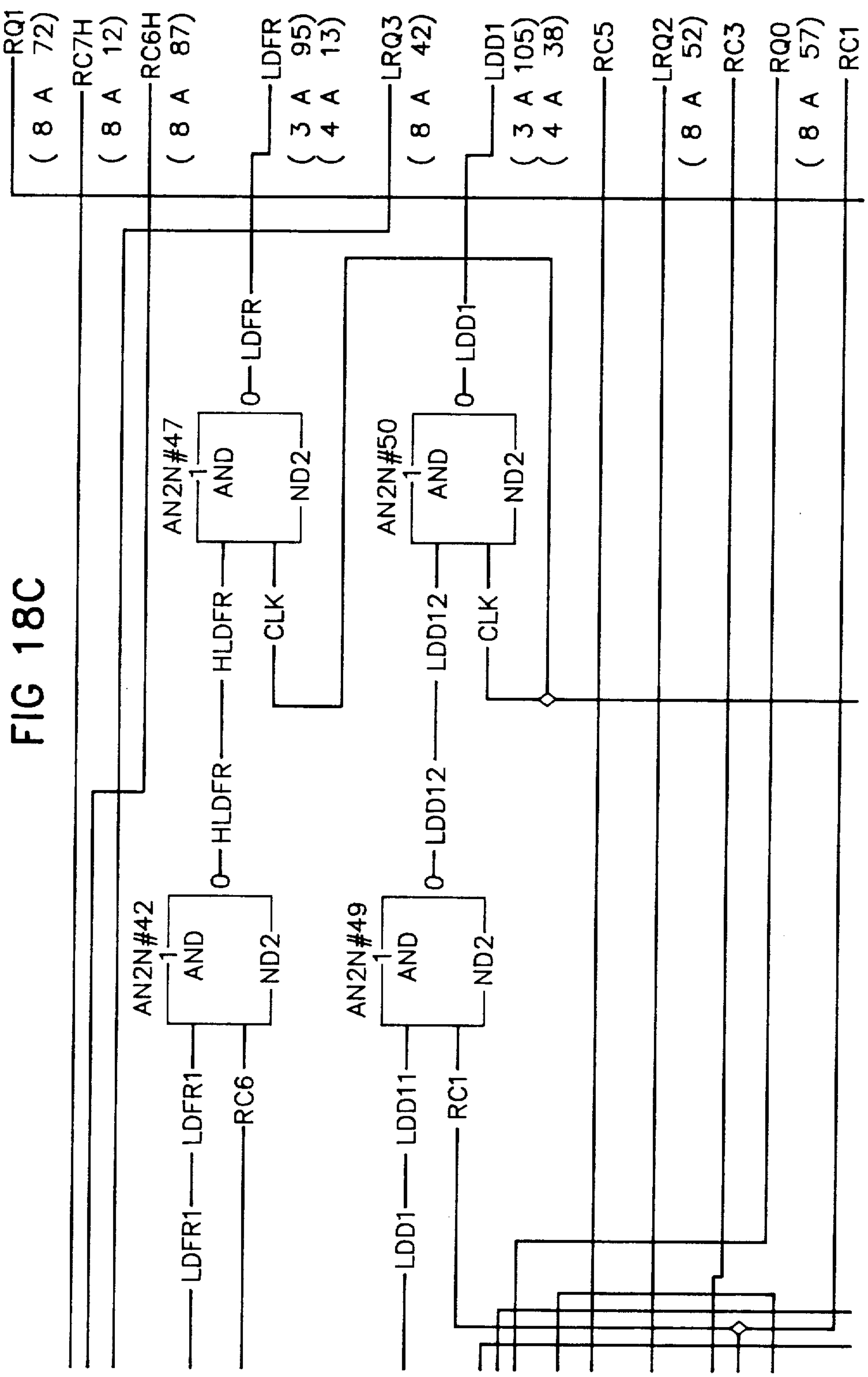
Figure 18D:
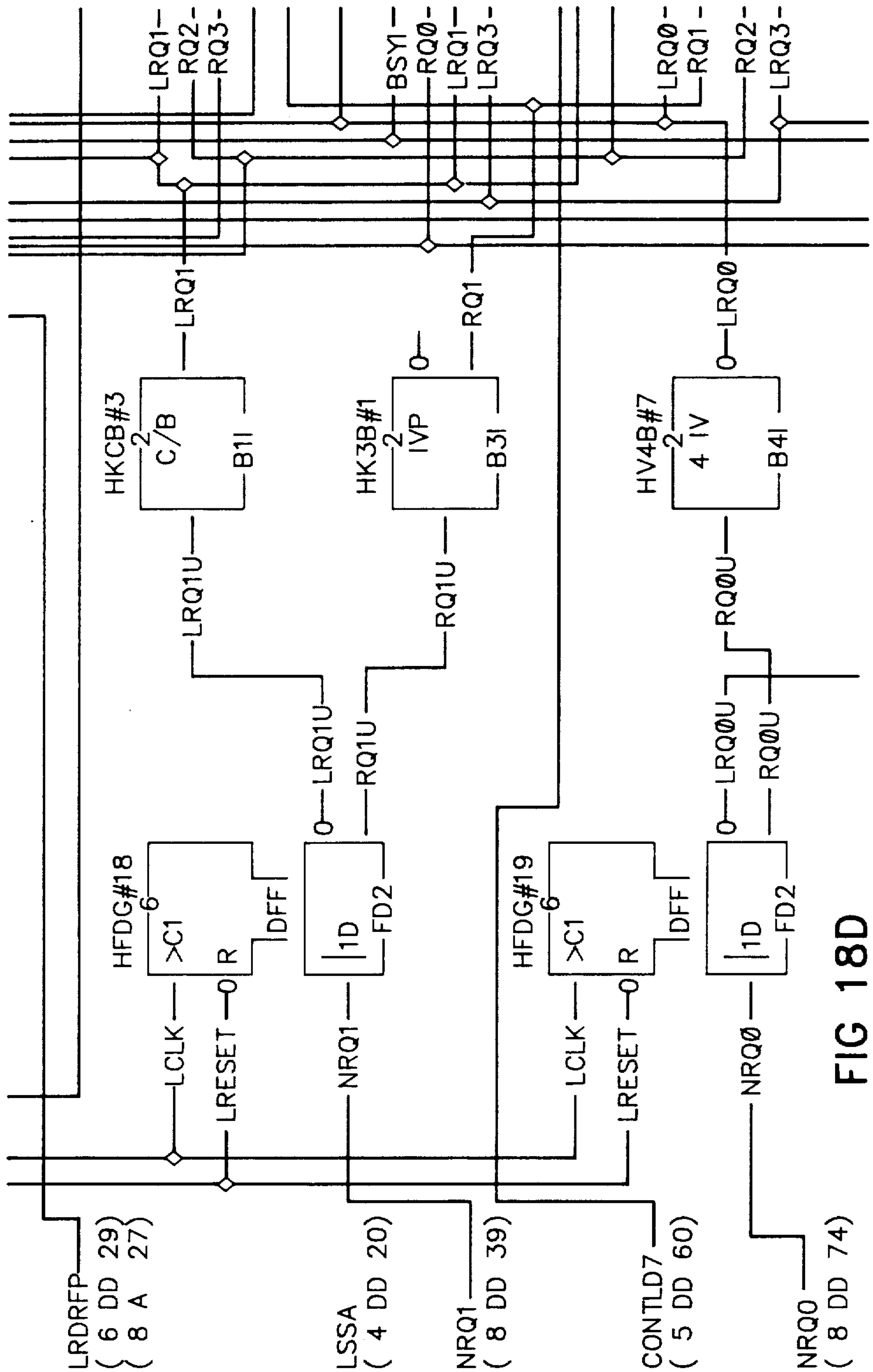
Figure 18F:
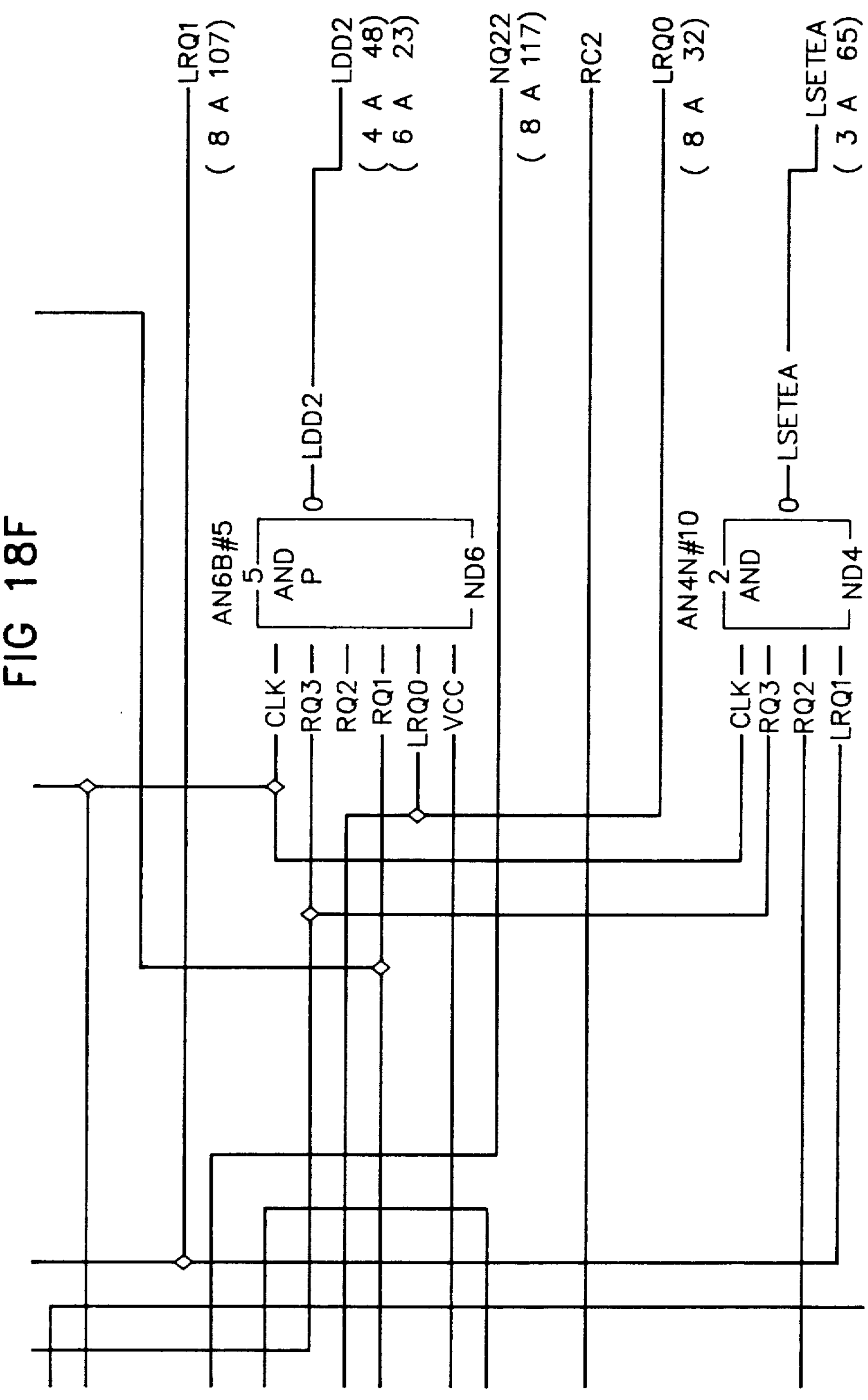
Figure 18G:
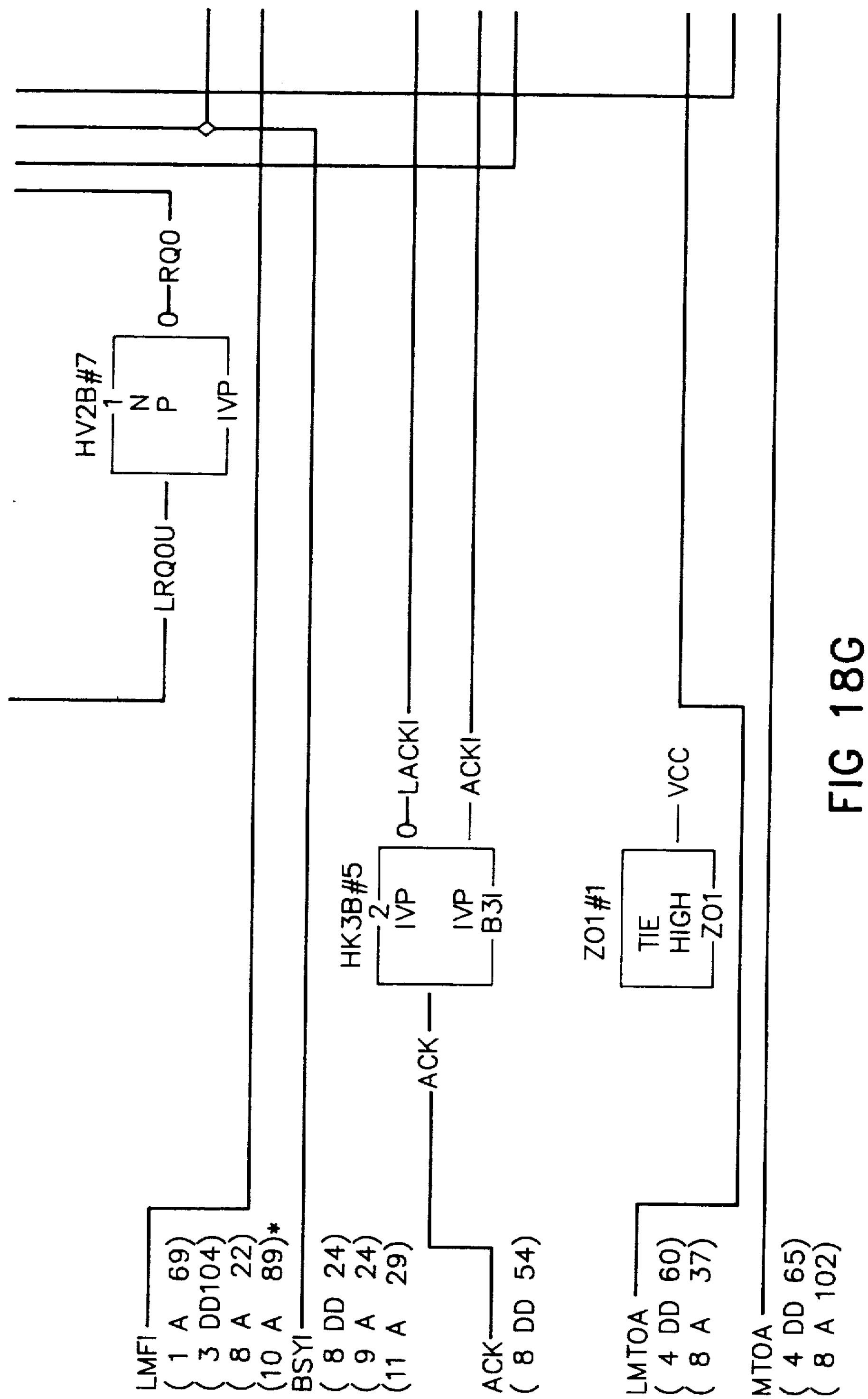
Figure 18H:
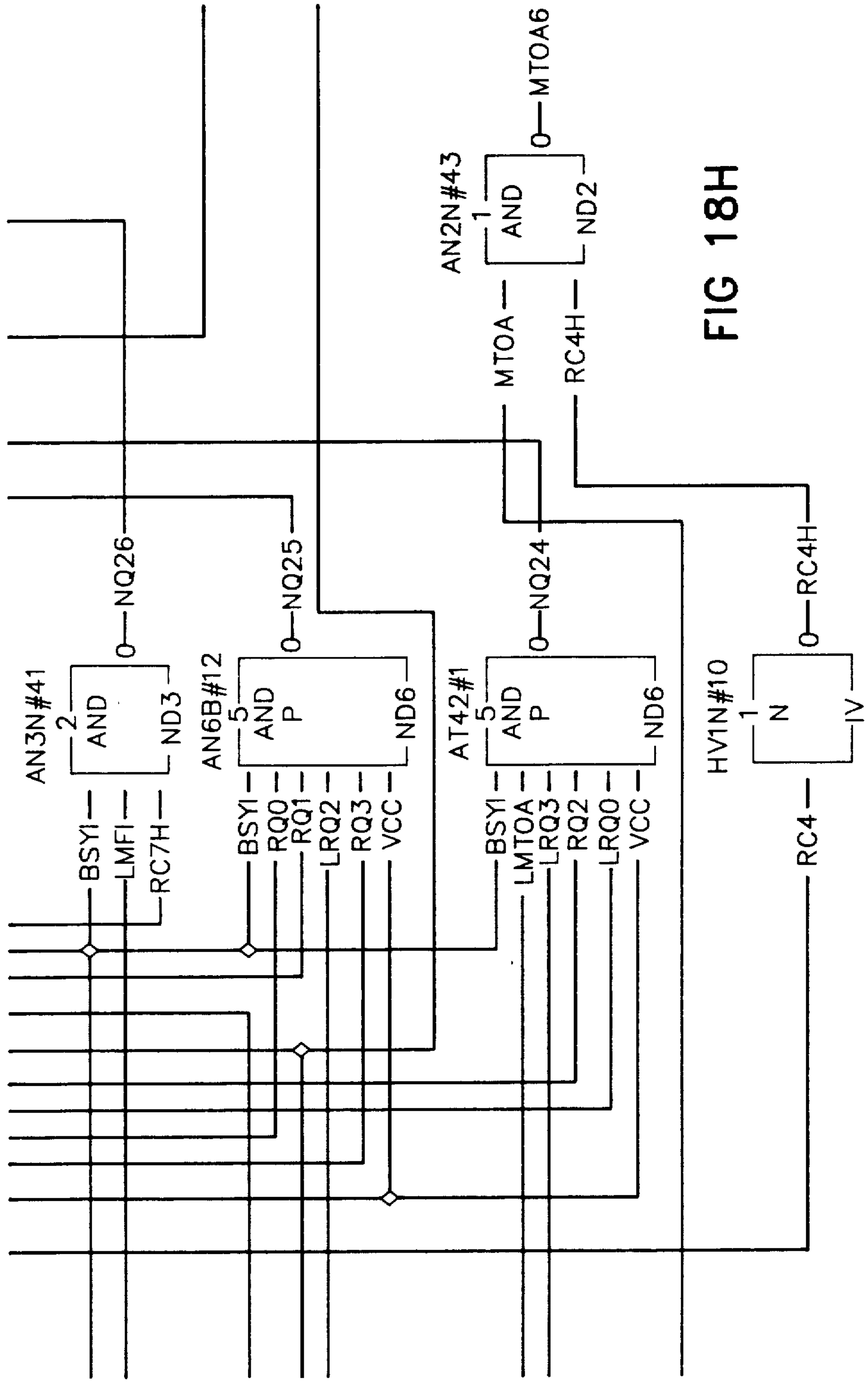
Figure 18I:
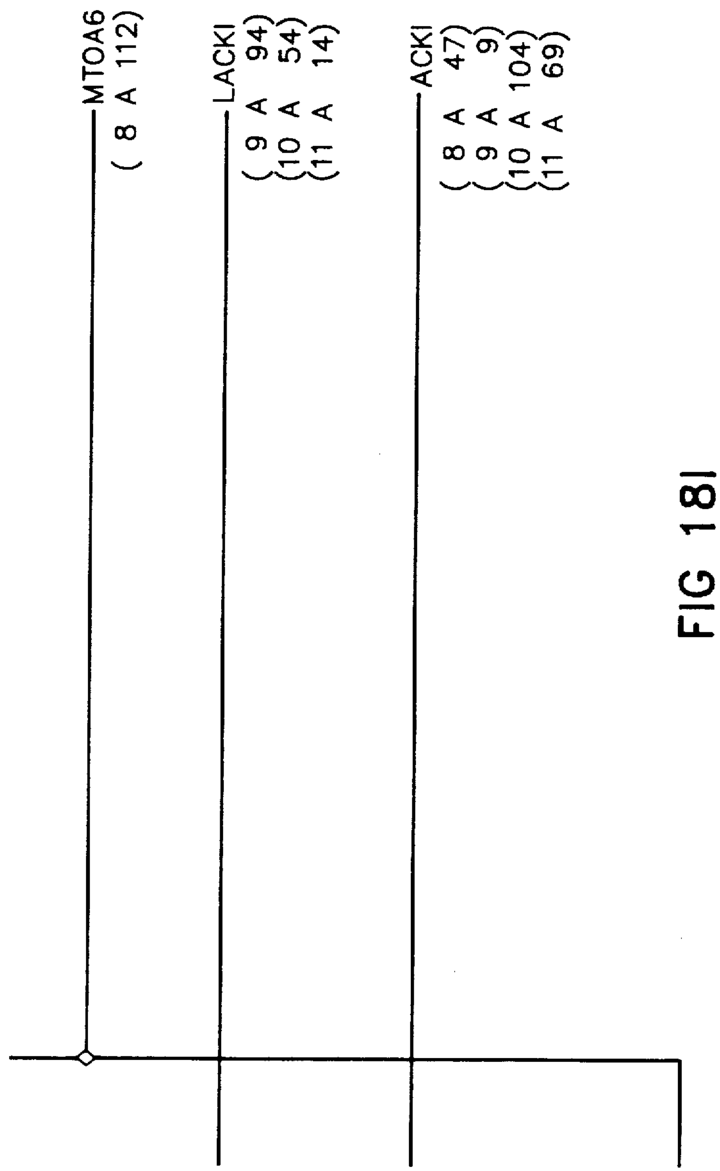
Figure 19A:
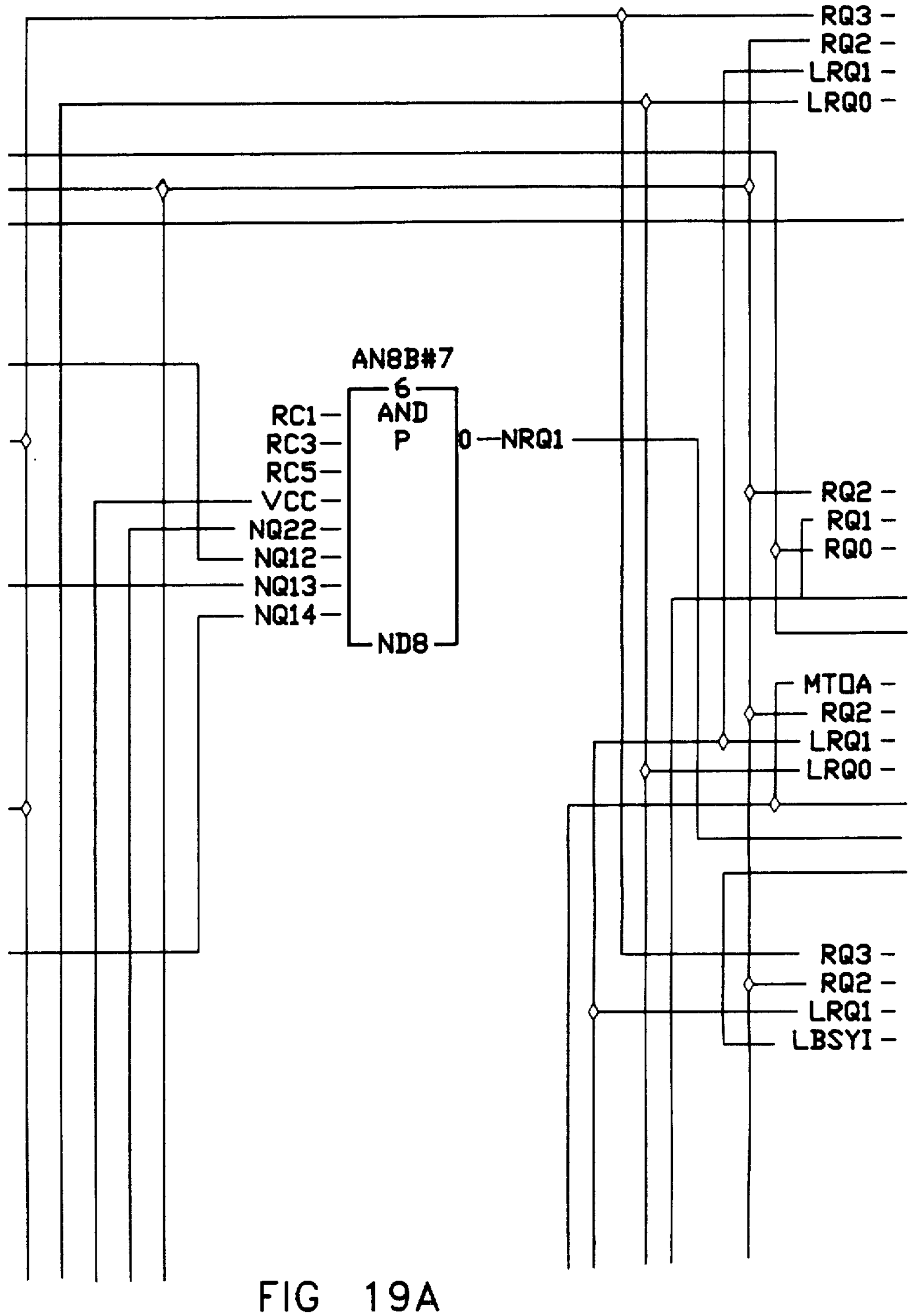
Figure 19B:
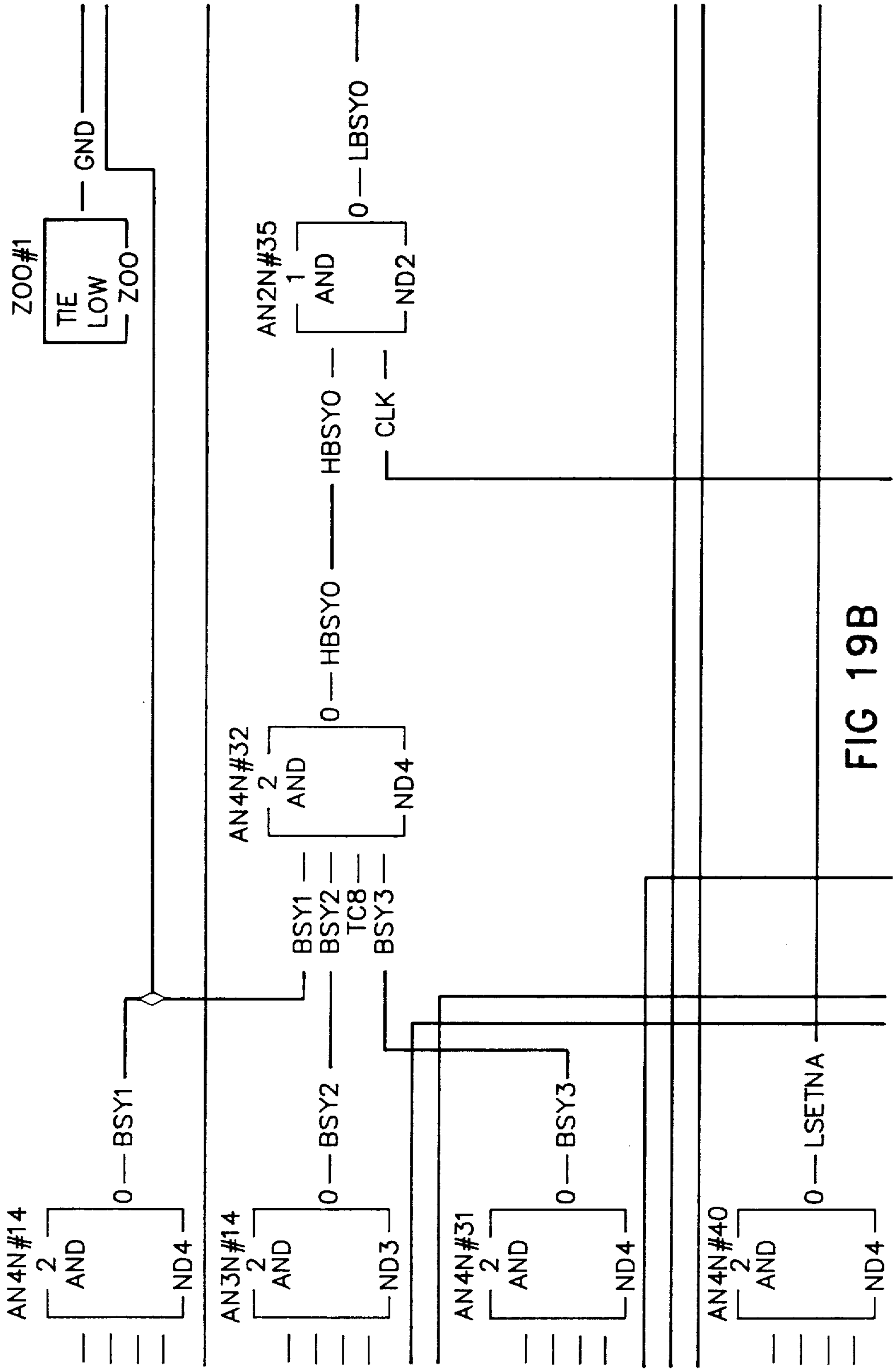
Figure 19C:
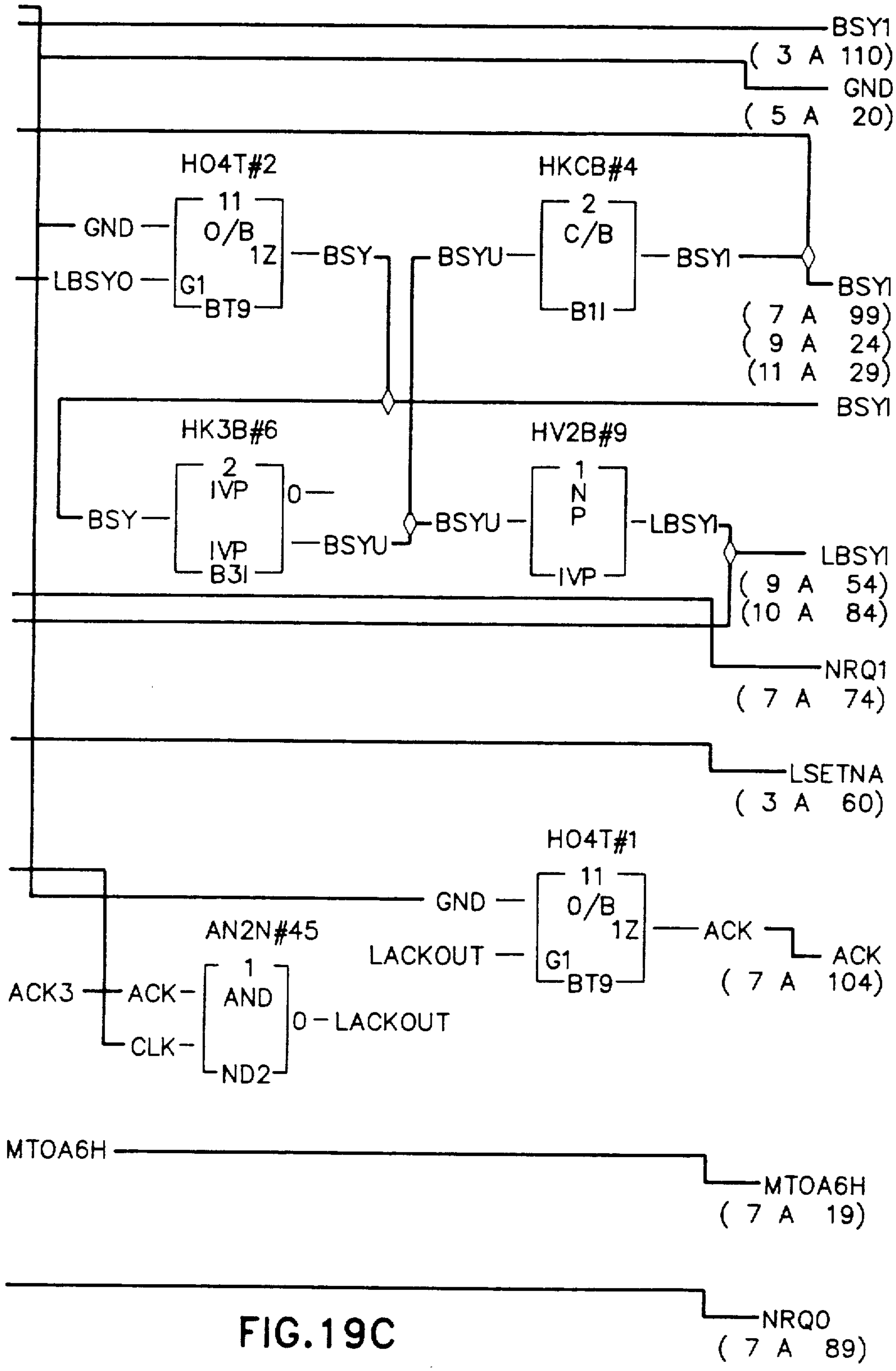
Figure 19E:
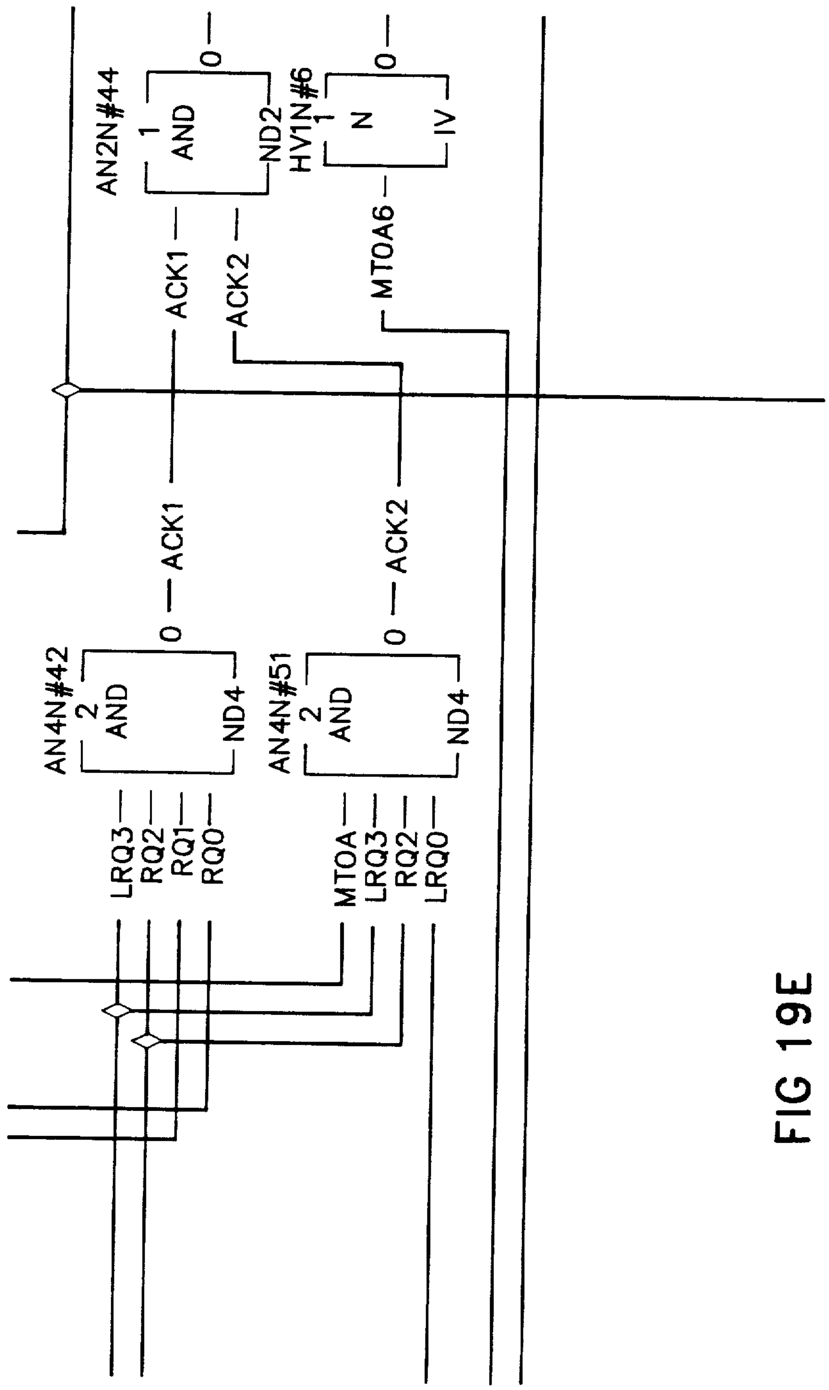
Figure 19F:
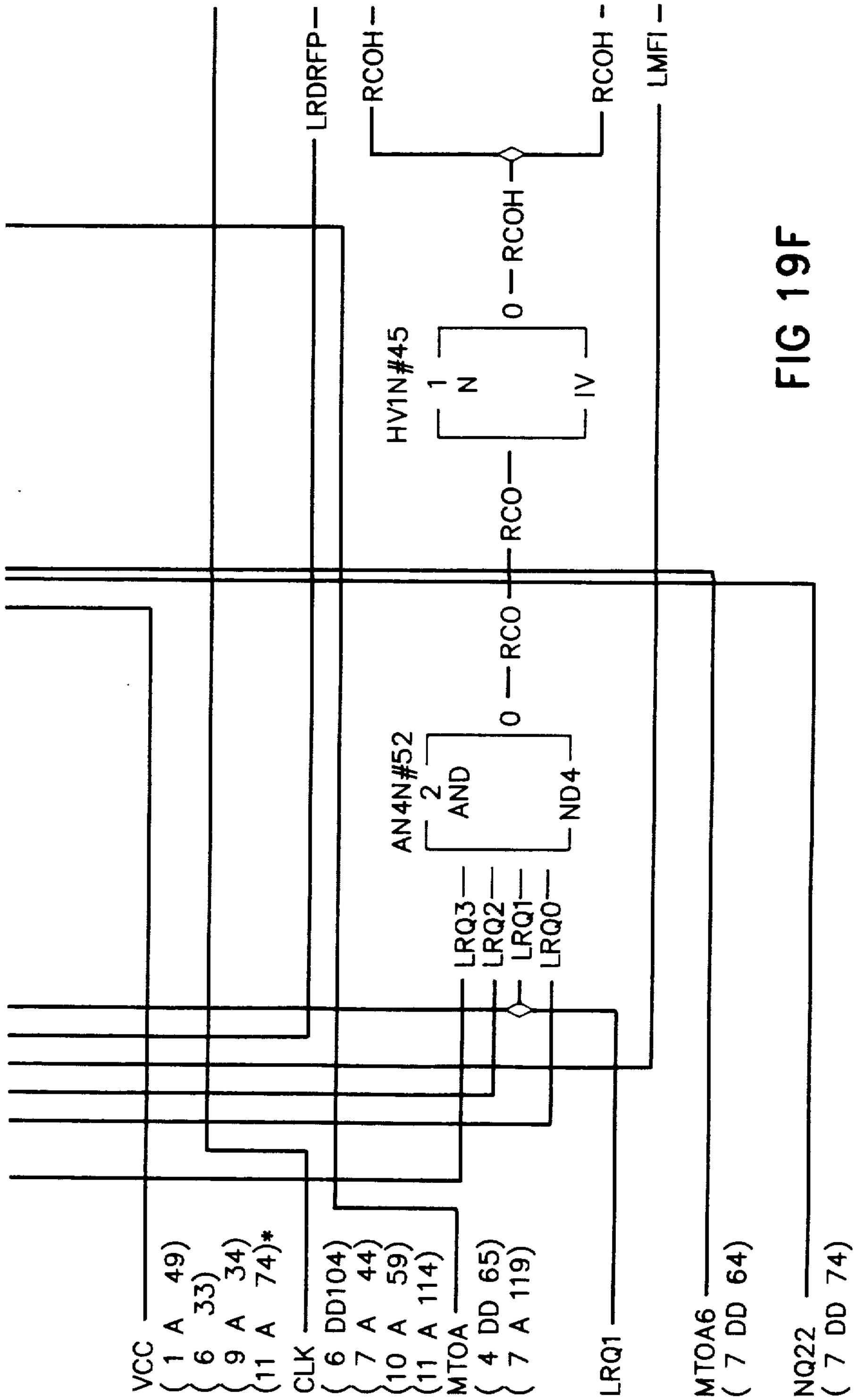
Figure 19G:
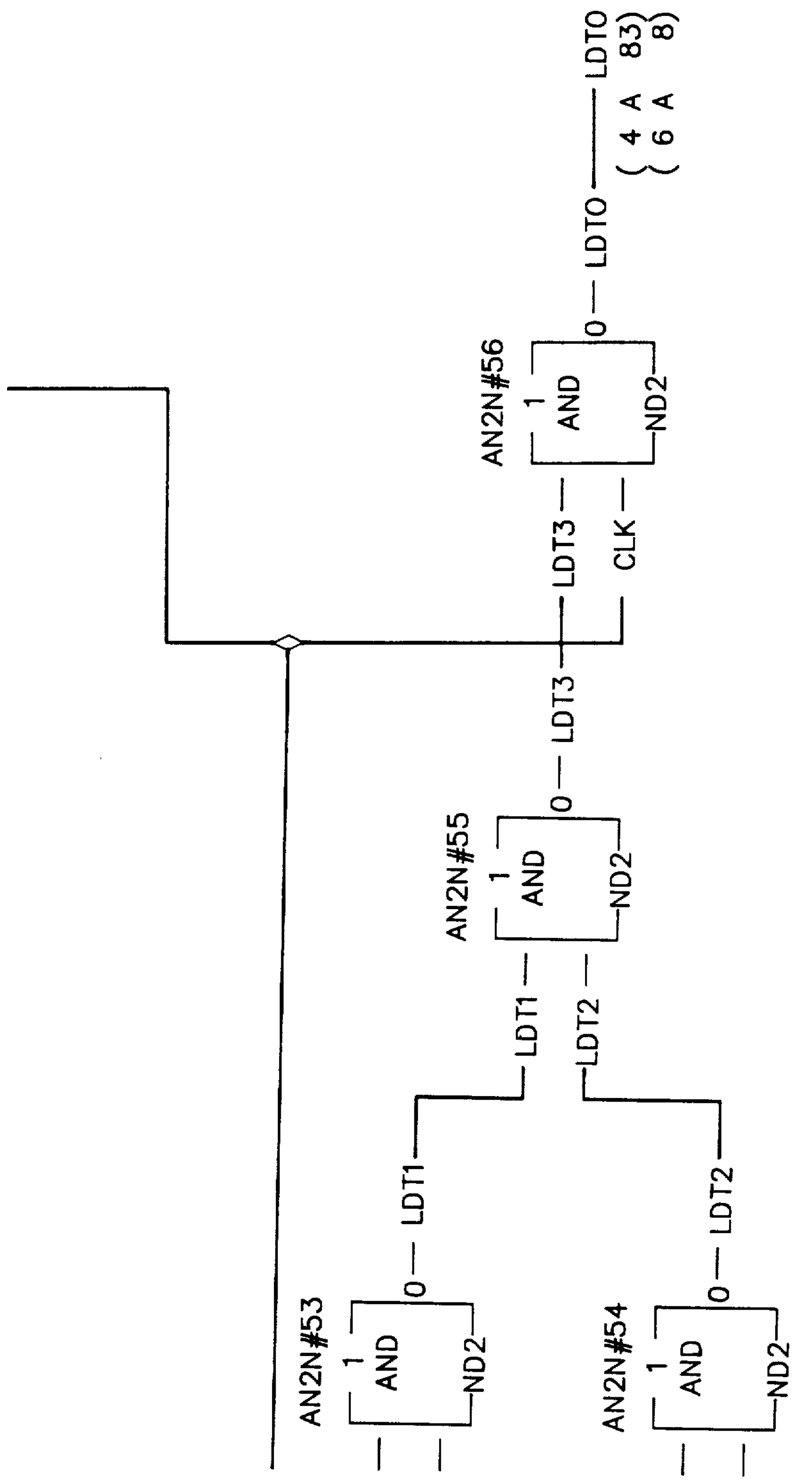
Figure 20B:
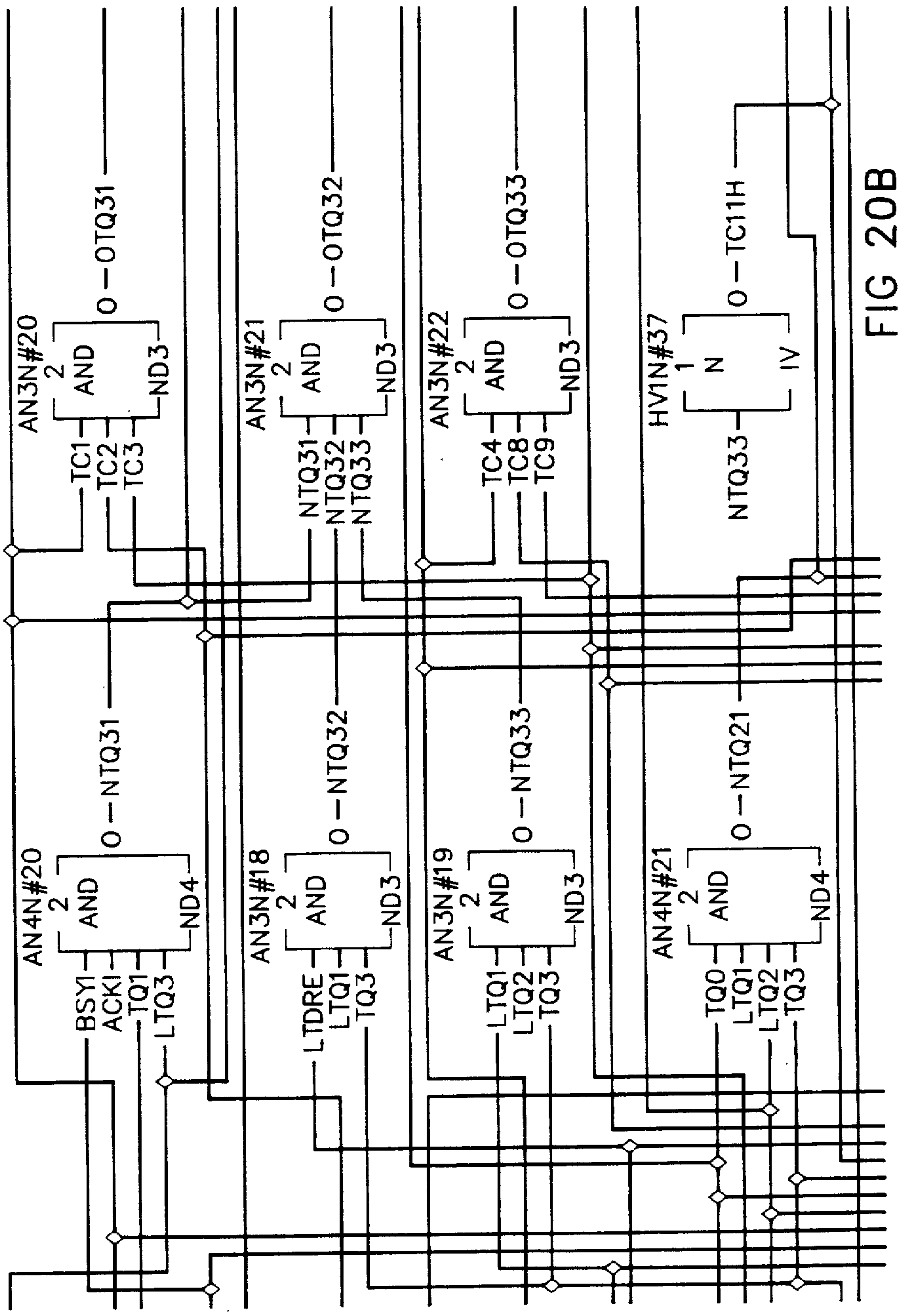
Figure 20C:
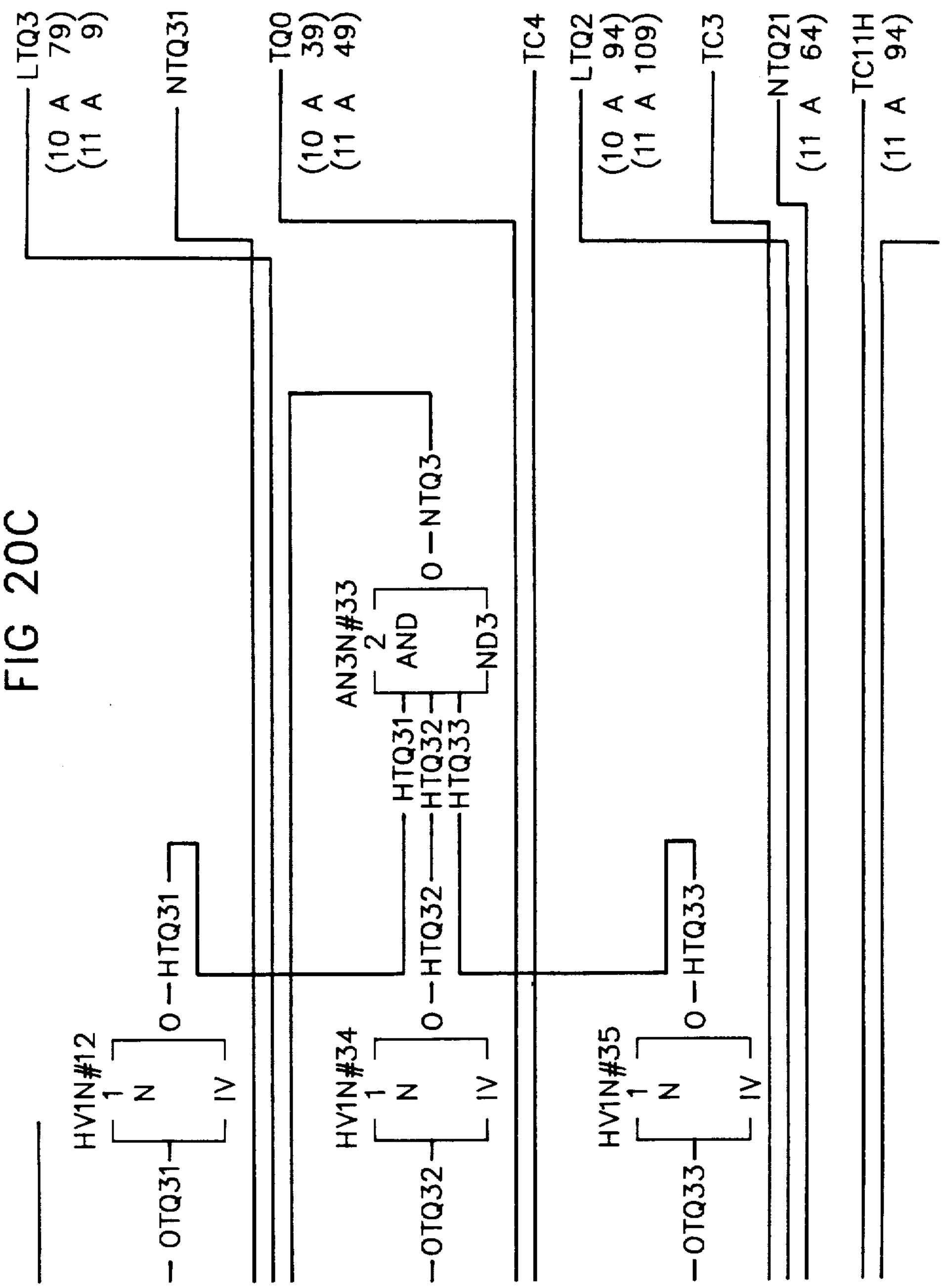
Figure 20E:
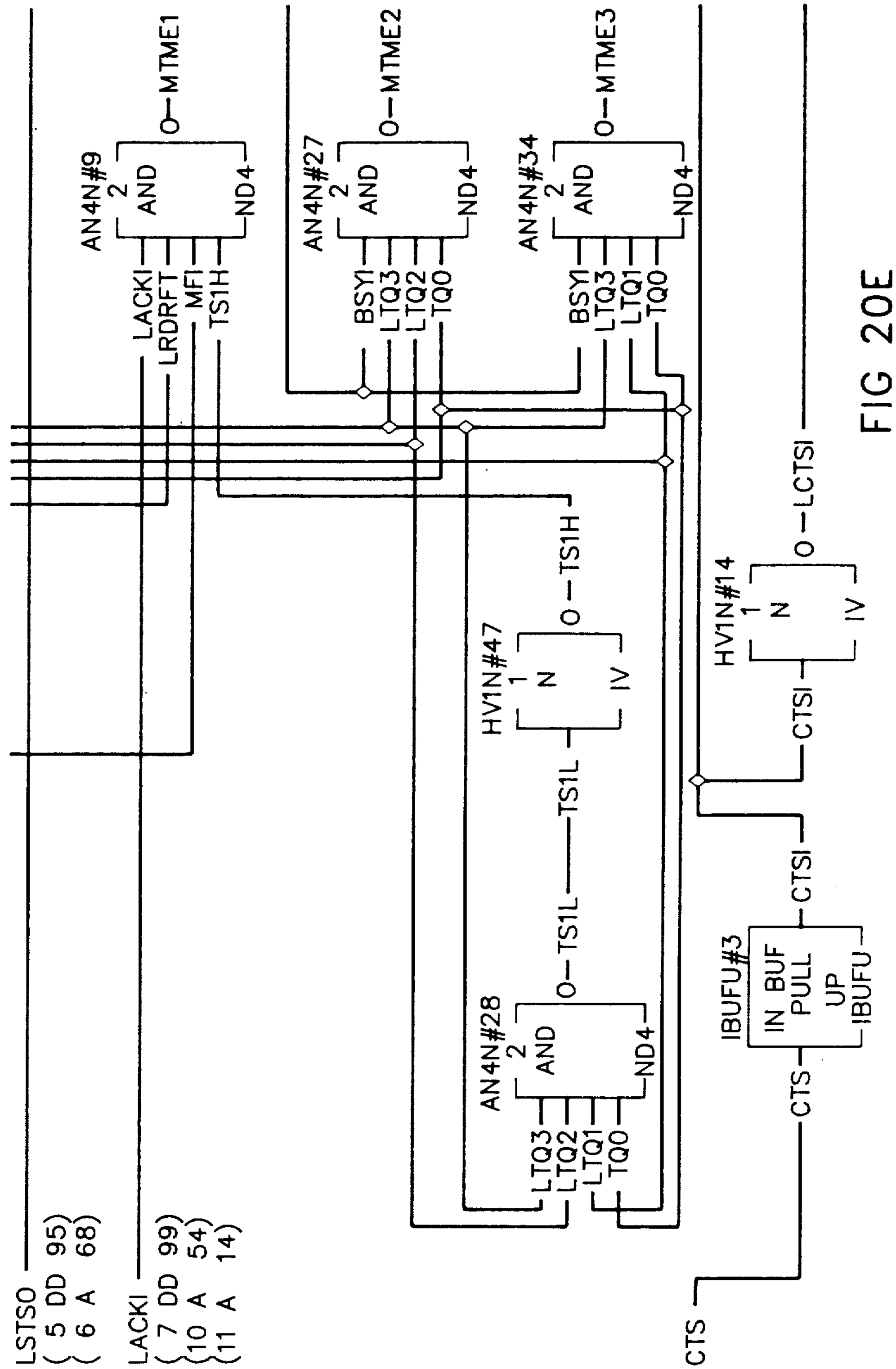
Figure 20G:
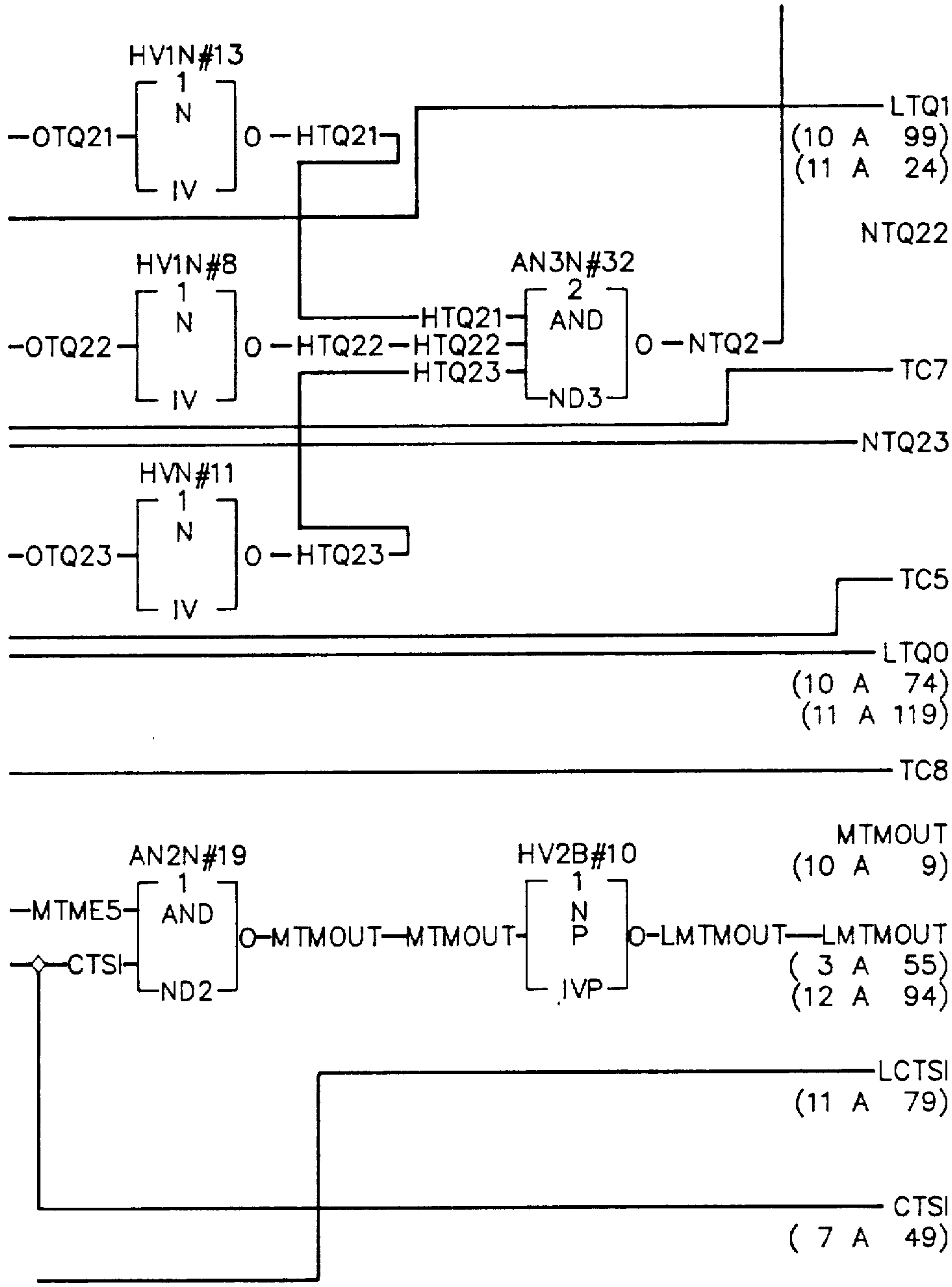
Figure 21A:
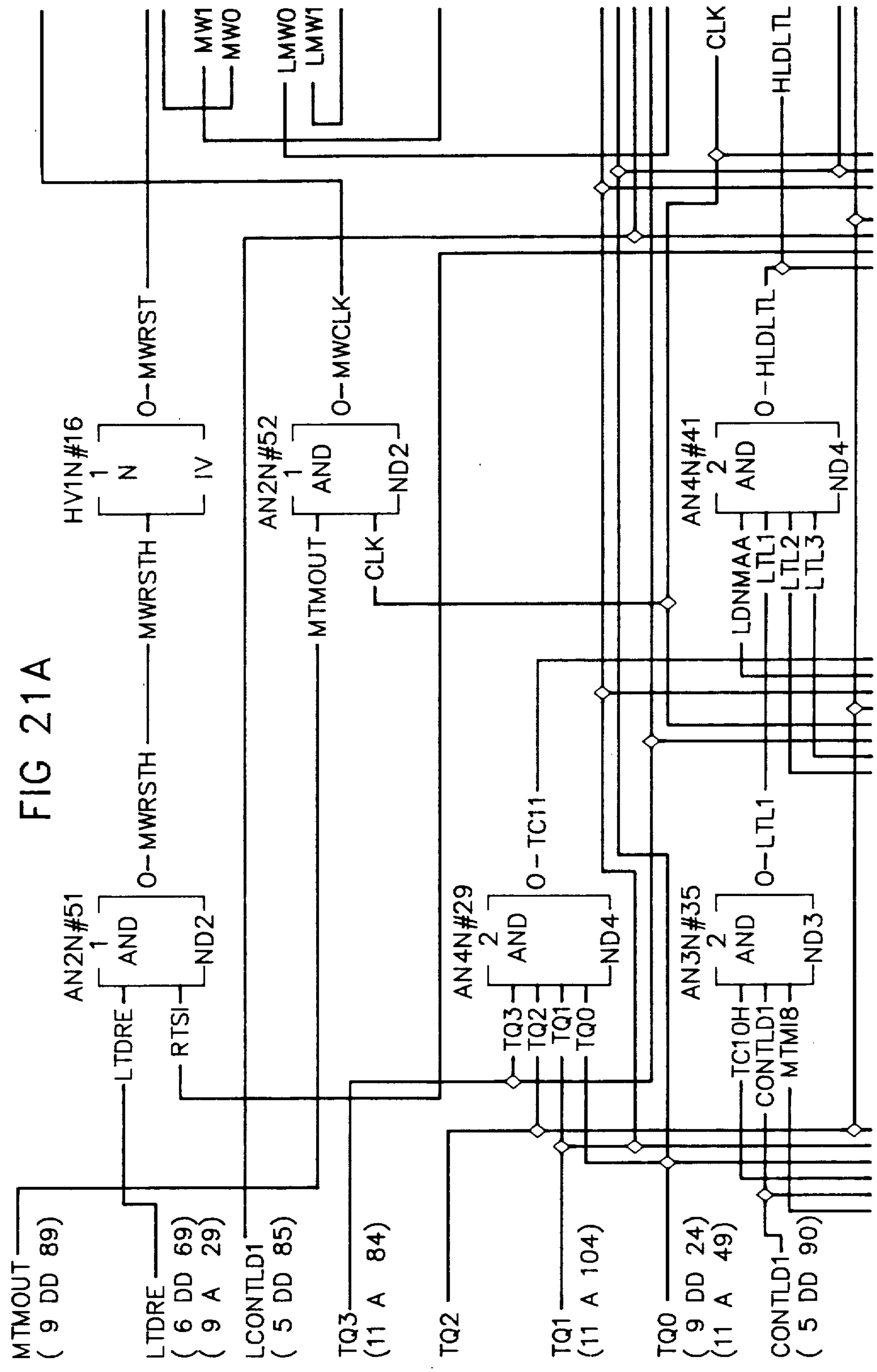
Figure 21C:
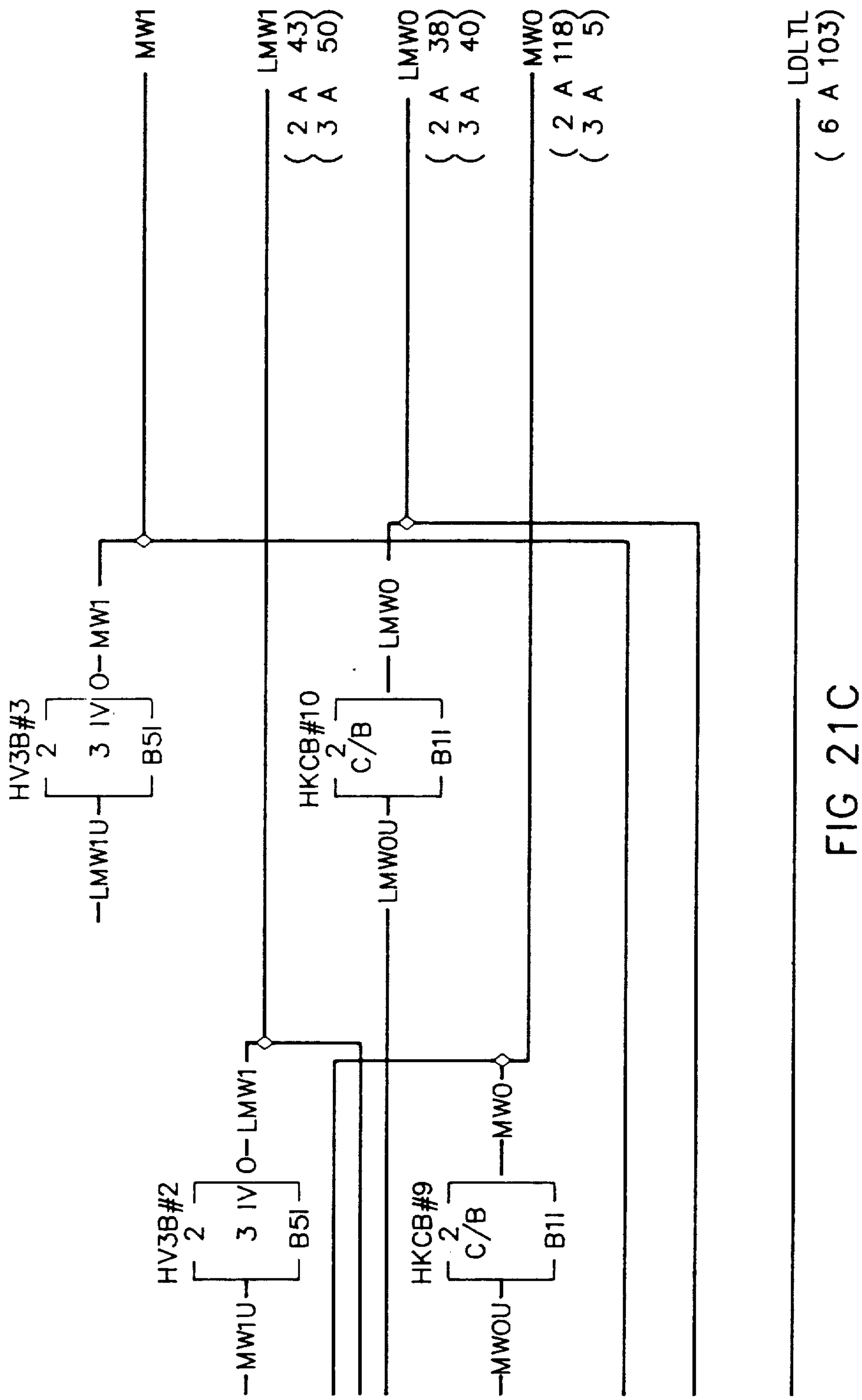
Figure 21E:
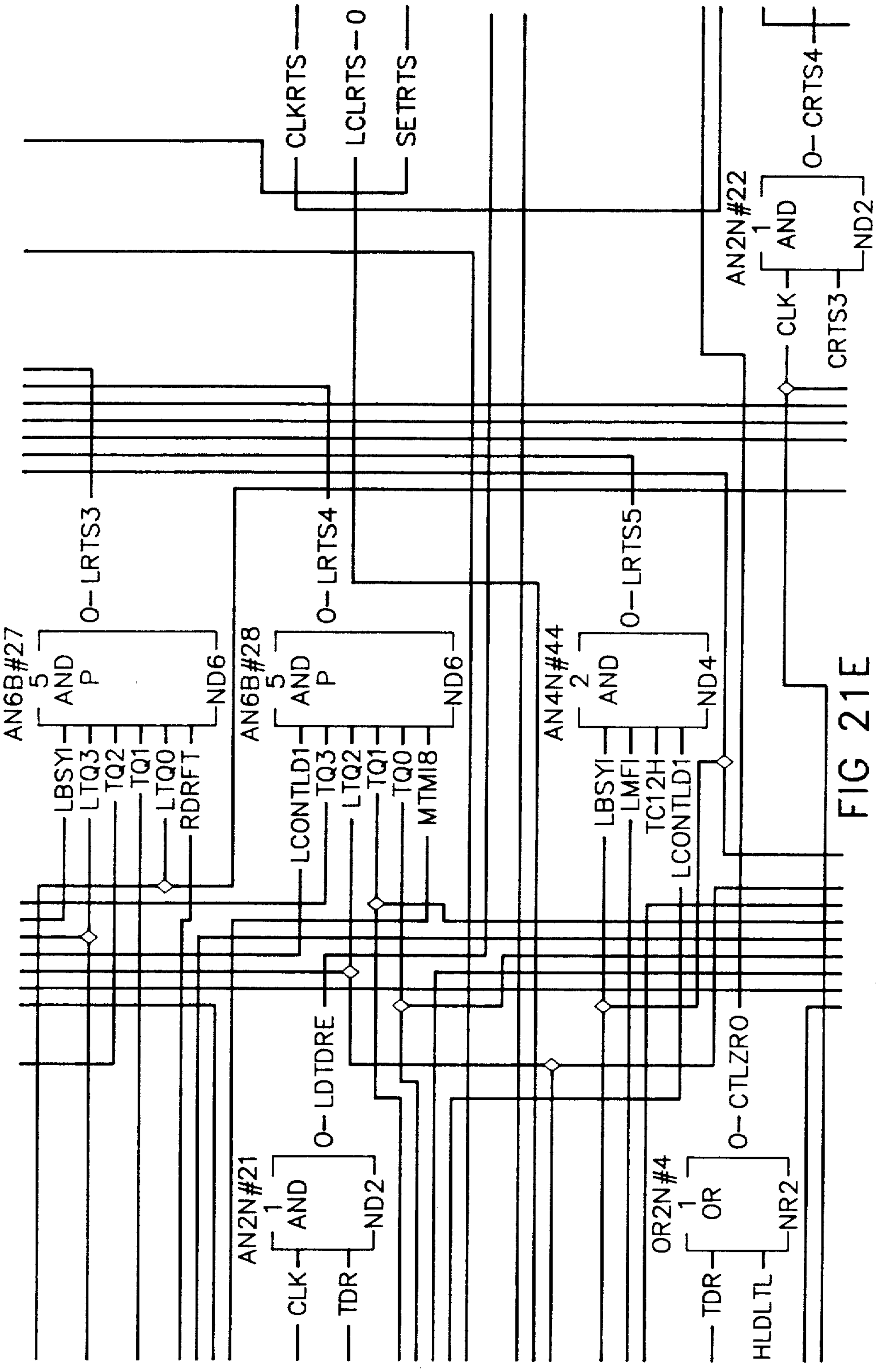
Figure 21F:
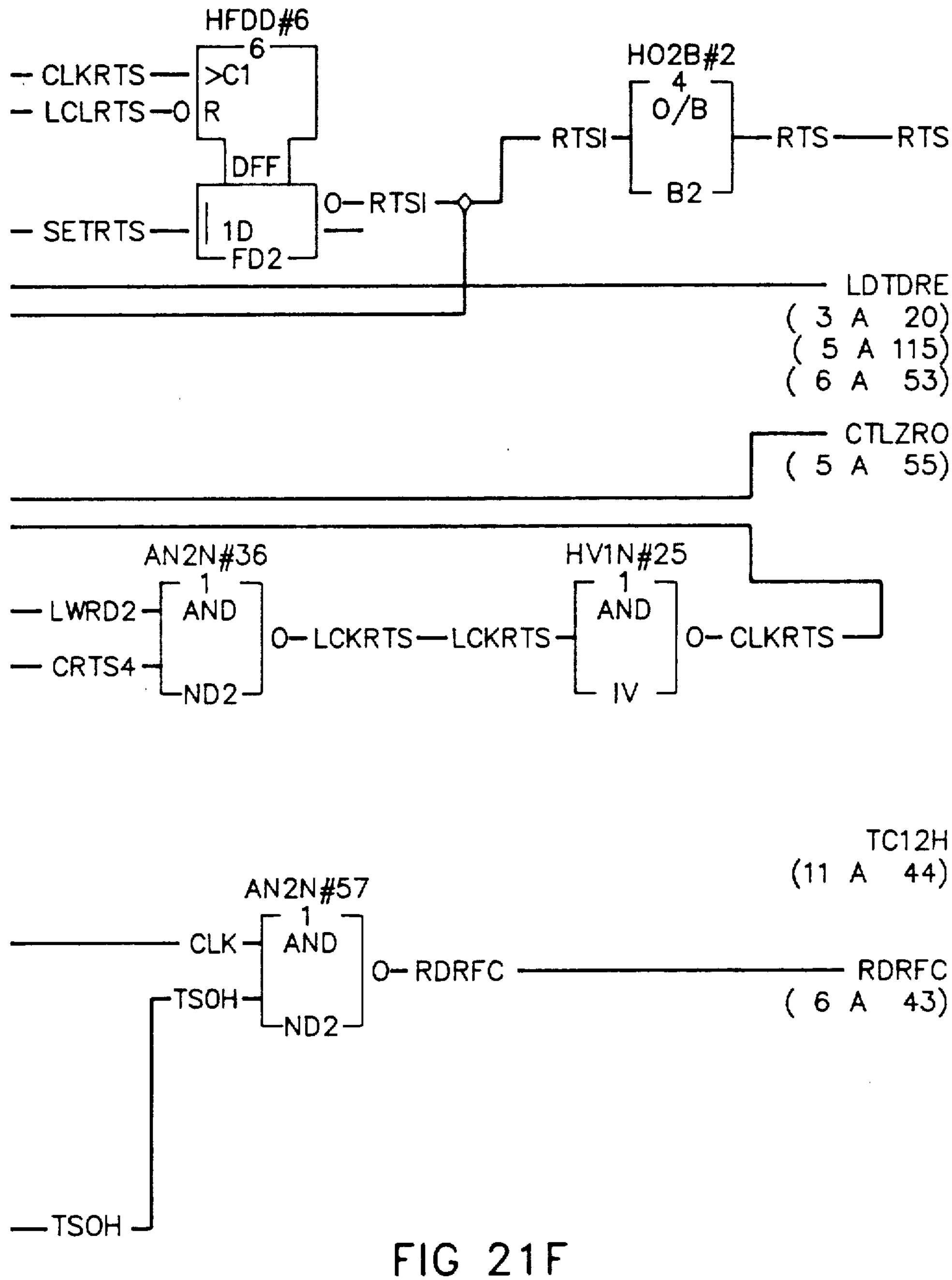
Figure 21G:
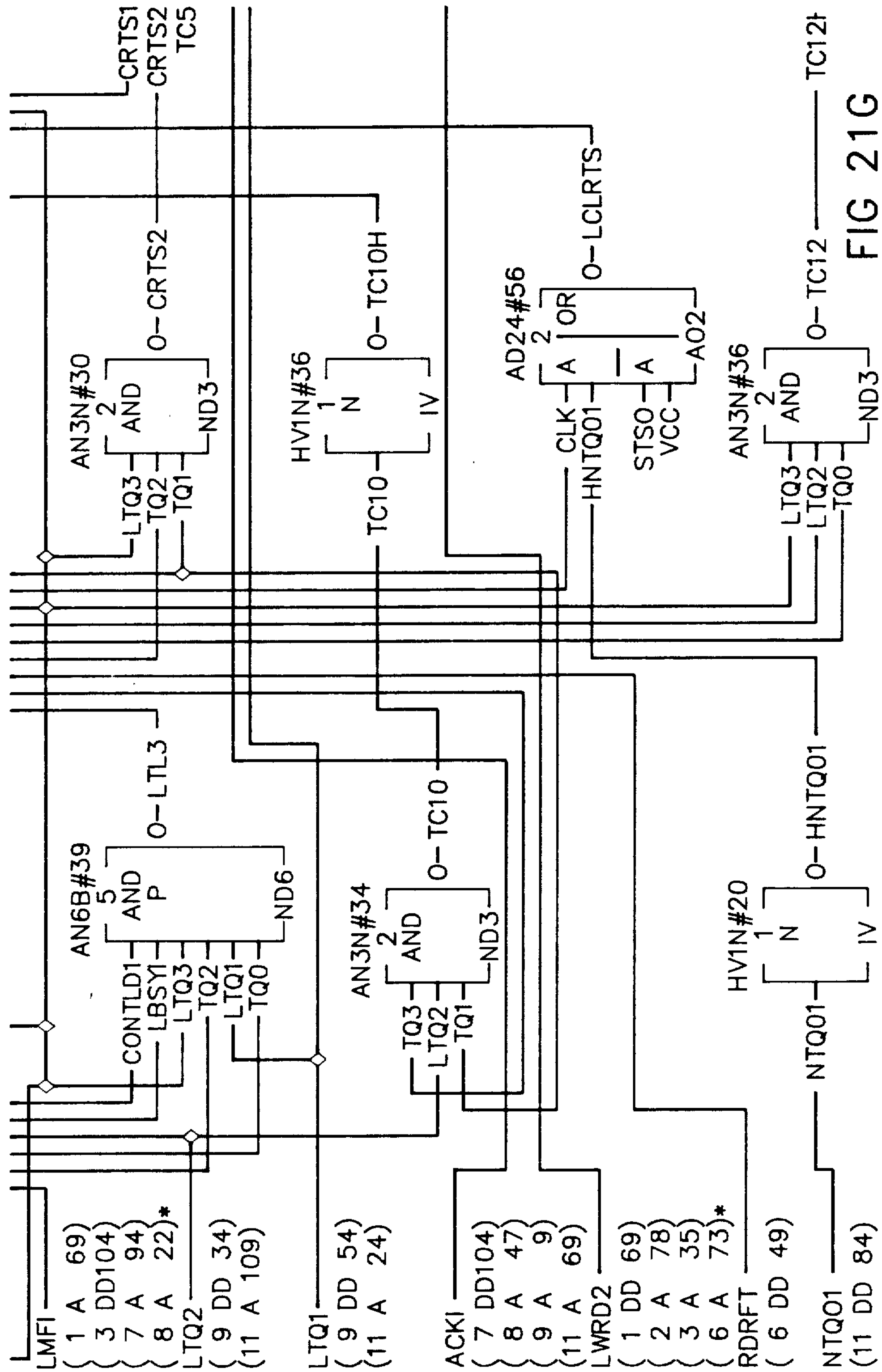
Figure 21H:
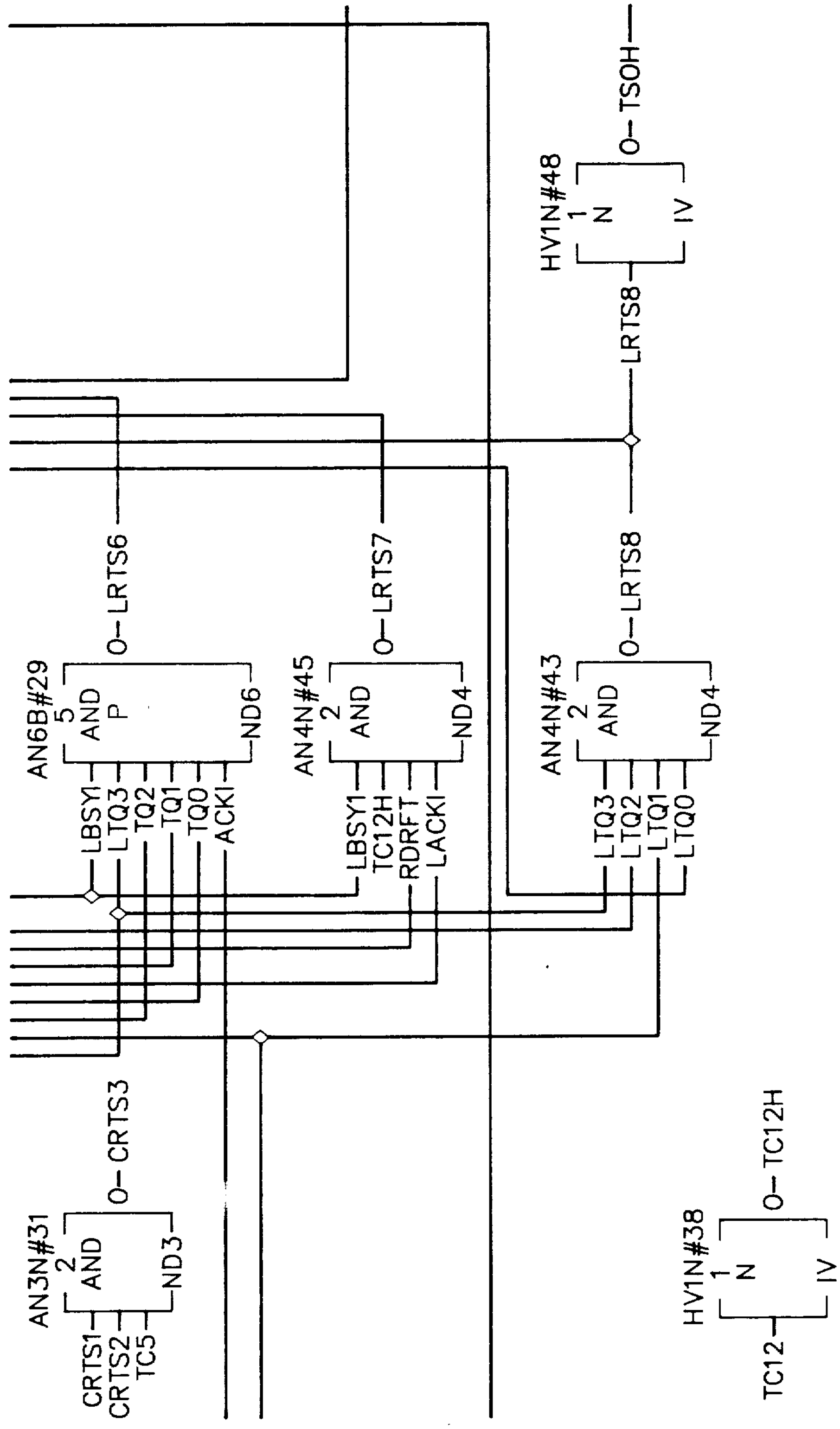
Figure 22A:
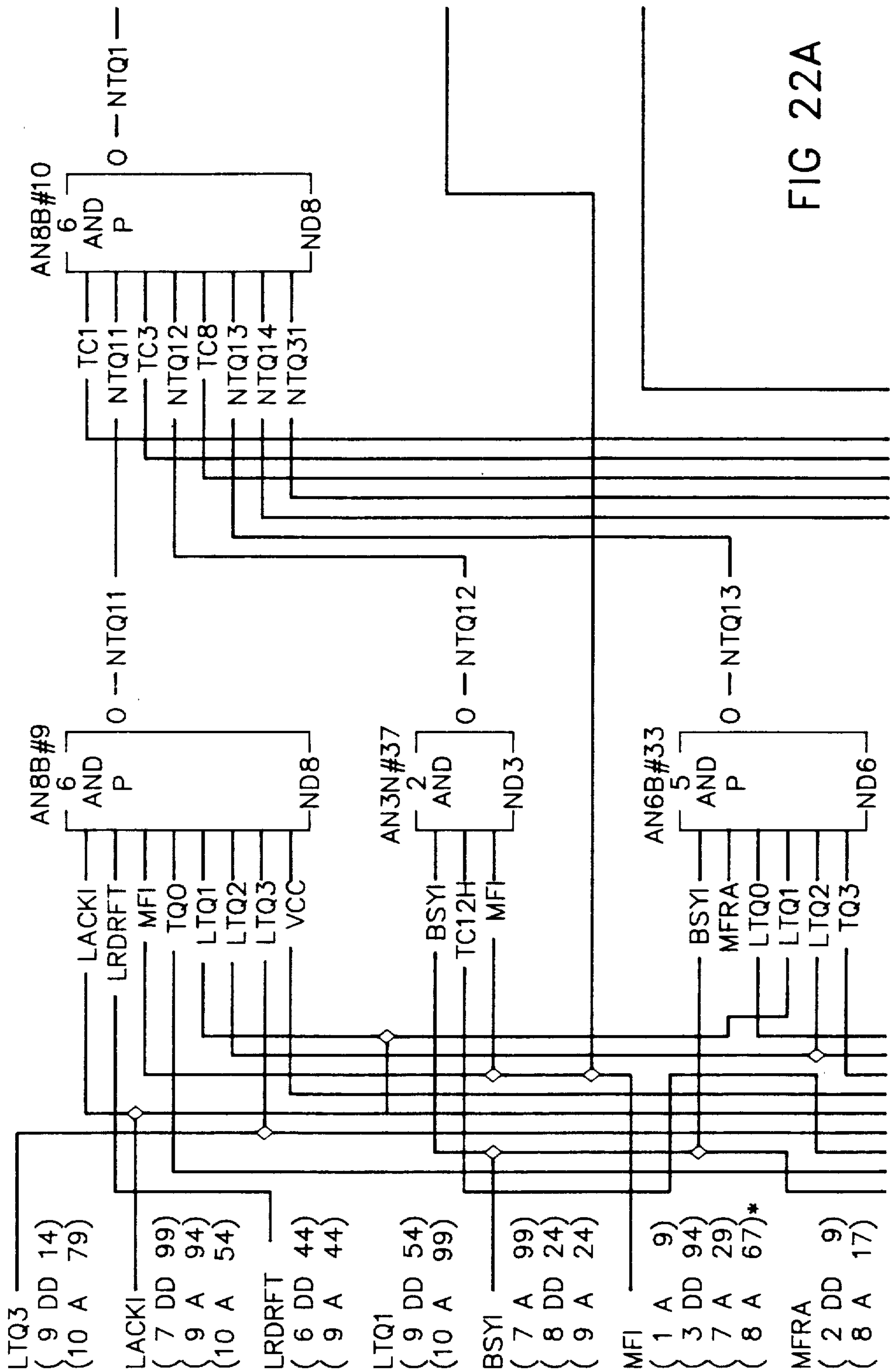
Figure 22B:
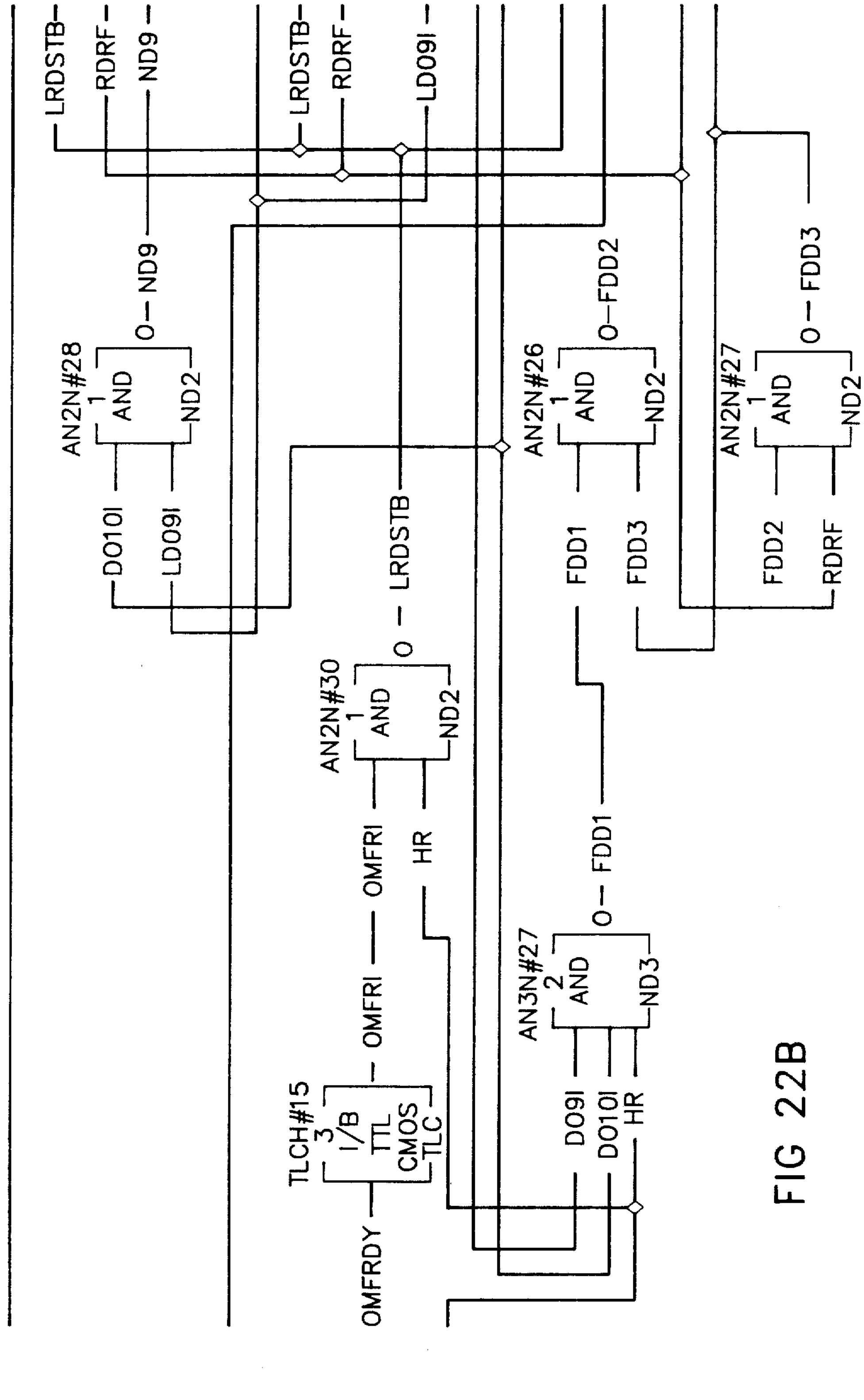
Figure 22C:
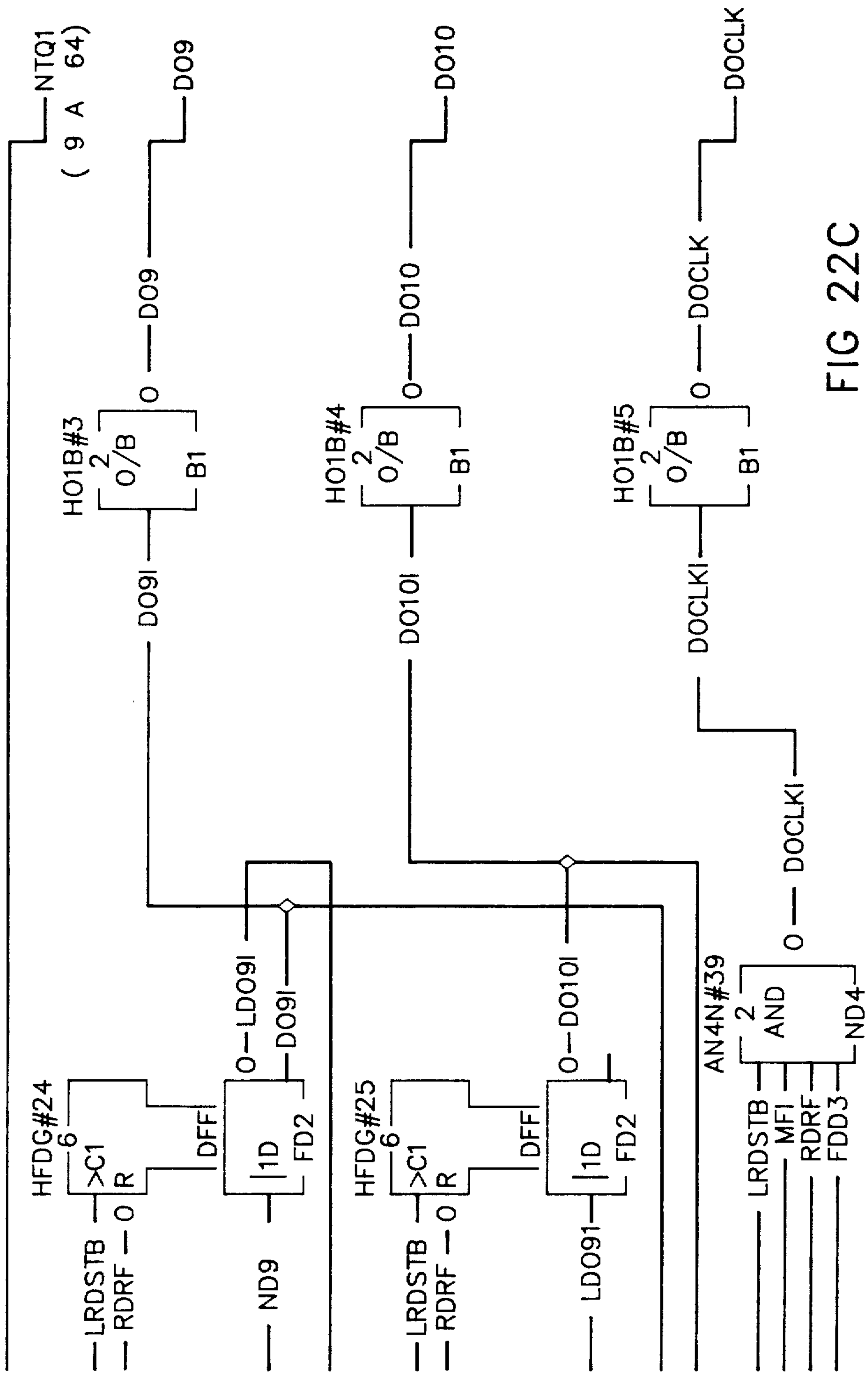
Figure 22D:
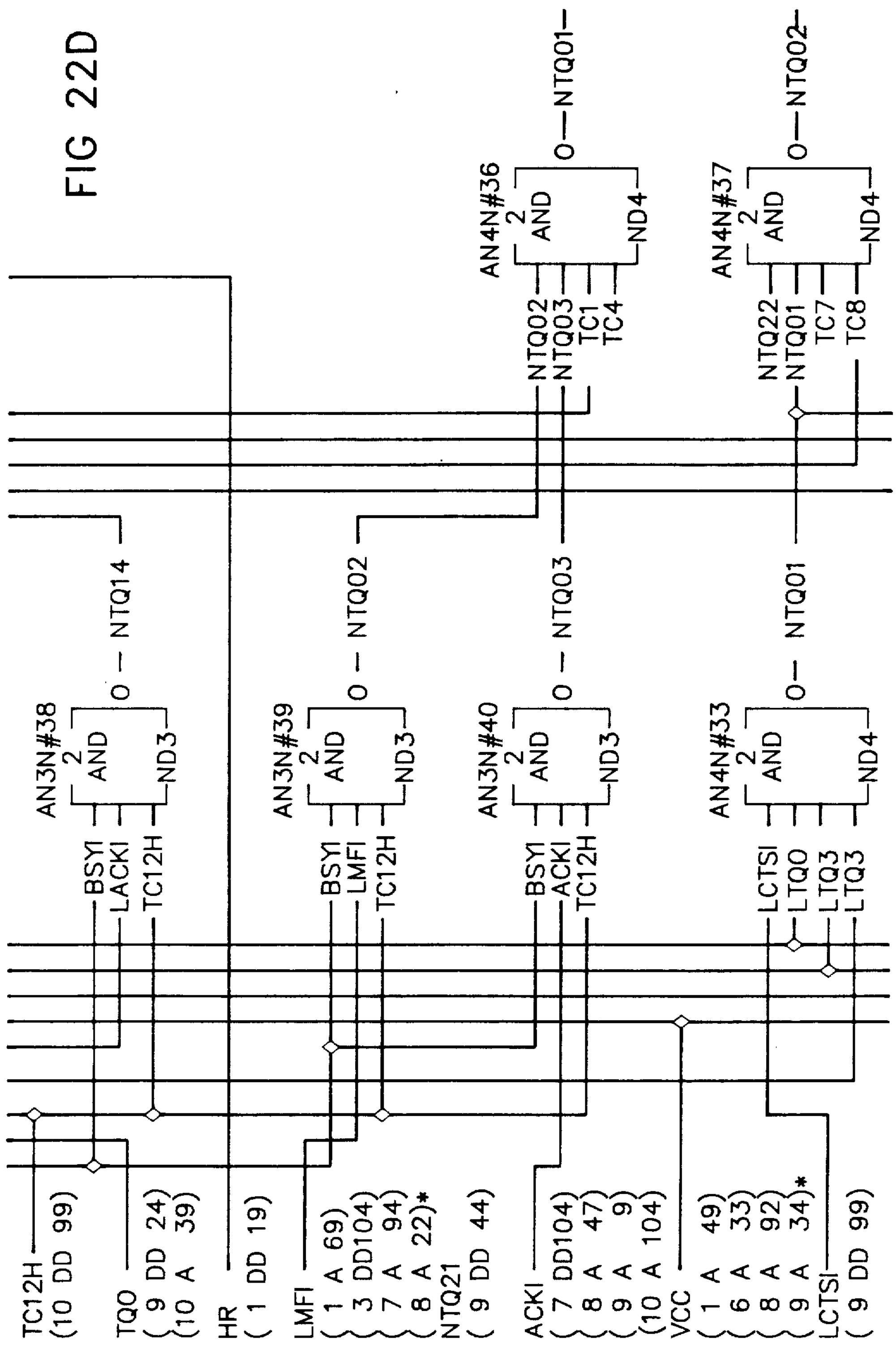
Figure 22E:
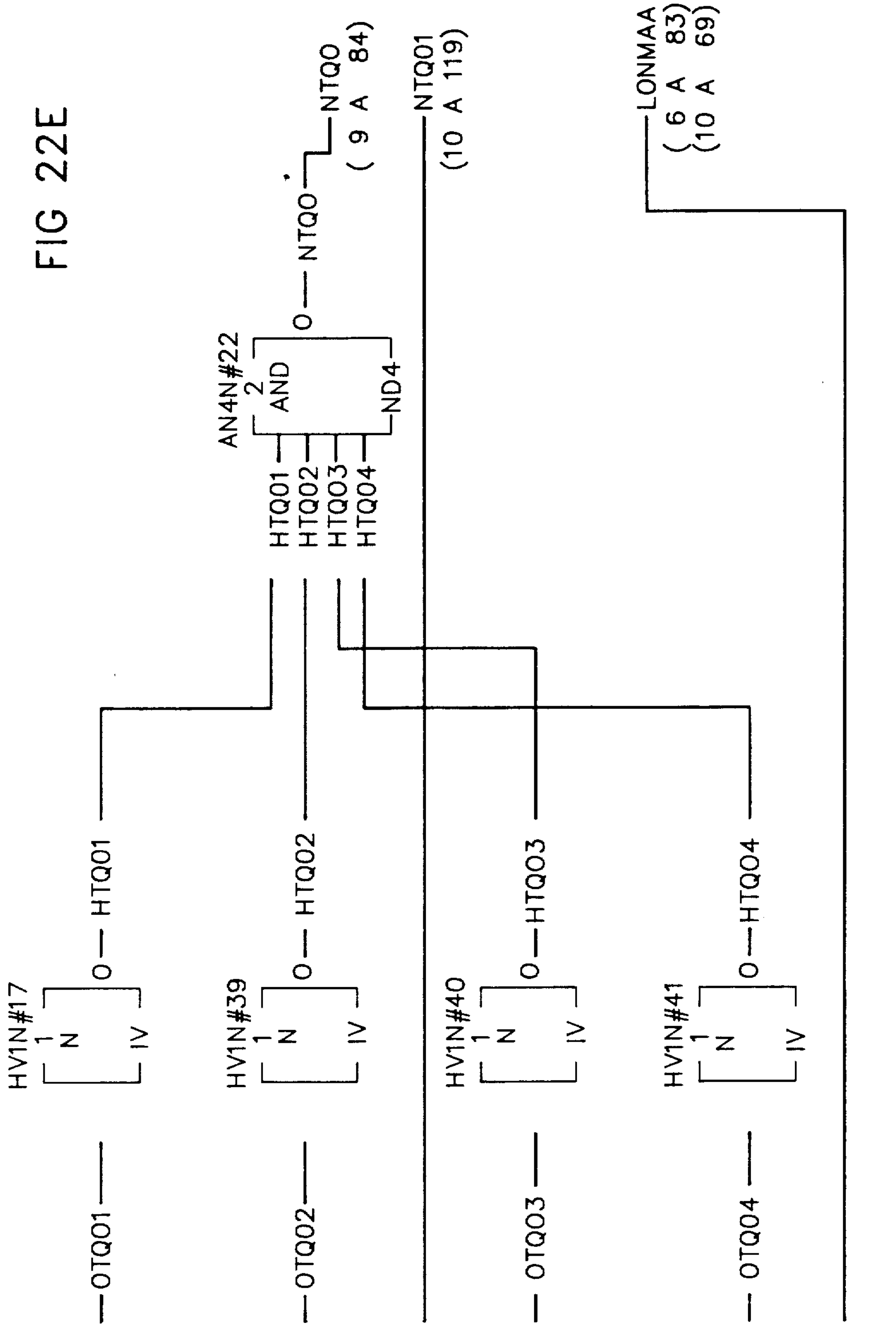
Figure 22F:
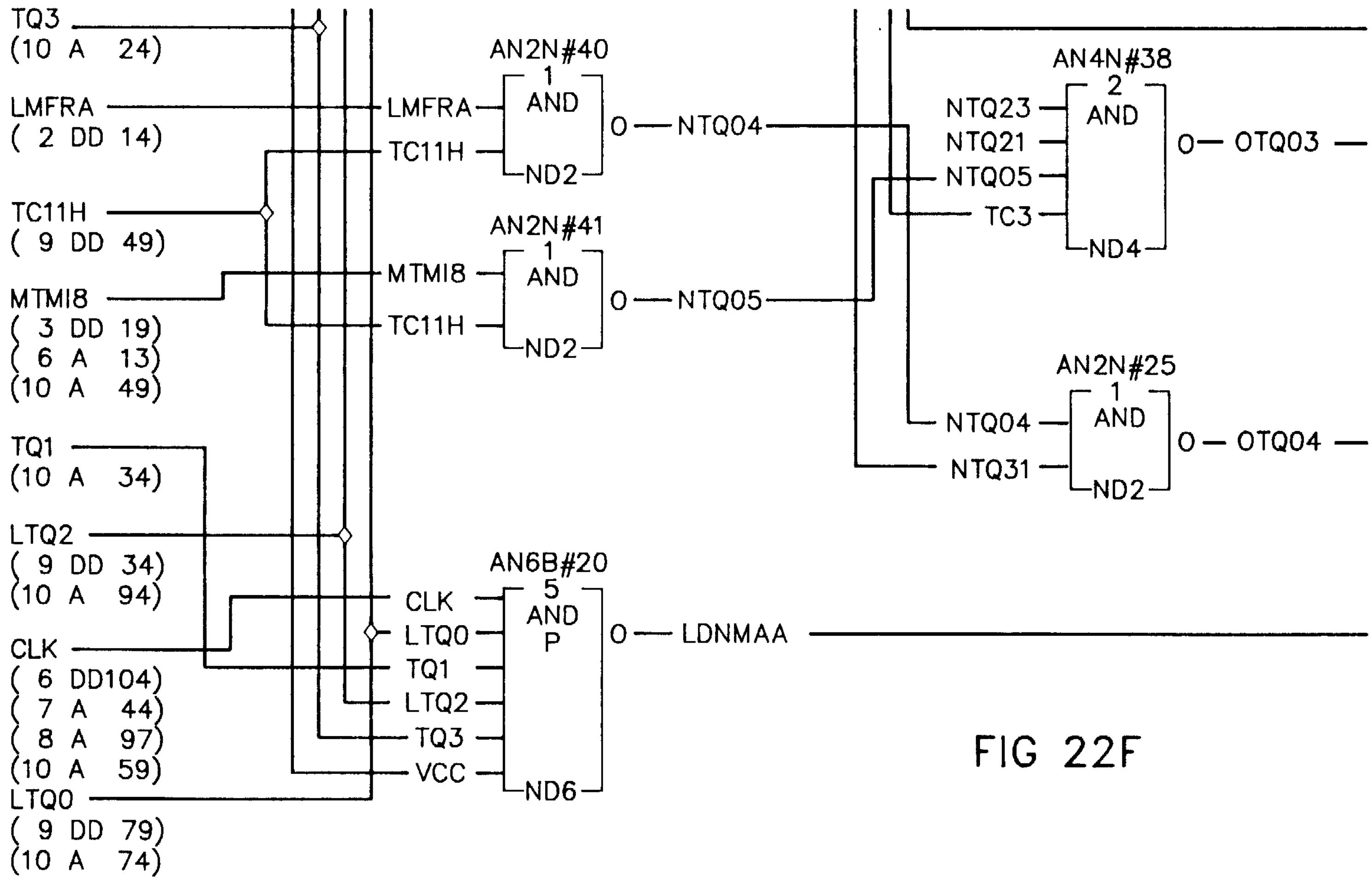
Figure 23A:
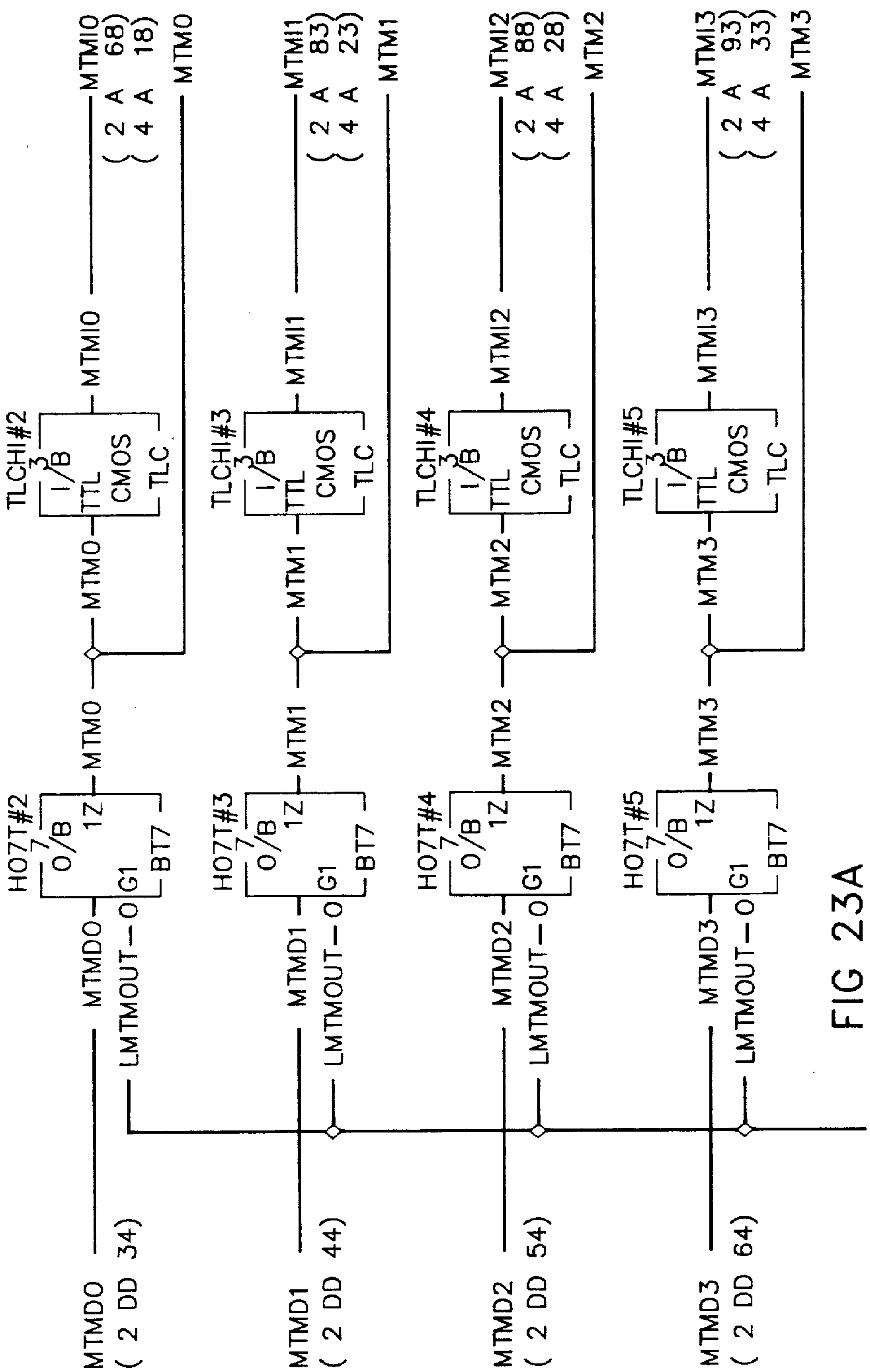
Figure 24B:
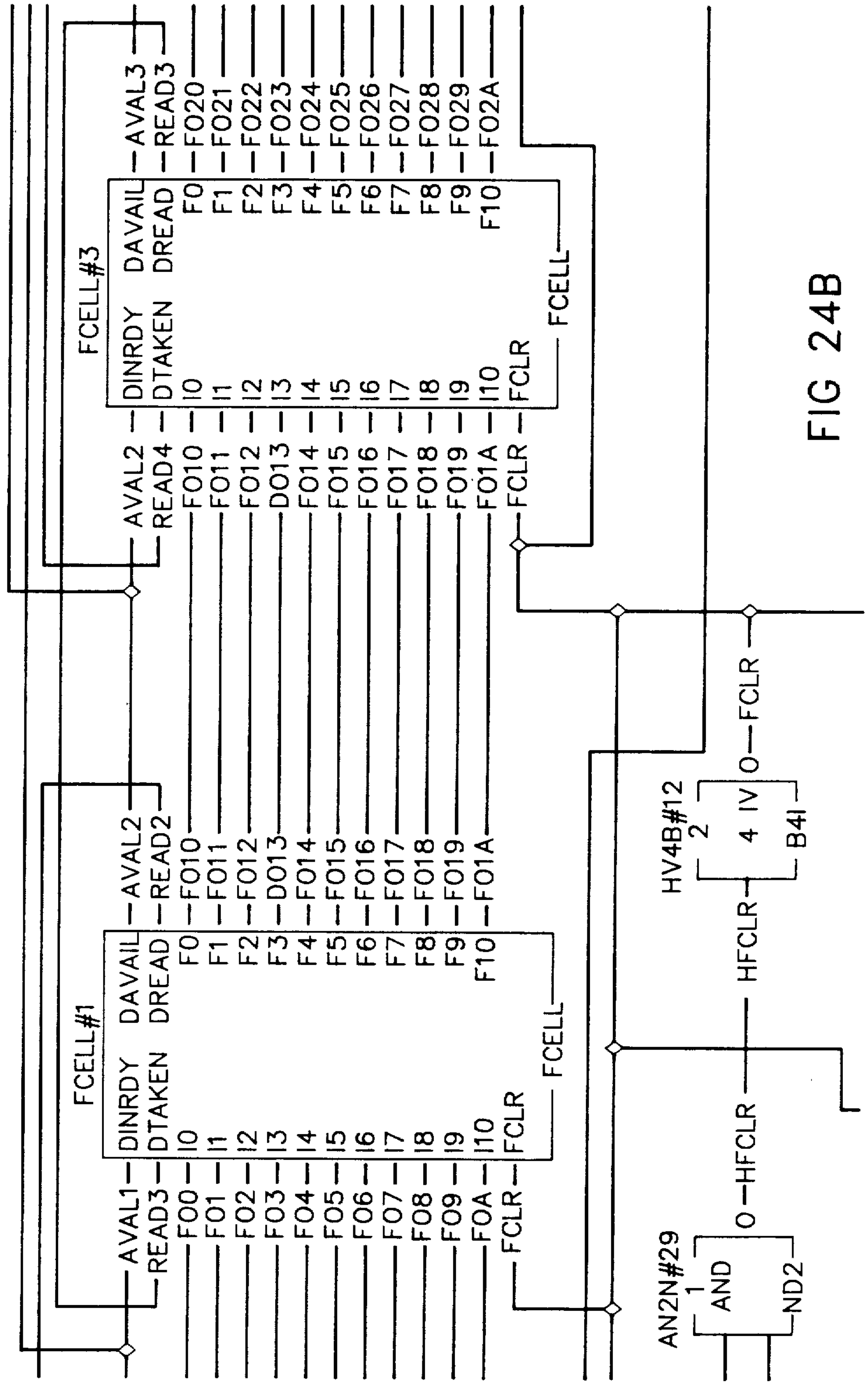
Figure 24C:
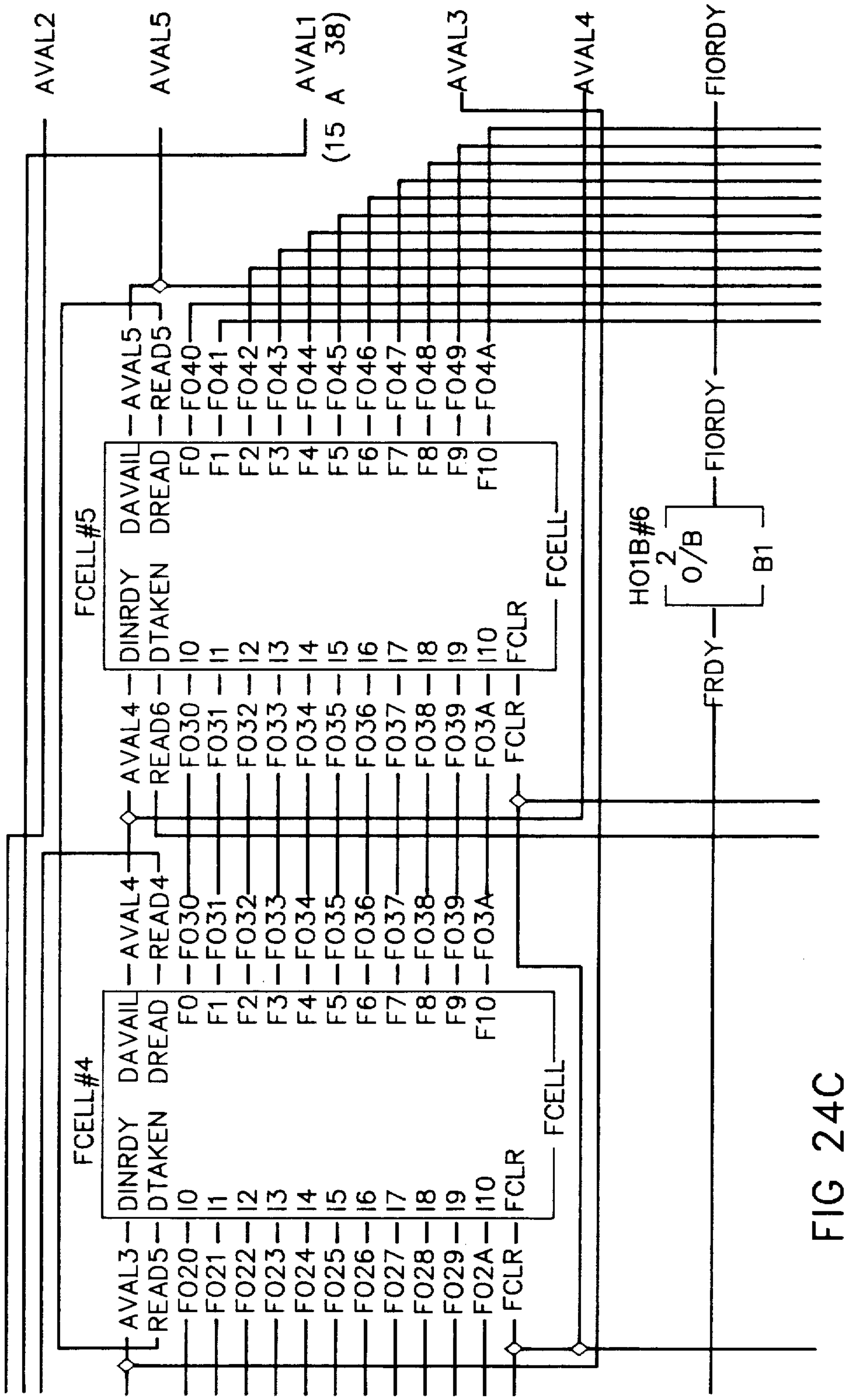
Figure 24D:
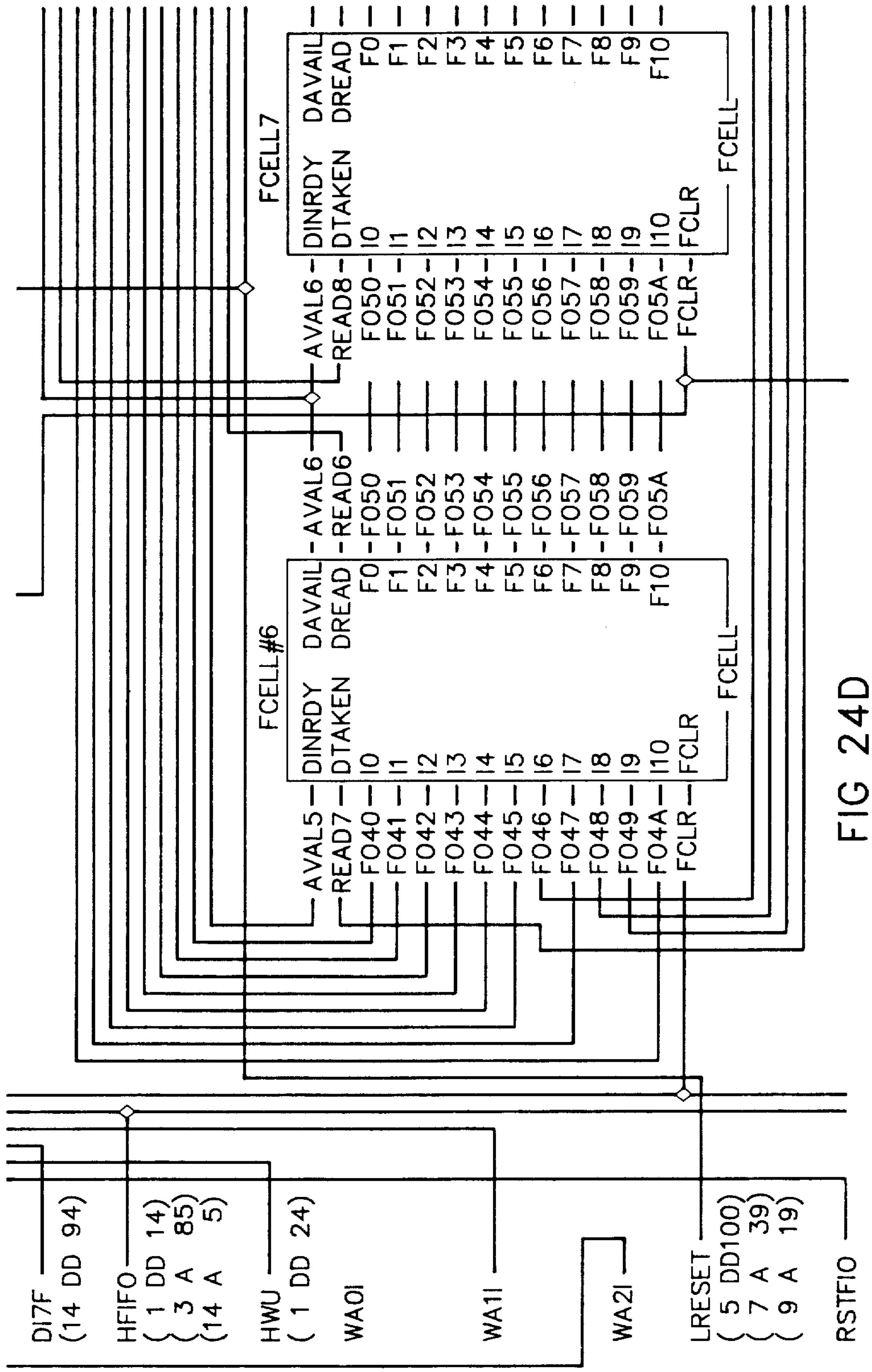
Figure 24E:
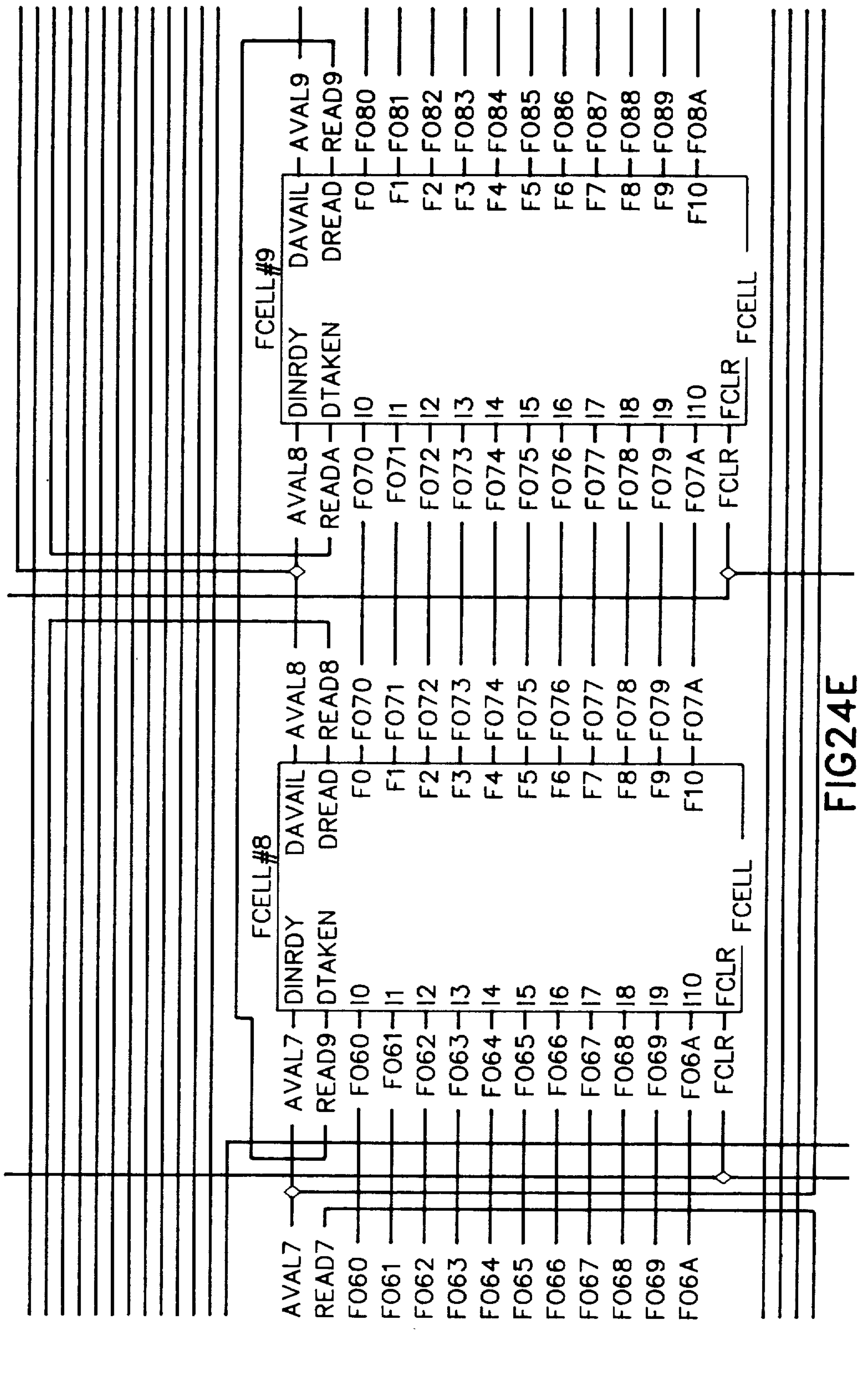
Figure 24G:
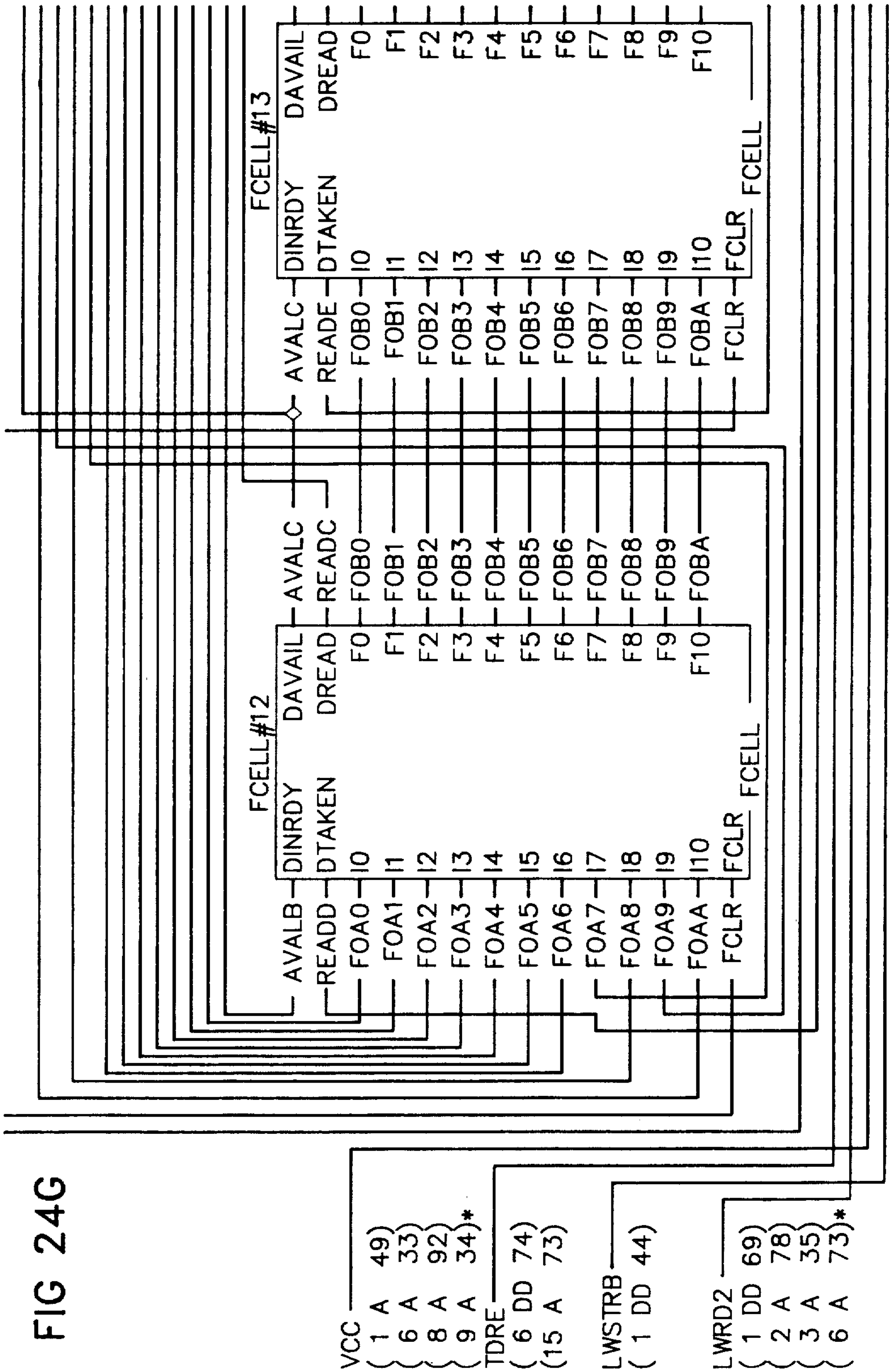
Figure 24I:
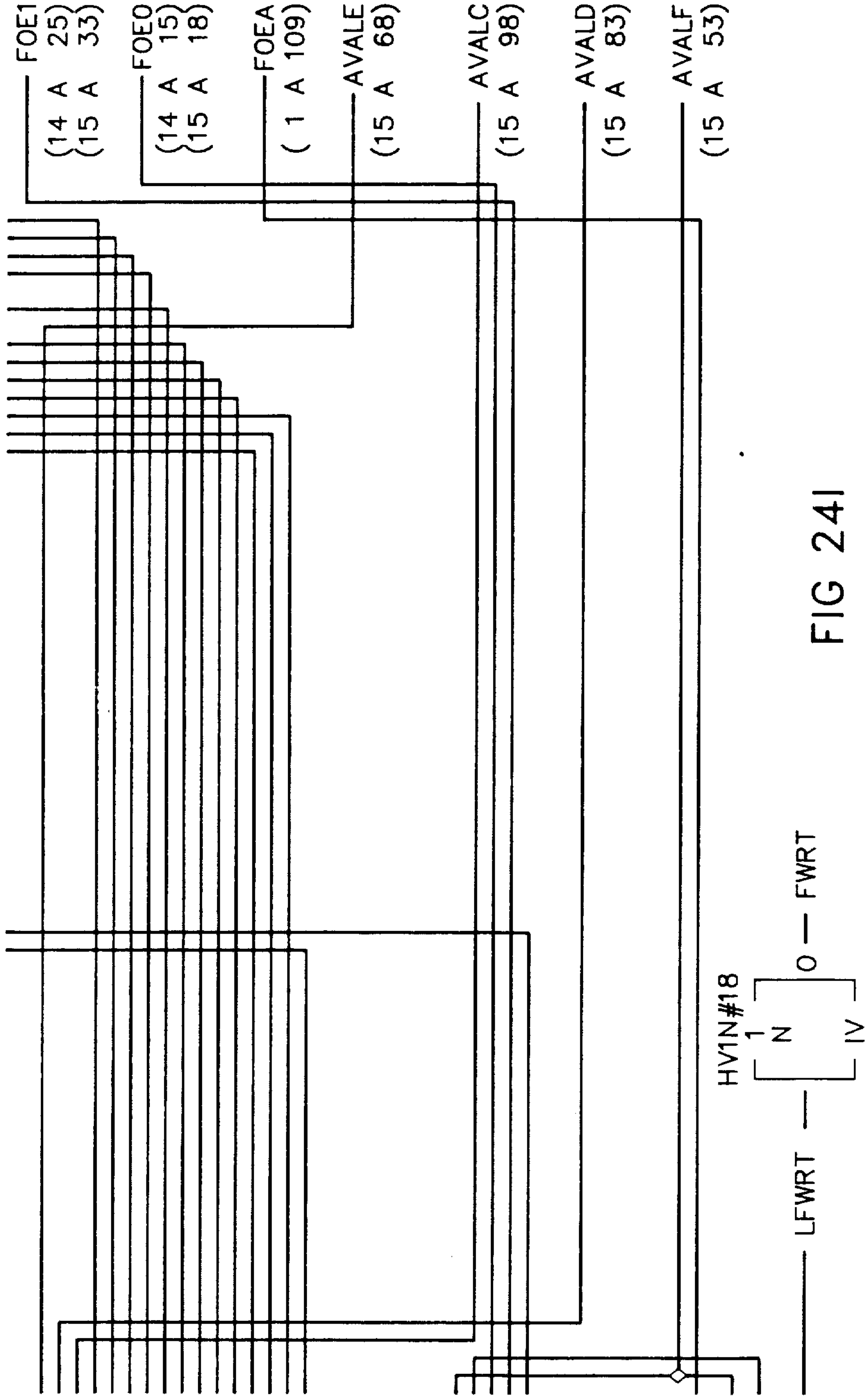
Figure 25A:
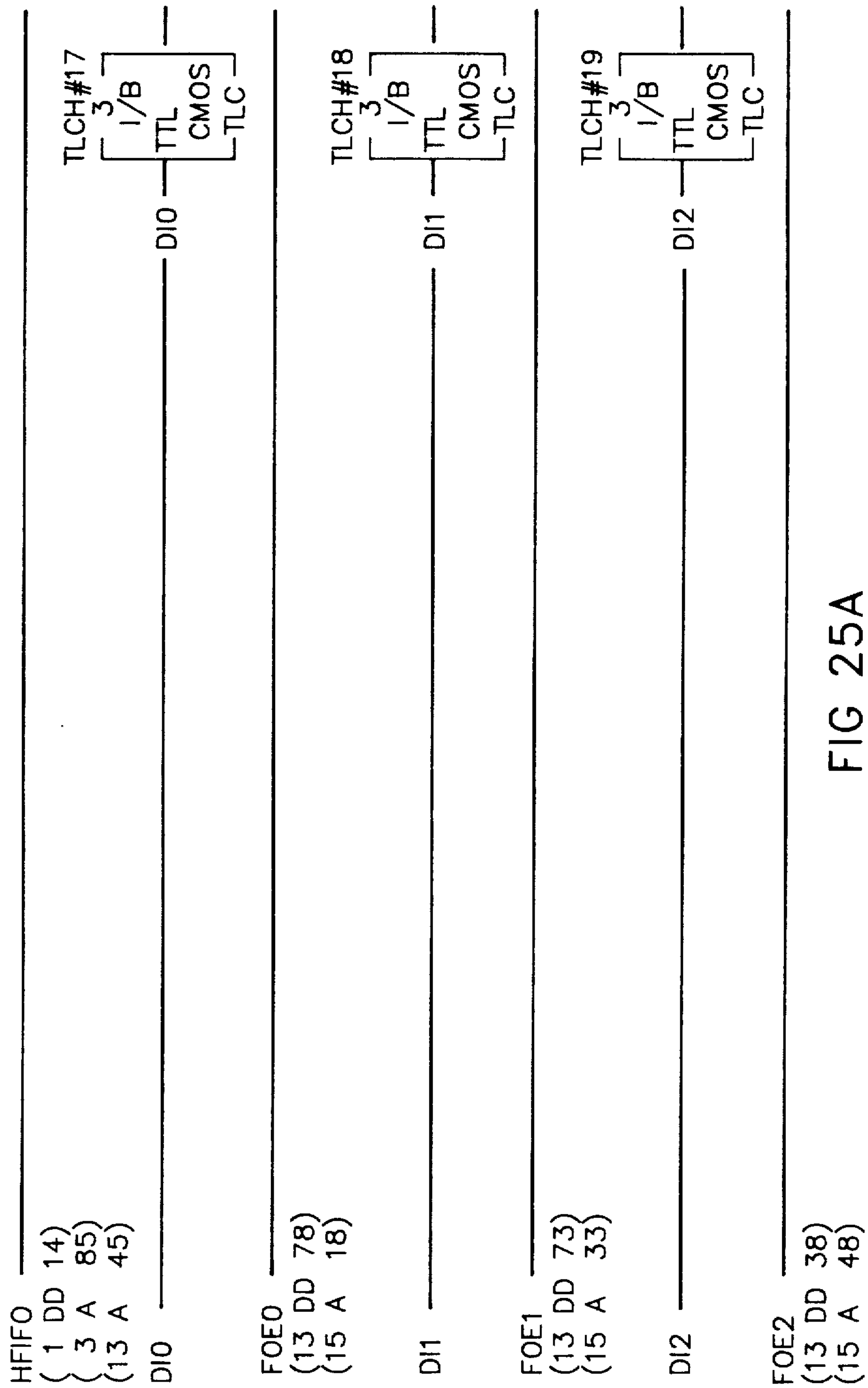
Figure 25B:
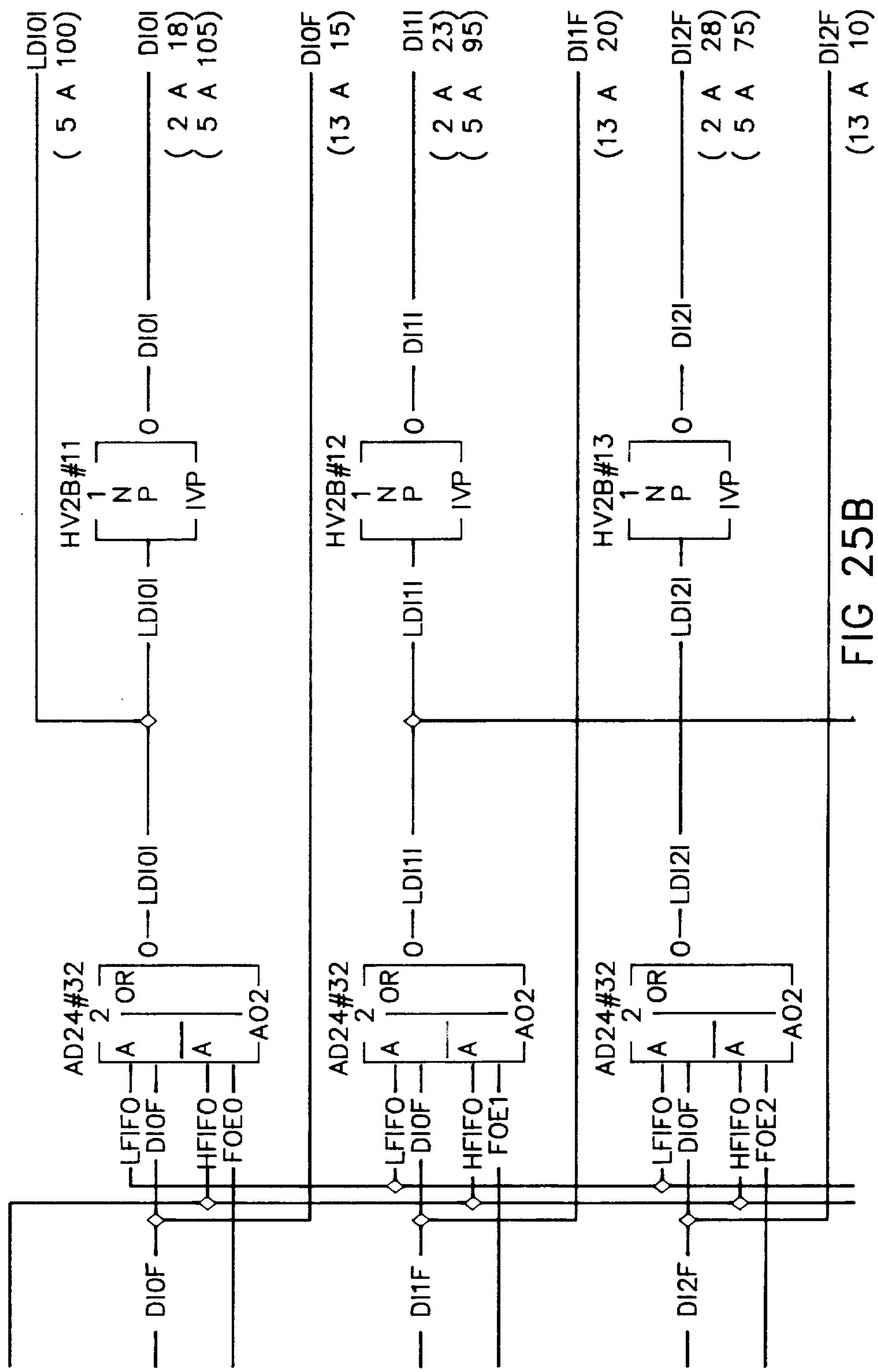
Figure 25C:
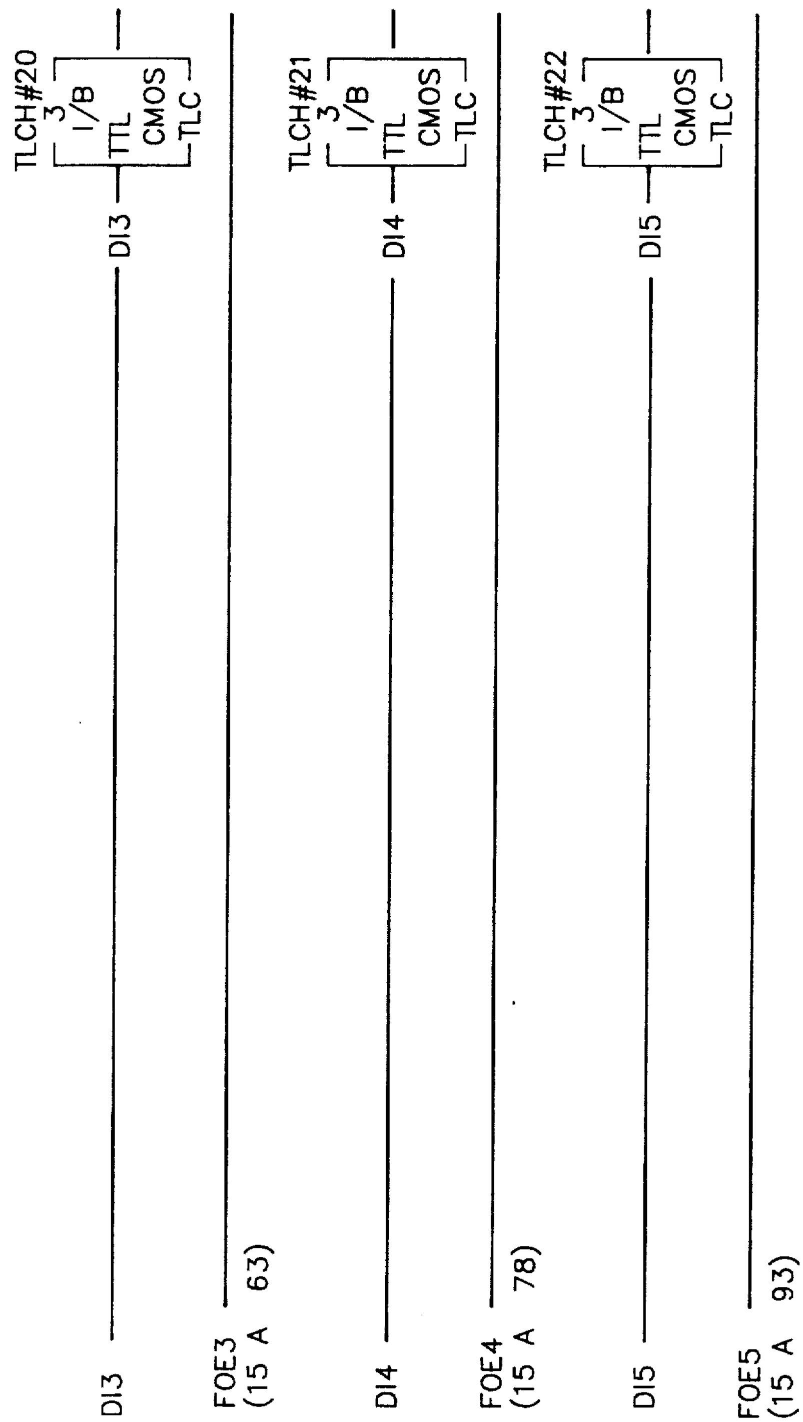
Figure 25D:
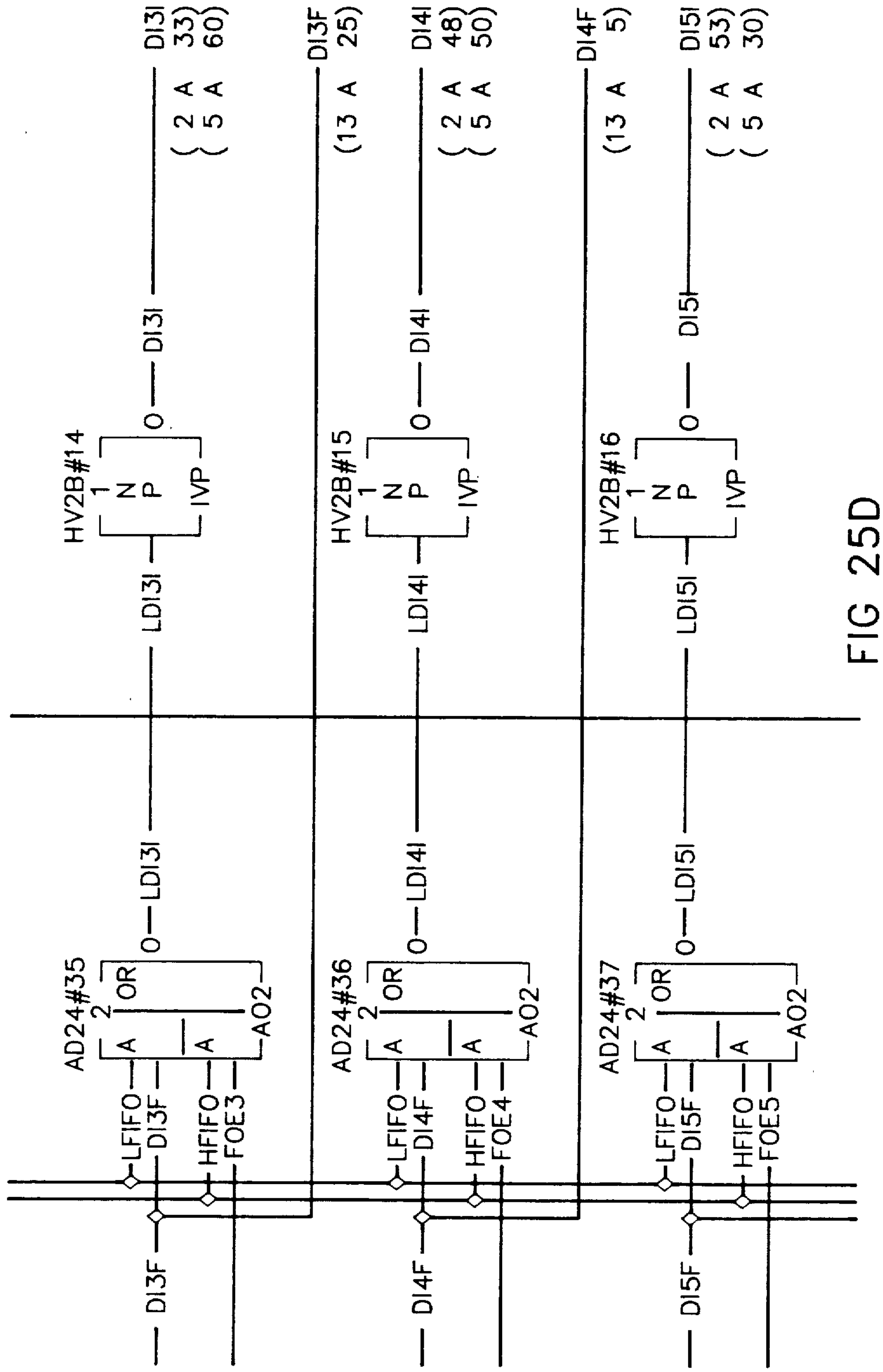
Figure 25E:
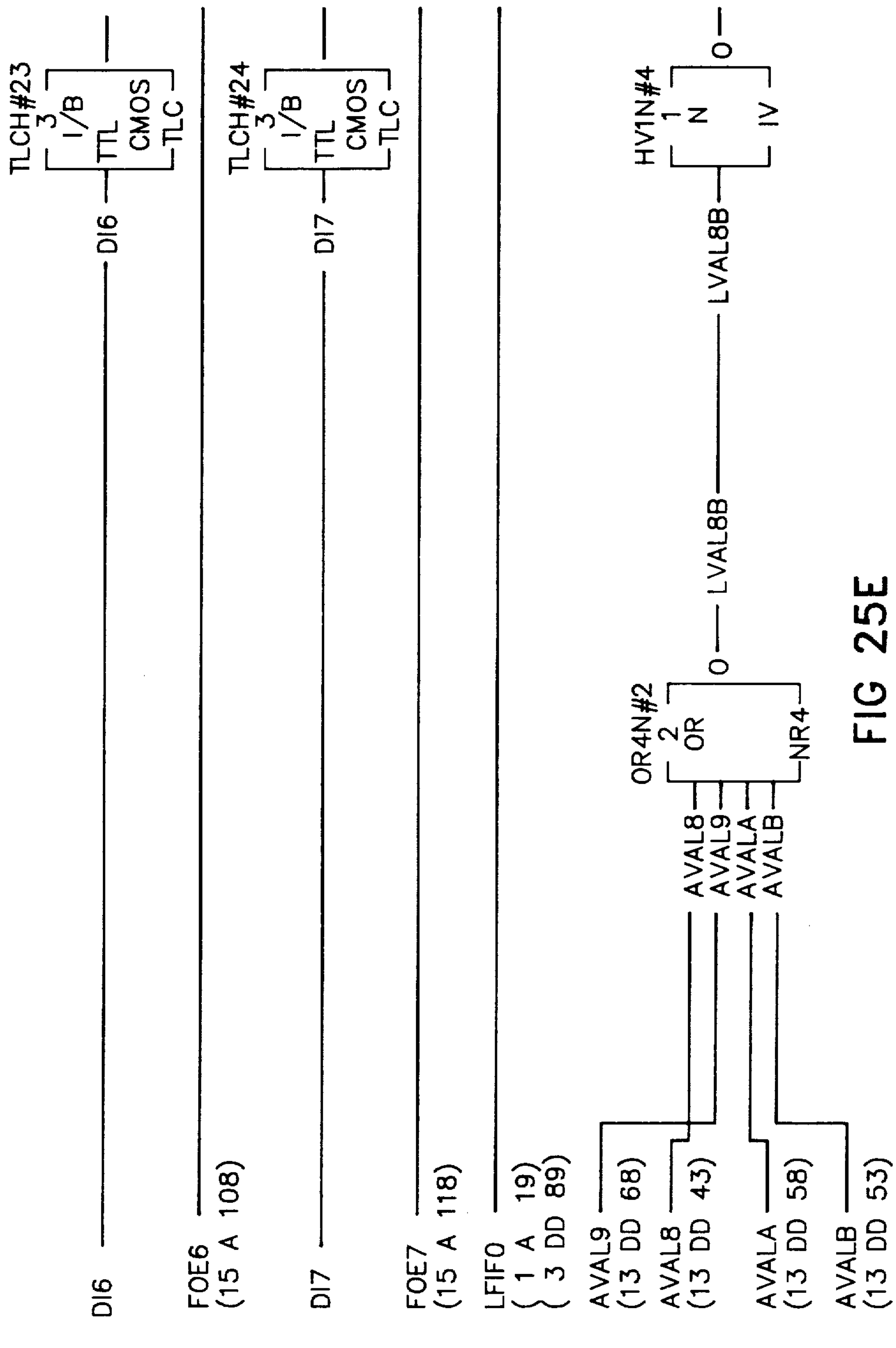
Figure 25F:
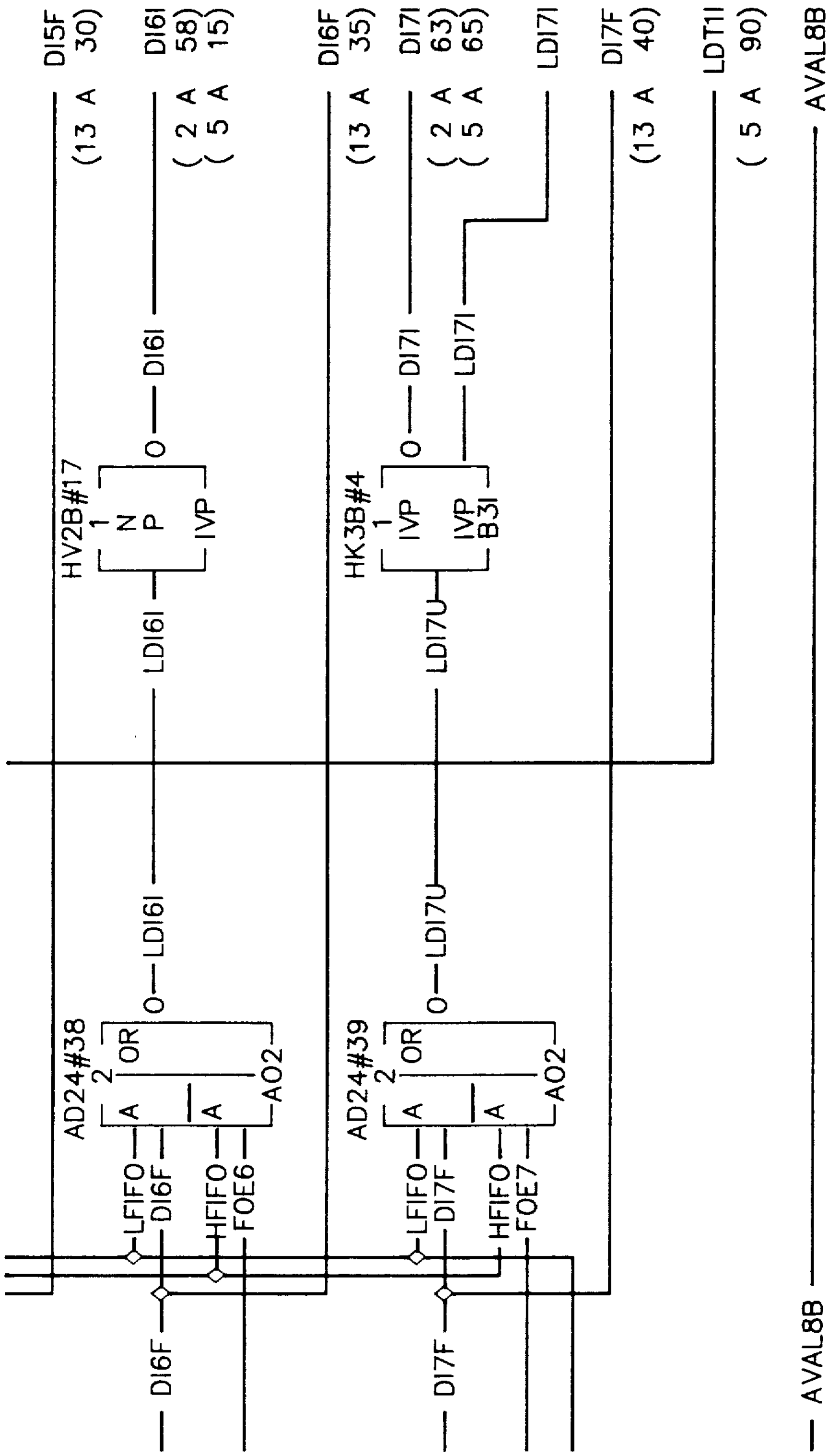
Figure 26A:
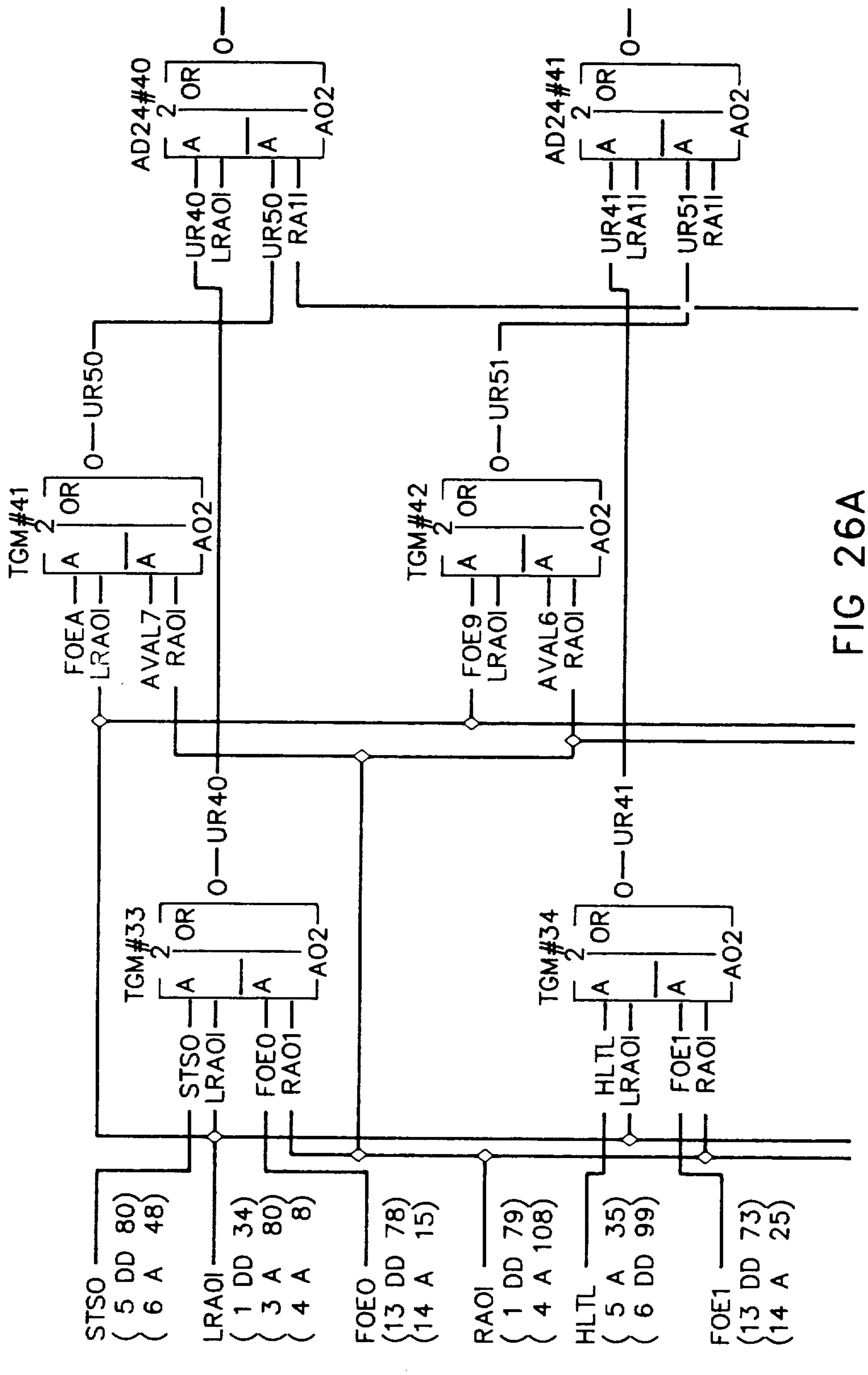
Figure 26D:
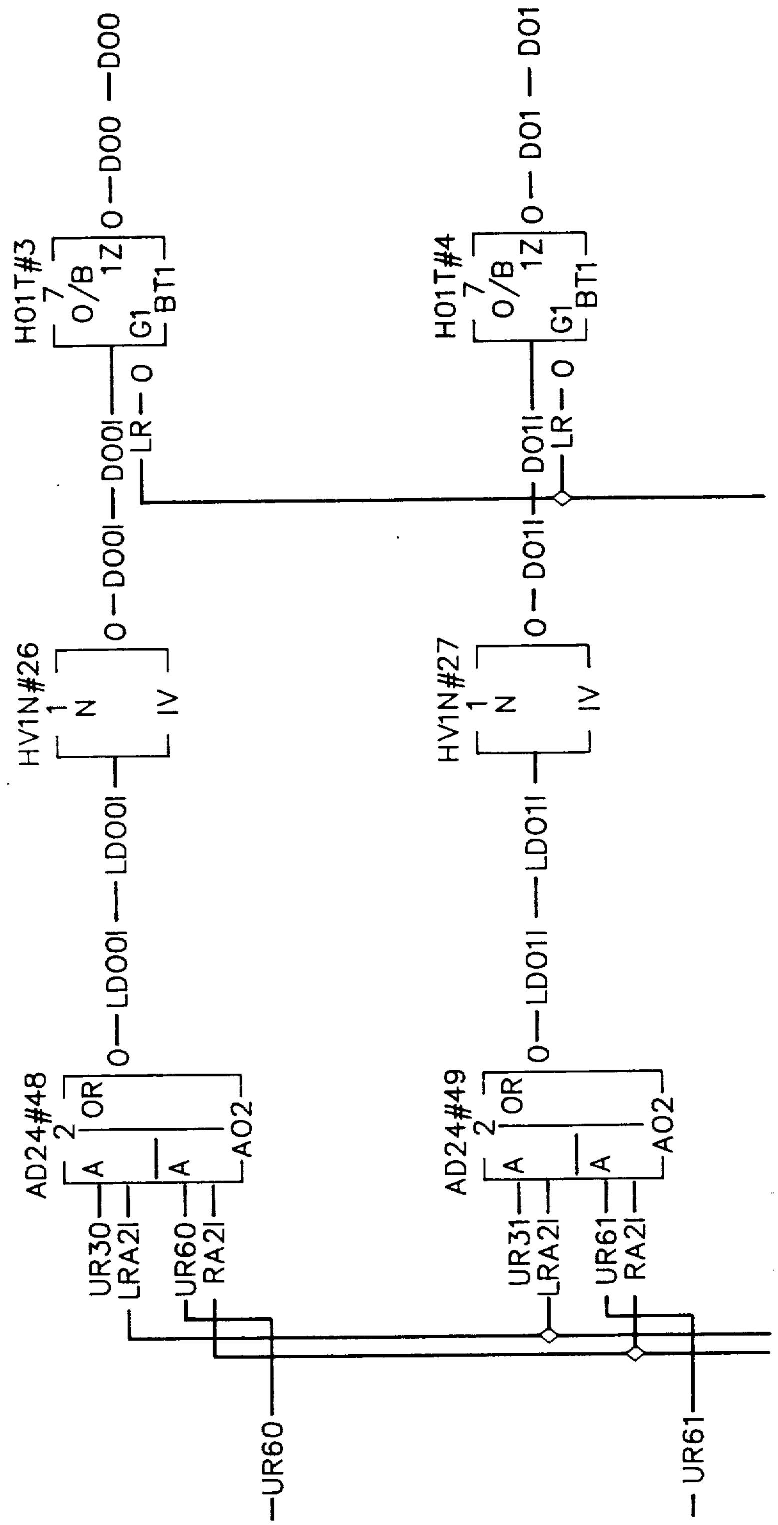
Figure 26E:
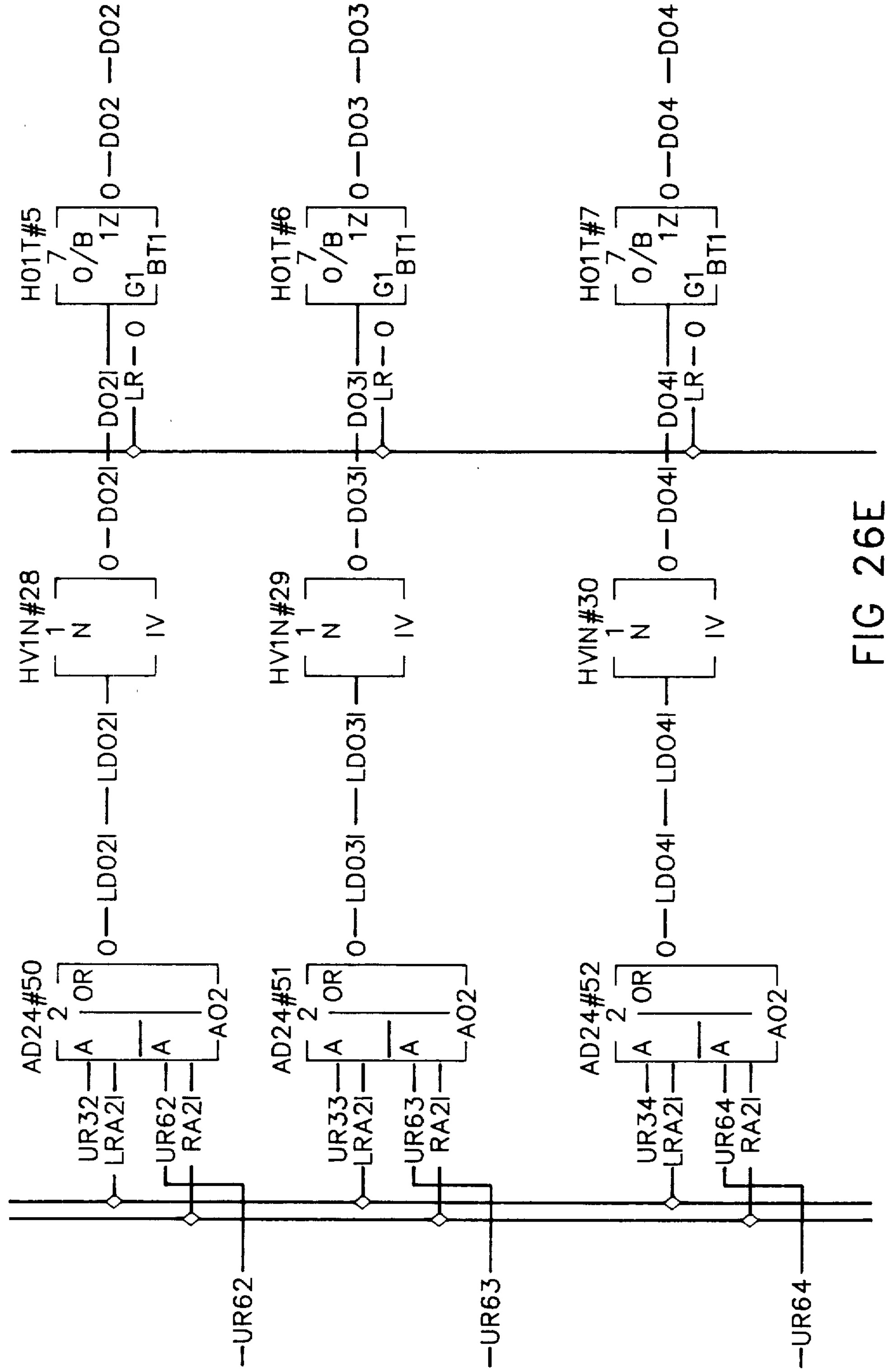
Figure 26F:
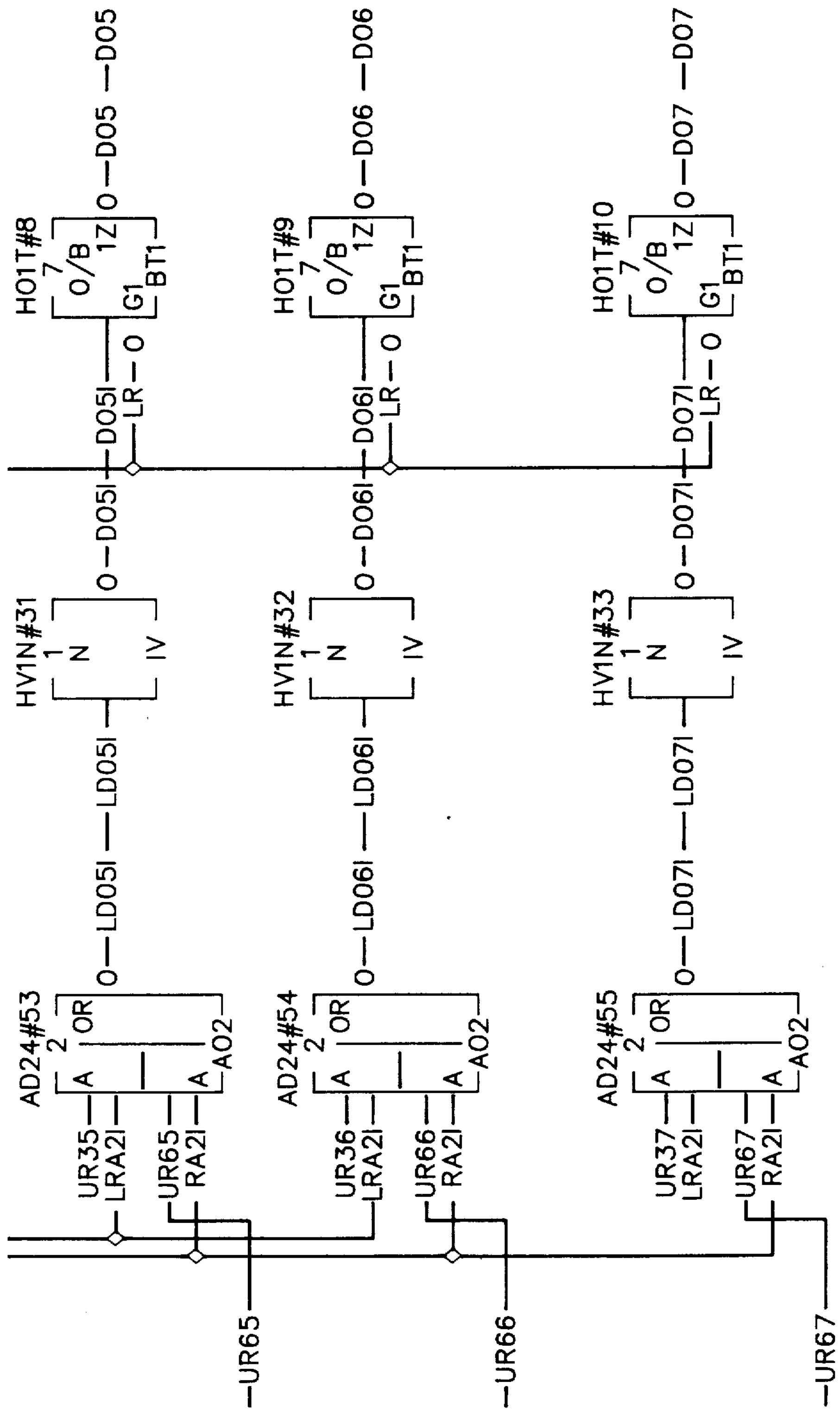
Figure 27A:
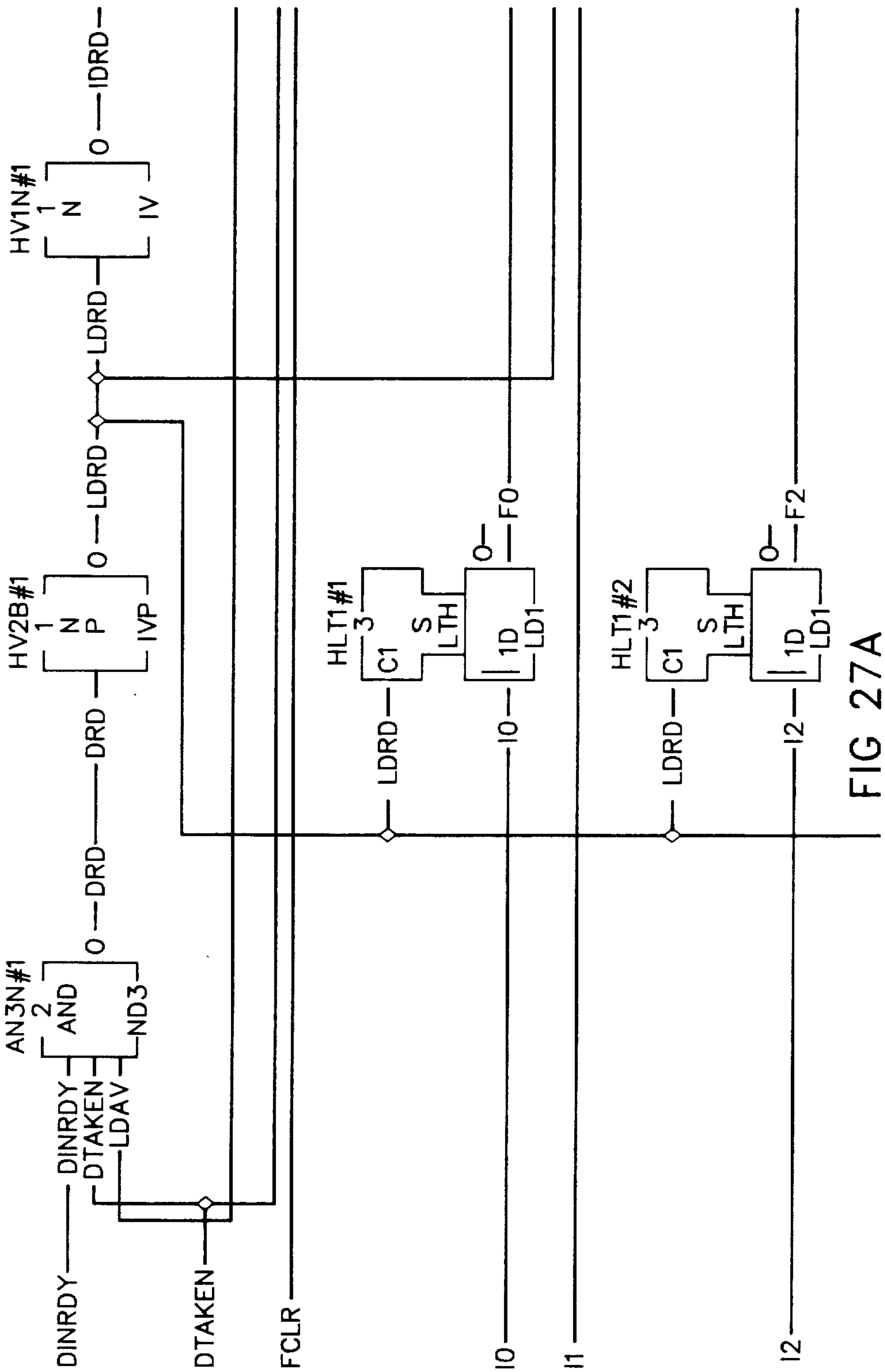
Figure 27B:
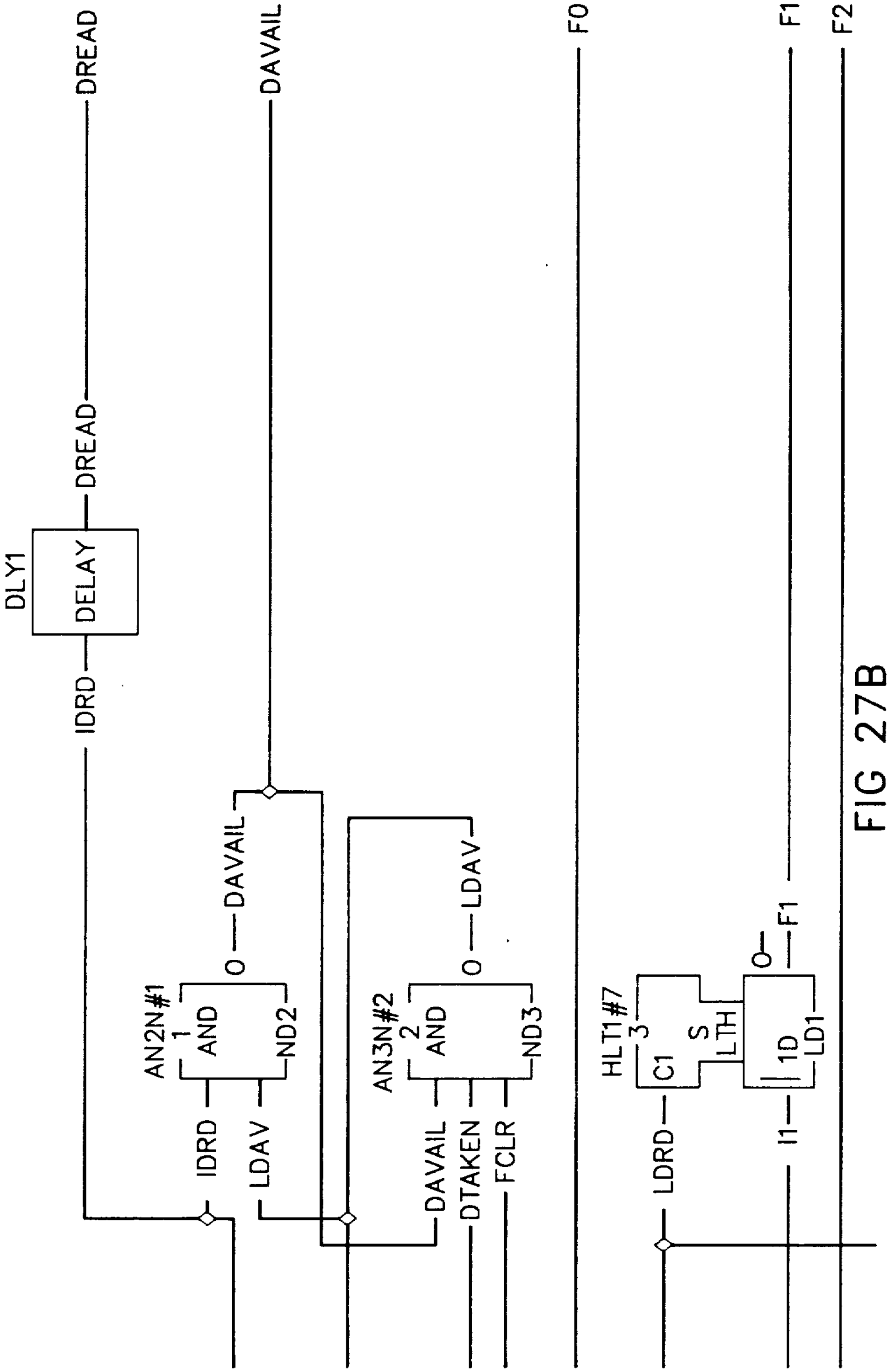
Figure 27C:
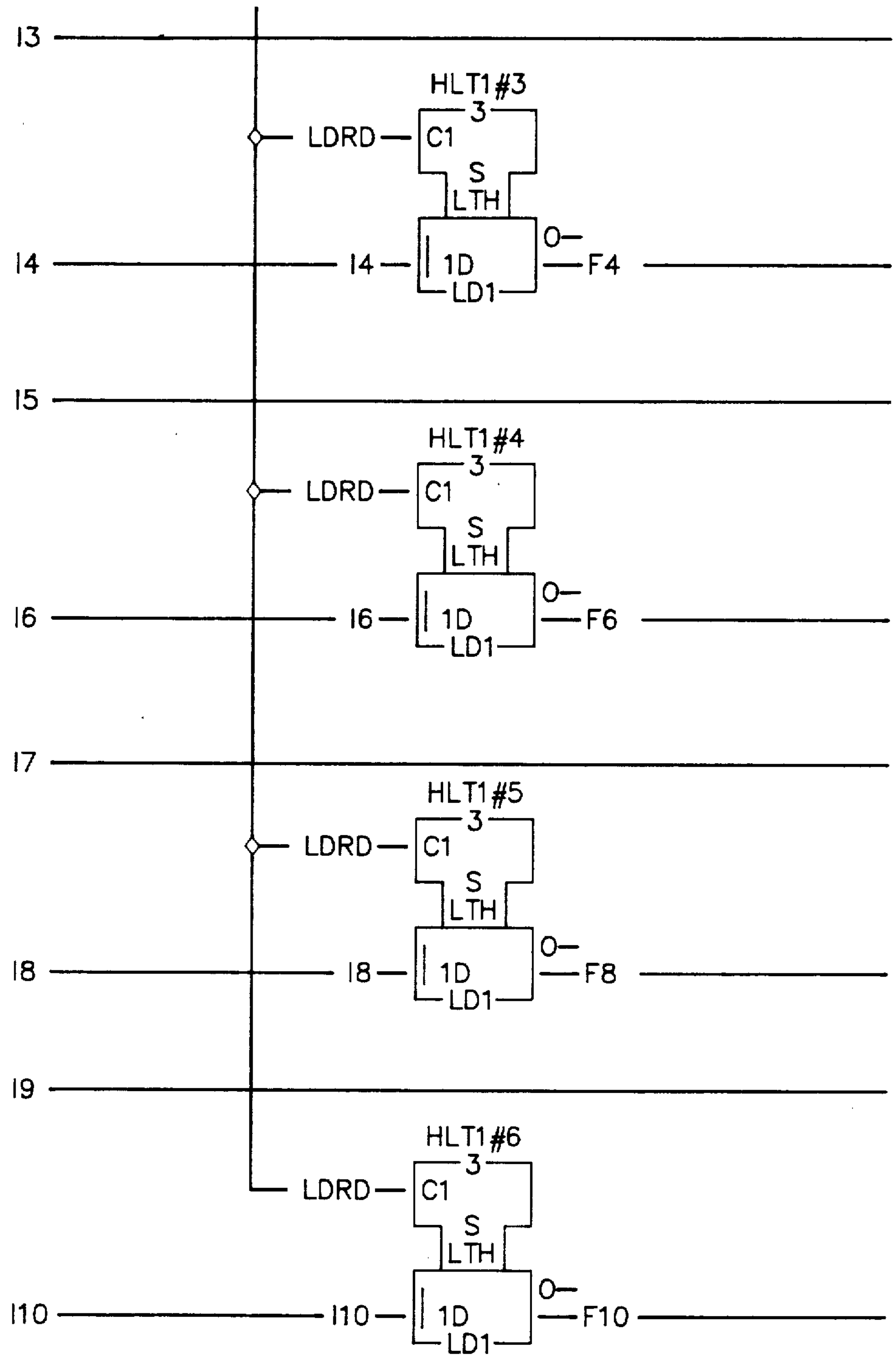
Figure 27D:
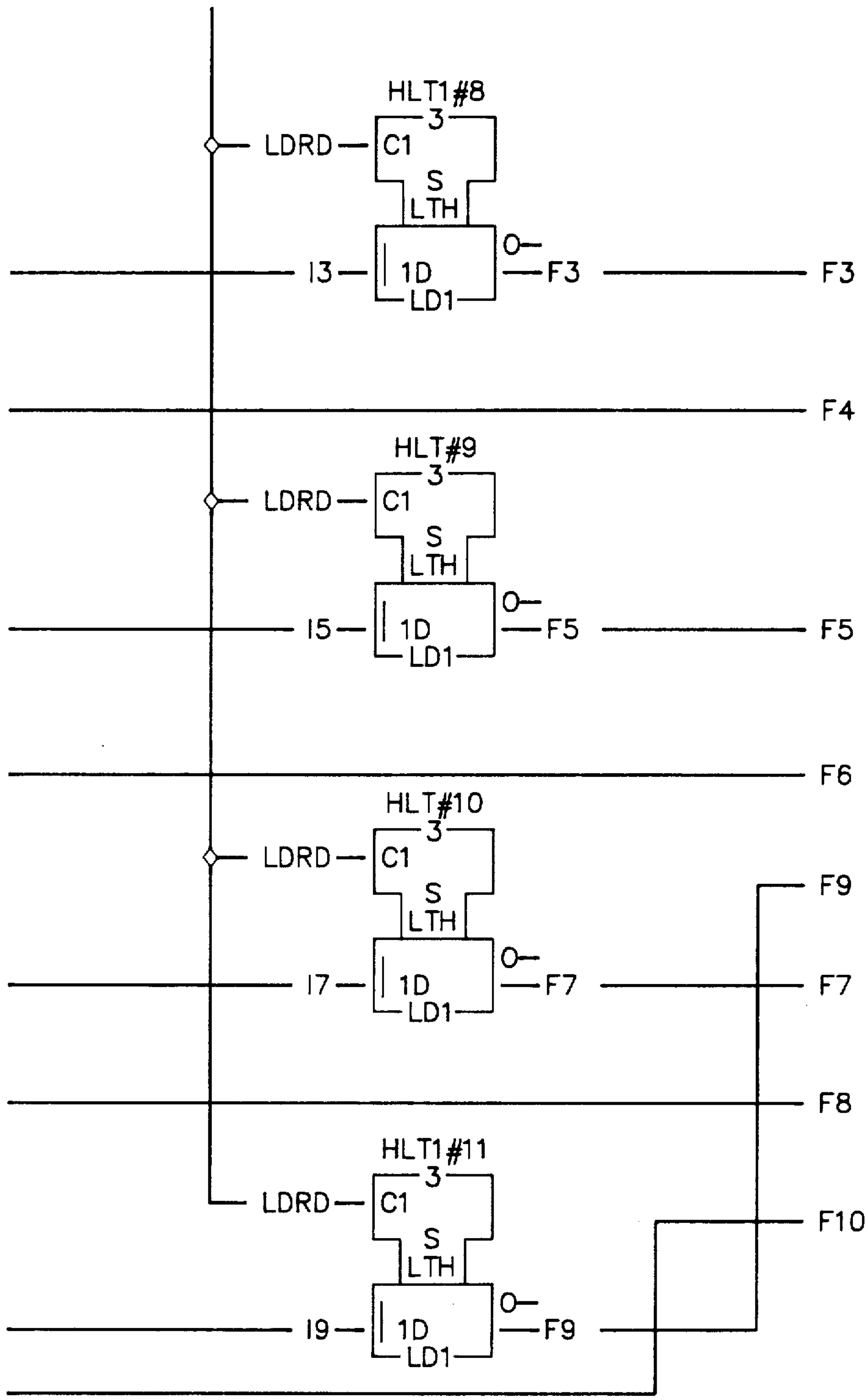
Figure 28A:
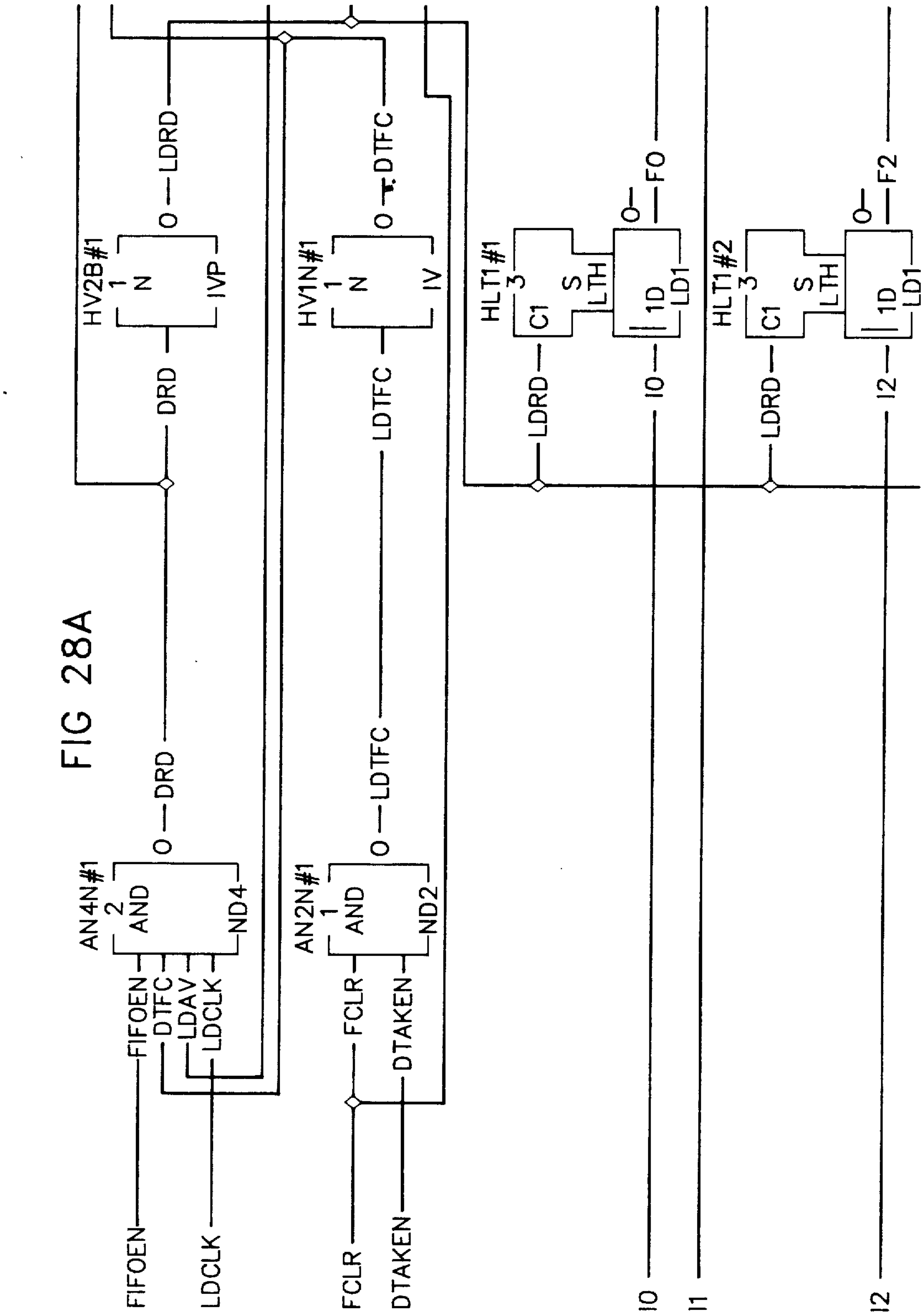
Figure 28B:
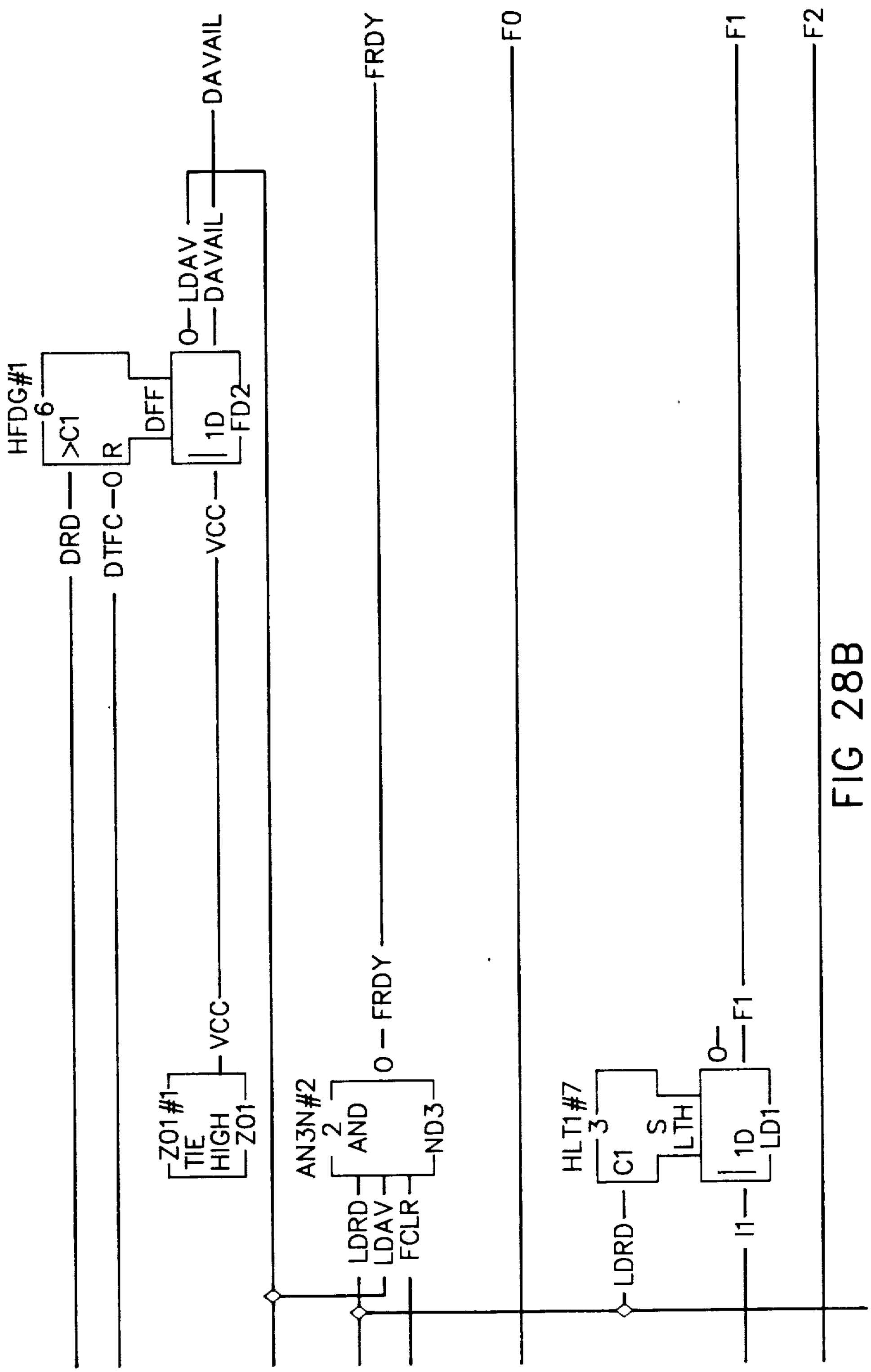
Figure 28C:
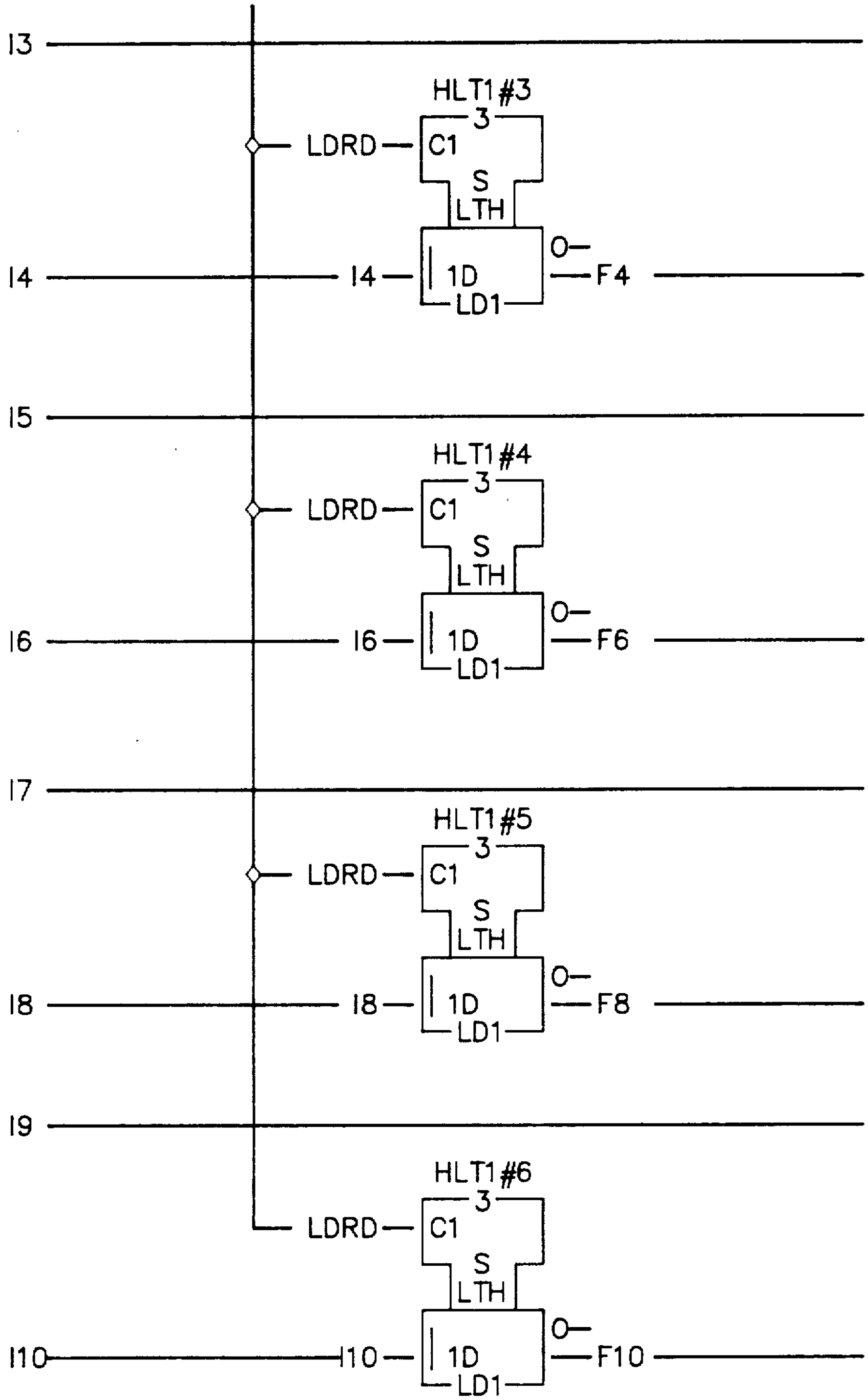
Figure 28D:
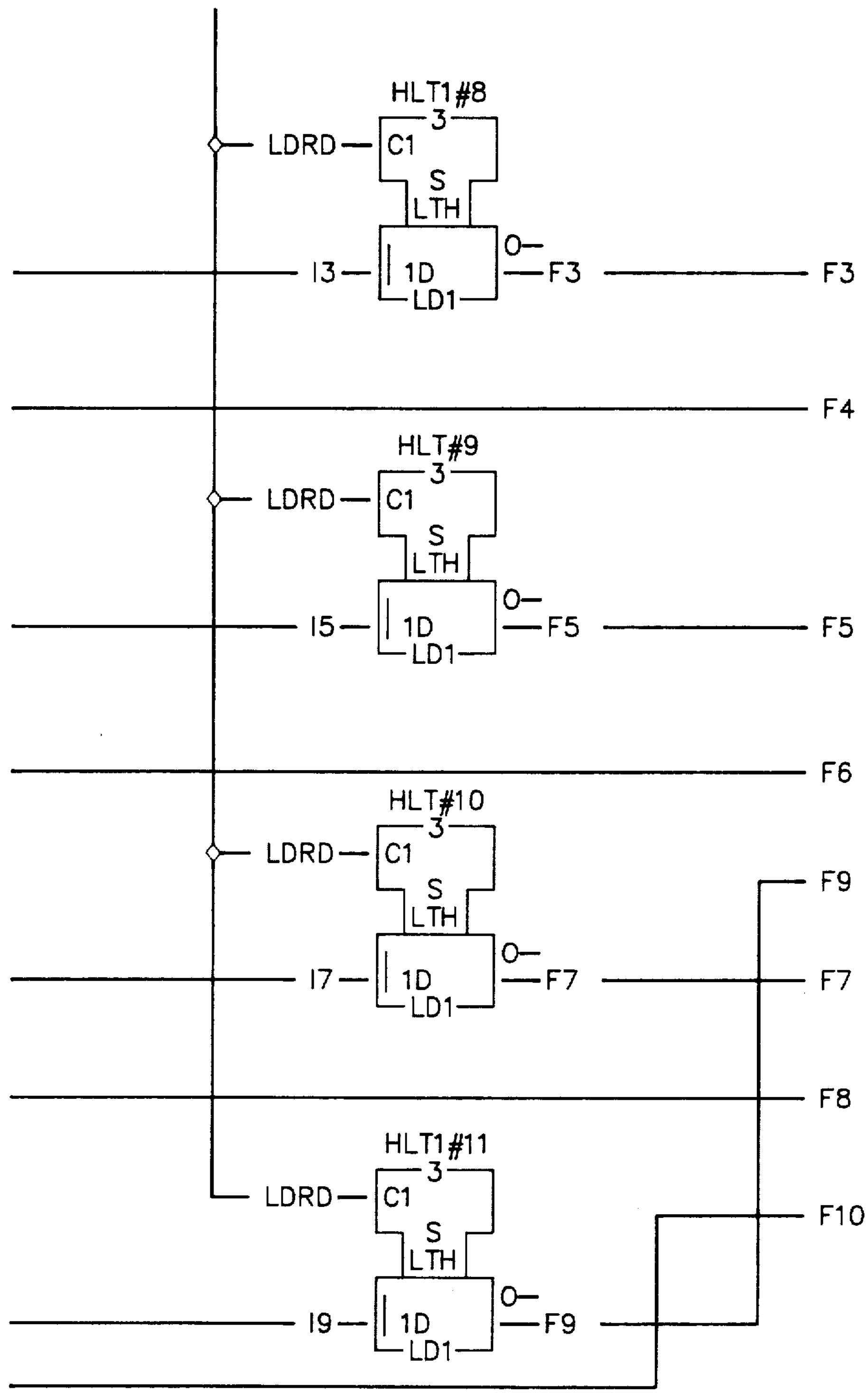
Figure 29A:
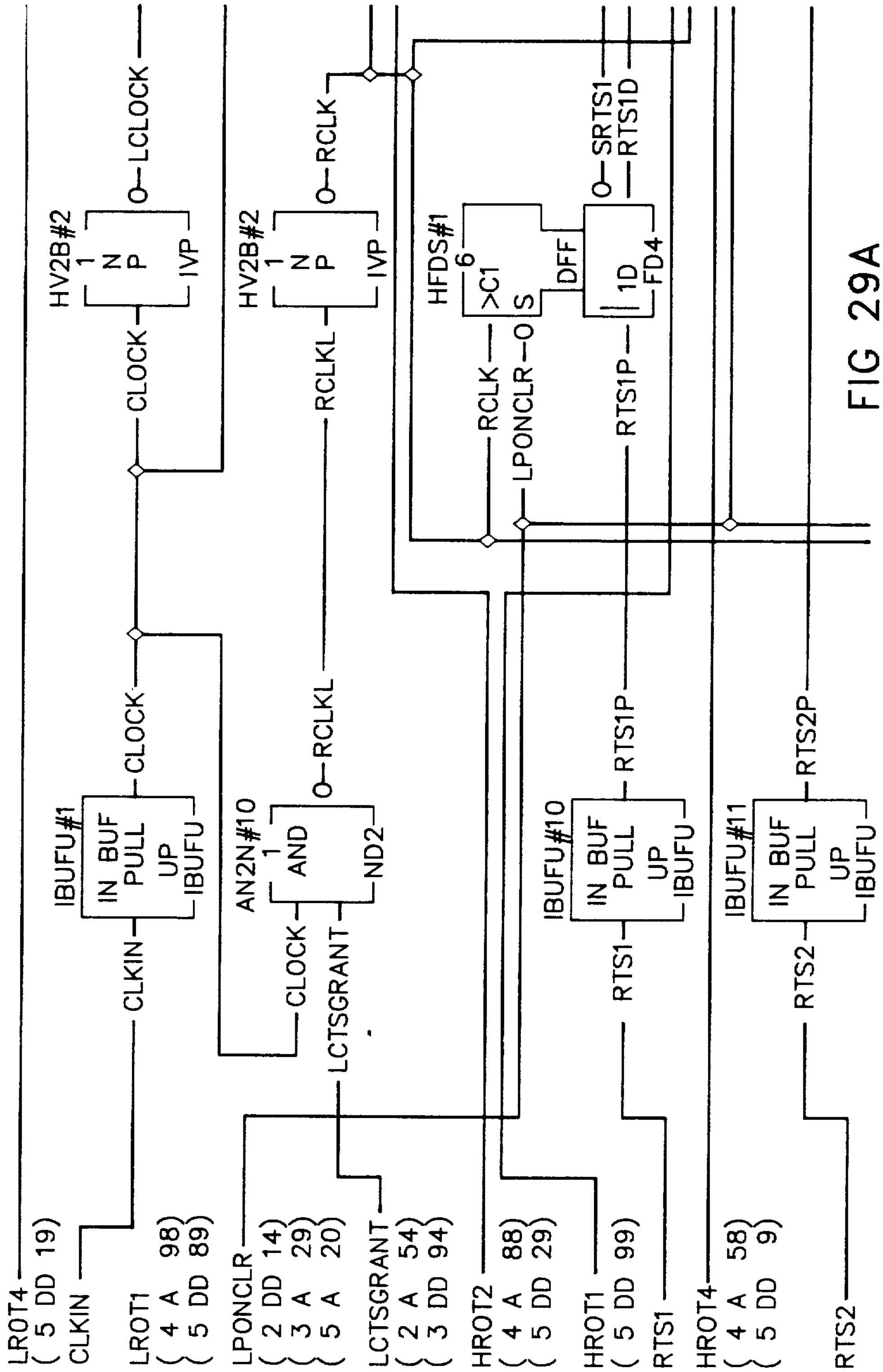
Figure 29C:
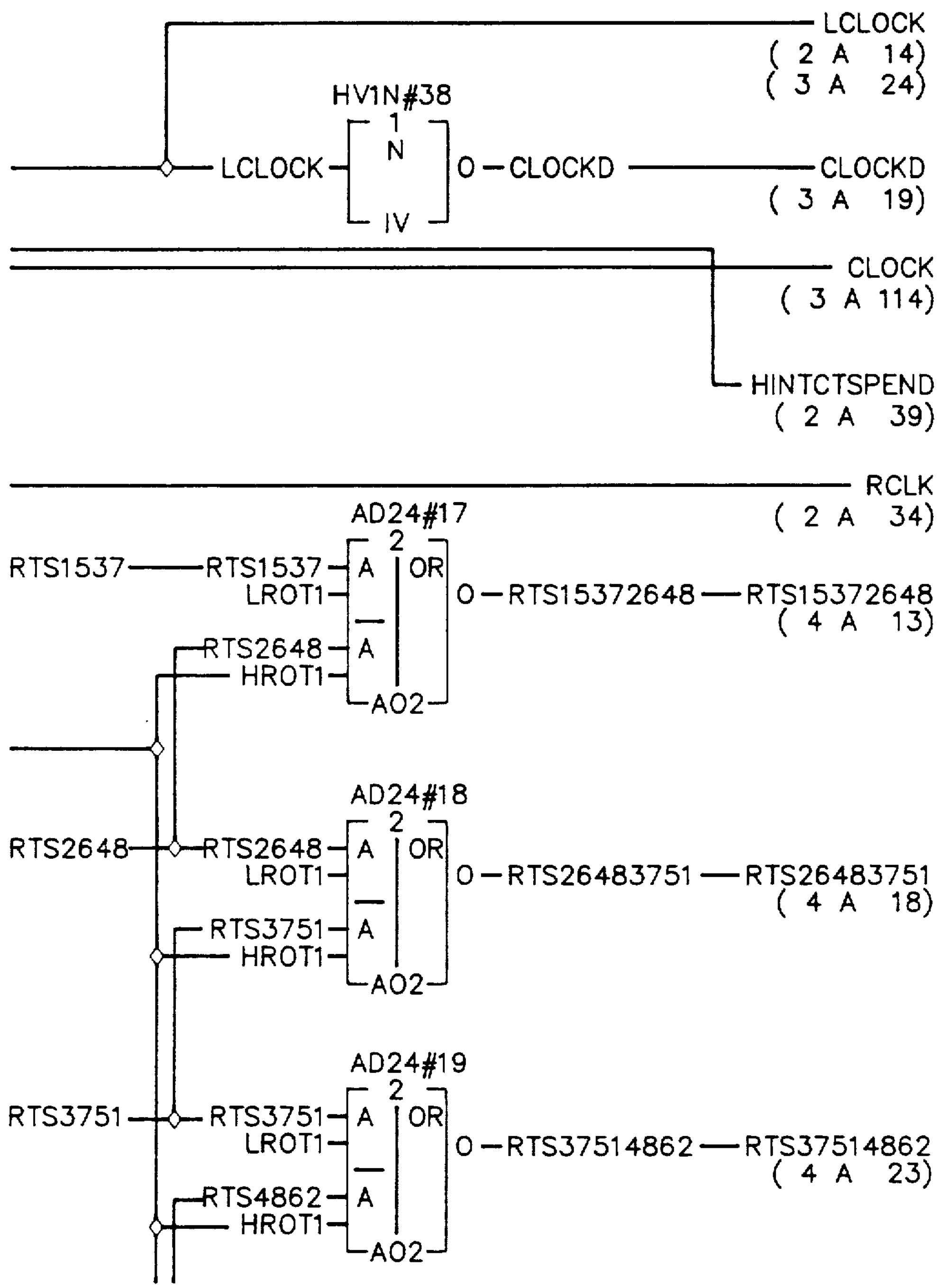
Figure 29D:
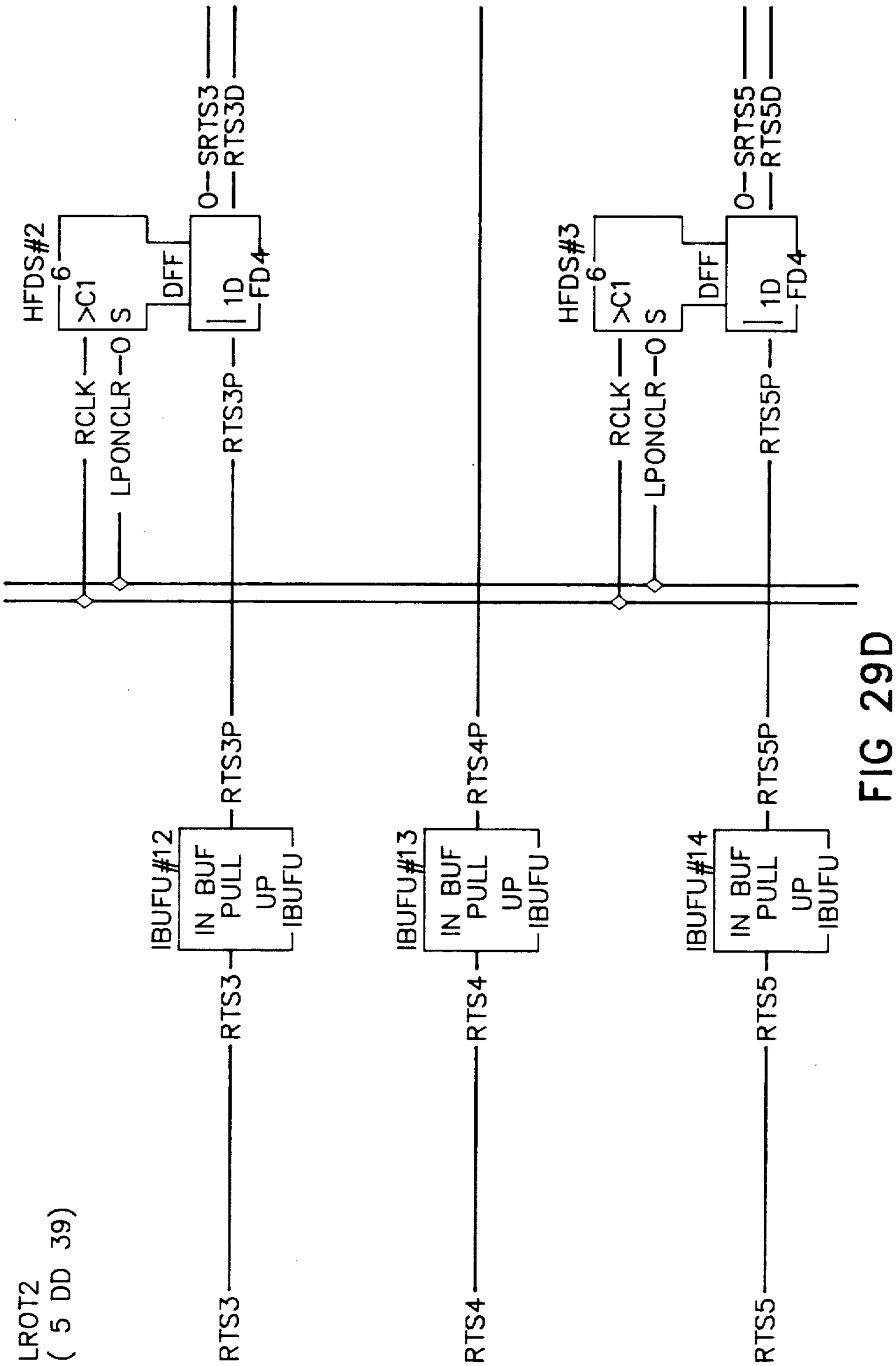
Figure 29F:
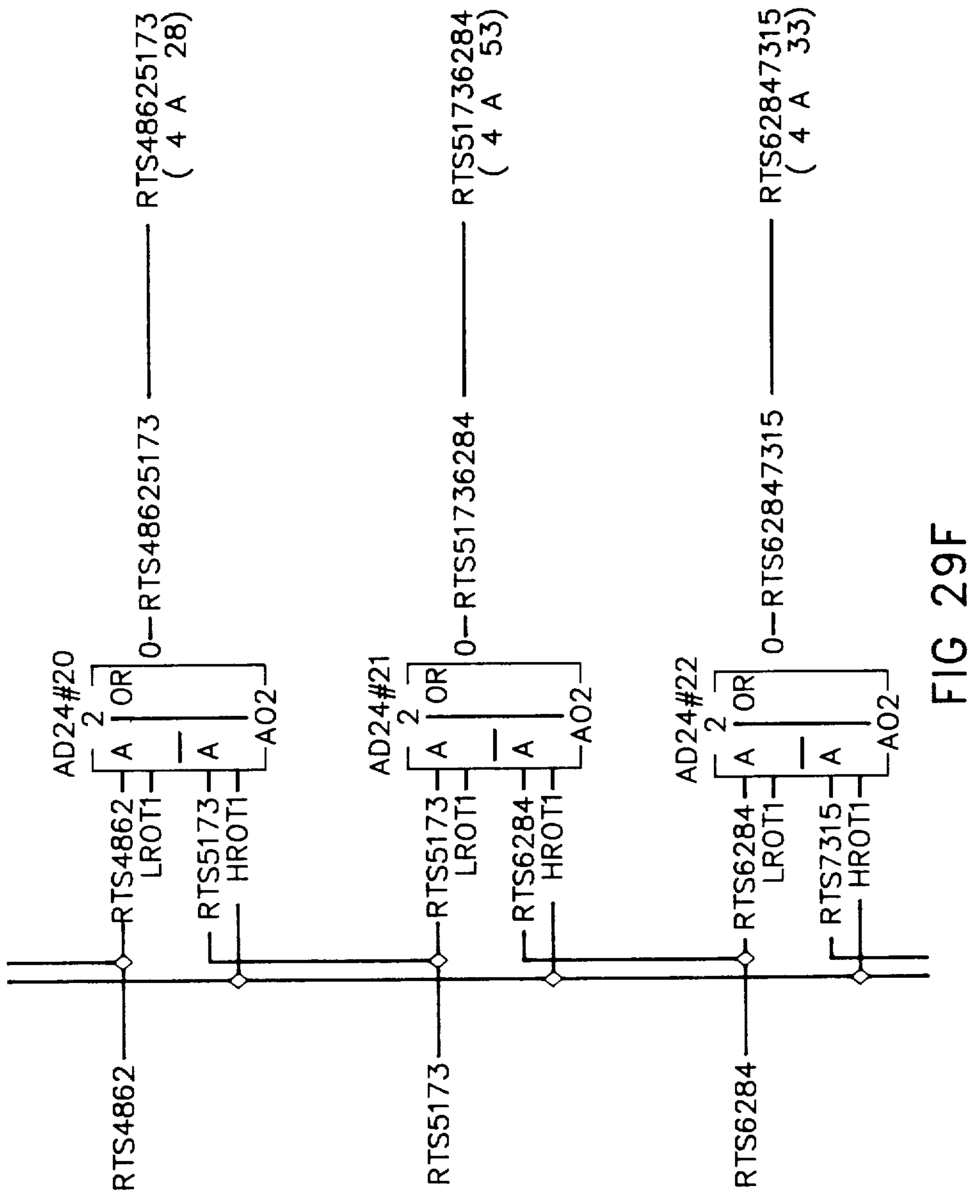
Figure 29G:
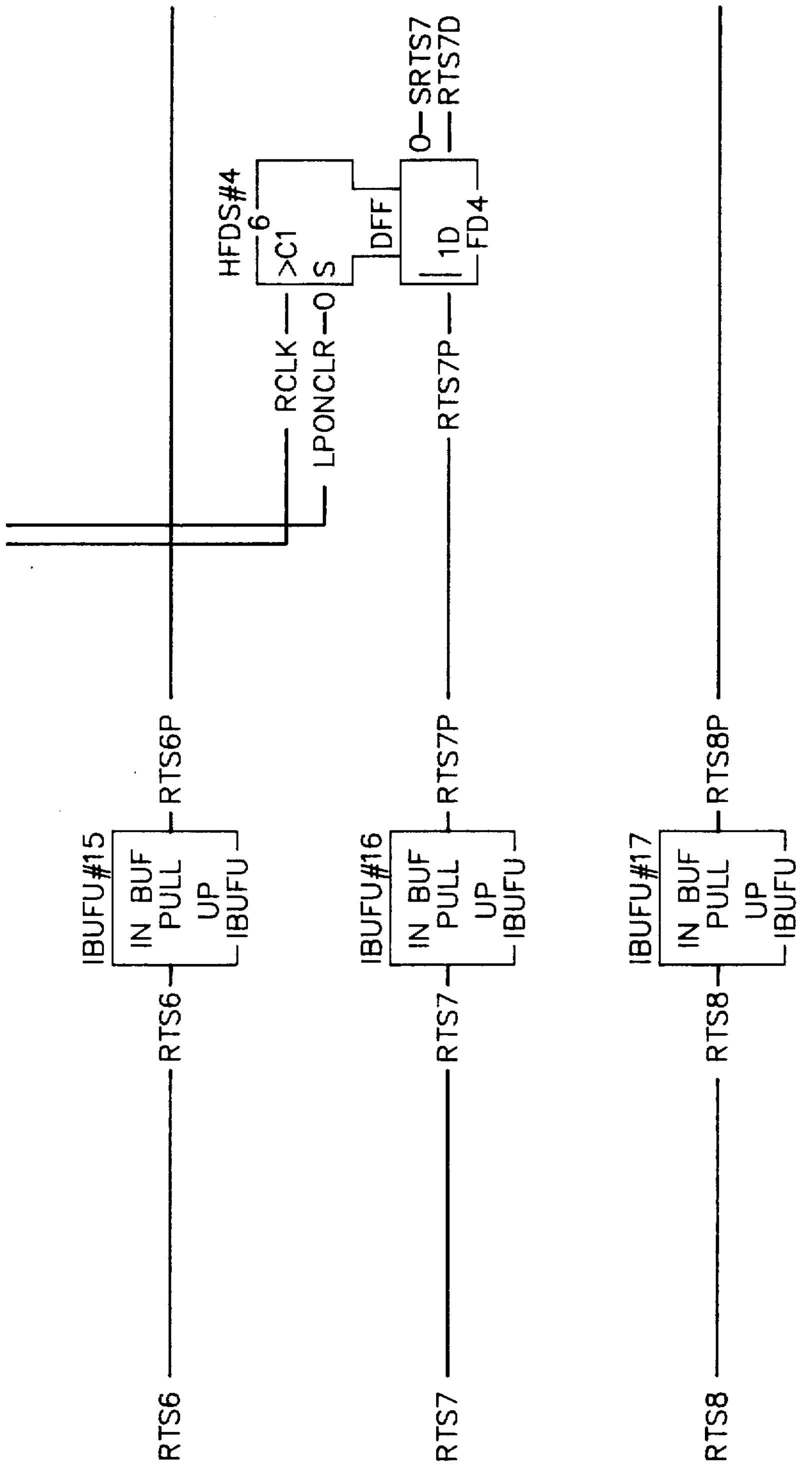
Figure 29I:
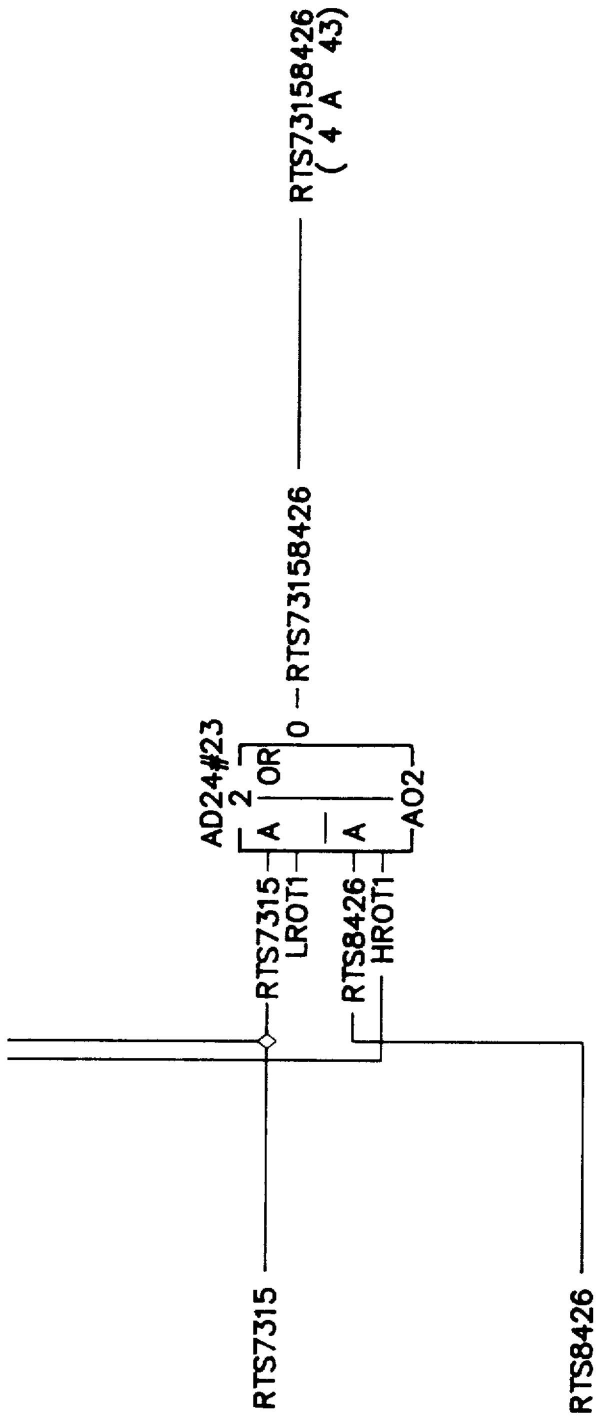
Figure 30A:
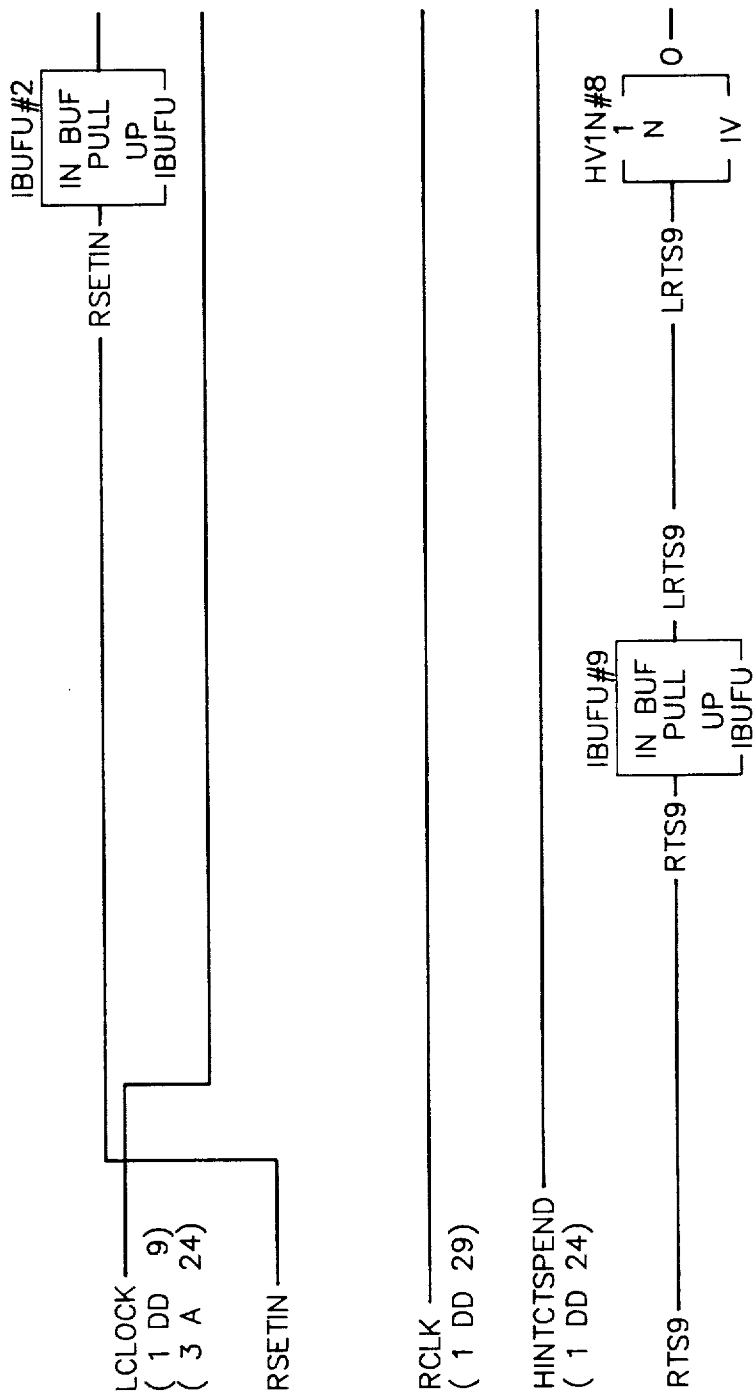
Figure 30B:
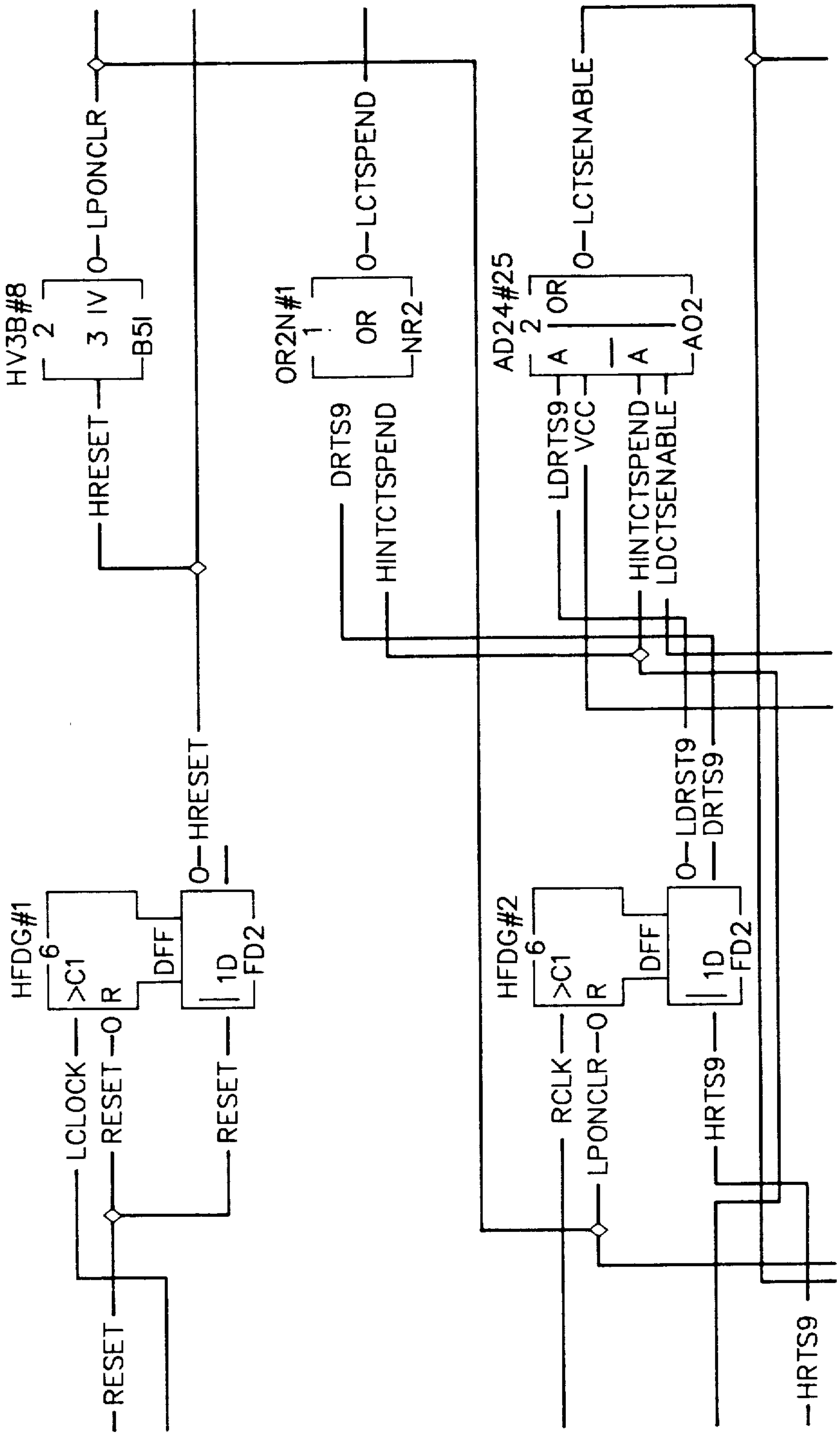
Figure 30C:
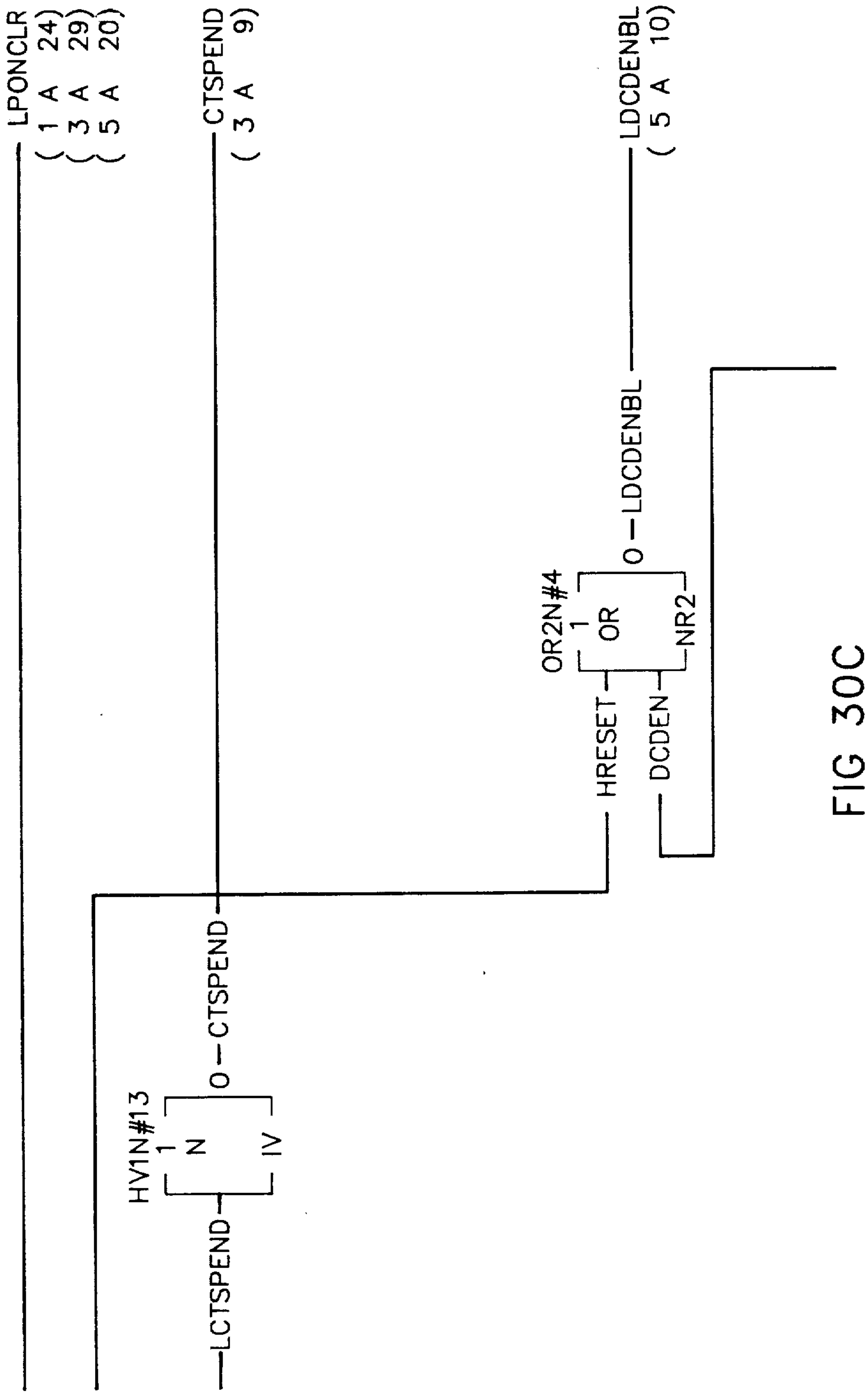
Figure 30D:
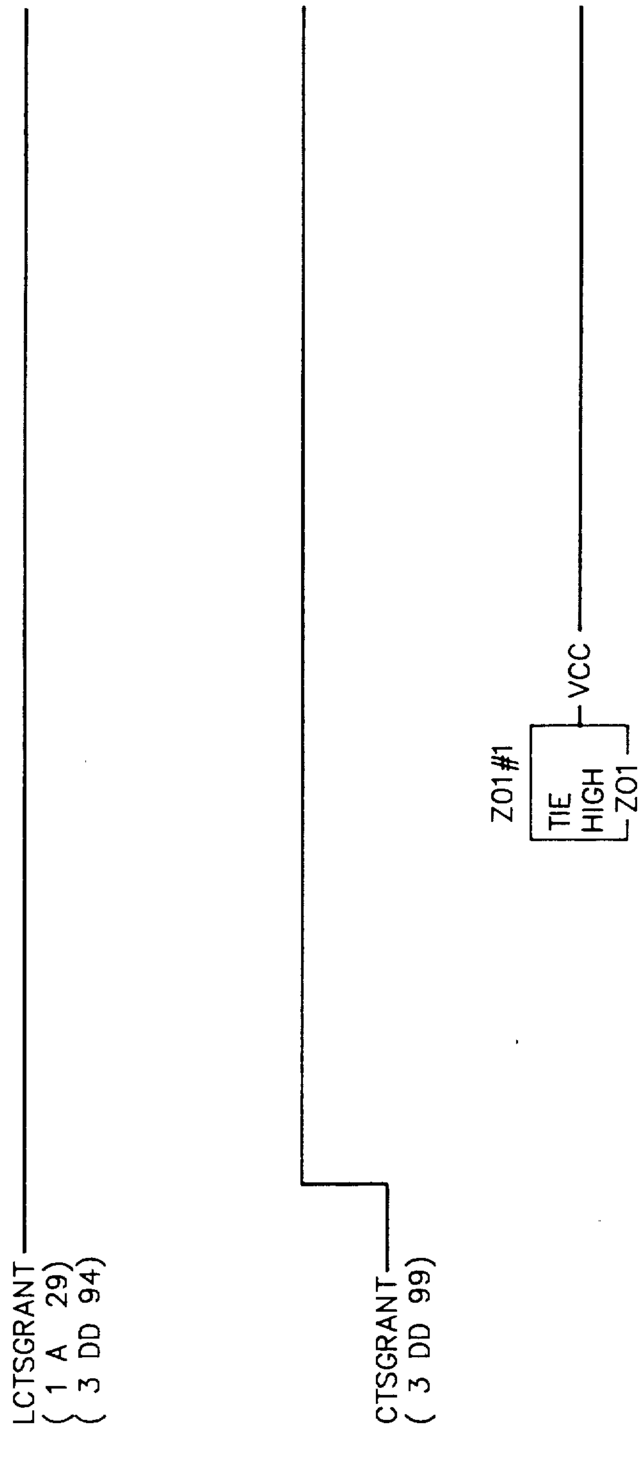
Figure 30E:
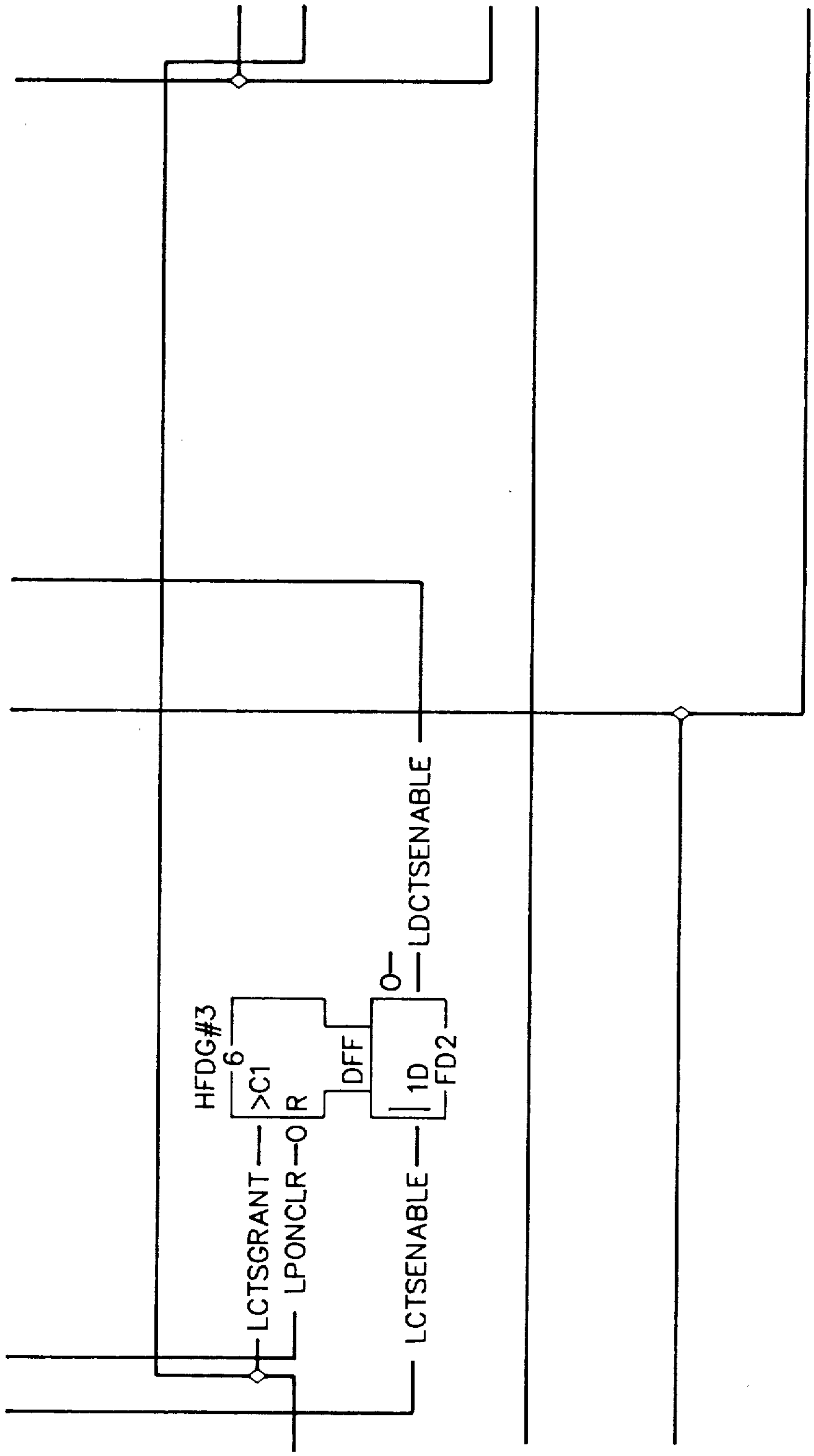
Figure 30F:
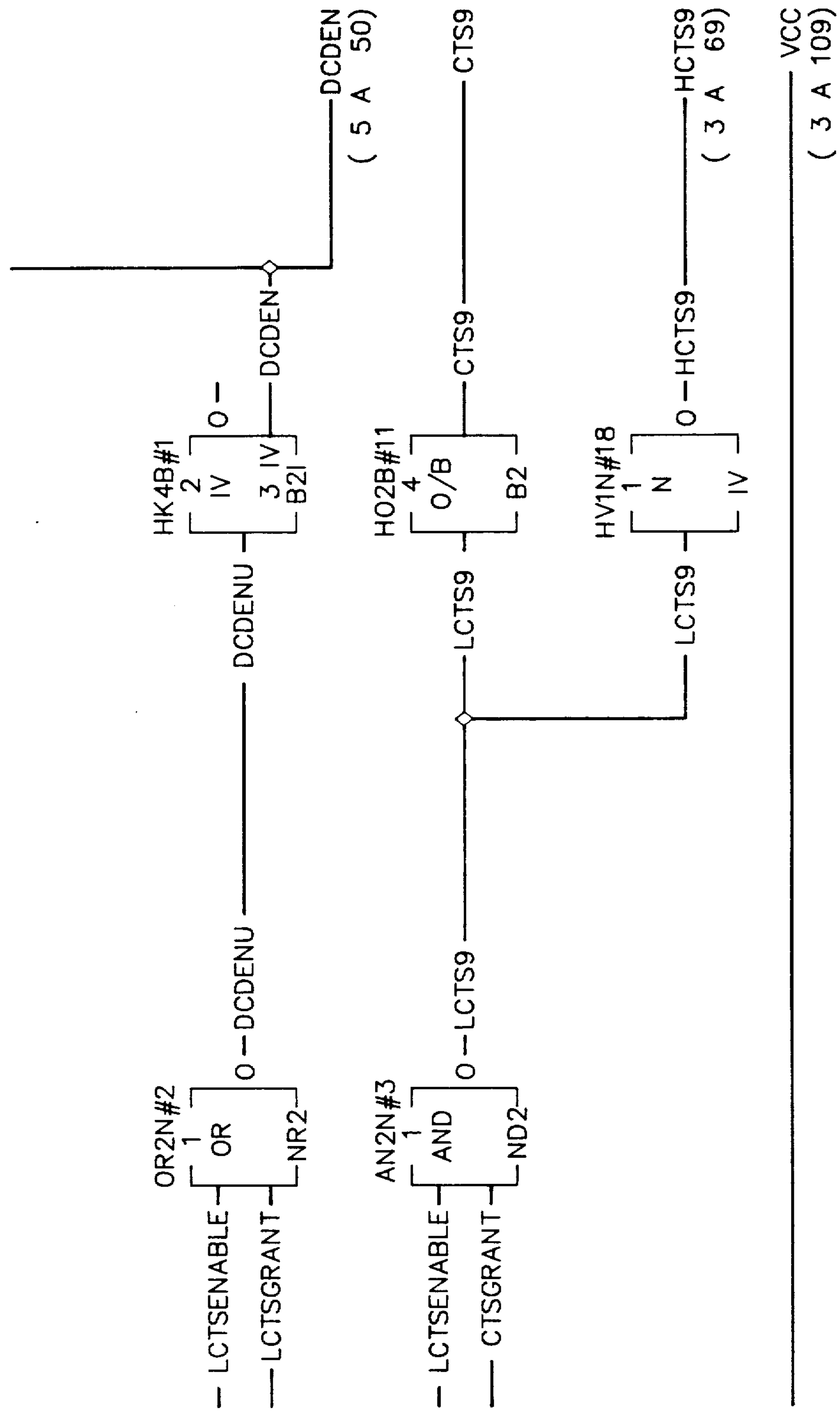
Figure 30G:
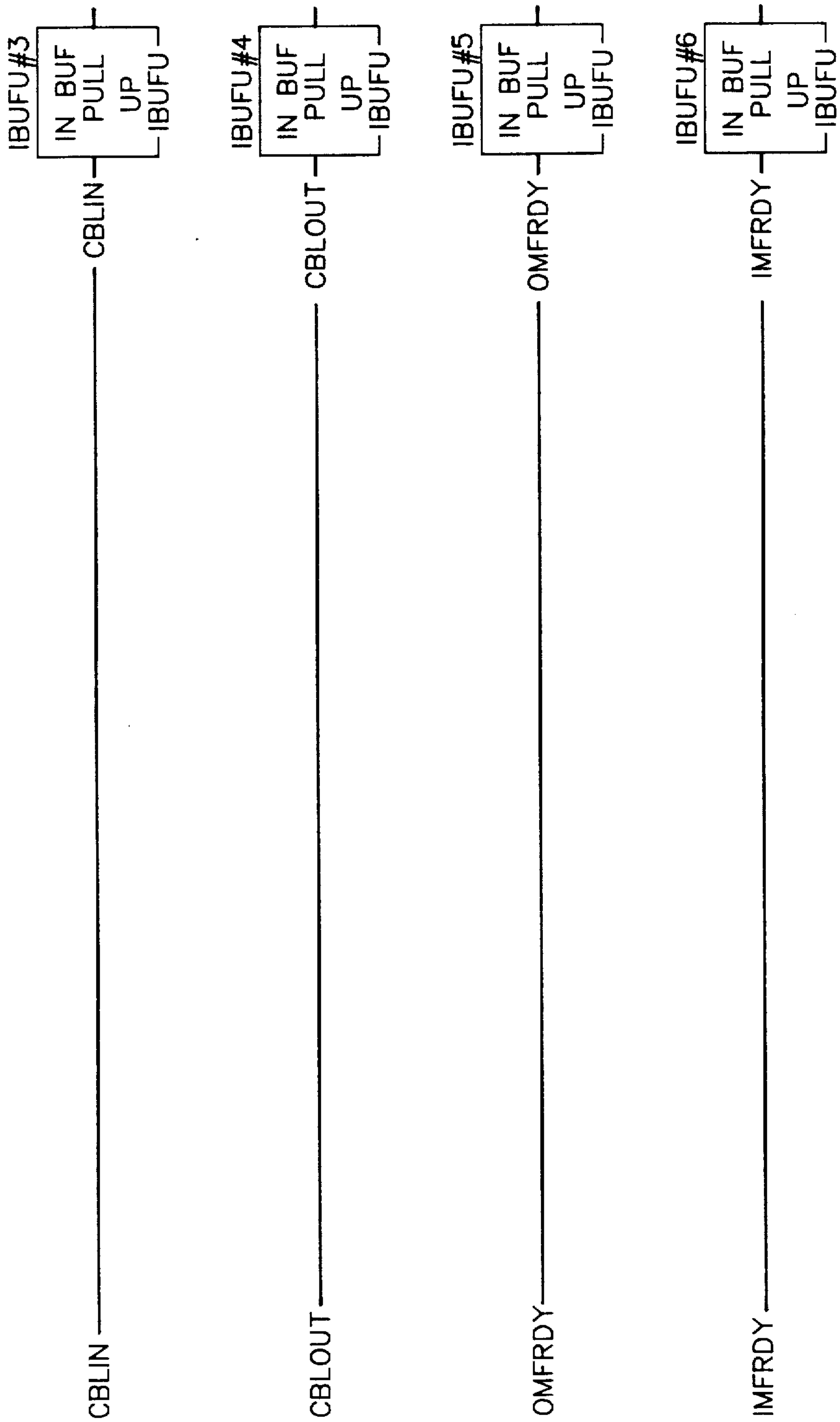
Figure 30H:
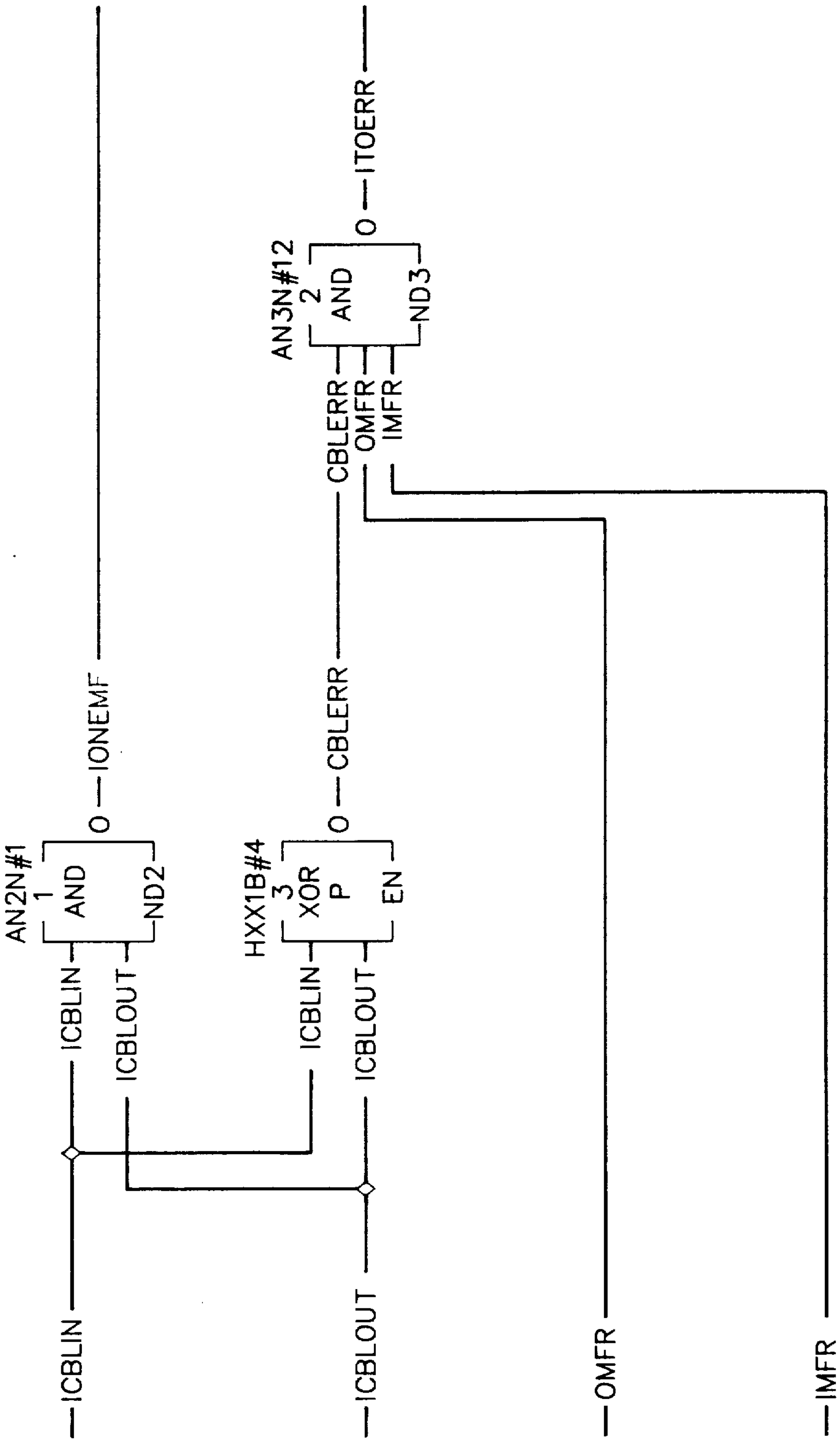
Figure 30I:
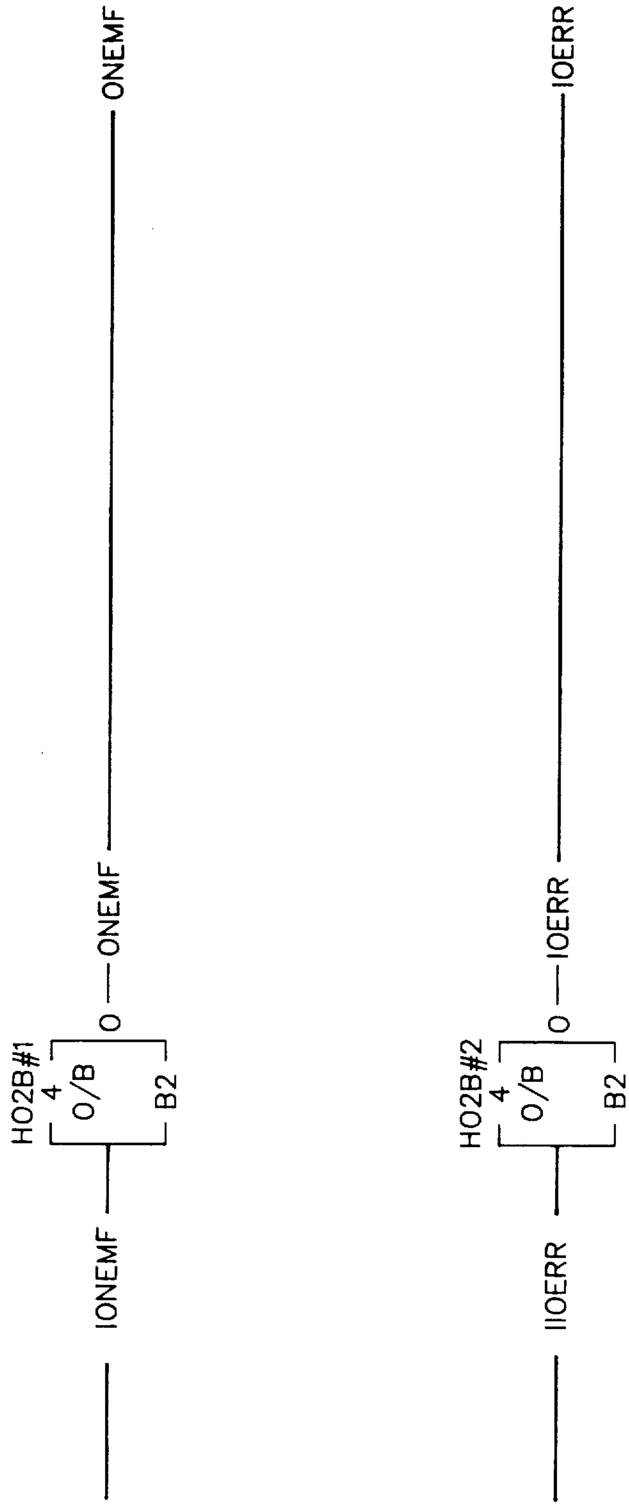
Figure 31A:
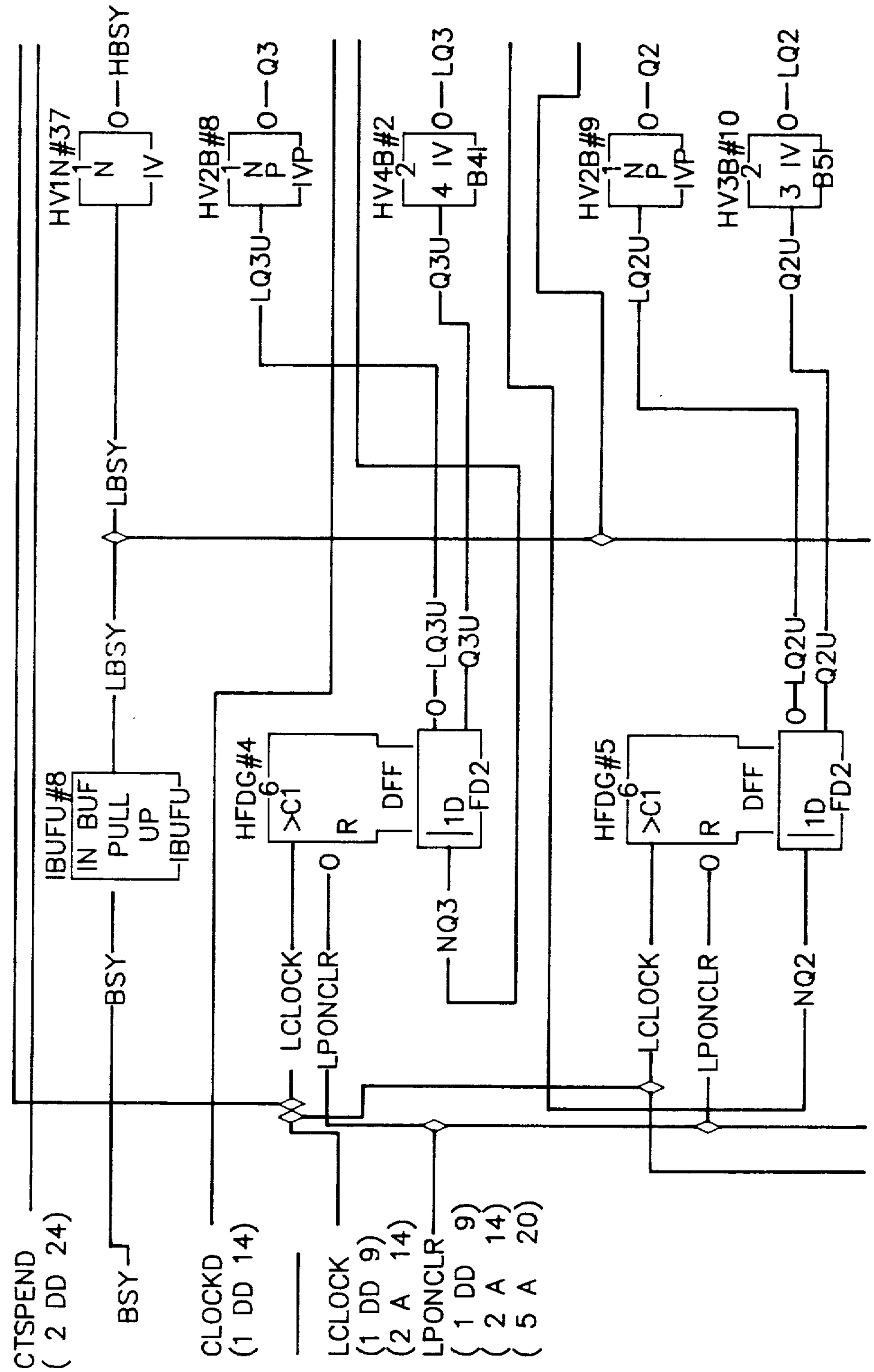
Figure 31B:
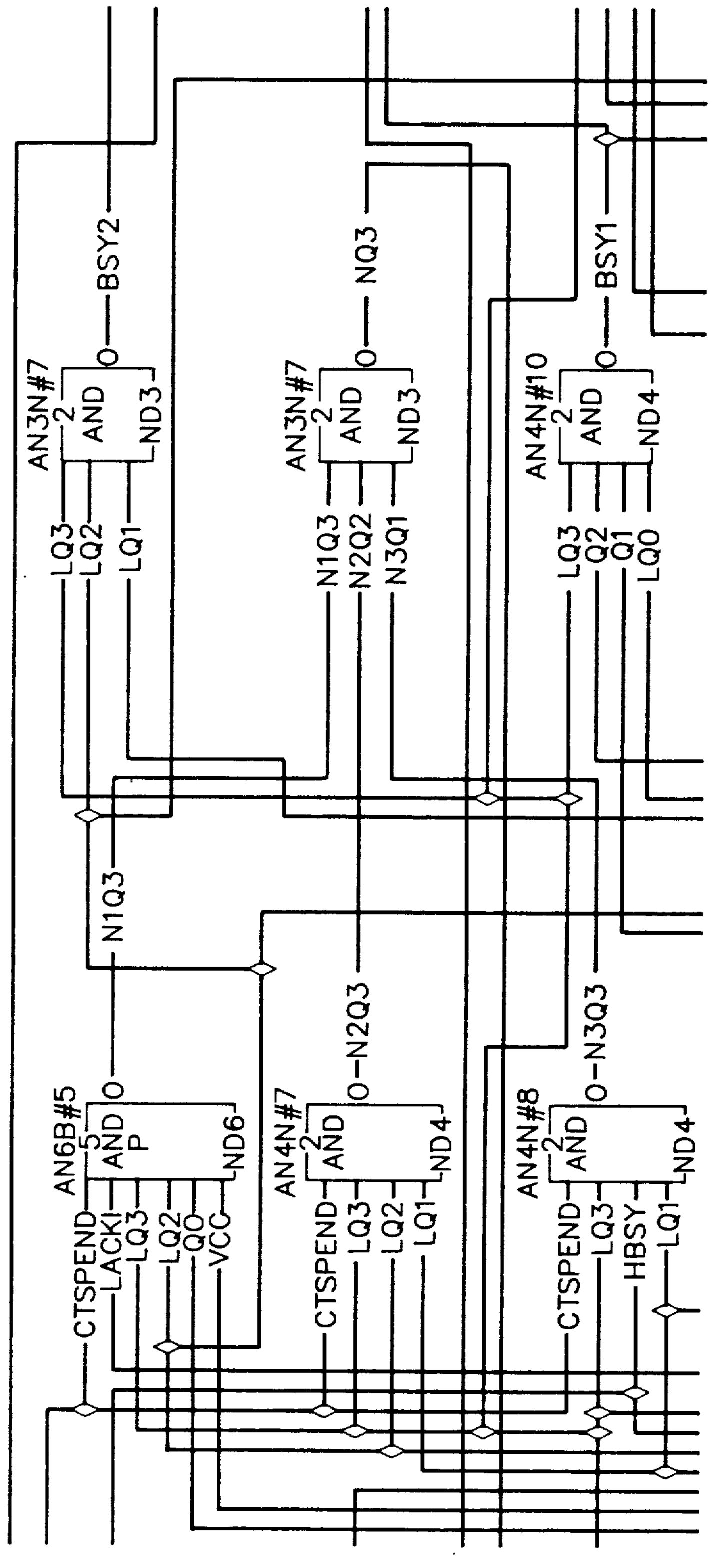
Figure 31B:
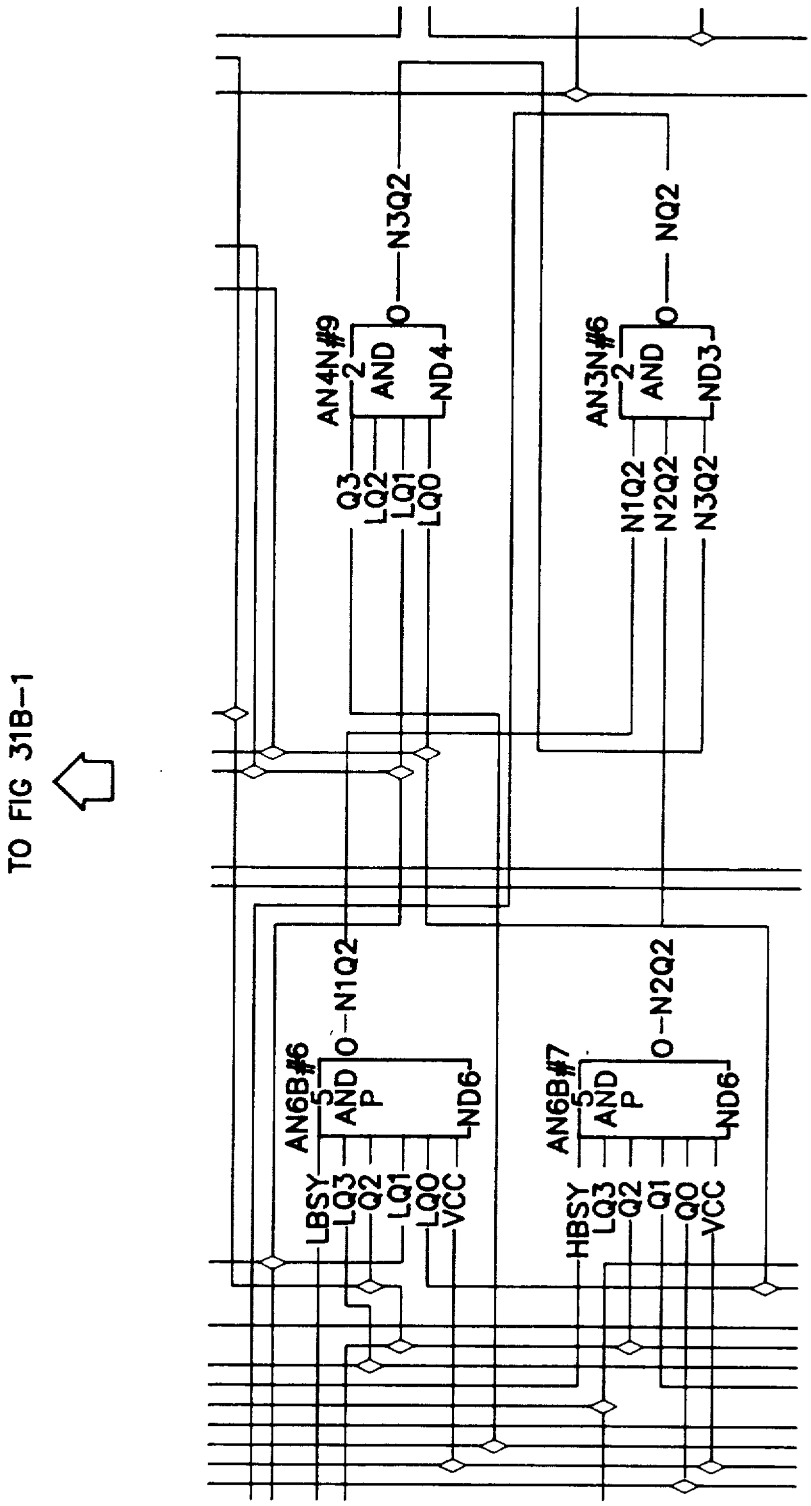
Figure 31C:
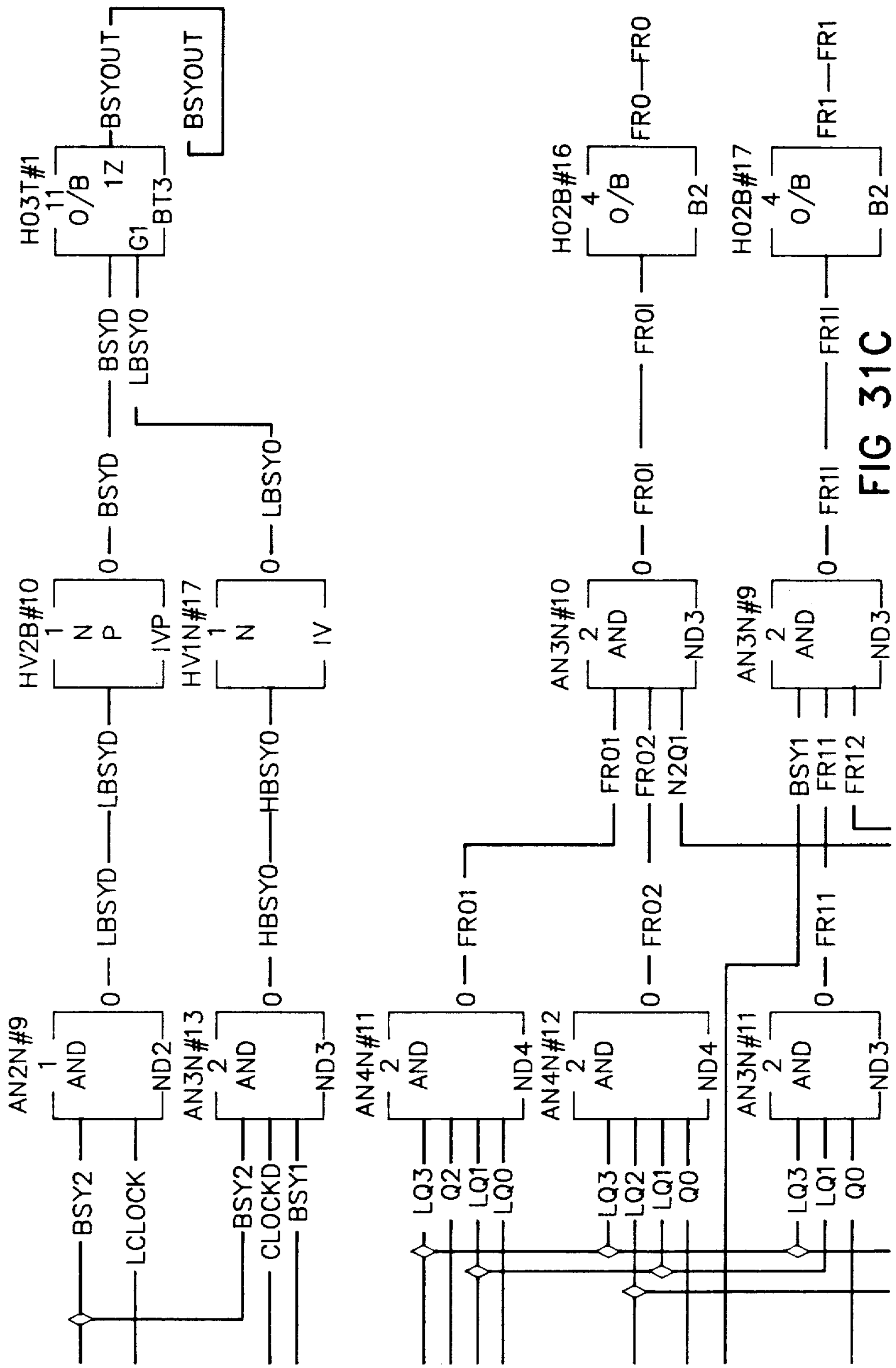
Figure 31D:
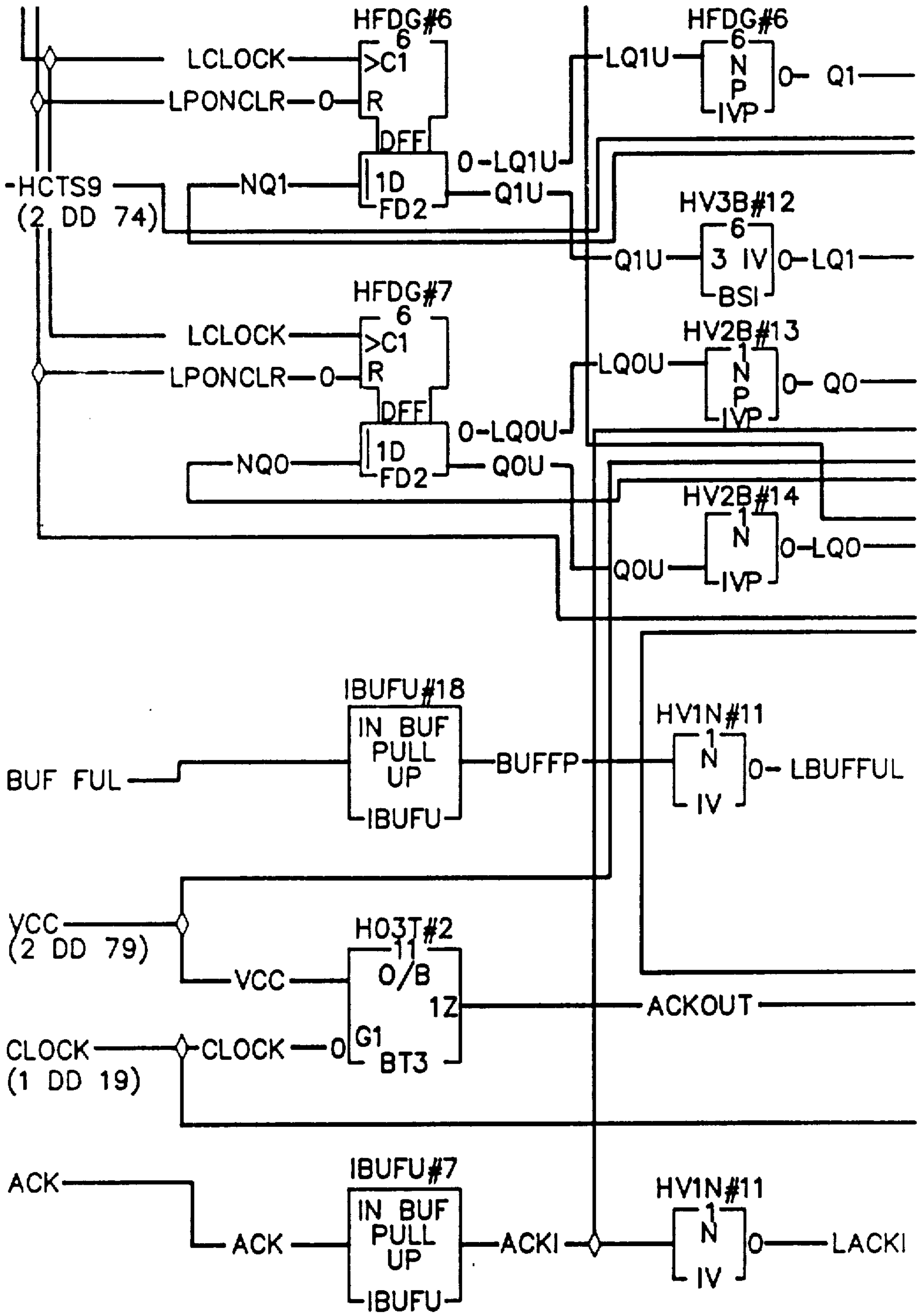
Figure 31E:
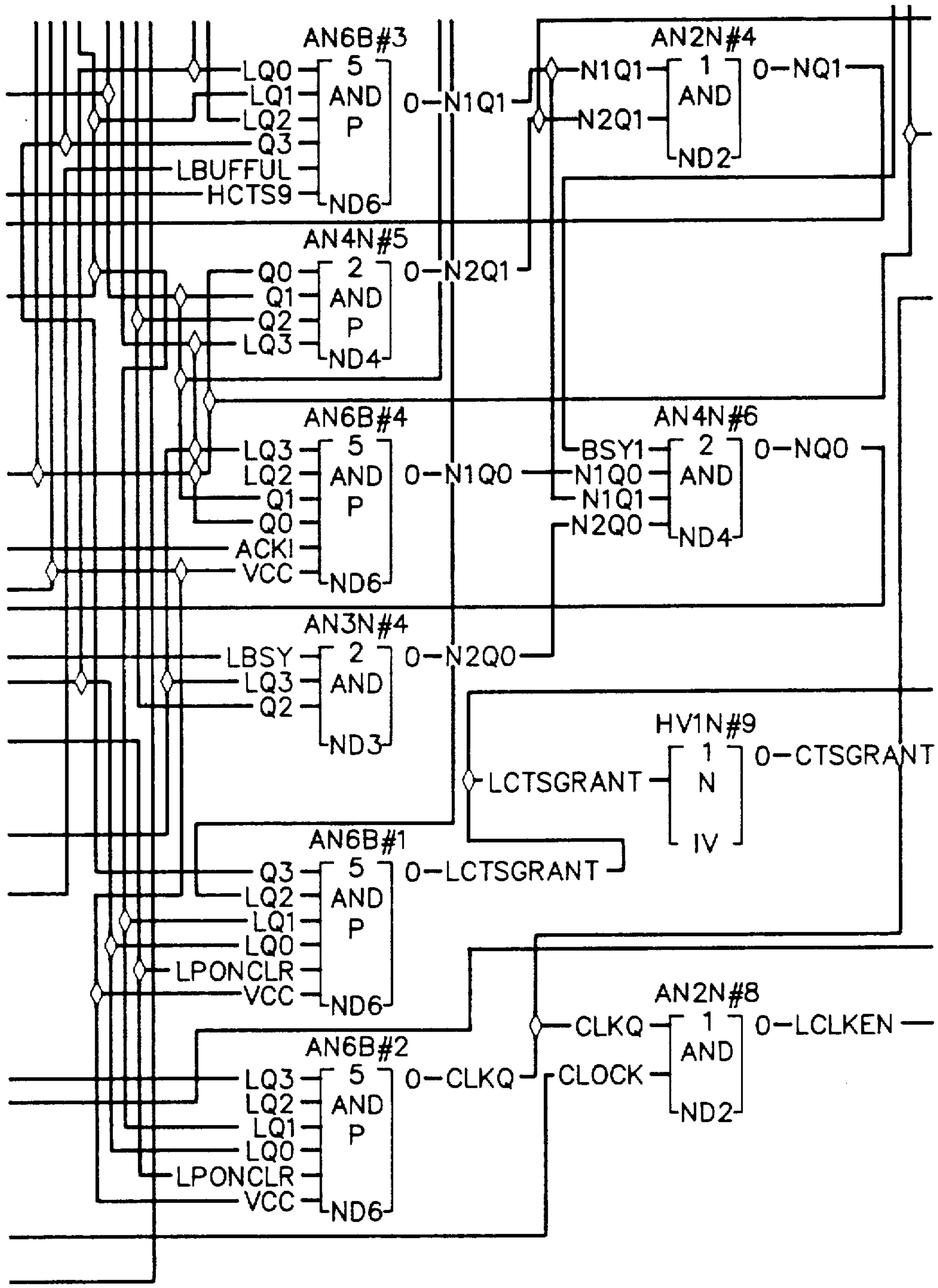
Figure 31F:
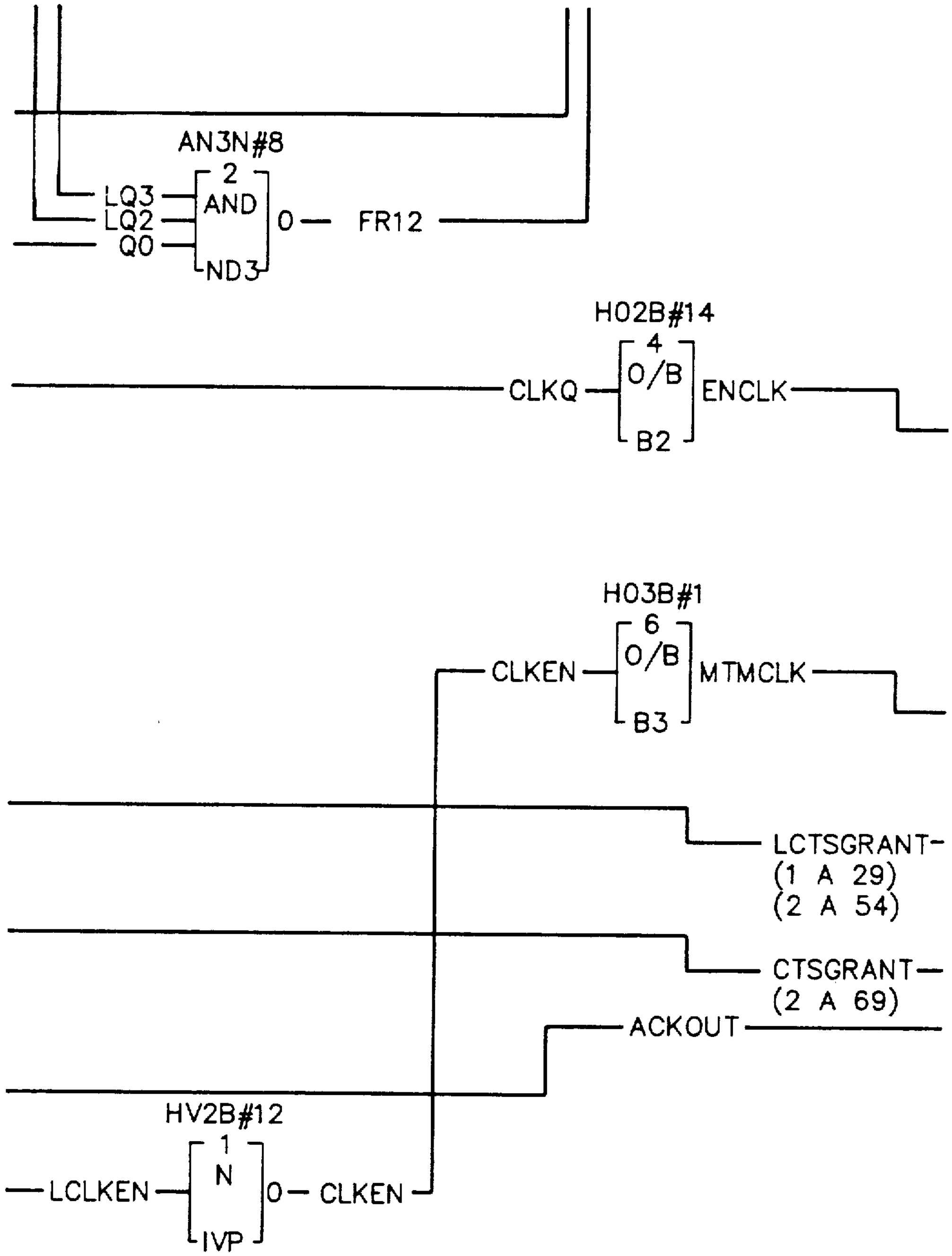
Figure 32A:
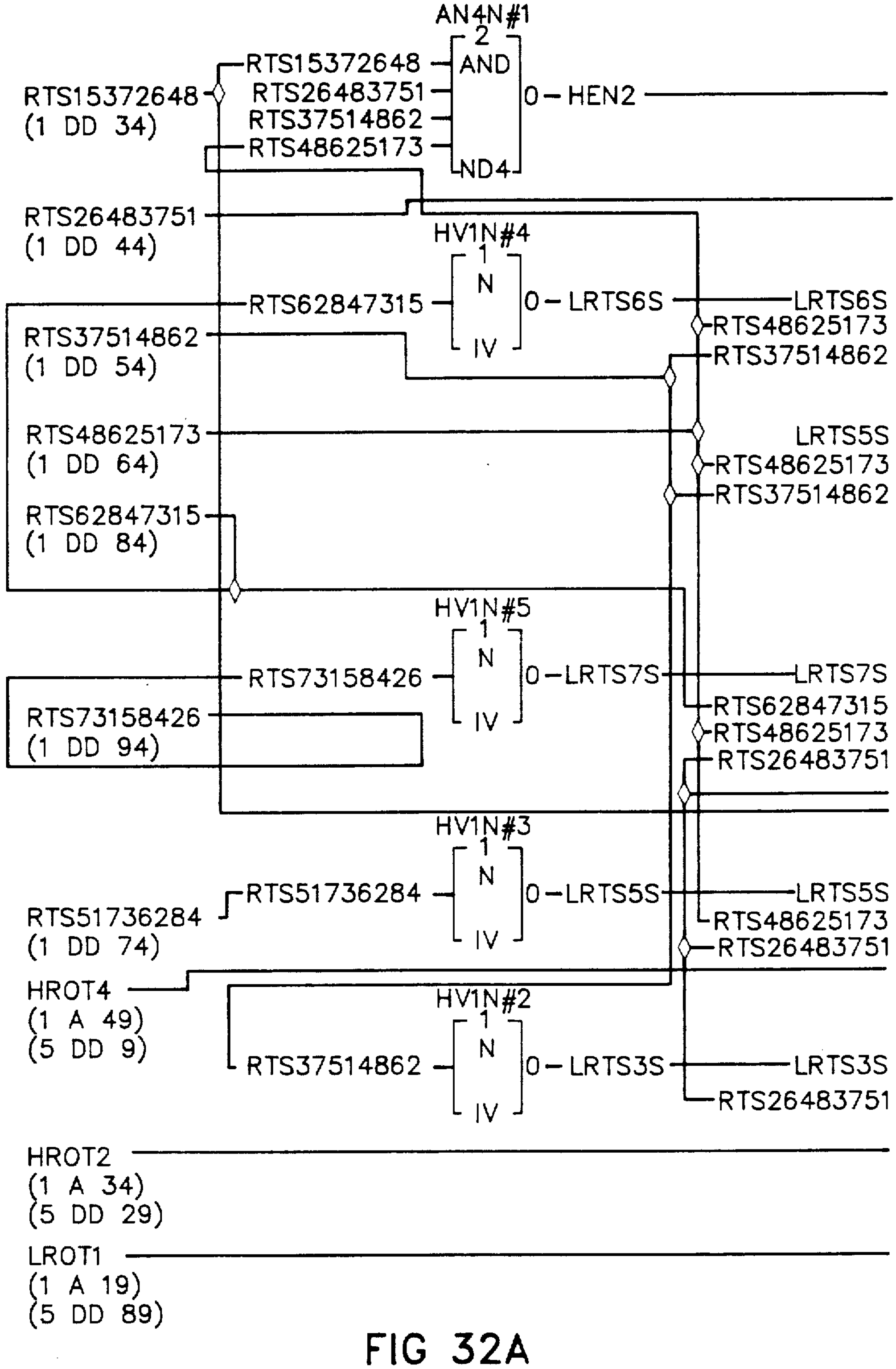
Figure 32B:
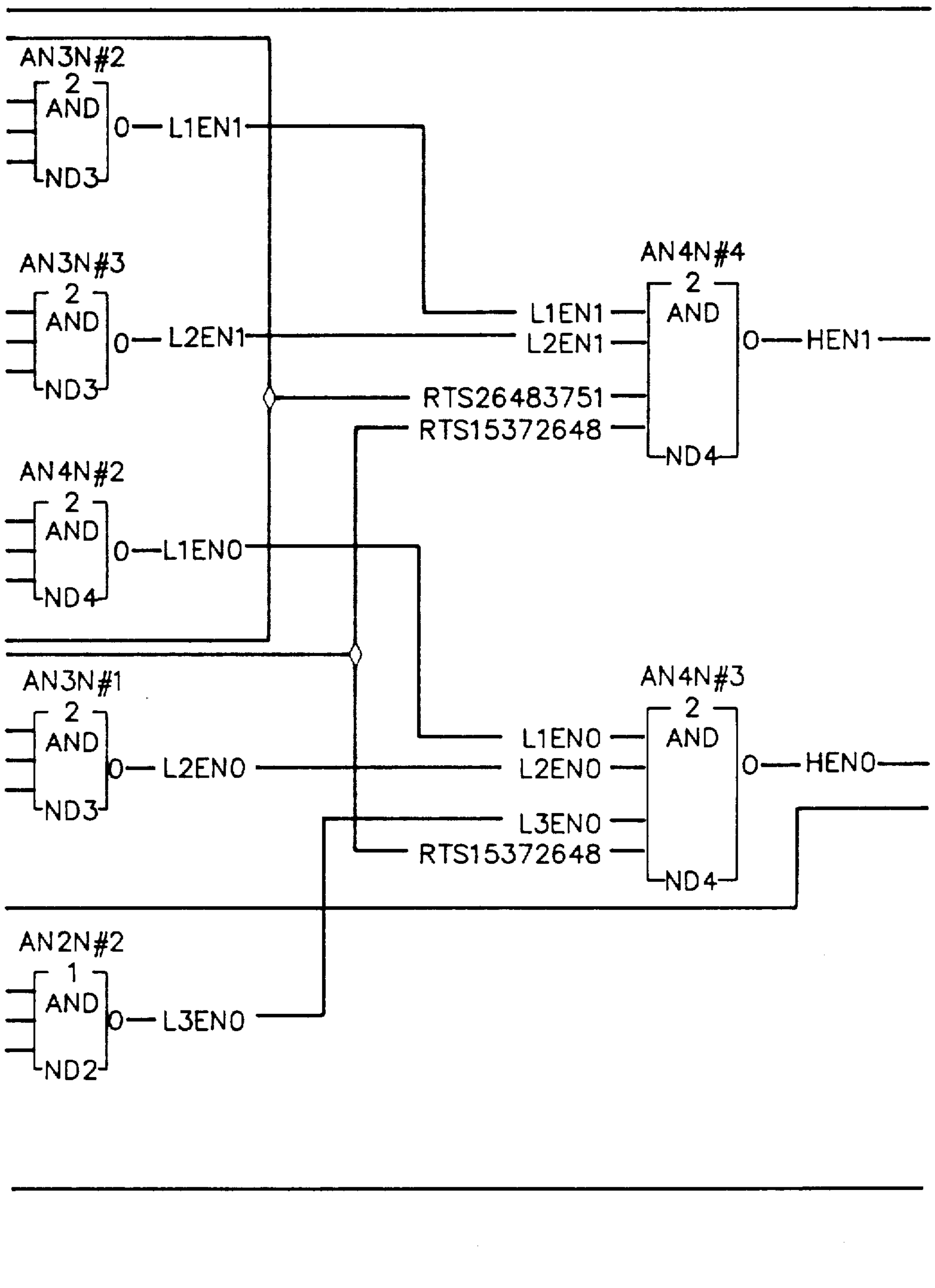
Figure 32C:
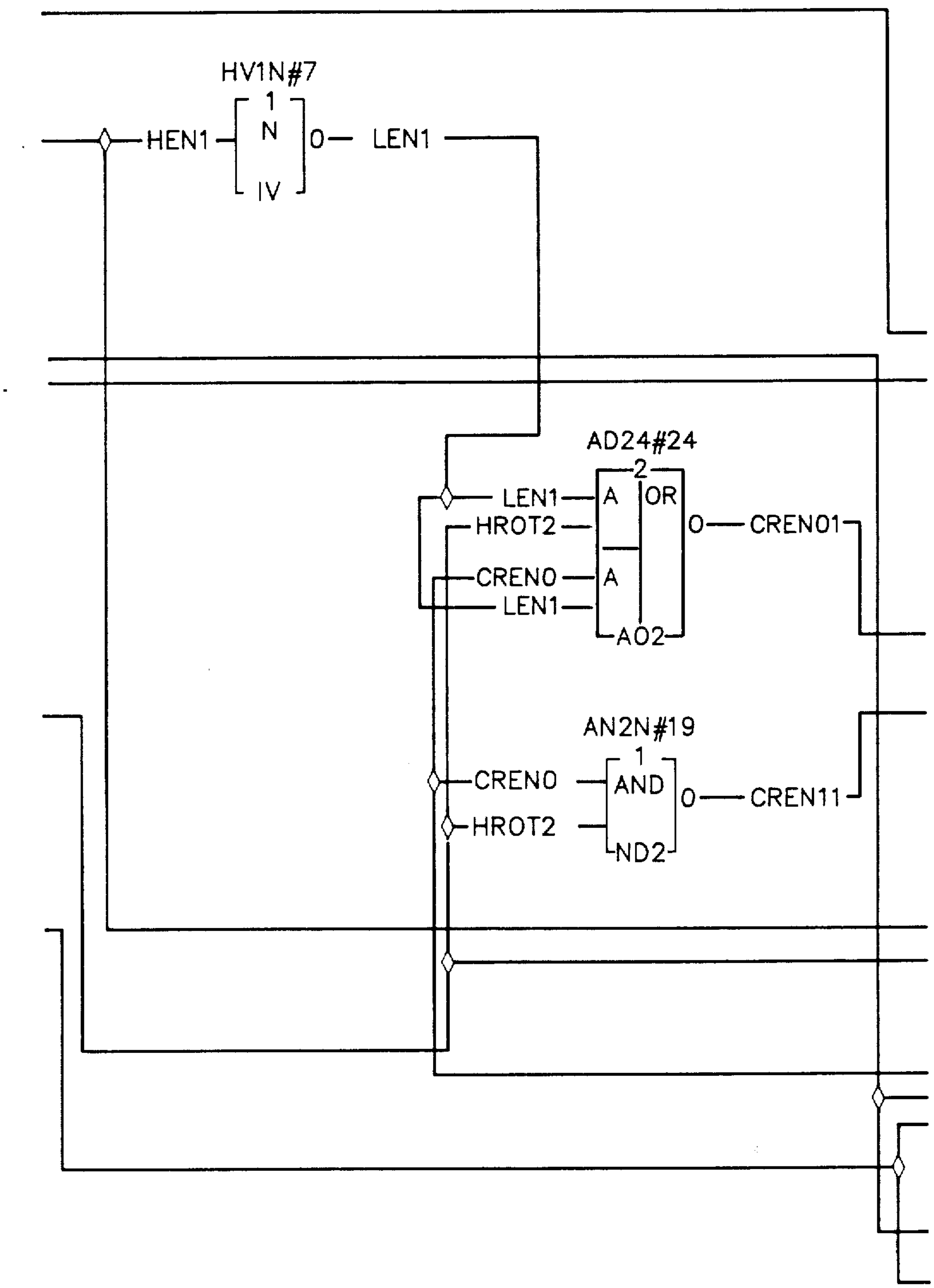
Figure 32D:
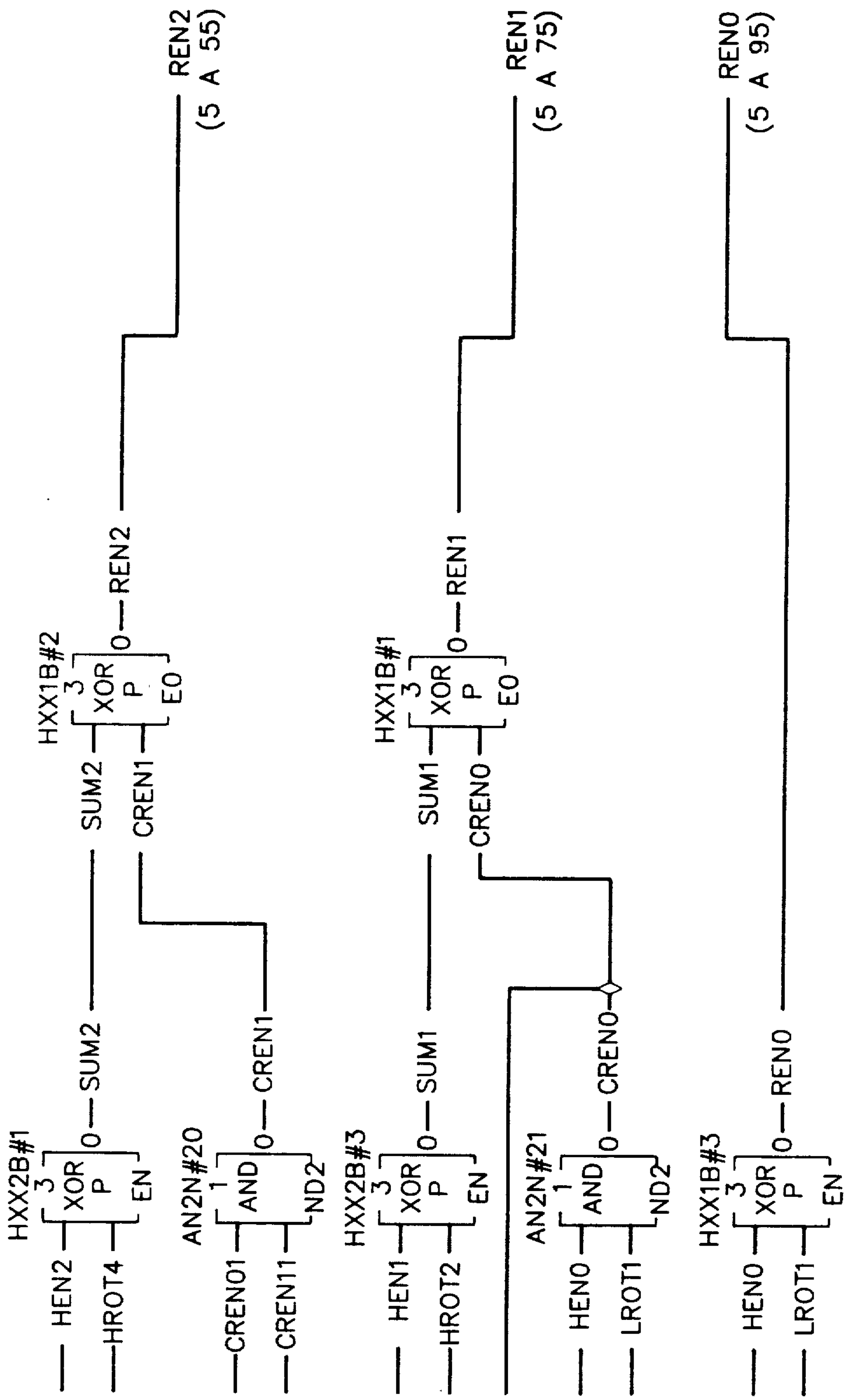
Figure 33A:
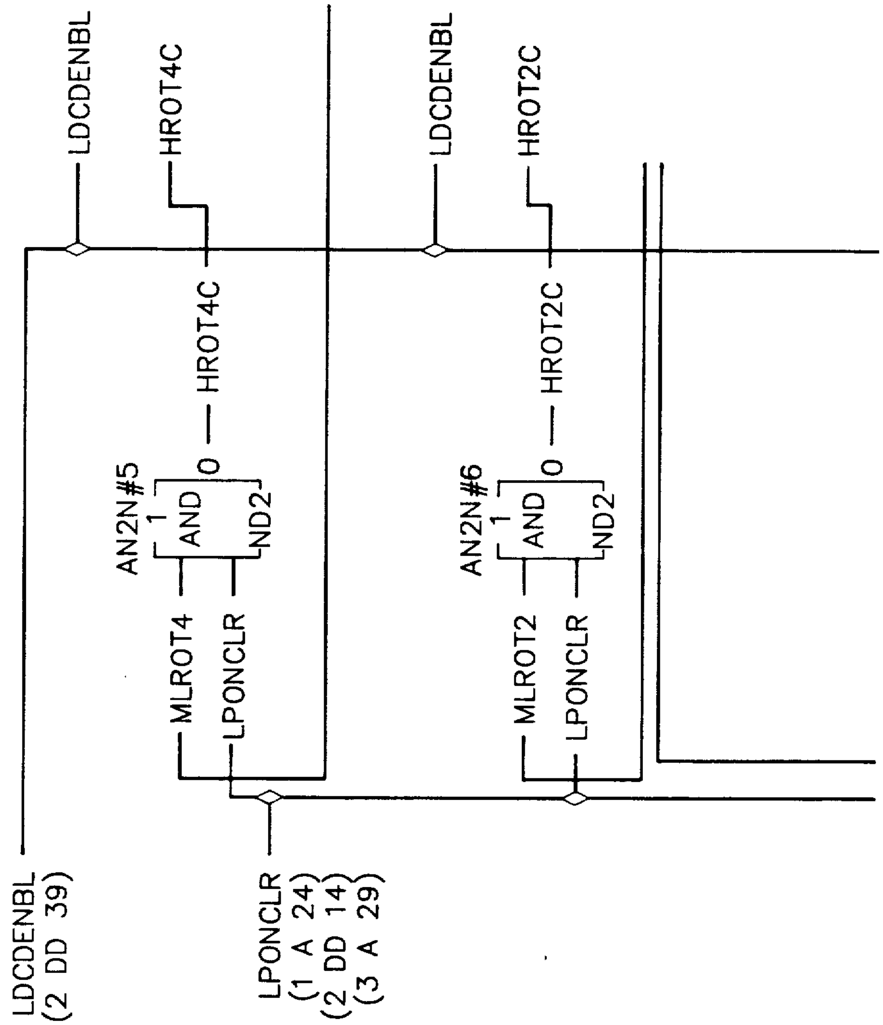
Figure 33B:
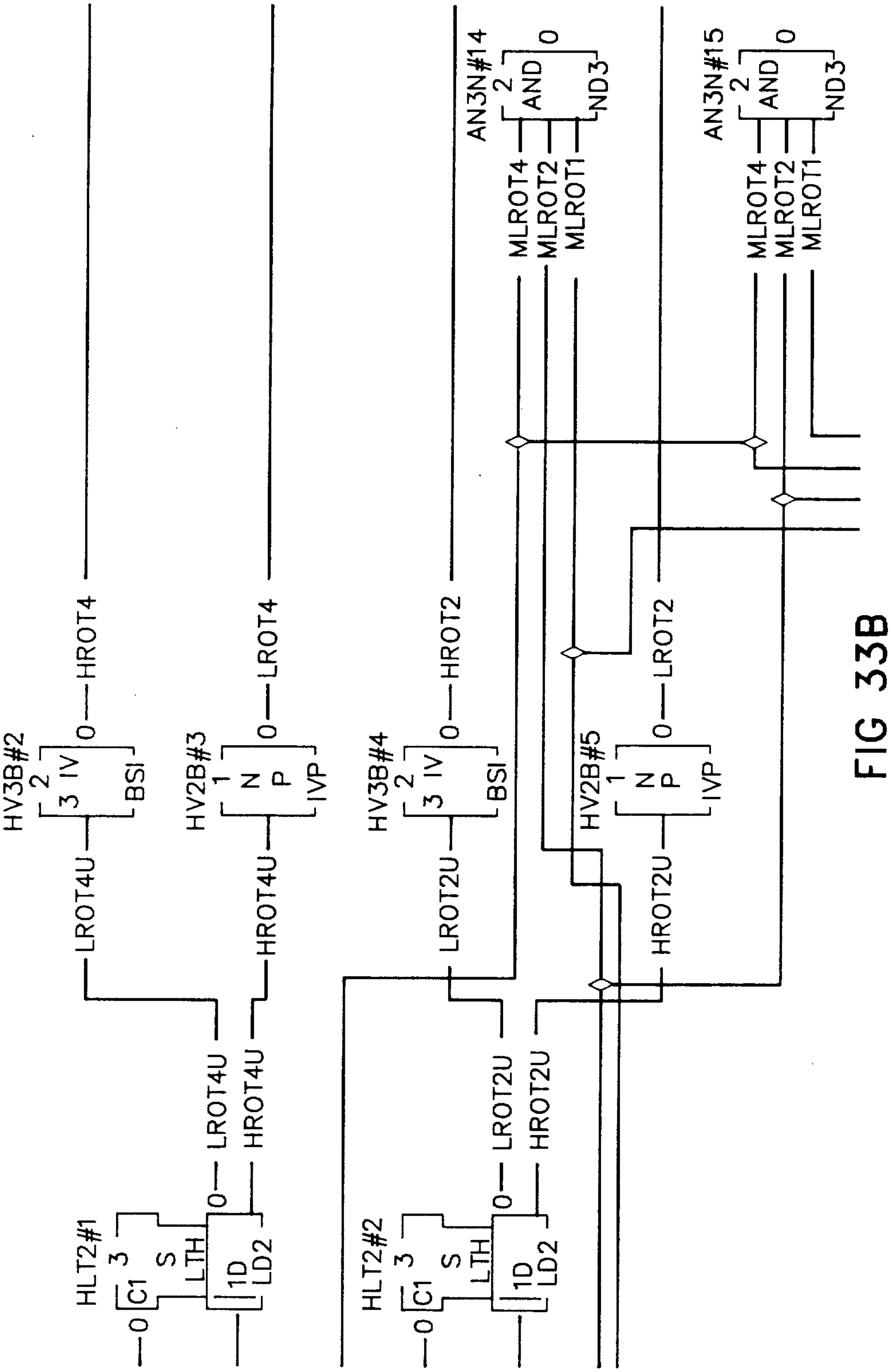
Figure 33C:
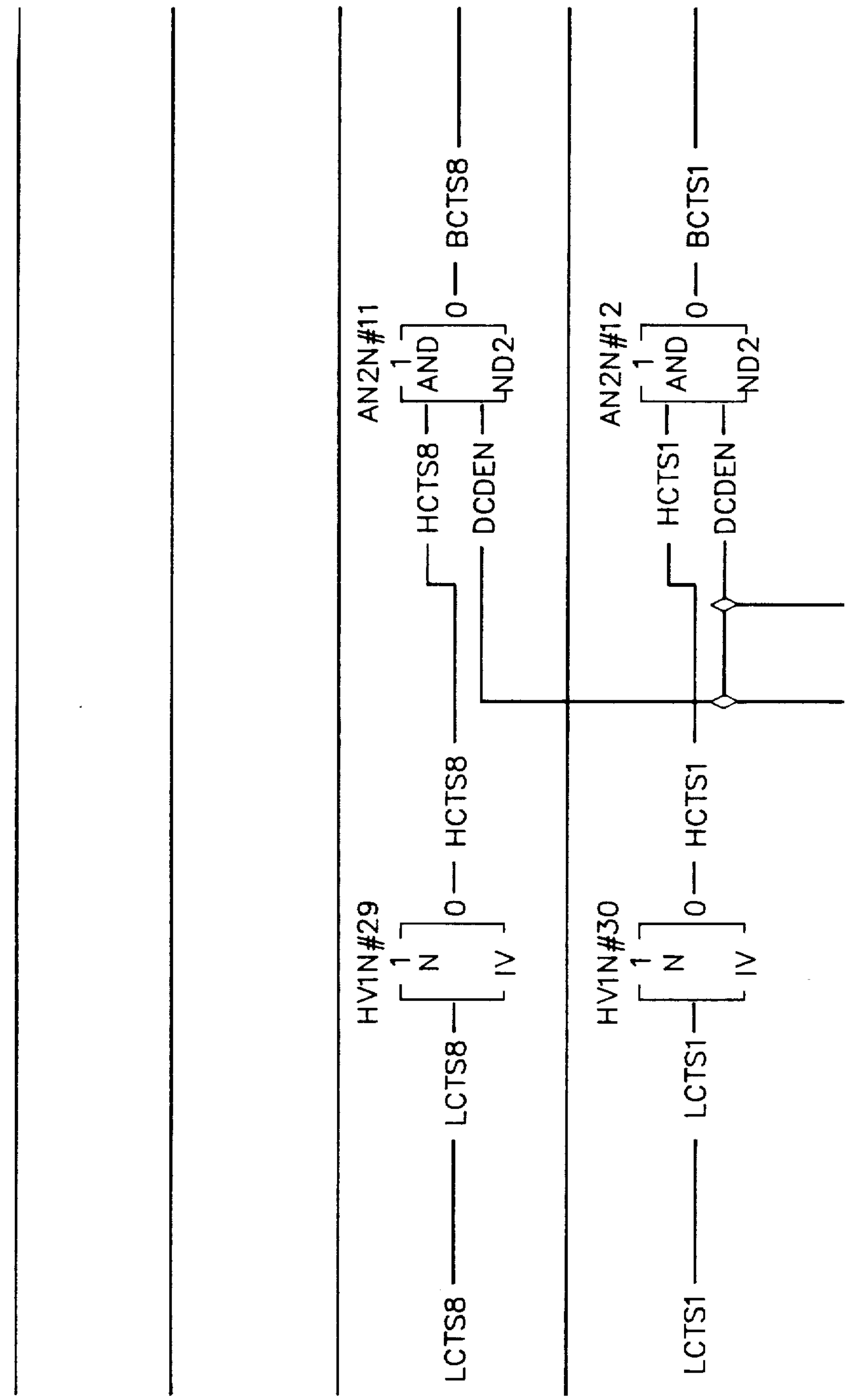
Figure 33D:
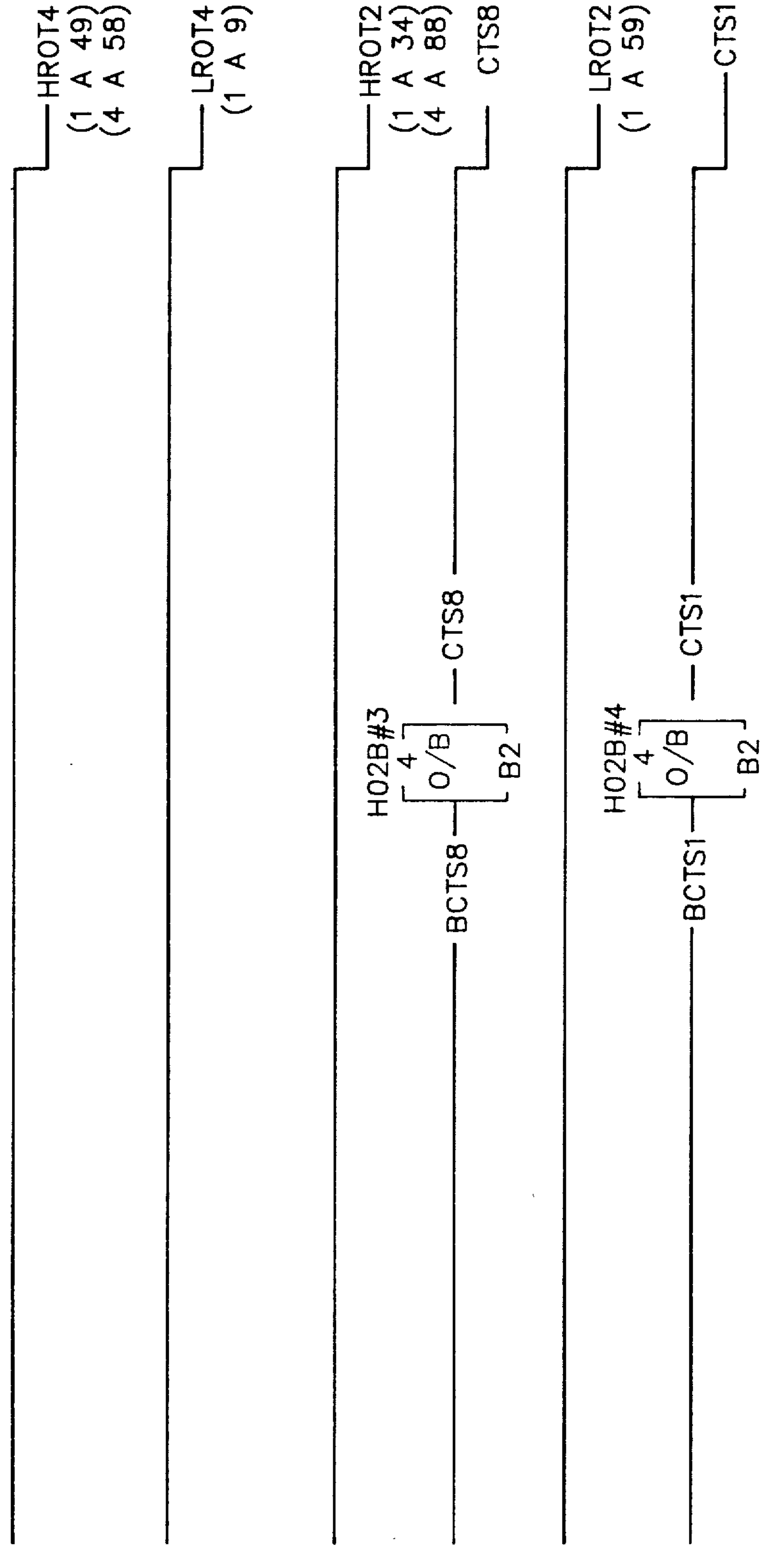
Figure 33E:
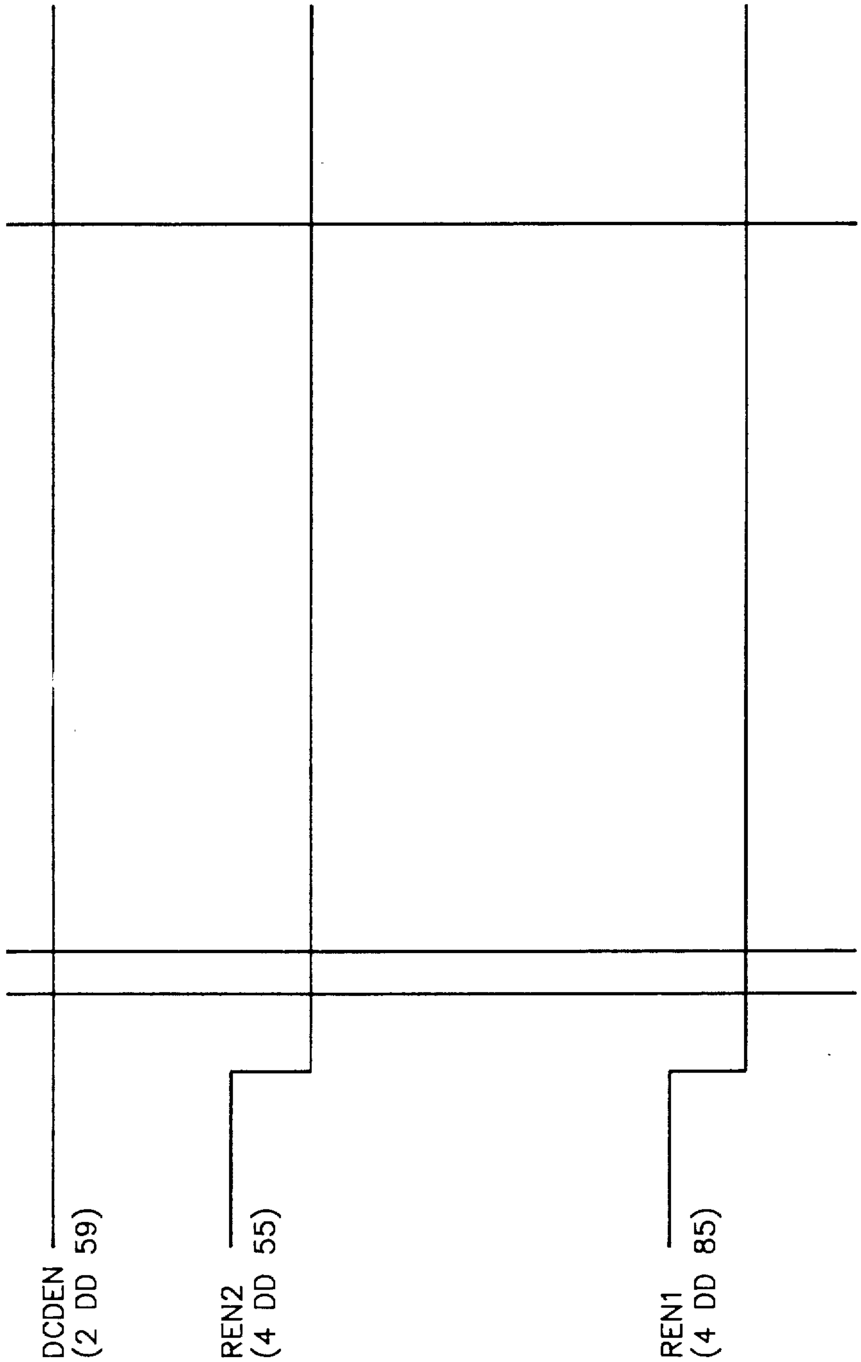
Figure 33F:
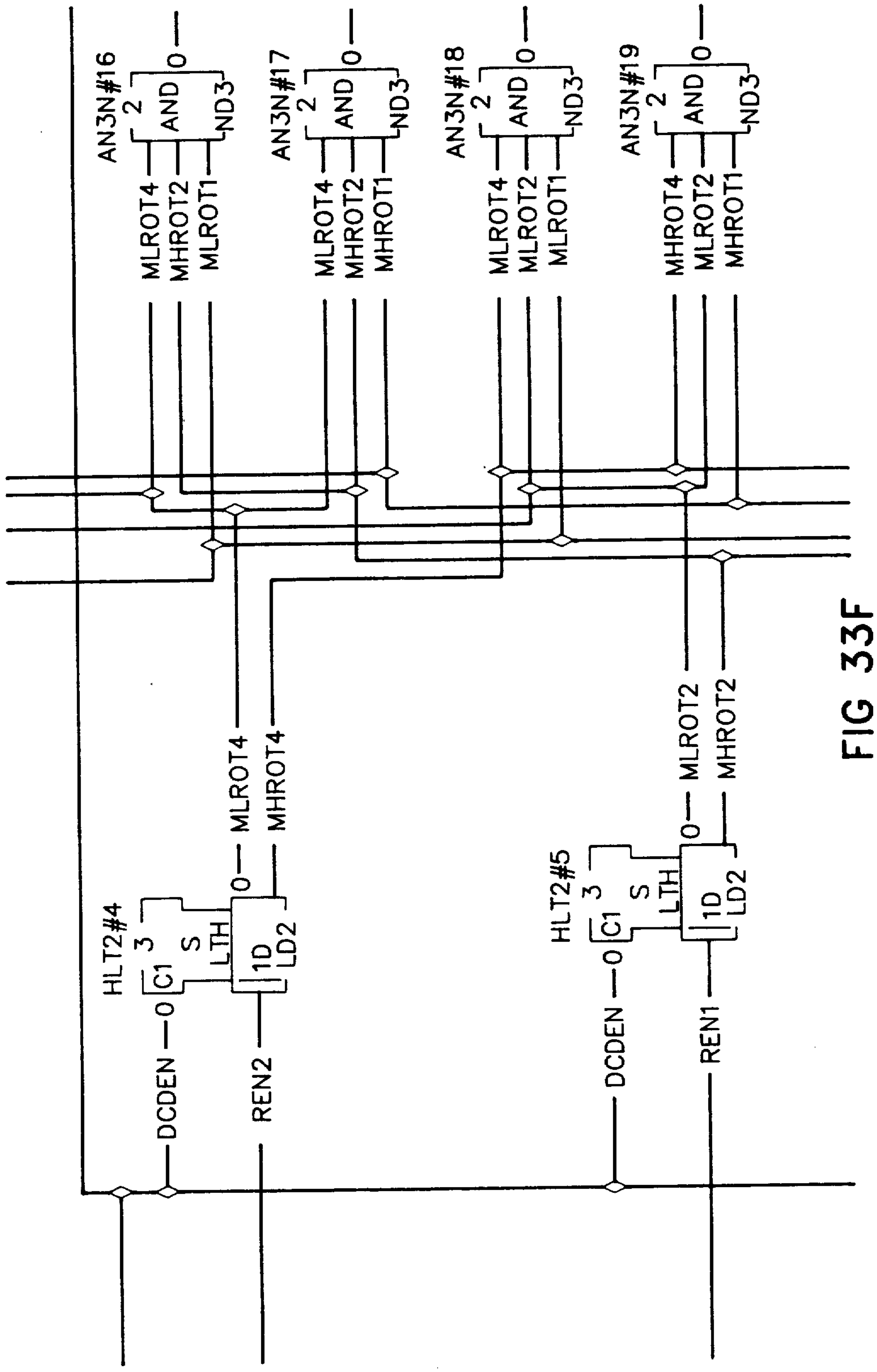
Figure 33G:
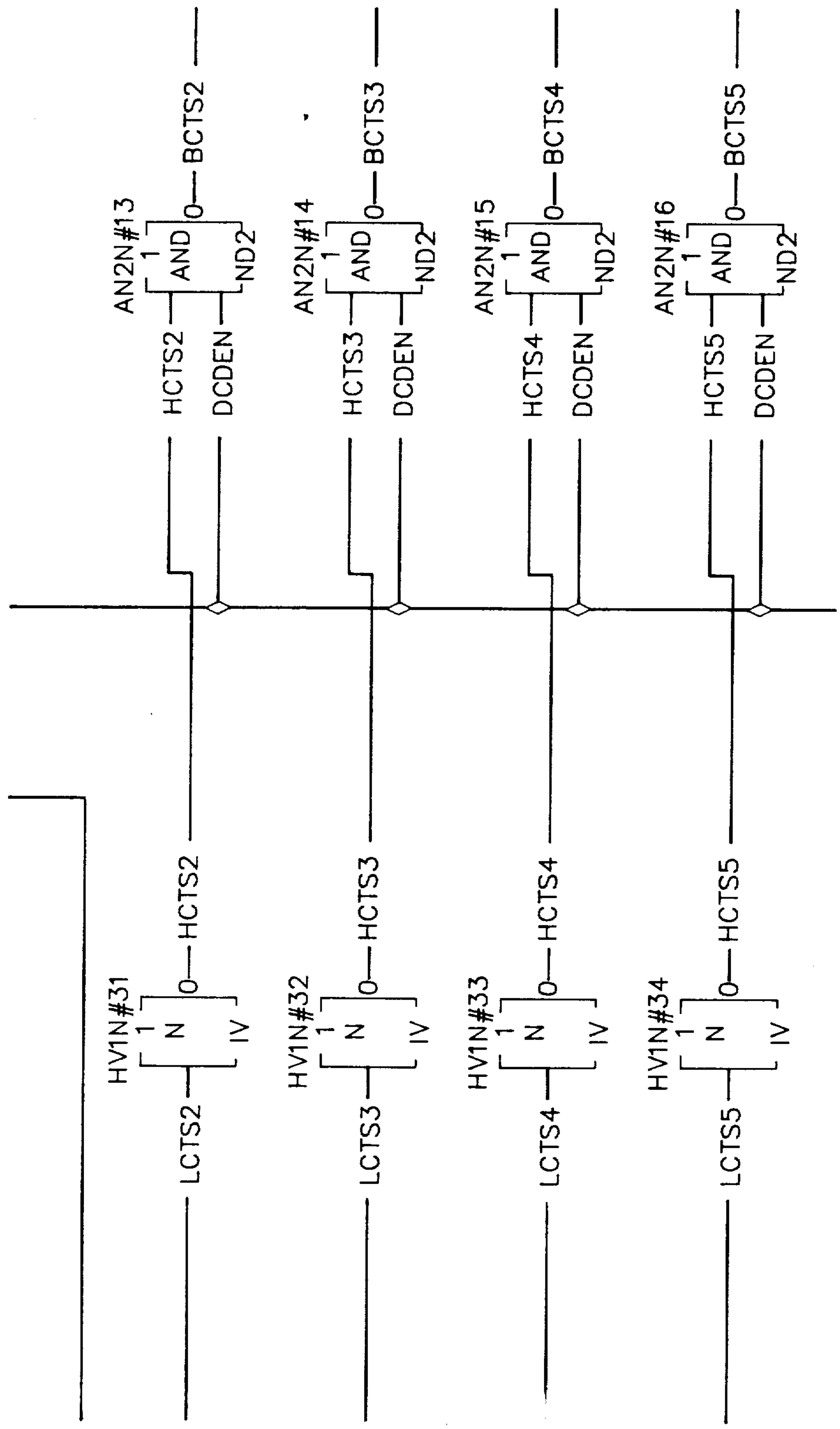
Figure 33H:
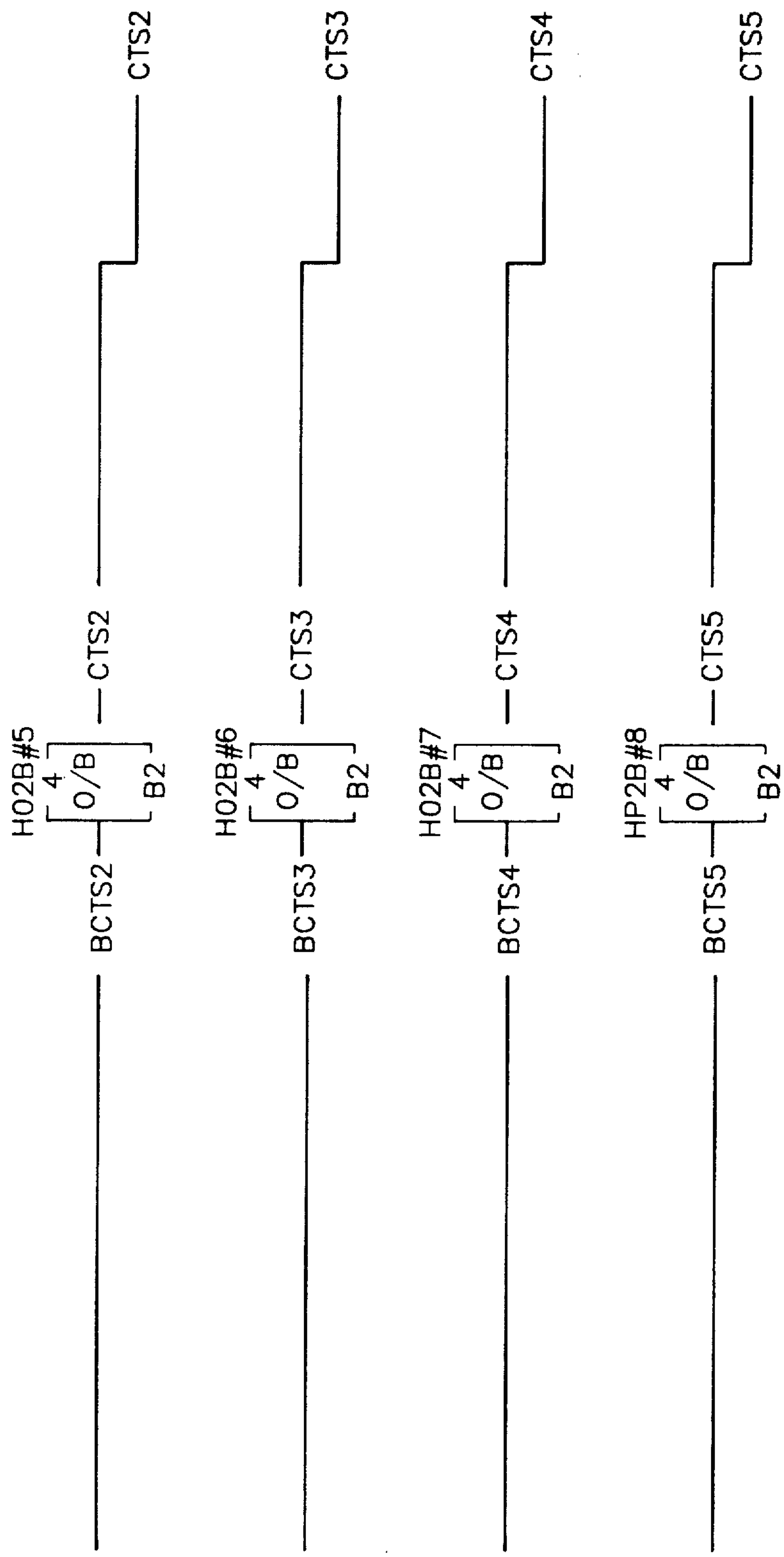
Figure 33I:
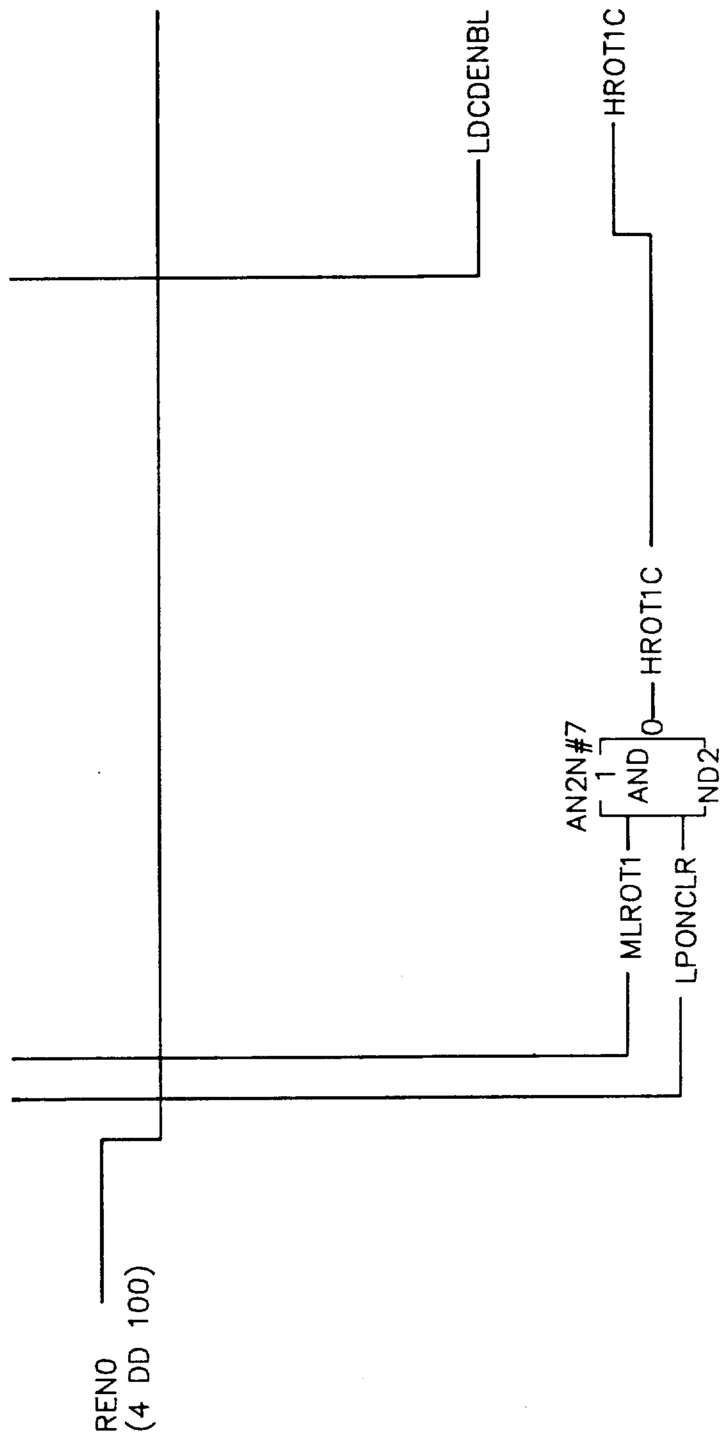
Figure 33J:
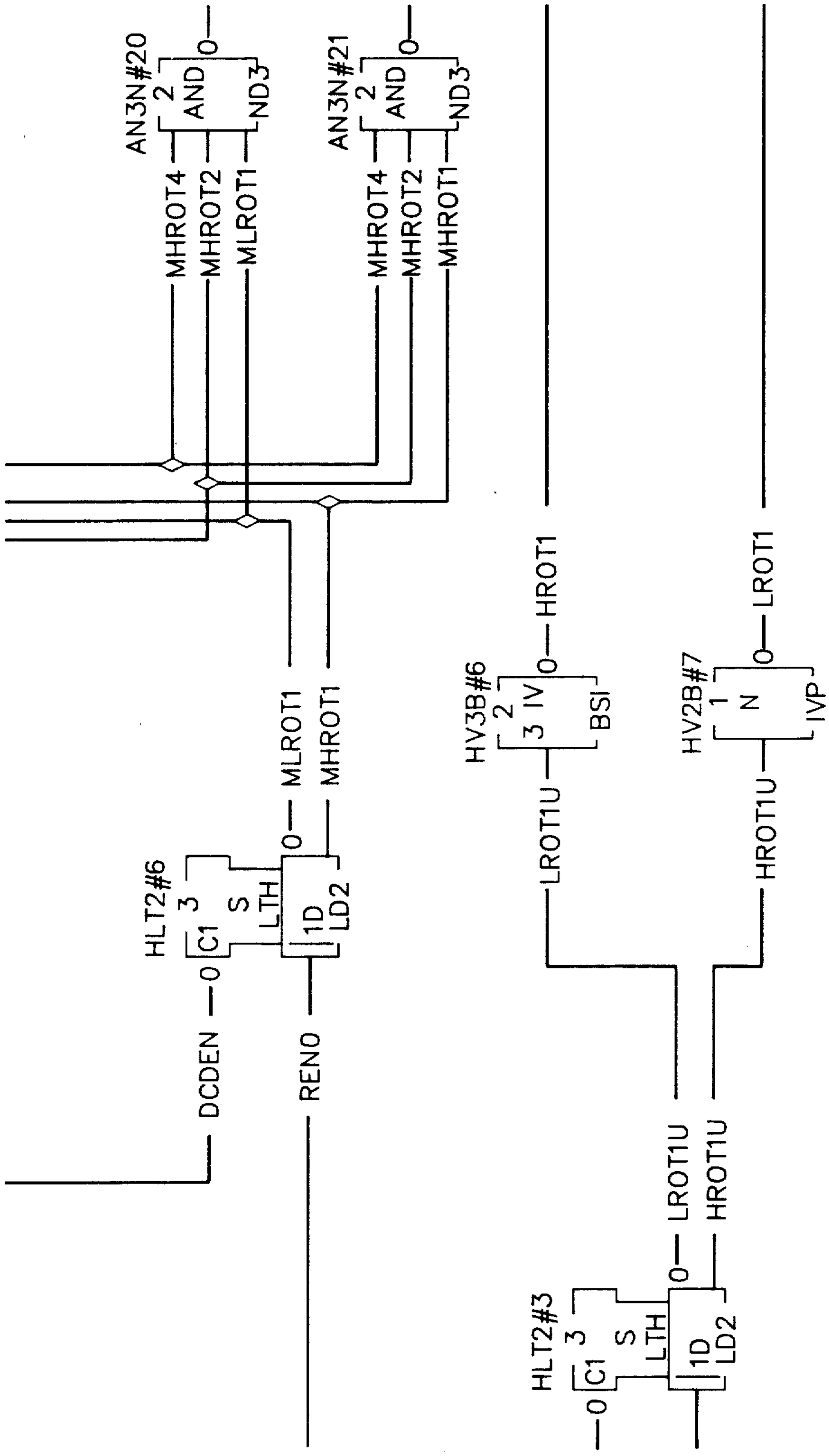
Figure 33K:
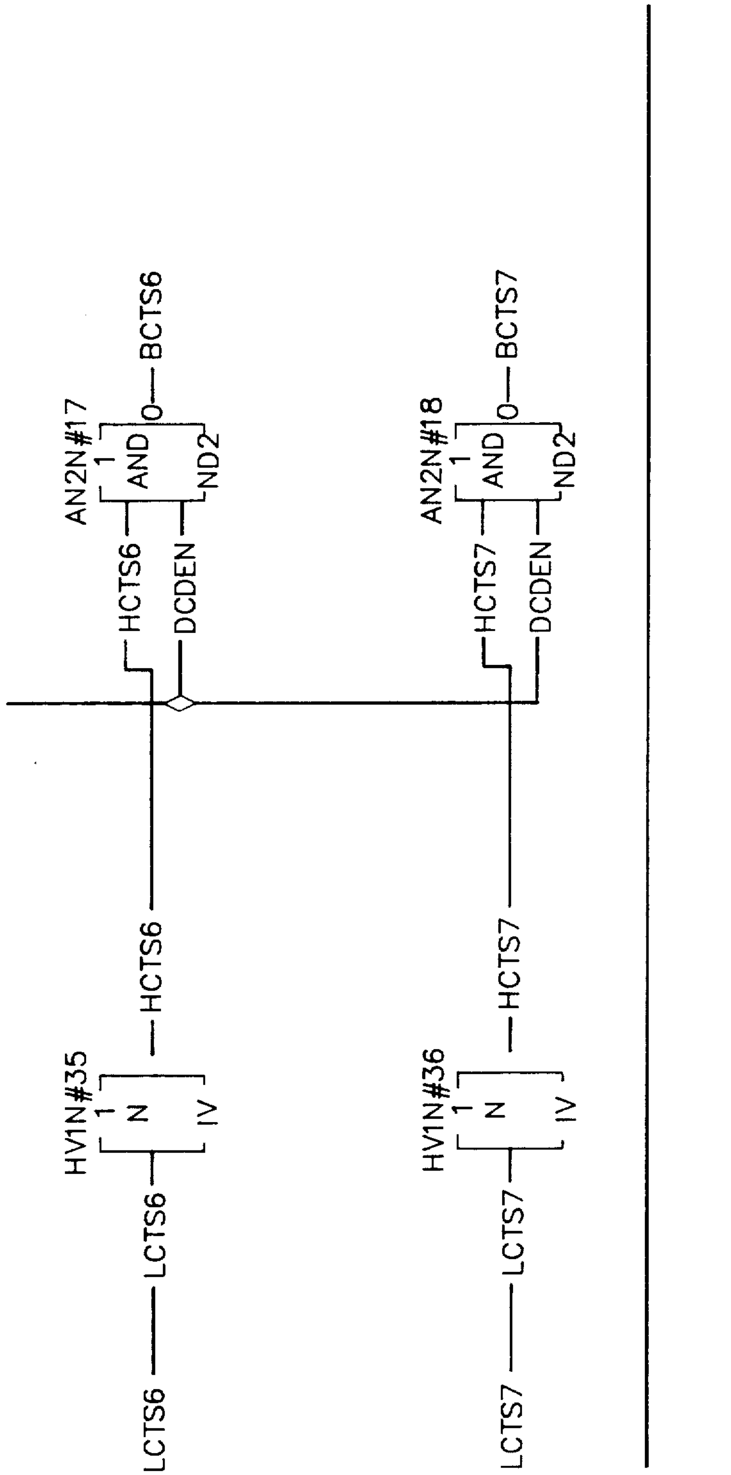
Figure 33L:
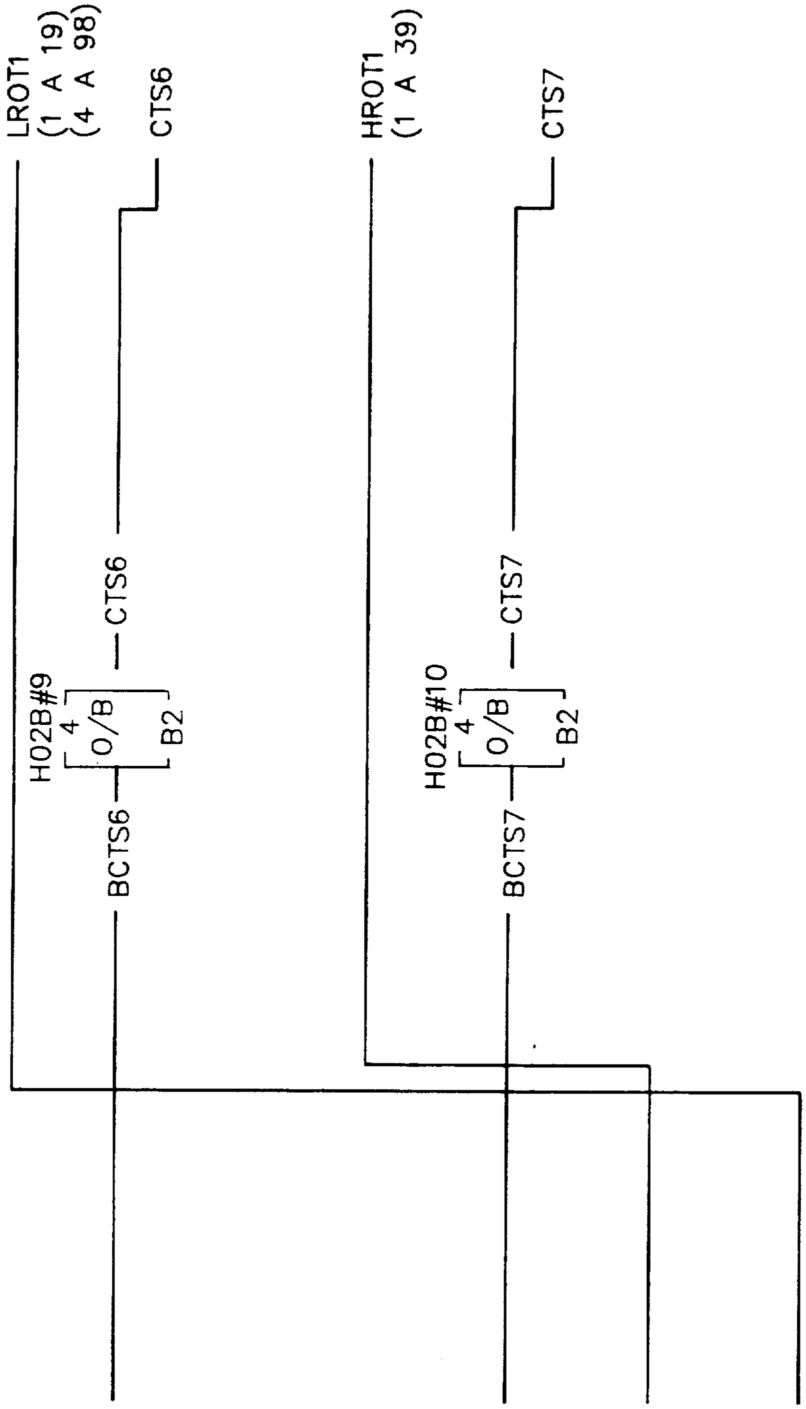

FIGS. $3A_1$, $3A_2$ and $3A_3$ are graphical representations of different situations that can exist in the type of communication illustrated in FIG. 3A;

FIG. 3B is a simplified block diagram illustrating a communication type wherein a message from a transmitter means in a group is placed on the external bus;

FIGS. $3B_1$ and $3B_2$ are graphical representations of different situations that can exist in the type of communication illustrated in FIG. 3B;

FIG. 3C is a simplified block diagram illustrating a communication type wherein a message is received by an external transmitter means of a group and intended for a data transfer means in another group;

FIGS. $3C_1$ and $3C_2$ are graphical representations of different situations that can exist in the type of communication illustrated in FIG. 3C;

FIG. 3D is a simplified block diagram illustrating a communication type wherein a message is received by an external transmitter means of a group and is intended for an internal data transfer means;

FIGS. $3D_1$, $3D_2$, $3D_3$, $3D_4$ and $3D_5$ are graphical representations of different situations that can exist in the type of communication illustrated in FIG. 3D;

FIG. 3E is a simplified block diagram illustrating a communication type wherein a message is received by an external transmitter means of a group and returned to the internal transmitter means which originally sent the message;

FIG. $3E_2$ is a graphical representation of the type of communication illustrated in FIG. 3E;

FIGS. 4A and 4B are the respective upper and lower portions of a flow chart for the arbitrator which determines the sequence with which transmitter means will be given access to the internal bus;

FIG. 5 is a block diagram of the arbitrator;

FIGS. 6A and 6B constitute a state machine flow chart, a portion of which is common to internal and external transmitter means and the remainder of which is for an internal transmitter means;

FIG. 6C is a state machine flow chart for an external transmitter means;

FIGS. 7A and 7B constitute a state machine flow chart, a portion of which is common to internal and external data transfer means and the remainder of which is for an internal data transfer means;

FIGS. 7C and 7D constitute a state machine flow chart for an external data transfer means;

FIG. 8 is a flow chart for a code state machine that identifies the registers in an external data transfer means;

FIG. 8A is a state machine register containing the two bits for each of the states set by the code state machine of FIG. 8;

FIG. 8B is a graphical illustration of the operations of FIG. 8;

FIGS. 9A' and 9B' constitute a detailed diagram showing the inter-connections between an internal chip and an external chip, the arbitrator and a differential driving system;

FIG. 9A is a diagram showing inter-connection signals that are provided in a single mainframe operation;

FIGS. 10, 10A, 10B and 10C illustrate the registers of both internal and external chips;

FIGS. 11A and 11B constitute a block diagram of an internal chip;

FIGS. 12A and 12D constitute a schematic diagram for the READ, WRITE and SELECT logic of an internal chip;

FIGS. 13A through 13H constitute a schematic diagram for a transmitter means multiplexer;

FIGS. 14A through 14F constitute a schematic diagram for a bit-8 transmit logic;

FIGS. 15A through 15I constitute a schematic diagram for receiver data registers and a same-sender comparator;

FIG. 16A through 16I constitute a schematic diagram for the interrupt enable logic;

FIGS. 17A through 17F constitute a schematic diagram for the status register;

FIGS. 18A through 18I and 19A through 19G constitute a schematic diagram for the state machine for the data transfer means;

FIGS. 20A through 20G, 21A through 21H and 22A through 22E constitute a schematic diagram for a state machine for the transmitter means;

FIGS. 23A and 23B constitute a schematic diagram for a data transfer register and for a transmitter output buffer;

FIGS. 24A through 24I constitute a schematic diagram for a fifo buffer;

FIGS. 25A through 25F constitute a schematic diagram for a data-in processor and a fifo multiplexer;

FIGS. 26A through 26F constitute a schematic diagram for a receiver READ multiplexer and an output buffer;

FIGS. 27A through 27D and 28A through 28D constitute a schematic diagram for the fifo memory and control;

FIGS. 29A through 29I constitute a schematic diagram for the RTS input and barrel shifter of the arbitrator;

FIGS. 30A through 30I constitute a schematic diagram for the mainframe by-pass logic and I/O error logic for the arbitrator;

FIGS. 31A through 31F constitute a schematic diagram for the arbitrator state machine;

FIGS. 32A through 32D constitute a schematic diagram for the RTS priority encoder; and FIGS. 33A through 33L constitute a schematic diagram for the CTS priority decoder.

DETAILED DESCRIPTION OF THE INVENTION

OVERVIEW

Figure 1:
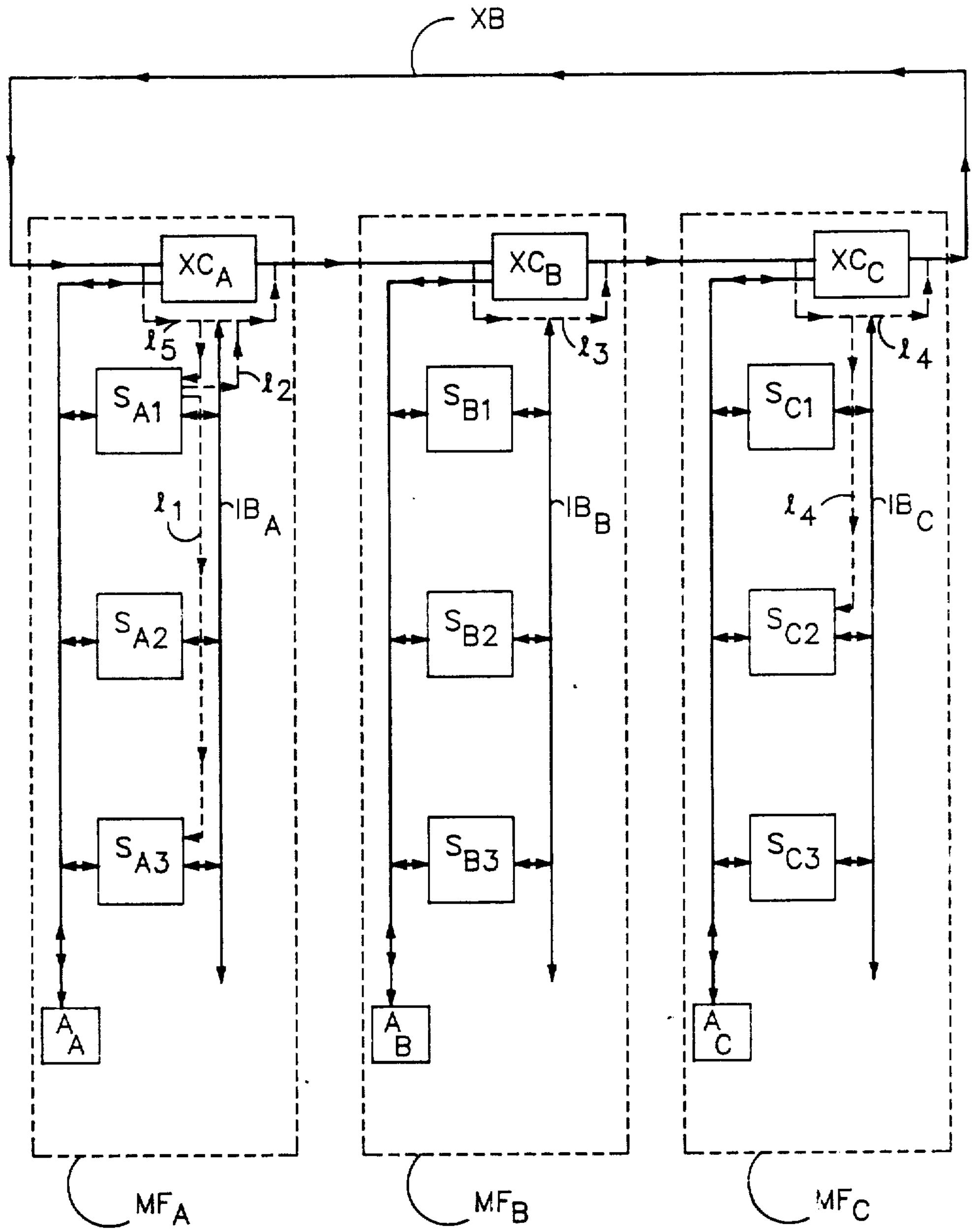
FIG. 1 is a simplified block diagram of a bus system incorporating this invention which illustrates the different types of communications involved.

In order to provide a basic understanding of the overall operation of a bus system incorporating this invention, reference is made to FIG. 1 in which three mainframes $MF_A$, $MF_B$ and $MF_C$ are shown at different points on an external bus XB which is in the form of a loop. The mainframe $MF_A$ is comprised of a coupling means $XC_A$ for transferring signals from the external bus XB to an internal bus $IB_A$ and vice-versa; three stations $S_{A1}$, $S_{A2}$ and $S_{A3}$ that can supply information to and receive information from the internal bus $IB_A$ under the control of their respective microprocessors (not shown); and an arbitrator $A_A$ that determines the sequence in which the coupling means $XC_A$ and the stations $S_{A1}$, $S_{A2}$ and $S_{A3}$ have access to the internal bus $IB_A$. Much time is saved by including the coupling means $XC_A$ or any station in the sequence only when $XC_A$ or that station has a message to deliver. Messages placed on the external bus XB by the coupling means $XC_A$ flow around the loop formed by the external bus XB in a counterclockwise direction, as indicated by the arrows. The purpose of the bus system is to deliver messages provided by the microprocessor of a station to a designated station, but the microprocessor is not part of the invention. As will be seen, microprocessors only need provide messages in a given format, but achieving that result is well within the skill of the art. Except for the subscripts, the mainframes $MF_B$ and $MF_C$ are the same as $MF_A$.

A bus system incorporating this invention is capable of performing five different types of communications and reacting to different situations that may be encountered in each in a manner explained in detail in connection with FIGS. 3A through 3E. In the description of these five types of communication, the path or paths followed by the message is indicated by a designated dashed line in FIG. 1.

A first type of communication situation is from a station such as $S_{A1}$ to a station such as $S_{A3}$ in the same mainframe. As indicated by the dashed line $l_1$, the message flows from $S_{A1}$ to $S_{A3}$ via the internal bus $IB_A$. In a situation where $S_{A3}$ can receive the message, it is delivered; but in a situation where $S_{A3}$ cannot receive the message or where it can receive the message but is instructed by its microprocessor to only receive a message from another station, the message remains in the sending station $S_{A1}$ until it is given another turn on the internal bus $IB_A$ and delivers the message or until the microprocessor of $S_{A1}$ aborts the message.

A second type of communication situation occurs when a message from a station is put onto the external bus XB for delivery to a station in another mainframe. If, for example, the message originates in $S_{A1}$ of $MF_A$ and is intended for station $S_{C2}$ in mainframe $MF_C$, it passes via the internal bus $IB_A$ to the coupling means $XC_A$ which places it on the external bus XB as indicated by the dashed line $l_2$. There are two situations that can be encountered. Either the coupling means $XC_A$ can make the transfer or it cannot. If it cannot, the message stays in the station $S_{A1}$ to await another turn unless it is aborted.

A third type of communication situation occurs when a message on the external bus XB arrives at the coupling means of a mainframe and is not intended for a station in that mainframe. An example is where a message is sent by $S_{A1}$ in the mainframe $MF_A$ and intended for station $S_{C2}$ in the mainframe $MF_C$. As indicated by the dashed line $l_3$, the coupling means $XC_B$ of the mainframe $MF_B$ is to transfer the message from the portion of the external bus XB on its left to the portion of the external bus XB on its right via the internal bus $IB_B$. In one situation, the coupling means $XC_B$ can transfer the message from the internal bus $IB_B$ to the external bus XB; but in another, it cannot do so, in which event the message is stored in $XC_B$ to await another turn.

A fourth type of communication situation occurs when a message on the external bus XB arrives at a coupling means of a mainframe in which the station for which the message is intended resides, e.g., for the station $S_{C2}$ in the mainframe $MF_C$. A completely successful communication requires that the message be delivered to the station $S_{C2}$ and also that it be transferred to the external bus XB so as to eventually arrive at the mainframe from which it came. Thus, as indicated by the dashed line $l_4$, the coupling means $XC_C$ transfer the message from the section of the external bus XB on its left to the internal bus $IB_C$ and via the internal bus $IB_C$ to the station $S_{C2}$. The coupling means $XC_C$ also transfer the message from the internal bus $IB_C$ to the section of the external bus XB on its right. In a situation where the station $S_{C2}$ can receive the message and the coupling means $XC_C$ can transfer the message to the external bus XB, the communication is completely successful; but there are four situations in which it is not. If the station $S_{C2}$ cannot receive the message and the coupling means $XC_C$ cannot transfer it from the internal bus $IB_C$ to the external bus XB, the message stays in the part of the coupling means $XC_C$ at which it arrived. This also occurs if the coupling means $XC_C$ cannot transfer the message from the internal bus $IB_C$ to the external bus XB even if the station $S_{C2}$ can receive it. There are two situations in which the message is not delivered to the station $S_{C2}$ and is returned by the external bus XB to the mainframe from which it came, in which event the station that originated the message will send it again on its next turn on its internal bus, unless the message has been aborted by its microprocessor. In one of these latter situations, the station $S_{C2}$ is busy; and in another, it has been instructed by its microprocessor to only receive a message from a different sending station.

A fifth type of communication situation occurs when a message is returning to the mainframe containing the station that originated it, as briefly noted above. If, for example, the station $S_{A1}$ originated the message, the coupling means $XC_A$ transfers it from the external bus XB to the internal bus $IB_A$ and it flows along the internal bus $IB_A$ to the station $S_{A1}$, as indicated by the dashed line $l_5$. The station $S_{A1}$ examines the message to see if it has been successfully delivered. If so, $S_{A1}$ is prepared to receive a new message to transmit; but if not, $S_{A1}$ will retransmit the message when it gets another turn on the internal bus $IB_A$, unless its microprocessor has aborted the message.

BLOCK DIAGRAM

The general manner in which a bus system of this invention carries out the five communication types of FIGS. 3A through 3E will now be described by reference to the block diagram of FIGS. 2A, 2B and 2C, in which the same designations are used as in FIG. 1. The system is shown as being comprised of three mainframes $MF_A$, $MF_B$ and $MF_C$ that are contained within separate rectangles formed by dash-dot lines. Since the mainframes are identical except for the letter subscripts employed, only the mainframe $MF_A$ of FIG. 2A will be described.

Figure 9B:
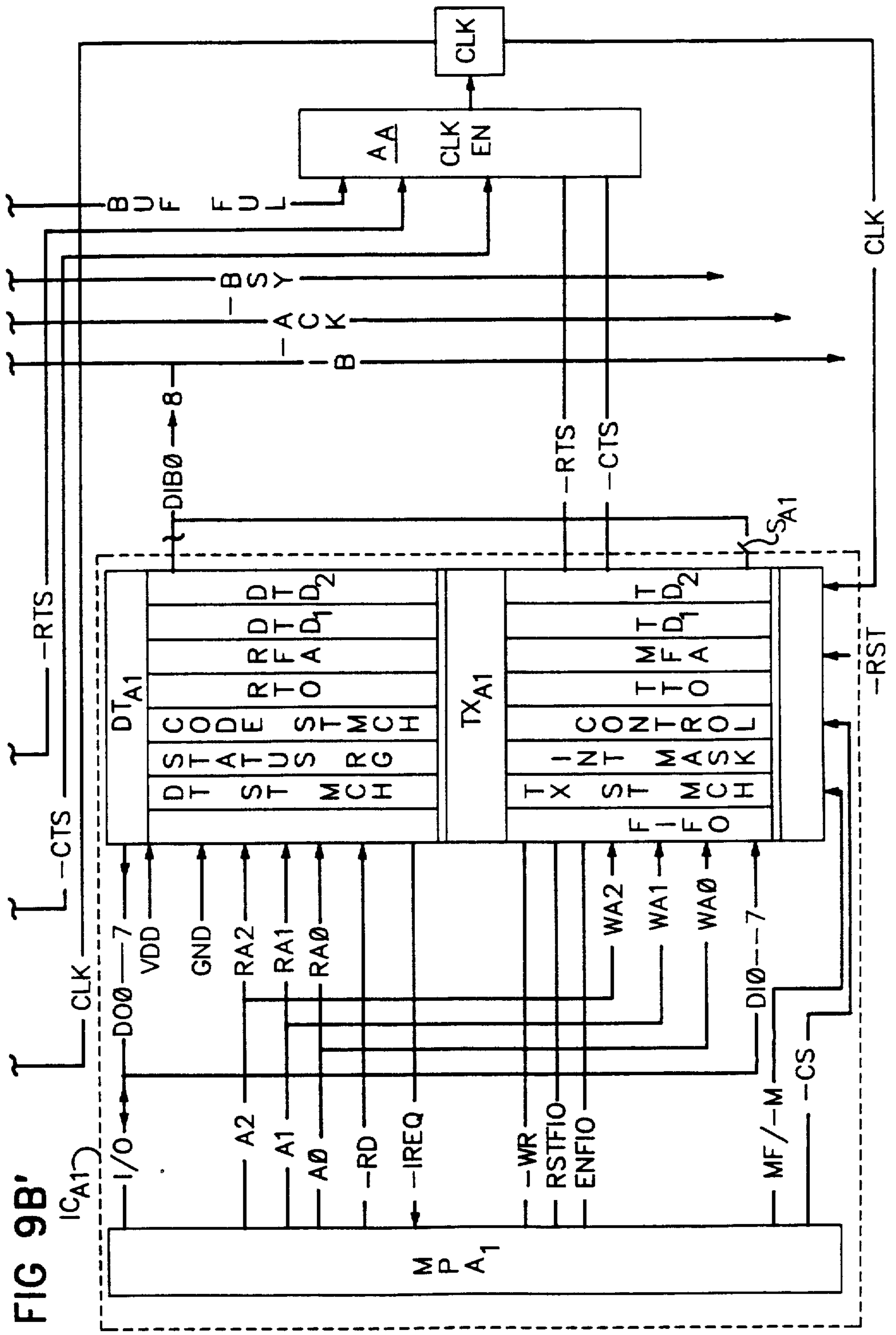

Although more stations may be used, the mainframe $MF_A$ is shown as having three stations $S_{A1}$, $S_{A2}$ and $S_{A3}$ which may be in the form of modules. The station $S_{A1}$ is comprised of a microprocessor $MP_{A1}$ and an internal chip $IC_{A1}$. The latter has a transmitter means $TX_{A1}$ for trnasmitting signals to an internal bus $IB_A$ and a data transfer means $DT_{A1}$ for transferring signals from the internal bus $IB_A$ to the microprocessor $MP_{A1}$. Information is passed from the microprocessor $MP_{A1}$ via an eight-bit-side input/output line I/O to the internal chip $IC_{A1}$ and from it to registers in the transmitter means $TX_{A1}$ selected by the combination of bits applied to the pins A0, A1 and A2 when a −WR pin is low. Information is passed from registers in the data transfer menas $DT_{A1}$ via I/O to the microprocessor $MP_{A1}$ when a −RD pin is low. The registers of the internal chip $IC_{A1}$ that are to be written into and read from are illustrated in FIG. 9B' and the combinations of the logic states of A0, A1 and A2 for both write and read situations are shown in FIG. 10. The microprocessor $MP_{A1}$ can also send a signal to a reset input of the internal chip $IC_{A1}$. Although now shown, the transmitter means $TX_{A1}$ and the data transfer means $DT_{A1}$ each have their own state machine. Except for the numerals in the subscripts, the stations $S_{A2}$ and $S_{A3}$ are identical to the station $S_{A1}$ just described.

The transmitter means $TX_{A1}$, $TX_{A2}$ and $TX_{A3}$ are respectively connected to the internal bus $IB_A$ via normally open switches $s_{A1}$, $s_{A2}$ and $s_{A3}$; and all of the data transfer means $DT_{A1}$, $DT_{A2}$ and $DT_{A3}$ are permanently connected to the internal bus $IB_A$.

An external chip $XC_A$ is provided that has a transmitter means $TX_A$ that receives data from certain leads of an external bus XB via a fifo $F_A$ and conveys it to the internal bus $IB_A$ via a switch $s_A$. The external chip $XC_A$ also has a data transfer means $DT_A$ that transfers data from the internal bus $IB_A$ to certain leads of the external bus XB. If data is to pass directly from the transmitter means $TX_A$ to the data transfer means $DT_A$, it is conveyed by the internal bus $IB_A$. If desired, noise immunity can be enhanced by differentially coupling the external chip $XC_A$ to the external bus XB, in which event a differential driver $DFD_A$ is coupled between the output of the data transfer means $DT_A$ and the external bus XB, and a differential receiver $DFR_A$ is coupled between the external bus XB and the input of the transmitter means $TX_A$.

In the manner described above, the mainframe $MF_A$ is inserted at one point in the external bus XB. The mainframes $MF_B$ and $MF_C$ are inserted at successive points along XB by similar connections of their respective external chips $XC_B$ and $XC_C$. The external bus XB includes pairs of conductors U, V, W, X and Y. Each of these pairs goes from the differential driver of one mainframe to the differential receiver of the next mainframe. Because of space limitations, however, the portions of the pairs between the differential driver $DFD_C$ of the mainframe $MF_C$ and the differential receiver $DFR_A$ are not shown. This part of XB therefore forms a loop. Because data passes through the mainframes $MF_A$, $MF_B$ and $MF_C$ in sequence, $MF_A$ is prior to $MF_B$, $MF_B$ is prior to $MF_C$, and $MF_C$ is prior to $MF_A$. Another pair of conductors in XB is connected between the differential driver of one mainframe and the differential receiver of the previous mainframe. Thus, a pair $Z_1$ is connected between $DFD_A$ of $MF_A$ and $DFR_C$ of $MF_C$; a pair $Z_2$ is connected between $DFD_B$ of $MF_B$ and $DFR_A$ of $MF_A$; and a pair $Z_3$ is connected between $DFD_C$ of $MF_C$ and $DFR_B$ or $MF_B$.

When any of the transmitter means $TX_{A1}$, $TX_{A2}$, $TX_{A3}$ and $TX_A$ have a complete message to place on the internal bus $IB_A$, it asserts a signal −RTS (REQUEST TO SEND) on an individual control line between it and an arbitrator $A_A$ that will be described in detail at a later point. These individual control lines are respectively labelled $-RTS_{A1}$, $-RTS_{A2}$, $-RTS_{A3}$ and $-RTS_A$ in FIG. 2A. If the arbitrator $A_A$ grants such a request, it asserts a signal −CTS (CLEAR TO SEND) on an individual line between itself and the transmitter means selected so as to effectively close the corresponding one of the switches $s_{A1}$, $s_{A2}$, $s_{A3}$ and $s_A$. These individual control lines are respectively labelled $-CTS_{A1}$, $-CTS_{A2}$, $-CTS_{A3}$ and $-CTS_A$ in FIG. 2A. The arbitrator $A_A$ sends a −CTS signal in sequence to all transmitter means $TX_{A1}$, $TX_{A2}$ and $TX_{A3}$ of the internal chips that have asserted −RTS and places the transmitter just given access to the internal bus $IB_A$ at the bottom of the sequence. In between each grant to successive transmitter means of the internal chips, it gives the transmitter means $TX_A$ of the external chip $XC_A$ an opportunity to have access to the internal bus $IB_A$ if $TX_A$ has a message to send.

For reasons which will become clear, two control lines −ACK and −BSY are connected to all of the internal chips $IC_{A1}$, $IC_{A2}$ and $IC_{A3}$ as well as to the arbitrator $A_A$, and another control line BUF FUL is connected between the data transfer means $DT_A$ of the external chip $XC_A$ and the arbitrator $A_A$.

The format of any message conveyed from a microprocessor to a transmitter means of one of the internal chips is set forth below.

| D7 D6 D5 D4 D3 D2 D1 D0 |
|---|
| TO ADDRESS |
| FROM ADDRESS |
| DATA 1 |
| DATA 2 |

These eight-bit words are respectively written into the registers TTO, MFA, $TD_1$ and $TD_2$ of the internal transmitter means shown in FIG. 9B' under the control of the bits applied to the pins A0, A1 and A2 as previously mentioned.

The TO address is the address of the station to which the message is to be sent and may or may not be in the same mainframe as the sending station. If two data words are supplied by the microprocessor, they will be written into the registers $TD_1$ and $TD_2$; but if only one data word is sent, it will be written into the register $TD_2$. When $TD_2$ is written into, the message is complete and −RTS is asserted.

The FROM address is the address of the sending station. Before operations begin, the FROM address is written into the MFA register while the reset input of the internal chip is set.

At this point, it should be noted that the eight bits of information in the registers of the transmitter means $TX_{A1}$ have a ninth bit associated with them as illustrated below and that all nine bits are conveyed to the internal bus $IB_A$. These words will now be referred to as "frames" and their designations are to the left. The first eight bits come from the registers indicated at the right (FIG. 9B') and the ninth bit is added.

| | D8 | D7 D6 D5 D4 D3 D2 D1 D0 | |
|---|---|---|---|
| TO | BW | TO ADDRESS | TTO |
| F | EA | FROM ADDRESS | MFA |
| $D_1$ | NA | DATA 1 | $TD_1$ |
| $D_2$ | CMD | DATA 2 | $TD_2$ |

The BW bit in the TO frame will be set high by the transmitter state machine if the register $TD_1$ has no data and the register $TD_2$ does, and it will be set low if both $TD_1$ and $TD_2$ have data. The bit EA in the F frame and the bit NA in the $D_1$ frame will be low at this point. As will be explained, they will be used to indicate the status of transmissions to a station in another mainframe or that the message has been sent to a station in a single mainframe system that is not available. The CMD bit is not important to this invention, but provides an extra channel of communication that may be useful in certain circumstances. In a manner to be explained, it is set whenever a SEND CMD bit is set in the control register.

The types of communication situations described below are also illustrated in FIGS. 3A through 3E. However, in FIGS. 3A through 3E, the particular stations are not identified and the transmitter means and data transfer means are merely identified as being internal if they are in one of the stations or external if they are part of the external coupling means.

In the following description of the manner in which the bus system of FIGS. 2A, 2B and 2C carries out the five different communication types, the situations (1), (2) and (3) that can be encountered in the first communication type of FIG. 3A are respectively illustrated in FIGS. $3_{A1}$, $3_{A2}$ and $3_{A}3$; the situations (4) and (5) that can be encountered in the second communication type of FIG. 3B are respectively illustrated in FIGS. $3B_1$ and $3B_2$; the situations (6) and (7) that can be encountered in the third communication type of FIG. 3C are respectively illustrated in FIGS. $3C_1$ and $3C_2$; the situations (8), (9), (10), (11) and (12) that can be encountered in the fourth communication type of FIG. 3D are respectively illustrated in FIGS. $3D_1$, $3D_2$, $3D_3$, $3D_4$ and $3D_5$; and the only situation (13) that can be encountered in the fifth communication type of FIG. 3E is illustrated in FIG. $3E_2$.

The only completely successful communications are those illustrated in FIGS. $3A_1$, $3B_1$, $3C_1$, $3D_1$ and $3E_2$.

In any communication, the sending transmitter means places the TO and F frames on the internal bus $IB_A$ in sequence.

It is helpful to note that a message is terminated whenever −BSY is asserted. The arbitrator does this in the $D_2$ frame.

First Communication Type (FIG. 3A)

Situations (1), (2), (3)

In the first type of communication between a station such as $S_{A1}$ and a station such as $S_{A3}$ that are both in the mainframe $MF_A$, the latter asserts a signal −ACK on the control line of the same designation during the F frame to indicate that it is present; but if the communication is for a station in another mainframe such as $S_{C2}$ in the mainframe $MF_C$, −ACK is not asserted. In either case, the TO and F frames are automatically stored in the appropriate registers (shown in FIG. 9B') of the data transfer means $DT_A$ of the external chip $XC_A$ under the control of $DT_A$'s state machine. This assumes that the registers are empty. What occurs if the registers of $DT_A$ are not empty will be discussed in detail at a later point. If the communication is internal, the storage of the TO and F frames in this manner presents no problem because they can be written over.

In the situations (1) of FIG. $3A_1$, the addressee $S_{A3}$ is ready to accept data so that it does not assert −BSY. The absence of −BSY in either the F or $D_1$ frames permits the transmitter means $TX_{A1}$ of the station $S_{A1}$ to complete the transmission through the frame $D_2$. The control signal −BSY appearing in the $D_2$ frame is asserted by the arbitrator $A_A$ for synchronization purposes that will be explained when the flow charts are considered.

In the situation (2) of FIG. $3A_2$, the addressee $S_{A3}$ has been instructed by its microprocessor $MP_{A3}$ to receive from the same station that it last received a message from. If $S_{A1}$ is that station, −BSY is not asserted and the transmission is completed; but if $S_{A1}$ is not that station, a fact that cannot be determined until after the F frame, $S_{A3}$ asserts −BSY during the $D_1$ frame and $D_2$ is not sent.

In the situation (3) of FIG. $3A_3$, the addressee $S_{A3}$ is busy, i.e., its microprocessor $MP_{A3}$ has not read all the data in its registers, the data transfer means $DT_{A3}$ asserts −BSY during the F frame and the communication is terminated at that point; neither $D_1$ nor $D_2$ are placed on the internal bus $IB_A$.

Second Communication Type (FIG. 3B)

Situations (4), (5)

In the second type of communication from a station in one mainframe to a station in another, such as from the station $S_{A1}$ in the mainframe $MF_A$ to a station $S_{C2}$ in the mainframe $MF_C$, the control signal −ACK is not asserted during the F frame on the −ACK control line of $MF_A$ because the addressee $S_{C2}$ is not in $MF_A$ and no station in $MF_A$ can assert −BSY because no station in $MF_A$ is the addressee.

In situation (4) of FIG. $3B_1$, the registers of the data transfer means $DT_A$ of the external chip $XC_A$ are empty so that they can receive data, in which event $TX_{A1}$ in the station $S_{A1}$ places all four frames of the message on the internal bus $IB_A$ in sequence. The state machine for the data transfer means $DT_A$ of the external chip $XC_A$ also stores the frames $D_1$ and $D_2$ when they are put on the internal bus $IB_A$ by the transmitter means $TX_{A1}$ of the station $S_{A1}$.

When the $D_2$ frame is stored in its register of $DT_A$, a code state machine that is not shown in FIG. 2A but which is part of the data transfer means $DT_A$ sends a signal −DOCLK to the −WR pin of the external chip $XC_B$ in the next mainframe $MF_B$ along the external bus XB. If the fifo $F_B$ is ready to receive data, it asserts a signal −FIORDY that is conveyed by differential conductor pair $Z_2$ back to the code state machine via $DFR_A$ and the −RD pin so that the external communication can proceed.

The code state machine of the data transfer means $DT_A$ of the external chip $XC_A$ provides four combinations of two bits from its status register that are used to successively select the order in which the data frames To, F, $D_1$ and $D_2$ are to be read and placed on the external bus XB. These same bits are respectively placed on the output pins DO9 and DO10 of the data transfer means $DT_A$ so that they are carried along with the rest of the message DO0–DO8 to the fifo $F_B$ of the next mainframe. At the output of the fifo $F_B$, the code bits are respectively connected to the WA0 and WA1 pins of the transmitter means $TX_B$ of the external chip $XC_B$ so as to place the first nine bits of the frames in the proper registers of $TX_B$. The frames with the added bits appear at the outputpins of $DT_A$ as illustrated below. Note that the bit positions DO0–DO8 correspond to the bit positions D0–D8 of the words on the internal bus $IB_A$.

| DO10 | DO9 | DO8 | DO7 DO6 DO5 DO4 DO3 DO2 DO1 DO0 |
|---|---|---|---|
| 0 | 0 | BW | TO ADDRESS |
| 1 | 0 | EA | FROM ADDRESS |
| 0 | 1 | NA | DATA 1 |
| 1 | 1 | CMD | DATA 2 |

In situation (5) of FIG. $3B_2$, the registers of the data transfer means $DT_A$ are not all empty so that $DT_A$ cannot receive a message. In this case, the signal BUF FUL is asserted during the TO frame, but the state machine of $DT_A$ has to wait until the end of the F frame to see by the assertion or non-assertion of −ACK whether the message is for a station in the mainframe $MF_A$ or for a station in another mainframe. If −ACK is asserted in the F frame, the addressee is in the same mainframe and $DT_A$ does nothing; but if −ACK is not asserted in the F frame, the addressee is in another mainframe, in which event $DT_A$ asserts −BSY during the $D_1$ frame. At this point, $S_{A1}$ re-asserts −RTS and tries to successfully complete its communication when granted −CTS by the arbitrator $A_A$.

Third Communication Type (FIG. 3C)

Situations (6), (7)

In the third type of communication from a station $S_{A1}$ in the mainframe $MF_A$ to the station $S_{C2}$ in the mainframe $MF_C$, the message passes from the transmitter means $TX_B$ of the external chip $XC_B$ to its own data transfer means $DT_B$ via the internal bus $IB_B$. After the message has bubbled up through the fifo $F_B$ and the $TD_2$ register (FIG. 9B') is filled, $TX_B$ asserts a request-to-send signal on its −RTS control line to the arbitrator $A_B$ for the mainframe $MF_B$. If the arbitrator $A_B$ asserts clear-to-send on the −CTS control line between it and $TX_B$, the switch $s_B$ is closed to connect the data lines DO8–DO0 to the internal bus $IB_B$. The state machine of $TX_B$ then places the TO frame on the internal bus $IB_B$. Because the TO address is for the station $S_{C2}$ which is not in the mainframe $MF_B$, the signal −ACK will not be asserted.

In the situation (6) of FIG. $3C_1$, BUF FUL is not asserted by $DT_B$, the nine-bit frames TO, F, $D_1$ and $D_2$ are conveyed by the internal bus $IB_B$ to the appropriate registers in the data transfer means $DT_B$ of the external chip $XC_B$ and are placed on the external bus XB with the added bits DO9 and DO10 the same as before and with the DO8 bits of the F and $D_1$ frames respectively unchanged.

In the situation (7) of FIG. $3C_2$, the registers of $DT_B$ are not empty so that is asserts a signal BUF FUL on the line to the arbitrator $A_B$ during the TO frame. After waiting until the end of the F frame to see whether the message is for a station in $MF_B$, a fact that would be indicated by the assertion of −ACK in the F frame, the data transfer means $DT_B$ asserts −BSY during the $D_1$ frame and $D_2$ is not transmitted. The arbitrator $A_B$ then asserts −BSY on the −BSY control line for synchronization purposes and the message remains in $TX_B$ to await another turn on the internal bus $IB_B$.

Fourth Communication Type (FIG. 3D)

Situations (8) through (12)

In the fourth type of communication, the message arrives at the transmitter means of the external chip for the mainframe containing the TO address station, e.g., the message already described that originated in $TX_{A1}$ of the station $S_{A1}$ in $MF_A$ and which is intended for the station $S_{C2}$ in $MF_C$. After the message has bubbled up through the fifo $F_C$ and the $D_2$ frame is stored in the $TD_2$ register of the transmitter means $TX_C$ of the external chip $XC_C$ of the mainframe $MF_C$, the state machine of $TX_C$ asserts a request-to-send signal on the −RTS control line to the arbitrator $A_C$. If the arbitrator $A_C$ asserts clear-to-send on the −CTS control line to $TX_C$, the switch $s_C$ is closed and $TX_C$ places the TO and F frames on the internal bus $IB_C$ in sequence.

In the situation (8) of FIG. $3D_1$, the station $S_{C2}$ for which the message is intended asserts −ACK on the −ACK control line during the F frame, but because its registers are empty and because it has not been instructed by its microprocessor $MP_{C2}$ to only receive a message from a station other than $S_{A1}$, it does not assert −BSY during the F frame. The registers of the data transfer means $DT_C$ of the external chip $XC_C$ of the mainframe $MF_C$ are ready to receive data so the BUF FUL is not asserted. In this event, $TX_C$ sequentially places the $D_1$ and $D_2$ frames on the internal bus $IB_C$ and they are stored in registers of the data transfer means $DT_C$. In order to inform the originating station $S_{A1}$ that the message has been delivered, the ninth bit EA is set to unity and NA is left at zero. This is necessary in order to permit the registers TTO, MFA, $TD_1$ and $TD_2$ of the originating transmitter means $TX_{A1}$ to receive another message. Otherwise, the message would be repeatedly transmitted.

In the situation (9) of FIG. $3D_2$, $S_{C2}$ asserts −ACK during the F frame but the data registers of the data transfer means $DT_C$ of the external chip $XC_C$ are full so that the state machine of $DT_C$ asserts BUF FUL, the arbitrator $A_C$ asserts −BSY during the $D_1$ frame, and the message stays in the registers of $DT_C$ regardless of the condition of the TO address station $S_{C2}$ and awaits another turn on the internal bus $IB_C$.

In situation (10) of FIG. $3D_3$, the station $S_{C2}$ asserts −ACK during the F frame, but neither it nor the data transfer means $DT_C$ are capable of receiving data so that −BSY is asserted during the F frame by the arbitrator $A_C$ and $DT_{C2}$ and the message remains in $TX_C$ to await the assignment of another turn on the internal bus $XB_C$ by the arbitrator $A_C$. The bits EA and NA remain at zero. In situation (11) of FIG. $3D_4$, the data registers of the data transfer means $DT_C$ of the external chip $XC_C$ are empty but the data registers of the TO address station $S_{C2}$ are full so that it asserts −BSY as well as −ACK during the F frame. The state machine for the data transfer means $DT_{C2}$ tests to see if the transmitter means $TX_C$ is sending the message. If so, it asserts −BSY during the $D_1$ frame. Otherwise, −BSY would be unasserted at the end of the F frame and the communication would terminate as in the situation (10). The arbitrator $A_C$ asserts −BSY in the $D_2$ frame as is required for synchronization, and the state machine for $DT_{C2}$ sets the ninth bit EA of the F frame and NA of the $D_1$ frame to a logic high. This indicates that the TO station exists but is busy. The $D_1$ and $D_2$ frames are loaded into the registers of the data transfer means $DT_C$ of the external chip $XC_C$ and transmitted in the manner previously described to the fifo $F_A$ of the mainframe $MF_A$. Because EA=1 and NA=1, the message remains in the registers of the originating transmitter means $TX_{A1}$ waiting for $TX_{A1}$ to have another turn on the internal bus $IB_A$. Unless the message is aborted by the microprocessor $MP_{A1}$, $TX_{Al}$ cannot send a new message. The reason for passing the message around the loop formed by the external bus XB rather than causing it to remain in the transmitter means $TX_C$ is to prevent the external bus XB from being clogged.

In the situation (12) of FIG. $3D_5$, the registers of the data transfer means $DT_C$ are ready to receive data, but the station $S_{C2}$ for which the message is intended has been instructed by its microprocessor $MP_{C2}$ to only receive a message from a station other than $S_{A1}$ at which the message originated. In this event, $S_{C2}$ asserts −ACK during the F frame but the state machine for the data transfer means $DT_{C2}$ cannot know until after the F frame where the message is coming from. When it sees that the message is not from the designated station, it asserts −BSY during the $D_1$ frame. The arbitrator $A_C$ asserts −BSY during the $D_2$ frame, as is usual so that the complete message is placed on the external bus XB even though it has not been delivered to $S_{C2}$. As in the situation (11), this is done in order to prevent the external bus XB from becoming clogged.

Fifth Communication Type (FIG. 3E)

Situation (13)

In the situation (13) of FIG. $3E_2$, assume that the message has been delivered to the TO address station $S_{C2}$ and that it is stored in the registers of the data transfer means $DT_C$ of the external chip $XC_C$ with EA=1 and NA=0. After the handshake performed by −DOCLK and −FIORDY has been successfully performed between the data transfer means $DT_C$ and the fifo $F_A$ in the external chip $XC_A$ and the message has been delivered via the external bus XB to the fifo $F_A$ and bubbled up through it to the registers in the transmitter means $TX_A$ as controlled by the additional bits DO9 and DO10, the transmitter means $TX_A$ asserts −RTS. When it receives −CTS, the switch $s_A$ is closed and the TO and F frames are put on the internal bus $IB_A$. Since the TO address station $S_{C2}$ is not in the mainframe $MF_A$, neither −ACK nor −BSY are asserted in the F frame. The data transfer state machine of $DT_{A1}$ of the station $S_{A1}$ determines whether or not the address in the F frame of the message is the same as the address of the station $S_{A1}$ that is stored in its MFA register (FIG. 9B'). If it is, −ACK and −BSY are asserted during the $D_1$ frame and the registers of the transmitter means $TX_{A1}$ are prepared to receive a new message if EA=1 and NA=0. But even if the addresses match, $TX_{A1}$ is not prepared to receive a new message if EA=1 and NA=1 because, although the TO address station is present, it is busy and the message has not been successfully transmitted.

For convenience, the significance of the different combinations of EA and NA are set forth below.

| EA | NA | |
|---|---|---|
| 0 | 0 | No receiver in system |
| 0 | 1 | Never occurs |
| 1 | 0 | Message received |
| 1 | 1 | TO station exists but busy |

COMMUNICATION TYPES AND SITUATION

Whereas the above description of the block diagram of FIGS. 2A, 2B and 2C has explained in a general way the operation of the various components of a bus system incorporating this invention, the following description of FIGS. 3A through 3E will explain the operation with respect to the flow charts for the various state machines.

As previously noted, FIGS. 3A, 3B, 3C, 3D and 3E are block diagrams respectively illustrating the paths to be followed by the message in different types of communication, and the graphs in the same respective rows illustrate the signals −BSY, −ACK and BUF FUL that occur in different situations. The blocks with XTX in their identification are transmitter means of an external chip; the blocks with XDT are data transfer means of an external chip; the blocks with ITX are transmitter means of an internal chip; and the blocks with IDT are data transfer means of an internal chip. An internal bus is designated by IB and the external bus is designated by XB.

The graphical figures of the drawing are divided by dashed lines into successive time periods equal to one cycle of the clock pulses that are shown at the top of each column. Each time period is labelled at the top with the frame of the message that is occurring. In the flow charts for the various state machines and in the discussion below, the graphical situations are respectively identified by numbers in parentheses rather than by the figure designations.

A completely successful delivery of the four frames TO, F, $D_1$ and $D_2$ of a message occurs only in FIGS. $3A_1$, $3B_1$, $3C_1$ and $3D_1$; and preparing a transmitter means for the transmission of a new message after a successful delivery occurs in FIG. $3E_2$. Whereas it might seem that FIGS. $3D_4$ and $3D_5$ represent a successful delivery of the four frames of a message because the time periods are labelled TO, F, $D_1$ and $D_2$, they are situations in which the message is not delivered to the TO station and is sent on around the external bus XB to prevent lock-up.

Although the flow charts for the various state machines are discussed in detail at a later point, they are briefly referred to below. The reader may wish to study their detailed discussion at this point, but it is not thought necessary. In the flow charts, the dots define clock cycles and frames, and the frame in which a decision is made is indicated near the decision block. Communication situations are in parentheses and machine states are in brackets.

It should be kept in mind that −BSY will be asserted by some state machine whenever a message is prematurely terminated and that −BSY is asserted only by the arbitrator in the $D_2$ frame of a complete message. This is done for synchronizatin purposes. The assertion of — BSY resets all state machines (except the code state machine) to their initial state [0], and — BSY is only unasserted when the arbitrator receives an — RTS signal.

Communication Situations (1), (2)

Communication situation (1) is a completely successful communication in which the full message is delivered from $ITX_A$ to the registers of $IDT_A$ that is in the same mainframe and is the same as the situation in FIG. 2A when, as previously discussed, a message was sent from the transmitter means $TX_{A1}$ of station $S_{A1}$ to the data transfer means $DT_{A3}$ of station $S_{A3}$.

The internal transmitter means $ITX_A$ places the TO and F frames on the internal bus IB as indicated by blocks 604 and 608 of FIG. 6A. Before placing the $D_1$ and $D_2$ frames on the internal bus IB however, a decision block d603 (FIG. 6B) checks the levels of −BSY and −ACK which are provided by the state machine for the internal data transfer means $IDT_A$ shown in FIGS. 7A and 7B in a manner described below. In this situation, −BSY is not asserted and −ACK is. The $D_1$ frame is placed on the internal bus IB by a block 618 (FIG. 6B), and after a check of −BSY in the $D_1$ frame by a decision block d605, the $D_2$ frame is placed on the internal bus IB by a block 620. The TDRE (TRANSMIT DATA REGISTER EMPTY) flag is then set by a block 622 so that the registers of the transmitter means $ITX_A$ can receive another message from the microprocessor, not shown in FIG. 3A. The state machine for $ITX_A$ then returns to the state [0]. In all communication situations, the TO and F frames are placed on the internal bus IB as just described, but different paths are followed for different outputs of decision block d603 (FIG. 6B).

The way in which the levels of −ACK and −BSY are determined so that decision block d603 of FIG. 6B may make its decision is as follows. In the flow chart of FIGS. 7A and 7B for an internal data transfer means such as $IDT_A$, a decision block d702 determines that $IDT_A$ is a section of an internal chip, and in situations (1) and (2), it will indicate by the state of RDRF (READ DATA REGISTER FULL) that the registers of $IDT_A$ are empty. The TO address is loaded into a register RTO (see FIGS. 9A′, 9B′ and 10) of $IDT_A$ by a block 710, and a check is made by a decision block d706 (FIG. 7A) during the F frame to see if the TO address is the address of the station in which $IDT_A$ is located. This is done by comparing the address in the RTO register with the address in the MFA register. In situations (1) and (2), the address will be the same so that −ACK is asserted by a block 712.

Figure 10A:
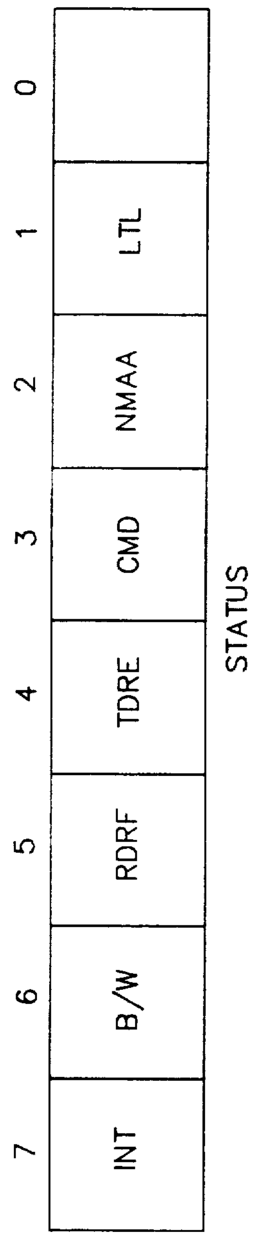
Figure 10B:
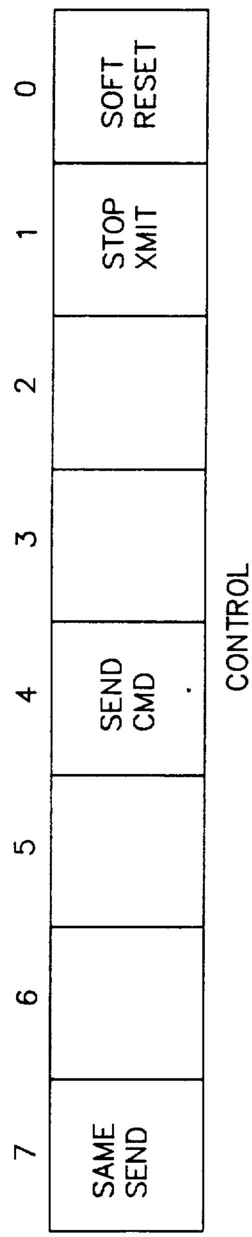

A decision block d708 (FIG. 7B) checks during the F frame to see if the microprocessor has set the SAME SEND flag of the control registers shown in FIG. 10B. If it has, it means that the data transfer means $IDT_A$ is to load a message on the internal bus IB into its registers only if it comes from the same station as the last message it received. The address SSA for the station from which the last message was received is in the RFA (RECEIVED FROM ADDRESS) register of the internal chip in which $ITX_A$ and $IDT_A$ are located. If the decision block d708 outputs "1,1" the SAME SEND bit has been set; but the FROM address of the message on the internal bus IB is not the same as that in RFA, in which event the state machine moves to a state [15] during the $D_1$ frame and a block 714 asserts −BSY as noted in FIG. 3$A_2$. This is the communication situation (2).

If, however, the decision block d708 indicates that the SAME SEND bit is not set or that it is set and the addresses are the same, the F frame is loaded into its register by a block 716 and a new state [9] is entered at the start of the $D_1$ frame. If decision block d709 indicates that −BSY and −ACK are not asserted during the $D_1$ frame, the $D_1$ frame is loaded into the register $DTD_1$ of FIG. 10A by a block 717 and a new stat [14] is entered during the $D_2$ frame in which $D_2$ is loaded by a block 718. This is communication situation (1) of FIG. 3$A_1$. The CMD flag in the status register of FIG. 10A is set by a block 720, and the RDRF flag is set by a block 722 before the machine goes to the state [0].

At this point, it should be noted that the BW bit, which is the ninth bit in the To frame, is set to "1" whenever the microprocessor writes data into the $TD_2$ register without first writing data into the $TD_1$ register; but it is set to "0" if data is in both registers. The BW bit and the RDRF flag bit can be used to indicate where the valid data is in the registers of the internal chip as indicated below.

| RDRF | BW | |
|---|---|---|
| 1 | 0 | Valid data in $DTD_2$, $DTD_1$ |
| 1 | 1 | Valid data in $DTD_2$ |
| 0 | X | No valid data |

Although the external data transfer means XDT, of the external chip has no apparent part to play, it is on the internal bus IB and will accept data so that all the frames thereon could be stored in it. It operates when the MF/−M bit is set high, a fact that is detected by decision block d702 (FIG. 7A) in the TO frame. A decision block d710 (FIG. 7C) monitors the −CTS line to the transmitter means $XTX_A$ of its own external chip. In the situations (1) and (2), −CTS will be high because $ITX_A$ has received a −CTS (CLEAR TO SEND) signal and is therefore on the internal bus IB. The data transfer means such as $XDT_A$ of an external chip makes its BUF FUL signal high during the TO frame when its registers are full and low if they are empty. A decision block d711 monitors BUF FUL. If it is high, the machine advances to a state [11] during the F frame and decision block d712 monitors −BSY and −ACK. If −BSY is not asserted and −ACK is, it means that the system is in the situation (1). The state machine for $XDT_A$ then enters a state [5] during which, as shown below decision block d704 of FIG. 7B, the machine will wait for −BSY to be asserted and then go to the state [0]. The assertion of −ACK means that the message is for a station in the mainframe and that it is not to go external. This procedure occurs in situations (1) and (2).

It is quite possible, however, that the registers of the external data transfer means $XDT_A$ will be empty, in which event blocks 724 (FIG. 7C) and 726 (FIG. 7D) will respectively load the TO and F frames into registers of $XDT_A$; but when decision block d713 (FIG. 7D) checks −BSY and −ACK during the F frame, the machine again goes to the state [5] to await the assertion of −BSY before returning to the state [0].

Communication Situation (3)

This situation is one where the message cannot be delivered to the internal data transfer means $IDT_A$ because its receiving registers are full. The same situation can exist in FIG. 2A in communicating between the transmitter means $TX_{A1}$ and the data transfer means $DT_{A3}$. This fact is indicated by decision block d702 of FIG. 7A when RDRF=1. Since −M is asserted, a decision block d703 indicates during the F frame whether or not the message on the internal bus IB is for it. If so, a block 702 asserts −ACK and a block 704 asserts −BSY as is required in this situation before the state machine returns to the state [0].

As in the situations (1) and (2) just discussed, the external data transfer means $XDT_A$ plays no part in situation (3) but it is on the bus. In the situation (3), however, both −BSY and −ACK are asserted in the F frame so that the state machine is returned to the state [0] by decision block d712 of FIG. 7C if the registers of $XDT_A$ are full, and by decision block d713 (FIG. 7D), after loading the TO and F frames with blocks 724 and 726, if the registers are empty.

Communication Situations (4), (5)

In the type of communication involved in these situation, the message is to go from an internal transmitter means $ITX_B$ to an external data transfer means $XDT_B$, which is the same as the message going from the transmitter means $TX_{A1}$ to the data transfer means $DT_A$ in FIG. 2A. The TO and F frames of a message are placed on the internal bus IB by $ITX_B$ in the same way as described above in connection with $ITX_A$ of FIG. 3A, i.e., by blocks 604 and 608 of FIG. 6A. Since the data transfer means $XDT_B$ is in an external chip, the decision block d702 of FIG. 7A will indicate that MF/−M is high so that the state machine of FIGS. 7C and 7D for the data transfer means of an external chip goes into operation. It first monitors the −CTS line from the arbitrator (not shown) to the transmitter means $XTX_B$ in the same external chip to see whether it is on the internal bus IB or whether an internal transmitter means such as $ITX_B$ is. In situations (4) and (5), −CTS will be high because $XTX_B$ is not on the internal bus IB.

A decision block d711 (FIG. 7C) monitors the BUF FUL line that indicates in the TO frame whether the data registers of the data transfer means $XDT_B$ for the external chip are full. If they are, the transmission cannot be completed. The decision block d712 in FIG. 7C tests −ACK and −BSY. Since no data transfer means of an internal chip has been addressed, neither −BSY nor −ACK are asserted during the F frame. The machine goes into a state [15] where, as shown in connection with d708 of FIG. 7B, −BSY is asserted to abort the transfer during the $D_1$ frame as can be seen in FIG. 3$B_2$ which is the situation (5).

Because no internal station is addressed, neither −BSY nor −ACK are asserted during the F frame. Therefore, decision block d603 of the state machine of FIGS. 6A and 6B for an internal transmitter means such as $ITX_B$ causes the machine to go to a state [5] in which the $D_1$ and $D_2$ frames are put on the internal bus IB by blocks 624 and 626 respectively. Thus, if decision block d711 of FIG. 7C indicates that the registers of the external data transfer means $XDT_B$ are empty, i.e., BUF FUL=0, the transmission can be completed, as in the situation (4) of FIG. 3$B_1$. Blocks 724 (FIG. 7C) and 726 (FIG. 7D) respectively load the TO and F frames into the registers, and decision block d713 (FIG. 7D) checks during the F frame for −ACK and −BSY. As noted above, they are not asserted. The state machine then goes to a state [9] which, as shown in connection with decision block d709 of FIG. 7B, completes the communication.

Communication Situations (6), (7)

The communication type in which these situations occur is illustrated in FIG. 3C. The message is to go from the transmitter means $XTX_C$ in an external chip to the data transfer means $XDT_C$ of the same chip. This is the same way that the message went in FIG. 2B from the transmitter means $TX_B$ of the external chip $XC_B$ to its data transfer means $DT_B$.

After receiving the signal −CTS from the arbitrator, the transmitter means $XTX_C$ of the external chip successively places the TO and F frames on the internal bus IB with the blocks 604 and 608 of FIG. 6A in the same way as an internal transmitter means previously described, but decision block d602 will now have a high output for MF/−M so that the state machine for the transmitter means of an external chip will be in operation from this point on. The functions of this state machine are illustrated in FIG. 6C. In FIG. 6C, a decision block d612 tests −BSY and −ACK during the F frame. Neither will be asserted in the F frame because the message is not for a station in this mainframe. The state machine for the external transmitter means $XTX_C$ then goes to a state [7] and places the $D_1$ frame on the internal bus IB with the block 638. A decision block d613 tests −BSY and −ACK in the $D_1$ frame.

The assertion or non-assertion of these signals is determined by the state machine of FIGS. 7C and 7D for the data transfer means of an external chip such as $XDT_C$. The decision block d710 will have a low output because −CTS has been asserted by the arbitrator on the line going to the external transmitter means $XTX_C$. During the TO frame, a decision block d714 of FIG. 7C tests BUF FUL which, as previously explained, indicates to the arbitrator whether or not the registers in $XDT_C$ are full or empty.

In the completely successful communication situation (6) of FIG. 3C, the registers of the external data transfer means $XDT_C$ will be empty so that the output of the decision block d714 is low. The state machine of the external data transfer means $XDT_C$ then loads the TO frame into its register as indicated at block 728. It them enters a state [8] during the F frame and loads it into its register as indicated by a block 730. During the F frame, a decision block d716 tests −BSY and −ACK. As noted above, the TO address is not in the mainframe so that −ACK and −BSY are not asserted. The machine then goes to a state [9] of FIG. 7B but because the functions performed during this state are shown in connection with a decision block d709, they are not shown again in FIG. 7D. In state [9], a check of −BSY and −ACK is made during the $D_1$ frame by the decision block d709. As neither is asserted, the $D_1$ frame is loaded into a register of the external data transfer means $XDT_C$ by a block 717. The non-assertion of −BSY and −ACK is also noted by a decision block d613 in the flow chart of FIG. 6C for the external transmitter means $XTX_C$ so that it goes to the state [15] in which, as shown in connection with decision block d605 of FIG. 6B, the $D_2$ frame is placed on the internal bus IB. During the $D_2$ frame, the state machine for $XDT_C$ then enters a state [14] in which the $D_2$ frame is loaded into the $D_2$ register of $XDT_C$ by a block 718 (FIG. 7B) and the CMD and RDRF bits are respectively set by blocks 720 and 722 before the machine returns to the state [0]. This is the completed communication (6).

In communication situation (7), however, the registers of the external data transfer means $XDT_C$ are full so that BUF FUL is asserted in the TO frame and the output of decision block d714 of FIG. 7C is high. The machine then enters a state [1] during the F frame and checks −BSY in decision block d715. Because the TO address is not in the mainframe −BSY is not asserted in the F frame so that the output of d715 is high. This causes the machine to go to state [15], which is illustrated in connection with decision block d708 of FIG. 7B wherein −BSY is asserted in the $D_1$ frame as required and this, in turn, causes decision block d613 of the state machine for the external transmitter means $XTX_C$ shown in FIG. 6C to set −RTS by a block 640 before it returns to the state [0].

Communication Situations (8), (9), (10), (11), (12)

The communication type in which the situations (8) through (12) occur is illustrated in FIG. 3D. For a completely successful communication, as illustrated by communication situation (8) of FIG. $3D_1$, the message has to go from the transmitter means $XTX_D$ of an external chip to the data transfer means $XDT_D$ of the same external chip and to the data transfer means $IDT_D$ of an internal chip in the same mainframe. This is the same as the communication in FIG. 2C from $TX_C$ to $DT_C$ and to $DT_{C2}$ of the mainframe $MF_C$.

Communication Situation (8)

In the successful communication situation (8) of FIG. $3D_1$, a message is completely delivered from the external transmitter means $XTX_D$ to the external data transfer means $XDT_D$ as well as to the internal data transfer means $IDT_D$. This situation may be involved in the communication in FIG. 2C between $TX_C$ to $DT_C$ and to $DT_{C2}$.

The TO and F frames are put on the internal bus IB by the blocks 604 and 608 of FIG. 6A.

The response of the internal data transfer means $IDT_D$ can be seen in FIGS. 7A and 7B. During the TO frame, the output of decision block d702 will be low because it is ready to receive a message. The TO frame is loaded into its register by a block 710 and a decision block d706 indicates by a high output that the internal data transfer means $IDT_D$ is the addressee. A block 712 then asserts −ACK. Because the SAME SEND bit is not asserted in communication situation (8), the output of decision block d708 (FIG. 7B) is low and the F frame is loaded into its register by the block 716. A test is then made of −BSY and −ACK in the $D_1$ frame by decision block d709.

The response of the external data transfer means $XDT_D$ can be seen in FIGS. 7C and 7D. During the TO frame, the output of a decision block d710 that tests whether −CTS has been sent to the external transmitter means $XTX_D$ is low because the latter is on the internal bus IB. In this situation, decision block d714 will show that the registers of the external data transfer means $XDT_D$ are empty. The TO frame is then loaded into its register by a block 728 and the F frame is loaded into its register by the block 730. A test is then made of −BSY and −ACK in the F frame by the decision block d716 (FIG. 7D). It will find that −ACK is asserted by the block 712 of FIG. 7A as just described and that −BSY was not asserted during the F frame so that the machine goes to a state [13].

As seen in FIG. 6C for the external transmitter means $XTX_D$, −BSY and −ACK are tested in the F frame by the decision block d612. With −BSY not asserted and −ACK asserted, the $D_1$ frame is put on the internal bus IB by a block 650 and a test is made of BUF FUL and −BSY by decision block d615 in the $D_1$ frame. Since −BSY is not asserted and the registers of the external data transfer means $XDT_D$ are empty, the machine proceeds to a state [15] which, as can be seen in FIG. 6B, places the $D_2$ frame on the internal bus IB with a block 620 and sets the TDRE flag with a block 622 so as to permit the external transmitter means $XTX_D$ to receive a new message.

Return now to FIGS. 7A and 7B for the internal data transfer means $IDT_D$. Neither −BSY nor −ACK have been asserted during the $D_1$ frame so that decision block d709 directs the machine to complete loading the message. Block 717 loads the frame $D_1$ into its register, block 720 loads the CMD bit, and block 722 sets the RDRF flag in the status register.

At last mention, the state machine (FIGS. 7C and 7D) for the external data transfer means $XDT_D$ had just entered the state [13]. In this state, the $D_1$ frame is loaded into its register by a block 740 (FIG. 7D), EA is set to "1" by a block 742, and a check of −BSY during the $D_1$ frame is made by decision block d717. Since −BSY is not asserted, the machine goes to a state [14] which, as can be seen from FIG. 7A, loads the $D_2$ frame into its register and completes the transmission. Thus, in the communication situation (8), the message is delivered to $XDT_D$ and $IDT_D$ as required.

Communication Situation (9)

In the communication situation (9) of FIG. $3D_2$, the registers of the external data transfer means $XDT_D$ are full, the registers of the internal data transfer means $IDT_D$ are empty, and $IDT_D$ has not been instructed to receive only from the same station as last time. The message cannot be put onto the external bus XB and therefore should not be delivered to the internal data transfer means $IDT_D$, even though it is ready to receive a message. Therefore, the message must stay in $XTX_D$ until its next turn on the internal bus IB. This situation may be involved in the communication in FIG. 2C from $TX_C$ to $DT_C$ and to $DT_{C2}$ of the mainframe $MF_C$.

After the TO and F frames have been placed on the internal bus IB, the procedure in the state machine of FIGS. 7C and 7D for the external data transfer means $XDT_D$ is as follows. The output of decision block d710 is low as it was in communication situation (8), but the output of decision block d714 (FIG. 7C) is high because $XDT_D$'s registers are full in this situation. The machine enters a state [1] where decision block d715 checks for −BSY during the F frame. Even though BUF FUL is asserted before the TO frame, it does not cause −BSY to be asserted in the F frame so that the output of decision block d715 is high and causes the machine to go to the state [15]. In this state, as shown in FIG. 7A, −BSY is asserted during the $D_1$ frame as shown in FIG. $3D_2$. The machine of FIGS. 7A and 7B then returns to he state [0].

After the TO and F frames have been placed on the internal bus IB, the procedure for the state machine of FIGS. 7A and 7B for the internal data transfer means $IDT_D$ is as follows. The TO frame is loaded into its register by the block 710 (FIG. 7C), decision block d706 (FIG. 7A) indicates that $IDT_D$ is the addressee and −ACK is asserted by the block 712 during the F frame as shown in FIG. $3D_2$. Since the SAME SEND bit is not set, a block 716 (FIG. 7B) loads the F frame and decision block d709 checks −BSY and −ACK in the $D_1$ frame.

In the meantime, decision block d612 of the state machine of FIG. 6C for the external transmitter means $XTX_D$ checks −BSY and −ACK in the F frame. Since −ACK was asserted by block 712 of the state machine of FIG. 7A for the internal data transfer means $IDT_D$ and −BSY has not been asserted, the output of decision block d612 leads to a block 650 where the $D_1$ frame is put on the internal bus IB. During the $D_1$ frame, decision block d615 checks −BSY and BUF FUL. As stated, the assertion of BUF FUL caused −BSY to be asserted in the $D_1$ frame. This causes −RTS to be set for the external transmitter means $XTX_D$ by a block 652 so that it will await its next turn on the internal bus IB. The state machine then goes back to state [0].

Communication Situation (10)

In the communication situation (10) of FIG. $3D_3$, the registers of $XDT_D$ and $IDT_D$ are both full so that the message cannot be delivered to either and cannot go around the external loop. This situation may be involved in the communication in FIG. 2C between $TX_C$ to $DT_C$ and to $DT_{C2}$.

After the TO and F frames have been placed on the internal bus IB by the external transmitter means $XTX_D$, decision block d702 of FIG. 7A in the state machine for the internal data transfer means $IDT_D$ indicates that RDRF=1 during the TO frame. The TO address is latched and checked during the F frame to see if $IDT_D$ is the addressee. Since it is, −BSY and −ACK are asserted during the F frame by blocks 702 and 704 respectively as shown in FIG. $3D_3$ and the machine returns to the state [0].

The assertion of −BSY and −ACK in this manner causes decision block d612 in the state machine of FIG. 6C for the external transmitter means $XTX_D$ to direct the procedure to a decision block d614 that checks BUF FUL. Because the registers of the external data transfer means $XDT_D$ are full, the message cannot be sent around the external loop and a block 644 sets −RTS before the transmitter state machine returns to the state [0]. Therefore, the message remains in $XTX_D$ to await another turn on the internal bus IB.

In the state machine of FIGS. 7C and 7D for the external data transfer means $XDT_D$, −CTS is asserted so that BUF FUL is checked by the decision block d714. BUF FUL is high because $XDT_D$'s registers are full and −BSY is checked during the F frame by decision block d715. Because −BSY has been asserted in the F frame by the block 702 of FIG. 7A, the state machine returns to the state [0].

Communication Situation (11)

In the communication situation (11) of FIG. $3D_4$, the registers of the internal data transfer means $IDT_D$ are full but the registers of the external data transfer means $XDT_D$ are empty, so that the message should not be delivered to $IDT_D$ but put on the external bus XB for circulation. This situation may be involved in the communication in FIG. 2C between $TX_C$ to $DT_C$ and to $DT_{C2}$.

The TO and F frames are put on the internal bus IB by the external transmitter means $XTX_D$.

The reaction of the state machine of FIGS. 7C and 7D for the external data transfer means $XDT_D$ is as follows. Since $XTX_D$ is on the internal bus IB, the output of decision block d710 is low and the decision block d714 checks BUF FUL. In this situation, decision block d714 will indicate that the registers of $XDT_D$ are empty, and the TO and F frames are loaded into the registers by the blocks 728 and 730 respectively.

Since MF/−M and RDRF are asserted in the decision block d702 of the flow chart of FIG. 7A for the state machine of the internal data transfer means $IDT_D$, the decision block d703 checks to see if $IDT_D$ is the addressee. Since it is and cannot receive data, it asserts −ACK and −BSY with blocks 702 and 704 respectively during the F frame before returning to the state [0].

The state machine of FIG. 6C for the external transmitter means $XTX_D$ monitors −BSY and −ACK during the F frame with decision block d612. Since they are asserted by the blocks 702 and 704 of the state machine of FIGS. 7C and 7D for the internal data transfer means $IDT_D$, the state machine of FIG. 6C checks BUF FUL in a decision block d614. Since the registers of the external data transfer means $XDT_D$ are empty, a state [2] is entered during which −BSY is asserted by a block 646 to prevent a return to the state [0], and the $D_1$ frame is placed on the internal bus IB by a block 648. The machine then enters the state [15] wherein, as seen in FIG. 6A, the $D_2$ frame is placed on the internal bus IB before the machine returns to the state [0].

The state machine of FIGS. 7C and 7D for the external data transfer means $XDT_D$ also checks −BSY and −ACK during the F frame in decision block d716. Since both are asserted, it proceeds to a state [12] in the $D_1$ frame during which it asserts −BSY to keep other transmitter means off the internal bus IB, loads the $D_1$ frame into its register with block 734, sets NA=1 in a block 736 to indicate that the addressee $IDT_D$ is busy, and sets EA=1 in a block 738 to indicate that the addressee $IDT_D$ is in the mainframe. The machine then proceeds to a state [14] in which, as shown in FIG. 7A, it loads the $D_2$ frame into its register with a block 718, loads CMD with a block 720, and sets RDRF with a block 722 before returning to the state [0]. When the $D_2$ frame is loaded, −DOCLK is asserted.

Communication Situation (12)

In the communication situation (12) of FIG. $3D_5$, the internal data transfer means $IDT_D$ has been instructed by its microprocessor to receive only from the same station that sent the last previous message by the assertion of the SAME SEND bit in the control register, and the registers of the external data transfer means $XDT_D$ are empty so that the message can be placed on the external bus XB for circulation. This situation may be involved in the communication in FIG. 2C between $TX_C$ to $DT_C$ and to $DT_{C2}$.

The state machine of FIG. 6C for the external transmitter means $XTX_D$ places the TO and F frames on the internal bus IB in the usual way.

The reaction of the state machine of FIGS. 7C and 7D for the external data transfer means $XDT_D$ is as follows. Since $XTX_D$ is on the internal bus IB, the output of decision block d710 is low and decision block d714 checks BUF FUL. In this situation, decision block d714 will indicate that the registers of $XDT_D$ are empty and the TO and F frames are loaded into their registers by the blocks 728 and 730 respectively.

The reaction of the state machine of FIGS. 7A and 7B for the internal data transfer means $IDT_D$ is as follows. Since MF/−M is asserted and RDRF is not asserted in decision block d702 of the state machine of FIG. 7A for $IDT_D$, the TO frame is loaded onto the internal bus IB by the block 710 and the decision block d706 checks to see if $IDT_D$ is the addressee in the F frame. Since it is, −ACK is asserted by a block 712 and the decision block d708 checks to see if the SAME SEND bit has been asserted and if the FROM address in the message is the SSA (SAME SENDER ADDRESS) desired. In this situation, the SAME SEND bit is asserted but SSA is not correct so that the machine goes to a state [15] in which it asserts −BSY during the $D_1$ frame before returning to the state [0]. This maintains synchronization in other transmitter means and data transfer means.

The state machine of FIG. 6C for the external transmitter means $XTX_D$ monitors −BSY and −ACK during the F frame in decision block d612. Although, as just described, −BSY is asserted in the $D_1$ frame in the state [15], it is not asserted in the F frame; but −ACK is asserted in the F frame by the block 702 of the state machine of FIG. 7A for $IDT_D$ so that the output of the decision block d612 of FIG. 6C leads to a state [6] at the start of the $D_1$ frame. A block 650 places the $D_1$ frame on the internal bus IB and a check is made of −BSY and BUF FUL by the decision block d615. The signal −BSY is asserted during the $D_1$ frame and BUF FUL is not, so that the machine proceeds to a state [15] in which, as shown in FIG. 6A, the $D_2$ frame is put on the internal bus IB. After setting TDRE, the transmitter state machine of FIG. 6C goes to the state [0].

Return now to the state machine of FIGS. 7C and 7D that as last mentioned had just loaded the F frame into its registers with the block 730. When it checks −ACK and −BSY in the decision block d716 during the F frame, −ACK is asserted but −BSY is not so that the machine proceeds to a state [13] in which the $D_1$ frame is loaded by a block 740, EA is set to "1" by a block 742, and decision block d717 checks −BSY. Since −BSY is asserted during $D_1$ by $IDT_D$, NA is set to "1" by a block 743. Since both EA and NA are "1", it means that the addressee is present but busy. The machine goes to a state [14] to finish loading the register of the external data transfer section $XDT_D$ so that the message can be forwarded on the external bus XB. This is initiated by asserting −DOCLK as previously described.

Communication Situation (13)

In the communication type shown in FIG. 3E, the only situation encountered is (13), which is illustrated in FIG. $3E_2$. In this situation, the message has gone around the loop formed by the external bus and has returned to the station that originated it. If the message has been successfully delivered to a station in another mainframe, the TDRE flag is set in the transmitter means so that a new message can be written into its registers. If the addressee is present in another mainframe but busy, the message stays in the registers of the original transmitter means unless it is aborted by the associated microprocessor. If the addressee is not in any mainframe, the message is aborted. Communication situation (13) was involved when the message went from the data transfer means $DT_C$ of the mainframe $MF_C$ of FIG. 2C to the transmitter means $TX_A$ of the mainframe $MF_A$ of FIG. 2A via the external bus XB.

In FIG. 3E, the message on the external bus XB is placed in the fifo (not shown) of the external transmitter means $XTX_E$. As each successive frame emerges from the fifo, it is written into the register of FIG. 9B' that is selected by the code state machine. FIG. 3E differs from FIGS. 3A through 3D in that the internal data transfer means $IDT_E$ is in the same internal chip as the internal transmitter means $ITX_E$. This could be the case in FIGS. 3A through 3D as a message can be sent from the transmitter means of an internal chip to its own data transfer means.

First, the external transmitter means $XTX_E$ obtains access to the internal bus IB and places the TO and F frames on it as shown by the blocks 604 and 608 of FIG. 6A.

The reaction of the internal data transfer means $IDT_E$ of the sending station can be seen from FIGS. 7A and 7B to be as follows. The decision block d702 determines whether the registers of $IDT_E$ are full. If they are, the machine enters a state [14] in which the decision block d703 determines in the F frame whether the message is for $IDT_E$. In communication situation (13), $IDT_E$ is in the sending station and not in the addressed station so that decision block d703 will have a low output. During the F frame, a decision block d704 checks −BSY and −MFA (MY FROM ADDRESS). Since the addressee is not in the mainframe, −BSY is not asserted; but if the FROM address in the message is the address of the station in which $IDT_E$ resides, −MFA is asserted. The machine advances to a state [7] and asserts −BSY during the $D_1$ frame with a block 706 and −ACK with a block 708 before returning to the state [0]. This affirms the fact that communication situation (13) prevails because it is the only one in which −BSY and −ACK are asserted during the $D_1$ frame.

The external transmitter means $XTX_E$ having a state machine that operates as in FIG. 6C examines −BSY and −ACK in the F frame with the decision block d612. Since neither one is asserted because the TO address is not in the mainframe, the machine goes to a state [7] (not to be confused with the state [7] of FIGS. 7C and 7D) in which the $D_1$ frame is put on the internal bus IB by a block 638 and a test is made of −BSY and −ACK during the $D_1$ frame by a decision block d613. Since −BSY and −ACK are asserted during the $D_1$ frame by blocks 706 and 708 of FIG. 7B for the internal data transfer means $IDT_E$, the external transmitter means $XTX_E$ will load TDRE with a block 642 and return to the state [0].

We now come to the internal transmitter means $ITX_E$ which originated the message that has just been put on the internal bus IB by $XTX_E$. The flow chart for the state machine for the internal transmitter means $ITX_E$ is shown in FIGS. 6A and 6B. After the $D_2$ frame of the message is placed on the internal bus IB by block 626, the message stays in the registers of the transmitter means until it is aborted by its associated microprocessor or until it has been successfully delivered to the station having the TO address.

After placing $D_2$ on the internal bus IB, the internal transmitter means $ITX_E$ gets off IB so that another transmitter means may get on it, and $ITX_E$ enters a state [13] in which a decision block d607 checks to see if the TDRE flag has been set. This may be done by its associated microprocessor. A decision block d608 then checks −BSY. During the $D_2$ frame, the arbitrator (not shown) asserts −BSY in a manner to be explained and −BSY will remain asserted until a new communication begins, at which point the arbitrator unasserts −BSY. Thus, when the decision block d608 indicates that −BSY is unasserted, the TO frame of another transmission is on the internal bus IB. It could be there becuase of the external transmitter means $XTX_E$ being on the internal bus IB to bring back the message $ITX_E$ sent as in situation (13), or it could be any other transmitter means of the same mainframe. As long as −BSY is asserted, no message is on the internal bus IB and the state machine of FIG. 6A keeps looping back to the start of the state [13].

As soon as decision block d608 (FIG. 6A) indicates that −BSY is unasserted, it means that a TO frame is on the internal bus IB and the machine then enters a state [8] while the F frame is present. The signal −BSY is checked by a decision block d609 (FIG. 6B). If it indicates that −BSY is asserted during the F frame, it means that the message is for a station in the mainframe and is not a message returning to the station that originated it, and the machine loops back to the start of state [13].

But if the decision block d609 indicates that −BSY is unasserted during the F frame, it is possible that the external transmitter means $XTX_E$ is on the internal bus IB. To find out, decision block d610 checks −MFA during the F frame. If −MFA is asserted, it means that the message on the internal bus IB is returning to the station that sent it. The decision block d610 also checks EA. If −MFA and EA are asserted, the machine enters a state [11] in which a decision block d611 examines NA. If NA=0, the message has been successfully delivered to the TO address station and the flag TDRE is set so that the internal transmitter means $ITX_A$ may receive another message to send. If NA=1, the TO address exists but is busy in which event the state machine either sets the TDRE flag if its microprocessor has set the STOP XMIT flag, or reasserts −RTS so as to request another turn on the internal bus IB.

Should −MFA be asserted and EA not asserted, it means that there is no station having the TO address. The machine enters a state [10] during the $D_1$ frame and loads the flag NMAA (NO MODULE AT TO ADDRESS), LTL (LAST TRANSMISSION LOST), and TDRE with the blocks 628, 630 and 632 respectively. The internal transmitter means $ITX_D$ is now ready to receive another message.

All of the stations in the same mainframe observe what is on the internal bus IB. For those that did not originate the message coming from the external transmitter means $XTX_E$, their decision blocks d610 will indicate that −MFA is not asserted, in which event they go into a dummy state [9] before looping back to the start of state [13]. In other words, all of the internal transmitter means check out every message on the internal bus IB to see if it is the one they sent.

Although the external data transfer means $XDT_E$ plays no role in the situation (13), it functions as follows. The external data transfer means $XDT_E$, which functions as shown in FIGS. 7C and 7D, determines in the TO frame by decision block d710 that the external transmitter means $XTX_E$ of the same chip is on the internal bus IB, and the decision block d714 checks BUF FUL. If the registers of $XDT_E$ are full, decision block d715 will check −BSY in the F frame. In communication situation (13), −BSY is not asserted in the F frame so that the machine goes to state [15] in which, as can be seen from FIG. 7A, −BSY is asserted during the $D_1$ frame. If the registers of $XDT_E$ are empty, the TO frame is loaded by block 728 and the F frame is loaded by the block 730. A check is made by decision block d716 of −BSY and −ACK in the F frame. Since neither are asserted in situation (13), the machine goes to state [9] shown in FIG. 7A wherein a check is made of −BSY and −ACK during the $D_1$ frame by decision block d709. Since −BSY is asserted, the machine returns to the state [0] and the loaded words are not put on the external bus XB.

ARBITRATOR

The arbitrator performs three functions: (1) it determines the sequence with which the transmitter means of a mainframe are given access to the internal bus; (2) it provides synchronization of the state machines; and (3) it enables the clock only when a frame is being transmitted so as to reduce noise.

If the transmitter means, including the transmitter means for the external chip, are given access to the internal bus IB in a repeated sequence, whether or not they have a message to send, much time is wasted and the messages would proceed slowly around the loop formed by the external bus XB. In accordance with an aspect of this invention, the arbitrator checks each of the transmitter means for an assertion or non-assertion of a request-to-send signal −RTS in a sequence X, $T_1$, X, $T_2$, X, $T_3$ . . . X, $T_n$, X, $T_1$, etc. wherein X indicates a check of the transmitter means of the external chip and T indicates a check of the transmitter means of an internal chip. Only those transmitter means asserting −RTS are given access to the internal bus IB so that the transmitter means of the external chip can have up to 50% of the time on IB. The percentage could be increased or decreased by the frequency with which X appears in the sequence. Thus, no time is wasted and the message can proceed around the loop formed by the external bus XB at a satisfactory rate.

In the particular embodiment of the invention described herein, a complete message includes four frames: TO, F, $D_1$ and $D_2$; but as noted, there are some communication situations in which the message is terminated at the end of the F frame and some when the message is terminated at the end of the $D_1$ frame. In each of these situations, the state machines for the stations of the mainframe assert −BSY in the last frame. In communication situations having four frames, the arbitrator asserts −BSY in the last frame. When −BSY is asserted, the state machines return to their starting places so that they are synchronized.

The arbitrator maintains synchronization by keeping −BSY asserted after the last frame of each message until a transmitter means is given access to the internal bus IB. The unassertion of −BSY at this time permits all state machines to start their procedures at the same time.

Observation of the thirteen communication situations illustrated in FIGS. $3A_1$–$3A_3$; $3B_1$–$3B_2$; $3C_1$–$3C_2$; $3D_1$–$3D_5$; and $3E_2$ shows that each has a unique combination of the frames TO, F, $D_1$ and $D_2$ in which the control signals −BSY, −ACK and BUF FUL are asserted so that it would be possible to perform all the functions of the arbitrator state machine described above by providing thirteen different logic circuits for each mainframe, but it is far simpler and less expensive to provide an arbitrator that functions as illutrated by FIGS. 4A and 4B. These figures are for the arbitrator $A_A$ of FIG. 2A, but the other arbitrators $A_B$ and $A_C$ of FIGS. 2B and 2C respectively would operate in the same way.

As will be seen from the following description of the flow chart of FIGS. 4A and 4B, the clock is enabled for each frame of a message that is transmitted. At various points in the flow chart, there are boxes containing an indicated assertion of each of two bits FR0 and FR1. These bits indicate the frame in which the state machine is and are only used for servicing, so that there is no need for mentioning them again. The discussion related to each decision block is headed by the designation of that block, the numbers of the state referred to are in respective brackets [], and the numbers of the communication situations referred to are in respective parentheses ().

When the arbitrator is powered up, it is in a state [0] and a block 401 asserts −BSY so as to place the transmitter and data transfer state machines of both the internal and external chips in their starting states [0].

−CTS, Decision Block d401

State [0]

A test is made by a decision block d401 to see whether or not a −CTS signal has been asserted by the transmitter means of any chip and therefore whether a −CTS is pending. If not, −BSY is still asserted by the block 401; but if so, the machine enters a state [8] in which −CTS is conveyed to the chip selected by the logic circuits in a block 404 formed by dashed lines and a clock is enabled for one cycle for the TO frame by a block 406. When the state [8] is entered and −BSY is unasserted, it signifies the start of a new transmission and thereby synchronizes the operation of all the state machines.

Included in the block 404 are a series of decision blocks d402 through d407 that respectively check each of the transmitter means of the mainframe $MF_A$ of FIG. 2A in the following repeated sequence: $TX_A$, $TX_{A1}$, $TX_A$, $TX_{A2}$, $TX_A$ and $TX_{A3}$—to see whether or not it has asserted −RTS. If it has, the arbitrator asserts −CTS on the control line to that transmitter means as respectively indicated by the blocks 408, 410, 412, 414, 416 and 418 so as to connect it to the internal bus IB.

BUF FUL/EXTCTS, Decision Block d408

State [8], TO Frame

A decision block d408 (FIG. 4B) tests the state of BUF FUL in the TO frame to determine whether the data transfer registers of the external chip are full and tests —EXTCTS to see whether −CTS has been granted to the external chip.

If BUF FUL is a logic low, indicating that the data transfer registers of the external chip are empty, and if −EXTCTS for the external chip is a logic high, indicating that the external chip is not requesting access to the internal bus, or if BUF FUL is a logic high, indicating that the data transfer registers of the external chip are full, the machine proceeds to a state [4] to begin processing communication situations (1) through (5), (7), (9), (10) and (13). In the state [4], the clock is enabled for one cycle for the F frame by a block 420, and a test is made for −BSY by a decision block d409.

−BSY, Decision Block d409

State [4], F FRAME

Situations (1) through (13)

If decision block d409 (FIG. 4B) indicates that −BSY is asserted during the F frame, situations (3) and (10) are involved. The state machine proceeds to a point A in the diagram where a test is made by a decision block d410 (FIG. 4A) as to whether a signal −CTS is pending.

−CTS, Decision Block d410

State [4], F Frame

Situations (3), (10)

If decision block d410 indicates that −CTS is not pending, the machine reverts to the state [0] and the block 401 asserts −BSY as just described. If decision block d410 indicates that −CTS is pending, the machine enters the state [8] again.

Return to Decision Block d409

If the decision block d409 (FIG. 4B) indicates that −BSY is not asserted during the F frame, the state machine enters a state [5] in which the clock is enabled for the $D_1$ frame by a block 421, and another test is made for −BSY by a decision block d411.

−BSY, Decision Block d411

State [5], $D_1$ Frame

Situations (1), (2), (4), (5), (7), (9), (13)

If decision block d411 indicates that −BSY is asserted during the $D_1$ frame, situations (2), (5), (7), (9) and (13) are involved and the machine goes to point A. Although −BSY is also asserted during the $D_1$ frame in situations (11) and (12), the data transfer registers of the external chip are not full and −CTS is granted to the external chip in these situations so that the conditions at the right side of the decision block d408 are not met.

If the decision block d411 indicates that −BSY is not asserted, the successful communication situations (1) and (4) are involved. The state machine enters a state [1] during which −BSY is asserted by a block 426 and the clock is enabled for the $D_2$ frame by a block 428. The state machine then goes to the point A.

Return to Decision Block d408

If the decision block d408 (FIG. 4B) produces logic lows, it means that the data transfer register of the external chip is empty and that its transmitter means is on the internal bus IB, a condition that can only exist for situations (6), (8), (11), (12) and (13). The state machine enters a state [7] during which the clock is enabled for the F frame by a block 430 and a decision block d412 checks −BSY. This is the F frame.

−BSY Decision Block d412

State [7], F Frame

Situations (6), (8), (12), (13)

If decision block d412 indicates that −BSY is not asserted, situation (11) is ruled out, and situations (6), (8), (12) and (13) are involved. The machine enters a state [3] during which the clock is enabled by a block 431 for the $D_1$ frame and a check is made for −ACK by a decision block d413.

−ACK, Decision Block d413

State [8], $D_1$ Frame

Situations (6), (8), (12), (13)

If decision block d413 indicates that −ACK is asserted during the $D_1$ frame, the machine reverts to point A because, as illustrated by situation (13), −ACK is only asserted at this time when a message is returning to the station that originally sent it.

If decision block d413 indicates that −ACK is not asserted during the $D_1$ frame, the machine enters the state [1] in which the $D_2$ frame is placed on the internal bus IB as illustrated by the situations (6), (8) and (12).

Return to Decision Block d412

If decision block d412 indicates that −BSY is asserted during the F frame, situation (11) is involved and the machine enters a state [6]. The signal −BSY is asserted by a block 422, and the clock is enabled for the $D_1$ frame by a block 424. In situation (11), the message cannot be delivered to the data transfer means in the TO station because it has data in it, and the message is sent around the external bus XB to avoid lock-up. The machine then enters the state [1] in which the $D_2$ frame is placed on the internal loop and reaches the data transfer means of the external chip from which it goes around the external bus XB.

Note that the assertion of −BSY in the $D_1$ frame by the block 422 is followed by the assertion of −BSY by the block 426 in the $D_2$ frame so that −BSY is asserted in the F, $D_1$ and $D_2$ frames as required in situation (11). As soon as there is a −CTS pending, the state [8] is entered.

ARBITRATOR BLOCK DIAGRAM

The operation of the arbitrator has been explained with the aid of FIGS. 4A and 4B, but the major components, their interconnections and the figures of the drawings respectively illustrating the schematic circuit diagrams therefor are indicated in FIG. 5. As in FIG. 1, FIG. 5 specifically illustrates an arbitrator for a mainframe having three stations; but the schematic circuit diagrams in FIGS. 29A through 33L are for an arbitrator in a mainframe having eight stations.

Three request-to-send lines, one from each station, are designated $-RTS_1$, $-RTS_2$ and $-RTS_3$ and are respectively connected to three registers (not individually shown) in a block 502. At each cycle of a system clock 504, the request-to-send lines are updated so that those lines on which an −RTS signal is asserted at that clock cycle are low. The registers are respectively connected to inputs $i_1$, $i_2$ and $i_3$ of a barrel shifter 506 which, at the particular instant illustrated, respectively connects $i_1$, $i_2$ and $i_3$ to inputs A, B and C of an −RTS priority encoder 508. The encoder determines the priority of the inputs A, B and C and informs the CTS decoder 510 of its decision. If the station has asserted −RTS so that the input A is in a low state, the decoder 510 asserts −CTS on the line to that station so as to put the transmitter on the internal bus; but if the station is not asserting −RTS, no −CTS is granted. In either case, the decoder 510 places a bit on a line 511 to the barrel shifter 506 that causes it to effectively rotate the connections between its inputs $i_1$, $i_2$ and $i_3$ and the inputs A, B and C of the priority encoder 508. Thus, $i_1$ is connected to C; $i_2$ is connecfted to A; and $i_3$ is connected to B. If it is low, the decoder 510 will assert −CTS on the line to the station from which −RTS comes.

As previously described, the transmitter means of the external chip, herein designated by $XC_4$, of the mainframe is given a chance on every other clock cycle to gain access to the internal bus. The request-to-send line $-RTS_4$ from the external chip is applied to a register 412 that is connected to a block 514 containing the state logic for asserting or not asserting −CTS on the line to $XC_4$. The register 512 is also connected to a −CTS PENDING block 516 and when any of the stations are asserting an −RTS signal, a low state is supplied on a line 518 to the block 516. Note also that the line 511 having a bit indicating that one of the stations has been given a chance to get on the internal bus is connected to the block 514. Thus, if the line 511 indicates that a station has just been given a chance to have access to the internal bus and $XC_4$ is asserting −RTS, the logic in the block 514 will assert −CTS on the line to $XC_4$ so that its transmitter means is connected to the internal bus.

The state machine for the arbitrator is contained in a block 520 and, as can be seen from the flow chart of FIGS. 4A and 4B, it is connected to the control lines −BSY and −ACK, the BUF FUL signal of the data transfer means of the external chip, the system clock 504, the output of the block 514 on which −CTS is asserted for the external chip $XC_4$, and to the output of the block 516 indicating whether any −CTS signal is pending, i.e., whether any of the stations or the external chip are asserting −RTS. As described in connection with the flow chart of FIGS. 4A and 4B, the state machine of the block 520 asserts −BSY in the $D_2$ frame, enables the clock when required, and provides signals FR0 and FR1 identifying the current frame. The state machine of the block 520 also supplies a signal 522 to the CTS decoder 510 so as to indicate that the transmitter means of the external chip $XC_4$ has been given its chance to get on the internal bus and that one of the stations may have its chance.

TRANSMITTER STATE MACHINE

Reference is made to the flow charts of FIGS. 6A, 6B and 6C for an explanation of the operation of the state machines of the transmitter means in the internal and external chips respectively. Although the operations performed by these transmitter means are quite different, they use the same hardware except for the fact that a signal MF/−M is set at a logic low for an internal chip and at a logic high for an external chip.

As previously noted, there are only thirteen communication situations. Situations (1) through (5) involve the transmitter means of an internal chip, and situations (6) through (13) involve the transmitter means of an external chip. In each chip, the logic states of one or more of −BSY, −ACK and BUF FUL are examined during certain of the TO, F and $D_1$ frames so as to progressively eliminate certain communication situations and either prematurely terminate a communication before all frames are placed on the internal bus, or place all frames on the bus. At the end of any communication, the signal −BSY is asserted and at the beginning of the next communication, it is unasserted by the arbitrator. For brevity, communication situations are indicated by a number in parentheses (), machine states are indicated by a number in brackets [], and the frames during which a decision block operates are indicated by TO, F, $D_1$ and $D_1$.

Functions Common to Transmitter State Machines of Internal and External Chips

Initially, the machines are in a state [0]. If a transmitter means has a message to send, it will automatically assert −RTS on the unique line between it and the arbitrator for the mainframe in which it resides when the $D_2$ frame is loaded into its register. It tests to see if it is granted time on the internal bus by checking the state of its unique −CTS line to the arbitrator, decision block d601 (FIG. 6A). As long as the logic state is high, −CTS is not asserted and it stays in the state [0]; but if −CTS is asserted, the TO address is placed on the internal bus by a block 604, and the −RTS signal is cleared by a block 606. All of this is in the state [0].

The machine then enters a state [1] during which a block 608 places the F frame on the internal bus and a decision block d602 tests the logic state of MF/−M to see whether it is an internal or external chip.

INTERNAL CHIP TRANSMITTER OPERATION

In the transmitter means of an internal chip, the output of the decision block d602 will be a logic low, and the communication situations in which the transmitter means of an internal chip may be involved are (1) through (5). A test is made of −BSY and —ACK by a decision block d603 (FIG. 6B).

−BSY, −ACK, Decision Block d603
State [1], F Frame
Situations (1) through (5)

If the decision block d603 indicates that −BSY is asserted, only the unsuccessful communication situation (3) is involved, whether or not —ACK is asserted. Before −RTS is re-asserted, however, a test is made by a decision block d604 to see if the microprocessor for the internal chip has commanded it to cease further attempts to transmit by setting a STOP XMIT flag.

STOP XMIT, Decision Block d604
State [1], F Frame
Situation (3)

If the output of decision block d604 is a logic low, −RTS is asserted by a block 610 before the machine returns to the state [0]. The message stays in the transmitter registers.

If the output of decision block d604 is a logic high, further attempts to send the message are to be abandoned and −RTS is not re-asserted. The LTL flag is set by a block 612 and the TDRE flag is set by a block 614 before the machine returns to the state [0]. Although the message remains in the transmitter registers, the setting of TDRE will permit a new message to be written in place of it. Instead of showing the block d604, 610, 612 and 614 each time the combination is used, reference will be made to a dashed-line rectangle 616 that surrounds them.

Return to Decision Block d603

If decision block d603 indicates that −BSY is not asserted and that −ACK is asserted during the F frame, only the communication situations (1) and (2) can be involved because the assertion of −ACK indicates that the station having the TO address is present in the mainframe, a condition that does not exist in situations (4) and (5).

In order to handle situations (1) and (2), the machine enters a state [3] during which the $D_1$ frame is placed on the internal bus by a block 618 and a test is made of −BSY by a decision block d605.

−BSY, Decision Block d605
State [3], $D_1$ Frame
Situations (1), (2)

If decision block d605 indicates that −BSY is asserted during the $D_1$ frame, only unsuccessful communication situation (2) is involved. The assertion of −BSY during $D_1$ means that the station having the TO address has been instructed by its microprocessor to receive from the same sender as before and that this message is not from that sender. In this situation, it is necessary to wait until the F frame in order to determine if the message is from the same sender. The assertion of −BSY during the $D_1$ frame is effected by the blocks 706 and 714 of FIG. 7B, which illustrates the operation of a state machine of an internal data transfer means and which will be discussed below. The machine then carries out the function of the blocks contained within the dashed rectangle 616 (FIG. 6B).

If decision block d605 indicates that −BSY is not asserted during the $D_1$ frame, only the successful communication situation (1) is involved. The machine then enters a state [15] during which a block 620 places the $D_2$ frame on the internal bus and a block 622 sets the TDRE flag indicating that another message can be written into the transmitter registers. The machine then returns to the state [0].

Return to Decision Block d603

If decision block d603 indicates that neither −BSY nor −ACK are asserted in the F frame, situations (4) and (5) are involved because the station having the TO address must be in another mainframe. The machine enters a state [5] during which a block 624 (FIG. 6A) places the $D_1$ frame on the internal bus and a test is made of −BSY by a decision block d606.

−BSY, Decision Block d606
State [5], $D_1$ Frame
Situations (4), (5), (13)

If decision block d606 indicates that −BSY is asserted during the $D_1$ frame, the unsuccessful communication situation (5) is involved. Because the data transfer registers of the external chip have data in them, i.e., the buffer is full, the state machine of the external data transfer means asserts −BSY during the $D_1$ frame (see block 732 in FIG. 7D). It could not do this earlier because it is the lack of the assertion of −ACK in the F frame that informs the data transfer means of the external chip that it is to receive a message. With −BSY asserted in the $D_1$ frame, a successful transmission cannot be made and the internal transmitter state machine goes back to the state [0] by following procedure indicated by blocks contained within the dashed rectangle 616 (FIG. 6B).

If decision block d606 (FIG. 6A) indicates that −BSY is not asserted in the $D_1$ frame, the successful communication situation (4) is involved. The data transfer registers of the external chip do not have data in them so that −BSY is not asserted by the data transfer state machine for the external chip. State [12] is entered during which the $D_2$ frame is placed on the bus by a block 626 in accordance with situation (4). The four frames of the message are now in the data transfer registers of the external chip and ready for transmission around the external loop. As previously explained, the arbitrator state machine asserts −BSY during the $D_2$ frame for the purpose of synchronization.

What Happened to the Message Just Sent to the Data Transfer Section of an External Chip in the Communication Type (4) Just Described?

During the $D_2$ frame, the arbitrator for the mainframe asserts −BSY for synchronization. After the four frames of a message are loaded into appropriate registers in the data transfer means of the external chip, they are passed around the external loop until they return to the transmitter means of the same external chip. What follows is a description of what occurs from the point of view of the originating transmitter means. Until it is known that either the message was delivered to the station in another mainframe having the TO address or the message has been aborted, the TDRE flag will not be set and no new message can be placed in the originating transmitter means. When the $D_2$ frame has been placed on the internal bus by the block 626, the machine enters a state [13] wherein a decision block d607 tests to see if the flag TDRE has been set and the message aborted by an instruction from the microprocessor of the station in which the originating transmitter means resides.

TDRE, Decision Block d607

State [13]

If decision block d607 (FIG. 6A) indicates that the flag TDRE has been set for any reason, a new message may be written into the transmitter registers of the originating station and the message just sent may be destroyed. The machine then goes back to the state [0].

If decision block d607 indicates that the flag TDRE is not set, a test is made by a decision block d608 to see if −BSY is asserted.

−BSY, Decision Block d608

State [13]

Situation (13)

If decision block d608 (FIG. 6A) indicates that −BSY is still asserted, it means that no other transmitter means has been granted access to the internal bus, and the machine loops back to the beginning of the state [13].

If decision block d608 indicates that −BSY is unasserted, it means that a new transmission is started (see decision block d601) and that a new TO frame is on the internal bus. This TO frame could be from the transmitter means in the external chip or from another transmitter means in the same mainframe. The machine then enters a state [8] during which the F frame is on the internal bus and a new test is made of −BSY by a decidion block d609 (FIG. 6B).

−BSY, Decision Block d609

State [8], F Frame

Situation (13)

If decision block d609 indicates that −BSY is asserted during the F frame, it means that the TO address is in the mainframe so that the message on the internal bus is not returning to the station that originated it, in which event the machine loops back to the beginning of state [13].

If, however, decision block d609 indicates that −BSY is not asserted, it means that some transmitter means is on the internal bus and the state machine proceeds to a decision block d610 where the FROM address on the internal bus is compared with the address of the station in which the internal transmitter means retaining the original message resides, and a check is made of EA, which is the ninth bit of the F frame.

−MFA, EA, Decision Block d610

State [8], F Frame

Situation (13), (5)

If decision block d610 (FIG. 6B) indicates that the FROM address in the F frame on the internal bus is not the address of the station that originally sent the message in accordance with the situation (4), the level of EA does not matter and the state machine for any transmitter means which has transmitted a message and for which this occurs goes into a "dummy" state [9] for timing and synchronization before returning to the beginning of state [13]. This can occur if a message is sent from one station in the mainframe to another in the same mainframe or if a message is sent external by another station in the mainframe. Thus, the transmitter means of the originating station will go back to the beginning of the state [13] and keep looping through it until the flag TDRE is set, at which point it will return to the state [0], or until −BSY is unasserted.

If decision block d610 indicates that the FROM address on the internal bus is the same as the address of the station that originally sent the message in accordance with the situation (4) and if EA is low so that there is no TO address in the system, the machine proceeds to a state [10] during which a block 628 sets the NMAA flag; a block 630 sets the LTL flag; and a block 632 sets the TDRE flag so that the station that originated the message can receive a new one.

If decision block d610 indicates that the FROM address on the internal bus is the same as the address of the station that originally sent the message in accordance with the situation (4) and if the station to which that message was sent is in the system, the ninth bit EA of the F frame will have a logic high and the machine enters a state [11] during which the logic state of NA, the ninth bit of the $D_1$ frame, is checked by a decision block d611.

NA, Decision Block d611

State [11], $D_1$ Frame

Situation (13)

If decision block d611 (FIG. 6B) indicates that NA is a logic high so that the TO station was there but was busy, the procedure goes to the dashed rectangle 616 so that −RTS is re-asserted or the message is aborted.

If decision block d611 indicates that NA is a logic low, the message has been delivered to the station having the TO address so that the TDRE flag can be set by a block 634 which makes the transmitter means that originated the message capable of accepting a new message. The machine then returns to the state [0].

EXTERNAL CHIP TRANSMITTER OPERATION

When the transmitter means of the external chip requests and receives access to the internal bus, only situations (6) through (13) are possibly involved. The functions of the blocks d601, 604, 606 and 608 are carried out in the same manner that they were by teh transmitter means of an internal chip so as to arrive at decision block d602 with the FROM address on the bus. But the signal MF/−M of the decision block d602 is now a logic high so that the procedure follows a path 636 to a decision block d612 shown in FIG. 6C that examines whether or not −ACK and −BSY are asserted during the F frame.

−BSY, −ACK, Decision Block d612

State [1], F Frame

Situations (6) through (9), (12), (13)

If decision block d612 indicates that neither −BSY nor —ACK are asserted during the F frame, the possible situations are seen to be (6), (7) and (13), i.e., either the message is from a station in a previous mainframe in the external loop and for a station in a subsequent mainframe, in which event the transmitter means of the external chip tries to pass the message via the internal bus to its own data transfer means; or the station that originally launched the message is in the same mainframe as the external chip, in which event communication situation (13) is carried out, as has just been explained from the point of view of the transmitter means of that station. If the registers of the external data transfer means are not full, the successful communication situation (6) is carried out; but if these registers are full, situation (7) prevails in which event the message stays in the external transmitter means until a subsequent turn on the internal bus permits a situation (6) or the message is aborted.

In order to determine which of the communication situations (6), (7) or (13) is involved, the machine enters a state [7] during which a block 638 in the transmitter means of the external chip places the $D_1$ frame on the internal bus, and another test is made of the states of −BSY and −ACK by a decision block d613 (FIG. 6C).

−BSY, −ACK, Decision Block d613

State [7], $D_1$ Frame

Situations (6), (7), (13)

If decision block d613 indicates that neither −BSY nor −ACK are asserted during the $D_1$ frame, the successful communication situation (6) is carried out. The TO address station is not in this mainframe and the data transfer registers of the external chip are ready to accept data. The state [15] is then entered during which, as explained in connection with decision block d605 of FIG. 6B, the $D_2$ frame is placed on the internal bus and the TDRE flag is set. Examination of FIGS. 4A and 4B shows that the arbitrator asserts −BSY during the $D_2$ frame.

If decision block d613 (FIG. 6C) indicates that −BSY is asserted but that −ACK is not asserted during the $D_1$ frame, it means that the TO address station is not in this mainframe and that the data transfer registers of the external chip cannot accept data. The −RTS signal for the external chip is set by a block 640 to await the next turn on the internal bus, and the machine returns to the state [0]. This is situation (7).

If decision block d613 indicates that −ACK is asserted during the $D_1$ frame, situation (13) is involved. The data transfer means of the internal chip has determined by means of a decision block d704 (FIG. 7B) or a decision block d707 (FIG. 7A) in the data transfer state machine for an internal chip to be described below that the FROM address on the internal bus is the same as the address of the station in which the data transfer state machine resides and further that the internal bus is not busy. When these conditions exist, the data transfer state machine asserts −BSY and −ACK during the $D_1$ frame. Therefore, when the state machine for the transmitter means of the external chip finds by decision block d613 (FIG. 6C) that −ACK is asserted during the $D_1$ frame, it can set its TDRE flag with a block 642 so that the transmitter means can receive a new message. The machine then returns to the state [0].

Return to Decision Block d612

Situations (10), (11)

If decision block d612 (FIG. 6C) indicates that −BSY and −ACK are asserted during the F frame, situations (10) and (11) may be involved. The TO station is in the mainframe but is busy. A test is made by decision block d614 as to whether BUF FUL is asserted, i.e., are the data transfer registers of the external chip full?

BUF FUL, Decision Block d614

State [1], F Frame

Situations (10), (11)

In the situation (10), the decision block d614 indicates that the buffer if full, −RTS is re-asserted by a block 644, and the machine returns to the s-tate [0]. The message stays in the registers of the external transmitter means until its next turn on the internal bus or until the message is aborted.

In the situation (11), the decision block d614 indicates by a low logic value that the buffer is empty, the machine enters a state [2]. The signal −BSY is asserted by a block 646 during the $D_1$ frame to keep other transmitter means and data transfer means synchronized and the $D_1$ frame is placed on the internal bus by a block 648. Although the message cannot be sent to the TO address station because decision block d612 has indicated that it is busy, it can be sent around the external loop because the buffer is empty. The machine then enters the state [15] wherein, as previously explained, the $D_2$ frame is placed on the internal bus and the TDRE flag is set so that the external transmitter means is free to handle another message before the machine returns to the state [0].

Return to Decision Block d612

Situations (8), (9), (12)

If decision block d612 (FIG. 6C) indicates that −BSY is not asserted and that −ACK is asserted during the F frame, the TO address station is in the same mainframe as the external chip and is not busy, so that situations (8), (9) and (12) are potentially possible. To determine which situation is to be carried out, the machine enters a state [6] during which the $D_1$ frame is placed on the internal bus by a block 650 and a test is made at the end of the TO frame by a decision block d615 of the logic state of −BSY and BUF FUL of the external data transfer means. BUF FUL is low when the data transfer registers of the external chip are empty.

−BSY, BUF FUL, Decision Block d615

State [6], $D_1$ Frame

Situations (8), (9), (12)

If decision block d615 (FIG. 6C) indicates that −BSY is not asserted during the $D_1$ frame and the BUF FUL is low, situation (8) is involved. Since decision block d612 has already indicated that the data transfer means of the TO station is ready to receive data, the message can be conveyed to the external data transfer means for introduction to the external loop and to the TO address station at the same time, as is required. The state machine then goes into the state [15] which, as previously explained in connection with the decision block d605 of FIG. 6B, places the $D_2$ frame on the internal bus and sets the TDRE flag of the external transmitter state machine so that it is ready to receive a new message before going back to the state [0].

If decision block d615 (FIG. 6C) indicates that −BSY is asserted during the $D_1$-frame, situation (8) is involved. The signal −BSY is asserted during the $D_1$ frame by the data transfer means of the external chip if its registers are full at the end of the TO frame. Although the message could be received by the TO address station, it cannot be passed around the external bus so that it must remain in the registers of the external transmitter means until it is given another turn on the internal bus. Unless the message is aborted, −RTS is re-asserted by a block 652 before the machine returns to the state [0].

If decision block d615 indicates that −BSY is asserted during the $D_1$ frame and the BUF FUL is low so that the registers of the external data transfer means are empty, situation (12) will be involved. Under this condition, the TO address station has been instructed to receive its message from the same sender as before, so that the message must be passed around the external bus until it again arrives at the transmitter means of the same external chip. The machine then goes into the state [15] during which it places the $D_2$ frame on the internal bus and sets the TDRE flag so that the external transmitter means may receive a new message.

DATA TRANSFER STATE MACHINE

In FIGS. 7A-7B and 7C-7D that respectively illustrate the operation of a state machine for the data transfer means of an internal chip such as $IC_A$ of FIG. 2A and the operation of a state machine for the data transfer means of an external chip such as $XC_A$ of FIG. 2A, the numbers enclosed in brackets [] indicate a state that is entered at a solid dot, the numbers in parentheses () indicate the communication situations involved, and TO, F, $D_1$ and $D_2$ respectively indicate the frame occurring at the time.

STATE MACHINE FOR AN INTERNAL CHIP

Situations (1) through (3), (8) through (13)

Before going into a detailed description of FIGS. 7A and 7B, it should be noted that the right half of the drawings relates to the operations occurring when the registers of the data transfer means of an internal chip are full, and the left half relates to the operations occurring when the registers of the data transfer means are empty.

From an examination of FIGS. 3A through 3E, it can be seen that an internal data transfer means is involved in the communication situations noted above. Although it may not be readily apparent, an internal data transfer means plays a role in situation (13) by supplying signals that are used in that situation.

−BSY, Decision Block d701

State [0]

While in the state [0], a decision block d701 (FIG. 7A) indicates by a logic high when −BSY is unasserted by the arbitrator for the mainframe in which the data transfer means resides. This means that a new message is starting and that the TO frame is on the internal bus. When this occurs, the procedure goes to a decision block d702.

DATA TRANSFER REGISTERS FULL

MF/−M, RDRF, Decision Block d702

State [0], TO Frame

Situations (3), (10), (11), (13)

If decision block d702 indicates that the data transfer registers are full, i.e., RDRF=1, and that MF/−M has been pre-set to a low logic level, the data transfer means is in an internal chip and the procedure goes to a decision block d703.

MTOA, Decision Block d703

State [4], F Frame

Situations (3), (10), (11), (13)

The decision block d703 determines whether the TO address on the internal bus is the same as the address of the station in which the data transfer means resides. Although this function would seem to more properly belong in the state [0], when the TO address is on the internal bus, timing considerations require that this function be done in the state [4]. In order to do this, the TO address is latched.

If the decision block d703 indicates by a logic high that the TO address on the internal bus is the same as the address of the station in which the data transfer means resides, a block 702 asserts −ACK in the F frame to indicate that it is in the mainframe; and since decision block d702 has already determined that the registers of the data transfer means are full, −BSY is asserted by a block 704, a combination that occurs only in communication situations (3), (10) and (11). The machine then returns to state [0].

If decision block d703 indicates that the TO address on the internal bus is not the same as that of the station in which the data transfer means resides, the procedure goes to a decision block d704 (FIG. 7B).

−BSY, −MFA, Decision Block d704

State [4], F Frame

Situation (13)

The decision block d704 determines whether or not −BSY and −MFA (MY FROM ADDRESS) are asserted during the F frame.

If the decision block d704 indicates that −BSY is not asserted and that −MFA is, the machine enters a state [7] during the $D_1$ frame. This means that the data transfer means is in the station that originally sent the message but, although it has nothing to do with setting the TDRE flag indicating that new data can be written into the registers of the transmitter means in its station, it asserts −BSY by a block 706 and −ACK by a block 708 as is required by the situation (13), and then returns to the state [0] so as to be synchronized. The assertion of −BSY and −ACK during the $D_1$ frame is used at the bottom output of decision block d610 of the internal transmitter means of FIG. 6B to set TDRE and prepare the transmitter means for the reception of a new message for transmission.

If the decision block d704 (FIG. 7B) indicates that −BSY is asserted during the F frame, nothing can be done regardless of the level of −MFA so that the machine returns to the state [0]. The signal −BSY may be asserted by another station or by the data transfer means of the external chip.

−BSY, Decision Block d705

State [5], F Frame

If decision block d704 indicates that neither −BSY nor −MFA are asserted, the machine enters a state [5] during which decision block d705 waits for −BSY to be asserted for synchronization purposes. When −BSY is asserted, the machine goes to state [0].

DATA TRANSFER REGISTERS EMPTY

Decision Block d702

State [0], TO Frame

Situations (1), (2), (8), (9), (12)

If decision block d702 (FIG. 7A) indicates that the data transfer registers are empty and that MF/−M has been pre-set to a low logic level, the data transfer means is in an internal chip and the procedure goes to a block 710 that loads the TO frame into the RTO register. The machine then enters a state [6] during which the F frame is on the internal bus and the procedure goes to a decision block d706.

MTOA, Decision Block d706

State [6], F Frame

Situations (1), (2), (8), (9), (12), (13)

The decision block d706 determines whether to TO address on the internal bus is the same as the address of the station in which the data transfer means resides.

−BSY, −MFA, Decision Block d707

State [7], $D_1$ Frame

Situation (13)

If decision block d706 indicates that the addresses are not the same, a decision block d707 checks −BSY and −MFA and the ensuing operations are the same as previously described in connection with the decision block d704 (FIG. 7B). When −BSY is not asserted and −MFA is asserted, the machine goes to the state [7] during which, as previously explained, −ACK and −BSY are asserted during the $D_1$ frame as is required in situation (13). Thus, whether its registers are full or not, an internal data transfer means can assert the signals −ACK and −BSY during the $D_1$ frame that its associated transmitter means requires to set TDRE and be ready to receive a new message.

Return to Decision Block d706

If decision block d706 (FIG. 7A) indicates that the TO address on the internal bus and the address of the station in which the internal data tranfer means resides are the same, −ACK is asserted during the F frame by a block 712 and the procedure then goes to a decision block d708 (FIG. 7B).

SAME, −SSA, Decision Block d708

State [6], F Frame

Situations (1), (2), (8), (9), (12)

The decision block d708 examines whether or not the seventh bit (SAME SEND) in the control register has been set and whether or not −SSA has a logic level indicating that the FROM address now on the internal bus is the same as the address in the RTO register, which is the address of the station from which the previous message was received.

In situations (2) and (12), the decision block d708 indicates that the SAME SEND flag has been set so that the data transfer means is to only receive from the same sender as before and SSA is not asserted, showing that the message currently on the internal bus is not from that same sender. The machine enters a state [15] in which −BSY is asserted by a block 714 during the $D_1$ frame so as to terminate the transmission, and the machine returns to the state [0]. The assertion of −BSY in the $D_1$ frame is used by the decision block d605 of an internal transmitter means shown in FIG. 6B to terminate the transmission in situation (2) and by the decision block d615 of an external transmitter means shown in FIG. 6C to terminate the transmission in situation (12).

In situations (1), (8) and (9), the SAME SEND flag is low so that this restriction is not in effect; thus, it does not matter what the logic level of −SSA is in decision block d708 (FIG. 7B). The F frame is loaded into the register of the internal data transfer means by a block 716.

−BSY, −ACK, Decision Block d709

State [9], $D_1$ Frame

Situation (9)

If −BSY is asserted during the $D_1$ frame in the state [15] associated with a decision block d715 of FIG. 7C, it means that the registers of the external data transfer means are full so that the message must stay in its associated external transmitter means as required in communication situation (9).

Situations (1), (8)

If neither −BSY nor −ACK are asserted during the $D_1$ frame, but remembering that −ACK was asserted during the F frame by the block 712 (FIG. 7A), it can be seen that the conditions for the successful communication situations (1) and (8) have been met so that frames $D_1$ and $D_2$ are respectively loaded into the registers of the internal data transfer means by blocks 717 and 718, (FIG. 7B), the command bit CMD is set by a block 720, and the RDRF bit is set by a block 722 before the machine returns to the state [0].

Return to Decision Block d708

Situations (1), (8), (9)

After running at least one message through the system without setting the SAME SEND flag, an indication by decision block d708 (FIG. 7B) to the effect that the SAME SEND flag is set and that the current message is from the same station as last time causes the procedure to bypass the block 716 that loaded the F frame and follow the procedure of the state [9]. This prevents writing the same F frame into the register a second time.

STATE MACHINE FOR AN EXTERNAL CHIP

Before going into a detailed description of FIGS. 7C and 7D which illustrate the operation of a state machine for an external data transfer means, it should be noted that the right half of the drawing is for a situation in which the message on the internal bus is from an internal transmitter means and the left half of the drawing is for the situation where the message on the internal bus is from the external transmitter means of the same chip. Although it would seem from FIGS. 3A through 3E that the external data transfer means plays no active role in the situation associated therewith, it still has some function to perform.

−BSY, Decision Block d701

State [0]

The decision block d701 (FIG. 7A) is the same for the data transfer state machines of internal and external chips. It waits for the arbitrator of the mainframe in which the external data transfer means resides to unassert −BSY, thus indicating that a new transmission is beginning and that the TO frame is on the internal bus.

MF/−M, RDRF, Decision Block d702

State [0], TO Frame

In the data transfer machine for an external chip, the signal MF/−M is pre-set to the high logic level. Regardless of the logic state of RDRF, the machine proceeds to a decision block d710 (FIG. 7C).

−CTS, Decision Block d710

State [0], F Frame

Situations (1) through (5)

If the output of the decision block d710 is high, it means that the message on the internal bus is from an internal transmitter means, so that situations (1) through (5) are involved. In situations (4) and (5), the message is to go to the data transfer means of the external chip. The procedure then goes to a decision block d711.

TRANSMITTER MEANS OF EXTERNAL CHIP NOT ON INTERNAL BUS

BUF FUL, Decision Block d711

State [0], TO Frame

Situations (1) through (5)

The decision block d711 checks BUF FUL to see if the registers of the external data transfer means are full. If they are, the machine proceeds to a state [11] in which a decision block d712 tests −BSY and −ACK during the F frame.

−BSY, −ACK, Decision Block d712

State [11], F Frame

Situations (1) through (3), (5)

In the successful internal communication situation (1), −ACK is asserted during the F frame by the block 712 of FIG. 7A; but because the registers of the internal data transfer means for whom the message is intended are empty and ready to receive data, −BSY is not asserted. The machine proceeds to the state [5] for synchronization, as previously explained in the discussion of decision block d705 of FIG. 7B. When −BSY is asserted by the arbitrator in the $D_2$ frame, the state machine returns to the state [0].

In the internal communciation situation (2) which is unsuccessful because the SAME SEND flag is set and the particular message is not from that sender, the output of decision block d712 of FIG. 7C is the same so that the state [5] is entered. The only difference is that −BSY is asserted during the $D_1$ frame by the block 714 of FIG. 7B so that the state machine for the data transfer means of an external chip returns to the state [0] at this time rather than during the $D_2$ frame.

In situation (3), −ACK and −BSY are respectfully asserted in the F frame by the blocks 702 and 704 (FIG. 7A) so that the state machine returns to the state [0] at this time.

Return to Decision Block d711

Situations (1) through (4)

If decision block d711 (FIG. 7C) indicates that the data transfer registers of the external chip are empty, the TO frame is loaded into them by a block 724 and a state [10] is entered during which the F frame is loaded into the data transfer registers of the external chip by a block 726 (FIG. 7D) and the assertion or non-assertion of −BSY and −ACK are tested during the F frame by a decision block d713.

−BSY, −ACK, Decision Block d713

State [10], F Frame

Situations (1) through (4)

In situations (1) and (2), the decision block d713 indicates that −BSY is not asserted and that −ACK is. The machine proceeds to the state [5] during which, as previously explained in connection with decision block d705 of FIG. 7B, it awaits the assertion of −BSY in the $D_1$ or $D_2$ frames before returning to the state [0]. The signal −BSY can be asserted in the $D_2$ frame during a successful communication situation (1) or it can occur during the $D_1$ frame, as in the unsuccessful communication situation (2), when the station with the TO address is instructed by its microprocessor to receive only from the same sender as previously and the FROM address on the bus is for a different station.

In situation (3), the decision block d713 (FIG. 7D) indicates that −BSY and −ACK are asserted during the F frame. It is not a situation such as (10) because decision block d710 (FIG. 7C) has indicated that the transmitter means of the external chip has not been given access to the internal bus. Situation (3) is terminated at the end of the F frame so that the state machine for the data transfer means of the external chip goes to the state [0] at the end of the F frame in order to stay in sync.

If decision block d713 (FIG. 7D) indicates that neither −BSY nor −ACK are asserted during the F frame, communication situation (4) is involved in which the message is being sent from a station in the mainframe where the external chip resides to a station in another mainframe. Because decision block d711 (FIG. 7C) has already indicated that the data transfer registers of the external chip are empty, the transmission can be completed by proceeding to the state [9] during which, as described in connection with decision block d709 of FIG. 7B, the message is delivered to the data transfer means of the external chip.

TRANSMITTER MEANS OF EXTERNAL CHIP ON INTERNAL BUS

Return to Decision Block d710

Situations (6) through (13)

If decision block d710 (FIG. 7C) indicates that −CTS is asserted, it means that the transmitter means of the external chip is on the internal bus so that situations (6) through (13) can be involved.

BUF FUL, Decision Block d714

State [0], TO Frame

Situations (6) through (13)

If decision block d714 indicates by the high logic level of BUF FUL that the data transfer registers of the external chip are full during the TO frame, i.e., the RDRF flag is set, situations (7), (9) and (13) are involved. The machine proceeds to a state [11] and decision block d715.

−BSY, Decision Block d715

State [1], F Frame

Situations (7), (9), (10), (13)

In situation (10), the decision block d715 indicates by a logic low that −BSY is asserted during the F frame. It is asserted by the block 704 of FIG. 7A because the TO address station is busy. The decision block d714 has already indicated that the registers of the data transfer means of the external chip are full. The message is terminated in the F frame so that the machine returns to the state [0].

If, however, decision block d715 indicates by a logic high that −BSY is not asserted during the F frame, the situations (7) and (9) are involved because they require the external data transfer registers to be full during the TO frame as decision block d714 has already indicated; but the situation (13) could also be involved because, in this situation, it does not matter whether the data transfer registers of the external chip are full or not. Because the transmissions of (7), (9) and (13) are to aborted at the end of the $D_1$ frame, the machine enters the state [15] during which, as has been explained in connection with decision block d708 of FIG. 7B for the internal data transfer means, −BSY is asserted during the $D_1$ frame.

Return to Decision Block d714

Situations (6), (8), (11), (12), (13)

If decision block d714 (FIG. 7C) indicates by a logic low that the data transfer registers of the external chip are empty, a block 728 loads the TO frame into the registers and the machine enters a state [8] where a block 730 loads the F frame into the registers and the assertion or non-assertion of −BSY and −ACK is determined by a decision block d716 (FIG. 7D).

−BSY, −ACK, Decision Block d716

State [8], F Frame

Situations (6), (8), (11), (12), (13)

In situation (11), the decision block d716 indicates that both −BSY and −ACK are asserted during the F frame. The assertion of −BSY and −ACK means that the TO address of the message in the transmitter registers of the external chip is in the same mainframe but that it is busy. In order to avoid lock-up of the external bus, the message is passed from the transmitter means of the external chip to its data transfer means via the internal bus. From there, it goes on around the external loop until it arrives once more at the transmitter means of the same external chip in the mainframe which initiated the message. The transmission is tried again unless the associated microprocessor has aborted it.

In order to carry out situation (11), the machine enters a state [12] during which a block 732 asserts −BSY during the $D_1$ frame to keep other transmitter means and data transfer means synchronized, a block 734 loads the $D_1$ frame from the internal bus, and blocks 736 and 738 respectively set NA (which is the ninth bit of the F frame) and EA (which is the ninth bit of the $D_1$ frame) to logic highs so as to indicate to the original sending station when the message reaches it in situation (13) that the station with the TO address was there but was busy.

The machine then enters the state [14] during which the message is loaded into the registers of the data transfer means of the external chip, as indicated by the blocks 718, 720 and 722 that were associated with one of the outputs of decision block d709 of FIG. 7B.

In situations (8) and (12), the decision block d716 (FIG. 7D) indicates that −BSY is not asserted and that −ACK is. This means that the station having the TO address is in the mainframe. The machine enters a state [13] during which the $D_1$ frame is loaded into a register of the data transfer means by a block 740 of the external chip, and EA is set to "1" by a block 742 so as to indicate that the TO address data transfer means can receive data. At this point, a decision block d717 checks −BSY during the $D_1$ frame. If it is not asserted, the successful communication situation (8) is carried out by entering a state [14] during which, as shown in FIG. 7A, the $D_2$ frame is loaded into the register of the data transfer means of the external chip. The CMD flag is set as is the RDRF flag. The message can now go around the external loop. The delivery of the $D_2$ frame to the register of the data transfer means of the internal chip was explained in the discussion of FIGS. 7A and 7B.

In situation (12), however, decision block d717 (FIG. 7D) indicates that −BSY is asserted during $D_1$ by the block 714 of FIG. 7C because the SAME SEND flag is set. The message is not loaded into the register of the data transfer means of the internal chip, but is loaded into the data transfer means of the external chip so that it can go around the external loop by proceeding to the state [14] after setting NA=1 by a block 743 to indicate that the message was not delivered to the TO address station.

In situation (6), the decision block d716 (FIG. 7D) indicates that neither −BSY nor −ACK are asserted during the F frame which means that the TO address station is not in the mainframe. The state machine then proceeds to the state [9] illustrated in FIG. 7A in which −BSY and −ACK are checked in the $D_1$ frame by decision block d709. Since neither −BSY nor −ACK are asserted, the $D_2$ frame is loaded into a register of the data transfer means of the external chip.

In situation (13), the same procedure is followed except that −BSY is asserted during the $D_1$ frame so that decision block d709 causes the machine to go to the state [0].

CODE STATE MACHINE FLOW CHART

In an internal chip, the microprocessor selects the registers to be read from or written into, but in an external chip, there is no microprocessor and these functions are performed by the code state machine. When the MF/−M bit is high, as it is on an external chip, the outputs of the two-bit code state machine are respectively connected to the RA1 and RA0 inputs of the data transfer means to select the register to be read and to the DO9 and DO10 output pins that are respectively connected to the WA1 and WA0 inputs of the transmitter means for the next external chip along the external bus XB in order to select a register to be written into that corresponds to the one being read from.

An additional task of the code state machine is performance of a handshake operation for each word of a message that is sent from the data transfer means of one external chip to the transmitter means of the next external chip along the external bus XB.

The manner in which these functions are performed will now be explained by reference to the flow chart of FIG. 8. A state register 802 in FIG. 8A contains the two bits for each of the states [01], [00], [10] and [11] as they occur. These bits are respectively applied to the inputs RA1 and RA0 of the data transfer means so as to select the register to be read from and via DO9 and DO10 and the external bus XB to WA1 and WA0 of the transmitter for the next mainframe so as to select a corresponding register to be written into.

Whenever the $D_2$ register is empty, an RDRF register flag is set low, a READY flag is set by a block 804 and the machine is placed in the state [01] so as to address the RFA (see FIG. 9A'). While in this state, the logic state of RDRF is monitored by a decision block d801. The various signals referred to below are illustrated in FIG. 8B. When data is written into the $D_2$ register, the output of decision block d801 goes high and a signal −DOCLK is sent via the external bus XB to the −WR input of the transmitter means for the next mainframe along the external bus XB. If the fifo is ready to receive data, it asserts −FIORDY, and it is conveyed via the external bus XB to the −RD input of the data transfer means. The unasserts −DOCLK and causes the RFA frame to be written into the transmitter means via the external bus XB. The transmitter means responds by unasserting −FIORDY, thus indicating to the data transfer means that the MFA frame has been received, and clocks the state machine to its next state [00]. A block 806 indicates this interaction between −DOCLK and −FIORDY, but the interaction is more clearly shown by FIG. 8B. In the state [00], a decision block d802 and a block 808 respectively carry out functions corresponding to those of the blocks d801 and 806, and place the TO frame on the external bus XB. The machine advances to the state [10] in which a decision block d803 and a block 810 respectively carry out functions corresponding to those of the blocks d801 and 806 so as to place the $D_1$ frame on the external bus XB and advance the machine to the state [11]. In the state [11], a decision block d804 checks the logic states of RDRF and READY. The RDRF flag will be high because the $D_2$ frame is still in the $DTD_2$ register of the data transfer means and the READY flag will be high because it has not been cleared. In this circumstance, the previously described interaction between −DOCLK and −FIORDY takes place as indicated by a block 812, the $D_2$ frame is placed on the external bus XB, and both −DOCLK and −FIORDY are unasserted. If the READY flag were not used so that the machine reverted to its initial state [01] at any time when RDRF is low, the unassertion of −FIORDY could cause the machine to revert to its initial state [01] before RDRF becomes low, in which event the frame RFA could be sent a second time. To prevent this from occurring, the flag READY is cleared by a block 814 and the machine returns to the beginning of the state [11]. If RDRF is still high, decision block d804 causes a return to the beginning of the state [11]; but as soon as RDRF goes low, READY is set by the block 804 and the machine returns to the state [01].

DETAILS OF MAINFRAME CONNECTIONS

Reference is made to FIGS. 9A' and 9B' for a description of details of the mainframe $MF_A$ that are not shown in FIG. 2A. Only the station $S_{A1}$ will be described, but all other stations of FIG. 2A are the same. Although not shown, the mainframes $MF_B$ and $MF_C$ of FIGS. 2B and 2C respectively are assumed to be present.

As shown in FIG. 2A, the eight-bit wide I/O line is internally connected to the inputs DI0–DI7 of the external transmitter means $TX_A$ and to the outputs DO0–DO7 of the external data transfer means $DT_A$. The latter are tri-stated when the microprocessor $MP_{A1}$ is sending data to $TX_A$.

The pins A2, A1 and A0 through which $MP_{A1}$ selects the registers of the external transmitter means $TX_A$ to be written into or the registers of the external data transfer means $DT_A$ to be read are respectively internally connected to RA2 and WA2, RA1 and WA1, and RA0 and WA0. When the −WR pin is low, $MP_{A1}$ writes into the registers of $TX_A$ selected by A2, A1 and A0; and when the −RD pin is low, $MP_{A1}$ reads from the registers of $DT_A$ selected by A2, A1 and A0.

Both the external data transfer means $DT_A$ and the external transmitter means $TX_A$ communicate with the internal bus IB via pins DIB0–DIB8, the ninth bit DIB8 being for BW, EA, NA and CMD occurring during the frames TO, F, $D_1$ and $D_2$ respectively. As in FIG. 2A, the external data transfer means $DT_A$ is always connected to the internal bus IB so as to transfer any data thereon to the microprocessor $MP_{A2}$ via its registers; but the external transmitter means $TX_A$ is only connected to the internal bus IB via a switch $s_A$ when it receives a −CTS command to send from the arbitrator $A_A$ in response to its assertion of −RTS.

At the external chip $XC_A$, the nine lines of the internal bus IB are respectively connected to the pins DIB0–DIB8 that are connected to the data transfer means $DT_A$ and the transmitter means $TX_A$ in the same way as the pins of the same designation in the internal chip $IC_{A1}$ are connected to $DT_{A1}$ and $TX_{A1}$, i.e., $DT_A$ is always connected to IB and $TX_A$ is only connected to the internal bus IB via a switch $s_A$ when $TX_A$ receives a −CTS command to send from the arbitrator $A_A$.

An essential difference between the internal chip $IC_{A1}$ and the external chip $XC_A$ is the fact that the inputs DI0–DI7 to the external transmitter means $TX_A$ and the outputs DO0–DO7 of the external data transfer means $DT_A$ are respectively connected to separate pins as are WA2, WA1 and WA0 of $TX_2$ and RA2, RA1 and RA0 of $DT_A$.

The external data transfer means $DT_A$ transfer data from the internal bus IB to the external bus XB via pins DO0–DO7 and DO8 and, as noted in FIG. 2A, the code bits supplied by the code state machine for the different registers of $DT_A$ being read from appear at pins DO9 and DO10. Selection of the register is attained by connecting DO9 and DO10 to the pins RA0 and RA1. As in FIG. 2A, the signal −DOCLK supplied by $DT_A$ when data is written into its $DTD_2$ register goes to the next mainframe $MF_B$ via the differential driver $DFD_A$; and the signal −FIORDY on the pin −RD as made in response to a signal −DOCLK from the previous mainframe $MF_C$ also passes through the differential driver $DFD_A$. At this point, −FIORDY goes via a conductor of the external bus XB to the previous mainframe $MF_C$.

The manner in which these pins and signals are connected to the next external chip along the external bus XB (which would be $XC_B$ in the system of FIG. 2B) is the same as the illustrated connections of $XC_C$ to $XC_A$ that are respectively shown in FIG. 2C and 2A. After passing through the differential receiver $DFR_A$, the leads from the pins DO0–DO7 of $DT_C$ are respectively connected to the pins DI0–DI7 of the transmitter means $TX_A$; the lead from the pin DO8 of the data transfer means $DT_C$ is connected to WA2; the code bits from pins DO9 and DO10 of $DT_C$ are respectively connected to WA0 and WA1 of $TX_A$; −DOCLK from $DT_C$ is connected to the −WR PIN OF $TX_A$; and −FIORDY is connected to the −RD pin of $DT_A$.

In order to enable a fifo in either of the transmitter means $TX_{A1}$ or $TX_A$, a low logic level is applied to a pin labelled ENFIFO; and in order to clear the fifo, a low logic level is applied to a pin RSTFIO. In the internal transmitter means $TX_{A1}$, the enabling and clearing of the fifo is under the control of the microprocessor $MP_{A1}$; but in the external transnitter means $TX_A$, the fifo is always enabled in response to the low logic level that is applied to the ENFIFO pin. Clearing the fifo of the external transmitter means $TX_A$ is effected whenever power is not applied to the mainframe on either side of $MF_A$, i.e., $MF_C$ and $MF_B$ in FIGS. 2C and 2B respectively. Each mainframe is provided with a power input such as indicated by the block 902 in FIG. 9A′. The power input 902 provides a signal having a low logic level when power is not supplied to it and a high logic level when power is supplied to it. Thus, logic levels are conducted via the differential driver $DFD_A$ to a conductor of the external bus XB that goes to the RSTFIO pin on the external transmitter means $TX_B$, in which event the signal is called IMFRDY, and to the RSTFIO pin of the external transmitter $TX_C$, in which event the signal is called OMFRDY. Thus, the pin RSTFIO of $TX_A$ receives a signal IMFRDY from the power input (not shown) of $MF_C$ and a signal OMFRDY from the power input (not shown) of $MF_B$. If either signal has a low logic level, indicating a lack of power, the fifo of $TX_A$ is cleared.

When using the fifo of an internal transmitter means such as $TX_{A1}$, there are situations where the fifo must be bypassed. For example, if messages are stacked up in the fifo and the message currently in the registers of $TX_{A1}$ is not being delivered for some reason, the microprocessor may wish to abort the message by setting a stop-transmit command (STOP XMIT) in a control register in a manner to be described. In this situation, the command STOP XMIT would be stacked up behind the other data in the fifo so as to have no effect and the station would be locked up because it can't transmit the current message. A similar situation is encountered when the microprocessor $MP_{A1}$ wishes to make a software reset by setting a SOFT RESET command in its control register because this does not clear the fifo. In either situation, the fifo must be disabled so that the command can bypass it and go directly to the command register.

Only one pin VDD is shown on each chip for the application of an operating potential, and only one pin GND is shown for connection to ground, but more may be used.

The power input 902 resets all of the chips when power comes on so as to set all the state machines to their starting state and perform the following functions that will subsequently be described. All interrupts of an interrupt register are disabled and a software reset bit in a control register and a TDRE bit indicating that the registers are empty are set in a status register. All other control register bits are made to have a logic low. In addition, the reset bit of each internal chip can be set by its microprocessor.

SINGLE MAINFRAME OPERATION

If neither the cable to the input of a transmitter means of a chip nor the cable to the output of a data transfer means are connected, a signal ONEMF is asserted that connects internal conduction between the input and output; but if only one of the cables is connected, a warning signal IOERR is generated that turns on a warning light.

Setting of the Ninth Bit D8

The BW bit of the TO frame is automatically set to unity when data is written into the $TD_2$ register of a transmitter means without data having been written into the $TD_1$ register. BW is set when TDRE is set and cleared when $TD_1$ is written into.

The EA bit is low when the F frame is first placed on the internal bus IB but is set high by the state machine of the data transfer means of the station in another mainframe to which the message is sent whether it is busy or not. This means that the TO address station is present.

The NA bit is low when the $D_1$ frame is first placed on the internal bus IB but is set high by the state machine of the data transfer means of the station in another mainframe if it is the station to which the message is sent and is busy.

The CMD bit is set by setting the SEND CMD bit of the control register.

REGISTERS

Figure 10C:
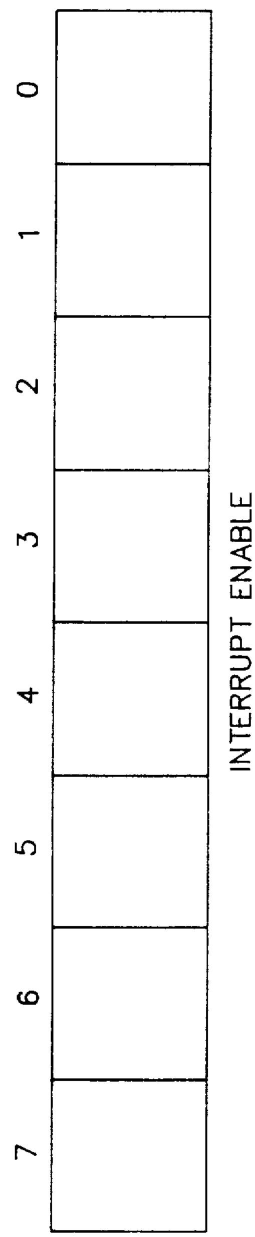

Reference is now made to FIGS. 10, 10A, 10B and 10C for a detailed description of the registers of an internal chip such as $IC_{A1}$. Also shown are the pins. Arrows on each pin show the direction of flow of data. The pins on the left side of FIG. 10 are for communication with the associated microprocessor; the pins DIB are to be connected to the internal bus IB; and the pins −RTS, −CTS, −ACK, −BSY and CLK are to be connected as shown in FIGS. 2A, 2B, 2C and 9A′, 9B′. Each register has eight bits, and the logic levels of A2, A1 and A0 that are used to address it are indicated to the right of the register name. The associated microprocessor can only write into the registers in the column at the right that are in the transmitter means and read from the registers in the column at the left that are in the data transfer means, but the various state machines can read any of the registers as required.

When a microprocessor has a message to send, it asserts −WR, sets A2, A1 and A0 to "0", "0" and "0" respectively and loads the TO address of the station to which the message is to go into the TTO register. At a previous time, the microprocessor asserted −RTS, set A2, A1 and A0 to "0", "0" and "1" respectively and loaded the address for the station in which the internal chip resides into the MFA register. Two words of the message may then be loaded into the $TD_1$ and $TD_2$ registers. If there is only one word of data in the message, it is loaded into the $TD_2$ register.

The bits of the status register are as follows. The interrupt bit INT and the command bit CMD will be explained later. At any time when the $DTD_2$ register of a data transfer means has data in it, a RDRF bit is set. When the message has been delivered to the TO address station and has returned along the external bus XB to the mainframe that originally sent it, a TDRE bit is set so as to permit a new message to be written into the registers TTO, MFA, $TD_1$ and $TD_2$ of the transmitter means. If no station having the TO address is found, an NMAA bit is set; and if a message is aborted, an LTL bit will be set. The setting of LTL also sets TDRE.

The control register of FIG. 10B that is in a transmitter means performs the following functions. If it is desired that a station only receive a message from the same station that it just received a message from, its microprocessor sets the SAME SEND bit in the control register. In performing this function, a state machine for the data transfer means of the station to which the message is being sent will compare the address in its RFA register that came with the last message received with the address in the F frame of the message currently on the internal bus IB. If they are not the same, the station will assert −BSY. If it is desired to put a certain command into effect, the microprocessor sets the SEND CMD bit. This will cause the CMD bit in the status register to be set and will set the CMD bit in the $D_2$ frame high. Although this serves no function at the present time, it is available if needed. Should the microprocessor decide to abort a message, it sets the STOP XMIT bit; and if software reset is desired, the SOFT RESET bit is set. This prevents the internal chip from communicating with the internal bus IB and sets the TDRE bit in the status register at "1" so that the transmitter means may receive a new message. When a new message is received, TDRE goes to "0". No other bits in the various registers are affected. During a software reset, all registers can be changed in the normal fashion. It is the only condition in which the MFA register may be loaded. A software reset also disables a request IREQ that the microprocessor interrupt whatever else it is doing and proceed with functions related to the internal chip. Although a hardware reset effected by the power input 902 sets the SOFT RESET, it also forces all of the state machines to their initial states.

The purpose of the interrupt mask register is to determine those conditions under which the IREQ pin is to be made low so as to interrupt whatever the associated microprocessor is doing and cause it to perform functions for the chip. A logic low will appear on the IREQ pin whenever the interrupt bit INT of the status register is set, and it will be set when any of the other bits of the status register equal "1" and the corresponding bit in the interrupt mask equals "1". The microprocessor can set any of the bits D6–D0 to either a "1" or a "0" in the following manner. If the bit D7 equals "1", all of the bits D6–D0 that have a "1" will be set; but if D7 equals "0", all of the bits D6–D0 that have a "1" will be cleared. Therefore, if it is desired that IREQ have a low value so that the microprocessor is interrupted whenever either CMD or BW in the status register equals "1", the microprocessor writes the following bits into the interrupt mask register: 11001000. The bit D7 equals "1" so that D6 and D3 are set at "1". The bit D6 is the same bit that BW is on in the status register and D3 is the same bit that CMD is on in the status register. The bits with the zeroes are not affected so that if they were previously set, they will remain so. If all bits in the interrupt mask register are to be cleared, the microprocessor writes the bits 01111111. A bit in the status register is masked or prevented from asserting a low on IREQ when the corresponding bit in the interrupt mask register equals "0".

Because any bit in the interrupt mask register can be made equal to "0" or "1" without affecting the other bits, it is made not necessary for the microprocessor to read this register or to keep it in memory so that the bits that are not to be affected can remain at their original values.

It should be noted that the data transfer means of an internal chip does not require a register for the TO address on the internal bus IB because the latter can be compared with the station address in the MFA register. In an external chip, however, an additional register RTO shown in dashed lines in FIG. 10 is required so that the TO address can be placed on the external bus XB. But inasmuch as an external chip is not associated with a microprocessor, it does not require an interrupt mask or a control register.

INTERNAL CHIP BLOCK DIAGRAM

In view of the fact that the internal and external chips have so much in common, both are illustrated by block diagram of FIGS. 11A and 11B. The internal chip will be described first, and then the difference of the external chip will be described. The purpose of FIGS. 11A and 11B is to identify the major components of the chips, to show in a general way the communications between them, and to identify the subsequent figures of the drawings that relate to each component. The operation of the chips is explained with the aid of the flow charts for the various state machines.

In an internal chip, the interface with its microprocessor is provided by a block 1102 (FIG. 11A) containing the read-write select-logic circuits shown in FIGS. 12A–12D. The microprocessor provides the data inputs D0–D7 and inputs CS for indicating that the chip is selected for operation, −RD to indicate that the microprocessor is to read from its registers, and RA0–RA2 to indicate the registers to be read from.

Part of the block diagram relates to the transmitter means of a chip and part to the data transfer means. The transmitter means is considered first. When a station has a message to send or has instructions to give on the eight input lines DI0–DI7, it asserts −WR and a combination of WA0–WA2 (as shown in FIG. 9A') to select the register to be written into. The bits DI0–DI7 and WA0–WA2 may go directly to the registers or indirectly via a fifo 1104 that is illustrated in FIGS. 24A–24I. If the fifo 1104 is to be used, the microprocessor asserts −ENFIFO. Application of this signal to the fifo 1104 and a multiplexer 1106 having the circuits illustrated in FIGS. 25A–25F causes the fifo 1104 to accept the information and the multiplexer 1106 to connect its input to the output of the fifo. If −ENFIFO is not asserted, the input of the multiplexer 1106 is directly connected to receive DI0–DI7 and WA0–WA2 so that the fifo 1104 is bypassed.

When a message is being sent, the bits DI0–DI7 at the output of the multiplexer 1106 successively represent the TO address, the FROM address and data words $D_1$ and $D_2$. The lines DI0–DI7 are connected to the input of a block 1108 containing the transmitter registers illustrated in FIGS. 13A–13H and are written into the appropriate register under the control of a write decoder 1110 illustrated in FIGS. 12A–12D that deciphers the WA0–WA2 bits appearing at the output of the multiplexer 1106. When the $TD_2$ register is written into, a transmitter state machine 1112 (illustrated by the flow charts of FIGS. 6A, 6B and 6C and the schematic circuit diagrams of FIGS. 20A through 22E) asserts an −RTS signal on its individual line to the arbitrator of the mainframe in which the chip resides; and when the arbitrator asserts −CTS on the individual line to the state machine asserting the −RTS signal, the state machine 1112 causes a multiplexer 1114 having the circuits illustrated in FIGS. 13A–13H to transmit the TO, F, $D_1$ and $D_2$ frames in sequence to an electrical output buffer 1116 having the circuits shown in FIGS. 23A and 23B. The output of the buffer 1116 is connected to the internal bus IB of the mainframe. The bits DI0–DI7 are now termed DIB0–DIB7. As can be seen from the flow chart of FIGS. 6A and 6B, the transmitter state machine 1112 requires information as to the assertion or non-assertion of −BSY and −ACK on the control lines for the mainframe.

Whenever the sending station has received information returned to it around the external bus XB to the effect that the message has been successfully delivered; the message could not be delivered and is lost; or there has been a software reset, the state machine 1112 sets a TDRE bit in a status register 1118 having the circuits illustrated in FIGS. 17A–17F. Conversely, when the empty data transfer register receives data, the TDRE bit in the status register 1118 is cleared.

It will be recalled that a ninth bit is added to the eight bits from the microprocessor to form the TO, F, $D_1$ and $D_2$ frames before they are put on the internal bus IB. The ninth bit is actually output to the internal bus IB by a bit-8 transmit logic contained in a block 1120 and having circuits shown in FIGS. 14A–14F. If the chip is the one that originated the message, the ninth bit for the TO frame is referred to as BW and is set by the transmitter state machine 1112 to a high or low level, depending on whether the message received from the microprocessor had a $D_1$ word or not; and the setting of the ninth bit for the $D_2$ frame depends on whether the SEND CMD bit has been set in a control register 1122 to be described. The ninth bits for the F and $D_1$ frames, which are respectively called EA and NA, are at a low level. The bits for EA and NA are controlled by the state machine for the data transfer means of an external chip, as shown in FIGS. 7C and 7D, and will be discussed below.

In order that a microprocessor may send instructions, e.g., stop transmit or set the conditions for its interruption by the assertion of a signal IREQ, the DI0–DI7 lines from the multiplexer 1106 are respectively connected to the inputs of a control register 1122 and an interupt mask register 1124, the circuits for both of which are shown in FIGS. 16A–16I. These registers can be written into whenever the write decoder 1110 receives the proper values of WA0–WA2.

The components of the block diagram of FIGS. 11A and 11B that are involved with the data transfer means of an internal chip are as follows. As previously noted, the data transfer means are always connected to the internal bus IB. Electrical isolation buffers 1126 having the circuits shown in FIGS. 23A and 23B are connected between the internal bus IB and the receive-data registers shown in a block 1128. The circuits for the latter are shown in FIGS. 15A–15I. As the frames TO, F, $D_1$ and $D_2$ successively come along the internal bus IB, they are stored in appropriate registers of the block 1128 under the control of a state machine 1130, the function of which is explained in connection with the flow chart of FIGS. 7A and 7B and the circuits for which are shown in FIGS. 18A through 19G. If the registers of the block 1128 are full so that they cannot receive data from the internal bus IB, the register 1128 informs the state machine 1130 of this fact, and it sets the D5 bit (RDRF) in th status register 1118. The D5 bit is cleared when the microprocessor reads data from the registers.

When a microprocessor reads data from the registers 1128, it sends appropriate sequences of RA0–RA2 to a read multiplexer 1132 and removes the tri-state condition of read output 1134. The circuits for both the read multiplexer 1132 and the read output 1134 are shown in FIGS. 26A–26F.

The bit D8, which is the ninth bit of a message on the internal bus IB that respectively represents BW, EA, NA and CMD in the TO, F, $D_1$ and $D_2$ frames, is applied to a bit-8 data transfer means register 1136 having the circuits shown in FIGS. 23A and 23B. This bit can be read by the microprocessor and is also supplied to the transmitter state machine 1112 so that it can determine what has happened to the message it sent.

EXTERNAL CHIP BLOCK DIAGRAM

Whereas most of the components of an external chip are the same as those of FIGS. 11A and 11B, it has a code state machine 1138 having the circuits shown in FIGS. 22A through 22E that provides outputs DO9 and DO10 that are connected to RA0 and RA1 respectively for the purpose of identifying the registers of the block 1128 that are being read from so as to place the data stored therein on conductors of the external bus XB. These same conductors are connected to the WA0 and WA1 inputs of the block 1102 of the next external chip around the loop formed by the external bus XB, and the ninth bit DO8 is connected to WA2. Another difference is that the circuits of the block 1134 are not tri-stated so that data can flow to the external bus XB.

Whereas the stations of the embodiment described have a microprocessor for each station, it is to be understood that any type of controller can be used and that a single controller could provide all the required functions. Furthermore, although a series internal bus could be used in practicing the invention, it would slow down the rate of transmission. In addition, each of the transmitter means and data transfer means, both internal and external, has its own state machine, but a single state machine could be used, if desired. The mainframes described are just one way of assembling a complete group of stations.

What is claimed is:

1. A bus system comprising a mainframe having a parallel internal bus, a group of stations each having an internal transmitter for placing the words of a message on said bus when enabled and having internal data transfer means for receiving messages on said bus, each of said stations having an address, an input, an external transmitter for placing words at said input on said internal bus in order when enabled to do so, an output, an external data transfer means for transferring words from said internal bus to said output, all of said transmitters having means for asserting a request-to-send signal when they have a message to send, an arbitrator, first individual lines respectively connected between said transmitters and said arbitrator for conveying request-to-send signals to said arbitrator from said transmitters, means in each transmitter for placing a request-to-send signal on its first individual line when it has a message to send, second individual lines for conveying clear-to-send signals from said arbitrator to said transmitter, said arbitrator having means for sending clear-to-send signals in sequence via said second individual lines to those of said transmitters including said external transmitter that have asserted a request-to-send signal so as to enable them to respectively start placing words of a message on said internal bus, said transmitters having means, when enabled, for placing words on said bus to the order of: a TO word that is the address of the station to which the message is to go; a FROM word that is the address of the station sending the message; and a plurality of data words, first and second control lines respectively connected to said arbitrator, said stations and said external data transfer means, said stations having means for asserting a signal on said first control line when a TO word on said internal bus is its address and means, when the station is addressed, for asserting a signal on said second control line before all the words of a message have been placed on said internal bus if it is not ready to receive a message, said stations having means for terminating the placement of words on said internal bus when a signal is asserted on said second control line, said arbitrator having means for asserting a signal on said second control line after any transmitter has placed a given maximum number of words on said bus, and said external data transfer means having means for conveying words on said internal bus to said output when no signals are asserted on said first and second control lines prior to the assertion of a signal on said second control line by said arbitrator.

2. A bus system as set forth in claim 1 in which said group of stations further comprises means in each station for indicating whether a FROM word on said internal bus is the address from which it has been instructed to next receive a message, and means for asserting a signal on said second control line so as to terminate the transmission before the entire message is sent if the TO address on said internal bus is its own and the FROM address is not the address from which it is to receive a message.

3. A bus system as set forth in claim 1 wherein said group of stations further comprises means for adding extra bits to the words of a message placed at said output by said external data transfer means, the logic states of said extra bits indicating the combination of signals asserted on said first and second control lines, means for coupling said output to said input, said stations having means for examining words placed on said internal bus to see if the FROM word agrees with its address so as to indicate that the station sent this message, and means responsive to said extra bits for determining whether the TO address of the message exists and, if so, whether it was delivered and, if not, providing a signal that can be used to abort the message and prevent the station from being locked up.

4. A communication system comprising an internal bus, a group of stations each having its own address, data transfer means having access to said bus for transferring messages on said bus to said station and a transmitter that does not normally have access to said bus, each of said transmitters having first and second individual lines, means for asserting a signal requesting access to said bus on said first individual line when it has a message to send and means for starting to place, the words of a message on said bus in sequence when a clear to send signal is asserted on its second individual line, said message including at least words in respective location in the message having the address of the station to which the message is to go and the address of the station sending the message, selection means coupled to said first and second individual lines from the transmitters of each station for determining the sequence in which clear-to-send signals are to be asserted on said second individual lines, an acknowledge control line coupled to said stations;

each of said stations having means for asserting an acknowledge signal on said acknowledgement control line when its data transfer means transfers its own address to it from said bus, a busy central line coupled to said station, each of said stations having means for asserting a busy signal on said busy control line when its data transfer means transfers its own address to it from said bus and it is not prepared to receive a message, and each of said transmitters having means for decoupling it from said bus when a busy signal is asserted on said busy control line.

5. A communication system as set forth in claim 4 wherein said selection means has means for asserting a busy signal on said busy control line after a transmitter has placed words representing the address to which a message is to go, its own address and a given number of data words on said line.

6. A communication system as set forth in claim 4 in which said group of stations is provided with an external transmitter that does not normally have access to said bus, and which has an input to which a message it is to transmit is to be applied, buffering means coupled to said input, first and second individual lines, means for asserting a signal requesting access to said bus on said first individual line when it has a message in its buffering means and means for placing the words of the message on said bus in sequence when a clear-to-send signal is asserted on its second individual line, said latter first and second individual lines being coupled to said selection means, said selection means operating to react to a request-to-send message on said first individual line from said external transmitter so as to include clear-to-send signals on the second individual line to said external transmitter in said sequence, said external transmitter being coupled to said busy control line and having means for maintaining a message in its buffering means when a busy signal is asserted on said busy control line prior to the placement of the entire message on said bus, an external data transfer means having buffering means coupled to said bus, an output coupled to said latter buffering means, an individual buffer full line and means for asserting a signal on said buffer full line when the latter buffering means is full, means for each station for asserting a recognition signal indicating that it originally transmitted a message on said internal bus when the transmitter for the station does not have access to said internal bus and the word in the message on the bus for an address of a station that sent the message is the address for the station, means including an external bus for coupling said output of said external data transfer means to said input of said external transmitter, and means for asserting a busy signal on said busy control line when a buffer full signal is asserted on said buffer full line by the external data transfer means for a group and (1) a message is being placed on said internal bus by a transmitter for a station in the group and an acknowledge signal is not asserted on said acknowledge control line or (2) a message is being placed on said internal bus by the external transmitter for the group and no station in the group has asserted a recognition signal.

7. A communication system as set forth in claim 6 in which said external data transfer means for said group of stations has means coupled to said acknowledge control line for setting the logic state of an extra bit accompanying a message it is placing on said external bus so as to indicate whether or not an acknowledge signal has been asserted on said acknowledge central line and means coupled to said busy central line for setting the logic state of a different bit accompanying the message so as to indicate whether or not a busy signal has been asserted, and means for each station responsive to the logic states of said additional bit accompanying a message and to the assertion that station of a recognition signal for indicating whether or not its message has been delivered.

8. A communication system comprising a plurality of groups of stations, each station having an address and each group having an input and an output, each station being capable of providing a message having a designated word represent the address of the station for which the message is intended and a designated word representing its own address, means including an internal bus in each group for conveying a message originating in a station in the group and intended for another station in the group to the intended station, means in each group for conveying a message originating in a station in the group and intended for a station in another group to the output of the group, means including an external bus for coupling the output of each group to the input of a next group, the output of the last group being coupled to the input of the first so as to form a loop, means in each group for conveying a message arriving at the input and intended for a station in another group to its output, means in each group for conveying a message arriving at its input and intended for a station in that group to that station if it is prepared to receive the message and for conveying the message to the output of the group whereby the message may be conveyed around said loop back to the input of the group in which the station originating the message is located, means in each group for adding bits to the message as it leaves the output for a group indicating whether or not the station for which the message is intended is in the group, and if it is, whether or not that station was prepared to receive the message, and each station having a means for recognizing when a word in a message that designates the address of a station originating the message is its own address and means for analyzing the extra bits accompanying the messages to see what happened to it when such recognition occurs.

* * * * *